United States Patent [19]
Barber et al.
[11] Patent Number: 5,040,123
[45] Date of Patent: Aug. 13, 1991

[54] EXPERT SYSTEM SCHEDULER

[75] Inventors: Karon A. Barber, Bloomfield Hills; David H. Osterfeld, Birmingham, both of Mich.; Kenneth L. Burridge, Clearwater, Fla.

[73] Assignee: General Motors Corporation, Detroit, Mich.

[21] Appl. No.: 405,692

[22] Filed: Sep. 8, 1989

[51] Int. Cl.[5] .............................. G06F 15/46
[52] U.S. Cl. .............................. 364/468; 364/149; 364/401; 364/513
[58] Field of Search .............. 364/468, 513, 401, 402, 364/403, 149-151

[56] References Cited

U.S. PATENT DOCUMENTS

| | | | |
|---|---|---|---|
| 4,648,023 | 3/1987 | Powell | 364/468 X |
| 4,796,194 | 1/1989 | Atherton | 364/468 |
| 4,807,108 | 2/1989 | Ben-Arieh et al. | 364/468 X |
| 4,852,001 | 7/1989 | Tsushima et al. | 364/468 X |
| 4,896,269 | 1/1990 | Tong | 364/468 |

*Primary Examiner*—Joseph Ruggiero
*Attorney, Agent, or Firm*—Albert F. Duke

[57] ABSTRACT

An expert system scheduler is disclosed which uses heuristics developed by an experienced factory scheduler. The scheduler uses these heuristics to generate schedules. Forward and backward scheduling is used at different stages of the schedule generation process.

6 Claims, 26 Drawing Sheets

EXPERT SYSTEM SCHEDULER

FIELD OF THE INVENTION

This invention relates to a method of scheduling operations in manufacturing facilities and more particularly to an expert system scheduler for generating a detailed sequence of events to be executed on the floor of a factory.

BACKGROUND OF THE INVENTION

The effort to bring Computer Integrated Manufacturing (CIM) to factory floors has been motivated by the overall thrust to increase the speed of new products to market. One of the links to CIM is factory floor scheduling, which is concerned with efficiently orchestrating the factory floor to meet the customer demand and responding quickly to changes on the factory floor and changes in customer demand. Traditionally, factory floor scheduling has been a difficult problem to solve. Even after decades of research, management scientists have failed to find solution approaches which can be applied in practice to repetitive batch production scheduling. Most commercially available packages have not found generic application, because they are hard to customize to a particular plant situation and objectives. Also, some of the math-based scheduling packages require large computation times in their search for a near optimum solution.

SUMMARY OF THE INVENTION

In accordance with the present invention a scheduler is provided which schedules manufacturing facilities and more specifically generates a detailed sequence of events to operate the plant floor of a factory. The scheduler employs expert system techniques which lead to improved plant floor schedules under dynamically changing operating conditions. The scheduler was developed for application in the automotive industry, but is also applicable to other batch oriented manufacturing industries.

The scheduler utilizes various artificial intelligence (AI) based methodologies as well as a commercially available expert system shell. One of the primary features of the scheduler is its generic approach. That is, it doesn't matter what type of parts, machines or operations exist at the plant being scheduled. Among the many benefits of using such a system, are: reduced inventories, reductions in overtime, better utilization of equipment and user flexibility.

One of the features of the scheduler is the method in which schedules are generated. Rather than attempting to schedule various events while considering global data and constraints the scheduler generates the plant floor schedule in a multi-pass process. That is, events are scheduled in a manner that initially considers the most basic operating constraints within the plant. Then, in successive iterations or passes, additional constraints are invoked relative to the scheduled events. Events may be rescheduled to meet the constraint being applied if necessary. Thus, a plant floor schedule is built up in an iterative manner while satisfying all of the constraints in the system. Within the multi-pass approach there are additional features of significance. These include (1) scheduling preventive maintenance jobs (2) inventory versus safety stock usage (3) the concept of scheduling into negative time (4) scheduling Just-In-Time but allowing a user to pull the schedule early (5) selective, dynamic application of both forward and backward scheduling and (6) dynamic rededication of machines based on short term load.

Another feature of the scheduler of the present invention is its generic architecture. Data is maintained in specified knowledgebases. These knowledgebases are generic in the sense that they are used in all applications of the scheduler yet are internally unique to reflect the plant specific data. The five knowledgebases that are a part of the scheduler are generally named (1) model (2) orders (3) calendar (4) Gantt chart and (5) batches or trays. Although generic, the system can be customized to match the needs and objectives of the plant being modeled. For example, the model knowledgebase may be of an axle plant, the orders knowledgebase may be customer orders for the various axles produced in varying quantities and due dates. The calendar depicts the time each machine is available for production over the time horizon that the plant is scheduling. The last two knowledgebases, gantt chart and batches represent basic entities used in displaying to the user the generated schedule and for modeling batch sizes of parts to be processed.

Another feature of the present invention is the utilization of "partial fits" in the schedule generation process. Partial fits may be best described through the following example. Suppose a batch or lot of part A is scheduled from 12:00 to 12:30. Further, suppose that another batch of part A is scheduled from 12:50 to 1:20. Now, suppose it is desired to schedule another batch of part A and the desired start and end times are 12:15 and 12:45 respectively. It is obvious that this event will not fit entirely in the machine's idle time (12:30 to 12:50) as there is already a batch scheduled from 12:00 to 12:30. But, if this event is allowed to be scheduled at 12:15 to 12:45, the earlier event (12:00 to 12:30) can be rescheduled so that its start and end times are now 11:45 and 12:15. The event to be scheduled did not fit entirely in the original consideration but did partially fit. If the percent of partial fit exceeds a system defined parameter then the scheduler will allow this "partial fit". More generally, the system is rescheduling some other events a little earlier so that the event currently under consideration can be scheduled near the desired times.

An area where the scheduler of the present invention is very useful is in merging an existing schedule with a newly generated one. This is an area where many scheduling systems fail. Since no scheduling system can instantaneously generate a plant floor schedule and implement it on the factory floor, consideration must be given to the delay between the time that a plant requests a schedule and the time that the generated schedule can take effect on the floor. It is uneconomical for equipment to sit idle while a new schedule is being generated if customer demand indicates the equipment should be utilized. The scheduler of the present invention permits the user to define how long to continue to follow the existing schedule or when to switch over to the new one. After that elapsed time, the newly generated schedule will be integrated and the plant floor can begin to operate under the control of the new schedule.

The scheduler of the present invention uses factory data related to three primary categories. First, is data having to do with parts that are produced in the plants. Second, is data having to do with operations, or those processes that are executed on a part, as it is being built.

Finally, there is machine data defining which operations can run on which equipment.

An interface or preprocessor, between the scheduler and the source of the factory data, analyzes all of, the data and builds a model of the factory from which the expert system scheduler generates schedules. The basic requirements for the interface are to insure that all of the plant data is consistent and valid and to dynamically create the plant model. The scheduler then 1) generates a schedule for the plant floor which includes a time dependent sequence of events for each machine in the plant and 2) satisfies the customer orders.

The scheduler was developed using KEE, an expert system shell from IntelliCorp and the LISP programming language. The scheduler is driven by the requirement to build parts for customers. The scheduler initially assesses the available machine capacity (i.e. when machines can produce parts). Only the time available that can be used to produce parts on the machines is considered throughout the duration of the scheduling. Prior to back scheduling customer orders, the existing conditions in the plant are considered. One condition considered is the status of each machine. If machines are currently processing parts and/or committed to processing additional parts then those events are a constraint in the scheduling system. Further, if a machine is not available, or is in a down state, this factor must be considered as well. Once the current plant conditions are fully captured and comprehended by the scheduler the backscheduling of orders begins. The orders for parts to be scheduled are processed in a specific sequence. They are scheduled from the order with the latest due date back to the one with the earliest due date. The primary scheduling heuristics incorporated into the scheduler focus on backscheduling. Basically, backscheduling involves scheduling operations to be performed on a part, on the best available machine, from the final operation back to the initial or leadoff operation. This approach attempts to generate both a synchronous schedule and a just-in-time (JIT) production schedule.

Backscheduling begins with a chosen customer order. Next, the final operation for a specific part in the order is selected. Then the machines that can perform the operation are identified. The scheduler then determines the optimal time to schedule that operation given the events already scheduled at that point in time. The optimal time is defined as the time which permits a synchronous flow to the next operation with no required movement to and from a storage area. The scheduler also considers the consequences of setups or changeovers during the scheduling of events. The best choice for a process is made after all of the possibilities are evaluated. The criteria for selecting the best machine includes maximizing synchronousness, minimizing setups, scheduling batches of parts together and following machine dedication logic. This procedure continues for each operation for a given part in a customer order. The other parts in the order are then scheduled until the entire order is complete. Then remaining customer orders are scheduled until all of them have been scheduled. At this point the scheduler has produced a plant schedule that represents all events necessary to meet the customer demand for parts.

After a schedule has been generated for the plant, the scheduler considers current inventory and safety stock levels. These two areas represent on hand amounts of any given part at any operation. The scheduler uses the on hand inventory to improve the schedule. Safety stock is similarly used, but only in cases where orders are scheduled to be completed after their due date. That is, the safety stock is used in a much more cautious manner. It is intended for emergency situations, such as when a machine breaks down or when orders are expected to be completed late.

Next the system insures that the schedule is in fact feasible. It does this by shifting forward in time any events that were backscheduled to occur before the current time. Such infeasibilities can occur if there is not sufficient time available on the machines to build the parts or when too many customer orders need to be scheduled in the planning horizon. The shifting insures that all events will be scheduled at or later than the current time. In addition, during the shifting of the schedule forward in time, an attempt is made to minimize any lateness for orders by utilizing slack or idle time.

The next phase is to schedule preventive maintenance (PM) jobs on any machine that requires periodic maintenance. Typically, these jobs vary in duration from a few minutes to hours and must be performed at regular intervals. There is more flexibility in scheduling these jobs since they usually can be scheduled in a window or range of time. An attempt is made to schedule them in any existing idle time in the plant schedule. Basically, they are scheduled in the first available place where they will fit and not adversely impact already scheduled events. If no such place exists then they are scheduled where they will have a minimal impact on events that have been scheduled. Production events are rescheduled as required to make room for PM jobs. In any event, all PM jobs must be scheduled.

An optional feature, which pulls events earlier in time is also available to users. This capability, if used, will cause events to be completed earlier than they are needed and thus increase inventory levels in the plant. It can have positive implications in that if unexpected machine failures occur there is still a chance that the excess time (from pulling events earlier) will be sufficient to offset the downtime for the machine and still complete the order on time. This step merely tries to find idle time periods, earlier than where an event is currently scheduled, where the event can be rescheduled. It considers aspects such as minimization of setups as well as all possible machines that the process can be scheduled on during this phase.

The final functional area focuses on forward scheduling events. This method is essentially a mirror image of the backscheduling approach. Forward scheduling is applied within the scheduler in two areas. The first is for the replenishment of safety stock, which attempts to rebuild any safety stock used during the schedule generation. The second is for scheduling lower priority orders that are completed only if plant capacity is sufficient to do so. Specifically, forward scheduling looks for sufficient idle time to schedule a process and any required setups. Forward scheduling attempts to minimize additional setups with lesser emphasis on being synchronous. Forward scheduling will not schedule events that will cause any disruption to the customer orders already scheduled as they are of higher priority.

BRIEF DESCRIPTION OF THE DRAWINGS

The above and other advantages of the invention will become more apparent from the following description taken in conjunction with the accompanying drawings wherein like references refer to like parts and wherein.

DETAILED DESCRIPTION

Figure 11:
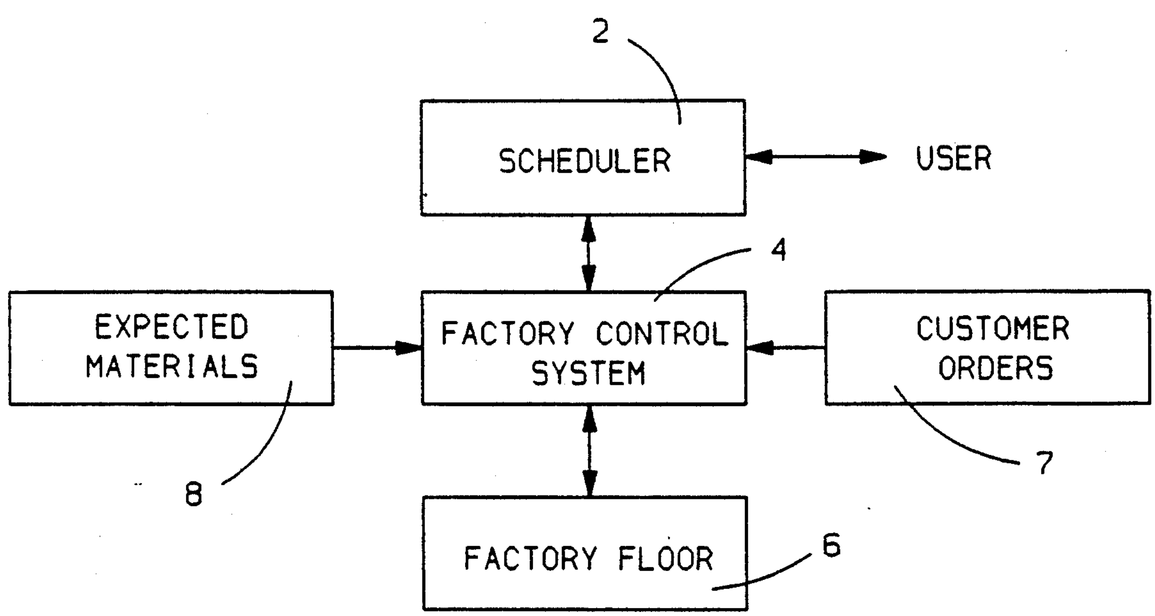
FIG. 11 depicts information flow to and from the scheduler.

Referring now to the drawing and initially to FIG. 11 the scheduler of the present invention is generally designated 2 and is particularly useful in a highly automated facility involved in automotive component production. The factory floor is controlled through a host computer designated the Factory Control System (FCS) 4. The FCS 4 receives factory floor status information from the factory floor as depicted at 6. In addition, the FCS contains current data on customer orders and on all expected material receipts as depicted at 7 and 8. All this information is sent through a computer network to the scheduler 2 whenever the situation warrants generation of a new schedule. A new schedule is generated and sent back to the FCS 4 for execution on the plant floor. The FCS 4 sends appropriate commands to the plant floor cell controllers for implementing the schedule.

Figure 12:
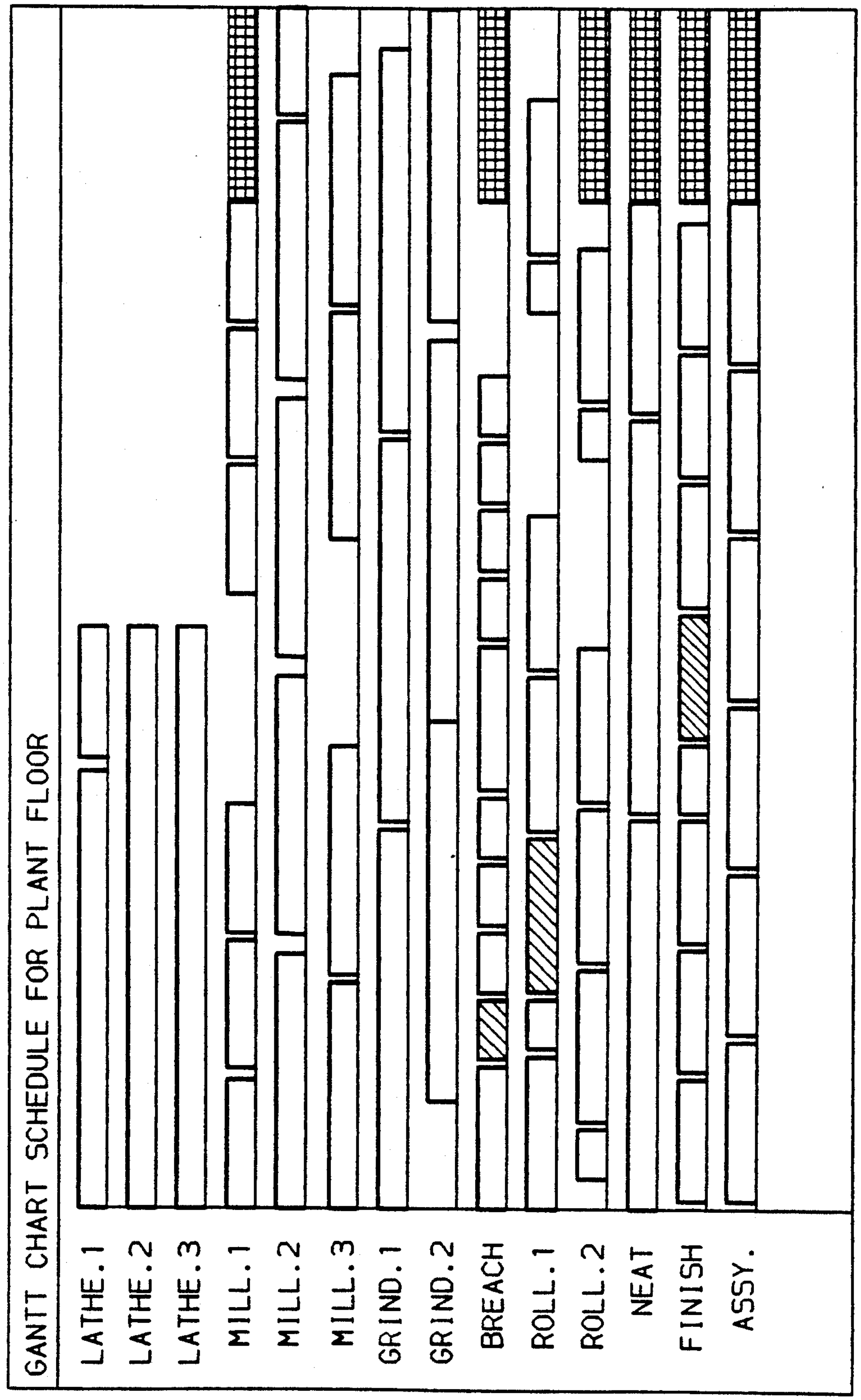
FIG. 12 shows a schedule in the form of a Gantt chart.

The schedule is presented to the user in the form of a Gantt chart as shown in FIG. 12. The chart shows the schedule for an 8-hour period for a small department on a factory floor. The user can scroll the Gantt chart up and down if there are more than 24 machines, and right and left to look across the scheduling horizon. Successive operations of one particular batch of parts can be highlighted to follow its flow across the machines. In the chart the flow of a batch of parts is highlighted. The user can have the system generate the schedule step by step and follow its construction, or run all the steps together. The Gantt chart interface gives the user an understanding as to how the schedule is built and the overall performance. It also gives the user a quick means of evaluating the quality of the schedule.

Figure 1A:
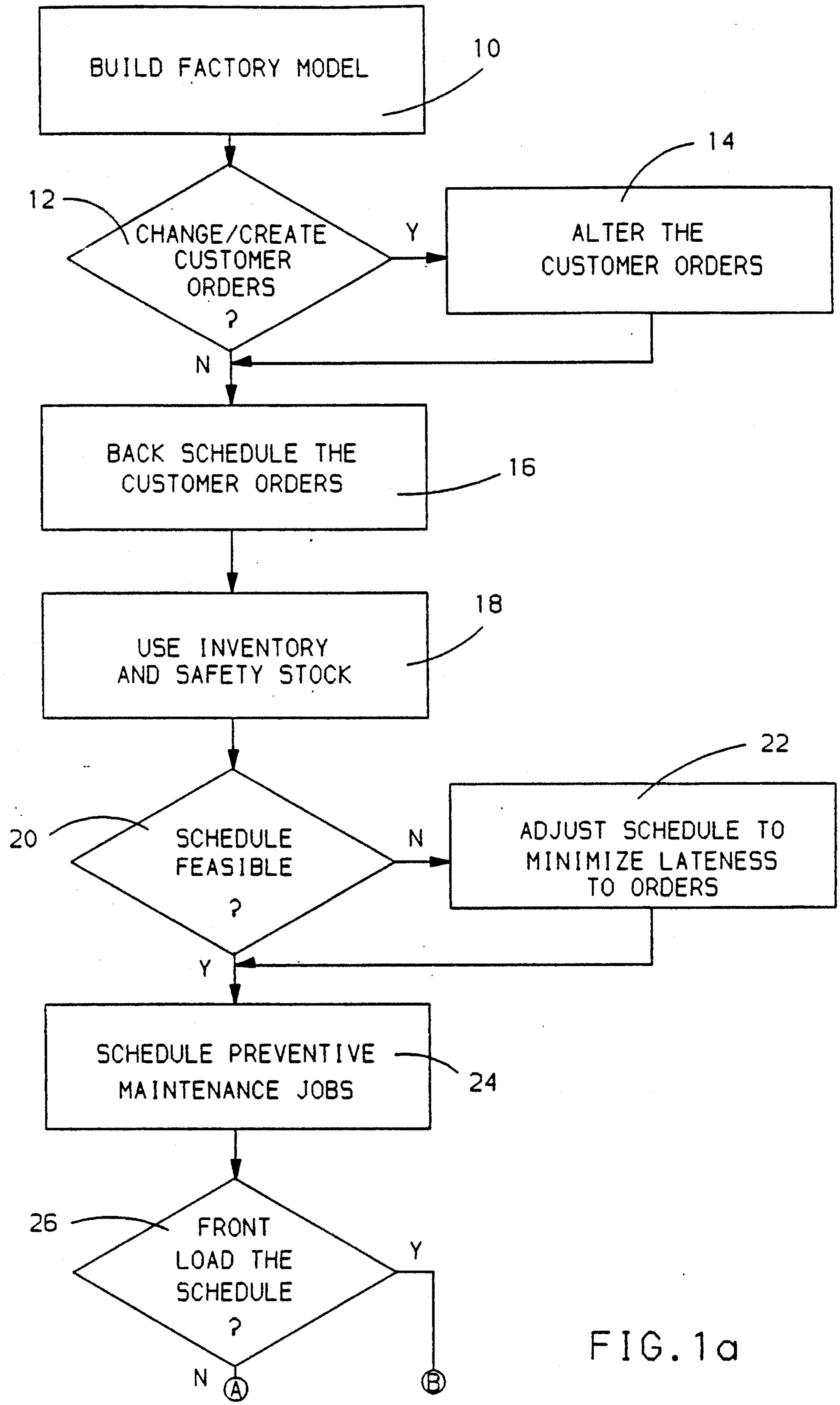
FIG. 1*a* and 1*b* show an overall flow chart of the factory scheduling method of the present invention.
Figure 1B:
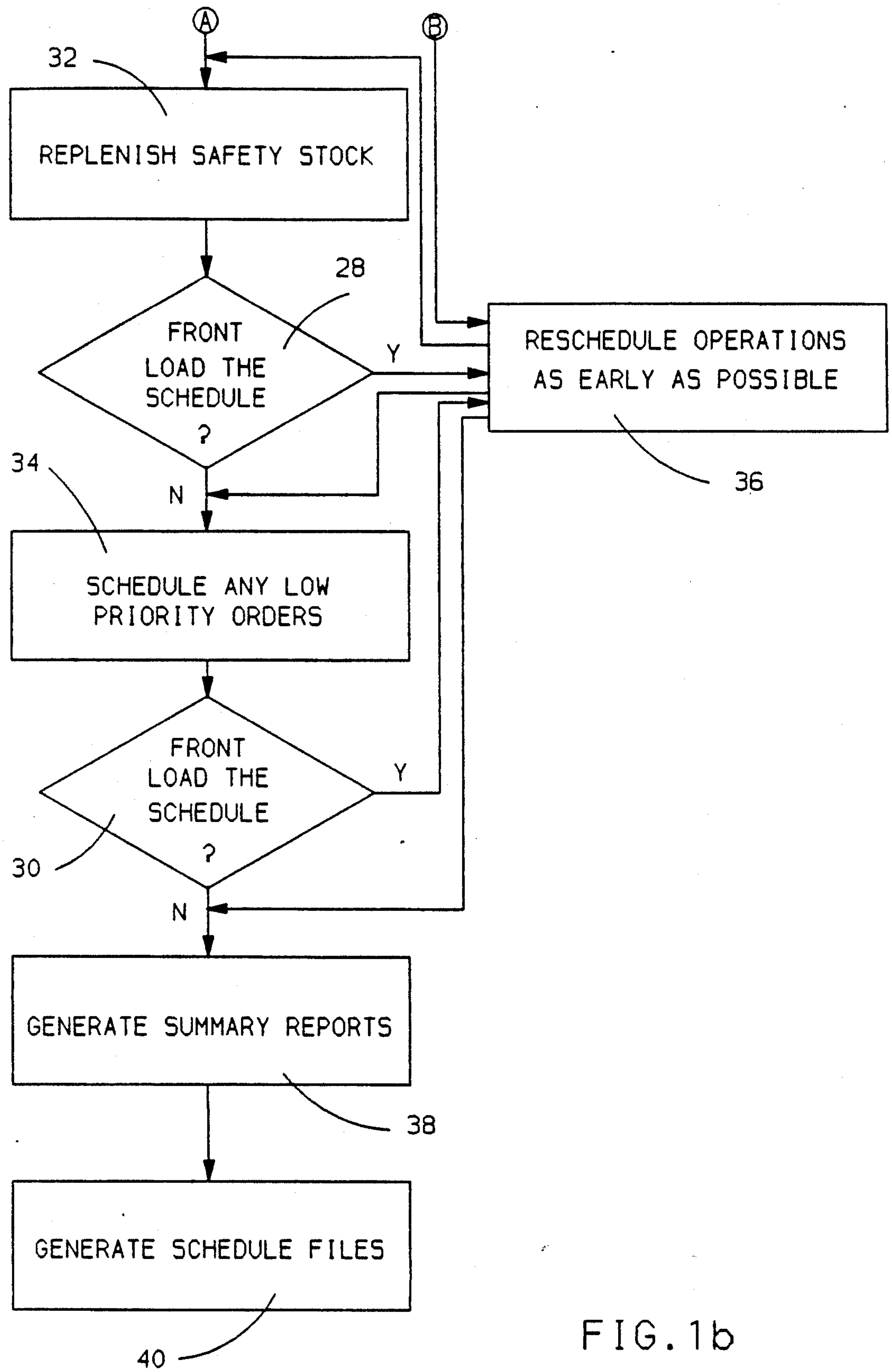

Referring now to FIGS. 1*a* and 1*b*, an overall flowchart of the invention is shown. The initial step indicated at step 10 is to build a model of the factory from plant data files. Once the model is constructed the user is given the option of changing the existing orders or creating new orders as indicated at step 12. If changes are made the customer orders to be scheduled are updated as indicated at step 14. Thereafter backscheduling of the customer orders begins as indicated at step 16 and attempts to generate a just-in-time (JIT) production schedule at each operation in the production process. Next, as indicated at step 18, available inventory is used to improve the early part of the schedule. This permits later operations to be scheduled earlier and thereby free up machine capacity. After present inventory is considered, safety stock may be used as necessary to minimize any lateness relative to order due date(s). If as indicated at step 20, if the schedule generated is feasible, then preventive maintenance jobs are scheduled as indicated at step 24. By feasible we mean a) all orders are completed on time, b) all operations start after any current activities on each machine are completed. If the schedule as generated is not feasible, then the schedule is adjusted to take up any existing slack and thereby minimize the lateness of the orders as indicated in step 22, and preventive maintenance is then scheduled as indicated at step 24. The decision blocks at 26, 28 and 30 indicate an option that is offered to the user at different times to front load the schedule so events are scheduled earlier than a JIT schedule would dictate. In between these option offerings the safety stock is replenished as indicated at step 32 and low priority orders are scheduled as indicated at step 34. The low priority orders may for example be orders from other plants which could use any excess capacity that may exist on the machines. If the user exercises the option of front loading the schedule, the events are rescheduled as early as possible as indicated at step 36. Optional user reports may be generated as shown at step 38, which may for example be a machine utilization report indicating total production time, setup time and downtime for each machine in the factory. Various scheduling files covering the scheduling horizon are then generated as indicated at step 40. These files will include an activities file detailing a time ordered listing of what each machine is scheduled to do. The scheduling horizon is user defined and starts with build context time (BC in FIG. 13*a*) and ends with a user defined date and time such as for example two weeks after build context time. Build context time is the point in time when a snapshot of the factory was taken by the factory control system 4. Operations scheduled by the scheduler 2 may not begin before a user defined frozen time (FT1 in FIG. 13*a*) for each machine. Frozen time occurs after build context time and is a user defined time. Frozen time may be extended if a machine is currently processing a batch of parts on the factory floor and the process completion time extends beyond the user defined frozen time.

Figure 2:
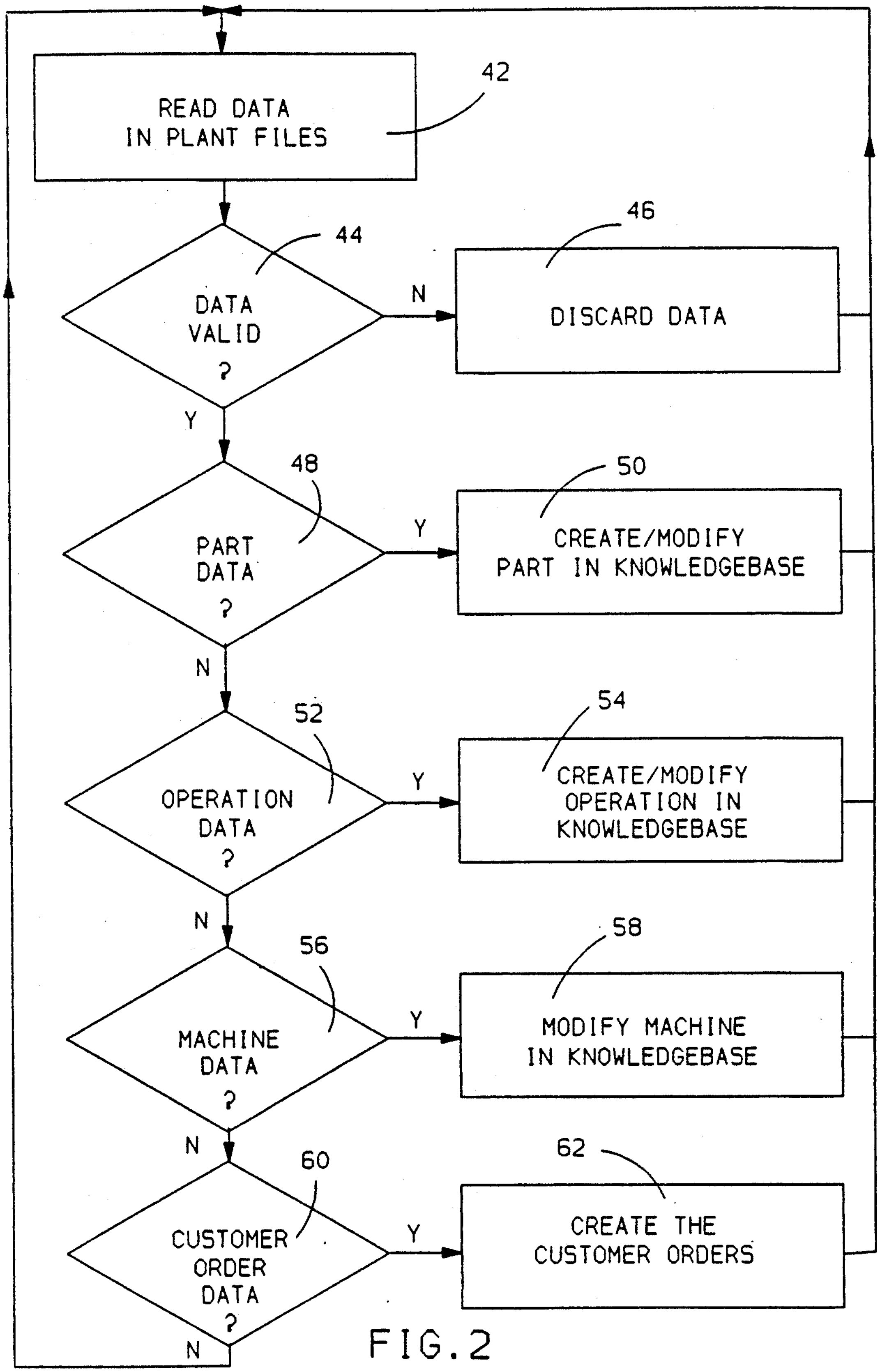
FIG. 2 is a flow chart depicting the creation of the factory model.
Figure 3A:
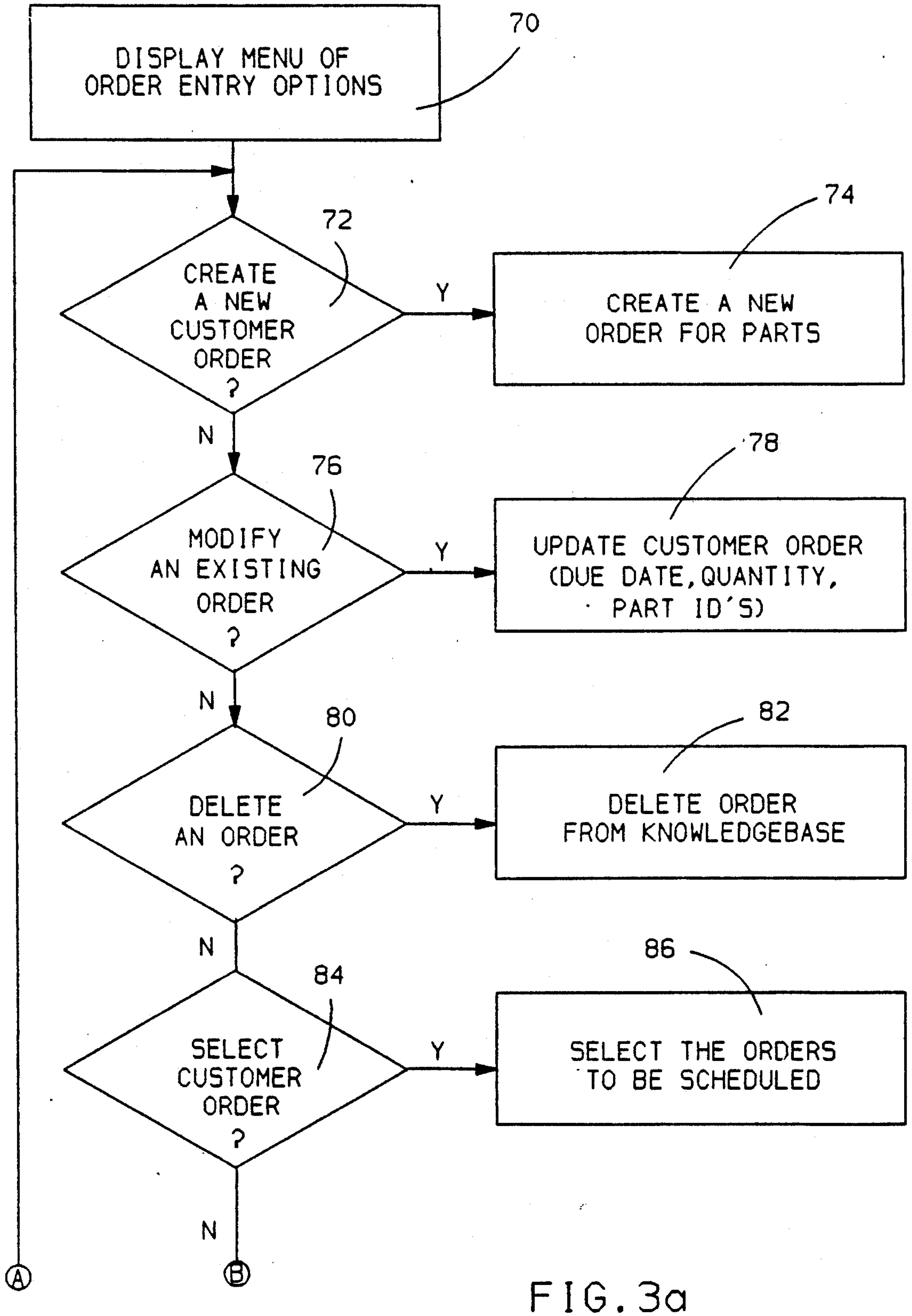
FIGS. 3*a*–3*b* is a flow chart depicting the step involved in changing customer orders.
Figure 3B:
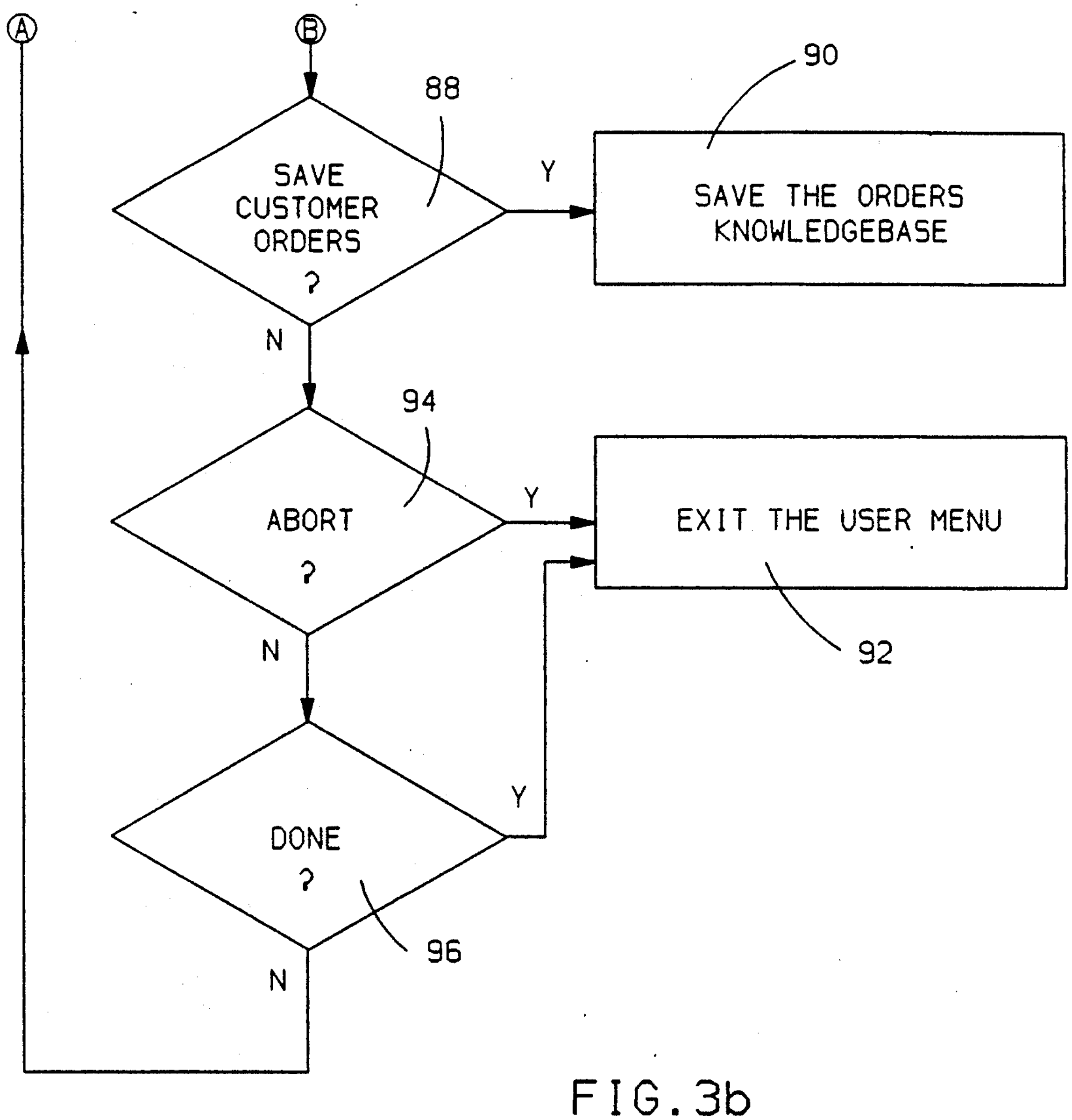

The initial step 10 of creating a model of the plant being scheduled is shown in greater detail in FIG. 2. As indicated at step 42, plant data including data relating to parts, operations and machines is read in from plant files. The data is examined for validity and discarded if invalid as shown at steps 44,46. As indicated at steps 48,50 52,54, and 56,58 the data relating to parts, operations and machines is used to build up the expert system knowledgebase of the factory. Part related information includes number of pieces in a batch or lot size and the routing (sequence of operations) to produce a part. Data may refer to a specific axle for example and include attributes such as batch size or routing. Operation data defines production time per part, setup or changeover time, lead time between operations, preferred machines for producing a part, and the inventory levels of each part (at each operation). The operation may, for example, be grinding and an attribute of the grinding operation would, for example, be cycle time or production time on a per piece basis. The machine data extracted from plant files includes machine status, availability, capacity and material handling times between machines. Customer order data is used to create a separate orders knowledgebase as indicated at steps 60,62. For example, an order may consist of 100 axles due on a specified date and time.

FIGS. *3a* and *3b* show the steps involved when a user wishes to change any data related to customer orders for parts. It is possible to make various changes to the customer orders if desired. As indicated in step 70, a menu is presented to the user with the options available. The various options are indicated at steps 72,76,80,84, and 88. If the user exercises an option, sub-menus are displayed to assist the user in carrying out the functions as indicated in steps 74,78,82,86, and 90. The user can then interact with the order entry system one or more times in the following manner. In steps 72 and 74 new customer orders can be created for any valid parts. Existing orders can be updated as shown in steps 76,78. This may involve modifying quantities ordered, updating due dates or adding new parts to an existing order. The user can delete orders as indicated in steps 80,82. In steps 84,86 the user may choose one or more of the existing orders to be scheduled. In steps 88,90 the user may save the new or modified orders knowledgebase. The user may exit the menu at step 92 by selecting the ABORT or DONE options as indicated in steps 94, 96.

The schedule is generated through a technique called backward scheduling. FIGS. *4a–4c* show the steps executed. In step 100 the customer orders are sorted by due date with those due latest to be scheduled first. In step 102 a check is made to determine if all orders have been scheduled. If so, then the backscheduling process is complete as indicated at step 103. Otherwise, a check is made to determine if all batches of parts associated with the order currently being scheduled are completed. As indicated at step 104, if all batches of parts have been scheduled then control returns to step 102 to check whether there are further orders to be scheduled. Otherwise, step 106 identifies the next batch to be scheduled for the current order. As indicated in step 108, if all operations in the routing for the batch of parts are scheduled then the process continues at step 102 with the next order to schedule, if any. If all operations haven't been scheduled, step 110 selects the next operation of the part to be scheduled, which is the immediately preceding operation in the routing of the part. That is, the operations are scheduled in the reverse order of the sequence in which they are executed. Step 112 identifies which machines are capable of performing this operation. In step 114 the next machine in the list generated in step 112 is chosen for consideration. In step 116, the window of time during which it is desirable to schedule the operation, as well as the desired end time for the operation are determined. The desired end time is the date when the order is due if the final operation is being scheduled, or the start time of the succeeding operation minus any required material handling move time and/or any required lead time for the operation. The window of time to be examined is the product of process time of the operation and a user defined window span integer, i.e. the window time is a multiple of operation process time. For example, process time for a grind operation might be one hour and window span might be the integer 2, thus producing a window of time of two hours. Thus the window of time would begin two hours prior to the desired end time for the operation being scheduled.

Next, step 118 identifies the idle time periods that exist within the current window of time where the operation could potentially be scheduled. At step 120 a check is made to determine whether any idle time exists between successive events involving the chosen machine. If none exist then step 122 checks whether any other machines can be considered for scheduling this event. If other machines are available then control passes back to step 114 and the next machine to be considered is selected. However, if there are no other machines to be considered then step 124 checks whether any solution exists at this time. If not, then the time window to be considered in scheduling this operation is expanded in step 126 and control resumes at step 114 which chooses a valid machine to consider. However, if a solution did exist then the solution is implemented at step 128 and the process returns to step 108.

Now, if at step 120, idle time exists then the idle time periods in the window of time being examined on the current machine are considered as viable places to schedule the operation. Checks are made in steps 130 and 132 to see if the operation and any associated setups or changeovers will fit into the available idle time. If they won't fit entirely, or partially i.e. meeting a predetermined required percentage of fit such as for example 60% fit, then in step 134 the alternative is discarded from further consideration. Otherwise, step 136 collects the relevant solution data, such as setups required, scheduled completion time for operation, total production time, and stores this data. This proposed solution is then compared with the current best solution, if one exists at this point in time, for the operation being scheduled. More specifically, step 138 checks to determine whether the assigned machine of the current solution is a primary or backup machine. A primary machine is one the user designates as preferable for a given operation. Backup machines are other machines capable of performing the operation. If the assigned machine of the current solution is a primary machine, or is a backup machine and the best solution's machine is also a backup machine as determined in step 140, then the process continues to consider the current solution. Otherwise, this solution is discarded from further consideration as indicated at step 142 and control returns to step 120. At step 144 a check is made to determine whether the current solution is within a user defined range of for example 15% of the desired end time for the operation. If so, the process continues at 146. If not, then step 148 checks the best solution relative to this same criteria. If the best solution to date isn't within the range then the current solution continues to be considered at step 146. Otherwise, the current solution is discarded at step 150 and the process continues at step 120. At step 146, a check compares the number of setups required for the solution being examined. If the number of setups for the current solution exceeds that of the best solution to date then step 152 discards the current solution and control returns to step 120. If the required number of setups is less than the number associated with the best solution then the system discards the best solution in step 154 and updates the current solution to be the best solution in step 156. The process now continues at step 120. This iterative process continues until all operations for all parts in all orders have been scheduled. At that point the backscheduling process is complete.

FIGS. 5a–5e show the steps associated with using available inventory and safety stock to improve the schedule. Initially, in step 170 a check is made to determine if there are any events expected to occur in the factory before the newly generated schedule can be implemented on the plant floor. If not, then step 172 initiates the process of utilizing inventory in the newly generated schedule. Otherwise, step 174 identifies scheduled operations from the existing plant floor schedule to verify that inventory exists to execute the operation First, in step 176 a check is made to determine whether the part operation is a leadoff operation. A leadoff operation is the first or initial operation performed on a part. If it is a leadoff operation then it can be ignored since there would be no productive part inventory required. If the operation is not a leadoff operation then a check is made at step 178 to see if there is available inventory to feed into the scheduled operation. If so, then inventory is used and decremented in step 180. If not, then the operation in question is deleted from the schedule at step 182. This iterative process continues until all of the operations from the previous or old schedule have been checked. Now the system can use the remaining inventory to further improve the operations for the newly generated schedule. As indicated in step 172, the various operations of all the parts are ranked from highest to lowest. That is, any leadoff operations are ranked low and final operations, like assembly, are ranked high. At step 184 a check is done to determine whether any of these operations have not yet been considered. If some operations remain then the next highest ranked operation is selected in step 186. At step 188 a check is made to determine if any inventory exists for that operation. If inventory does exist, then the next earliest scheduled operation that could use that inventory is identified at step 190. Steps 192 and 194 use and decrement the inventory appropriately. The process returns to step 188 to check whether any inventory still exists for this operation. This process continues until no more inventory exists for the operation and the process returns to step 184 where the next operation in the ranked table is considered. When this list is exhausted the system attempts to further improve the schedule by using any safety stock that exists. Steps 196, 198 and 200 are identical to steps 172, 184 and 186 executed during the inventory usage process. Further, steps 202 and 206 duplicate the functionality of steps 188 and 192, 194. The only difference in using safety stock is that it is only to be used to avoid or minimize any lateness of the customer orders That is, unlike inventory which is used until it is all gone, safety stock is used more cautiously. This is represented at step 204 which prevents usage of safety stock unless operations are projected to be late.

Figure 6A:
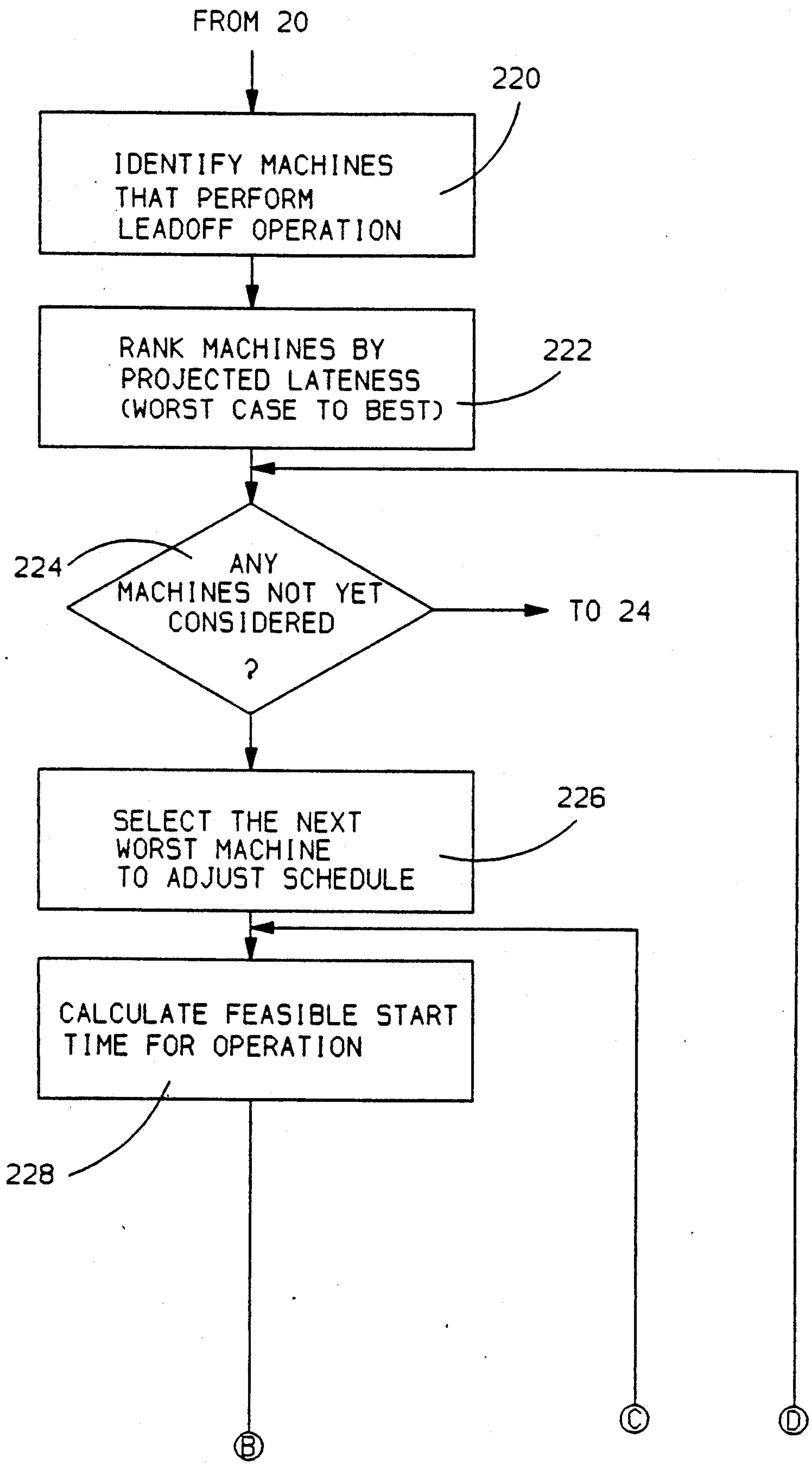
FIGS. 6*a* and 6*b* are a more detailed flow chart of the steps performed in adjusting a schedule which is not feasible as initially generated.
Figure 6B:
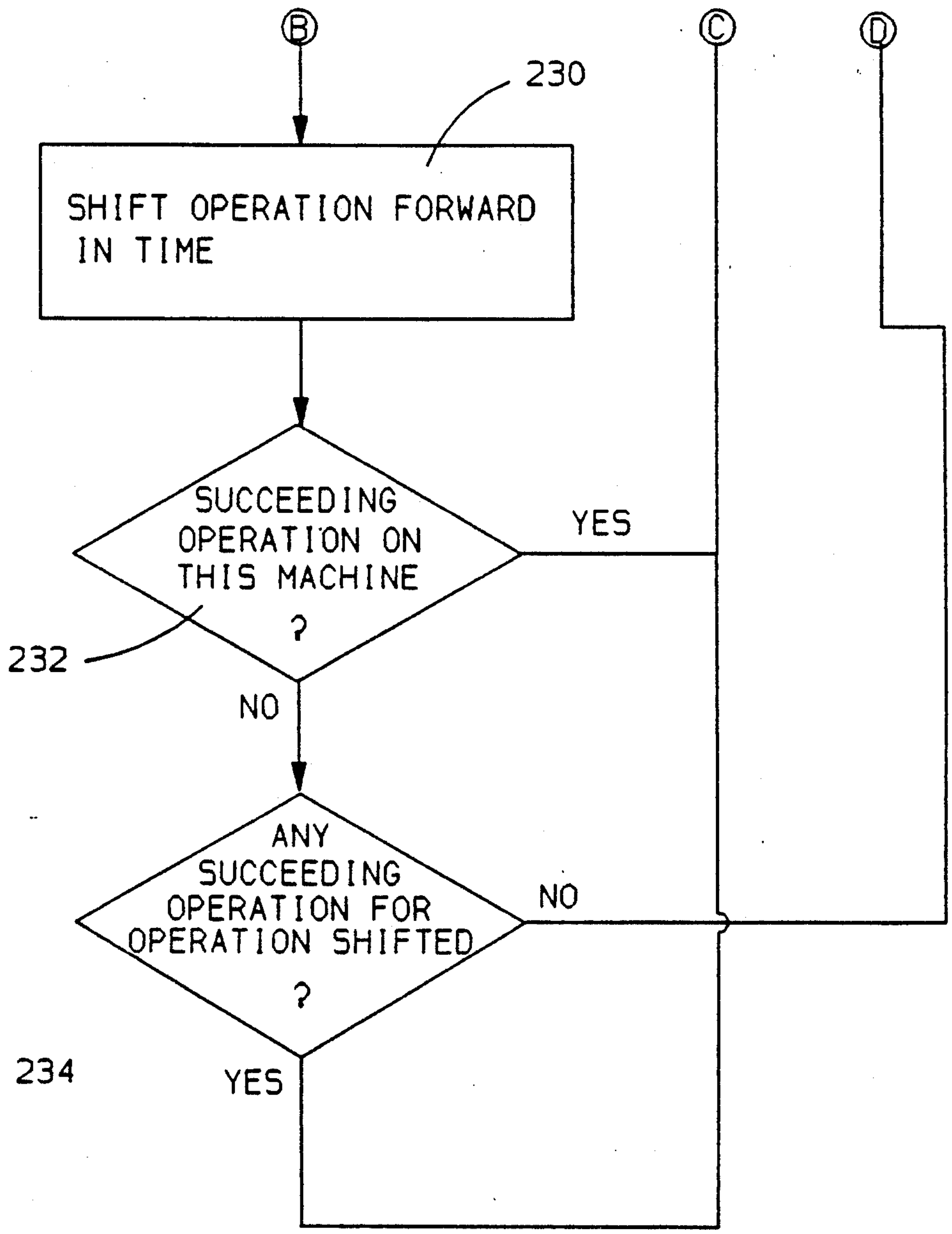

Referring to FIGS. 6a and 6b, a more detailed representation of the steps performed in block 22 of FIG. 1a is shown. Step 220 identifies which machines in the plant are capable of performing leadoff or initial operations on parts. Then based on the generated schedule these machines are ranked in step 222 from worst to best with the worst being that machine which has operations backscheduled furthest in time. These machines are considered one at a time in steps 224 and 226. The earliest scheduled operation is considered and a determination is made in step 228 of the amount of time the operation must be shifted forward in order to make the operation feasible. At step 230 the operation is shifted forward in time by the calculated amount. Idle or slack time is used during the shifting process for the operation to minimize lateness. Each succeeding operation on that machine is similarly checked at step 232 as described above and shifted accordingly. This process continues until the schedule for this machine is feasible. Now that a machine's operations have been shifted and they are feasible, a check is made at step 234 to determine whether any of the shifted operations have succeeding operations on other machines. If they do, these successor operations must be similarly shifted to maintain a feasible schedule and the process then returns to step 224. The above process repeats itself until all operations on all machines are feasible When all leadoff machines have been considered this process is complete.

Figure 7A:
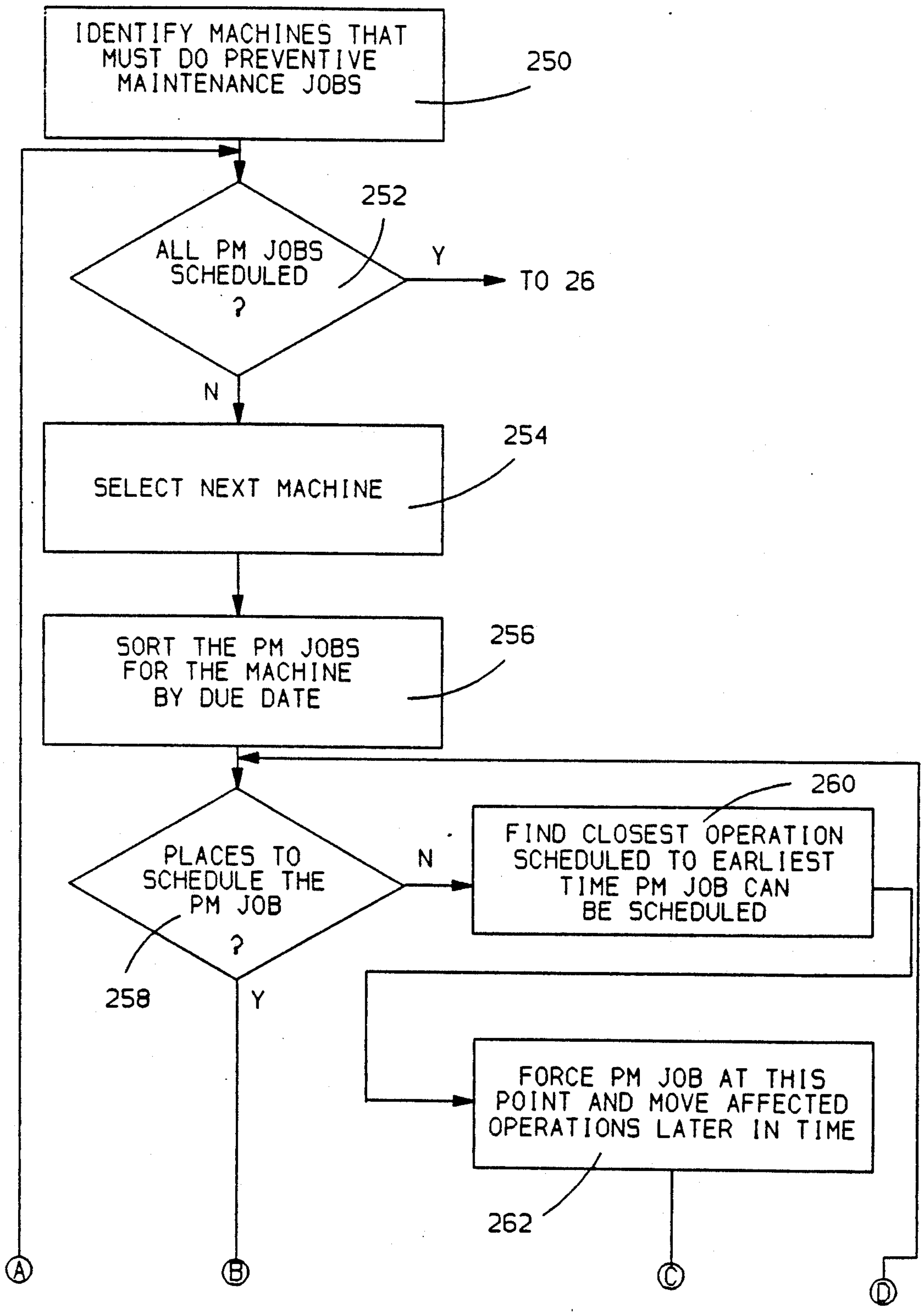
FIGS. 7*a* and 7*b* are a flow chart of steps involved in scheduling preventive maintenance.
Figure 7B:
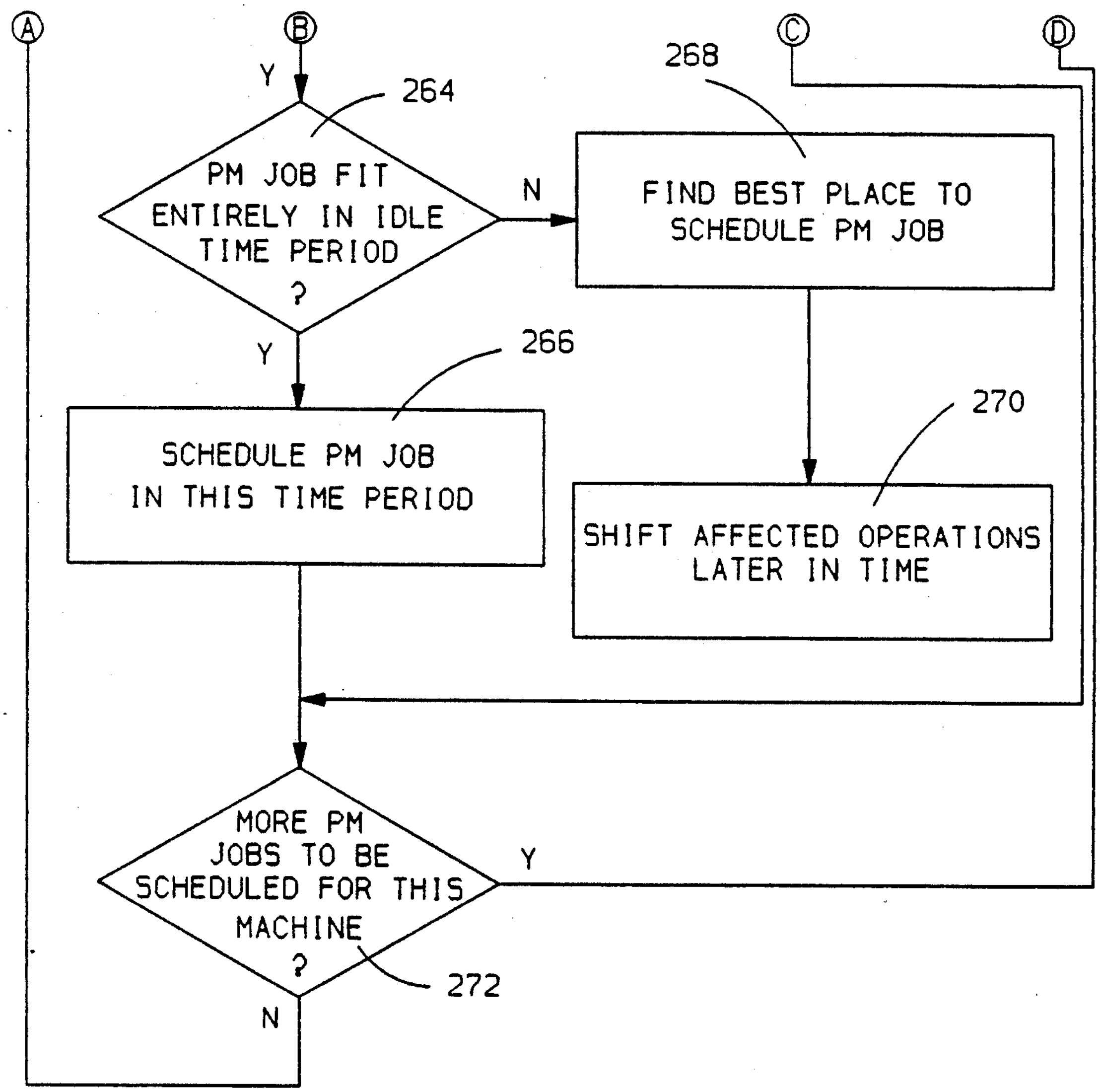

FIGS. 7a and 7b show the basic steps involved in scheduling of preventive maintenance (PM) jobs. These jobs are scheduled after the customer orders have been scheduled for two reasons. First, the most important constraint for the factory is that customer orders be done on time. Second, PM jobs often have windows of time during which they can be scheduled. That is, a 15 minute PM job may be scheduled anytime during the course of a day. Thus, there is more flexibility in scheduling these kinds of events. Initially, step 250 identifies which machines have PM jobs that need to be scheduled. Then a check is made at step 252 to determine if all PM jobs have been scheduled. If so, then this process is complete. Otherwise, in step 254 the system chooses the next machine to be processed. In step 256 all of that machine's PM jobs are sorted by their required due date. Now the PM jobs are scheduled one at a time. First, a check is made at step 258 to determine if there is any available time to schedule the PM job. If there are no idle time periods in the window of time during which the PM job must be scheduled then the PM job must be forced into the schedule. Step 260 identifies the earliest desired place in the schedule and forces the PM job into the schedule at this point. Any jobs it affects, or overlaps must be rescheduled later in time. This is done in step 262 by simply rescheduling the affected operations forward in time. On the other hand, if there were places to schedule the PM job then a second check is made at step 264 to determine if the PM job duration will fit entirely into the available idle time. If the event fits completely into the available idle time then it is scheduled as indicated in step 266. If it does not fit completely, then the event is scheduled in the earliest idle time interval as indicated in step 268. In step 270 all affected events are rescheduled later in time. A check is made at step 272 to see if there are other PM jobs yet to be scheduled for this machine. If so then control returns to step 258. If there are no more PM jobs for the machine then control returns to step 252. This process continues until all machines have all necessary PM jobs scheduled.

Figure 8:
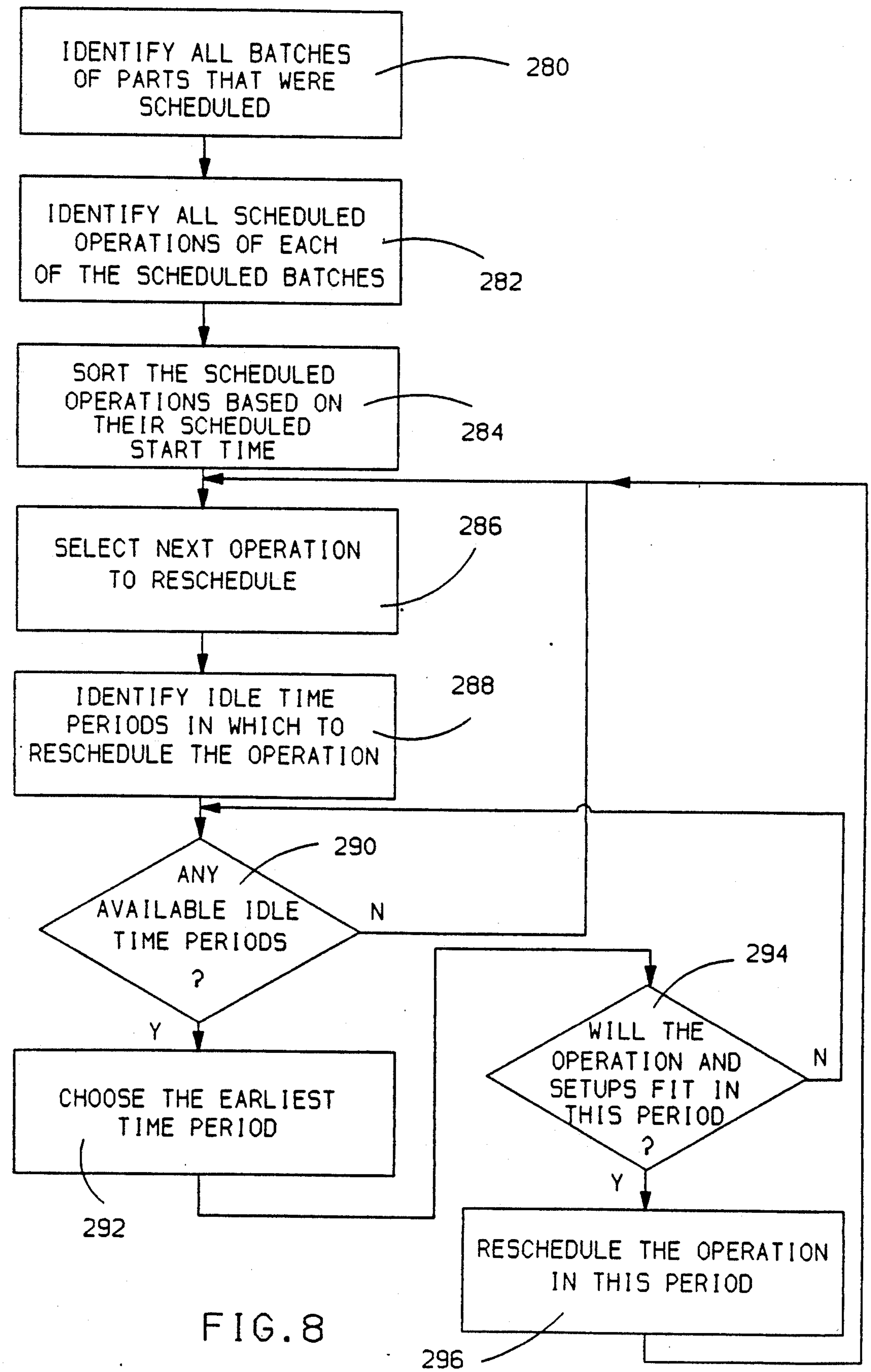
FIG. 8 is a flow chart of the steps involved in front loading the scheduled operations.

FIG. 8 depicts the procedure for front loading a schedule. As previously indicated in FIGS. 1a and 1b this procedure is optional and is highly dependent on the operating goals of the factory being scheduled. The intent is to front load or schedule events earlier in time than they are currently scheduled. Although this tends to deviate from the Just-In-Time scheduling philosophy there are two reasons this may be desirable. First, typical factories of the present do not tend to operate with the JIT goals and objectives. Thus, there is a tendency to begin scheduling processes as early as possible. A second reason has to do with the reliability of equipment in the plant. When machines are frequently erratic in their behavior and unexpected downtime occurs often, a JIT schedule will in fact become late if this unexpected downtime impacts any of the scheduled events. Thus, with newer equipment, the JIT philosophy is often not emphasized until the machines are relatively stable and reliable in their performance. Step 280 collects all of the batches of parts that have been backscheduled. Next all of the associated operations for each of the batches are identified at step 282. Step 284 sorts the operations based on the scheduled start times of each operation. Beginning at step 286 the process will then reschedule the earliest event. In step 286 the next earliest event that has not been rescheduled is selected. Step 288 identifies all available idle time periods, if any, that exist in the schedule and are earlier than where the operation is currently scheduled. A check is made at step 290 to determine whether any idle time periods remain If not, then control passes back to step 286 and the next earliest operation is selected. If idle time periods exist then the earliest one is chosen in step 292. The earliest time period is checked at step 294 to determine if the event will fit into this idle time period. As a part of the check, any required setups or changeovers are also considered. If the operation and setups will not fit, then the process returns to step 290. If the operation does fit, it is rescheduled in this idle time period in step 296 and control return to step 290. This process continues until all operations have tried to be rescheduled earlier in time.

Figure 4A:
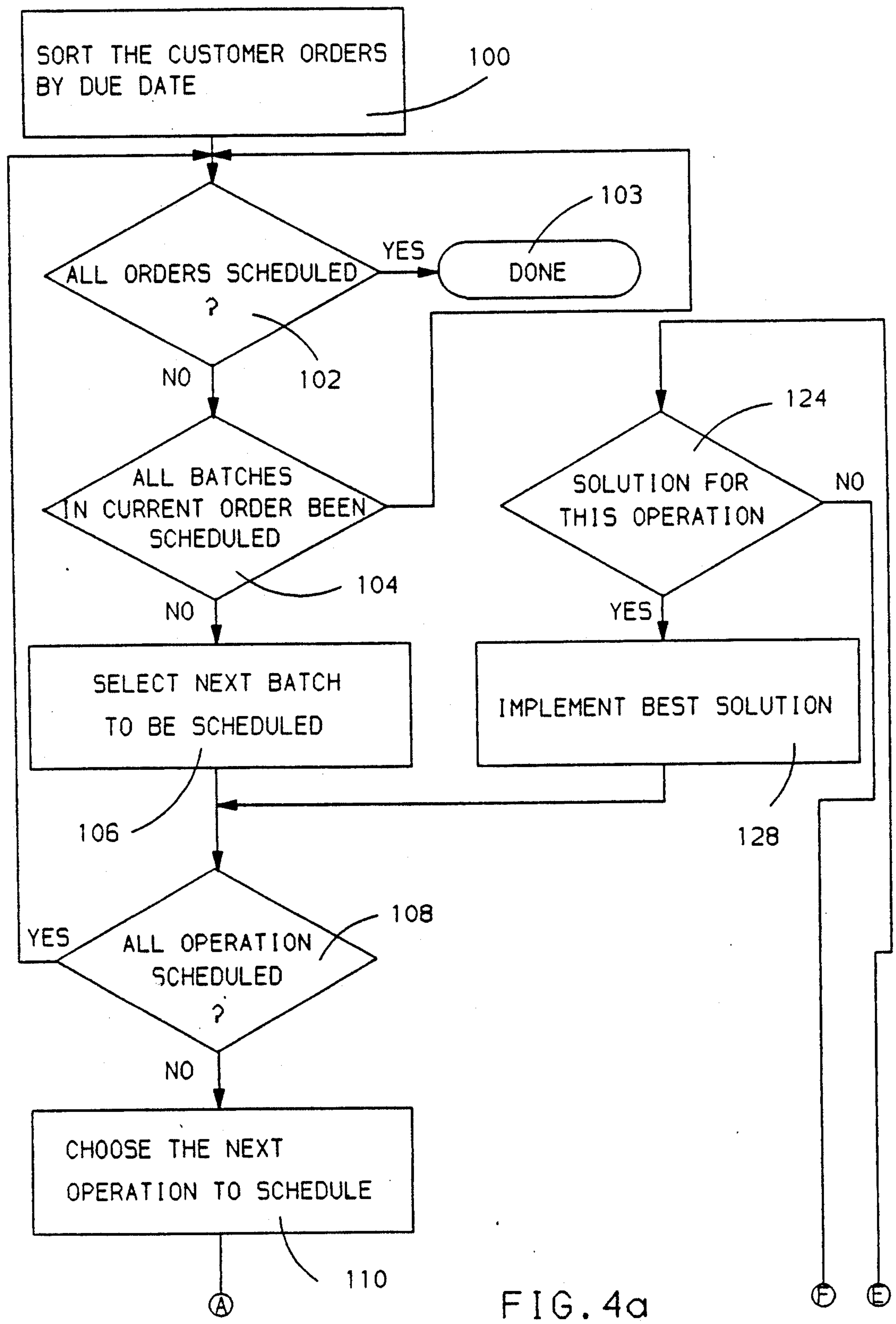
FIGS. 4*a*–4*c* show the backscheduling process.
Figure 4B:
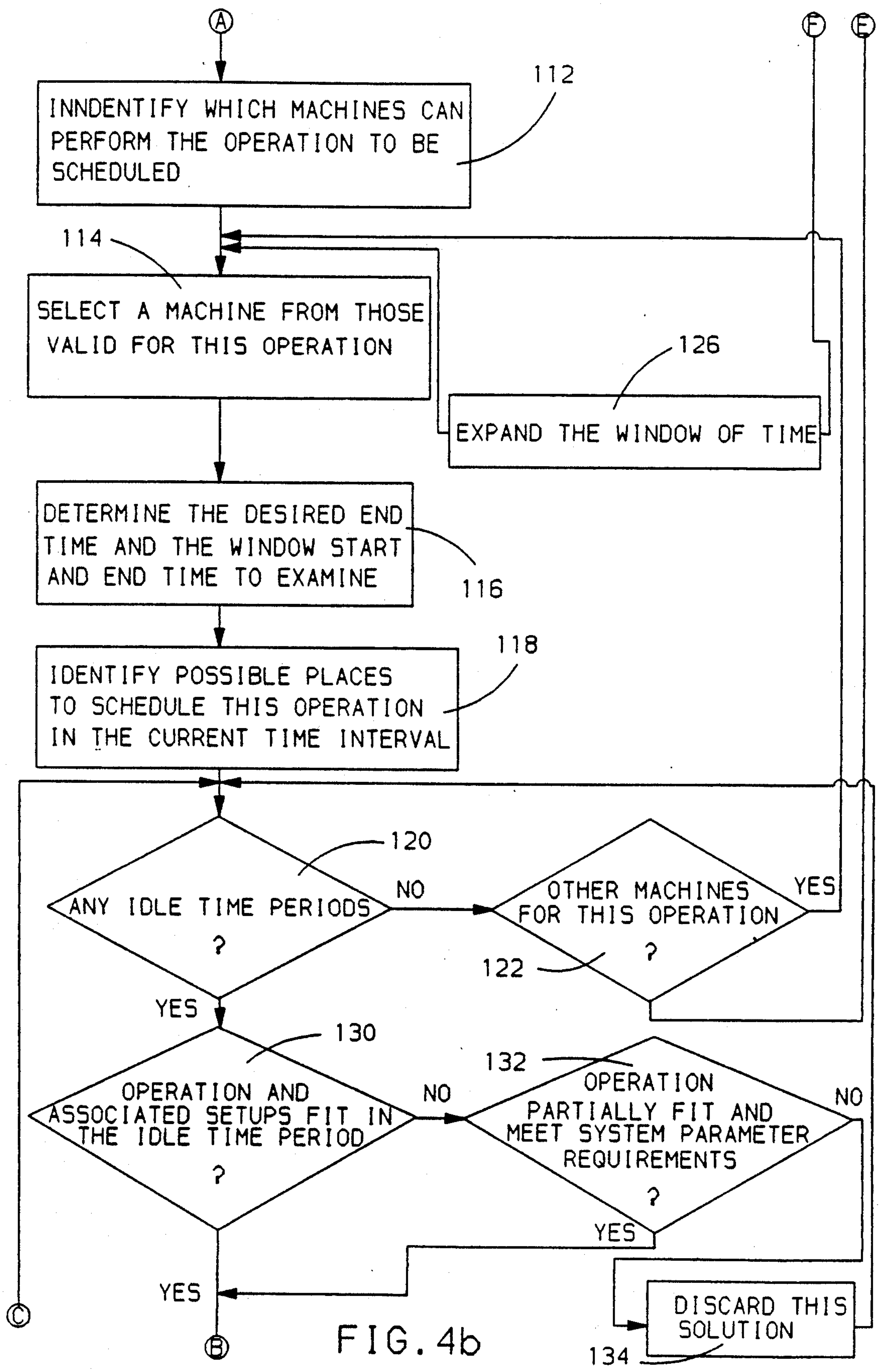
Figure 4C:
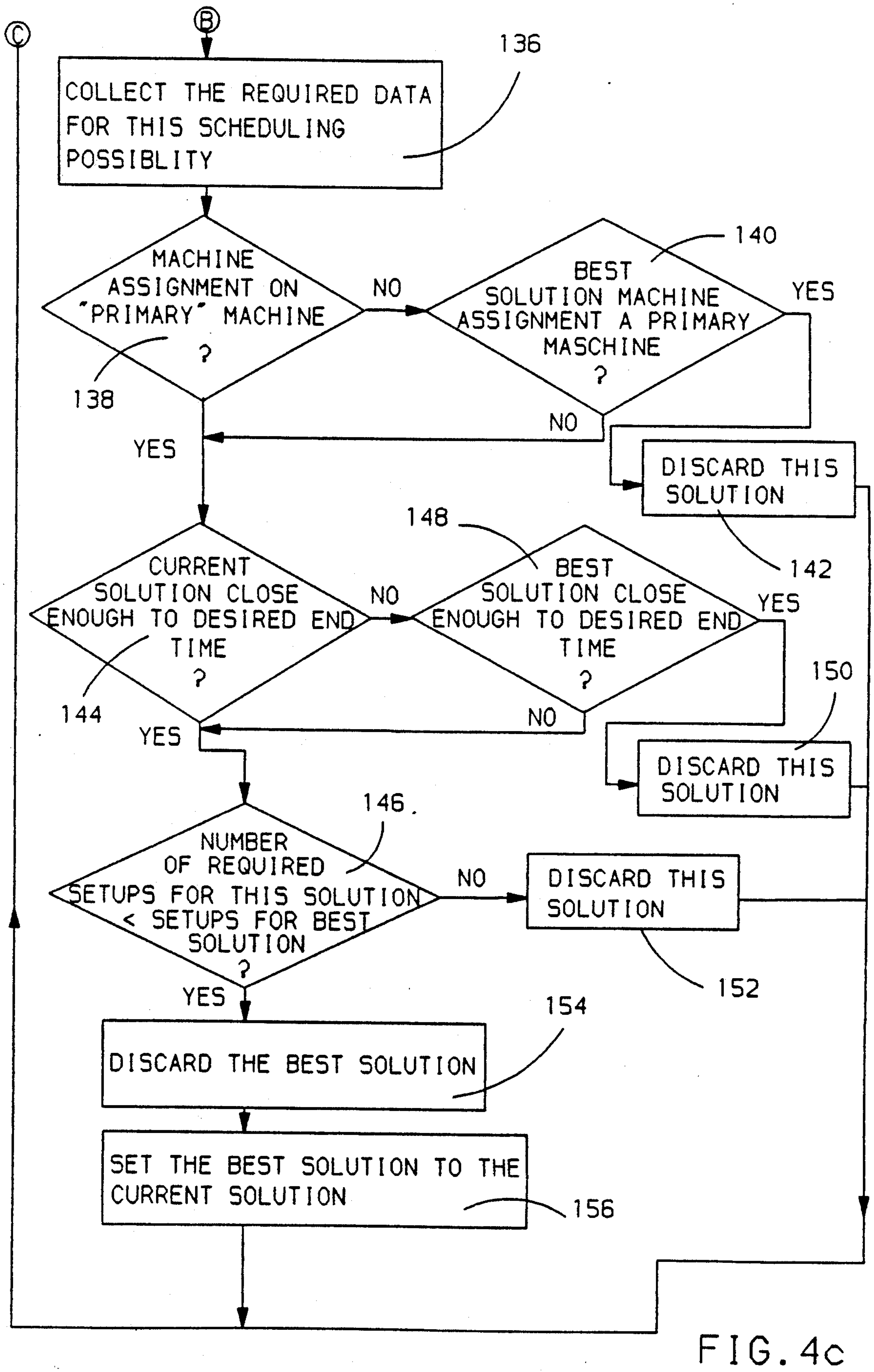
Figure 5A:
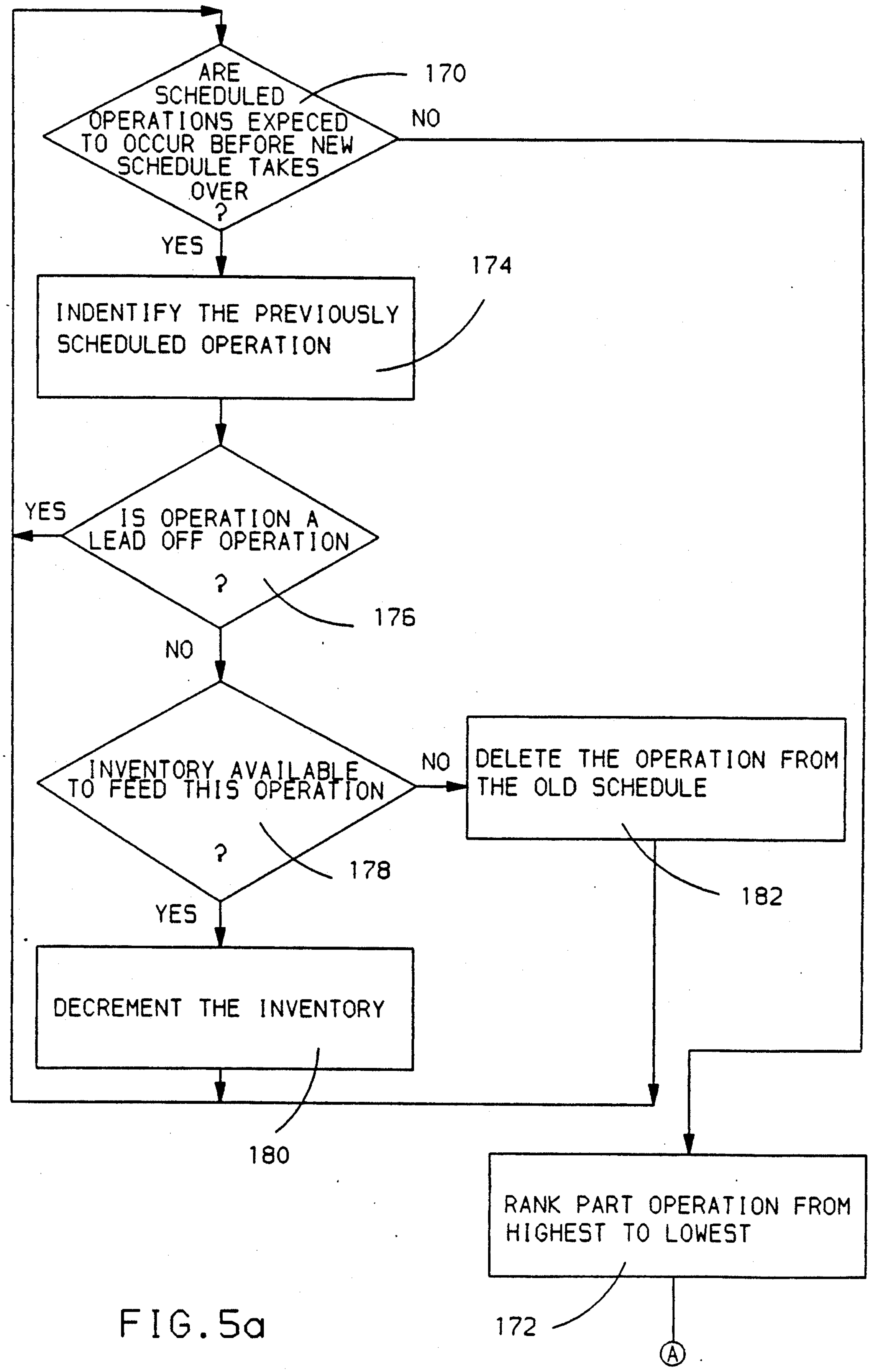
FIGS. 5*a*–5*c* show the steps involved in using inventory and safety stock.
Figure 5B:
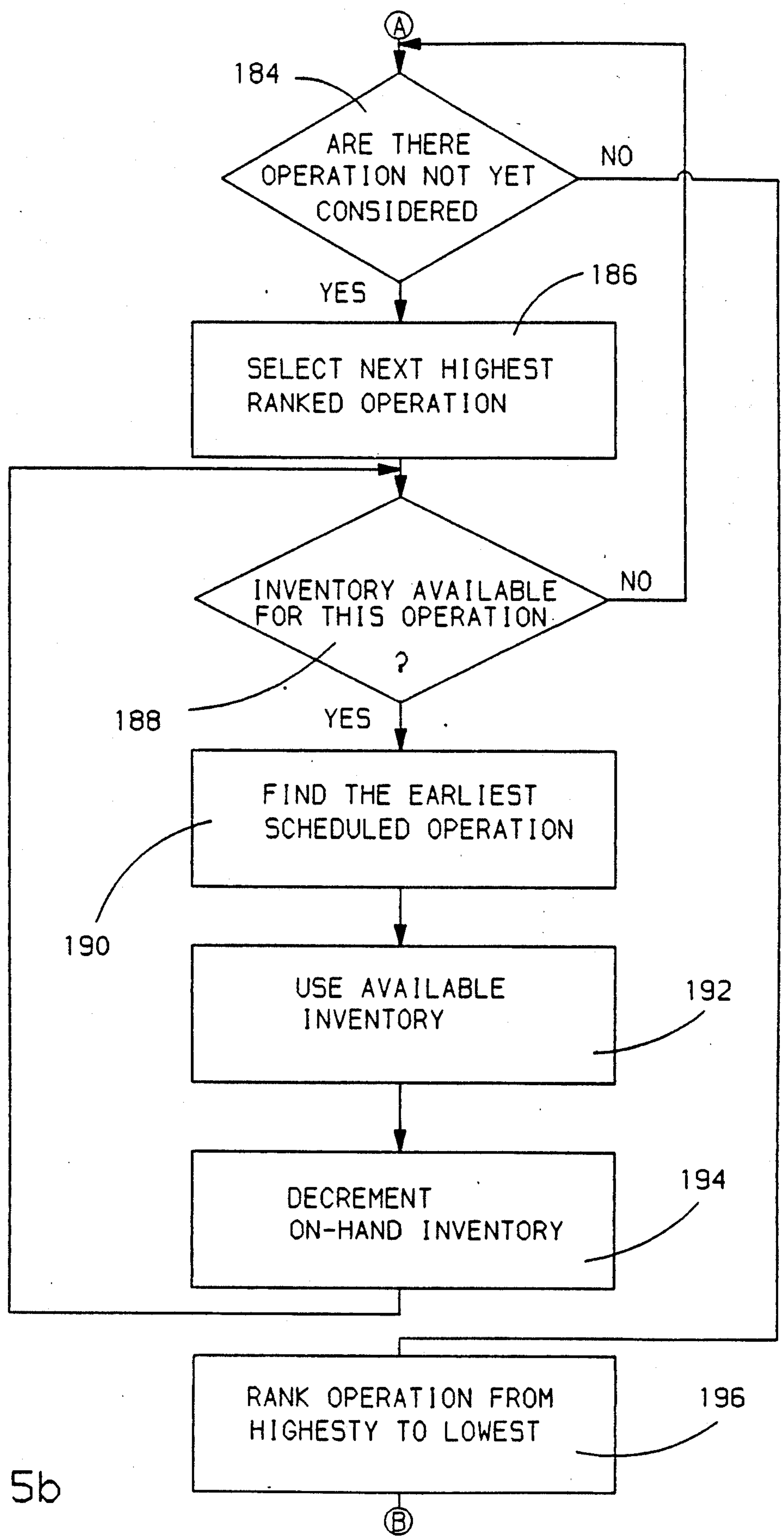
Figure 5C:
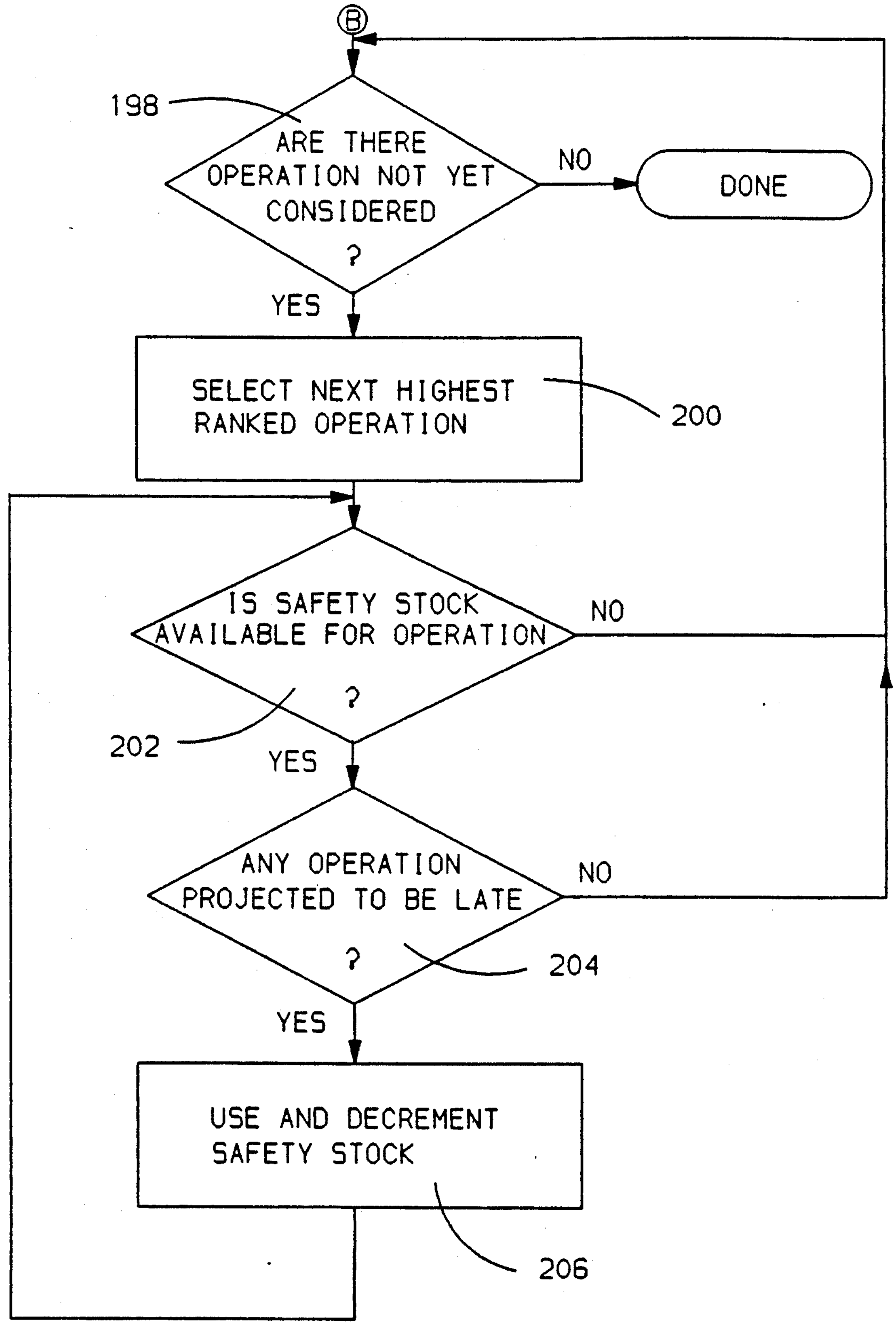
Figure 9:
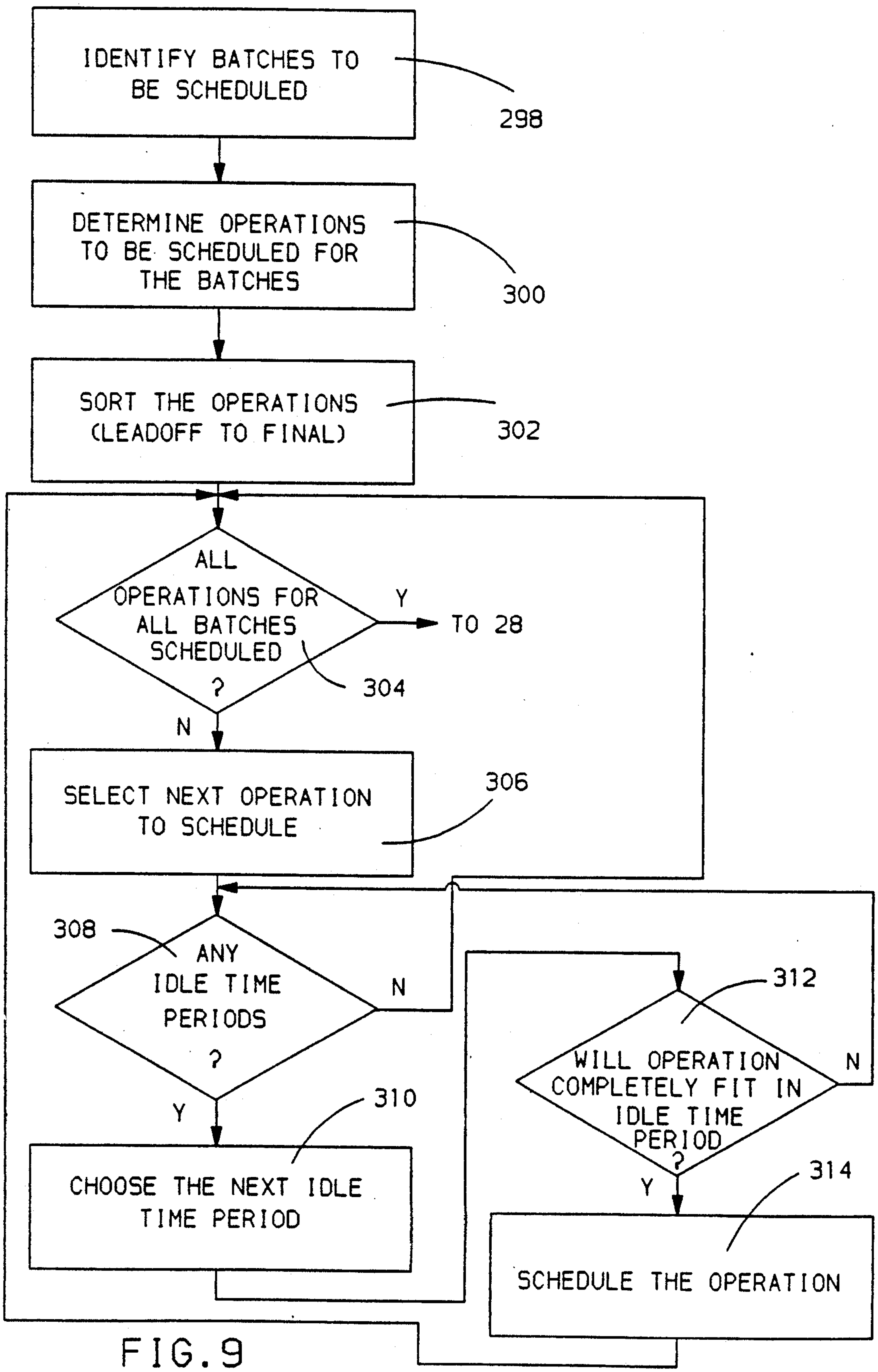
FIG. 9 is a flow chart of the forward scheduling process.

FIG. 9 represents the forward scheduling process. This process is applicable to both steps 32 and 34 of FIG. 1*b* but will be described with respect to step 32 for replacing safety stock. An attempt is made to schedule operations, given the existing constraints of already scheduled operations and machine unavailability. This procedure schedules operations in a forward manner (first operation, second, third, etc.) rather than in a backwards fashion as discussed relative to FIGS. 4*a*–4*c*. Step 298 identifies any batches of parts that need to be forward scheduled. The process will be used replenishing safety stock or scheduling lower priority component orders. Step 300 determines all operations for all of the batches identified in step 298. This is done by looking at the part routing to identity what operation must be performed to produce the part. The operations are sorted from highest to lowest at step 302. A check is made at step 304 to determine whether all operations, have been scheduled. If so then this pass is complete. If not then the next operation is selected to be scheduled in step 306. A check is make at step 308 to determine if any available idle time exists on any possible machine to schedule this event. If not then control returns to step 304. Otherwise, step 310 chooses the next idle time period for consideration. As indicated in steps 312 and 314, if the operation and any required setups will fit entirely within this idle time period then the event is scheduled and control returns to step 304. If not control returns to step 308.

Figure 10A:
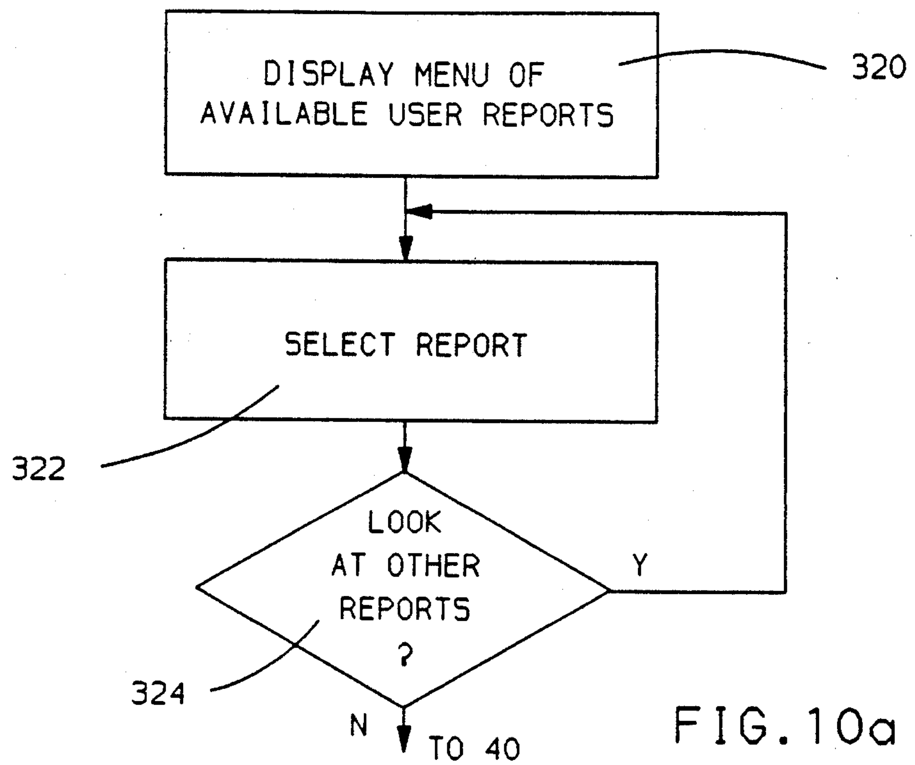
FIG. 10*a* and 10*b* show the generation of reports and the output of schedule files.
Figure 10B:
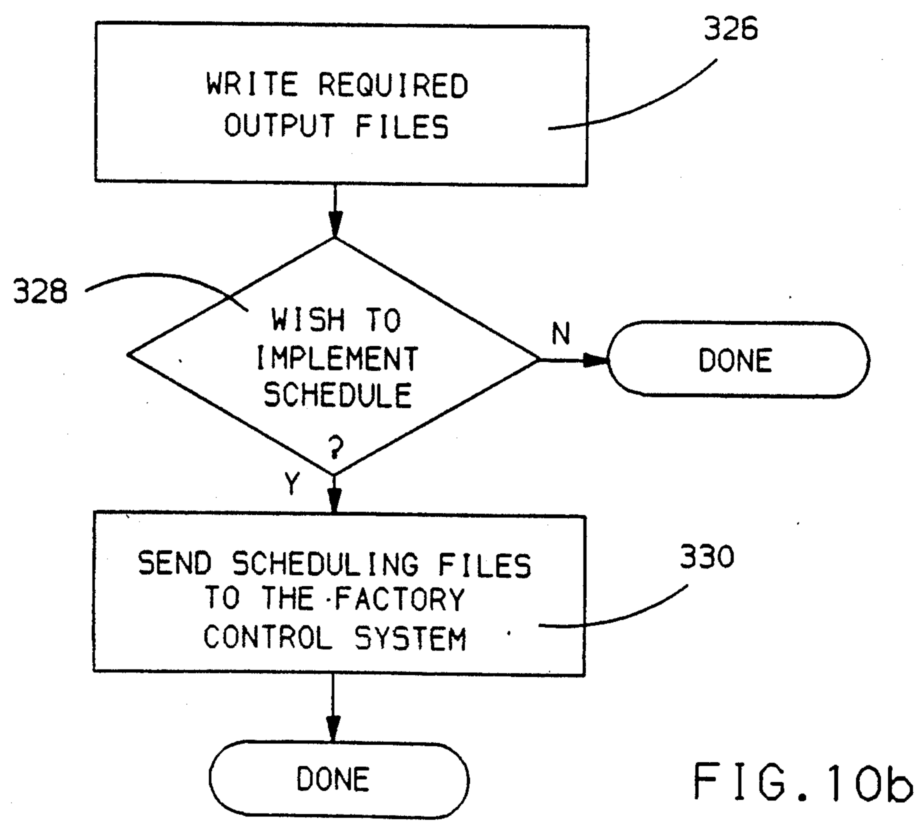

FIGS. 10*a* and 10*b* show step 38 and 40 of FIG. 1 in greater detail. Referring first to FIG. 10*a*, step 320 displays a menu of available reports to review and analyze. In step 322 the user selects an individual report. These reports include machine utilization, inventory usage, part makespan, lateness and safety stock reports. Step 324 checks to determine whether additional reports are desired and if so control returns to step 322.

Referring now to FIG. 10*b*, in step 326 the output files are written to disk. The user is asked if he wishes to implement the newly generated schedule at step 328. If so, as indicated in step 330, the files are sent to the Factory Control System (FCS) which carries out the schedule.

Figure 13A:
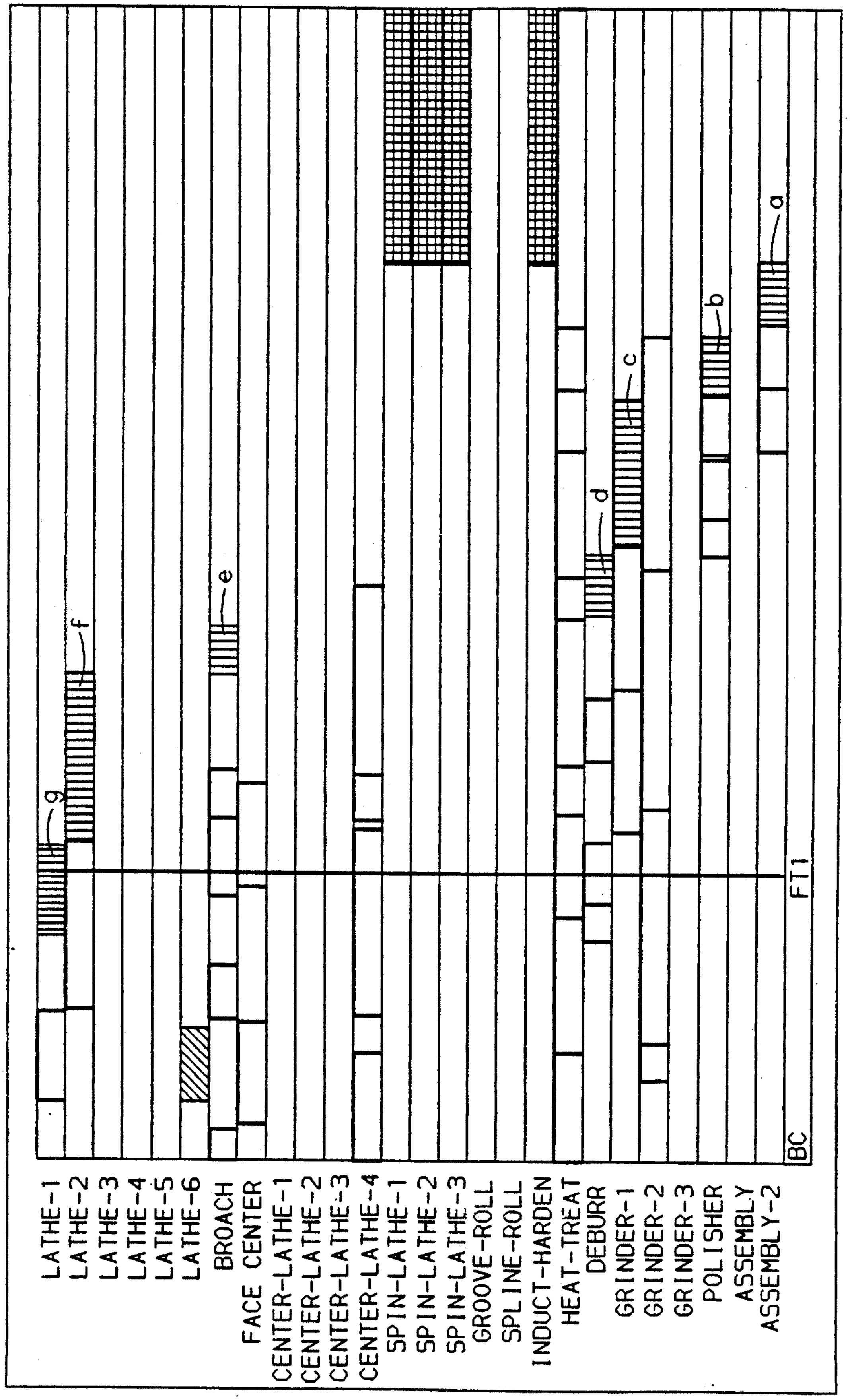
FIGS. 13*a*–13*f* are Gantt charts depicting six steps performed by the scheduler in generating a schedule.

Referring now to FIGS. 13*a*–13*f*, Gantt charts graphically depict the generation of a schedule. The scenario represented is a simple order for 150 front drive axles, to be processed in batches of 52 pieces each. In FIG. 13*a* the basic concept of backscheduling the events for a batch of parts is demonstrated. Note that seven vertical crosshatched boxes have been scheduled in the order numbered a–g. The assembly operation is first scheduled on machine ASSEMBLY2 at the due date for that batch of parts. Next, the polish operation is scheduled so that it ends just in time for assembly to start. This backwards scheduling continues on the boxes labelled c–g where g is the leadoff or first operation the part undergoes in the manufacturing process. At this point, one batch, or 52 parts have been scheduled through the factory. Next, another 52 pieces are scheduled in the same manner. These boxes are immediately to the left of the boxes a–g and are scheduled backwards from assembly in the same sequence as before. The size of each box is scaled to reflect the duration of the event. The other unshaded boxes represent batches of other component parts that make up the final assembled axle. The black boxes on the far right portion of the chart represent time that a machine is unavailable for production. This may be due to planned machine downtime or unexpected machine failures.

Figure 13B:
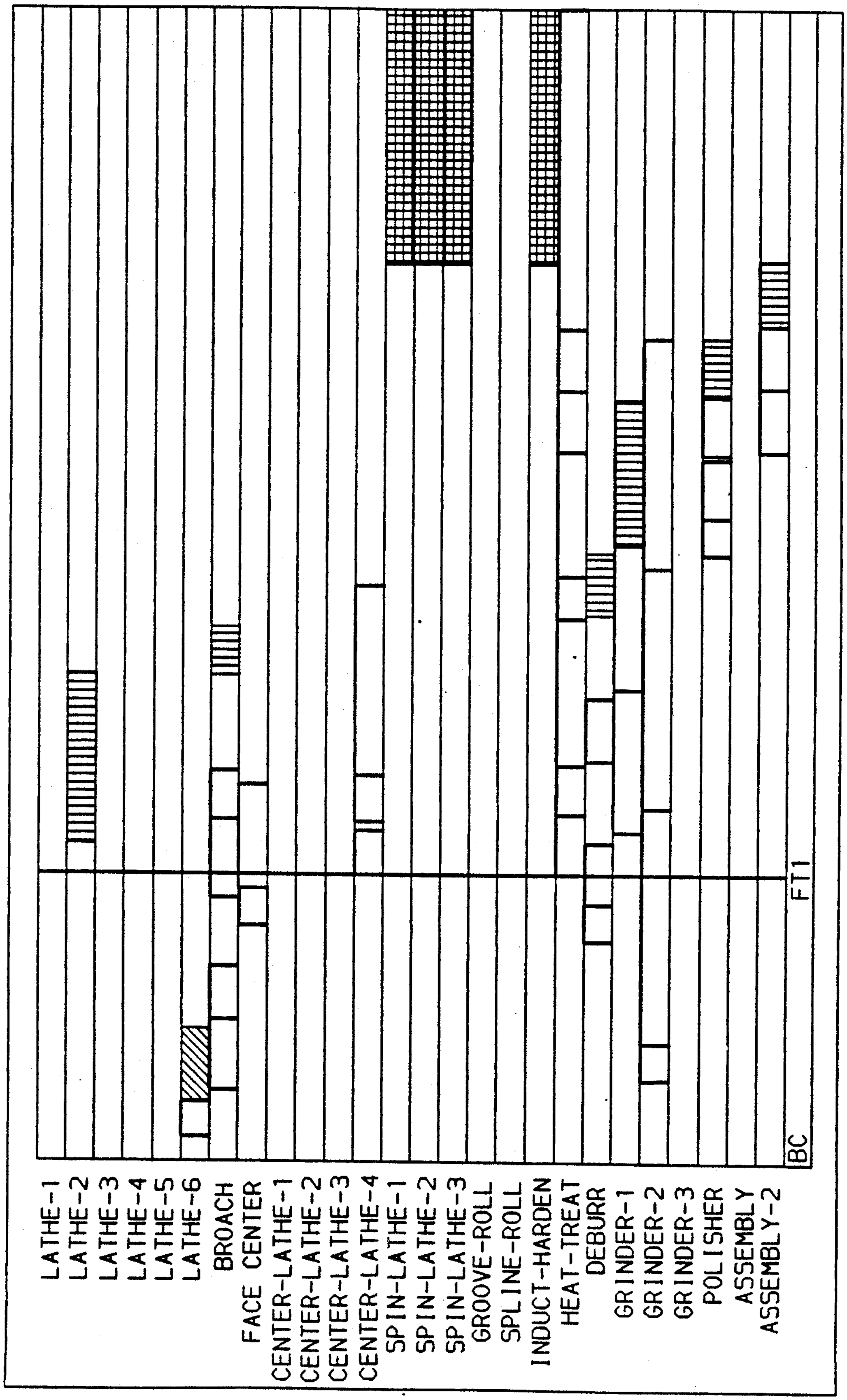

FIG. 13*b* demonstrates the impact of using available on-hand inventory to help improve the generated schedule. The system attempts to use trays, or batches, of inventory to improve the front end, or earliest portion of the schedule. This is demonstrated by the apparent disappearance of boxes from the chart. That is, if inventory is available then it is no longer necessary to schedule one or more batches of that part depending on how many batches of the part exist in inventory. In FIG. 13*b* some boxes that were formerly scheduled have been removed because of available inventory. A comparison to FIG. 13*a* will verify the prior existence of such events.

Figure 13C:
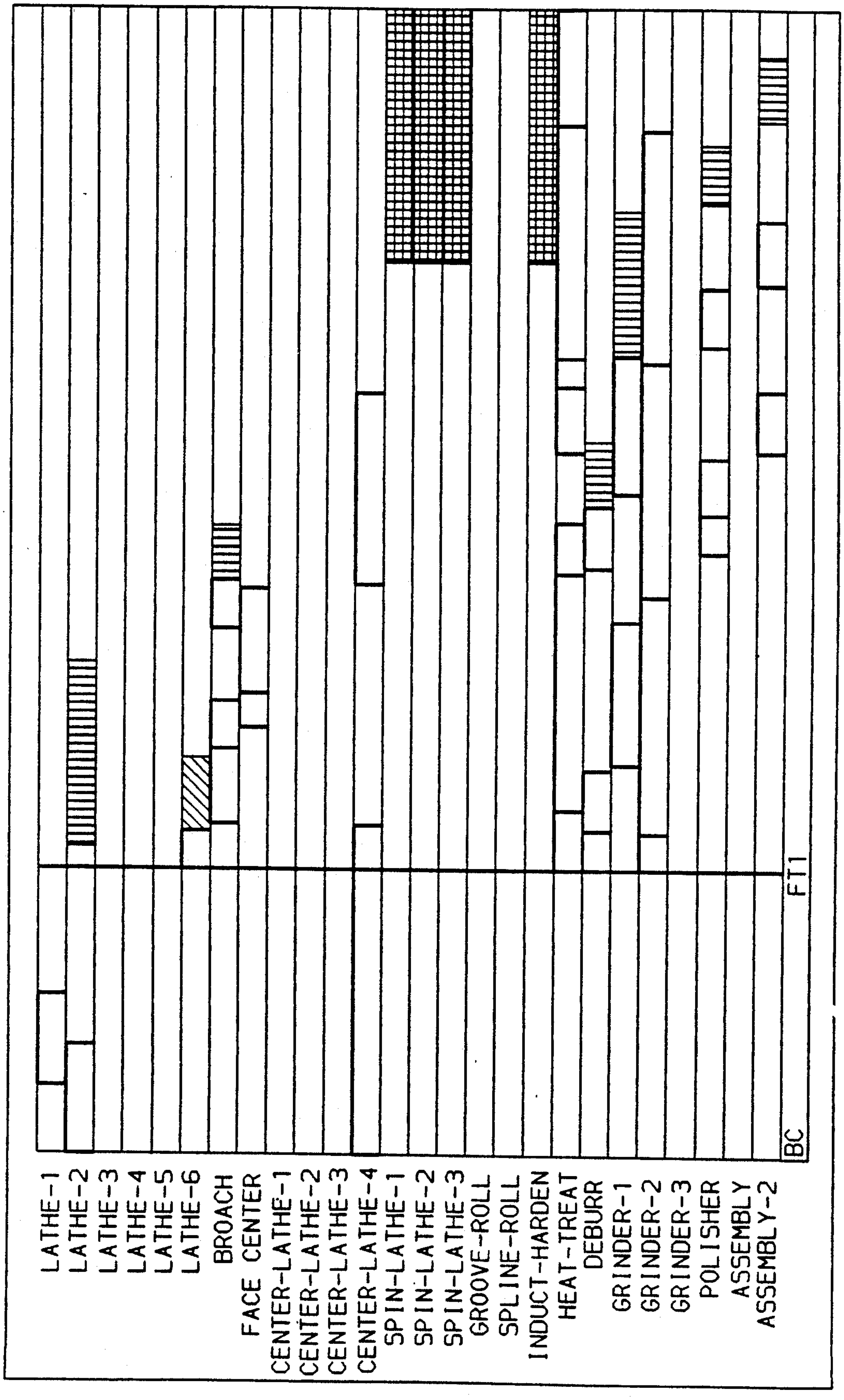

FIG. 13*c* shows the effects of shifting the schedule forward in time to insure feasibility. As indicated in FIG. 13*a* some events were scheduled before the solid dark line defining frozen time one (labelled FT1 on the bottom of the chart). This line designates the earliest time that operations can be scheduled. Thus, if any operations are scheduled before that time they must be shifted forward in time so that their start time is equal to or greater than FT1. See for example the sixth machine from the top of the chart, designated J&L-6. It will be noted that these operations have been shifted or rescheduled from their positions in FIG. 13*a*, to start in accordance with the above constraint.

Figure 13D:
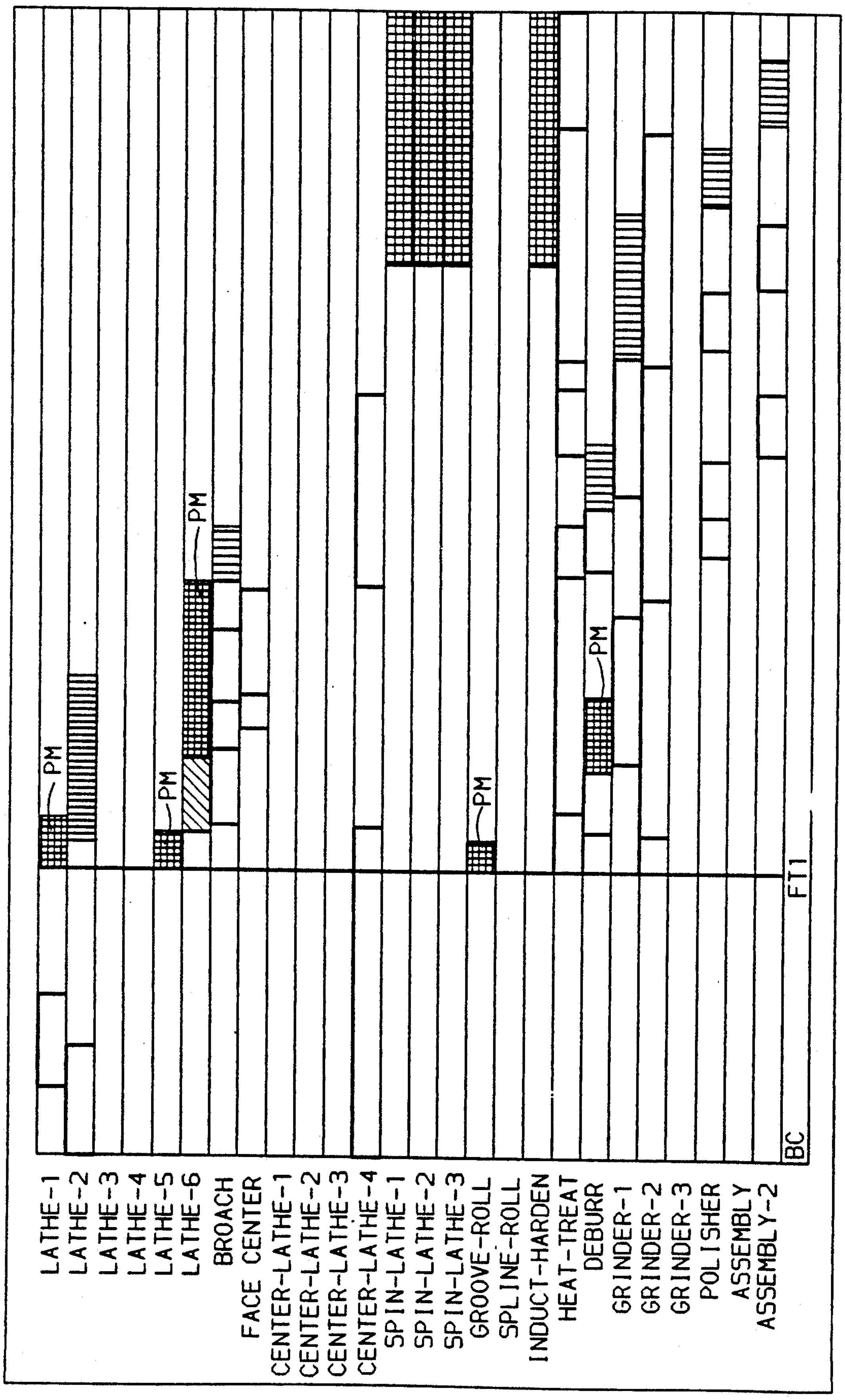

FIG. 13*d* illustrates the scheduling of preventive maintenance (PM) jobs. The PM jobs are designated PM in the chart. These jobs are scheduled around the already scheduled production jobs for customers. That is, the scheduler fits the PM jobs in as time permits. Production jobs can be shifted as necessary. Note on machine J&L-6 that the PM job has been scheduled after two earlier scheduled events. The other PM jobs are scheduled similarly. The situation can become considerably more complex as the scheduling scenario becomes more complicated. A typical schedule would contain many more scheduled production events and also need to schedule many more PM jobs. However, the illustrated scenario conveys the general idea of PM scheduling.

Figure 13E:
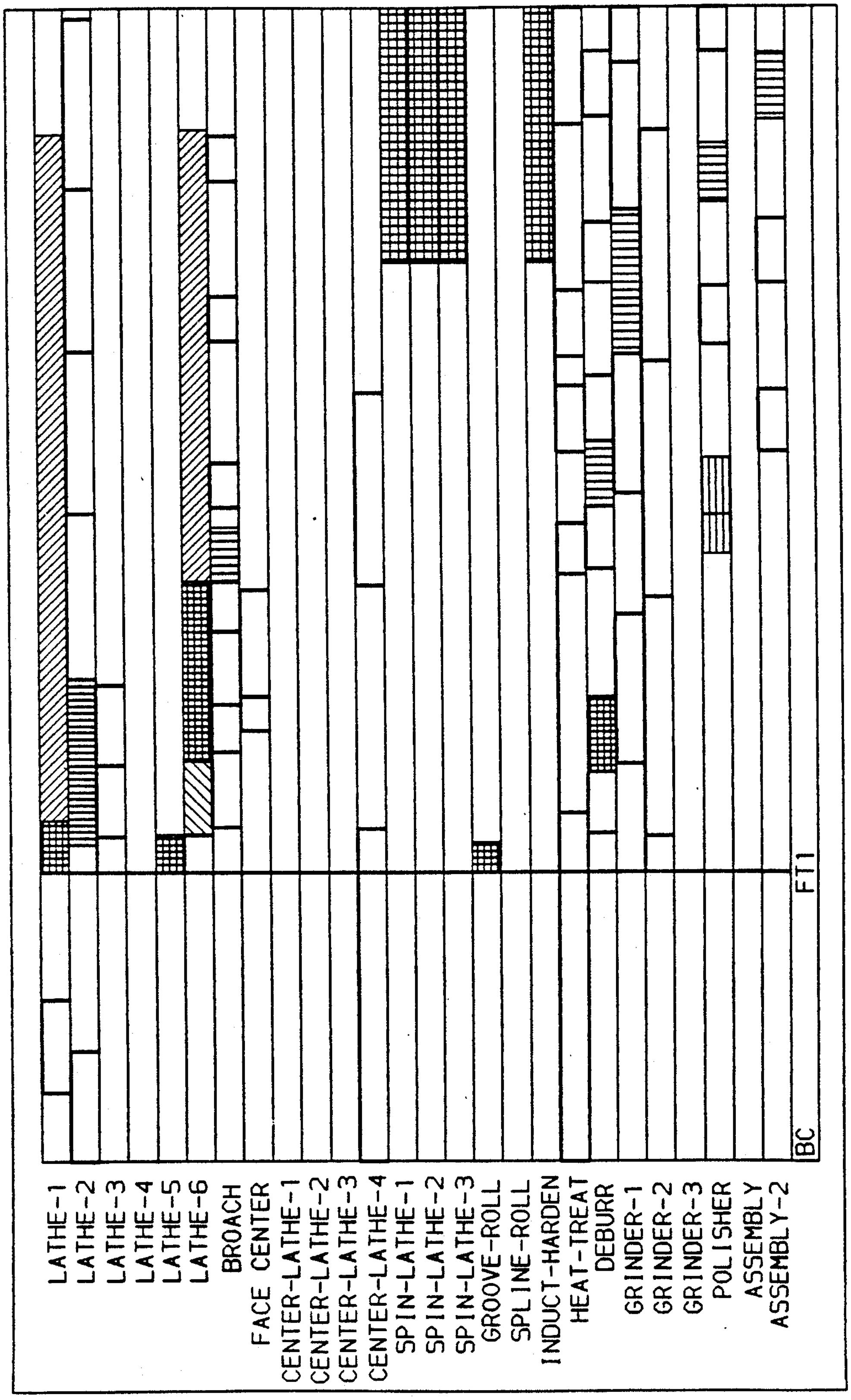

FIG. 13*e* shows the replenishment of safety stock that might have been used in the process shown in FIG. 13*b*. Here, as in scheduling PM jobs, the operations are scheduled to satisfy the replenishment of safety stock as machine capacity permits. Effort is made to avoid impact on the existing schedule. In this process, operations are only scheduled if they fit into the available time completely. This is slightly different than PM job scheduling where a PM job will be forced in if necessary. The safety stock operations are highlighted by diagonal crosshatching on both the J&L-1 and J&L-6 machines. Reference to FIG. 13*d* will show that those events scheduled to the left of the crosshatched ones already existed in the previous schedule pass.

Figure 13F:
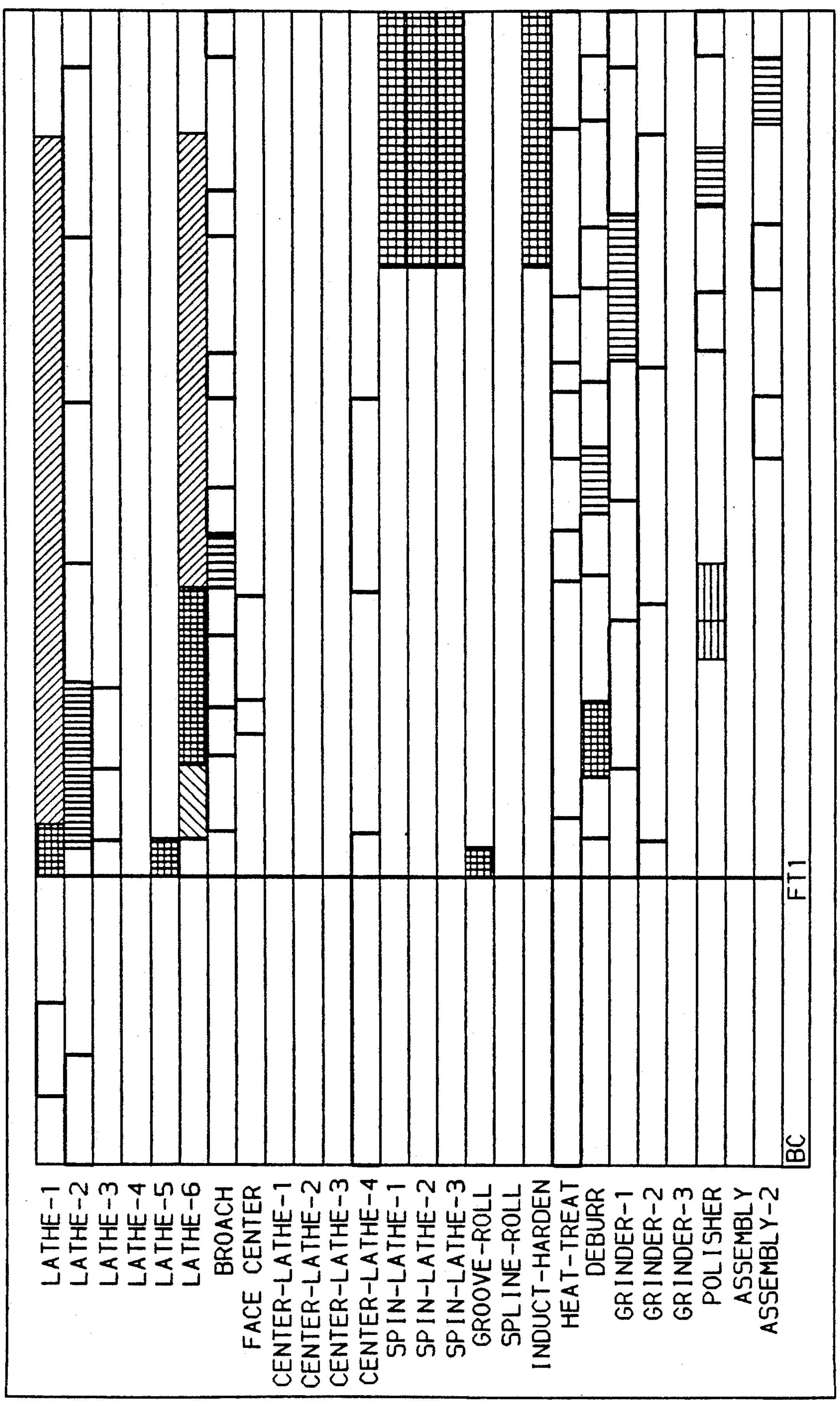

FIG. 13*f* shows the impact of front loading the schedule. During front loading operations are scheduled as early as possible without reference to Just-In-Time production. The particular scenario depicted in FIGS. 13*a*–13*f* has very few operations that can be pulled earlier in time. Two operations that can be scheduled earlier are horizontally crosshatched. In a real world scenario, the scheduler might reschedule hundreds of operations in this phase.

Attached hereto and forming a part hereof is an Appendix, comprising a source code listing written in Lisp with comments, showing an implementation of the invention. Software functions identified in the Appendix as kk.get.value(s), kk.put.value(s) and kk.remove.all.-values are available from IntelliCorp Inc.

```
-*- Mode:Common-Lisp; Package:KEE; Fonts:(cptfont HL10B cptfont HL12B HL12BI); Base:10 -*-

; CALENDARFNS.LISP

--package 'kee)

 ---------------------- CALENDAR FUNCTIONS -------------------------
;
; This file contains all the functions to build, edit, display a calendar and the daylong sche
les.
  The file has:  1. The ESS logo calendar menu.
;                2. The calendar window
;                3. The daylong schedules windows
;
; CALENDAR
;
; The calendar display constructs three customized types of hotspot:
;   ARRAY-HOTSPOTS have i and j fields for use in array access;
;   DAY-HOTSPOTS have date fields which hold the day of the month;
;   MACHINE-HOTSPOTS have machine fields which hold the machine name.
;
; Calendar structures:
;
; 1-  CALENDAR-UNIT - has slots:
;   CALENDAR-MACHINES - a list of machine names IN THE SAME ORDER AS IN THE ARRAY!!!!
;   STARTING-MONTH-NUMBER - a number from 0 to 11
;   CHOSEN-MONTH - an atom such as JULY - this is what the traffic light puts in
;   CHOSEN-MONTH-REAL - an atom such as JULY - this is after we convert it
;   INITIAL-DEFAULT-SCHEDULE - an atom such as D1
;   [illegible] number such as 1986
;   month - for each month, the slot is the month name, such as JANUARY; the value is an array
;
;      The months are:  the month prior to the current month and 11 months after that-
;
; 2-  array - 2 dimensional - (# of machines, # days in month)
;   Note that we do NOT keep track of what day in the week a date is; we calculate it when we
;   need it, such as when we display and when we copy daylong schedules-
;
; CONVENTION:  MONTH is an atom like January; MONTHN is a number from 0 to 11; MONTH-NUMBER is
 number from 1 to 12-
;
  FUNCTIONS
;
; There are 3 ways to start this all up:  initialize-calendar, and CREATE and DISPLAY on the d
ault-calendar-menu.
; All 3 call create-calendar-window.
;
; initialize-calendar -  "Initialize the calendar - called while initializing the scheduler."
;
  default-calendar-menu  - "This is the menu from the ESS logo button"
;   This has 2 ways to get to a calendar:  redraw-calendar and create-calendar
;   In either case, we will look for new machines and update the display.
;
 ---------------------------------------------------------------------
```

```
(defvar *calendar-window* nil)
(defvar *default-display-window* nil)
(defparameter *calendar-unit* '(calendar-unit calendarkb))

(defstruct (array-hotspot (:include hotspot)) i j)
(defstruct (day-hotspot (:include hotspot)) date)
(defstruct (machine-hotspot (:include hotspot)) machine)

(defvar *calendar-machine-height* 24)
(defvar *initial-element* (A1)
(defvar *calendar-height* 648)
(defvar *left-margin* 127)  ; Where to start the lines (space for the machine names at the left)
(defvar *top-margin* 44)  ; Amount of space to leave at the top for the dates

(defparameter *month-list* '(january february march april may june july august september october
november december))


; ---------------------- TOP LEVEL CALENDAR MENU (ON ESS LOGO) ----------------------

(defun default-calendar-menu ()
"This is the menu from the ESS logo button"
 '("Default Calendar Menu"
  'DEFAULT-CALENDAR-ITEMS
  "Create, Redraw, Display or Close Default Schedule Calendar"
  (SUBITEMS ("Create New Calendar"
             'CREATE-CALENDAR
             "Create New Default Schedule Calendar From Scratch")
            ;;("Load Existing Calendar"
            ;;'LOAD-CALENDAR
            ;;"Load An Existing Default Schedule Calendar From Disk")
            ("Save Calendar"
             'SAVE-CALENDAR
             "Save Default Calendar To Disk")
            ;;("Rename Existing Calendar"
            ;;'RENAME-CALENDAR
            ;;"Rename Default Schedule Calendar To New Name")
            ("Display Calendar"
             'REDRAW-CALENDAR
             "Display Machine Unavailability Calendar")
            ("Close Calendar"
             'CLOSE-CALENDAR
             "Close Machine Unavailability Calendar")
            ("Show All Machine Unavailability Calendars"
             'SHOW-DAYLONGS
             "Show All Currently Existing Machine Unavailability Calendars")
            ("Create/Update Machine Unavailability Calendar"
             'CREATE-DAYLONG
             "Create/Update Machine Unavailability Calendar, Add/Update Machine Unavailability
Calendars")
            ("Copy Machine Unavailability Calendar"
             'COPY-DAYLONG
             "Copy a Machine Unavailability Calendar")
            ("Specify Initial Machine Unavailability Calendar"
             'SPECIFY-INITIAL-DAYLONG
             "Select the Default Machine Unavailability Calendar to be Used When Creating a New
Calendar")
            )))


(defun load-calendar ()
 "Load an existing calendar"
 (let* ((old-kbfile "CALENDARKB")
        (kbfile (with-keeio
                  (terpri)
                  (prompt-user 'string :prompt "What is the name of the Calendar KB to load? "
                               :return-default old-kbfile))))
   (load.kb kbfile t)))

(defun save-calendar ()
 (save.kb 'calendarkb t))
```

```
(defun create-calendar ()
 "High level function to create new default calendar"
 (when (mouseconfirm "REALLY START NEW CALENDAR ?Old calendar will be deleted!?")
  (enter-year)
  (create-calendar-window)
  (create-arrays)
  (remove.all.values *calendar-unit* 'chosen-month)
  (unitmsg 'viewport-chosen-month-of-calendar-unit.2 'open-panel!)
  (expose *calendar-window*)
  (new-calendar-title)))

(defun enter-year ()
 (let* ((old-value (get.value *calendar-unit* 'year))
       (new-value (with-keeio
                   (terpri)(format t "The current year is ~a-" old-value) (terpri)
                   (prompt-user 'read :prompt "What is the new value for year (4 digits)? " :
turn-default old-value))))
  (put.value *calendar-unit* 'year new-value)
  (redraw-calendar)))

(defun redraw-calendar ()
 "High level function to recreate calendar window without recreating data arrays"
 (create-calendar-window)
 (remove.all.values *calendar-unit* 'chosen-month)
 (unitmsg 'viewport-chosen-month-of-calendar-unit.2 'open-panel!))

(defun display-calendar ()
 (when (window-stream-p *calendar-window*)
   (activate *calendar-window*)
   (expose *calendar-window*)
   (unitmsg 'viewport-chosen-month-of-calendar-unit.2 'open-panel!)
   (select *calendar-window*)))

(defun close-calendar ()
 (when (window-stream-p *calendar-window*)
  (deactivate *calendar-window*)
  (unitmsg 'viewport-chosen-month-of-calendar-unit.2 'close-panel!)))



 ------------ FIX START MONTH - IF WE ARE IN A NEW MONTH, FIX UP THE CALENDAR -------------

  Whenever the month changes, the following must occur:
  1-  Reset the STARTING-MONTH-NUMBER slot in calendar-unit, and the LEAP-YEAR slot-
   The LEAP-YEAR slot is set if the February month is in a leap year-
  2-  Reinitialize the old array for the old starting month with the default value-
  3-  Relabel the box-strings in the month-selector bar-
  Convention:  Months are numbered 0 thru 11-

(defun fix-calendar-start-month ()
 "This checks to see if the month has changed.  See comment above."
 (put.value '(chosen-month-av calendarkb) 'avput 'chosen-month-av)

(let* ((year (get.value *calendar-unit* 'year))
      (current-monthn (mod (1- (fifth (multiple-value-list (decode-universal-time (get-univer
-time))))) 12))
      (new-starting-monthn (mod (1- current-monthn) 12)) ; start with previous month
      (leap-year (leap-year-p (if (<= new-starting-monthn 1) year (1+ year))))
      (old-starting-monthn (or (get.value *calendar-unit* 'starting-month-number) 0)))

   (print (list year current-monthn new-starting-monthn leap-year old-starting-monthn))
  (when (not (= old-starting-monthn new-starting-monthn)) ; The month changed- So fix things-
   (put.value *calendar-unit* 'starting-month-number (mod (1- old-starting-monthn) 12)) ;; ju
 incr, to retur
   (put.value *calendar-unit* 'leap-year leap-year)
   ;; reset the previous month's array
   (let* ((initial-element (or (get.value *calendar-unit* 'initial-default-schedule)
                             *initial-element*))
         (month (nth old-starting-monthn *month-list*))
         (a (get.value *calendar-unit* month)))
     (print (list initial-element month a))
     (loop for i from 0 to (1- (array-dimension a 0)) do
```

```
          (loop for j from 0 to (1- (array-dimension a 1)) do
                (setf (aref a i j) initial-element))))
   ;; fix the month-selector window
   (let* ((kpu (unit 'keepicture.instances 'calendarkp))
          (kpl (loop for u in (get.values kpu 'keepicture.instances) when (get.value u 'strin
g collect u))
          (sorted-kpl (sort kpl #'(lambda (a b) (< (position-x (get.value a 'position))
                                              (position-x (get.value b 'position)))))))
     (loop for i from 0 to 11 do
           (put.value (nth i sorted-kpl) 'strings (nth (mod (+ new-starting-monthn i) 12) *mo
n-list*))))
   ;; Now recurse to see if we still have to update more months-
   (fix-calendar-start-month))
  nil))


;; ---------------------------------- LOW-LEVEL UTILITIES ----------------------------------

(defun get-number-of-machines () (get.value *calendar-unit* 'number-of-machines))

(defun get-calendar-machines () (get.values *calendar-unit* 'calendar-machines))  ; Everyone sho
d use this.

(defun fix-calendar-machines-if-necessary ()
 (let* ((old-machines (get.values *calendar-unit* 'calendar-machines))
        (current-machines
          (loop for machine-type in (get.value 'control-unit 'gantt-machine-list)   ; A list of
achine classes
                append
                (sort (loop for unit in (unit.descendants machine-type 'member)
                            collect (unit.name unit))
                      #'string-lessp))))
  (cond ((and old-machines
              (set-difference old-machines current-machines))
         (msgout "The old machines on the calendar do not match the current machine list. The
w machines will be added with the default schedule.")
         (fix-arrays old-machines current-machines))
        (t (put.values *calendar-unit* 'calendar-machines current-machines)))))

(defun fix-arrays (old-machines current-machines)
 (let* ((new-machines (set-difference current-machines old-machines))
        (num-old-machines (length old-machines))
        (num-new-machines (length new-machines))
        (initial-element (or (get.value *calendar-unit* 'initial-default-schedule)
                             *initial-element*)))
  (loop for month in *month-list* do
        (let* ((num-days (get-month-days month))
               (new-array (make-array (list num-days (+ num-new-machines num-old-machines))
                                      :initial-element initial-element))
               (old-array (get.value *calendar-unit* month)))
          (loop for i from 0 to (1- num-days) do
                (loop for j from 0 to (1- num-old-machines) do
                      (setf (aref new-array i j) (aref old-array i j))))
          (put.value *calendar-unit* month new-array)))
  (put.values *calendar-unit* 'calendar-machines (append old-machines new-machines))))  ;; Kee
old machines in same order


(defun create-arrays ()
"Creates an array of appropriate size for each month of the year and installs them in appropri
e slot in calendar-unit."
;;(fix-calendar-machines-if-necessary)
 (let* ((initial-element (or (get.value *calendar-unit* 'initial-default-schedule)
                            *initial-element*)))
  (fix-calendar-start-month)
  (loop for month in *month-list* do
        (put.value *calendar-unit* month
                   (make-array (list (get-month-days month)
                                     (get-number-of-machines))
                               :initial-element initial-element)))))
```

```
------------------------------ INITIALIZE AND CREATE CALENDAR WINDOW ROUTINES ----------------
---------------

(defun initialize-calendar ()
"Initialize the calendar - called while initializing the scheduler."
(when (not (window-stream-p *calendar-window*))
  (create-calendar-window 'nodisplay)))

(defun create-calendar-window (&optional dont-display)
"Create the calendar window; determine and place the machines; including machine names and lin
."
(fix-calendar-machines-if-necessary)
(fix-calendar-start-month)
(let* ((cw-width (window-stream-width *kee-root-window*))
       (cw-height *calendar-height*)
       (cw-left 0)
       (cw-bottom 0)
       (window-region (make-region :left cw-left :bottom cw-bottom :width cw-width :height cw-
ight))
       (big-bold-font (open-font 'helvetica 'bold 12))

       (machines (get-calendar-machines)))
  (if (window-stream-p *calendar-window*)
      (progn
        (unless dont-display (expose *calendar-window*))
        (clear-window-stream *calendar-window*)
        (setf (window-stream-hotspot-list *calendar-window*) nil) ..
        (reshape *calendar-window* window-region))
      ;; else
      (setq *calendar-window*
            (make-window-stream :left cw-left :bottom cw-bottom
                                :width cw-width :height cw-height :activate-p (not dont-displa

                                :title "Default Calendar" :parent *kee-root-window*)))
  (put.value *calendar-unit* 'number-of-machines (length machines))
  (setq *calendar-machine-height* (floor (/ (- *calendar-height* *top-margin*) (get-number-of-
achines))))

  (loop for machine in machines  ; write the machine names
        with y = (- *calendar-height* (+ *top-margin* *calendar-machine-height*))
        do
        (setf (window-stream-x-position *calendar-window*) 5)
        (setf (window-stream-y-position *calendar-window*) y)
        (format *calendar-window* "~a" (unit.name machine))
        ;;                (get.value machine 'gantt-mach-name))
        (decf y *calendar-machine-height*))
  (draw-calendar-lines)
  (add-to-font-set *calendar-window* big-bold-font)
  (setf (window-stream-button *calendar-window*) 'calendar-mousefn)
  (setf (window-stream-mouse-cursor-in *calendar-window*) 'cursor-in-calendar-array)
  (setf (window-stream-mouse-cursor-out *calendar-window*) 'cursor-outof-calendar-array
  (setf (window-stream-hotspot-list *calendar-window*) (make-calendar-hotspots))
  (unless dont-display (expose *calendar-window*))))


(defun draw-calendar-lines ()
 "Called by create-calendar-window; draws lines on calendar"
 (let* ((width (region-width (window-stream-region *calendar-window*))))
   (loop for j from 0 to (1- (get-number-of-machines))
         with y = (- (- *calendar-height* *top-margin*) (+ 3 *calendar-machine-height*))
         do
         (when (zerop (mod j 3))
           (draw-line-xy *calendar-window* *left-margin* y width y
                         :brush-width 1))
         ;;:brush-width (if (zerop (mod j 3)) 2 1))) ;;  :dashing 5) ; Note that dashing is slo

         (decf y *calendar-machine-height*))))

(defun refresh-calendar-regions ()
 "Clears calendar entries but leaves machine names, and redraws lines.  Called by display-calen
ar-window."
```

```
(let* ((width (region-width (window-stream-region *calendar-window*))))
  (clear-window-stream-region *calendar-window*
                              (make-region :left *left-margin* :bottom 0
                                           :width (- width *left-margin*)
                                           :height *calendar-height*)) ;; (+ 8 (- *calendar-h
eight* *top-margin*))))
  (draw-calendar-lines)))

(defun new-calendar-title ()
 (let* ((window *calendar-window*)
        (big-bold-font (open-font 'helvetica 'bold 12))
        (month (get.value *calendar-unit* 'chosen-month-real))
        (year (get-year-number month)))
   (write-title window
               (format nil "Machine Availability for ~a~a -- Mondays are underlined" month
                       (if (zerop year) " " (format nil ", ~a" year)))
               big-bold-font)))

(defun display-calendar-window (&optional month timelinep)
"This is called whenever any change is made to the calendar window data (all the editing fns).

(when (not month)
  (setf month (get.value *calendar-unit* 'chosen-month-real)))
(let* ((window *calendar-window*)
       (array  (get.value *calendar-unit* month))
       (cw-width (window-stream-width *kee-root-window*))
       (big-bold-font (open-font 'helvetica 'bold 12))
       (normal-font (open-font 'helvetica 'regular 10))
       (year (get-year-number month))
       (first-monday (get-first-monday-of-month month year))
       (date-width (floor (- cw-width *left-margin*) 31)))
  (expose window)
  (new-calendar-title)
  (refresh-calendar-regions)
  (loop for i from 0 to (month-length month)        ; FOR EACH DATE - write date, underline, a
ll values-
        with x = *left-margin*
        do
        (setf (window-stream-font window) big-bold-font)
        (setf (window-stream-x-position *calendar-window*) (+ 2 x))
        (setf (window-stream-y-position window) (+ 8 (- *calendar-height* *top-margin*)))
        (format *calendar-window* "~d" (1+ i))
        (when (eq (mod i 7) first-monday)
          (let* ((y (+ 6 (- *calendar-height* *top-margin*))))
            (setf (window-stream-x-position *calendar-window*) x)
            (setf (window-stream-y-position window) y)
            (format window "~a" '_)
            (when (> i 8) (format window "~a" '_))
            (draw-line-xy *calendar-window* (- x 3) 0 (- x 3) y :brush-width 1)))
        (setf (window-stream-font window) normal-font)
        (loop for j from 0 to (1- (get-number-of-machines)) ; FOR EACH MACHINE
              with y = (- *calendar-height* (+ *top-margin* *calendar-machine-height*))
            for value = (aref array i j)
            do
            (setf (window-stream-x-position window) x)
            (setf (window-stream-y-position window) y)
            (decf y *calendar-machine-height*)
            (if (not timelinep)
                (format window "~a" value)
                ;; else
                (display-sched-times window x y date-width value)))
        (incf x date-width))))


(defun display-sched-times (window x y date-width cdrnal)
"Experimental routine to show graphically the amount of time taken in a default schedule."
 (let* ((scheds (get.value 'default-schedules cached)))
   (loop for sched in scheds do
        (let* ((start-time (convert-string-to-mil-duration (first sched)))
               (end-time (convert-string-to-mil-duration (second sched)))
               (brush-width 10)
```

```
              (y1 (+ y (/ brush-width 2)))
              (x1 (+ x (/ (* start-time date-width) 86400)))
              (x2 (+ x (/ (* end-time date-width) 86400))))
         (when (> x2 x1)
           (draw-line-xy window x1 y1 x2 y1 :brush-width brush-width))))))

(defun make-calendar-hotspots ()
"Creates and returns list of hotspots; called by create-calendar-window."
(let* ((cw-width (window-stream-width *kee-root-window*))
       (date-width (floor (- cw-width *left-margin*) 31))
       (machines (get-calendar-machines)))
  (append
    (loop for i from 0 to 30           ;; MIDDLE OF THE SCREEN
          with x = (+ *left-margin* 0) ; was 104
          append
          (loop for j from 0 to (1- (get-number-of-machines))
                with y = (- *calendar-height* (+ *top-margin* *calendar-machine-height*))
                collect
                (let ((hotspot (make-array-hotspot :region (make-region :left x :bottom y :wid
 30)
                                                                                   :height *calendar-mach
ine-height*)
                                                          :i i :j j)))
                  (decf y *calendar-machine-height*)
                  hotspot))
          do
          (incf x date-width))
    (loop for i from 0 to 30           ;; DATES AT THE TOP
          with x = (+ *left-margin* 0) ; was 104
          collect
          (make-day-hotspot :region (make-region :left x :bottom (+ 6 (- *calendar-height* *top-
margin*))
                                                          :width 20 :height 15)
                            :date i)
          do (incf x date-width))
    (loop for machine in machines
          with y = (- *calendar-height* (+ *top-margin* *calendar-machine-height*))
          collect
          (make-machine-hotspot :region (make-region :left 5 :bottom y :width 80 :height 15)
                                :machine (unit.name machine))
          do (setq y (decf y *calendar-machine-height*))))))


;----------------------- AV on the MONTH TRAFFIC LIGHT --------------------
; "month" is January for the first box-string being moused, feb for the 2nd, etc-
-; so we have to fix it to what is actually displayed-

(defun chosen-month-av (self slot newvalues oldvalues unit slottype &optional world)
(self slot oldvalues unit slottype world ; ignore
;;(push newvalues foo)
(when newvalues
  (let* ((chosen-month (first newvalues))
         (monthn (mod (1- (get-month-number chosen-month)) 12))
         (starting-monthn (or (get.value *calendar-unit* 'starting-month-number) 0))
         (chosen-month-real (nth (mod (+ starting-monthn monthn) 12) *month-list*)))
    ;;(push (list newvalues monthn starting-monthn chosen-month-real) foo)
    (put.value *calendar-unit* 'chosen-month-real chosen-month-real)
    (display-calendar-window chosen-month-real)))
newvalues)


; ----------------------- *CALENDAR-WINDOW*'S BUTTON METHOD -----------------------

(defparameter *calendar-window-right-menu-item-list*
            '(("Bury" bury "Bury calendar window")
              ("Clear" clear "Clear calendar window")
              ("Close" close "Close calendar window")))

(defun calendar-mousefn (window mouse-state)
 "The top level button method for the calendar window."
 (let* ((month (get.value *calendar-unit* 'chosen-month-real))
```

```
    (array (when month (get.value *calendar-unit* month)))
    (position (mouse-state-position mouse-state))
    (button-state (mouse-state-button-state mouse-state))
    (hotspot (hotspot-under-position window position))
    (month-length (when month (month-length month)))) ;; (when array (array-dimension array
 1))))
  ;;(setq foo (list window mouse-state position hotspot))
  (expose window)
  (select window)
  (cond  ((null month)(documentation-print "Choose Month"))
        ((eq button-state mouse-right-1)      ; RIGHT MOUSE
         (let ((selection (pop-up-menu-choose *output-window-right-menu-item-list*)))
           (case selection
             (bury (bury window))
             (close (deactivate window))
             (clear (clear window)))))
        ((null hotspot) (background-button))
        ((typep hotspot 'machine-hotspot)    ; MACHINE
         (when (eq button-state mouse-left-1)
           (calendar-machine-left-button-menu window (machine-hotspot-machine hotspot) month
 array)))
        ((typep hotspot 'day-hotspot)          ; DAY
         (when (and (eq button-state mouse-left-1)
                    (>= month-length (day-hotspot-date hotspot)))
           (calendar-day-left-button-menu window (day-hotspot-date hotspot) month array)))
        ((typep hotspot 'array-hotspot)          ; ENTRY IN THE MIDDLE OF THE SCREEN
         (when (>= month-length (day-hotspot-date hotspot))
           (calendar-date-button-menu array button-state hotspot window)))
        (t nil))))

(defparameter *calendar-background-menu*
          '(("Normal display" normal "Normal display with default daylong schedule names")
            ("Timeline display" timeline "Timeline")))

(defun background-button ()
 (let ((selection (pop-up-menu-choose *calendar-background-menu*)))
  (case selection
    (normal (display-calendar-window))
    (timeline (display-calendar-window nil 'timeline)))))


(defun calendar-date-button-menu (array button-state hotspot window)    ;; HOTSPOT was an ARRAY-
HOTSPOT (middle of display)
"The user has moused a date hotspot on the calendar."
(let* ((cw-width (window-stream-width *wee-root-window*))
       (date-width (floor (- cw-width *left-margin*) 31)))
  (when (eq button-state mouse-left-1)
    (let* ((i (array-hotspot-i hotspot))
           (j (array-hotspot-j hotspot))
           (x (+ *left-margin* (* i date-width)))
           (y (- (- *calendar-height* (+ *top-margin* *calendar-machine-height*))
                 (* j *calendar-machine-height*)))
          ;;(old-value (aref array i j))
          (default-schedules
            (loop for name in (unit.slot.names 'default-schedules)
                  collect (list (format nil "~S0<~a  downtime: ~a~;~>"
                                            name (get.value 'default-schedules name))
                                name (string name))))
          (new-value (pop-up-menu-choose default-schedules :title "Default Schedules")))
     ;;;         (with-eocic (terpri)(format t "The current value is ~a~" value) (terpri)
     ;;;            (prompt-user 'read :prompt "What is the new value? " :return-default valu
e))
      (when new-value
        (setf (aref array i j) new-value)
        (expose window)
        (clear-window-stream-region window
                                    (make-region :left x :bottom y :width 20 :height (- *calen
r-machine-height* 2)))
        (setf (window-stream-x-position window) x)
        (setf (window-stream-y-position window) y)
        (format window "~a" (aref array i j))))))
```

```
(when (eq button-state mouse-middle-1)
  (let* ((i (array-hotspot-i hotspot))
         (j (array-hotspot-j hotspot))
         (old-value (aref array i j))
         (default-schedule (get.value '(default-schedules calendarkb) old-value)))
    (with-kesio
      (terpri)
      (format t "The ~a default schedule is ~a~" old-value default-schedule)
      (terpri)))))


(defun cursor-in-calendar-array (window mouse-state)
 "CALENDAR-WINDOW's MOUSE-CURSOR-IN METHOD"
 (declare (ignore window mouse-state))
 (documentation-print "L: Change Default Schedule   M: Describe Default Schedule   R: Pop Up Wo
rd Editor Menu"))

(defun cursor-outof-calendar-array (window mouse-state)
 "CALENDAR-WINDOW's MOUSE-CURSOR-OUT METHOD"
 (declare (ignore window mouse-state))
 (documentation-print ""))


 ---------------------- LOW LEVEL ROUTINES FOR THE HOTSPOT MENUS ----------------------

(defun month-length (month)
 (let* ((year (get-year-number month)))
  (case month
   (february (if (leap-year-p year) 29 27))
   ((april june september november) 29)
   (otherwise 30))))

(defun choose-daylong (default-value)
"Brings up a menu of schedules to choose 1 from."
 (let* ((scheds (sort (loop for slot in (unit.slots (unit '(default-schedules calendarkb)))
                             collect (slot.name slot))
                       #'string<))
       (menu (loop for sched in scheds collect (list sched sched sched)))
       (new-value (or (pop-up-menu-choose menu :title (format nil "Default value: ~a" default-
lue))
                       default-value)))
   new-value))

(defun choose-machines ()
 "Brings up a menu of machines to choose 1 from-"
 (let* ((machines (sort (copy-seq (get-calendar-machines))
                        #'string<))
       (new-values (choice machines "Choose one or more machines")))
   (unless (eq new-values :ABORTED)
     new-values)))


(defun get-first-monday-of-month (month year)
 "Returns value from 0 to 6, does not add 1 to get actual date of first monday; called by displ
-calendar-array"
 (let ((month-number (get-month-number month)))
   (mod (- 7  (seventh
               (multiple-value-list
                 (decode-universal-time
                   (encode-universal-time 0 0 0 1 month-number year *time-zone*)
                   *time-zone*)))))
      7)))


(defun get-month-number (month)
 (case month
   (january 1)
   (february 2)
   (march 3)
   (april 4)
   (may 5)
```

```
 (June 6)
 (July 7)
 (August 8)
 (September 9)
 (October 10)
 (November 11)
  December 12)))

(defun get-month-days (month)
"Number of days in each month"
(case month
 ((January March May July August October December) 31)
 ((April June September November) 30)
 (February 28)
 (t (print "Oops get-month-days"))))


(defun get-year-number (month)
(let* ((starting-monthn (or (get.value *calendar-unit* 'starting-month-number) 0))
      (starting-year (or (get.value *calendar-unit* 'year) 0))
      (year (if (< (get-month-number month)(1+ starting-monthn))
                 (1+ starting-year) starting-year)))
 year))

(defun leap-year-p (year)
"Return T if the year is a leap year"
(and (zerop (mod year 4))
     (or (zerop (mod year 400)) ; NIL if year is divisible by 100, but T if divisible by 400-
         (not (zerop (mod year 100))))))

; ---------------------- ITEM MENU FUNCTIONS - MOUSE A MACHINE ----------------------
(defparameter *calendar-machine-menu*
            '(("Copy Machine to other Machines -- Week" machine-week
               "Copy this machine's schedule to another machine for all days of this month")
              ("Copy Machine to other Machines -- Month" machine-month
               "Copy this machine's schedule to another machine for all days of this month")
              ("Copy Machine to other Machines -- Year" machine-year
               "Copy this machine's schedule to another machine for all days of this year")))

(defun calendar-machine-left-button-menu (window machine month array)
"The user moused a machine (down the left-hand side)."
window ; ignore
(let ((selection (pop-up-menu-choose *calendar-machine-menu*)))
  (case selection
    (machine-week (copy-machine-schedule-for-week machine month array))
    (machine-month (copy-machine-schedule machine month array 'month))
    (machine-year (copy-machine-schedule machine month array 'year)))))

(defun copy-machine-schedule-for-week (from-machine month array)
array ; ignore
"Copy this machine's schedule to another machine for all days of this week"
(let* ((to-machines (choose-machines))
       (orig-week-start (choose-week month))
       (from-machine-index (get-machine-index (unit.name from-machine))))
  (loop for to-machine in to-machines do
        (let* ((to-machine-index (get-machine-index to-machine))
               week-start)
          (setq week-start orig-week-start)

          (when (and from-machine-index to-machine-index)
            (let ((m-array (get.value *calendar-unit* month)))
              (decf week-start 1)      ; Subtract 1 from week start to make up for the array s
ting at 0, not
              (loop for i from week-start to (min (month-length month) (+ week-start 6))
                    do
                    (setf (aref m-array i to-machine-index)(aref m-array i from-machine-index))
 )))))

 display-calendar-window month))
```

```
fun choose-week (month)
isplay a menu of Mondays for the user to select from."
et* ((year (get-year-number month))
      (first-monday (get-first-monday-of-month month year))
      (mondays nil))
  dotimes (i (- (month-length month) first-monday))
   (setq mondays
         (append mondays (list (format nil "~a" (+ i first-monday 1)))))   ; The 1 makes up f
the counter starting at 0
   (incf i 6))
 (read-from-string
   (choose-one mondays "Please pick the Monday of the week to copy."))))

fun copy-machine-schedule (from-machine month array month-or-year)
'Copy this machine's schedule to another machine for all days of this month/year"
array ; ignore
let* ((to-machines (choose-machines))
       (from-machine-index (get-machine-index (unit.name from-machine))))
  (loop for to-machine in to-machines do
       (let* ((to-machine-index (get-machine-index to-machine)))
          (when (and from-machine-index to-machine-index)
            (loop for m in *month-list*
                  for m-array = (get.value *calendar-unit* m)
                  do
                  (when (or (equal 'YEAR month-or-year)
                            (equal m month))
                    (loop for i from 0 to (month-length m)
                          do
                          (setf (aref m-array i to-machine-index)(aref m-array i from-machine-
dex))))))))

   (display-calendar-window month)))

efun get-machine-index (machine) (position machine (get-calendar-machines)))


  ------------------- USER MOUSED A DAY ---------------------------
efparameter *calendar-day-menu*
            '(("Copy Day to Month" copy-month "Copy this day's schedule to all days of this mo
h")
              ("Copy Day to Year" copy-year "Copy this day's schedule to all days of the year"

              ("Copy Day of Week This Month" copy-day-of-week-in-month
               "Copy this day's schedule to those which are the same day of the week, this mon
 only")
              ("Copy Day of Week This Year" copy-day-of-week-in-year
               "Copy this day's schedule to those which are the same day of the week, for thi
tire year")
              ("Copy Week to Year" copy-week-year
               "Copy this week's schedule to the remainder of the year")))

.fun calendar-day-left-button-menu (window date month array)
"The user moused a day (along the top border) (not a date in the middle)."
window ; ignore
let ((selection (pop-up-menu-choose *calendar-day-menu*)))
  (case selection
    (copy-month (copy-month date month array))
    (copy-year (copy-year date month array))
    (copy-day-of-week-in-month (copy-day-of-week-in-month date month array))
    (copy-day-of-week-in-year (copy-day-of-week-in-year date month array))
    (copy-week-year (copy-week-year date month array)))))

efun next-calendar-month (month)
"Return the name of the next month"
;; Called by generate.machine.unavailability.
let* ((index (position month *month-list*)))
  (if (= index 11)
      'january
      (first (rest (nthcdr index *month-list*))))))
```

```
(defun copy-month (date month array)
"Copy this day's schedule to all days of this month"
 (loop for i from 0 to (month-length month)
       unless (= i date)
       do
       (loop for j from 0 to (1- (get-number-of-machines))
             do
             (setf (aref array i j)(aref array date j))))
(display-calendar-window month))

(defun copy-year (date month array)
"Copy this day's schedule to all days of the year"
(loop for m in *month-list*
      for m-array = (get.value *calendar-unit* m)
      do
      (loop for i from 0 to (month-length m)
            unless (and (= i date)(eq m month))
            do
            (loop for j from 0 to (1- (get-number-of-machines))
                  do
                  (setf (aref m-array i j)(aref array date j)))))
(display-calendar-window month))

(defun get-day-of-month (date month)
"Return the day of the week of the first day of this month"
(let ((month-number (get-month-number month))
      (this-year (get-year-number month)))
  (seventh
    (multiple-value-list
      (decode-universal-time
        (encode-universal-time 0 0 0 (1+ date) month-number this-year *time-zone*)
        *time-zone*)))))


(defun copy-day-of-week-in-month (date month array)
"Copy this day's schedule to those which are the same day of the week, this month only"
(let ((thisday (get-day-of-month date month)))
  (loop for i from 0 to (month-length month)
        when (and (= thisday (get-day-of-month i month))
                  (/= i date))
        do
        (loop for j from 0 to (1- (get-number-of-machines))
              do
              (setf (aref array i j)(aref array date j))))
  (display-calendar-window month)))

(defun copy-day-of-week-in-year (date month array &optional dont-display)
"Copy this day's schedule to those which are the same day of the week, for the entire year"
 (let ((thisday (get-day-of-month date month)))
  (loop for m in *month-list*
        for m-array = (get.value *calendar-unit* m)
        do
        (loop for i from 0 to (month-length m)
              when (and (= thisday (get-day-of-month i m))
                        (not (and (= i date)(eq m month))))
              do
              (loop for j from 0 to (1- (get-number-of-machines))
                    do
                    (setf (aref m-array i j)(aref array date j)))))
  (unless dont-display
    (display-calendar-window month))))

(defun copy-week-year (date month array)
"Copy this week's schedule to the remainder of the year"
(let* ((thisday (get-day-of-month date month))
       (len (month-length month)) ; 27 thru 30
       (days-left (- len date)))
  ;; thisday is 0 thru 6
```

```
;; date is 0 to 30, month is 'january to 'december
;;(setq foo (list thisday len days-left date month))
(if (or (> thisday date)
        (< days-left (- 6 thisday)))
    (progn
      (ticl:beep)
      (documentation-print "Week overlaps a month boundary")
      (sleep 5))
    ;; else
    (when T
      (loop for day from thisday to 6
            for new-date from date to 40
            do (copy-day-of-week-in-year new-date month array 'cont-display))
      (loop for day from thisday downto 0
            for new-date from date downto 0
            do (copy-day-of-week-in-year new-date month array 'cont-display))
      (display-calendar-window month))))
```

```
---------------------------------- DAYLONG FUNCTIONS ----------------------------------

 Top-level menu routines for daylong. SHOW-DAYLONGS, CREATE-DAYLONG COPY-DAYLONG SPECIFY-INIT
L-DAYLONG

(defun copy-daylong ()
"Copy a Machine Unavailability Calendar"
(let* ((old-daylong (choose-daylong nil))
       (new-daylong (with-keeio
                      (terpri)
                      (prompt-user 'read :prompt "What is the new daylong name? ")))
       (u '(default-schedules calendarkb)))
  (when (and old-daylong new-daylong)
    (create.slot u new-daylong 'own (get.values u old-daylong))
    (show-daylongs))))

(defun specify-initial-daylong ()
"Specify Initial Machine Unavailability Calendar"
(let* ((old-value (get.value *calendar-unit* 'initial-default-schedule))
       (new-value (choose-daylong old-value)))
  (put.value *calendar-unit* 'initial-default-schedule new-value)))


(defun show-daylongs ()
"Show all currently existing default daylongs"
;; "Show All Currently Existing Machine Unavailability Calendars")
(cond ((window-stream-p *default-display-window*)
       (expose *default-display-window*)
       (clear *default-display-window*))
      (t (setq *default-display-window*
               (make-window-stream :parent *kee-root-window* :title "Existing Default Daylongs

                                   :left 700 :width 300 :bottom 324 :height 400
                                   :activate-p t))))
(setf (window-stream-button *default-display-window*) 'kee-button)
(setf (window-stream-repaint *default-display-window*) 'default-display-repaint)
(enable-window-stream-extent-scrolling *default-display-window* :horizontal nil)
(repaint *default-display-window*))


(defun default-display-repaint (stream &optional region)
"The repaint function for the daylong display window"
region ; ignore
(let ((current-extent-height
        (if (>= (window-stream-inner-height stream)(window-stream-extent-height stream))
            (window-stream-inner-height stream)
            (window-stream-extent-height stream))))
  (setf (window-stream-scroll stream) 'nill)      ;;nill is a no-op function provided by KEE
```

```
(clear-window-stream-region stream)                        ;;used to disable further scrolling while p
ainting
  (setf (window-stream-y-position stream)
      (- current-extent-height (window-stream-ascent stream)))
  (setf (window-stream-x-position stream) 0)
  (loop for slot in (unit.slots 'default-schedules 'own t t)
        for  slotname = (slot.name slot)
        do
        (loop for downtime in (get.value 'default-schedules slotname)
              with i = 1
              do
              (cond ((= i 1)
                     (format *default-display-window* "~a: down from ~a to ~a~%"
                             slotname (first downtime) (second downtime))
                     (incf i))
                    (t
                     (format *default-display-window* "      and from ~a to ~a~%"
                             (first downtime) (second downtime))))))
  (setf (window-stream-extent-height stream)
        (if (>= (window-stream-inner-height stream) current-extent-height)
            (window-stream-inner-height stream)
            (- current-extent-height (window-stream-y-position stream))))
  (setf (window-stream-scroll stream) 'default-window-stream-scroll-method))      ;;reset norma
scrolling fuctionality


  -------------------- CREATE-DAYLONG - AND ALL THE MOUSE FUNCTIONS --------------------

(defun create-daylong ()
"Create/Update Machine Unavailability Calendar, Add/Update Machine Unavailability Calendars"
 (let ((stream (make-window-stream :left 0
                                   :bottom 0
                                   :width 400
                                   :height 250
                                   :activate-p t
                                   :parent *kee-root-window*
                                   :title "Default Daylongs"  )))
  (setf (window-stream-button stream) 'daylongs-mousefn)
  (setf (window-stream-font stream) (first *system-font-set*))
  (format-daylong-window stream)))


(defun format-daylong-window (stream)
 (let (hotspot-list)
  (format stream "~%  DAYLONG ")
  (format stream "                                                  Downtimes:  ")
  (format stream "~%    name? ")
  (setf hotspot-list (print-object stream 'daylong-entry :label " " :minimum-height 15 :minimu
width 100))
  (format stream "~%~% DOWNTIME ~%")
  (format stream "  starts when? ")
  (setf hotspot-list (list hotspot-list
                           (print-object stream 'daylong-starts :label " " :minimum-height 15
minimum-width 100)))
  (format stream "~%    ends when? ")
  (setf hotspot-list (append hotspot-list
                           (list (print-object stream 'daylong-ends :label " " :minimum-height
15 :minimum-width 100))))
  (draw-line-xy stream 0 50 (window-stream-width stream) 50 :brush-width 2 )
  (setf (window-stream-x-position stream) 30)
  (setf (window-stream-y-position stream ) 20)
  (print-object stream 'daylong-abort  :label "ABORT")
  (setf (window-stream-x-position stream) 90)
  (print-object stream 'daylong-done  :label "DONE")
  (setf (window-stream-x-position stream) 140)
  (print-object stream 'daylong-edit  :label "EDIT")
  (setf (window-stream-x-position stream) 185)
  (print-object stream 'daylong-redisplay  :label "REDISPLAY")
  (setf (window-stream-get stream 'hotspots) hotspot-list)))
```

```
(defun daylong-redisplay (stream &optional hotspot)
 "Redisplay the daylong window"
 hotspot ; ignore
 (clear-window-stream stream)
 (format-daylong-window stream)
 (display-daylong-name stream)
 (display-downtimes stream))

(defun display-daylong-name (stream)
 "Display the name of the daylong in the daylong window"
 (let ((name (window-stream-get stream 'daylong))
       (daylong-hotspot (first (window-stream-get stream 'hotspots))))

   (when name
     (setf (window-stream-x-position stream ) (region-left (lite-region daylong-hotspot)))
     (setf (window-stream-y-position stream) (+ (region-bottom (lite-region daylong-hotspot)) 5

     (format stream "~a" name))))

(defun display-downtimes (stream)
 "Display the downtimes in the daylong window"
 (let ((downtimes (window-stream-get stream 'downtimes))
       (x 160)
       (y 200))
   (clear-window-stream-region stream (make-reg 200 100 200 100))
   (when downtimes
     (loop for downtime in downtimes do
           (setf (window-stream-x-position stream) x)
           (setf y (- y 15))
           (setf (window-stream-y-position stream) y)
           (format stream "                                ~a   ~a" (first downtime) (second downtime))


(defun daylong-abort (stream &optional hotspot)
 "Abort out of the daylong display"
 hotspot ; ignore
 ;;  (when (mouseconfirm "REALLY ABORT?")

 (setf (window-stream-get stream 'daylong) nil)
 (setf (window-stream-get stream 'downtimes) nil)
 (closew stream)
 (documentation-print "")
 (show-daylongs))


(defun daylong-edit (stream &optional hotspot)
 "Edit a daylong"
 hotspot ; ignore
 (let ((downtimes (window-stream-get stream 'downtimes)))
   (if downtimes
       (edit-downtime stream (pop-up-menu-choose  (loop for downtime in downtimes
                    collect
                (list (mkstring downtime) downtime))
                         :title "Select Downtime to Edit:"))

       (documentation-print "NO DOWNTIMES TO EDIT-"))))

(defun edit-downtime (stream &optional downtime)
 (when downtime
   (let ((hotspots (window-stream-get stream 'hotspots)) new-downtime)
     (setf (window-stream-get stream 'downtimes) (remove downtime (window-stream-get stream 'do
wntimes)))
     (daylong-redisplay stream)
     (setf new-downtime (list (duration-input stream (second hotspots) (mkstring (first downtim
e)))
                             (duration-input stream (third hotspots) (mkstring (second downtim
e))))
     (setf (window-stream-get stream 'downtimes) (append (window-stream-get stream 'downtimes)
                                                         (list new-downtime)))
     (daylong-redisplay stream))))
```

```
(defun daylong-done (stream hotspot)
 "The user is done editing this daylong"
 hotspot ; ignore
 (let ((daylong (intern (string (window-stream-get stream 'daylong)) 'kee))
       (downtimes (window-stream-get stream 'downtimes)))
   (cond ((slot.exists.p daylong 'default-schedules)
          (put.value 'default-schedules daylong downtimes))
         (t (create.slot 'default-schedules daylong 'own (list downtimes))))
   (closew stream)
   (show-daylongs)))


(defun daylongs-mousefn (stream mouse-state)
 "The mousefn called if the user mouses the daylong window"
 (let ((hotspot (hotspot-under-position stream (mouse-state-position mouse-state))))
   (expose stream)
   (select stream)
   (cond (hotspot
          (eval (list (lite-object hotspot) stream hotspot)))
         (t
          (let ((choice (pop-up-menu-choose
                         '(("CLOSE" close)
                           ("MOVE" move)
                           ("SHRINK" shrink))
                         :TITLE "Select One:")))
            (case choice

              (close (closew stream))
              (shrink (shrink stream))
              (move (move stream (get-box-region (window-stream-width stream)
                                                 (window-stream-height stream))))))))))


;; --------------------- THESE ARE HOTSPOT FNS ON THE DAYLONG EDIT WINDOW --------------------


(defun daylong-starts (stream hotspot)
 stream hotspot ; ignore
 nil)

(defun daylong-ends (stream hotspot)
 stream hotspot ; ignore
 nil)

(defun daylong-entry (stream hotspot)
 (let ((name (TYPE-IN-HOTSPOT stream hotspot nil 'READ))
       start end
       (x 160)
       (y 200)
       (hotspots (window-stream-get stream 'hotspots)))

   (when  name
     (setf (window-stream-get stream 'daylong) name)
     (setf (window-stream-get stream 'downtimes) nil)
     (clear-window-stream-region stream (make-reg 200 100 200 100))
     (when (slot.exists.p (intern (string name) 'kee) 'default-schedules)
       (documentation-print "DAYLONG ALREADY EXISTS.  YOU CAN NOW CHANGE IT OR ABORT"))

     (setf (window-stream-y-position stream) y)
     (setf (window-stream-get stream 'downtimes)
           (loop for x from 1 to 100
                 collect
                 (list (setf start (TYPE-IN-HOTSPOT stream (second hotspots)))
                       (setf end (TYPE-IN-HOTSPOT stream (third hotspots))))
                 do
                 (clear-window-stream-region stream (lite-region (second hotspots)))
                 (clear-window-stream-region stream (lite-region (third hotspots)))
                 (setf (window-stream-x-position stream) 160)
                 (setf y (- y 15))
                 (setf (window-stream-y-position stream) y)
                 (format stream "                              ~a   ~a" start end)
```

```
            until
            (not (mouseconfirm "Enter more downtimes? (Left click - YES  Right click - NO
)))))



;*************************************************************************************
*
;*************************************************************************************
**

; -------------------- FUNCTIONS TO SAVE ARRAYS IN KBS ------------------------
;
; To save the calendarkb, we need to convert the arrays for each month into lists so that save
.b will
; save them correctly.   Arrays are stored in slots with valueclass "ARRAY"
;
; The save.kb method of kb should have a before wrapper that calls (store-arrays kbname)
; The load-kb method of kb should have an after wrapper that calls (restore-arrays kbname)


(defun array-to-list (array)
"Turns array into a list with 'array and dimensions on front"
(let ((array-dims (array-dimensions array)))
  (cons 'array (cons array-dims (ticl:listarray array)))))


(defun store-arrays (kbname)
"Replaces array slot value with list generated by array-to-list"
(let ((array-slots (loop for unit in (kb.units kbname)
                          append
                          (loop for slot in (unit.slots unit)
                                when (equal (get.facet.value unit (slot.name slot) 'valuecla
ss)
                                            (unit 'array))
                                collect slot))))
  (loop for slotref in array-slots
        with array-ref
        with currentunit
        with currentslot
        do (setq currentunit (slot.unit slotref))
           (setq currentslot (slot.name slotref))
           (setq array-ref (get.value currentunit currentslot))
           (remove.all.values currentunit currentslot)
           (put.facet.value currentunit currentslot 'valueclass 'list)
           (put.value currentunit currentslot (array-to-list array-ref)))))

(defun rebuild-array (list-ref)
"Turns list into an array"
(let* ((array-dims (car list-ref))
       (array-contents (cdr list-ref))
       (array-ref (make-array array-dims)))
  (zlc:fillarray array-ref array-contents)))

(defun restore-arrays (kbname)
"Replaces list representation of array slot value with array"
(let ((array-slots (loop for unit in (kb.units kbname)
                          append (loop for slot in (unit.slots unit)
                                       with value
                                       do (setq value (get.value unit (slot.name slot)))
                                       when (and (listp value)
                                                 (eq (car value)
                                                     'array))
                                       collect slot))))
  (loop for slotref in array-slots
        with currentunit
        with currentslot
        with list-ref
        do (setq currentunit (slot.unit slotref))
```

```
        (setq currentslot (slot.name slotref))
        (setq list-ref (cdr (get.value currentunit currentslot)))
        (remove.all.values currentunit currentslot)
        (put.facet.value currentunit currentslot 'valueclass 'array)
        (put.value currentunit currentslot (rebuild-array list-ref)))
(fix-calendar-start-month)))

; -*- Mode:Common-Lisp; Package:KEE; Base:10 -*-

(in-package 'kee)

; File CHECKING.LISP     Mark Jeffery  August, 1988

; Perform checking of the FCS Data KB and the resultant ESS translations in the ASLF
; and ORDERS KBs.

; The TESTS are defined by the DEFCHECK forms given below.  The macros take care
; of processing the DEFCHECKs.

; The main entry point is the function PERFORM-CHECKING; it defaults to trying
; all the FCS and ESS tests it has, returning T if everything is OK, and NIL otherwise.

; The :NEW keyword can be used to select individual tests.

; If the DO-ACTIONS keyword is non-NIL, then the failure actions will be done;
; usually it is a discarding of the unit from the class hierarchy.

; The functions DISCARDED-UNITS and RESTORE-UNITS can be used on discarded units:
; if given a class or KB, they operate on units that used to be in that class (or are
; discarded in that KB).  The default is the discarded units in the ASLE KB.

; Discarded units are units that have been made children of DISCARDED.UNITS in the
; ASLE or FCS KBs, or a child of REJECTED-ORDERS in the ORDERS KB, by the function
; DISCARD-UNIT.  They are restored by reconnecting them to their original parents
; with the function (RESTORE-UNITS <kb or original class>):
;       (restore-units 'operations)     (restore-units 'fcs)


; ---------------------------
; QUESTIONS/ SUGGESTIONS
; ---------------------------

; Should a routine that fails a test be discarded?? Special warning?? Or what??
; Code still needs commenting -- MAJ 1/6/89



; ------------------
;  Begin Lisp CODE
; ------------------

; ---------------------
;  DO-PRE-PROCESSING     ;; belongs in some other file??  Needs chopping.
; ---------------------


(defun DO-PRE-PROCESSING (&optional
                         (read-data-files t)
                         incremental-bridge  ; T, filename, or list of filenames.
                         (do-pre-checking t)
                         (do-translation t)
                         (do-post-checking t))

By default, performs the reading of data files from the directory *data-dir*,
pre-translation checking of the FCS data, translation from FCS data to the ESS
knowledgebase, and post-translation checking of the ESS knowledgebase.
It will skip any stage where the optional arg for that stage is NIL.
If T, a filename, or a list of filenames is supplied for the incremental bridge
argument, then the indicated files will be read in (default is "incremeg.data").

(unwind-protect              ; make sure mouse-cursor is restored
```

```
(let ((fos-errors nil)
      (ees-errors nil))
  (inform 'stage "U2%Beginning FOS/EES pre-processing.U%")
  (mouse-to-hourglass)   ; should use with-mouse-grabbed, since mouse-to-hourglass is TI-s
pecific.

  (if READ-DATA-FILES
      (progn (make-kb) (instantiate-kb) (read-pr-bill-of-materials))
      (inform 'special "U2%Skipping the reading of data files.U%"))

  (if INCREMENTAL-BRIDGE
    (if (stringp incremental-bridge) (setq incremental-bridge (list incremental-bridge)))
    (if (eq incremental-bridge t) (setq incremental-bridge (list "incrbrdg.dat")))
    (mop nil #'restore-units (list #data-kb* *factory-kb* *order-kb*))
    (loop for filename in incremental-bridge
          do (READ-INCREMENTAL-BRIDGE filename)))

  (DOT-DOTS-TO-DASHES)   ; convert dots to dashes for DOTs. catch INCREMENTAL BRIDGE nam
es.

  (if DO-PRE-CHECKING
      (setq fos-errors (not (perform-checking 'fos :do-actions t)))
      (inform 'special "U2%Skipping pre-translation FOS data checking.U%"))

  (if DO-TRANSLATION
      (progn (initialize-EES-kb) (translate-data-into-ees-kbs))
      (inform 'special "U2%Skipping the translation of data records.U%"))

  (if DO-POST-CHECKING
      (setq ees-errors (not (perform-checking 'ees :do-actions t)))
      (inform 'special "U2%Skipping post-translation EES kb checking.U%"))

  (CHECK-SLOT-FORMATS)   ; Inexpensive check of slot values; always do it.

  (PUT.VALUES 'control-unit 'selected-orders (SUMMARIZE-ORDERS))   ;; install buildable ord
s.

  (when (or (discarded-units *factory-kb*) (discarded-units *order-kb*))
    (inform 'warning "U%WARNING! Units were discarded from the EES KBs.U%"))
  (inform 'stage "U%Enter and select any manual orders, and then run the scheduler. U
                 U%Then select B"Write FOS Commit Files" or run (write-commit-files).U%")

  t)  ; what should return be?? (and fos-errors ees-errors) ?
 (mouse-to-arrow)))   ; should be replaced with KEE code, since this is TI-specific.


(defun SUMMARIZE-ORDERS ()
 "Print a summary of PARTS and ORDERS.
 Return a list of the buildable ORDERS."
 ;; Could simplify formatting with a version of FORMAT-VALUES that accepted a message arg.
 (let* ((rejected-parts (discarded-units 'parts))   ; unit names.
        (rejected-orders (discarded-units 'orders))   ; unit names.
        (rej-part-reason-list (sort-by-reason rejected-parts))
        (rej-order-reason-list (sort-by-reason rejected-orders))
        (remaining-orders (loop for unit in (unit.descendants 'net-order-demand-orders 'member)
                                collect (unit.name unit))))
 (if REJECTED-PARTS   ;; bad parts
     (progn (inform 'result "U2%U18@<Rejected parts:U>U12@<PartU>Failure Reason")
            (inform 'result "U%U18@ U>U12@<-----U>---------------")
            (inform 'result "U%U18@U18@ U>U12@<U8U>U8U8U%U8U%" (or rej-part-reason-list '(("N
one"))))
     (inform 'result "U2%U18@<Rejected parts:U>U8U8U%U18@ U>U8U%" '(("None"))))

 (inform 'result "U2%U18@<Remaining parts:U>U8U8U%U18@ U>U8U%"   ;; good parts
         (or (loop for part in (unit.descendants 'parts 'member)
                   collect (unit.name part))
             '(("None"))))
 (if REJECTED-ORDERS   ;; bad orders
     (progn (inform 'result "U2%U18@<Rejected orders:U>U20@<OrderU>Failure Reason")
            (inform 'result "U%U18@ U>U20@<-----U>---------------")
            (inform 'result "U%U8U8U18@U8 U>U8U8U%U8U%" (or rej-order-reason-list '(("N
```

```
...))
      (inform *result "[illegible]Rejected orders:[illegible]" [illegible]))

  (inform *result "[illegible]Selected orders:[illegible]" (or remaining-orders [illegible]
  ;; good orders

  remaining-orders))

(defun SORT-BY-REASON (list-to-sort)
 "Auxiliary Fn for SUMMARIZE-ORDERS.
 Sort list by the FAILED-TEST slot; include FAILED-TEST in the return list."
 (bubble-sort (loop for object in list-to-sort
                    collect (list object (let ((reason (get.value object 'failed-test)))
                                           (if reason
                                               (format nil "Failed in [illegible]" reason)
                                               "Invalid Functional Code?"))))
          #'string[illegible] :key #'second))

(defun ORDER-STATUS ()
 "Prints the rejected/remaining parts and orders; you must run DO-PRE-PROCESSING first."
 (let ((*[illegible]* (inform-stream *results*)))
  (declare (special [illegible]))
   (summarize-orders)
   (terpri)))


 ;;---------------------------------
 ;; SOT/DASH hacking for SOTs
 ;;---------------------------------

(defun SOT-DOTS-TO-DASHES ()
 ; Three regular files with SOT need dots changed. (MJJ 12/17/88 previously only 1 being fixed)
 
 ; Several incremental [illegible] files also have this, so must do conversion after bridge process
 in.
   WARNING: loading incremental bridge after the dash-to-dot conversion could be tricky
 ;; if any matching occurs.  Could FACTORY DATA be changed to use dashes?  Safer...
 (replace-sot-dots-with-dashes 'operations-listing-file)
 (replace-sot-dots-with-dashes 'manufacturing-cells-activity-status-file)      ;; SOT no longer
 used??
 (replace-sot-dots-with-dashes 'manufacturing-cells-operational-schedule-file)) ;; SOT no longer
 used??

(defun REPLACE-SOT-DOTS-WITH-DASHES (class)
 "Replace dots in SOTs with dashes for all members of CLASS."
 (loop for member in (class-members class)
       for SOT = (get.value member 'schedule-operation-type)
       do (put.value member 'schedule-operation-type (replace-dots-with-dashes SOT))))

(defun REPLACE-DOTS-WITH-DASHES (string)
 (unless (member string '(NIL ,*error-token*))
  (substitute #\- #\. string)))

(defun REPLACE-DASHES-WITH-DOTS (string)          ;; Needed by COMMIT code to fix SOTs.
 (unless (member string '(NIL ,*error-token*))
  (substitute #\. #\- string)))


 ;;-------------------------
 ;; CHECK-ACTIVITIES          ;; not a part of CHECKDAT; does it belong anywhere else??
 ;;-------------------------

(defun CHECK-ACTIVITIES ()
 "1. Read in the activities in the manfactv3.dat file and put them in a list.
  2. Read in the activities in the manfopen.dat file and put them in a list.
  3. For each activity in the first list, check to see if that activity
     exists in the second list.  If it does, print out a severe warning!!!"
 (let ((manfactv-list nil)
       (manfopen-list nil))
```

```
;Step 1.
 (with-open-file (s "cos-fcsdata-in;manfactv2.dat")   ; <---------- Replace this with the prop
variable
   (read-line s)                                                                         ; r
ip header
   (loop for line = (subseq (read-line s nil "EOF") 8 16) until (string-equal line "") do
         (if (not (string-equal line "        "))                                        ; a
dd to list
             (setq manfactv-list (append (list (read-from-string line)) manfactv-list)))  ; i
f not all spaces
         (read-line s) (read-line s)))                                                    ; s
kip rest of record
;Step 2.
 (with-open-file (s "cos-fcsdata-in;manfopn.dat")     ; <---------- Replace this with the pro
variable
   (read-line s)                                                                          ; s
kip header
   (loop for line = (subseq (read-line s nil "EOF") 8 16) until (string-equal line "") do
         (if (not (string-equal line "        "))
             (setq manfopn-list (append (list (read-from-string line)) manfopn-list)))
         (read-line s)))                                                                  ; s
kip rest of record
;Step 3.
 (loop for id in manfactv-list do
       (if (member id manfopn-list)
           (format t
"~2%There is an identical activity id in the manfactv2 and manfopn data files~ ~a ~a     ~ould w
ork!!!"
                   id ))))



; -----------------------------------------------------
;     CHECKDAT:  "Checking" Functions and Macros
; -----------------------------------------------------


; In general, note that any changes to these macros will require the whole file
; be recompiled if the changes are to have any effect.


(defvar *check-list* () "Global that is a list of the defined, active tests.")

(defvar *do-actions* nil "Global that indicates whether the discard actions should be done.")


(defmacro CHECK-ITEMS (&key items check else error-header name family
                        inform (description "Every item meets test."))

 "Macro that interprets a DEFCHECK form and runs it, counting items and failures."
 ;; Return is a list of four things: failure-count items-counted test-name test-family.

 `(let ((failure-count 0)   ; Lisp CHECK form; substitute CHECK code for :CHECK in LISP
        (object-count 0)
        (test-name ',name)
        (reason nil))
   (declare (special test-name reason *do-actions*))
   (inform 'summary "~2%Test ~a ~a" ',family ',name)
   (inform 'progress "~2%~d~23T~a~D~a" "Checking to see that:" ,description)
   ,(subst `(progn                ;; substitute this code for the :CHECK keyword.
              (incf object-count)
              (unless ,check
                (when (= failure-count 0)    ;; print header, if first failure.
                  (inform 'discard ,error-header))
                (when (active-inform-mode 'discard) ;; print failure msg
                  ,inform)
                (incf failure-count)          ;; count the failure.
                (when *do-actions* ,else)))  ;; perform failure action, if global enabled.
           :check
           items)
```

```
(if (= failure-count 0)
    `(progn (if (= object-count 0)  ;; If no failures...
                (inform 'warning "~2%~&~23<NO items found for~>Test ~a ~a~%" ',family  ,name

                (inform 'progress "~2%~&~23<Number checked: ~a~>~a~%" object-count ,descripti

            (list 0 object-count ',name ',family))
     (progn (inform 'warning "~2%Test ~a ~a failure count: ~a, out of ~a~%"   ;; OOPS, had f
ures.
                  ',family ',name failure-count object-count )
            (when *do-actions*
              (if ,(not (null else))    ;; check if there's any failure action...
                  (inform 'progress "Failure action: ~a~%" ',else)  ;; notify user.
                  (inform 'progress "No failure action.~%")))
            (list failure-count object-count ',name ',family))))  ;; return test summary.

(defmacro MAKE-CHECK-FUNCTION (&rest keylist)
"Compile a checking function for the given test arguments."
`(compile nil `(lambda () ,(macroexpand `(check-items ,@keylist)))))  ; expand macro.

(defmacro DEFCHECK (name family &rest args )
"User macro for defining a CHECK form, by making it the <family>-CHECK property of the symbol
<family>-<name>.
 The family is normally ESS or FDS."
(let ((test-id `,(intern (format nil "~a{~a-~a}" family name) 'kee)))  ; in ker order such a
; diff family,same name
      (test-family `,(intern (format nil "~a{~a-CHECK}" family) 'kee))) ;make symbol <famil
y>-CHK. ESS-CHECK
  (setf (get test-id test-family)
        ,(macroexpand `(make-check-function (name ,name :family ,family ,@args))))
  (setf (get ,name 'description) ,(second (member :description args)))
  (unless (member test-id *check-list* :test #'eq)
   (setq *check-list* (nreverse (cons test-id (reverse *check-list*)))))
  test-id))  ; return the name of the test.


(defmacro true? (clause failure-reason)
`(or ,clause (not (setq reason ,failure-reason))))


  ------------------------------------------
;       Main CHECKING Function
  ------------------------------------------


(defun PERFORM-CHECKING (&optional (family 'ess) &key menu
                        (check-list *check-list*)  do-actions)

"Run the indicated checks, in the order they are defined.
 Keep track of failures, and inform the user."

; If DO-ACTIONS is T (which it normally is), then perform the ELSE actions for the CHECKS.
; Note that the DISCARD-UNIT action can be undone with RESTORE-UNITS.

(when menu (let ((selections (multiple-choice check-list))) ; if menu non-nil, give a menu
              (setq check-list (if (listp selections) (nreverse selections) nil))))
(when (symbolp check-list) (setq check-list (list check-list))) ; let single test name as arg
.
(unless (consp check-list) (format t "~2%No tests.~%") (return-from perform-checking))
(inform 'stage "~2%Performing ~a checks.~%" family)
(let* ((check-prop (intern (format nil "~a{~a-CHECK}" family) 'kee))
       (*do-actions* do-actions)
       (results (loop for check-name in (remove nil check-list)
                     for check-code = (get check-name check-prop)
                     when check-code   ;; if there's code, run it.
                       collect          ;; and collect the results.
                       (funcall check-code))))
  (declare (special *do-actions*)) ; controls action; reimplement without global?
  (cond ((= (length results) 0) (inform 'warning "~2%No ~a tests found.~2%" family))
        (t (loop for result in results
```

```
          with failures = nil
          with items-tested = nil
          do (when (not (= (first result) 0)) (setq failures t))        ; Keep track of
             (when (not (= (second result) 0)) (setq items-tested t)) ; global results.
          finally
            (return (if failures
                        (progn (inform 'stage
                                       "U2%Caution: There were test failures U
                                       in the Ua set of tests.U2%" family)
                               nil)
                        (if items-tested
                            (progn (inform 'stage "U2%All Ua tests succeeded.U2%" famil

                                   t)
                            (progn (inform 'warning "U2%No items tested with Ua tests.U
family)
                                   nil))))))))


; ---------------------------------------------
;         ES Utility Functions
; ---------------------------------------------


(defun FORMAT-ALL (streams &rest args)
 "Execute FORMAT for each of the streams indicated."
 (let ((string (apply #'format nil args)))
   (dolist (stream streams) (format stream string))))


(defun collect-member-values (class slot)
 (loop for object in (unit.descendants class 'member)
      for value = (get.value object slot)
      when value collect value))


(defun collect-members (class slot value)
 (loop for unit in (unit.descendants class 'member)
      when (equal (get.value unit slot) value)
      collect unit))

; ---------------------------------
;    Fns for Discarding Units
; ---------------------------------


(defun DISCARDED-UNITS (&optional class-or-kb kb)
"Returns a list of the discarded units that were formerly in the indicated class."
 (let* ((class-unit (unit.exists.p
                      (or (and kb (unit.exists.p class-or-kb kb))
                          (and (null kb) (not (kb.exists.p class-or-kb)) class-or-kb))))
       (discard-head (get-discarded-unit-head
                        (or kb (kb.exists.p class-or-kb) class-unit))))
  (unless discard-head (inform 'error "U2%Can't tell which KB you mean for DISCARDED-UNITS.U2%

           (return-from discarded-units nil))
  (loop for unit in (unit.children discard-head 'member)
        when (or (null class-unit)
                 (member class-unit (get.values unit 'ancestors) :test #'eq))
          collect (unit.name unit))))


(defun RESTORE-UNITS (&optional class-or-kb kb
 "Returns the original parents of units that were formerly in the indicated class.
  Returns a list of the units returned.
 (let* ((class-unit (unit.exists.p
                      (or (and kb (unit.exists.p class-or-kb kb))
                          (and (null kb) (not (kb.exists.p class-or-kb)) class-or-kb))))
       (discard-head (get-discarded-unit-head
                       (or kb (kb.exists.p class-or-kb) class-unit))))
  (unless discard-head (inform 'error  "U2%Can't tell which KB you mean for DISCARDED-UNITS.U2
```

```
        (return-from restore-units nil))
  (loop for unit in (unit.children discard-head 'member)
        when (and (or (null class-unit)
                      (member class-unit (get.values unit 'ancestors) :test #'eq))
                  (restore-unit unit))
        collect (unit.name unit))))


(defun DISCARDED-UNIT? (unit)
 (if (unit.exists.p unit) (car (member (get-discarded-unit-head unit) (unit.parents unit 'membe
 ))))


(defun GET-DISCARDED-UNIT-HEAD (unit-or-kb)
 "Determine the parent unit for discarded units, given a KB or a unit within a KB."
 ;; It is always "discarded-units" except for the ORDERS kb, where it is "rejected.orders."
 ;; Return the unit structure, not the name (name may be ambiguous).
 (if (null unit-or-kb) (setq unit-or-kb *factory-kb*))
 (let ((kb (or (kb.exists.p unit-or-kb)
               (and (unit.exists.p unit-or-kb) (unit.kb unit-or-kb)))))
   (unless kb (return-from get-discarded-unit-head nil))
   (or (unit.exists.p 'discarded-units kb)
       (unit.exists.p 'rejected-orders kb)   ; different name in kb ORDERS
       (if (eq kb (kb *order-kb*)) (create.unit 'rejected-orders kb))
       (create.unit 'discarded-units kb))))


(defun DISCARD-UNIT (unit &optional (slot 'failed-test) (value (if (boundp 'test-name) test-name)

 (declare (special test-name))
 "Save the parents of this unit, and then make it a member of DISCARDED-UNITS."
 ; Note that children of this unit become detached along with their parents.
 ; If interrupted, could leave a unit with an improper set of class relationships.
 ; could beef up so recovery more likely.
 (let ((discard-head (get-discarded-unit-head unit)))
   (unless discard-head (inform 'error "~&~%Can't tell which KB you mean for DISCARDED-UNITS.~2%
      [illegible]
     (return-from discard-unit nil))
   (when (unit.exists.p unit)
     (unless (unit.parent.p discard-head unit 'member)   ; don't do if already a member; initial
 [illegible]
       (put.values unit 'parent-member-units (unit.parents unit 'member))   ; check if NIL?
       (put.values unit 'parent-class-units (unit.parents unit 'subclass)) ; check if NIL?
       (put.values unit 'ancestors (append (unit.ancestors unit 'member)
                                           (unit.ancestors unit 'subclass)))
       (when (and slot value) (put.value unit slot value))   ; [illegible]
       (reset.parents unit nil nil 'subclass)
       (reset.parents unit (list discard-head) nil 'member)
       (unit.name unit)))))


(defun RESTORE-UNIT (unit &optional force)
 "Restore the parents of this unit from PARENT slots."
 ; could beef up so recovery more likely if interrupted.  FORCE T may help for now.
 (let ((discard-head (get-discarded-unit-head unit)))
   (unless discard-head (format t "~&~%Can't tell which KB you mean for DISCARDED-UNITS.~2%")
       .   (return-from restore-unit nil))
  (when (unit.exists.p unit)
    (let ((member-parents (get.values unit 'parent-member-units))
    '       (class-parents (get.values unit 'parent-class-units)))
      (cond ((null (or (unit.parent.p discard-head unit 'member) force))
             ' (inform 'warning "~2%~a is not a discarded unit~%" (unit.name unit)) nil)   ; ret
 nil
            ((null (or member-parents class-parents))
             (inform 'debug "~2%~a does not have any parents to restore.~%" (unit.name unit))
      ; return nil
            (t (reset.parents unit member-parents nil 'member)   ; could check to see if unit
 has any other parents.
               (reset.parents unit class-parents nil 'subclass)
               (unit.name unit)))))))
```

```
; ------------------------------------------
;         FIS Utility Functions
; ------------------------------------------

(defun FORMAT-ERROR (record-key has-file has-not-file &optional record)
  "Print the record key and the files that appear to be incorrect."
  (declare (ignore record))
  (format t
          "~%~a~25T~a~16T~a~%~a"
          record-key
          (or (actual-fcs-filename has-file) has-file)
          (format nil "~a" (or (actual-fcs-filename has-not-file) has-not-file)))

              (format nil "Discarded by ~a" (get.value record 'failed-test))    ;     ;
          (if (and (unit.exists.p record)
                   (unit.exists.p 'discarded-units *data-kb*)
                   (unit.ancestor.p (unit 'discarded-units *data-kb*) record 'member)))


(defun NOT-IN-FILE-HEADER (stream &optional alternate-header)
  "Print the header for messages where an FCS data file appears to be in error"
  (format stream
        "~%~a~25T~a~16T~a~%~a~%~a~%~a~16T~a~%~a"
        "RECORD ID" "IS IN FILE" (or alternate-header "BUT FAILED TEST")
        "---------" "----------" "----------------"))

(defun ACTUAL-FCS-FILENAME (file-class-unit)
  "Convert from an FCS Unit to the actual FCS file name"
  (when (unit.exists.p file-class-unit)
    (if (discarded-unit? file-class-unit)   ; work for discarded unit members, for MATCH-...
        (setq file-class-unit (get.value file-class-unit 'parent-member-units)))
    (if (null (classp file-class-unit))
        (setq file-class-unit (car (unit.parents file-class-unit 'member))))
    (let ((path (get.value file-class-unit 'fcs-file-name)))
      (if path (pathname-name path)))))



; ------------------------------------
;         ESS Checks
; ------------------------------------

; The order of the CHECKS is important; the correctness of the results depends
; on the discards of the previous tests.

; The DEFCHECK results in either lisp or TellAndAsk code that loops through the ITEMS
; generated by the ITEMS clause, performing the indicated CHECK clause for each item.
; If the CHECK fails (returns NIL), then the INFORM code is executed.
; If the DO-ACTIONS keyword to perform-checking is non-NIL (which it normally is),
; then the ELSE clause is also executed for each failure.

; By default, the CHECK forms are of type Tell And Ask, and take TAA forms to select
; items and perform the check.  The ELSE fail-action clause is always Lisp code.

; If :type lisp is specified, then the Item selection should be nested Lisp
; LOOP code with the symbol :CHECK put in where the check should be performed.

; Note that no arguments are evaluated; they are used as they appear.

; Formatting could be made neater, more general by using a version of FORMAT-VALUES
; that took a MSG arg.


(defcheck MACHINE-SLOTS ESS
  :description "Every machine has valid slot values."
  :items (loop for machine in (unit.descendants 'machines 'member)
               do
               (loop for slot in    ;; WARNING: which of these actually need to be tested?
                     '(;;acceptable-proximity-of-operation-to-completion          ; called is a
thing, now.
```

```
            ;;max-window-increments-for-dedication percentage-of-fit
            ;; percentage-of-fit-for-batching   ; not using anymore  9/15/88 mjb
            ;;setup-process-percent-to-batch
            ;;window-span window-span-for-batching
            ;
        for values = (get.values machine slot)
        for value = (car values)
        do !check))
:check (if (eq slot 'callid)
          (and (stringp value) (= (length value) 7))
          (and (listp values) (= (length values) 1) (integerp value)))
:else   (discard-unit machine)  ; discarding for now; note! must restore before saving KB.
:inform (progn (format t "[illegible]"
                 (unit.name machine) slot values))
:error-header (format nil "[illegible]
                 [illegible]"))

(defcheck OPERATIONS-SLOTS ESS
:description "Every operation has valid slot values."
:items  (loop for operation in (unit.descendants 'operations 'member)
          do (loop for slot in '(cycle-time preferred-machines [illegible]
                                 [illegible]-for-operation safety-stock [illegible]
[illegible]-times
                 for values = (get.values operation slot)
                 do !check))
:check  (check-operation-slots operation slot)
:else   (discard-unit operation)
:inform (format t "[illegible]"
                 (unit.name operation) slot values)
:error-header (format nil "[illegible]
                 [illegible]"))

(defcheck OP-HAS-MACHINES ESS
:description "Every operation has valid machines associated with it."
:items  (loop for operation in (class-members 'operations)
          for preferred-machines = (get.value operation 'preferred-machines)
          do !check)
:check  (every #'(lambda (machine) (unit.ancestor.p 'machines machine 'member))
          preferred-machines)
:else   (discard-unit operation)
:inform (format t "[illegible]" (unit.name operation) preferred-machines)
:error-header (format nil "[illegible]Operation[illegible]Bad Machine Spec List[illegible]
                 [illegible]"))

(defcheck PART-HAS-ROUTING ESS
:description "Every part has a routing."
:items  (loop for part in (class-members 'parts)
          for routing = (get.value part 'routing)
          do !check)
:check  (not (null routing))
:else   (discard-unit part)
:inform (format t "[illegible]" (unit.name part))
:error-header (format nil "[illegible]Part without Routing[illegible]
                 [illegible]"))

(defcheck ROUTING-HAS-OPS ESS
:description "Every routing uses valid operations."
:items  (loop for part in (class-members 'parts)
          for routing = (get.value part 'routing)
          when routing do !check)
:check  (every #'(lambda (operation) (unit.ancestor.p 'operations operation 'member))
          routing)
:else   (discard-unit part)
:inform (format t "[illegible]"
          (unit.name part) (if (listp routing) routing (cons routing nil)))
:error-header (format nil "[illegible]Part name[illegible]Bad Routing List[illegible]
                 [illegible]"))


[illegible]ed to get slot right first.
```

```
:fcheck ASM-REQ-PARTS-EXIST ESS                     ; This is specific to SAGINAW. We do not need
 to see if
                                                    ; other assemblies use a deleted asm, since they
 aren't at Saginaw.
                                                    ; Also, only the last op in an ASM is an asm
 at Saginaw.
 If components are considered ASMs, then the last op may not be an asm op.

:description "For every assembly, the required parts exist."

:items  (loop for asm-part in (unit.descendants 'assemblies 'member)
              for asm-op = (car (last (get.value asm-part 'routing)))
              for req-part-list = (if (unit.exists.p asm-op)
                                      (get.value asm-op 'required-productive-parts)) ; assume
 part list has unit names?
              with bad-part
              when (member (unit.name asm-part) req-part-list :test #'eq
                          :key #'(lambda (entry) (unit.name (car entry))))
              do :check)
:check  (every #'(lambda (req-part)
                   (if (unit.ancestor.p 'parts (car req-part) 'member)
                       t
                       (progn (setq bad-part req-part) nil)))
               (remove (unit.name asm-part) req-part-list :test #'eq
                       :key #'(lambda (entry) (unit.name (car entry)))))
:else   (discard-unit asm-part)
:inform  (format t "~%~25a~a~a"
                   (unit.name asm-part) (if (unit.exists.p bad-part) (unit.name bad-part) bad-
 part))
:error-header (format nil "~2%~25a Assembly Name~Missing Part~
                           ~%~25a--------------~-------------"))


:fcheck ORDER-WITHIN-HORIZON ESS
:description "Every order is due within the schedule horizon."
:items  (loop for order-record in (unit.descendants 'net-order-demand-orders 'member)
              for due-date = (string-to-utime (get.value order-record 'date/time-due))
              for quantity = (get.value order-record 'netted-quantity)
              with horizon-end = (get.value 'control-unit 'horizon-end)
              do :check)
:check  (<= due-date horizon-end)
:else   (discard-unit order-record)   ; need to handle an alternate discarded-units unit: rejec
 ted-orders
:inform  (format t "~%~30a~a~%~25a~a~%~8a~a"
                   (unit.name order-record) (utime-to-string due-date) quantity)
:error-header (format nil "~2%~30a Order Name~%~25a Late Due Date~%~10a Quantity~%~
                           ~%~30a-----------~%~25a--------------~%~10a---------~%"))



:fcheck ORDER-FOR-VALID-PART ESS
:description "Every order references a valid part."
:items  (loop for order-record in (unit.descendants 'net-order-demand-orders 'member)
              for order-table = (car (get.value order-record 'order-table)) ; table is a list
 a list.
              for ordered-part = (first order-table)   ; must get complete routing even if par
 is partial.
              do :check)
:check  (unit.ancestor.p 'parts ordered-part 'member)
:else   (discard-unit order-record)   ; need to handle an alternate discarded-units unit: reje
 ted-orders
:inform  (format t "~%~25a~a~a" (unit.name order-record)
                   (if (unit.exists.p ordered-part) (unit.name ordered-part) ordered-part))
:error-header (format nil "~2%~25a Order Name~Rejected Part~
                           ~%~25a-----------~--------------"))


 ------------------------
   Slot-checking Fns
 ------------------------
```

```
; A more generalized version of DATA-TYPE in the SLOT-FORMAT entry for Slot-Translation Descri
ns
 could probably take over for more of this code.   1/6/89 MJJ

(defun CHECK-OPERATION-SLOTS (operation slot)  ; class.member.p --> unknown; use unit.parent.p
 "Given a slot for an operation, check it carefully for well-formedness and correct values."
 (let* ((values (get.values operation slot))
       (value (car values)))
  (and (case slot
         ((eligible-machines preferred-machines safety-stock safety-stock-used setup-times pos
ble-machines)
          (listp values))  ; zero or more values.
         (t (and (listp values) (= (length values) 1))))
       (case slot
        (cycle-time  ; list of items
          (check-value-list value '((or (null x) (unit.ancestor.p 'machines x 'member))  ; at
east at Saginaw
                                    (integerp x)) ; we should pick one type.
                            :min-number-values 1))
        (lead-time-for-operation
          (check-value-list value '((or (null x) (unit.ancestor.p 'machines x 'member))
                                    (integerp x)) ; duration in seconds.
                            :min-number-values 1))
        (preferred-machines
         (check-value-list values '((unit.ancestor.p 'machines x 'member))
                          :min-value-length 1    ; must have at least 1 machine.
                          :reuse-last-pred t :min-number-values 1))
        (possible-machine-class (or (null values)
                                    (and (unit.exists.p value)
                                         (unit.ancestor.p 'machines value 'subclass))))
        (safety-stock
          (check-value-list values '((integerp x)
                                     (integerp x)))
                            ;  :min-number-values 1
        (setup-times
          (check-value-list values '((or (unit.ancestor.p 'machines x 'member) (null x))
                                     (or (unit.ancestor.p 'machines x 'member) (null x))
                                     (or (unit.ancestor.p 'machines x 'member) (null x))
                                     (integerp x)))
                            ; :min-number-values 1
          )))))


(defun CHECK-VALUE-LIST (value-list pred-list &key
                        number-values
                        min-number-values
                        max-number-values
                        value-length
                        (min-value-length (length pred-list))
                        max-value-length
                        reuse-last-pred)
 "Interprets input as a list of values, checking to see that the elements of each value
 (the value must be a list) satisfy the corresponding element predicate in the predicate
 list. Predicates should use X for the element in the value."

 ; consider fixing so can use with a straight list of values that aren't themselves lists.

 (let* ((len-pred (length pred-list))      ; if not list, applies to all??
       (len-values (when (listp value-list) (length value-list)))
       (last-pred (car (last pred-list))))
  (and (listp value-list)
       (if number-values (= len-values number-values) t)
       (if min-number-values (>= len-values min-number-values) t)
       (if max-number-values (<= len-values max-number-values) t)
       (every #'(lambda (value)
                  (let ((len-value (when (listp value) (length value))))
                    (and (listp value)
                         (if value-length (= len-value value-length) t)
                         (if min-value-length (>= len-value min-value-length) t)
                         (if max-value-length (<= len-value max-value-length) t)
```

```
                  (every #'apply-pred value pred-list)
                  (if (> len-value len-pred)
                      (if reuse-last-pred
                          (every #'(lambda (x) (apply-pred x last-pred))
                                 (nthcdr len-pred value))
                          nil)
                      t))))
          value-list))))

(defun APPLY-PRED (x pred)
 "Auxilary function to CHECK-VALUE-LIST.  Binds X and then EVALs predicate."
 (declare (special x)) (eval pred))



   ------------------------------
;          FDS Checks
   ------------------------------

   See notes under ESS checks, above.  Note that the order the tests appear
   in is important -- some tests depend on previous tests having discarded
;  records that failed those tests.


(check OP-IN-ROUTING FDS

 :description "Every operation is in a routing."

 :items  (loop for op-record in (unit.descendants 'operations-listing-file 'member)
               for op-name = (get.value op-record 'operation-name)
               with route-op-names = (loop for route-record in (unit.descendants 'routings-file
'member)
                                            for to-op-name = (get.value route-record 'to-operat
ion)
                                            for from-op-name = (get.value route-record 'from-ope
ration-name)
                                            when to-op-name collect to-op-name into result
                                            when from-op-name collect from-op-name into result
                                            finally (return (remove nil result)))

               do :check)

 :check   (member op-name route-op-names :test #'string=)
 :else    (discard-unit op-record)
 :inform  (format-error op-name 'operations-listing-file test-name op-record)
 :error-header (not-in-file-header nil))


(check OP-HAS-MACHINE FDS

 :description "Every operation is assigned to at least one machine."

 :items  (loop for op-record in (unit.descendants 'operations-listing-file 'member)
               for op-name = (get.value op-record 'operation-name)
               with legal-cells = (collect-member-values 'machines 'cell-id)
               with op-names-with-legal-cells = (loop for op-machine-record
                                                       in (unit.descendants 'operations-facility
-machines-file 'member)
                                                       for cell.name = (get.value op-machine-rec
 'cell-name)
                                                       when (member cell.name legal-cells :test
string=)
                                                       collect (get.value op-machine-record 'ope
ration-name))
               do :check)
 :check  (member op-name op-names-with-legal-cells :test #'string=)
 :else   (discard-unit op-record)
 :inform  (format-error op-name 'operations-listing-file test-name op-record)
 :error-header (not-in-file-header nil))
```

```
(fcheck OP-HAS-OUTPUT-PART FCS                    ; circularity: don't know yet if part is really va
id.   Note that an
                                                  ; op may also have some invalid output parts, but
 least 1 is valid.

:description "Every operation has at least one output part."

:items (loop for op-record in (unit.descendants 'operations-listing-file 'member)
             for op-name = (get.value op-record 'operation-name)
             with valid-op-output-names = (loop for op-out-record in (unit.descendants 'output
unit-from-operations-file
                                                                                        'member
                                                     with valid-parts = (collect-member-values 'pro
ctive-parts-listing-file
                                                                                           'fun
ctional-code) ;restrict to M?
                                                     when (member (get.value op-out-record 'functio
l-code)
                                                                valid-parts :test #'string=)
                                                     collect (get.value op-out-record 'operation-na
e))
             do :check)
:check (member op-name valid-op-output-names :test #'string=)
:else  (discard-unit op-record)      ; output-parts-from-operations-file
:inform  (format-error op-name 'operations-listing-file test-name op-record)
:error-header (not-in-file-header nil))


(fcheck OP-HAS-INPUT-PART FCS                     ; circularity: don't know yet if part is really
alid.

:description "Every operation has at least one input part."

:items (loop for op-record in (unit.descendants 'operations-listing-file 'member)
             for op-name = (get.value op-record 'operation-name)
             with valid-op-input-names = (loop for op-out-record in (unit.descendants 'input-o
ut-from-operations-file
                                                                                        'member
                                                     with valid-parts = (collect-member-values 'pro
ctive-parts-listing-file
                                                                                           'fun
ctional-code) ;restrict to M?
                                                     when (member (get.value op-out-record 'functio
l-code)
                                                                valid-parts :test #'string=)
                                                     collect (get.value op-out-record 'operation-na
e))
             do :check)
:check (member op-name valid-op-input-names :test #'string=)
:else  (discard-unit op-record)      ; output-parts-from-operations-file
:inform  (format-error op-name 'operations-listing-file test-name op-record)
:error-header (not-in-file-header nil))


(fcheck ROUTING-HAS-OP FCS

:description "Every routing references only valid operations."

:items  (loop for route-record in (unit.descendants 'routings-file 'member)
              for route-name = (get.value route-record 'routing-name)
              for to-name = (get.value route-record 'to-operation-name)
              for from-name = (get.value route-record 'from-operation-name)
              for rank = (get.value route-record 'rank)
              with op-names = (collect-member-values 'operations-listing-file 'operation-name)
              do :check)
:check  (and (true? (string= rank "01")
                    (format nil "Not primary route: Rank ~A" rank))
             (true? (or (string-equal "999" (subseq to-name 12 15))
                        (member to-name op-names :test #'string=))
```

```
(true? (member op op-names :test # string=)
                    (discard-msg? 'linked-op 'operations-listing-file 'o
ration-name op)))
          linked-set)
     (true? (member "000" linked-set
               :test #'(lambda (x y) (string= x (subseq (get.value y 'from-operat
-name) 12 15))))
          (format nil "Does not have an initial 0"000" operation."))
     (true? (member "999" linked-set
               :test #'(lambda (x y) (string= x (subseq (get.value y 'to-operatio
name) 12 15))))
          (format nil "Does not have a final 0"999" operation.")))
:else  (discard-unit route-record)  ; discard everything in linked-set??
:inform  (format-error route-name 'routings-file reason route-record)
:error-header (not-in-file-header nil "FAILURE REASON"))


;-------------------
;  Routing Aux Fns
;-------------------

(defun COMPUTE-LINKED-SET (route-record)   ; misses circular routings.
 (let ((route-list (remove route-record (unit.descendants 'routings-file 'member)))
      (from-op (get.value route-record 'from-operation-name))
      (to-op (get.value route-record 'to-operation-name)))
  (remove-duplicates (append (list route-record)
                     (get-route-predecessors route-list from-op)
                     (get-route-successors route-list to-op)))))
```

```
(fun GET-ROUTE-PREDECESSORS (route-list from-op)
 loop for route in route-list
      for to-op = (get.value route 'to-operation-name)
      when (string= to-op from-op)
      append (cons route (get-route-predecessors route-list (get.value route 'from-operation-n
ame)))))

(fun GET-ROUTE-SUCCESSORS (route-list to-op)
 loop for route in route-list
      for from-op = (get.value route 'from-operation-name)
      when (string= from-op to-op)
      append (cons route (get-route-successors route-list (get.value route 'to-operation-nam...

---------------------

(check OP-IN-ROUTING-RETEST FOS

description "Every operation is in a routing."

items  (loop for op-record in (unit.descendants 'operations-listing-file 'member)
             for op-name = (get.value op-record 'operation-name)
             with route-op-names = (loop for route-record in (unit.descendants 'routings-file
ember)
                                         for to-op-name = (get.value route-record 'to-operati
-name)
                                         for from-op-name = (get.value route-record 'from-ope
tion-name)
                                         when to-op-name collect to-op-name into result
                                         when from-op-name collect from-op-name into result
                                         finally (return (remove nil result)))

             do :check)

check  (member op-name route-op-names :test #'string=)
else   (discard-unit op-record)
inform  (format-error op-name 'operations-listing-file test-name op-record)
error-header (not-in-file-header nil))


(check PART-LINKED-TO-OPS FOS

description "Every part is input or output from an operation."

items  (loop for part-record in (unit.descendants 'productive-parts-listing-file 'member)
             for part-name = (get.value part-record 'functional-code)
             with io-part-records = (append (unit.descendants 'output-parts-from-operations-f
e 'member)
                                            (unit.descendants 'input-parts-to-operations-fil
member))
             with op-names = (collect-member-values 'operations-listing-file 'operation-name)
             do :check)
check  (some #'(lambda (io-part) (and (string= part-name (get.value io-part 'functional-code))
                                  (member (get.value io-part 'operation-name) op-names :t
t #'string=)))
             io-part-records)
else  (discard-unit part-record)
 inform  (format-error part-name 'productive-parts-listing-file ; output-parts-from-operation
-file
                       test-name
                       part-record)
error-header (not-in-file-header nil))


(check RESOURCE-INPUT-TO-OP FOS

description "Every resource is input to a valid operation."
```

```
:items  (loop for resource-record in (unit.descendants 'other-resources-listing-file 'member)
              for resource-name = (get.value resource-record 'functional-code)
              with resources-used-records = (unit.descendants 'other-resources-used-in-operati
n-file 'member)
              with op-names = (collect-member-values 'operations-listing-file 'operation-name)
              do :check)
:check  (some #'(lambda (resources-used-record)
                  (and (string= resource-name (get.value resources-used-record 'functional-cod
.
                      (member (get.value resources-used-record 'operation-name) op-names :tes
t #'string=)))
              resources-used-records)
:else  (discard-unit resource-record)
:inform  (format-error resource-name 'other-resources-listing-file
                      test-name
                      resource-record)
:error-header (not-in-file-header nil))
(fcheck INVENTORY-IS-VALID-PART FOS

:description "Every inventory part is valid."

:items  (loop for inv-record in (unit.descendants 'productive-part-inventory-file 'member)
              for inv-name = (get.value inv-record 'functional-code)
              with part-names = (collect-member-values 'productive-parts-listing-file 'functio
nal-code)
              do :check)
:check  (member inv-name part-names :test #'string=)
:else   (discard-unit inv-record)
:inform  (format-error inv-name 'productive-part-inventory-file test-name inv-record)
:error-header (not-in-file-header nil))


(fcheck INVENTORY-IS-VALID-RESOURCE FOS

:description "Every inventory resource item is valid."

:items  (loop for inv-record in (unit.descendants 'non-productive-part-inventory-file 'member)
              for inv-name = (get.value inv-record 'functional-code)
              with part-names = (collect-member-values 'other-resources-used-in-operations-fil
 functional-code)
              do :check)
:check  (member inv-name part-names :test #'string=)
:else   (discard-unit inv-record)
:inform  (format-error inv-name 'non-productive-part-inventory-file test-name inv-record)
:error-header (not-in-file-header nil))


(fcheck RECEIPT-IS-VALID-PART FOS

:description "All expected receipts are for valid parts."

:items  (loop for receipt-record in (unit.descendants 'not-confirmed-expected-receipts-file 'm
ember)
              for receipt-name = (get.value receipt-record 'functional-code)
              with part-names = (append
                                 (collect-member-values 'other-resources-used-in-operations-f
e 'functional-code)
                                 (collect-member-values 'productive-parts-listing-file 'funct
ional-code))
              do :check)
:check  (member receipt-name part-names :test #'string=)
:else   (discard-unit receipt-record)
:inform  (format-error receipt-name 'not-confirmed-expected-receipts-file test-name receipt-rec
ord)
:error-header (not-in-file-header nil))


(fcheck PM-HAS-MACHINE FOS
```

```
:description "Every PM references a valid machine."

:items  (loop for pm-record in (unit.descendants 'pm-bill-of-materials-file 'member)
              for pm-name = (get.value pm-record 'pm-code)
              for cell-name = (get.value pm-record 'cell-name)
              with legal-cells = (collect-member-values 'machines 'cellid)
              do :check)
:check  (member cell-name legal-cells :test #'string=)
:else   (discard-unit pm-record)
:inform  (format-error pm-name 'pm-bill-of-materials-file test-name pm-record
:error-header (not-in-file-header nil))


(check CLEANUP-OF-FACILITY-PREF FOS

:description "Every operation and machine is valid for facility preference."

:items  (loop for pref-record in (unit.descendants 'operations-facility-preferences-file 'mem

              for op-name = (get.value pref-record 'operation-name)
              for cell-name = (get.value pref-record 'cell-name)
              with legal-ops = (collect-member-values 'operations-listing-file 'operation-nam

              with legal-cells = (collect-member-values 'machines 'cellid)  ; or use FOS data?

              do :check)
:check  (and (member op-name legal-ops :test #'string=)
             (member cell-name legal-cells :test #'string=))
:else   (discard-unit pref-record)
:inform  (format-error op-name 'operations-facility-preferences-file test-name pref-record
:error-header (not-in-file-header nil))


    ----------------------------------------------
           DATA SEARCH FUNCTIONS                    ;; DEBUGGING AID ONLY
    ----------------------------------------------


 ;Debugging Aid: FIND-DATA prints out a table of the file records found that
 match the input, which may be a symbol or string.   Will also find discarded
 records, marking them with an asterix in column one.

 (find-data '19sp)

 Number of records found: 14

 RTNG                1  RTE 26000261-MF-999.001.001  FRM 26000261-MF-000.001   TO 26000261-MF-010
 11 .
 RTNG                2  RTE 26000261-MF-999.001.001  FRM 26000261-MF-010.001   TO 26000261-MF-020
 1
 RTNG                3  RTE 26000261-MF-999.001.001  FRM 26000261-MF-020.001   TO 26000261-MF-999

 PROD-PART-LIST  48   FC 07849899-MA-999.001        SFT 19SP
 PROD-PART-LIST  49   FC 26000261-MF-010.001        SFT 19FX
 PROD-PART-LIST  50   FC 26000261-MF-999.001        SFT 19FX
 OPRN-OUTT-PART  23   OP 26000261-MF-010.001         FC 26000261-MF-010.001
 OPRN-OUTT-PART  24   OP 26000261-MF-020.001         FC 26000261-MF-999.001
 OPRN-LIST       24   OP 26000261-MF-010.001        SCT ASSEMBLY2
 OPRN-LIST     . 25   OP 26000261-MF-020.001        SCT ASSEMBLY2
 OPRN-FAC-RANK   32   OP 26000261-MF-010.001       CELL 8014
 OPRN-FAC-RANK . 33   OP 26000261-MF-020.001       CELL 8014
 OPRN-INPT-PART  25   OP 26000261-MF-010.001         FC 07849899-MA-999.001
 OPRN-INPT-PART  26   OP 26000261-MF-020.001         FC 26000261-MF-010.001


 NOTE: an asterix in column one means the unit has been discarded.


 ; ------------------------
```

```
; FIND-DATA: USER-LEVEL
; -------------------------


(defun FIND-DATA (datum)
 "Given a symbol or string, try to locate relevant FCS data records."

 ;; (find-data "07849391-MA-999.Ou1")
 ;; (find-data '19sp)

 (let* ((unit (find-unit datum))
        (matches (remove-duplicates
                    (match-on-name (or (if unit (get.value unit 'translation))  ; start with the
 slot if available.
                                       (if unit (symbol-to-names unit))          ; Get possible s
tings: "19SP      "
                                       (symbol-to-names datum)                   ; Try possible s
rings on raw data.
                                       (list datum)))
                    :test #'equal)))
   (cond (matches (setq matches (sort matches #'< :key #'third))
                  (format t "U2%Number of records found: UaU%" (length matches))
                  (format t "U%U:a^aU&15<UaU>U+U4<Ua U>U&^U&15<Ua U>U24<UaU>UaU
                            UUUaUE<Ua U>U20&<UaU>UaUUUaUE<Ua U>U20&<UaU>UaUaUXUaUX" matches))
         (unit (format t "U2%Could only find the unit Ua in KB Ua.U%" (unit.name unit) (unit.kb
 e unit)))
         (t (format t "U2%Cannot find data for Ua.U%" datum)))))


(defparameter *exclude-matching* '(cell SRT SOT)   ; otherwise, get end up eventually chaining t
 everything.
 "Nameslot abbreviations that will not be chained on by MATCH-ON-NAME to find other records.")


(defparameter *class-nameslot-alist*
          '((operations-listing-file operation-name schedule-operation-type)
            (productive-parts-listing-file functional-code schedule-resource-type)
            (routings-file routing-name from-operation-name to-operation-name)
            (operations-facility-preferences-file operation-name cell-name)
            (input-parts-to-operations-file operation-name functional-code)
            (output-parts-from-operations-file operation-name functional-code)
            ; (pm-bill-of-materials-file pm-code cell-name)
            (other-resources-listing-file functional-code schedule-resource-type)
            ; (other-resources-used-in-ops-file functional-code schedule-resource-type)  ;
 name right?
            (non-productive-part-inventory-file functional-code)
            ; (productive-part-inventory-file functional-code)  ; usually too big to include
 conveniently.
            ; (cell-state-status-file cell-name)
            (pm-context-file pm-code)
            (net-order-demand-file output-part-name original-customer-order)
            (net-confirmed-expected-receipts-file functional-code)
            ((discarded-units fcs) functional-code operation-name original-customer-order pm
code
                                   schedule-resource-type from-operation-name to-operation-name ce
-name
                                   output-part-name original-customer-order)
            (rejected-orders functional-code output-part-name original-customer-order)  ; no
all necessary?
            ; ((discarded-units axle) ; what might we look for??
            ))

(defparameter *abbrev-nameslot-alist*                    ; Manually maintained list of nameslot info.
          '((operation-name op 19)
            (to-operation-name to 19)
            (from-operation-name frm 19)
            (output-part-name OPD 19)
            (original-customer-order ORD 19)
            (schedule-operation-type SOT 12)
            (functional-code FC 19)
            (schedule-resource-type SRT 10)
```

```
(routing-name rte 23)
(pm-code pm 19)
(cell-name cell 7)))


(defun SYMBOL-TO-NAMES (symbol &optional type)
"Return a list of strings that are right-padded to be possible FCS names made from the given s
ol (or string)."

 Examples:  (symbol-to-names '19sp)          -->  ("19SP          " "19SP        " "19SP    ")
            (symbol-to-names '19sp 'srt)  -->  ("19SP        ")

(or (loop for entry in *abbrev-nameslot-alist*
          for name-len = (third entry)
          with sym-len = (length (string symbol))
          when  (and (<= sym-len name-len)
                     (if type
                         (member type entry)
                         [illegible] (< sym-len 19)))  ; only symbols shorter than [illegible]
[illegible] OPT SOT CELL
          collect (format nil [illegible] (or name-len 3) symbol))
    (list (string symbol))))


(defun MATCH-ON-NAME (names &optional already-examined)
"Does the work to find nameslots whose values match the input list of names.
 [illegible] in the same record."
 (let (match-return next-names)
  (when (null names) (return-from match-on-name (values nil already-examined)))
  (setq already-examined (union already-examined names :test #'equal))
  (loop for entry in *class-nameslot-alist*
        for class = (car entry)
        for slots = (cdr entry)
        for fcs-filename = (actual-fcs-filename class)
        do
        (loop for name in (remove-duplicates names :test #'equal)
              do
              (loop for slot in slots
                    for records = (if (= (length name) (or (third (assoc slot *abbrev-nameslot
 ists*))
                                                           -1))
                                      (collect-members class slot name))      ; only loop if n
 match.
                    do
                    (loop for record in records
                          do
                          (let* ((name-list (fast-find-names (unit.name record)))
                                 (new-names (loop for entry in name-list
                                                  when (not (member (car entry) *exclude-match
 g*))
                                                  collect (second entry)))
                                 (candidates (set-difference new-names already-examined :test
 equal)))
                            (setq next-names (append candidates next-names))
                            (push (list (if (discarded-unit? record) "*" " ")
                                        (or fcs-filename (actual-fcs-filename record))  ; wor
 with discarded units.
                                        (get.value record 'record-sequence)
                                        (let* ((rec-name (string (unit.name record)))
                                               (pos (position #\- rec-name :from-end t)))
                                          (if pos (subseq rec-name (1+ pos)) " "))
                                        name-list)
                                  match-return)))))
        finally (return (append (match-on-name next-names already-examined) match-return)))))


(defun FAST-FIND-NAMES (unit)
 (when (unit.exists.p unit)
   (loop for parent in (if (discarded-unit? unit)
                          (get.values unit 'ancestors)
                          (unit.ancestors unit 'member))
```

```
for name-slots = (cdr (assoc (unit.name parent) *class-nameslot-alist*))
when name-slots
append (loop for name-slot in name-slots
             for name = (get.value unit name-slot)
             collect (list (second (assoc name-slot *abbrev-nameslot-alist*))
                           name)))))


(defun FIND-NAME (&rest name-pieces-or-unit)
 "Given a spec for a unit, find the name slots of that unit."
 (let* ((unit (apply #'find-unit name-pieces-or-unit))
       (name-pairs (if unit
                       (loop for parent in (if (member (unit.name unit) (discarded-units (unit
 unit)))

                                                (get.values unit 'ancestors)
                                                (unit.ancestors unit 'member))
                             for name-slots = (cdr (assoc (unit.name parent) *class-nameslot-a
st*))

                             when name-slots
                             append (loop for name-slot in name-slots
                                          for name = (get.value unit name-slot)
                                          collect (list (second (assoc name-slot *abbrev-names
t-alist*)) name))))))
  (cond (name-pairs)
        (unit (format t "U2%Cannot find a name for object UsU%" unit) nil)
        (t nil))))


(defun FIND-UNIT (&rest name-pieces)
 (setq name-pieces (loop for piece in name-pieces collect (if (unit.exists.p piece) (unit.name
 u) piece)))
 (let* ((symbols (loop for piece in name-pieces
                      for symbol = (typecase piece
                                     (string (intern (string-trim '(#\space) (string-upcase pi
e)) 'kee))
                                     (symbol piece)
                                     (t (format t "U2%Object Us not a string or symbolU%" pie
 nil))
                      when symbol collect symbol))
       (units (if (and (= 1 (length symbols)) (unit.exists.p (car symbols) nil t)) (list (unit
car symbols)))))
       (stream nil))
  (unless units
   (and symbols
       (let ((sets (loop for symbol in symbols
                         for units = (unerels.unit symbol (list *factory-kb* *data-
order-kb*)
                                            (if (eq symbol (car symbols))
                                                'left 'apropos))
                         when units collect (loop for unit in units collect (unit un
)))))
         (when sets (setq units (reduce #'intersection sets))))))
  (cond (units (format stream "U%")
              (dolist (unit units)
                (format stream "Object Ua is a member of UäUa Uain Ua.U%" (unit.exists.p unit

                    (mapcar #'unit.name (unit.parents unit 'member)) (unit.kbname unit)))

              (car units))
        (t (format stream "U2%Cannot find a unit for name piecesUä UsUäU%" name-pieces) nil))))
 -*- Mode:Lisp; Package:KEE; Syntax: Common-lisp; Fonts:(cptfont HL10B cptfont HL12B HL12BI);
se:10 -*-


;  Generate output files from ESE that function as input files for FCS.  1988, Mark Jeffery.

;  The main user level function is WRITE-COMMIT-FILES, used as follows:

  (write-commit-files)                          ; write all commit files;
                                                ; this is the normal use.
```

```
;  Commit Files: cellactv  shipsonc  cellrsrc  expdrcpt  newwrqmt
;                Only the first 2 are functional, as of 10/4/88.

;                Dummy headers are output for files not yet implemented.
;                A list of record sizes called *record-size-alist* is MANUALLY
;                maintained for this purpose.

;  Other Uses:  (write-commit-files '(schedule activity))  ; write just two commit files.
;               (write-commit-files 'activity)             ; write just one commit file.
;               (write-commit-files 'cellactv)             ; specify FCS name if desired.
;               (write-commit-files 'activity :screen-only t) ; write 1 file, only to screen.
;               (write-commit-files nil :screen-only t)       ; write all files only to screen

;               (write-commit-files nil :commit-dir "foo:bar;")  ; specify a write directory.


;  Error msgs:  If any value for a commit file cannot be calculated, the NULL value NIL
;               is generated; if a record is larger than it should be, that is also an error.
;               WRITE-COMMIT-FILES will report back if any such NULLs appear, indicating
;               what field(s) were NULL.  If a record is too large, the message
;               "SOME FIELD IS OVER-SIZED" will result.  In either case, the commit files
;               should not actually be sent to the FCS.  There is either a bug or
;               unanticipated situation when a NULL or over-sized field appears, and it
;               should be corrected.

;  Activity Counter: The variable *commit-activity-counter* is used for generating
;               Unique IDs -- its value is saved automatically in a file in the
;               commit directory (give it its own dir instead?) when a cell activity commit
;               file is written.  (It is NOT saved when the file is written only to the screen


;               Care must be taken that the acitivity counter file is NOT deleted.
;               The activity counter file is loaded automatically the first time in a session
;               that a cell activity file is generated.

;               When a cell activity commit file is generated, any events that don't have
;               unique IDs are assigned one.  Thus writing the commit file over and over for
;               the same scheduling run will not change the output, but it will cause the
;               activity counter to be incremented and saved each time.

;               RECOVERY when the COUNTER FILE is ACCIDENTALLY DELETED: execute the forms
;                       (setq *commit-activity-counter* <value>)
;                       (write-commit-activity-counter)
;               where <value> is an integer that is bigger than the value from the previous ru

;               remembering that if you reach 99, then you have to start again at 1.
;               Zero is not considered legal.

;  Formatting:  Numbers are right-justified; everything else is left-justified.
;               Each output records is broken into as many 80 character lines as
;               are required to hold the record.   Each line is followed by a <NEWLINE> char;

;               any line less than 80 characters is padded with spaces to bring it up
;               to 80 characters.

;  Limitations: A maximum of 6999 events (excluding PMs) can be scheduled in any one run of
;               the scheduler, due to the necessity of generating a unique ID for each event.

;               A maximum of 3000 Planned maintenances can occur in one
;               run, again due to the unique ID requirement.

;               A maximum of 99 runs can be done before the unique IDs start to overlap;
;               thus no event should remain in the system for more than 99 runs.

;               The total number of events plus planned maintenances can be traded-off; the
;               system could be set up so that the limit is that the total of the two
;               cannot be more than 9999.


;  You can cause the output to go to the screen, to a file, or both -- see the
;  keywords for WRITE-COMMIT-FILES.  Normally, output goes just to the file.
```

```
; SETQ *NO-NILS-ALLOWED* to T if you want only records with no NILs in them.
; By default NILs are allowed, since they indicate some sort of error elsewhere.

n-package 'kee)

efparameter *commit-extension* "lisp")

efparameter *commit-file-types* '(cellactv cellrsrc expdrcpt newwrqmt shipschd))

efvar *commit-activity-counter* 0) ; saved by fn write-commit-activity-counter.
Must increment a counter modulo 100 for each run, and have another two digits for the route nu
er.

efvar *pm-counter* 7000)           ; reset to 7000 each time activity counter is incremented.
                                   ; Used to keep track of preventive maintenance.

efvar *last-commit-activity-counter-initialization* (get-universal-time))

efvar *initialization-source* "Program Load")

efvar *commit-results* nil)

efparameter *record-size-alist*              ; This list is MANUALLY maintained.
          '((cellactv 120) (activity 120)
            (cellrsrc 140) (resource 140)
            (expdrcpt 87)  (receipts 87)
            (newwrqmt 52)  (requirements 52)
            (shipschd 140) (schedule 140))
"Alist of commit-file-type and their total record sizes.  Used for making dummy headers.")


; --------------------------------
;        Main Function
; --------------------------------

efun WRITE-COMMIT-FILES (&optional (commit-file-types *commit-file-types*) &key
                        screen-only
                        (screen-as-well nil)      ; default: file only.
                        (commit-dir *commit-dir*)
                        run-number)

"Write the output (&"Commit&") files from ESS for use by FCS."

(setq commit-file-types (cond ((null commit-file-types) *commit-file-types*)
                              ((symbolp commit-file-types) '(,commit-file-types))
                              (t commit-file-types)))
(let* ((bad-setups (check-setups)))
(when run-number
  (setq *commit-activity-counter* (round run-number))
  (setq *last-commit-activity-counter-initialization* (get-universal-time))
  (setq *initialization-source* "User"))
(loop for file-type in commit-file-types
      collect
      (if screen-only
          (write-commit-file file-type commit-dir :file-p nil :screen-p t)
          (write-commit-file file-type commit-dir :file-p t :screen-p screen-as-well))
      into results
      finally (cond ((and (not bad-setups) (every #'null results))    ; remove nil instead?
                     (progn   ;; (format t "U2%Non-NULL values were successfully generated f
 all commit fields.U%")
                       (send-all-commit-files)
                       (return t)))
                    ((not (every #'null results))
              (format t "U2%Files with NULL or OVER-SIZED fields: U%U2%Ua  UaUa UaU%
      UaUaUa"
                        (loop for result in results  ; decide what to collect, print.  For n
 do it all.
                              when result
                              collect result))
              (format t "U2%Since NULL fields were found, the commit files should not be u
e.U%")))
      ; only the bad result case gets this far.
```

```
      (setq *commit-results* results)  ; save bad results in a global for inspection.
      (format t "Ü%Since either bad setup data or NULL fields were found, the commit files sh
ld not be used.Ü%")
      (when (and bad-setups (every #'null results))
          (when (yes-or-no-p (format t "Ü2% The commit data is okay except for bad setup info.
Do you wish to commit the schedule anyway? "))
            (send-all-commit-files)))
      (format t "Ü2%Error results are saved in the global *COMMIT-RESULTS* for inspection.Ü%")
      (return nil))))


(defmacro write-commit-file-to-streams ((a-stream filename dir file-p screen-p) &rest forms)
 "Internal function for file/screen handling"
 ; if not going to screen, should inform user of file-writing progress. xxx
 `(if ,file-p
    (with-open-file
      (file-stream (merge-pathnames (format nil "Üa.Üa" ,filename *commit-extension*)
                                    (or ,dir *commit-dir*))
             :direction :output :if-does-not-exist :create :if-exists :supersede)
      (let ((,a-stream (if ,screen-p
                          (make-broadcast-stream *standard-output* file-stream)
                          (make-broadcast-stream file-stream))))
        ,@forms))
    (if ,screen-p (let ((,a-stream t)) ,@forms))))
(defun write-commit-file (commit-file-type commit-dir &key file-p (screen-p t))
 "Write an individual commit file."
 (if screen-p (format t "Ü%"))                        ; start fresh line
 (ecase commit-file-type                              ; change so filename is always the short form?

  ((callactv activity)
   (check-commit-activity-counter)                       ; check only for activity files??
   (write-commit-file-to-streams
     (stream 'callactv commit-dir file-p screen-p)
     (prog1 (write-activity 'callactv stream)        ; MUST return the result of this first form
            (incf *commit-activity-counter*)         ; when increment??
            (setq *pm-counter* 7000)                   ; re-initialize for each run
            (check-commit-activity-counter)
            (when file-p
              (write-commit-activity-counter))     ; don't write in screen-only case
            (unless screen-p (format t "Ü%Commit file type Üa written to ÜaÜ2%"
                                  commit-file-type (namestring (truename stream)))))))
  ((shipschd schedule)
   (write-commit-file-to-streams
     (stream 'shipschd commit-dir file-p screen-p)
     (prog1 (write-schedule 'shipschd stream)       ; MUST return the result of this first form.
            (unless screen-p (format t "Ü%Commit file type Üa written to ÜaÜ2%"
                                  commit-file-type (namestring (truename stream)))))))
  ((newwrqmt requirements)
   (write-commit-file-to-streams
     (stream 'newwrqmt commit-dir file-p screen-p)
     (prog1 (write-new-reqmts 'newwrqmt stream)      ; MUST return the result of this first for

            (unless screen-p (format t "Ü%Commit file type Üa written to ÜaÜ2%"
                                  commit-file-type (namestring (truename stream)))))))
  ((cellrsrc expdrcpt resource receipts)
   (write-commit-file-to-streams
     (stream commit-file-type commit-dir file-p screen-p)
     (format t "Ü%Commit file type Üa is unavailable.  Writing header only.Ü%" commit-file-typ

     (write-commit-header commit-file-type nil stream) ; dummy in record size from *record-siz
alist*
     (unless screen-p (format t "Ü%Commit file type Üa written to ÜaÜ2%"
                           commit-file-type (namestring (truename stream))))
     nil))
  ((test test-file test-commit-file)
   (write-commit-file-to-streams (stream 'testfile commit-dir file-p screen-p)
                                 (write-test-commit-file 'testfile stream)))))


(defun WRITE-COMMIT-HEADER (commit-file-type total-record-size &optional (stream t))
 "Write a commit file header for the indicated file."
```

```
;; Uses a manually-maintained association list to obtain record sizes for dummy files.
 format-commit-data
  stream
  nil      ; suppress header printing; this IS a header.
  'build-context    23 (utime-to-string (get.value *control-unit* 'build-context-time))
  'commit-file-type  8 (string-downcase commit-file-type)
  'number-of-bytes-per-record 3  (or total-record-size
                                     (cadr (assoc commit-file-type *record-size-alist* :test #
;)))))

; ------------------------------------------------
; Code to handle the commit ACTIVITY COUNTER
; ------------------------------------------------

defun CHECK-COMMIT-ACTIVITY-COUNTER ()
 "Check that the Activity Counter is within the legal range 1 to 99."
 (let ((cnt *commit-activity-counter*))
   (when (> cnt 99)     ; reset counter. xxx
     (setq *commit-activity-counter* 1)    ; zero is not legal.
     (setq *last-commit-activity-counter-initialization* (get-universal-time))
     (setq *initialization-source* "Auto-reset"))
   (when (or (null cnt) (= cnt 0))     ; testing results in low numbers. xxx
     (return-from check-commit-activity-counter (read-commit-activity-counter)))
   (describe-commit-activity-counter)))

defun describe-commit-activity-counter ()
 "Print a description of the Activity Counter to the screen."
  (format t "Ü2%The commit activity counter is at Üa,Ü%Ü
              last reset at date/time Üa,Ü%Ü
              from source Üa.Ü2%"
        *commit-activity-counter*
        (if  *last-commit-activity-counter-initialization*
             (utime-to-string *last-commit-activity-counter-initialization*)
             "Unknown.")
        *initialization-source*)
 *commit-activity-counter*)

defun write-commit-activity-counter (&optional (counter-dir *commit-dir*))
 "Save the global variable *commit-activity-counter* in a file."
 (with-open-file                                 ; write in replace mode instead??
   (stream (merge-pathnames (format nil "Üa.lisp" 'activity-counter)
                            counter-dir)
           :direction :output :if-does-not-exist :create :if-exists :supersede)
   (let* ((utime (get-universal-time))
          (utime-string (utime-to-string utime)))
     (format stream "Activity Counter Record FileÜ%Ü
                     Time/date written, Lisp form of Time/date, Counter ValueÜ%Ü
                     ÜsÜ%ÜsÜ%ÜsÜ%"  ; each value on a line.
             utime-string utime *commit-activity-counter*)
      (format t "Ü2%Commit activity counter written out at Üa. Ü%Value: Üa    File: ÜaÜ2%"
             utime-string *commit-activity-counter* (namestring (truename stream)))
     )))

defun read-commit-activity-counter (&optional (counter-dir *commit-dir*))
 "Read the value of the gobal *commit-activity-counter* from a file and set it."
 (let* ((counter-dir (merge-pathnames  (format nil "Üa.lisp" 'activity-counter) counter-dir))
        (filename counter-dir)
        (new-init nil)
        (new-counter nil))
   (loop (unless (or (null *commit-activity-counter*)    ; if current value is legal, use it.
                     (< *commit-activity-counter* 1)
                     (> *commit-activity-counter* 99))
           (describe-commit-activity-counter)
           (return-from read-commit-activity-counter *commit-activity-counter*))
         (format t "Ü%Current counter value Üa not legal.Ü%" *commit-activity-counter*)
         (loop (cond ((probe-file filename) (return nil))     ; if default file exists, go ahead
nd try it.
                     ; (if (y-or-n-p "Ü%Is this the correct file: Üa? " (namestring filenam
) (return nil))
                     (t (format t "Ü%File Üa does not exist.Ü2%" (namestring (truename filename
)))
               (format t "Ü%Read value from what directory and/or filename? ")
```

```
        (setq filename (merge-pathnames (read-line) counter-dir)))
      (format t "Ü%Reading counter from Üa.Ü%" (namestring (truename filename)))
      (with-open-file
        (stream filename :direction :input)
        (dotimes (x 3) (read-line stream nil 'eof)) ; read first three lines and discard.
        (setq new-init (read stream nil 'eof))      ; universal lisp time format
        (setq new-counter (read stream nil 'eof))   ; integer for counter value.
        (when new-counter (setq *commit-activity-counter* new-counter)    ; if non-NIL, upda
 counter globals.
              (setq *last-commit-activity-counter-initialization* new-init)
              (setq *initialization-source* (namestring (truename stream)))))
      (setq filename nil)))) ;in case default filename has a bad value, don't want to loop
 nfinitely. xxx

defun COMPUTE-ACTIVITY-ID (box)
"Compute an activity ID for a box; do not look at the current activity-id slot, but do check b
-type."
(cond ((null (unit.exists.p box)) (format t "Ü2%Box Üa is not a unit.Ü%" box) nil)
      ((null (kk.get.value (box boxes) 'end-time)) (format t "Ü2%Box Üa is not active (end-tim
 is NIL).Ü%" (unit.name box)) nil)
      ((eq (kk.get.value (box boxes) 'box-type) 's)  ; box is a setup box; its ID must agree w
 n the op for which it is a setup.
       (let* ((machine (kk.get.value (box boxes) 'machine))
              (successor (if machine (next-process-box box machine))))
         (cond ((null machine) (format t "Ü2%Setup Box Üa has no machine.Ü%" (unit.name box)))
               ((null successor) (format t "Ü2%Setup Box Üa has no successor.Ü%" (unit.name bo
 ))
               (t (or (kk.get.value (successor boxes) 'activity-id) (compute-activity-id succe
 or)))))) ; successor may have one. xxx
      ((eq (kk.get.value (box boxes) 'box-type) 'd) (format t "Ü2%Box Üa is down.Ü%" (unit.nam
 box)) nil) ; down boxes don't have.
      ((eq (kk.get.value (box boxes) 'box-type) 'u) (format t "Ü2%Box Üa is unavail.Ü%" (unit.
 me box)) nil) ; down boxes don't have.
      ((eq (kk.get.value (box boxes) 'box-type) 'pm)
       (incf *pm-counter*)   ; should be 7000 to 9999
       (if (or (null (numberp *pm-counter*)) (> *pm-counter* 9999) (< *pm-counter* 7000))
           (format t "Ü2%Illegal maintenance counter value (not 7000-9999): Üa.Ü%"  *pm-counte
 ))
           (format nil "ÜaÜ2,'0dÜ2,'0d" *pm-counter* *commit-activity-counter* 99)))   ; shoul
 check ranges.
      (t (let* ((tray (kk.get.value (box boxes) 'tray))
                (part (if (unit.exists.p tray) (get.value tray 'part-id)))
                (tray-string (if (unit.exists.p tray)  (string (unit.name tray))))   ; TRAY-00
  (always 4 digits)
                (tray-id (get-tray-id-from-tray-name tray-string))
                ;;(tray-id (let ((pos (position #\. tray-string))) (when pos (subseq tray-stri
 (1+ pos)))))
                (op (unit.exists.p (kk.get.value (box boxes) 'operation)))
                (routing (if (unit.exists.p part) (get.value part 'routing))) ; tray routing i
 SUPPOSED to be the same..
                (routing-length (length routing))
                (member-of-routing (member op routing :test #'eq))  ; op should be in routing.
                (routing-number (when member-of-routing (- routing-length (length member-of-ro
 ing))))) ; zero-based
           (cond ((and (= 4 (length tray-id)) *commit-activity-counter* (< *commit-activity-co
 ter* 100)
                       routing-number (< routing-number 100))  ; handle the clean case first.
 x
                  (format nil "ÜaÜ2,'0dÜ2,'0d" tray-id *commit-activity-counter* routing-numbe
 )
                  ((null tray) (format t "Ü2%Box Üa has no tray.Ü%" (unit.name box)) nil)
                  ((and tray-id *commit-activity-counter* routing-number)
                   (format t "Ü2%Activity ID components not legal: tray-id Üa, run Üa, routing
  dex Üa.Ü%"
                         tray-id *commit-activity-counter* routing-number) nil)
                  ((and op routing (null member-of-routing))
                   (format t "Ü2%Operation Üa on box Üa does not appear in routing Üa.Ü%"
                         (unit.name op) (unit.name box) routing) nil)
                  (t (format t "Ü2%Box Üa with operation Üa, tray Üa, Ü
                             and part Üa does not correspond with Ü
                             routing Ü%Üa." (unit.name box) op tray part routing) nil))))
```

```
(defvar *no-nils-allowed* nil)  ; set to T to leave out any records with NIL values.  Should be
NIL except special testing.

(defun FORMAT-COMMIT-DATA (stream file-type &rest triples)
 "Format fields from a long list, thought of as grouped in triples:
 field name, field size, field value.  If no Null Fields, returns NIL.
 Returns a list if there are null fields: ( (null-field1 null-field2 ... ) formatted-line)"
 (let* ((null-fields nil)
        (over-sized nil)
        (total-record-size  ; substract 1 since there's no space after the last item.
          (1- (loop for x from 0 to (1- (length triples)) by 3  ;; step through the triples
                 do (if (null (nth (+ x 2) triples)) (push (nth x triples) null-fields))  ; note
field names with NIL value
                    (setf (nth x triples) (numberp (nth (+ x 2) triples)))  ; use first of tripl
es flag for right
                                                                            ; justifying numbers
                    sum (1+ (nth (1+ x) triples)))))
        (string (format nil "ÜäÜ:AÜve<ÜaÜ>Ü;Üv<ÜaÜ>ÜAÜÜ Üä" triples))  ; FORMAT the triples int
a string
        (len (length string))
        (line-length 80))
   (unless (= len total-record-size)
     (inform 'error "Ü2%Warning: This record has a field that is over-sized: Ü%ÜaÜ2%" string)
     (setq over-sized t))
   (unless (null file-type)  ; hack for last minute change to put in total record size.
     (write-commit-header file-type total-record-size stream))  ; write header even if null rec
d fields
   (unless (and *no-nils-allowed* null-fields)  ; if null-fields, don't output record if flag s
r not to.
     (loop for start from 0 to (1- len) by line-length   ; does this work for exactly 80 char r
ord?
           do (let ((output (format nil "Üv,,,' &<ÜaÜ>Ü%" ; pad out to line-length cols with sp
                                    line-length
                                    (subseq string start (min len (+ start line-length))))))
                ; subseq copies; could rewrite to avoid the copying...
                (format stream output))))
   (cond (null-fields (list null-fields string)) ; return null field names and string if record
as NILs in it.
         (over-sized (list '("SOME FIELD OVER-SIZED!") string))  ; note if some field was over-
zed...
         (t nil))))


(defun SECONDS-TO-STRING (secs)
 "Convert seconds elapsed time to a string of the form hhhh:mm:ss"
 (let* ((secs (if secs (round secs) 0)) ; guarantee integer; handle NIL
        (hours (floor (fquotient secs 3600)))
       (minutes (- (floor (fquotient secs 60)) (* hours 60)))           ;;; Modified by Dave O
9/12/88
       (seconds (rem secs 60)))
   (format nil "Ü4,'0d:Ü2,'0d:Ü2,'0d" hours minutes seconds)))         ;; on debug operation 5
min 48 secs returned


(defun UTIME-TO-STRING (&optional (utime (get-universal-time)))
 "Convert Universal Lisp time to FCS format: yyyy-mm-dd hh:mm:ss EST"
 ; assume time zone is GMT -- zone 0; thus arbitrary numbers work as start/end times.
 (let* ((ulist
          (nthcdr 3 (nreverse (multiple-value-list
                              (decode-universal-time (if utime (round utime) 0) *time-zone*))
 )))
   (format nil "Ü1äÜa-Ü2,'0d-Ü2,'0d Ü2,'0d:Ü2,'0d:Ü2,'0dÜä EST" ulist)))

(defun STRING-TO-UTIME (time-string)
 "Convert a string like ö"1988-9-4 5:30:00 ESTö" to Universal Lisp time.
 Spaces, dashes, colons, and slashes are equivalent.  ö"ESTö" and seconds are optional."
 (let* ((time-list
          (read-from-string
            (format nil "( Üa Üa )"  ; make a list of numbers, splicing in time zone...
                    *time-zone*
```

```
                    (substitute-if #\space #'(lambda (x) (member x '(#\: #\- #\/ #\E #\S #\T)
                                                                      :test #'char-equal))
                                  time-string)))) ; substitute spaces for all the chars in th
above list...
       (utime (cond ((= (length time-list) 7)
                     (apply #'encode-universal-time (nreverse time-list)))
                    ((= (length time-list) 6)
                     (apply #'encode-universal-time (cons 0 (nreverse time-list))))
                    (t (inform 'notification "~2%Time string should have components Y M D H M
S: ~a.~%" (cdr time-list))
                       nil))))
   (if (and (numberp utime) (< utime 0))
       (inform 'notification "~2%Warning: String \"~a\" converted to a negative universal time:
~d~%" time-string utime))
   utime))

(defun WRITE-TEST-COMMIT-FILE (file-type &optional (stream t))
   (let ((record
          (list
            'field-1 10 "Field-1 10"
            'field-2 30 30
            'field-3 30 "abcdefghijklmnopqrstuvwxyz"
            'field-4 7 "abcdefg"
            'field-4b 79 "1234567890123456789012345678901234567890123456789012345678901234567
123456789"
            'field-5 30 "abcdefghijklmnopqrstuvwxyz"
            'field-6 30 "abcdefghijklmnopqrstuvwxyz"
            'field-7 13 (utime-to-string)
            'field-8 26 "abcdefghijklmnopqrstuvwxyz"
            'field-9 10 (seconds-to-string 3603661)
            'field-10 26 "abcdefghijklmnopqrstuvwxyz")))
     (loop for x from 1 to 4
           do (apply #'format-commit-data stream file-type record)
              (setq file-type nil))
     (format-commit-data stream nil 'field-80 80
                         "12345678901234567890123456789012345678901234567890123456789012345678
1234567890")
     (format-commit-data stream nil 'field-9 10 (seconds-to-string 3603661))
     (format stream "~%")
     nil))


;;; Format and content of Commit Files

(defun COMMIT-ACTIVITY-TYPE (box in-type)
  (case in-type
    (S 'MS)          ; setup box ==> manufacturing setup
    ((P X) (let ((machine (kk.get.value (box boxes) 'machine)))
             (cond ((null (unit.exists.p machine))
                     (error "Box ~a has no machine, in an active commit role." (unit.name box)))
                    ((eq 'yes (get.value machine 'infinite-capacity))
                     'CN)       ; if not in plant, then consignment.
                    ((eq 'no (get.value machine 'infinite-capacity)) ; *** should use consignment
slot. xxx
                     'MP)       ; process or assembly box ==> manufacturing process.
                    (t (format t
                               "~2%Warning: box ~a has an illegal value for the slot INFINITE-CAP
ACITY.  Assuming value NO.~%"
                               (unit.name box))
                     'MP))))
    (PM 'MM)         ; preventative maintenance
    (F  (error "A Free box has appeared in an active commit role."))
    (D  (error "A Down box has appeared in an active commit role."))
    (t  (error "Unrecognized box type ~a for box ~a has appeared ~
               in an active commit role." in-type (unit.name box)))))


(defun ORDER-BOXES-FOR-ACTIVITY-FILE (box-list)
  "Sort active boxes by cellid and start-time; reject inactive boxes, down boxes, and free boxes
."
  (let ((box-list
```

```
        (loop for box in box-list
              when (and (kk.get.value (box boxes) 'end-time)  ; must have an end time to be ac
tive.
                        (member (kk.get.value (box boxes) 'box-type) '(s p pm x)))  ; D, F box
es no good.
              collect (list box
                            (kk.get.value (box boxes) 'start-time)
                            (get.value (kk.get.value (box boxes) 'machine) 'cellid))))  ; cel
lid is a string
    (loop for box-entry in
            (stable-sort (sort box-list #'< :key #'second)  ; start-time
                         #'string< :key #'third)          ; cellid should be a string (of lengt
h 7)
            with last-start-time = 0
            with last-machine = ""
          collect (let ((box (first box-entry))        ; the same machine cannot have events with
identical start times
                        (start-time (second box-entry))
                        (machine (third box-entry)))
                    (if (and (string= machine last-machine)   ; number or string??  note: can't
be true first time thru loop
                             (<= start-time last-start-time))  ; could be several in a row, like
 10 10 10
                        (kk.put.value (box boxes) 'start-time (setq start-time (1+ last-start-ti
me))))  ; seq 10 10 10 ==> 10 11 12. xxx
                    (setq last-machine machine)
                    (setq last-start-time start-time)
                    box))))

(defun WRITE-ACTIVITY (file-type &optional (stream t))
  (let ((ordered-boxes (order-boxes-for-activity-file (unit.children 'boxes 'member))))
    (when (null ordered-boxes)
      (write-commit-header file-type nil stream)  ; record size is dummied in from global alist.
      (return-from write-activity nil))
    (loop for ?box in ordered-boxes
          ; sort by cellid, then start-time.
          ; Note that only s, p, x, and mp boxes get sorted.  D and F boxes get dumped, as do in
active boxes.
          with bad-records = nil
          with end-of-activity-list = (+ (get.value 'control-unit 'build-context-time)
                                         (* (get.value 'control-unit 'modified-end-of-activities
 86400))
          unless (> (kk.get.value (?box boxes) 'start-time) end-of-activity-list)
          do
          (let* ((type (kk.get.value (?box boxes)'box-type))
                 (operation (kk.get.value (?box boxes) 'operation))  ; unit; string for pm?
                 (machine (kk.get.value (?box boxes) 'machine))
                 (start-time (kk.get.value (?box boxes) 'start-time))
                 (end-time (kk.get.value (?box boxes) 'end-time))
                 (fcs-start-time (utime-to-string start-time))
                 (tray (kk.get.value (?box boxes) 'tray))
                 (bad-record-info
                   (format-commit-data          ; assume ?box is a unit below.
                     stream
                     file-type
                     'activity-id    8  (or (kk.get.value (?box boxes) 'activity-id)    ; use ID
 if exists; else compute, install.
                                            (let ((id (compute-activity-id ?box)))
                                              (kk.put.value (?box boxes) 'activity-id id)
; do I really need to install?
                                              id))
                     'activity-type .2  (commit-activity-type ?box type)      ; consignment sl
ot needed. xxx
                     'cell-name     7  (if (and (unit.exists.p machine) (get.value machine 'cel
lid))
                                          (format nil "~a"  (get.value machine 'cellid)))
; force to string for now.

                     'operation-name  19     (cond ((eq type 'pm) operation)
                                                   ((unit.exists.p operation)
                                                    (get.value operation 'data-code)) ; orig st
```

```
ring (should be just 1)
                                                      (t nil))
                        'start-time          23    fcs-start-time
                        'early-start-time     23  fcs-start-time
                        'scheduled-duration  10  (and (numberp end-time)
                                                          (numberp start-time) ; note start may be a fe
w secs late for heat treat.
                                                          (let ((duration (- end-time start-time)))
                                                            (seconds-to-string
                                                              (cond ((< duration 0)
                                                                     ; handle odd cases where a zero-du
ration
                                                                     ; event starts at the same time as
 some other event,
                                                                     ; and so gets its start time bumpe
d a sec or two,
                                                                     ; resulting in a negative duration
.   mjj 10/4/89
                                                                     (inform 'warning
                                                                             "~U%Using 0 for a negative
 duration encountered w
                                                                                  in an active commit no
le: B~ IaL%"
                                                                                (unit.name ?box))
                                                                     0)  ;  Dave O. let's use zero.
                                                                    (t duration)))))
                        'scheduled-quantity   8  (cond ((member type '(pm s) :test #'eq) 0)      ; m
ake zero for PMs and Setups
                                                      ((unit.exists.p tray) (get.value tray 'tray-
size))
                                                      (t nil))
                        'scheduled-oprn-type 12  (cond ((eq type 'pm) " ") ; leave blank for PMs
                                                      ((unit.exists.p operation)     ; replacing do
ts should go away eventually
                                                       " ")                          ;;   DHO   6-29-89
 if short op names not maintained
;;                                                     (replace-dashes-with-dots (get.value operat
ion 'short-name)))
                                                      (t nil))
                        )))
             (setq file-type nil)                   ; suppress header after first record; will go aw
ay eventually. xxx
             (when bad-record-info                  ; means a record had NIL values in it --- BADDD!
               (push `(,(unit.name ?box) ,@(car bad-record-info)) bad-records))) ; save only fiel
d names for now.
          finally (return (if bad-records (list 'cellactv (nreverse bad-records))))))


(defun SCHEDULED-ORDERS ()  ; could serve as a predicate that the scheduler has been run.
  "Collect all order units that were scheduled."
  ; Note that orders filled from inventory will not appear to be scheduled.
  (loop for tray in (get-trays-in-system)        ;xxx???yyycrj
        for order = (get.value tray 'order)
        with filled-orders = nil
        when order
        do (pushnew order filled-orders)
        finally (return filled-orders)))

(defun WRITE-SCHEDULE (file-type &optional (stream t))

  ; All orders from FCS are returned to FCS.
  ; Manually entered orders are not given to FCS (since they do not appear in NET-ORDER-DEMAND-O
RDERS)
  ;        (Note: no manual orders should be in REJECTED-ORDERS, only non-manual ones.)
  ; A selected order is assumed filled.
  ; A selected, unlate order has build quantity = netted quantity and build-date/time = date/tim
e-due.
  ; An order that will be late has an updated build-date/time, but still full quantity.
  ; Only a selected order can be late.
  ; A non-selected order is assumed unfilled (build quantity 0, build-date/time = date/time-due)
.
```

```
; **** NOTE: Currently, there is no check to be sure the scheduler has actually been run.
;            This check should be added, otherwise all this order info will be incorrect.
;            The fn SCHEDULED-ORDERS, above, could serve as such a predicate.

; NOTE: SELECTED-ORDERS on CONTROL-UNIT MUST be a list of unitNAMES, not units.

 (let* ((late-orders (get-late-orders))     ; ( (<order-unit> <build-time>) ... )
        (all-orders (append (unit.descendants 'net-order-demand-orders 'member)
                            (unit.descendants 'rejected-orders 'member)))
        (selected-orders (get.values *control-unit* 'selected-orders))) ; if selected, assumed
filled.
   (when (null all-orders)
     (write-commit-header file-type nil stream)  ; record size is dummied in from global alist.
     (return-from write-schedule nil))
   (loop for order in all-orders      ;order table entry: (part-type final-op quantity-ordered
due-date)
        for late-order-time = (cadr (assoc (unit order) late-orders :test #'eq))
        with bad-records = nil
        do
        (let* ((bad-record-info
                 (format-commit-data
                   stream
                   file-type
                   'original-customer-order 19  (get.value order 'original-customer-order)
                   'ship-customer-code       8  (get.value order 'ship-customer-code)
                   'order-type-code          1  (get.value order 'order-type-code)
                   'date/time-due           23  (get.value order 'date/time-due)     ; pass th
rough
                   'order-quantity           8  (get.value order 'netted-quantity)
                   'primary-routing-name    15  (get.value order 'primary-routing-name)
                   'major-revision           3  (get.value order 'major-revision)
                   'minor-revision           3  (get.value order 'minor-revision)
                   'output-part-name        19  (get.value order 'output-part-name)
                   'build-date/time         23  (if late-order-time
                                                    (utime-to-string late-order-time)
                                                    (get.value order 'date/time-due))
                   'build-quantity           8  (if (member (unit.name order) selected-orders
:test #'eq)

                                                    ; if selected, then filled.
                                                    (get.value order 'netted-quantity)   ; if
not sel, then 0 quantity.

                                                    0)))) ; no such thing as a late rejected
order.
          (setq file-type nil)          ; suppress header after first record; will go away event
ually.
          (when bad-record-info          ; means a record had NIL values in it --- BADDD!
            (push (list order (car bad-record-info)) bad-records))) ; save only field names f
or now.
        finally (return (when bad-records (list 'shipschd (nreverse bad-records)))))))

(defun WRITE-NEW-REQMTS (file-type &optional (stream t))
  "Function to write out the New requirements File containing part, time required and quantity"
  (when *parts-to-order*
    (loop for item in *parts-to-order* do
        (let* ((bad-record-info
                 (format-commit-data
                   stream
                   file-type
                   'purchased-part 19 (first item)
                   'time-required  23 (utime-to-string (second item))
                   'quantity .      9 (third item))))
          bad-record-info ; ignore     ; I think it is UNSAFE to ignore this...  MJJ 12/28/88
          (setq file-type nil))))
  (write-commit-header file-type nil stream))

;(defun write-requirements (file-type &optional (stream t))
;  (loop for resource in (unit.descendants 'tooling 'member) ; tooling not in ESS yet. xxx
;        with bad-records = nil
;        do
;    (let* ((bad-record-info
```

```
;             (format-commit-data
;              stream
;              file-type
;              'functional-code             19  nil
;              'expected-receipt-date/time  23  nil
;              'quantity                     8  nil)))
;      (setq file-type nil)      ; suppress header after first record; will go away eventually. x
xx
;      (when bad-record-info          ; means a record had NIL values in it --- BADDD!
;       (push (list resource (car bad-record-info)) bad-records)))  ; save only field names for
now.
;    finally (return (when bad-records (list 'newmrgmt (nreverse bad-records)))))


;(defun get-order-quantity (tray)            ; not used anymore??
;  (let* ((part (get.value tray 'part-id))
;         (order (get.value tray 'order)))
;  (when (and (unit.exists.p tray)(unit.exists.p part) (unit.exists.p order))
;    (nth 2 (assoc (unit.name part)(get.value order 'order-table)))))) ; 3rd entry in alist.

(defun GET-LATE-ORDERS ()
  "Return an a-list of order units and their final end times for all late orders." ;xxx???yyycrj
  (loop for tray in (get-trays-in-system)
        ;(set-difference (unit.descendants 'trays-in-system 'member) ; assemblies, components, s
ub-assem.
                                       ;(unit.descendants 'wip-and-spares-trays 'member)) ; safety
stock, etc. 12/28/89 MJJ
        for order = (get.value tray 'order)    ; if no order, ignore. xxx
        for order-table = (if (unit.exists.p order) (first (get.value order 'order-table))) ; as
sume 1 entry per order.
        for date/time-due = (if (unit.exists.p order) (get.value order 'date/time-due))
        for due-date = (if date/time-due (string-to-utime date/time-due) (fourth order-table))
        for final-box = (get.value tray 'final-box)
        for end-time = (if (unit.exists.p final-box) (get.value final-box 'end-time))
        with entry-list = (copy-tree nil)  ; help prevent side-effects?
        do
        (cond ((not (unit.exists.p order))   ; provide an error message if no order is found.
               (inform 'notification "U2%Tray Ua does not have a valid order in an active commit '
 role.U%" (unit.name tray)))
              ((not (numberp due-date))      ; invalid due-date...
               (inform 'notification "U2%Order Ua on tray Ua does not have a valid due date: UaU
%"
                       (unit.name order) (unit.name tray) due-date))
              ((not (numberp end-time))      ; invalid end-time...
               (inform 'notification "U2%Tray Ua does not have a valid end time: UaU%" (unit.nam
e tray) end-time))
              ((> end-time due-date) ; if this succeeds, we have a late tray/order
               (let ((entry (assoc order entry-list :test #'eq)))  ; do we have a late tray alre
ady for this order?
                 (if entry  ; if we have an order entry already, see if this tray's even later.
                     (setf (cadr entry) (max (cadr entry) end-time))  ; replace order's entry wi
th the latest time
                     (push (list order end-time) entry-list)))))  ; no entry, so make one --  pu
sh.
        finally (return entry-list)))


(defun SCHEDULED-ORDER-STATUS (&optional part)
  "Show orders and number of hours delay, earliest original due date first."
  (let ((order-list (loop for order in (get.values *control-unit* 'selected-orders)
                          collect (list (unit order) (string-to-utime (get.value order 'date/tim
e-due))))))
    (format t "U2%Orders by earliest original due date first.U2%U
                Order Unit            Orig Due Date             Actually Done            Hrs L
ateU%U
                ----------            -------------             -------------            -----
---U2%")
    (loop for order-entry in (sort order-list #'< :key #'second)  ; sort by utime due.
          for order = (first order-entry)  ; actual unit
          for utime-due = (second order-entry)
```

```
for utime-late =  (second (assoc order late-orders))
for fc = (get.value order 'output-part-name)  ;; a string.
with late-orders = (get-late-orders)
with part-string = (format nil "Ua" part)
with part-functional-codes = (let ((part (and part (coerce-to-unit part))))
                               (if part (get.values part 'data-code)))
when (if part
         (or (equal fc part-string)  ;; PART can be SRT or FC
             (member fc part-functional-codes :test #'equal))
         t)
do (format t "U20s<UaU>  Ua   Ua  UsAU6,1fU1U%"
            (unit.name order)
            (utime-to-string utime-due)
            (utime-to-string (or utime-late utime-due))
            (if utime-late (/ (- utime-late utime-due) 3600)))
finally (return (values)))))
;;; -*- Mode:Common-Lisp; Package:KEE; Base:10; Fonts:(cptfont HL10B cptfont HL12B HL12BI) -*-
```

#|| -------------- EBB <--> FCS Communication Documentation ----------------------

Communication between the TI Explorer and the Stratus are done via IBM 3780 Communications protocol. This particular protocol was chosen because it is supported on both the Stratus and the TI.

Communication is bi-directional between the two machines:

1) Files are sent over from the Stratus to the TI -and-
2) Files are sent from the TI to the Stratus.

The FCS system (Stratus) sends over a set of files, which may be one of the following:

1) A complete Engineering Data Base bridge.
2) A complete EDB bridge followed by an incremental bridge (one extra file).
3) An incremental EDB bridge.
4) A PMMATERIALS bridge.
5) Build Context files.

(Please refer to the documentation on FILES TRANSFERED for more information on these files.
)

A background process is established which watches for files being sent over from the FCS to EBB. This process checks a specific unix directory (/usr/spool/bscbatch/stratus) every 30 seconds to see if a complete set of files have been received.

Files are read in from newest to oldest. This assures us that the newest set of files will be read and used. It also helps us to ignore partial bridges that were sent while debugging the FCS system.

Two specific files are used to identify a complete set of files. Those are: TRIGSTRT and TRIGEND. Any files falling between these two special files are considered a set.

The communication process waits until the last file sent is a TRIGEND file, then takes the complete set of files from the TRIGEND with the newest date back in time to the first TRIGSTRT we find. As we do this, we copy each file into the Lisp file system and then delete each Unix file.

Four files are checked for to determine what files came over:

| FILE | TYPE OF TRANSFER |
|---|---|
| RTNG | Complete EDB bridge |
| PMMATERIALS | PM Materials bridge |
| INCRBRDG | Incremental EDB bridge |
| MANACTV | Build context file set |

Since files are read in from newest to oldest, the incremental bridge will read in first. We must then go and try to read in a complete bridge. Because we delete the files from the unix side as we transfer them to the lisp side, after reading the incremental bridge the complete bridge then becomes the latest set of files.

The complete bridge and incremental bridge files are all put in the same directory on the Lisp file system. Old versions are placed in the archive directory (ESS-FCSDATA-OLD). If a new version is not brought over, the old version will still be in the Lisp directory. Thus, an incremental bridge will only replace the INCRBRDG file, and the complete bridge will still be in the Lisp directory.

The processing sequence which takes place after the files are in the Lisp file system is as follows:

1) Read in the complete bridge files
2) Read in and process each incremental bridge file in the order they were received
3) Translate the data into KB's
4) Generate a schedule.

For more detailed documentation on communication internals, please refer to COMMUNICATIONFN S.LISP, where you will find documentation for each function.

```
************************************************************************************************
*********

****************************************  START OF CODE  ***************************************
**********

(in-package 'KEE)                          ; Make sure the active package is KEE.


;;; Each file from the stratus starts with a single line that contains the filename.
;;; *filenames* is set equal to a list of all file names which ESS receives from the Stratus.

(defparameter *filenames*
              '(oprn_list
                 prod_part_list
                 othr_rsrc_list
                 oprn_fac_rank
                 oprn_inpt_part
                 oprn_othr_rsrc
                 oprn_outt_part
                 rtng
                 trde_skll
                 manfactv
                 manfstat
                 netinv
                 ordrdmnd
                 prodinvt
                 ;shrtmanp              ; This file is not being passed at present.
                 grossinv
                 manfoprn
                 incrbrdg
                 mnprshrt
                 expdrcpt
                 pmcntx
                 pmmaterials
                 trigstrt
                 trigend
                 ))


(defvar *archive-path* "lm:ess-fcsdata-old;")    ; Set equal to the archive directory.
(defvar *watch-for-files* nil)                    ; Global variable.  Set this to NIL to get the
process to exit by itself.
(defvar *watch-process-name* "STRATUSWATCH")    ; The name of the process.
(defvar *watch-sleep* 5)                          ; The watch process will look every 5 seconds to
 see if it should quit.
```

```
(defun watch-on-p () *watch-for-files*)

(defun quit-watch ()                                  ;; Call this to stop the watch process.
  (watch-log "Watch stopped")
  (setf *watch-for-files* nil))

(defun watch ()
  "The following function creates a message output window and begins the process that watches fo
r files being
   sent from the FOS."
  (when (not (watch-on-p))
    (watch-log "Watch started")
    (make-watch-output-window)      ;; The global variable *watch-window* is set to the watch-ou
tput-window stream.
    (clear *watch-window*)
    (watch-msg (format nil "Starting Ua process to watch for files coming from the Stratus.U%" *
watch-process-name*))
    (watch-msg (format nil
                          "U2% A window may pop up asking you for a user id. U%Simply hit <RETURN>
 and continue.U%"))
    (ticl:beep)
    (setq *watch-for-files* t)
    (ticl:process-run-function *watch-process-name* #'watch2)))

(defun watch2 ()
  "This function, called by watch, is used to receive file sent over from the unix side and to c
reate a
   MANACTV1.DAT and MANACTV2.DAT from the file MANACTV.DAT if the bridge type is BUILD-CONTEXT.
 This function
   will continue running (in the background) unitl the machine is rebooted or the global variabl
e
   *watch-for-files* is set to nil."
  (in-package 'KEE)
  with-keeio
   (let* ((bridge-type nil)
          (count 999))                                   ;; Set this large so it tests for files right
away.
      (loop while *watch-for-files* do                  ;; Every 12 times go look for files-
            (sleep *watch-sleep* "Watch sleep")
            (incf count)
            (when (> count 12)
              (setf count 0)
              (setf bridge-type (get-all-unix-files nil))
              (when bridge-type
                (let* ((bridge-types (list bridge-type))
                       new-bridge-type)
                  (loop while (setq new-bridge-type (get-other-bridge-if-there bridge-types)) do
                        (push new-bridge-type bridge-types))
                  (create-master-record-file)
                  (delete-old-incremental-files)
                  (setq *watch-for-files* nil)          ;; We will stop the watch process after w
e get this set!!!!!!!
                  (print-comm-message bridge-types)))))
    (watch-msg (format nil " Watch process exiting...U%")))))
(defun watch-msg (msg)
  "This writes a message to the watch window-"
  (expose *watch-window*)
  (format *watch-window* msg))

(defun watch-log (msg)
  "This writes messages about files transferred between the Stratus and the Unix systems to a lo
g file."
  (let* ((frompath *archive-path*)
         (filename "WATCH-LOG.DAT")
         (date (utime-to-string))
         (totalfile (format nil "Ua/Ua" frompath filename)))
    (ticl:condition-case
      (frompath filename)
        (let* ((stream (open totalfile :direction :output :if-exists :append :if-does-not-exist
:create)))
```

```
        (format stream "~2fa ~a~%" date msg)
        (close stream)
        T)
      (error nil))))


;;; ---------------------- GET ALL UNIX FILES ----------------------

(defun get-all-unix-files (command &optional (frompath "/usr/spool/bscbatch/stratus")
                           (topath "lm:ess-fosdata-in;"))
  "This function is called periodically to see if the last file is ready.  If they are,
   it will get all the files between TRIGSTRT and TRIGEND and return T.  Otherwise, it will retu
rn nil.
     If command = 'delete, this will just delete the unix files.  This can be used to clean up t
he unix directory.
     If command = 'look, this will just look at the files to see what type of bridge it is."

  (let* ((dir (directory (format nil "lxm:~a/*.*" frompath))))
    (if (not dir)
        (watch-msg (format nil "No directory for path lxm:~a~%" frompath))
        (let* ((filedata (loop for item in dir
                               collect (list (pathname-name item)
                                             (format nil "~a ~a"
                                                     (second (member :creation-date (fs:file-pro
perties item)))
                                                     (pathname-name item)))))
               (sorted-filedata (sort filedata #'(lambda (a b) (string< (second a)(second b)))))
               (rev-filenames-raw (reverse (loop for item in sorted-filedata collect (first item
 ))))
               (rev-filenames
                 (loop for filename in rev-filenames-raw
                       when (string= "pr" (subseq filename 0 2))
                       collect filename))

               (lastfilename (first rev-filenames))
               (firstline (read-first-line frompath lastfilename)))

          (if (or (equal firstline '(TRIGEND))
                  (eq command 'delete))
              (complete-bridge-or-incr (get-all-unix-files2 frompath topath rev-filenames comman
d))
              nil)))))
(defun get-all-unix-files2 (frompath topath rev-filenames command)
  "This function is called by GET-ALL-UNIX-FILES.  It performs the following:
    o Clears out the archive directory on the lisp side of the system.
    o Makes sure the file being passed is one we expect (i.e. is it in the list *filenames*
    o Puts the old file in the archive directory
    o Copies the files from the UNIX side to the LISP side.
    o Deletes the file out the UNIX directory
   rev-filenames is the reversed list of filenames in the Unix directory."

  (let* ((done nil)
         (real-filenames nil)
         (msg (format nil "~%Getting ~a files (including trigger files)...Command=~a~%" (length
rev-filenames) command)))
    (watch-msg msg)
    (watch-log msg)
    (unless command
      (ticl:delete-directory *archive-path*                                  ;; Clear out
the archive directory
                             :dont-delete-newest t
                             :delete-self nil :are-you-sure t))              ;; Just keep t
he latest version.
    (loop for filename in rev-filenames while (not done) do
          (watch-msg (format nil "~%Looking at file ~a  " filename))
          (let*  ((line (read-first-line frompath filename))
                  (real-filename (first line)))
            (when (and line real-filename)
              (watch-msg (format nil " real-filename is ~a  " real-filename))
              (watch-log (format nil "Using file ~a, real-filename is ~a" filename real-filename
))
```

```
        (let* ((fromfilepath (format nil "~a/~a" frompath (string-upcase filename))))
          (if (not (memq real-filename *filenames*))
              (watch-msg (format nil "Bad filename ~a not copied.~%" real-filename))
              (progn
                (setq real-filenames (cons real-filename real-filenames))
                (if (eq real-filename 'TRIGSTRT)
                    (setq done T)
                    (if (or (eq real-filename 'TRIGEND)
                            command)
                        nil                                             ;; do nothing, e
xcept it will get deleted.
                        (progn
                          (ticl:copy-file (format nil "~a~a.dat" topath real-filename)

      ; Put the old file in
                                          (format nil "~a~a.dat" *archive-path* real-filen
ame)) ; the archive directory
                          (delete-file (format nil "~a~a.dat" topath real-filename))

      ; and delete it.
                          (fs:expunge-directory topath)
                          (ticl:copy-file (format nil "lxm:~a" fromfilepath)
                                          (format nil "~a~a.dat" topath real-filename)
                                          :characters T  ;; I/O mode to transfer the data.
                                          :default-type :character))))
                (unless (eq command 'lock)
                  (lx:issue-shell-command (format nil "rm ~a" fromfilepath)) ;; delete the
 Unix file.
                ))))))
    (watch-msg (format nil "~%Got ~a files (including trigger files)...~%" (length rev-filenames
)))
    real-filenames))
(defun read-first-line (frompath filename)
  "This routine opens a file, reads the first line, and reads the line into a list.
   It protects opening the file and reading the string from errors.  It returns the first
   line in symbol form, or else it returns nil if there is an error."
  (ticl:condition-case
    (frompath filename)
      (let* (firstline)
        (with-open-file (stream (format nil "lxm:~a/~a" frompath (string-upcase filename)) :dire
ction :input)
          (setq firstline (read-line stream)))
        (read-from-string (format nil "( ~a )" firstline)))
    (error nil)))


(defun complete-bridge-or-incr (filenames)
  "Returns the type of bridge when passes a list of filenames."
  (if (memq 'RTNG filenames) 'COMPLETE
      (if (memq 'PMMATERIALS filenames) 'PMMATERIALS
          'INCREMENTAL)))


;;; --------------------- SENDING COMMIT FILES -----------------------

(defun send-all-commit-files ()
  "The following function transferes all commit files from the TI (ESS) to the Stratus (FCS)."
  (send-commit-file "CELLACTV" "LISP")
  (send-commit-file "SHIPSCHD" "LISP")
  (send-commit-file "CELLRSRC" "LISP")
  (send-commit-file "EXPDRCPT" "LISP")
  (send-commit-file "NEWWRQMT" "LISP")
  (format (get.value 'control-unit 'msg-output-window) "Sent 5 commit files to FCS...~%"))

(defun send-commit-file (filename ext &optional (frompath "lm:ess-fcsdata-out;")
                         (topath "/usr/spool/bscbatch/commit"))
  "The following function is used to send a file from the TI to the Stratus.  The function first
   makes sure the communication daemon is running, copies the file to the correct queue, and the
n
   issues the appropriate command to transfer the file to the Stratus."

  (if (not (file-exists "lxm:/usr/spool/bscbatch/stratus" "bsclock"))
      (watch-msg (format nil "Unix demon BSCD is not running.  File not transferred.~%"))
```

```
(let* ((tofilepath (format nil "~a/~a" topath filename)))
  (ticl:copy-file (format nil "~a~a.~a" frompath filename ext) (format nil "lxm:~a" tofile
path)
                  :characters T                          ;; I/O mode to transfer the data.
                  :default-type :character)
  (lx:issue-shell-command (format nil "/usr/bin/bscbatch -to=stratus ~a" tofilepath)))))

(defun file-exists (frompath filename)
  "This returns T if the file exists, else NIL.  Be sure the filename is in the correct upper or
  lower case."
  (ticl:condition-case
    (frompath filename)
      (with-open-file (stream (format nil "~a/~a" frompath filename) :direction :input)
        stream                        ; ignore (keeps the compiler from issuing a warning.
        T)
    (error nil)))


(defun get-other-bridge-if-there (bridge-types)
 "Returns a bridge type if only that bridge type existed in the queue, else issues a warning
  that two sets of files, both the same bridge type, exist.  The old file sets should be
  deleted.  NOTE:  This should not happen under normal circumstances."
 (let* ((next-bridge-type (get-all-unix-files 'look)))
   (if (memq next-bridge-type bridge-types)
       (progn
         (ticl:beep)
         (watch-msg (format nil "Two ~a bridges in the Unix files~%" next-bridge-type))
         (watch-msg (format nil "Using only the last one; you should delete the other files by
calling~%"))
         (watch-msg (format nil "  (get-all-unix-files 'delete)   several times.~%"))
         nil)
       (first-bridge-type))))

(defun delete-old-incremental-files ()
  "This deletes all of the incremental bridge files from the Lisp file system
   those ones before the last RTNG file."
  (let* (last-rtng-file-date)
    (loop for item in (directory *data-dir*)
          while (not last-rtng-file-date) do
          (let* ((filename (pathname-name item)))
            (when (equal filename "RTNG")
              (let* ((date (second (member :creation-date (fs:file-properties item)))))
                ;;(print (list 'date date))
                (setq last-rtng-file-date date)))))
    (loop for item in (directory *data-dir*) do
          (let* ((filename (pathname-name item)))
            (when (and (equal filename "INCRBRDG")
                       (> last-rtng-file-date (second (member :creation-date (fs:file-properties
item)))))
              (let* ((ext (pathname-version item))
                     (fullname (format nil "~a.DAT#~a" filename ext)))
                (delete-file (merge-pathnames *data-dir* fullname))
                (watch-msg (format nil " Deleting ~a~%" fullname))))))
    (ticl:send (merge-pathnames *data-dir*) :expunge)))


(defun make-watch-output-window ()
  "This function sets up an output window where all communication-related messages go."
  (when (not *watch-window*)
    (let* (window)
      (setq window (make-window-stream
                    :left 475 :bottom 140 :width 545 :height 575 :borders 2
                    :title "ESS - FOS Communication Messages"
                    :title-font *title-font* :font-set (list (open-font 'helvetica 'bold 10))
                    :parent *kee-root-window* :type 'window-stream))
      (setq *watch-window* window)
      (enable-window-stream-page-scrolling window :more-p t)
      (expose window)
      (setf (window-stream-button window) 'output-window-button-method)
      (clear window)
      nil)))
```

```
(defun print-comm-message (bridge-type)
  (clear *watch-window*)
  (watch-msg (format nil "Data received from Stratus~%"))
  (watch-msg (format nil "  Bridge types:  ~a~%" bridge-type))
  (loop for i from 1 to 5 do (tic1:beep)(sleep .5))
  nil)
    (expose *watch-window*)
    (format *watch-window* "~%Watch process ~a~%" msg)))

(defun start-watch ()
  "This function will start the watch process if it hasn't already been activated."
  (make-watch-output-window)
  (expose *watch-window*)
  (if (watch-on-p)
      (format *watch-window* "~%WATCH PROCESS ALREADY ON~%")
      (watch)))

(defun stop-watch ()
  "This function will stop the watch process if it's active."
  (make-watch-output-window)
  (expose *watch-window*)
    (if (not (watch-on-p))
        (format *watch-window* "~%WATCH PROCESS NOT ON~%")
        (progn (quit-watch)
               (format *watch-window* "~%Watch process will stop~%"))))
;;; ----------------- ROUTINES FOR DOING PRE-PROCESSING ------------------------
;;; We may want to move these few functions to TRANSDAT.LISP since they really relate to that
;;; as much or more than they relate to the communicationfns.

;; The scheduler will stop before each of the actions in this list and ask for confirmation to c
ontinue.
(defvar *stopping-points* '(init-only commit))

(defun do-pre-processing-all ()
  (do-pre-processing))

;;; The following routine should be used when we start getting incremental bridge files.

(defun do-pre-processing-all2 ()
  "This reads a complete bridge, then reads all the incremental bridge files,
   and then does the rest of the translation processing and checking."
  (do-pre-processing t nil nil nil nil)
  (loop for item in (directory *data-dir*) do
        (let* ((filename (pathname-name item)))
          (when (equal filename "INCRBRDG")
            (let* ((ext (pathname-version item))
                   (fullname (format nil "~a.DAT#~a" filename ext)))
              ;;(print (list 'file filename ext fullname))
              (do-pre-processing nil fullname nil nil nil)
              ;;(with-open-file (stream (merge-pathnames *data-dir* fullname) :direction :input)
              ;;(print (read-line stream)))
              ))))
  (do-pre-processing nil nil t t t))


;;;  This function should be placed near the top of SCHEDULEFNS.LISP since
;;;  it really is a top-level scheduling function (used primarily for debugging)

(defun resume (&optional start-over)
  "This function will continue scheduling tasks to the next stopping point.
   The global *last-action* has the last action completed.  If start.over is set
   to T, the scheduler will start over."
  (when start-over (setf *last-action* nil))
  (let* ((pause nil)
         (stream *watch-window*))
    (loop while (not pause)
          do
          (let* ((next-action (next-action)))
            (when (memq next-action *stopping-points*)
              (when (not (mouse-confirm (format nil "Continue into ~a~%" next-action) stream))
                (setq pause T)))
```

```
          (when (not pause)
            (format stream "Doing ~a~%" next-action)
            (eval (list next-action)))))
    (format stream "~%Pausing~%")
    (format stream "TYPE (resume) TO CONTINUE SCHEDULING~%")
    nil))

(defun show-watch-status ()
  "This function prints a message to the watch window
   telling the user whether the watch status is on or off."
  (let* ((msg (if (watch-on-p) "ON" "OFF")))
    (make-watch-output-window)
;-*- Mode:Common-Lisp; Package:KEE; Fonts:(cptfont HL12B cptfont HL12B HL12BI); Syntax:ZETALISP
; Base:10 -*-

(defun read-fcs-file ( )
  " This function reads in the Factory Control System data file and puts the data into
     slots of newly created units in the scheduling system"
  (when *do-dummy-fcs*
    (let* ((record t))
      (with-open-file (fcs-file (merge-pathnames "fcs-data.lisp" *path*) :direction :input)
        (loop until (equal record nil)
              do
              (setq record (read fcs-file nil nil))
              (let* ((type (first record)))
                (cond ((memq type '(M1 M2)) (set-machine-startup-status record))
                      ((memq type '(WE 56)) (update-on-hand-inventory record))
                      ((eq type 'PM7) (update-machines-for-pm record))
                      (t [illegible]))))))))

(defun read-fcs-file ( ))

(defun set-machine-startup-status (record)
  "Updates the startup-status slot of the machine unit with the current status and next schedul
ed events."
  (let* ((machine (second record))
         (operation (third record))
         (remaining-time (fourth record))
         (start-time (fifth record))
         (event-type (sixth record))
         (activity-id (seventh record))
         (quantity (eighth record)))
    (put.value machine 'startup-status
               (append (get.value machine 'startup-status)
                       (list (list operation remaining-time start-time event-type activity-id qu
antity))))))

(defun generate-machine-unavailability ()
  "Creates a box for downtime or other unavailability and puts associated data in slots."
  (let* ((horizon (get.value *control-unit* 'horizon-end-plus))
         (bc-time (get.value *control-unit* 'build-context-time))
         (calendar-unit (unit 'calendar-unit 'calendarkb))
         (default-schedules (unit 'default-schedules 'calendarkb))
         (start-day (get-current-day bc-time))
         (start-month (get-month-name bc-time))
         (start-month-index (get-month-index bc-time))
         (year (get-year bc-time))
         (begin-start-day (encode-universal-time 0 0 0 start-day start-month-index year [illegible]
[illegible])))
     (loop for machine-type in (get.values *control-unit* [illegible]-machine-list)
          do
          (loop for machine in (unit.children machine-type 'member)  ;; removed sort - bf dec1
                for machine-name = (unit.name machine)
;               when (get.value machine 'generate-gantt-machine)  ;[illegible] displayed machines[illegible]

                do
                (remove.all.values machine [illegible])
                (let* ((current-day start-day)
                       (month start-month)
                       (or by (get.value calendar-unit [illegible]))
                       (  [illegible] machine-name  get-calendar-machines  [illegible]
                  ((if (not [illegible]
```

```
(msgout (format nil "machine ~a is not on the calendar ~a" machine-name m
achine))

;; else do it

(loop for orig-current-day from start-day
      for horizon-remaining from (- horizon bc-time) by -86400  ;; number
of seconds in a day
      while (> horizon-remaining 0)
      do
      (when (> current-day (first (array-dimensions array)))
        (setq current-day 1)                                  ;; set at 1 fo
r new month

        (setq month (next-calendar-month month))
        (setq array (get.value calendar-unit month)))
      (let* ((array-element (aref array (- current-day 1) j))
             (default-schedule (get.value default-schedules array-element)))

        (create-unavailable default-schedule machine bc-time
                            start-day begin-start-day orig-current-day))
      (incf current-day)))))


(defun create-unavailable (default-schedule machine bc-time-minus-delta start-day begin-start-da
y orig-current-day)
  (loop for i from 0 to (- (length default-schedule) 1) do
        (let* ((current-downtime (nth i default-schedule))
               (start-time (convert-string-to-mil-duration (first current-downtime)))
               (end-time (convert-string-to-mil-duration (second current-downtime)))
               (adj-start-time (max bc-time-minus-delta (+ (ceiling start-time) begin-start-day
                                                (* 86400 (- orig-current-day start-d
ay))))))
               (adj-end-time (+ (ceiling end-time) begin-start-day
                                (* 86400 (- orig-current-day start-day)))))

          (if (and (/= start-time end-time)
                   (> adj-end-time bc-time-minus-delta))
              (let ((box (boxes-get-empty-box 'boxes)))
                (kk.put.value (box boxes) 'box-type 'U)
                (kk.put.value (box boxes) 'strings (list "U"))
                (box-highlight! box)
                (kk.put.value (box boxes) 'machine machine)
                (add.value machine 'non-pm-downtime
                           (list adj-start-time adj-end-time) 'own nil 'append t)
                (kk.put.value (box boxes) 'immovable t)
                (kk.put.value (box boxes) 'start-time adj-start-time)
                (kk.put.value (box boxes) 'end-time adj-end-time)
                (insert-box box
                            (third (first (pockets-in-range machine adj-start-time adj-end-time)))

                            nil)
                (do-before-bc-time adj-start-time adj-end-time machine)))))))

(defun do-before-bc-time (start-time end-time machine)
  "Function to create a mirror image of the calendar before build content time"
  (let* ((box (boxes-get-empty-box 'boxes))
         (bc-time (get.value 'control-unit* 'build-content-time))
         left-box real-start real-end)
    (kk.put.value (box boxes) 'box-type 'U)
    (kk.put.value (box boxes) 'strings (list "U"))
    (box-highlight! box)
    (kk.put.value (box boxes) 'machine machine)
    (setq real-start (+ (- bc-time end-time) bc-time))
    (setq real-end (+ (- bc-time start-time) bc-time))
    (add.value machine 'non-pm-downtime
               (list real-start real-end) 'own nil)
    (kk.put.value (box boxes) 'immovable t)
    (kk.put.value (box boxes) 'start-time real-start)
    (kk.put.value (box boxes) 'end-time real-end)
    (setq left-box
          (third (first (pockets-in-range machine real-start real-end))))
    (insert-box box left-box nil)))
```

```
(defun get-year (universal-time)
  (sixth
    (multiple-value-list
      (decode-universal-time universal-time *time-zone*))))

(defun get-month-name (universal-time)
  (case (fifth
          (multiple-value-list
            (decode-universal-time universal-time *time-zone*)))
    (1 'january)
    (2 'february)
    (3 'march)
    (4 'april)
    (5 'may)
    (6 'june)
    (7 'july)
    (8 'august)
    (9 'september)
    (10 'october)
    (11 'november)
    (12 'december)))

(defun get-month-index (universal-time)
  (fifth
    (multiple-value-list
      (decode-universal-time universal-time *time-zone*))))

(defun get-current-day (universal-time)
  (fourth (multiple-value-list (decode-universal-time universal-time *time-zone*))))

;; -------------------------------------------------------------------------------
(defun update-on-hand-inventory (record)
  "Updates the on-hand-wip or safety-stock slots of the operation unit with on hand trays."
  (let* ((record-type (first record))
         (operation (second record))
         (number-trays (fourth record))
         (required-trays (fifth record)))
    (cond ((equal record-type 'W5)
           (add.value operation 'on-hand-wip (list number-trays 0 0) 'own nil :append t))
          ((equal record-type 'S5)
           (add.value operation 'safety-stock (list number-trays required-trays) 'own nil :appen
d t)))))

(defun update-machines-for-pm (record)
  "Updates the schedule-pm slot on the machine unit with pm to be scheduled."
  (let* ((machine (second record))
         (pm-job (third record))
         (start (fourth record))
         (end (fifth record))
         (duration (sixth record))
         (frequency (seventh record)))
    (add.value machine 'schedule-pm-frequency (list pm-job start end duration frequency) 'own n
il :append t)))

(defun update-opers-for-component-orders (record)
  "Updates the component-parts-in-order slot on the operation unit with components to be schedul
ed."
  (let* ((count (length (third record)))
         (order (second record))
         operation quantity part due-date)
    (create.unit order 'orders)
    (dotimes (n count)
      (setq quantity (first (nth n (third record))))
      (setq part (second (nth n (third record))))
      (setq operation (third (nth n (third record))))
      (setq due-date (fourth (nth n (third record))))
      (add.value operation 'component-parts-in-order (list part quantity due-date order) 'own nil
 :append t))))

(defun utilize-onhand-inventory ()
```

```
  "Function to use existing onhand inventories at the front end of the scheduling horizon"
  ;(check-action 'utilize-onhand-inventory)
   (let* ((order-of-inventory-use (get.value 'control-unit 'ranked-opers-for-safety-stock))
         (msg-output.window (get.value 'control-unit 'msg-output-window))
         quit.looking new-inv link-to-box)
    (expose msg-output.window)
    (format msg-output.window "~%  Utilizing Inventories and/or Safety Stock ")
    (setq *time1* (time))
    (verify-inventory-for-ft-events order-of-inventory-use)                     ;;   insure inventory exi
sts for frozen time events  4-4-89     DHO
    (update-previous-schedule-inventory)                                          ;;  update for events
still left from prior schedule   DHO      4-10-89
    (loop for oper in order-of-inventory-use do                                  ;;  check each operation for a
vailable inventory
          (when (or (get.values oper 'on-hand-wip)
                    (get.values oper 'safety-stock))
          (setq new-inv (sort (copy-seq (get.values oper 'on-hand-wip)) #'sort-by-time-avail))
          (put.values oper 'on-hand-wip new-inv)
          (let* ((returned-value (scheduled-boxes-before-ft2 oper))
                 (boxes-before-ft2 (first returned-value))
                 (previous-sched-box (second returned-value)))
            (loop for entry in (get.values oper 'on-hand-wip) do
                  (let* ((inventory (first entry))
                         (time-available (second entry))
                         (flag (third entry))
                         (part (get.value oper 'part-id)))
                    (dotimes (count inventory)
                      (loop for item in boxes-before-ft2
                            until (or (null boxes-before-ft2) (eq inventory 0)) do
                            (let* ((box (first item))
                                   (operation (kk.get.value (box boxes) 'operation))  ;get.value
 => kk.get.value CRJ 4/17/89
                                   (number-of-tray-predecessors
                                     (length (kk.get.values (box boxes) 'same-tray-predecessors)
)) ;get.value => kk.get.value CRJ 4/17/89
                                 ;;   added above line and check below until we handle multiple pre
decessors in inventory     DHO      2-21-89
                            (when (and operation (<= number-of-tray-predecessors 1)
                                       (not (equal "ASSEMBLY2   " (get.value oper 'short-name
))))
                              (when (eq (unit.name operation) (unit.name oper))
                                (when (eq (unit.name (kk.get.value ((kk.get.value (box boxes)
'tray) trays-in-system) 'part-id)) ;get.value => kk.get.value CRJ 4/17/89
                                          (unit.name part))
                                 (let* ((old-value (list inventory time-available flag))
                                        updated-inventory)
                                   (setf inventory (1- inventory)) ;; decrement inventory
                                   (setf updated-inventory (list inventory time-available fla
g))
                                   (replace.value oper 'on-hand-wip old-value updated-invent
ry)
                                   (setq boxes-before-ft2 (remove item boxes-before-ft2
                                   (cond ((> time-available 0)
                                          (setq link-to-box (first previous-sched-box))
                                          (setq previous-sched-box (remove link-to-box pre
vious-sched-box))
                                          (find-tray-predecessors oper box link-to-box))   ;
; find preceding boxes
                                         (t  find-tray-predecessors oper box)))
                                   (setq quit.looking t)))))));)))
               (setq boxes-before-ft2 (first (scheduled-boxes-before-ft2 oper)))   ;; added this ca
ll  6-8-89
    (utilize-safety-stock oper boxes-before-ft2)))
    (setq *time2* (time))
    (report-execution-time msg-output.window)))

(defun utilize-safety-stock (oper events-before-ft2)
  " Function to use safety stock in place of operations scheduled that will cause lateness in th
e schedule"
  (let ((safety-stock (get.value oper 'safety-stock)))
  ;(check-action 'utilize-onhand-inventory)
```

```
;(loop for oper in (get.value *control-unit* 'ranked-opers-for-safety-stock) do
 (when safety-stock                          ;;   DHO  check to see if any safety stock or not   6
-8-89
   (when (> (first safety-stock) 0)
      (let* ((events-before-ft2 (first (scheduled-boxes-before-ft2 oper)))
             (quit.looking nil))
        (loop for item in events-before-ft2
              until (or quit.looking (null item)) do
              (let* ((box (first item))
                     (number-of-tray-predecessors (length (kk.get.values (box boxes) 'tray-p
redecessor)))) ;get.value => kk.get.value CRJ 4/17/89
                 ;;   added above line and check below until we handle multiple predecessors in
 inventory     DHO     2-21-89
                (when (and (not (equal "ASSEMBLY2   " (get.value oper 'short-name)))
                           (equal oper (kk.get.value (box boxes) 'operation)))    ;; fix on 8
-16-89   DHO
                  (find-non-negative-operation box)))
              (setq events-before-ft2 (remove item events-before-ft2 ))))))))

(defun recompute-machines-ft2 ()
  "Function to recalculate each machines frozen time 2 after inventory has been considered"
  (let* ((window (get.value 'scheduler-gantt-chart 'window))
         (gantt-chart (window-stream-get window 'gantt-chart))
         done revised-ft2)
    (loop for machine in (unit.descendants 'machines 'member) do
          (setq done nil)
          (loop for box = (next-setup-or-process-box nil machine)
                then (next-setup-or-process-box box machine)
                until done do
                (cond ((not box)                                          ;;  check to ma
ke sure something is scheduled on this machine
                       (setq done T))
                      ((and (not (eq (get.value box 'box-type) 'E))          ;;  find first box
scheduled (not from prior schedule)
                            (not (get.value box 'from-previous-schedule)))
                       (setq done T)
                       (if (previous-setup-or-process-box box)
                           (setq  revised-ft2 (max (get.value (previous-setup-or-process-box box
) 'end-time)
                                                   (get.value  control-unit 'frozen-time-1)))
                           (setq  revised-ft2 (get.value 'control-unit 'frozen-time-1)))
                       (put.value machine 'frozen-time-2 revised-ft2)))))   ;;  updated frozen t
ime 2 for the machine
    (display-ft2-bars gantt-chart window)))

(defun verify-inventory-for-ft-events (order-of-inventory-use)
  "Function to check to be sure inventory is available to feed the events in frozen time"
  (let* (prev-sched-events)
    (loop for operation in order-of-inventory-use do          ;;  check each operation for event
s in frozen time
          (setq prev-sched-events (scheduled-boxes-before-ft2 operation t))
          (loop for box in prev-sched-events do              ;; loop for events in frozen time
                (let* ((tray (kk.get.value (box boxes) 'tray))  ;get.value => kk.get.value CRJ 4
/17/89
                       (part-routing (if tray (get.value (kk.get.value (tray trays-in-system) 'p
art-id) 'routing)))
                       (current-operation (kk.get.value (box boxes) 'operation))
                       inventory-operation list-of-opers bill-of-matl-parts part last-oper
                       quit match found-inventory);; DHO   6-12
                  (if part-routing
                      (loop for oper in part-routing
                            until match do
                            (when (eq oper current-operation)
                              (setq match t)
                              (setq inventory-operation last-oper))
                            (setq last-oper oper)))
                  (when (not inventory-operation)                          ;;;  all new from here to
 ......   DHO   6-12-89
                    (setq part (get.value tray 'part-id))
                    (setq bill-of-matl-parts (get.value (car (last (get.value part 'routing))) '
bill-of-material-parts))
```

```
                (loop for entry in bill-of-matl-parts do
                      (when (not (eq (car entry) part))
                        (setq list-of-opers (append list-of-opers (last (get.value (car entr
y) 'routing))))))) ;; .....
              (when inventory-operation
                (setq list-of-opers (list inventory-operation)) )    ;;; added DHO   6-12-89
              (if list-of-opers
                  (loop for reqd-inventory in list-of-opers       ;;; added this too  6-12-89
                        unless quit do
                        ;;  all occurrences of inventory-operation change to reqd-inventory
from here to end   6-12-89   DHO
                        (loop for entry in (get.values reqd-inventory 'on-hand-wip)  ;; look
 for inventory at predecessor oper
                              until (or (null entry) found-inventory) do
                              (let* ((inventory (first entry)) (time-available (second entry
) flag (third entry)))
                                (let* ((old-value (list inventory time-available flag))
                                       updated-inventory)
                                  (when (and (> inventory 0)     ;;  changed when to cond
 6-12-89
                                             (= time-available 0))
                                    (setf inventory (1- inventory))         ;; decrement
inventory
                                    (setf updated-inventory (list inventory time-availa
ble flag))
                                    (replace.value reqd-inventory 'on-hand-wip old-valu
e updated-inventory)
                                    (setq found-inventory t))))
                        (when (not found-inventory)
                          (setq quit t))))   ;;   )
                  (setq found-inventory t))

              (when (not found-inventory)
                (delete-event box))))))

(defun scheduled-boxes-before-ft2 (operation &optional prev-sched-only)
  " Function to find (a) all scheduled (by ESS) boxes before FT2 and (b) all boxes from the
    previous schedule.  Each is returned as a list from this function. "
  (let* ((boxes-ft2 nil)
         (prior-sched nil)
         (sorted-event-list nil)
         (machines-looked-at nil)
         (number-machines 0)
         (end-activities-time (get.value *control-unit* 'end-of-activity-list)))
    (loop for entry in (get.values operation 'preferred-machines) do
          (setq number-machines (length entry))
          (dotimes (count number-machines)
            (let* ((machine (nth count entry))
                   (quit-looking nil)
                   start-time)
              (when (not (member machine machines-looked-at))
                (loop for box = (get.value machine 'first-box-on-machine)
                      then (kk.get.value (box boxes) 'same-machine-successor)
                      until (or (null box) quit-looking) do
                      (setq start-time (kk.get.value (box boxes) 'start-time))
                      (when (> start-time end-activities-time)
                        (setq quit-looking t))
                      (when (memq (kk.get.value (box boxes) 'box-type) '(P X))
                        (cond (prev-sched-only
                               (when (and (kk.get.value (box boxes) 'from-previous-schedule)
                                          (not (kk.get.value (box boxes) 'same-tray-predecessor))

                                          (eq (kk.get.value (box boxes) 'operation) operation))
                                 (setq prior-sched (append prior-sched (list box)))))
                              ((not (kk.get.value (box boxes) 'from-previous-schedule))
                               (setq boxes-ft2 (append boxes-ft2 (list (list box start-time)))))
                              (t (when (not (kk.get.value (box boxes) 'same-tray-successor))
                                   (setq prior-sched (append prior-sched (list box))))))))
                (setq machines-looked-at (append machines-looked-at (list machine)))))))
    (setq sorted-event-list (sort boxes-ft2 #'sort-by-time ))
```

```
    (if  prev-sched-only
         prior-sched
     (list sorted-event-list prior-sched))))

 (defun delete-event (box)
   "This function deletes events from frozen time if no inventory is available and
   resets slot information so that new activity id's can be computed"
  (let* ((same-machine-predecessor (previous-movable-box box))
        (same-machine-successor (next-movable-box box (kk.get.value (box boxes) 'machine)))
        (same-tray-successor (kk.get.value (box boxes) 'same-tray-successor))
        (same-tray-predecessor (kk.get.value (box boxes) 'same-tray-predecessor))
        (current-tray (kk.get.value (box boxes) 'tray))
        (machine (kk.get.value (box boxes) 'machine))
        (trays 0)
        no-activity-ids tray new-tray match)
    (loop for entry in (get.values machine 'deleted-event-from-ft2)
          until match do
          (when (eq (first entry) (unit.name (kk.get.value ((kk.get.value (box boxes) 'tray) tra
ys-in-system) 'part-id)))
            (setq trays (+ (second entry) 1))
            (replace.value machine 'deleted-event-from-ft2 (get.value machine 'deleted-event-fro
m-ft2)
                           (list (unit.name (kk.get.value ((kk.get.value (box boxes) 'tray) tray
s-in-system) 'part-id)) trays))
            (setq match t)))
    (when (not match)
      (add.value machine 'deleted-event-from-ft2
                (list (unit.name (kk.get.value ((kk.get.value (box boxes) 'tray) trays-in-syste
m) 'part-id)) 1)))
    (remove-box box)
    (delete-setups-as-required box)
    (#o6Arecycle-box box)
    ;;  added the next 5 lines to handle case of single process with a setup from previous sche
dule with no feeding inventory     DHO     5-24-89
;     (when (and same-machine-predecessor same-machine-successor
;              (eq (get.value same-machine-predecessor 'box-type) 'S)
;              (eq (get.value same-machine-successor 'box-type) 'S))
;       (remove-box same-machine-predecessor)
;       (recycle-box same-machine-predecessor))
;    (when same-machine-predecessor
;      (delete-setups-as-required same-machine-predecessor))
    (when same-machine-successor
      ;(delete-setups-as-required same-machine-successor)
      (loop for event = same-machine-successor
            then (kk.get.value (event boxes) 'same-machine-successor)
            until no-activity-ids do
            (setq same-tray-predecessor (kk.get.value (event boxes) 'same-tray-predecessor))
            (cond ((kk.get.value (event boxes) 'from-previous-schedule)
                   (setq tray (kk.get.value (event boxes) 'tray))
                   (setq new-tray (get-any-tray-from-free-pool 'wip-and-spares-trays))
                   (remove.all.values event 'activity-id)
                   (kk.put.value (new-tray trays-in-system) 'final-box (kk.get.value (tray trays
-in-system) 'final-box))
                   (kk.put.value (new-tray trays-in-system) 'initial-box (kk.get.value (tray tra
ys-in-system) 'initial-box))
                   (kk.put.value (new-tray trays-in-system) 'part-id (kk.get.value (tray trays-i
n-system) 'part-id))
                   (kk.put.value (new-tray trays-in-system) 'maximum-tray-size (kk.get.value (tr
ay trays-in-system) 'maximum-tray-size))
                   (kk.put.value (new-tray trays-in-system) 'tray-size (kk.get.value (tray trays
-in-system) 'tray-size))
                   (when (or (when same-tray-predecessor (not (eq tray (get.value same-tray-pred
ecessor 'tray))))
                             (not (kk.get.value (event boxes) 'same-tray-predecessor)))
                     (recycle-tray-to-free-pool tray))

                   (put.value event 'tray new-tray))
                  ((not (kk.get.value (event boxes) 'from-previous-schedule))
                   (setq no-activity-ids t)))))
;   (remove-box box)                              ;;    moved these calls    DHO  5-24-89
;   (#o6Arecycle-box box)
    (cond (same-tray-successor
```

```
(recycle-tray-to-free-pool current-tray)
(delete-event same-tray-successor))
(t (recycle-tray-to-free-pool current-tray)))))

(defun find-non-negative-operation (negative-box)
  " Find first operation scheduled in positive time where we can use safety stock for its predec
essor operation
    or the final operation in the routing"
  (let* ((part nil)
         (found nil)
         (previous-box nil)
         (fti-time (get.value *control-unit* 'frozen-time-i))
         (tray (kk.get.value (negative-box boxes) 'tray)) ;get.value => kk.get.value CRJ 4/17/89
         (last-scheduled-operation (car (last (kk.get.value (tray trays-in-system) 'routing))))
         (negative-operation (kk.get.value (negative-box boxes) 'operation)) ;get.value => kk.ge
t.value CRJ 4/17/89
         operation)
    (loop for box = negative-box
          then (kk.get.value (box boxes) 'same-tray-successor)
          until (or (null box) part) do
          (cond ((eq last-scheduled-operation negative-operation)
                 (setq operation (unit.name negative-operation))
                 (setq part (unit.name (kk.get.value (tray trays-in-system) 'part-id)))
                 (setq found (find-safety-stock part operation box)))
                ((> (kk.get.value (box boxes) 'start-time) fti-time)
                 (setq part (unit.name (kk.get.value ((kk.get.value (box boxes) 'tray) trays-in-
system) 'part-id)))
                 (loop for safety-stock-box = box
                       then (kk.get.value (safety-stock-box boxes) 'same-tray-successor)
                       until (or (null safety-stock-box) found) do
                       (setq previous-box (kk.get.value (safety-stock-box boxes) 'same-tray-pred
ecessor))
                       (if previous-box
                           (setq operation (unit.name (kk.get.value (previous-box boxes) 'operat
ion)))
                           (setq operation (unit.name (kk.get.value (safety-stock-box boxes) 'op
eration))))
                       (setq found (find-safety-stock part operation box))))))
    (cond ((not found)
           (setq part (kk.get.value ((kk.get.value (negative-box boxes) 'tray) trays-in-system)
'part-id))
           (setq found (find-safety-stock part negative-operation negative-box))))))

(defun find-safety-stock (part operation box)
  " Find if safety stock exists for a part operation combination"
  (let ((match nil)
        ;(part-id (get.value operation 'part-id)) ;No need.  See below CRJ 5/9/89
        machine inventory)
    (loop for entry in (get.values operation 'safety-stock)
          until (or (null entry) match) do

          ;; Changed (equal part part-id) to (eq (unit operation) (unit (kk.get.value (box boxes
) 'operation)))
          ;; to solve problem where inventory was used for the wrong part-operation. CRJ 5/9/89
          (cond ((eq (unit operation) (unit (kk.get.value (box boxes) 'operation)))
                 (setq machine (kk.get.value (box boxes) 'machine))     ;get.value => kk.get.valu
e CRJ 4/17/89
                 (setq inventory (first entry))
                 (cond ((> inventory 0)
                        (setq inventory (- (first entry) 1))          ;; decrement inventory
                        (replace.value operation 'safety-stock entry (list inventory (second ent
ry)))
                        (update-safety-stock-used operation part)
                        (find-tray-predecessors operation box) ; Throw out the predecessor boxes
 feeding into this one
                        (setq match t))))))
    match))

(defun update-safety-stock-used (operation part)
  " Function to update the amount of safety stock used during schedule generation"
  (let* ((safety-stock-used 0)
```

```
        (part-in-safety-stock (get.value operation 'part-id))
        (found nil))
    (loop for entry in (get.values operation 'safety-stock-used)
          until (or (null entry) found) do
          (cond ((equal part-in-safety-stock part)
                 (setq safety-stock-used (+ (first entry) 1))
                 (setq found t)
                 (replace.value operation 'safety-stock-used entry (list safety-stock-used))))
    (if (not found)
        (add.value operation 'safety-stock-used (list 1)))))

(defun verify-remaining-setups (process-box)
  "Used to check if any setups are to be rescheduled or deleted based on inventory usage"
  (let* (same-machine-predecessor same-machine-successor
         machine-predecessor-predecessor prior-event next-event)
    (loop for box = (kk.get.value (process-box boxes) 'same-machine-predecessor)  ;get.value =>
kk.get.value CRJ 4/17/89
          then (kk.get.value (box boxes) 'same-machine-predecessor)
          until (or (null box) prior-event) do
          (cond ((memq (kk.get.value (box boxes) 'box-type) '(P X S))  ;get.value => kk.get.valu
e CRJ 4/17/89
                 (setq prior-event t)
                 (setq same-machine-predecessor box))))
    (loop for box = (kk.get.value (process-box boxes) 'same-machine-successor)
          then (kk.get.value (box boxes) 'same-machine-successor)
          until (or (null box) next-event) do
          (cond ((memq (kk.get.value (box boxes) 'box-type) '(P X S))
                 (setq next-event t)
                 (setq same-machine-successor box))))
    (cond ((and same-machine-predecessor same-machine-successor)
           (cond ((and (equal (kk.get.value (same-machine-predecessor boxes) 'box-type) 'S)
; prior and successor are setups
                       (equal (kk.get.value (same-machine-successor boxes) 'box-type) 'S))
                  (setq machine-predecessor-predecessor (kk.get.value (same-machine-predecessor
boxes) 'same-machine-predecessor))
                  (cond ((and machine-predecessor-predecessor                          ;  see i
f we had done an add2
                              (kk.get.value (machine-predecessor-predecessor boxes) 'tray))
                         (cond ((same-pvor-p machine-predecessor-predecessor same-machine-succes
sor)
                                (pick-up-setup-boxes same-machine-predecessor same-machine-successo
r))  ;  pick up right setup box too
                               (t (when (not (memq (kk.get.value (same-machine-successor boxes) 'b
ox-type) '(P X)))
                                    (setq same-machine-successor (next-process-box same-machine-su
ccessor
                                                                                  (kk.get.value (
process-box boxes) 'machine))))
                                  (check-for-setup-time-change machine-predecessor-predecessor s
ame-machine-successor)
                                  (pick-up-setup-boxes nil same-machine-predecessor))))     ; dele
te only the seup box to the left
                        (t (pick-up-setup-boxes nil same-machine-predecessor))))
                 ((equal (kk.get.value (same-machine-predecessor boxes) 'box-type) 'S)
; only predecessor is a setup
                  (cond ((memq (kk.get.value (same-machine-successor boxes) 'box-type) '(P X))
; process follows box to delete
                         (will-setup-fit same-machine-predecessor same-machine-successor)   ; re
schedule the setup prior to the deleted box
                         (setq same-machine-predecessor nil))))))
          (same-machine-predecessor                              ; only has a predecessor
           (cond ((equal (kk.get.value (same-machine-predecessor boxes) 'box-type) 'S)
                  (pick-up-setup-boxes nil same-machine-predecessor)))))))

(defun check-for-setup-time-change (from-box to-box)
  "If deleting a process and setup need to check for expanding or shrinking setup box to the ri
ght"
  (let* ((old-setup-end (kk.get.value (to-box boxes) 'end-time)) ;get.value => kk.get.value CRJ
4/17/89
         (old-setup-start (kk.get.value (to-box boxes) 'start-time)) ;get.value => kk.get.value
CRJ 4/17/89
         (machine (kk.get.value (to-box boxes) 'machine)) ;get.value => kk.get.value CRJ 4/17/89
```

```
        (old-setup-time (- old-setup-end old-setup-start))
        (new-setup-time (get-setup-time from-box to-box machine)))
  (cond ((not (equal old-setup-time new-setup-time))              ; setup time changed?
        (kk.put.value (to-box boxes) 'start-time (- old-setup-end new-setup-time))
        (kk.put.value (to-box boxes) 'end-time old-setup-end)))))

(defun will-setup-fit (setup-box successor-box)
   " Function to determine if a rescheduled setup will fit in the desired time gap"
   (let* ((setup-start (kk.get.value (setup-box boxes) 'start-time)) ;get.value => kk.get.value
CRJ 4/17/89
          (setup-end (kk.get.value (setup-box boxes) 'end-time)) ;get.value => kk.get.value CRJ
4/17/89
          (setup-duration (- setup-end setup-start))
          rescheduled)
     (loop for box = successor-box
           then (kk.get.value (box boxes) 'same-machine-predecessor)
           until (or (null box) rescheduled) do
           (let* ((successor-start (if box
                                       (kk.get.value (box boxes) 'start-time)))
                  (successor-predecessor (if successor-start
                                             (kk.get.value (box boxes) 'same-machine-predecess
or)) ;get.value => kk.get.value CRJ 4/17/89
                                             nil))
                  (successor-predecessor-start (if successor-predecessor
                                                   (kk.get.value (successor-predecessor boxes)
'start-time)
                                                   *plus-infinity*))
                  successor-predecessor-end)
             (if (not rescheduled)
                 (cond ((memq (kk.get.value (successor-predecessor boxes) 'box-type) '(D U))
                        (setq successor-predecessor-end (if successor-predecessor
                                                            (kk.get.value (successor-predecess
or boxes) 'end-time)
                                                            *minus-infinity*))
                        (if (> (- successor-start setup-duration) successor-predecessor-end)
                          (reschedule-setup setup-box box box)
                          (let* ()
                            (loop for prior-box = successor-predecessor
                                  then (kk.get.value (prior-box boxes) 'same-machine-predece
ssor)
                                  until (or (null box) (not (memq (kk.get.value (prior-box b
oxes) 'box-type) '(D U)))) do
                                  (setq successor-predecessor prior-box))
                            (setq successor-predecessor-end (if successor-predecessor
                                                                (kk.get.value (successor-pred
ecessor boxes) 'end-time)
                                                                *minus-infinity*))
                            (reschedule-setup setup-box successor-predecessor box)))
                        (setq rescheduled t))
                       ((t (> (- successor-start setup-duration) successor-predecessor-start)
                        (reschedule-setup setup-box box box)
                        (setq rescheduled t))
                       ((equal setup-box (kk.get.value (box boxes) 'same-machine-predecessor)
) ;get.value => kk.get.value CRJ 4/17/89
                        (setq rescheduled t))))))))     ; our setup box is already there

(defun reschedule-setup (setup-box successor-box successor-process-box)
   " Reschedule a setup if it preceded a process that was deleted"
   (if setup-box
         (let* ((batching-gap (get.value *control-unit* 'gap-for-batching))
                (tray (kk.get.value (successor-process-box boxes) 'tray)) ;get.value => kk.get.
value CRJ 4/17/89
                (machines-to-batch (kk.get.value (tray trays-in-system) 'machines-to-batch))
                (machine-class (unit.parents (kk.get.value (successor-process-box boxes) 'machi
ne) 'member))
                (machine (kk.get.value (setup-box boxes) 'machine))
                (batching-for-part (if (member machine-class machines-to-batch)
                                       batching-gap
                                       0))
                (setup-end (- (kk.get.value (successor-box boxes) 'start-time) batching-for-par
```

```
t))
                (old-setup-start (kk.get.value (setup-box boxes) 'start-time))
                (old-setup-end (kk.get.value (setup-box boxes) 'end-time))
                (setup-duration (-  old-setup-end old-setup-start)))
             (remove-box setup-box)
         (insert-box setup-box nil successor-box)
         (kk.put.value (setup-box boxes) 'tray (get.value (next-movable-box setup-box machine) '
tray))
         (kk.put.value (setup-box boxes) 'start-time (- setup-end setup-duration))
         (kk.put.value (setup-box boxes) 'end-time setup-end))))

(defun pick-up-setup-boxes (right-setup-box left-setup-box)
  " Function to remove and recycle setup boxes"
     (cond (right-setup-box
           (remove-box right-setup-box)          ; get rid of setup preceding the process
           (recycle-box right-setup-box)))
    (remove-box left-setup-box)                  ; get rid of the right setup box
    (recycle-box left-setup-box))

(defun pick-up-setup-boxes-aux (box)
  " Function to remove and recycle setup boxes"
  (let* ((left-box-predecessor (previous-movable-box box))
         (left-box-successor (next-movable-box box (kk.get.value (box boxes) 'machine))))
    (if left-box-successor
        (cond ((and (same-pvor-p left-box-predecessor left-box-successor)
                    (eq (kk.get.value (left-box-successor boxes) 'box-type) 'S))  ;get.value -> kk.
get.value CRJ 4/17/89
             (remove-box left-box-successor)     ; get rid of next setup because it's same pvor a
s prior
             (recycle-box left-box-successor))))))

(defun find-tray-predecessors (operation current-box &optional linked-to-box)
   (let* ((next-box (kk.get.value (current-box boxes) 'same-tray-successor))
          boxes-to-delete quit)
      (cond (next-box
             (kk.put.value (next-box boxes) 'inventory operation) ;put.value -> kk.put.value CRJ
 4/17/89
             (cond ((linked-to-box
                    (add.value next-box 'same-tray-predecessor linked-to-box)    ;; added to lin
k prev sched box   DHO 1-23
                    (remove.value next-box 'same-tray-predecessor (unit current-box))
                    (kk.put.value (linked-to-box boxes) 'same-tray-successor next-box)) ;CRJ 4/1
7 89
                   (t (remove.value next-box 'same-tray-predecessor (unit current-box))))))
      (loop for box = current-box
           then (kk.get.value (box boxes) 'same-tray-predecessor)
           until (or (null box) quit) do
           (when (kk.get.value (box boxes) 'from-previous-schedule)
              (remove.all.values box 'same-tray-successor)             ;; quick fix for hanging
pointers   2-9-89
              (setq quit t))
           (if (not quit)
                (setq boxes-to-delete (append boxes-to-delete (list box)))))
      (delete-predecessors boxes-to-delete)))

(defun delete-predecessors (boxes-to-delete)
  " Takes a list of boxes to be deleted and checks to see whether any of them came from inventor
y.  If so,
    we need to update the inventory status.  We call update-inventory-status. Then we recycle th
e boxes"
  (loop for box in (reverse boxes-to-delete)                        ;; added reverse to get right
 sequence
        for tray = (kk.get.value (box boxes) 'tray)
        for final-box = (kk.get.value (tray trays-in-system) 'final-box)
        do
;          (cond ((kk.get.value (box boxes) 'inventory)                ;; keep this commented o
ut stuff for now  DHO  11-30-88
;                  (update-inventory-status box)))
;          (cond ((equal (kk.get.value (box boxes) 'inventory) 'ASSIGNED)
;                  (remove.all.values box 'same-tray-successor)
;                  (setq inventory-tray
```

```
;       (inventory-tray-info (kk.get.value ((kk.get.value (box boxes) 'tray) trays-in-system) 'p
art-id)
;                                                          (kk.get.value (box boxes) 'operation) bo
x nil))
;                (put.value inventory-tray 'initial-box box))
;               (t
;          if (equal id : first-box)
;              (put.value (kk.get.value (box boxes) 'tray) 'initial-box (kk.get.value (box boxes)
 'same-tray-successor))
        (when (eq box (kk.get.value (tray trays-in-system) 'initial-box))

          (kk.put.value (tray trays-in-system) 'initial-box (kk.get.value (box boxes) 'same-tray
-successor)))
        (verify-remaining-setups box)
        (pick-up-setup-boxes-aux box)
        (remove-box box)
        (recycle-box box)
        (when (eq final-box box)                                 ;; recycle tray if required
          (recycle-tray-to-free-pool tray))))


(defun update-inventory-status (box)  ;;; yyy no longer used
  ;; relative to above -- true, but keep in file as this or something similar may again be neede
d  DHO    12-5-88
  " We update the safety-stock slot of the operation unless we are already at the maximum numbr
 of
    trays of safety stock-  Then we add the tray to the wip slot of the operation"
  (let* (found match part-on-box operation part actual-safety-stock max-safety-stock max-reached
 time-available)
    (setq part-on-box (unit.name (kk.get.value '((kk.get.value (box boxes) 'tray) trays-in-system
) 'part-id)))
    (setq time-available (kk.get.value (box boxes) 'end-time))
    (loop for value in (get.values (setq operation (kk.get.value (box boxes) 'operation)) 'safet
y-stock)
          until found do
          (setq part (get.value operation 'part-id))
          (setq actual-safety-stock (first value))
          (setq max-safety-stock (second value))
          (cond ((equal part-on-box part)
                 (cond ((< actual-safety-stock max-safety-stock)
                        (replace.value operation 'safety-stock value (list (+ actual-safety-stoc
k 1) max-safety-stock))
                        (setq found t))
                       (t (setq found t)
                          (setq max-reached t))))))
    (if (not found)
        (add.value operation 'safety-stock (list 1 3)))
    (cond (max-reached
           (loop for value in (get.values operation 'on-hand-wip)
                 until match do
                 (setq part (get.value operation 'part-id))
                 (cond ((equal part-on-box part)
                        (replace.value operation 'on-hand-wip value (list (- (first value) 1) (s
econd value)
                                                                            (third value)))
                        (add.value operation 'on-hand-wip value (list 1 time-available 'y))
                        (setq match t))))
           (if (not match)
               (add.value operation 'on-hand-wip (list 1 time-available 'y))))))

(defun tray-waiting-to-be-scheduled (box operation tray)
  box operation tray ;; ignore
  nil)

(defun schedule-unassigned-parts ()
  ;; This takes the previous schedule and:
  ;; (1) lays it down at -infinity,
  ;; (2) shifts it right to jump over downtimes
  ;; (3) deletes boxes past t2
  ;; (4) links up the trays for these boxes
  ;; (5) updates wip based on the initial and final boxes on each tray-
```

```
;; (6) shifts all these boxes back to -infinity to prepare for backscheduling-
(create-unassigned-boxes)
(link-previous-schedule-boxes)
(shift-schedule-right)
(delete-past-ft2)
(fix-tray-box-links)
(check-tray-boxes)
(check-inventory)
(reset-ft2)
(check-setups)
(shift-to-minus-infinity)
t))

(defun create-unassigned-boxes ()
  "Take and schedule any parts that remain in the startup-status slot of the machines units"
  (let* ((bc-time (get.value *control-unit* 'BUILD-CONTEXT-TIME))
         (ft1-time (get.value *control-unit* 'frozen-time-1))
         (machines (unit.descendants 'machines 'member)))
    (loop for machine in machines do
          (setq *last-oper-box-end* *minus-infinity*)
          (put.value machine 'frozen-time-2 ft1-time)          ;; default to ft1
          (loop for unassigned-parts in (get.values machine 'startup-activity-status)
                when unassigned-parts
                do
                (create-unassigned-box unassigned-parts bc-time machine 'ACTIVITY))
          (loop for unassigned-parts in (get.values machine 'startup-operation-status)
                when unassigned-parts
                do
                (create-unassigned-box unassigned-parts bc-time machine 'OPERATION)))))

(defun create-unassigned-box (unassigned-parts bc-time machine status-type)
  (loop for part-list in unassigned-parts do
        (let* ((operation (first part-list))
               (part (get.value operation 'part-id))
               (event-type (fourth part-list)))
          (when (or (and part operation) (equal event-type 'PM)) ;; PM or part/op
            (let* ((process-time (second part-list))
                   (start-time (max bc-time (third part-list)))
                   (end-time (when (and (numberp process-time)(numberp start-time))
                               (+ start-time process-time)))
                   (box (boxes-get-empty-box 'boxes))
                   (activity-id (fifth part-list))
                   (box-type event-type)
                   (ft2 (or (get.value machine 'frozen-time-2) 0))
                   tray)
              (when (< start-time *last-oper-box-end*)
                (setq start-time *last-oper-box-end*)          ;;   if MANFOPRN activities are s
cheduled to start before
                (setq end-time (+ start-time process-time)))   ;;   the current activity (MANFAC
TV) reset start/end times
                (setq *last-oper-box-end* end-time)
              (when (and part operation)
                (setq tray (inventory-tray-info part operation box activity-id)))
              (when (equal event-type 'PM)
                (kk.put.value (box boxes) 'operation operation)
                (kk.put.value (box boxes) 'strings (list "PM"))
                (box-highlight! box 1 'grey))
              (when (> end-time ft2)
                (put.value machine 'frozen-time-2 end-time))
             (kk.put.value (box boxes) 'box-type box-type)
             (if (equal (kk.get.value (box boxes) 'box-type) 'S)
                 (kk.put.value (box boxes) 'strings '("S")))
             (kk.put.value (box boxes) 'from-previous-schedule status-type)
             (kk.put.value (box boxes) 'activity-id activity-id)
             (link-same-machine box machine process-time start-time bc-time)
             ;;(update-inventory-status box)
             )))))

(defun link-previous-schedule-boxes ()
 ;; This fixes up the same-tray-predecessor/successor links-
 (let* ((l (loop for box in (unit.children 'boxes 'member)
```

```lisp
                when (kk.get.value (box boxes) 'activity-id)
                collect (list box (kk.get.value (box boxes) 'activity-id))))
          (sorted-l (sort l #'(lambda (a b) (string< (second a) (second b))))))
    (loop for rest-of-l on sorted-l do
          (let* ((first-item (first rest-of-l))
                 (first-box (first first-item))
                 (first-id (second first-item))
                 (second-item (second rest-of-l)))
            (when (not (eq 'B (kk.get.value (first-box boxes) 'box-type)))       ;get.value => k
k.get.value CRJ 4/17/89
              (when (and second-item (eq 'B (get.value (first second-item) 'box-type)))
                (setq second-item (third rest-of-l)))
              (let* ((second-box (first second-item))
                     (second-id (second second-item)))
                (when (and first-item second-item first-box second-box first-id second-id
                           (string= (get-activity-id-tray first-id)
                                    (get-activity-id-tray second-id))
;;; needed in case where a predecessor (first-box) was in MANFOPRN and second-box was a current
activity   DHO 12-13
                           (not (eql (kk.get.value (second-box boxes) 'from-previous-schedule) '
ACTIVITY))
                           (not (string= first-id second-id)))          ;; This is for setups not
 pointing to their P's
                  (let* ((op1 (kk.get.value (first-box boxes) 'operation))
                         (op2 (kk.get.value (second-box boxes) 'operation)))
                    (cond ((eq op1 op2)
                           (format T "~% Bad activity-id linking box ~a op ~a with box ~a op ~a~%"

                                   first-box second-box op1 op2))
                          ((and (not (eq op1 op2))
                                (valid-next-operation second-box op1 op2))
                           (kk.put.value (first-box boxes) 'same-tray-successor second-box)
                           (kk.put.value (second-box boxes) 'same-tray-predecessor first-box))
                          (t nil)))))))))))

(defun valid-next-operation (box op1 op2)
  " Function to insure that FCS passed trays can be linked (i-e- valid routing)"
  (let* ((tray (get.value box 'tray))
         (part (if tray (get.value tray 'part-id) nil))
         (routing (if part (get.value part 'routing) nil))
         done first-operation)
    (when routing
      (loop for oper in routing until done do
            (when first-operation
              (if (eq op2 oper)
                  (setq done t)
                  (setq first-operation nil)))
            (when (eq oper op1)
              (setq first-operation oper))))
    done))

(defun check-operation-links ()
  (loop for box in (unit.children 'boxes 'member)
        when (kk.get.value (box boxes) 'activity-id) do
        (let* ((next-box (kk.get.value (box boxes) 'same-tray-successor)))
          (when next-box
            (let* ((tray (kk.get.value (box boxes) 'tray))
                   (part (kk.get.value (tray trays-in-system) 'part-id))
                   (routing (get.value part 'routing))
                   (operation (unit (kk.get.value (box boxes) 'operation) nil nil 'dontask))
                   (next-operation (unit (kk.get.value (next-box boxes) 'operation) nil nil 'don
task))
                   (rest-of-routing (member operation routing)))
              (if (not (and routing rest-of-routing))
                  (format T "~% Bad routing on box ~a tray ~a ~a ~a ~a~%" box tray routing rest-
of-routing operation)
                  (when (not (equal next-operation (second rest-of-routing)))
                    (format T "~% Invalid operation from box ~a op ~a to box ~a op ~a on tray ~a
~%      routing ~a~%"
                            (unit.name box) operation (unit.name next-box) next-operation (unit.
name tray) routing)))))))))
```

```
(defun link-same-machine (box machine process-time &optional orig-start-time bc-time)
  "Places this box in BC time"
  (let* ((start-time (+ *minus-infinity* (- orig-start-time bc-time)))     ;; put it way back to
 the left
         (first-box (get.value machine 'first-box-on-machine))
         left-box right-box end-time)
    ;; Find the left-box and right-box to insert this box in between-
    (loop for tbox = first-box
          then (kk.get.value (tbox boxes) 'same-machine-successor)  ;get.value => kk.get.value C
RJ 4/17/89
          until (or (null tbox)
                    right-box) do
          (when (>= (kk.get.value (tbox boxes) 'start-time) start-time)
            (setf right-box tbox)
            (setf left-box (kk.get.value (right-box boxes) 'same-machine-predecessor))))
    (when (or (and left-box (> (kk.get.value (left-box boxes) 'end-time) start-time)))
      ;;(and right-box (> (kk.get.value (right-box boxes) 'start-time) (kk.get.value (box boxes)
 'end-time))))
      (y-or-n-p "Generate-fixed-events trying to overlap two events at time ~A machine ~A~%"
                (utime-to-string orig-start-time) machine))
    (setq end-time (+ start-time process-time))
    (kk.put.value (box boxes) 'machine machine)
    (kk.put.value (box boxes) 'start-time start-time)
    (kk.put.value (box boxes) 'end-time end-time) ;; 'own nil :no-av t)
    (kk.put.value (box boxes) 'inventory 'ASSIGNED)
    (if (not (eq 'ACTIVITY (kk.get.value (box boxes) 'from-previous-schedule)))

        (setq left-box (third (first (pockets-in-range machine start-time end-time)))))
    (if left-box
        (insert-box box left-box nil)
        ;; else error -- there are overlapping events in the old schedule
        ;(progn
          (format T "~%Error in old schedule:  Overlapping events on machine ~a start-time ~a" (
unit.name machine)
                  (utime-to-string orig-start-time))
          nil))))

(defun delete-past-ft2 ()
  ;; Delete all the boxes past frozen-time-2.
  (loop for box in (unit.children 'boxes 'member)
        when (eq 'OPERATION (kk.get.value (box boxes) 'from-previous-schedule))
        do
        (when (and (not (memq (kk.get.value (box boxes) 'box-type) '(D U)))
                   (>= (kk.get.value (box boxes) 'start-time)
                       (cutoff-time (kk.get.value (box boxes) 'machine))))     ;;  improve this c
ode -- don't recalculate each ft2
          ;; again and again -- only once
                           DHO       1-18-89
          (let* ((prev-box (kk.get.value (box boxes) 'same-machine-predecessor)))
            (when (and prev-box (eq 'S (kk.get.value (prev-box boxes) 'box-type))) ;get.value =>
 kk.get.value CRJ 4/17/89
              (remove-box prev-box)
              (recycle-box prev-box)))
          (delete-successors box))))

(defun cutoff-time (machine)
   "This determines the FT2 cutoff time for a given machine.  It takes
   into account any downtime that might be scheduled for the machine.
   (FT2 is adjusted forward so that ESS has time to properly schedule
   events in the MANFCRRN file.  DELETE-PAST-FT2 calls this function."
  (let* ((done nil)
         (ft2-cutoff 0)
         (bc-time (get.value 'control-unit 'build-context-time)))
    (loop for entry in (get.values 'control-unit 'frozen-time-2-cutoff)
          until done
          (when (eql (unit.name machine) (first entry))
            (let* ((machine (first entry))
                   (ft2-duration (* (second entry) 3600)))
              (setq ft2-cutoff (+ bc-time ft2-duration))
              (loop for box = (get.value machine 'first-box-on-machine)
                    then (kk.get.value (box boxes) 'same-machine-successor)
```

```
                    until (null box)
                    when (and (> (kk.get.value (box boxes) 'end-time) bc-time) ;get.value => kk.
get.value DRJ 4/17/89
                              (memq (kk.get.value (box boxes) 'box-type) '(D U))) do
                    (if (> ft2-cutoff (kk.get.value (box boxes) 'start-time))
                        (incf ft2-cutoff (- (kk.get.value (box boxes) 'end-time) (max (kk.get.va
lue (box boxes) 'start-time) bc-time))));)
              (setq done t))))
    (when (not done)
      (format t "~% no cutoff time for machine ~a " (unit.name machine))
      (setq ft2-cutoff (+ bc-time (* 3 3600))))
    ft2-cutoff))

(defun delete-successors (box)
  ;; Delete all successors to this box; go down the machine and tray successor paths-
  (when box
    (delete-successors (kk.get.value (box boxes) 'same-machine-successor))
    (delete-successors (kk.get.value (box boxes) 'same-tray-successor))
    (when (and (not (memq (kk.get.value (box boxes) 'box-type) '(D E U)))
               (not (eq 'ACTIVITY (kk.get.value (box boxes) 'from-previous-schedule))))        ;;
 insure we don't delete a current activity
      (remove-box box)
      (let* ((prev-box (kk.get.value (box boxes) 'same-tray-predecessor)))
        (when prev-box

          (remove.all.values prev-box 'same-tray-successor)))
      (recycle-box box))))

(defun fix-tray-box-links ()
  ;; This computes the initial-box and final-box slots for trays-
  (loop for box in (unit.children 'boxes 'member) do
        (when (memq (kk.get.value (box boxes) 'box-type) '(F X))
          (let* ((tray (kk.get.value (box boxes) 'tray)))
            (when (and (kk.get.value (box boxes) 'from-previous-schedule)
                       (not (kk.get.value (tray trays-in-system) 'final-box)))
              (let* (next-box final-box initial-box)
                (setq final-box box)
                (loop while (setq next-box (kk.get.value (final-box boxes) 'same-tray-successor)

                      do (setq final-box next-box))
                (kk.put.value (tray trays-in-system) 'final-box final-box)
                (setq initial-box box)
                (loop while (setq next-box (kk.get.value (initial-box boxes) 'same-tray-predeces
sor))

                      do (setq initial-box next-box))
                (when (eq 'S (kk.get.value (initial-box boxes) 'box-type))        ;; don't want t
o pick up the setup box as first box
                  (setq initial-box (kk.get.value (initial-box boxes) 'same-machine-successor)))
                (when (not (and initial-box final-box))
                  (format T "~% Fix-tray-box=~a initial=~a final=~a~%" (unit.name box) initial-
box final-box))
                (kk.put.value (tray trays-in-system) 'initial-box initial-box))))))))

(defun check-tray-boxes ()
  " Check all the initial and final boxes on the trays-"
  (let* ((boxes (unit.children 'boxes 'member))
         (delete-tray nil))
    (loop for tray in (get-trays-in-system)
          do                                                                          ;xxx???yyy
zzz
          (let* ((initial-box (kk.get.value (tray trays-in-system) 'initial-box))
                 (final-box (kk.get.value (tray trays-in-system) 'final-box)))
            (when (not (and initial-box final-box))
              (setq delete-tray t)
              (loop for box in boxes do
                    (let* ((box-tray (kk.get.value (box boxes) 'tray)))
                      (when (and box-tray
                                 (equal (unit.name tray) (unit.name box-tray)))
                        (if (eq 'S (kk.get.value (box boxes) 'box-type))
                            (setq delete-tray nil)
                            (format t "~% box ~a init ~a final ~a " (unit.name box) initial-box
final-box)
;                       (remove-box box)
```

```
;                    recycle-box box))
                    )))
             (if delete-tray
                 (recycle-tray-to-free-pool tray))))))


(defun update-previous-schedule-inventory ()
  " Loop thru all the trays and update inventory based on the first and last boxes."
  (let* ((bc-time (get.value *control-unit* 'build-context-time))
         final-box-end)                              ;; added for correctb time on inventory   4-1
8-89
  (loop for tray in (get-trays-in-system 'wip-and-spares-trays) do
        (setq final-box-end 0)
        (let* ((max-tray-size (kk.get.value (tray trays-in-system) 'maximum-tray-size))
               (actual-tray-size (kk.get.value (tray trays-in-system) 'tray-size))
               (first-box (kk.get.value (tray trays-in-system) 'initial-box))
               (final-box (kk.get.value (tray trays-in-system) 'final-box))
               (first-operation (when (and first-box
                                    (not (eq 'S (kk.get.value (first-box boxes) 'box-type
))))
                               (kk.get.value (first-box boxes) 'operation)))
               (prev-operation (when first-operation (get-previous-operation tray first-operatio
n)))
               (final-operation (when (and final-box
                                    (not (eq 'S (kk.get.value (final-box boxes) 'box-type
))))
                               (setq final-box-end (- bc-time (kk.get.value (final-box boxes)
 'end-time)))
                               (kk.get.value (final-box boxes) 'operation)))
               (full-tray nil))
          (if (> actual-tray-size (* max-tray-size (get.value *control-unit* 'fraction-full-for
-inventory)))
                                              (setq full-tray t))
          (when (and final-operation full-tray)
            (increment-wip final-operation final-box final-box-end))
          (when (and prev-operation full-tray)
            (increment-wip prev-operation nil nil))))))

(defun get-previous-operation (tray first-operation)
  (let* ((part-id (kk.get.value (tray trays-in-system) 'part-id))
         (routing (get.value part-id 'routing))
         result)
    (loop for op-list on routing
          while (not result)
          do
          (when (and (second op-list)
                     (eq (unit.name (second op-list)) first-operation))
            (setq result (first op-list))))
    result))

;(defun increment-wip (operation part-id box)
;  (let* ((values (get.values operation 'on-hand-wip))
;         (old-item (assoc part-id values))
;         (new-count (when old-item
;                      (if (not box)
;                          (1- (first old-item))))))
;    (format t "~% oper ~a part-id ~a values ~a " operation part-id values)
;    (put.values operation 'on-hand-wip
;                (if old-item
;                    (if box
;                        (cons (list 1 (kk.get.value (box boxes) 'end-time) 'y) values)
;                        (substitute (list new-count (second old-item) 'y) old-item values))
;                    (cons (list (if box 1 -1) (if box (kk.get.value (box boxes) 'end-time) 0) 'y
) values)))))

(defun increment-wip (operation box time)   ;;; xxx which is the correct version???
  (if box
      (add.value operation 'on-hand-wip (list 1 time 'y) nil nil :append t)
      (loop for entry in (get.values operation 'on-hand-wip) do
            (if (eq (second entry) 0)
                (replace.value operation 'on-hand-wip entry (list (- (first entry) 1) 0 'y))))))

(defun check-inventory ()
```

```
" Look for errors in inventory slot on-hand-wip on operations-"
(loop for op in (unit.children 'operations 'member) do
      (loop for item in (get.values op 'on-hand-wip) do
            (let* ((part-id (get.value op 'part-id))
                   (count (first item)))
              (when (< count 0)
                (format T "~%Negative inventory at Operation: ~a  Part: ~a  Count: ~a~%" (unit
.name op) part-id count))))))

(defun reset-ft2 ()
  (let* ((ft1 (get.value *control-unit* 'frozen-time-1))
         (window (get.value 'scheduler-gantt-chart 'window))
         (gantt-chart (window-stream-get window 'gantt-chart)))
    (loop for machine in (unit.descendants 'machines 'member) do
          (put.value machine 'frozen-time-2 ft1))
    (loop for box in (unit.children 'boxes 'member)
          when (kk.get.value (box boxes) 'from-previous-schedule)
          do
          (when (and (not (memq (kk.get.value (box boxes) 'box-type) '(D U)))
                     (>= (kk.get.value (box boxes) 'end-time)
                         (get.value (kk.get.value (box boxes) 'machine) 'frozen-time-2)))
            (put.value (kk.get.value (box boxes) 'machine) 'frozen-time-2 (kk.get.value (box bo
xes) 'end-time))))
    (display-ft2-bars gantt-chart window)))


(defun shift-to-minus-infinity ()
  (let* ((bc-time (get.value *control-unit* 'build-context-time)))
    (loop for box in (unit.children 'boxes 'member)
          when (not (memq (kk.get.value (box boxes) 'box-type) '(D U)))
          do
          (let* ((end-time (kk.get.value (box boxes) 'end-time)))
            (when end-time
              (kk.put.value (box boxes) 'start-time (- (kk.get.value (box boxes) 'start-time) bc
-time))
              (kk.put.value (box boxes) 'end-time   (- end-time bc-time))))))
  (fix-machine-pointers))

(defun fix-machine-pointers ()
  (loop for machine in (unit.descendants 'machines 'member) do
        (let* ((l (loop for box = (get.value machine 'first-box-on-machine)
                        then (kk.get.value (box boxes) 'same-machine-successor)
                        until (not box)
                        when (and box (kk.get.value (box boxes) 'end-time))
                        collect (list box (kk.get.value (box boxes) 'start-time))))
               (sorted-l (sort l '(lambda (a b) (< (second a) (second b))))))
          (put.value machine 'first-box-on-machine (first (first sorted-l)))
          (loop for box-list on sorted-l do
                (let* ((this-box (first (first box-list)))
                       (next-box (first (second box-list))))
                  (when (and this-box next-box)
                    (kk.put.value (this-box boxes) 'same-machine-successor next-box)
                    (kk.put.value (next-box boxes) 'same-machine-predecessor this-box)))))))

(defun inventory-tray-info (part operation box activity-id)
  (let* (tray-number run-number sequence tray)
    (multiple-value-setq (tray-number run-number sequence) (decode-activity-id activity-id))
    (if (and tray-number
             (setq tray (intern (format nil "TRAY-~a-~a" tray-number run-number))))
        (if (and (unit.exists.p (unit tray 'trays nil 'nozsk))

                 (member tray (get.value 'wip-and-spares-trays 'free-tray-pool)))
                                                                         ;(unit.ancestor.p 'free-
tray-pool tray 'member)))

                                                                         ;removed to utilize tray
 compact units cnj 4/18/89
            nil                                            ;; tray is ok-
            (setq tray (get-any-tray-from-free-pool 'wip-and-spares-trays tray)))
        (setq tray (get-any-tray-from-free-pool 'wip-and-spares-trays )))
    ;(replace.parent tray 'trays-in-system 'wip-and-spares-trays 'member)
    (kk.remove.all.values (tray trays-in-system) 'initial-box)
    (kk.remove.all.values (tray trays-in-system) 'final-box)
    (kk.put.value (tray trays-in-system) 'part-id part)
```

```
    (kk.put.value (tray trays-in-system) 'tray-size (get.value part 'maximum-tray-size))
    (kk.put.value (tray trays-in-system) 'maximum-tray-size (get.value part 'maximum-tray-size))
 ;Not sure if correct crj4/17/89
    (put-info-on-box tray (unit operation) box nil)            ;;  was just operation -- added 'uni
t' per lee  12-13
    tray))

(defun decode-activity-id (activity-id)
  (when (and activity-id (stringp activity-id) (= 8 (length activity-id)))
    (let* ((tray-number (subseq activity-id 0 4))
           (run-number (subseq activity-id 4 6))
           (sequence (subseq activity-id 6 8)))
      (values tray-number run-number sequence))))

(defun get-activity-id-tray (activity-id)
  (when (and activity-id (stringp activity-id) (= 8 (length activity-id)))
    (subseq activity-id 0 6)))


(defun get-tray-id-from-tray-name (tray-name)
  "This routine returns a string of 4 characters which make up the tray id-  If a proper
   tray id is not found, a new tray which will have a valid name is created and that id
   is returned-"
  (let* ((pos1 (position #\- tray-name))
         (pos2 (position #\- (subseq tray-name (1+ (or pos1 0))))))
    (if (not (and (numberp pos1)(numberp pos2)))
        (progn
          (format T "~% ERROR get-tray-id-from-tray-name received bad arg: ~a~%" tray-name)
          (format T "~% Generating a new tray name for the event and continuing- ~%")
          (get-tray-id-from-tray-name (string (create-new-tray))))   ;Trouble crj 4/18/89     ;
Try it again with a good tray name
        (subseq tray-name (1+ pos1) (+ 1 pos1 pos2)))))


(defun new-inv ()
  " Function to use existing on-hand inventories at the front end of the scheduling horizon"
  (check-action 'utilize-onhand-inventory)
  (let* ((order-of-inventory-use (get.value 'control-unit 'ranked-opers-for-safety-stock))
         (msg-output.window (get.value 'control-unit 'msg-output-window))
         quit.looking new-inv link-to-box)
    (expose msg-output.window)
    (format msg-output.window "~% Utilizing Inventories and/or Safety Stock ")
    (setq stime1* (time))
;;    (verify-inventory-for-ft-events order-of-inventory-use)             ;;   insure inventory e
xists for frozen time events  4-4-89    DHD
;;   (update-previous-schedule-inventory)                                   ;;  update for events
 still left from prior schedule   DHD      4-10-89
    (loop for oper in order-of-inventory-use do                           ;;  check each operation for a
v

ailable inventory
          (when (or (get.values oper 'on-hand-wip)
                    (get.values oper 'safety-stock))
          (setq new-inv (sort (copy-seq (get.values oper 'on-hand-wip)) #'sort-by-time-avail))
          (put.values oper 'on-hand-wip new-inv)
          (let* ((returned-value (scheduled-boxes-before-ft2 oper))
                 (boxes-before-ft2 (first returned-value))
                 (previous-sched-box (second returned-value)))
            (loop for entry in (get.values oper 'on-hand-wip) do
                  (let* ((inventory (first entry))
                         (time-available (second entry))
                         (flag (third entry))
                         (part (get.value oper 'part-id)))
                    (dotimes (count inventory)
                      (loop for item in boxes-before-ft2
                            until (or (null  boxes-before-ft2) (eq inventory 0)) do
                            (let* ((box (first item))
                                   (operation (kk.get.value (box boxes) 'operation))  ;get.value
 -> kk.get.value CRJ 4/17/89
                                   (number-of-tray-predecessors
                                     (length (kk.get.values (box boxes) 'same-tray-predecessor)))
```

```
)) ;get.value => kk.get.value CRJ 4/17/89
                                ;;   added above line and check below until we handle multiple pre
decessors in inventory     DHO     2-21-89
                              (when (and operation (<= number-of-tray-predecessors 1)
                                     (not (equal  "ASSEMBLY2   " (get.value oper 'short-nam
))))
                               (when (eq (unit.name operation) (unit.name oper))
                                (when (eq (unit.name (kk.get.value ((kk.get.value (box boxes)
'tray) trays-in-system) 'part-id)) ;get.value => kk.get.value CRJ 4/17/89
                                      (unit.name part))
                                 (let* ((old-value (list inventory time-available flag))
                                        updated-inventory)
                                  (setf inventory (1- inventory)) ;; decrement inventory
                                  (setf updated-inventory (list inventory time-available fla
g))
                                  (replace.value oper 'on-hand-wip old-value updated-invent
...
                                  (setq boxes-before-ft2 (remove item boxes-before-ft2 ))
                                  (cond ((> time-available 0)
                                         (setq link-to-box (first previous-sched-box))
                                         (setq previous-sched-box (remove link-to-box previ
ous-sched-box))
                                         (find-tray-predecessors oper box link-to-box))     ;
; find preceding boxes
                                        (t (find-tray-predecessors oper box)))
                                  (setq quit.looking t))))))))))
          (setq boxes-before-ft2 (first (scheduled-boxes-before-ft2 oper)))   ;; added this ca
ll  6-8-89
    (utilize-safety-stock oper boxes-before-ft2))))
    (setq *time2* (time))
    (report-execution-time msg-output.window)))
MANFACTV1.DAT
Build-Context-Master-Record
23 23 23 23 23 1
Build-Context-Time Frozen-Time-One Frozen-Time-Two End-of-Activity-List End-of-Horizon Cycle-Tim
e-Code
IPANLIMPT_PART.DAT
Input-Parts-to-Operations-File
19 19 9 2 3
Operation-Name Functional-Code Quantity Group Rank
dummy.file
Machine-Identification-File
11 7
ESS-Machine-Name Cell-Id
MANFACTV2.DAT
Manufacturing-Cells-Activity-Status-File
7 8 2 19 8 10 10 8 10 23 23 23 23 12 7
Cell-Id Activity-Id Activity-Type Operation-Name Schedule-Quantity Cumulative-Down-Time Cumulat
ive-Degraded-Time Current-Quantity Schedule-Duration Actual-Start-Time Time-of-Update Time-to-Up-
State Time-to-Degrade-State Schedule-Operation-Type Tray-Serial-No
MANFOPSCH.DAT
Manufacturing-Cells-Operational-Schedule-File
7 8 2 19 23 23 10 8 12 7
Cell-Id Activity-Id Activity-Type Operation-Name Start-Time Early-Start-Time Duration Quantity S
chedule-Operation-Type Tray-Serial-No
MANFSTAT.DAT
Manufacturing-Cells-State-Status-File
7 1 23 23
Cell-Id Cell-State Up-State-Time Degraded-State-Time
E RIPRAT.DAT
Net-Inter-Plant-Expected-Receipts-File ,
14 23 8 1 1 23 9
Functional-Code Commit-Date-Time Expected-Receipts-Unique-Id Receipt-Type Constraint-Flag Expect
ed-Receipt-Date Quantity
ORDERMAND.DAT
Net-Order-Demand-File
9 7 1 23 3 15 3 3 19
Original-Customer-Order Ship-Customer-Code Order-Type-Code Date/Time-Due Netted-Quantity Primary
-Priority-Code Major-Revision Minor-Revision Output-Part-Name
dummy.file
```

```
Non-Productive-Part-Inventory-File
19 9 10
Functional-Code Quantity Edge-Count
OPRN_FACL_PREF.DAT
Operations-Facility-Preferences-File
19 7
Operation-Name Cell-Name
OPRN_LIST.DAT
Operations-Listing-File
19 1 9 9 9 5 1 9 12 5
Operation-Name Operation-Type Schedule-Cycle-Time Standard-Cycle-Time Budget-Cycle-Time Degrade-
Cycle-Percent Duration-Policy-Code Move-Time Schedule-Operation-Type Max-Lot-Size
OTHR_RSRC_LIST.DAT
Other-Resources-Listing-File
19 19 1 10 1
Functional-Code Lead-Time-Duration Consume-Flag Schedule-Resource-Type Inventory-Class
OPRN_OTHR_RSRC.DAT
Other-Resources-Used-in-Operations-File
19 19 8 2 2
Operation-Name Functional-Code Quantity Group Rank
OPRN_OUTT_PART.DAT
Output-Parts-From-Operations-File
19 19 8 1
Operation-Name Functional-Code Quantity Primary-Flag
dummy.file
Part-Characteristics-File
19 1 2 1
BPT Part-Rev Part-Size Part-Type
dummy.file
Part-Identification-File
19 19 10 12 3
FUCR Operation-Name ERT EOT Part-Revision
dummy.file
PM-Bill-of-Materials-File
19 2 7 4 4 10
PM-Code Activity-Type Cell-Name No-of-Resource-Records No-of-Skill-Records Duration
dummy.file
Resource-File
19 8
Functional-Code Quantity
dummy.file
Manpower-Skill-File
9 8
Manpower-Trade/Skill quantity
PMCNTX.DAT
PM-Context-File
19 23 23 10
PM-Code Early-Start-Time Due-Date-Time Frequency
PRODINVT.DAT
Productive-Part-Inventory-File
19 7 16 1
Functional-Code Tray-Serial-No Quantity Tray-Top-Bin-Flag
PROD_PART_LIST.DAT
Productive-Parts-Listing-File
19 10 3 8 10 1 1
Functional-Code Lead-Time-Duration Max-Tray-Capacity Target-Safety-Stock Schedule-Resource-Type
Purchd-Manufd-Flag Inventory-Class
RTNG.DAT
Routings-File
28 19 19 2
Routing-Name From-Operation-Name To-Operation-Name Rank
end

;;; This is all that should be read in-

dummy.file
Operation-Modify-Records
19 1 9 9 9 5 1 9 12 5
Operation-Name Operation-Type Schedule-Cycle-Time Standard-Cycle-Time Budget-Cycle-Time Degrade-
Cycle-Percent Duration-Policy-Code Move-Time Schedule-Operation-Type Max-Lot-Size
dummy.file
```

```
Other-Resource-Add-Operation-Records
19 19 8 2 2
Operation-Name Functional-Code Quantity Group Rank
dummy.file
Other-Resource-Add-Resource-Records
19 10 1 10 1
Functional-Code Lead-Time-Duration Consume-Flag Schedule-Resource-Type Inventory-Class
dummy.file
Other-Resource-Delete-Records
10
Schedule-Resource-Type
dummy.file
Other-Resource-Modify-Records
19 10 1 10 1
Functional-Code Lead-Time-Duration Consume-Flag Schedule-Resource-Type Inventory-Class
dummy.file
Product-Part-Add-Input-Part-Records
19 19 8 2 2
Operation-Name Functional-Code Quantity Group Rank
dummy.file
Product-Part-Add-Output-Part-Records
19 19 8 1
Operation-Name Functional-Code Quantity Primary-Flag
dummy.file
Product-Part-Add-Part-Records
19 10 3 8 10 1 1
Functional-Code Lead-Time-Duration Max-Tray-Capacity Target-Safety-Stock Schedule-Resource-Type
Purchd-Manufd-Flag Inventory-Class
dummy.file
Product-Part-Delete-Records
10
Schedule-Resource-Type
dummy.file
Product-Part-Modify-Records
19 10 3 8 10 1 1
Functional-Code Lead-Time-Duration Max-Tray-Capacity Target-Safety-Stock Schedule-Resource-Type
Purchd-Manufd-Flag Inventory-Class
dummy.file
Routing-Add-Facility-Preference-Records
19 7
Operation-Name Cell-Name
dummy.file
Routing-Add-Input-Part-Records
19 19 8 2 2
Operation-Name Functional-Code Quantity Group Rank
dummy.file
Routing-Add-Operation-Records
19 1 9 9 9 5 1 9 12 5
Operation-Name Operation-Type Schedule-Cycle-Time Standard-Cycle-Time Budget-Cycle-Time Degrade-
Cycle-Percent Duration-Policy-Code Move-Time Schedule-Operation-Type Max-Lot-Size
dummy.file
Routing-Add-Output-Part-Records
19 19 8 1
Operation-Name Functional-Code Quantity Primary-Flag
dummy.file
Routing-Add-Resource-Records
19 10 1 10 1
Functional-Code Lead-Time-Duration Consume-Flag Schedule-Resource-Type Inventory-Class
dummy.file
Routing-Add-Routing-Records
23 19 19 2
Routing-Name From-Operation-Name To-Operation-Name Rank
dummy.file
Routing-Delete-Records
23 12
Routing-Name Schedule-Operation-Type
dummy.file
Ship-Schedule-File
23 8 1 23 8 15 3 3 19 23 8
Orig-Cust-Order Ship-Cust-Code Order-Type-Code Date-Time-Due Order-Quantity Primary-Routing-Name
```

```
Major-Revision Minor-Revision Output-Part-Name Build-Date-Time Build-Quantity
dummy.file
New-Requirements-File
19 23 9
Functional-Code Exptd-Receipt-Date Quantity
dummy.file
Cell-Activity-File
8 2 7 19 23 23 10 9 12
Activity-Id Activity-Type Cell-Name Operation-Name Start-Time Early-Start-Time Scheduled-Durati
n Scheduled-Quantity Schedule-Operation-Type
;; -*- Mode:Common-Lisp; Package:KEE; Base:10; Fonts:(cptfont HL10B cptfont HL12B HL12BI); -*-

;;; GANTTFNS.LISP

(in-package 'kee)


;;; -------------------------- GANTTFNS DOCUMENTATION ------------------------------
;;;
;;; This file contains all the functions to display the gantt chart, the boxes, info about the b
oxes,
;;; mouse functions, and recycling, removing, and inserting boxes.
;;;
;;; STRUCTURES
;;;
;;; Boxes - All of the events in the system are represented as BOXES.  Each box has its start-ti
me,
;;; end-time, machine, same-machine-successor, same-tray-successor, and a lot of other info.
;;; The ganttfns display the boxes on the Gantt chart using CommonWindows.  Each box is a
;;; hotspot that is mousable.
;;;
;;; Machine labels or Baselines - The machine labels (down the left side of the Gantt chart) are
 KEEPICTURES.
;;;
;;; Bitmap - The fixed parts of the display (lines, machine labels) are put on a bitmap.
;;; The redisplay function bitblts the bitmap to the window, then draws in the dynamic parts of
the display.
;;;
;;; FUNCTIONS
;;;
;;; repaint-gantt-window - This is the repaint function on the Gantt window.
;;; Repainting is done by redrawing the entire viewport, including the machine labels, the lines
, and the
;;; notations at the bottom.  Then the entire set of boxes is examined to see which are within t
he time window
;;; to be displayed.  For each box, CENTER-PRINT-IN-REGION prints the box and creates the HOTSPO
T.
;;;
;;; initialize-gantt-chart - "Creates a gantt chart during initialization."
;;;
;;; initialize-gantt-units - "Creates boxes for process boxes for trays ordered." -- We create a
ll the event boxes for all the
;;; trays with all the same-tray-successor and -predecessor links, then the backscheduler gives
them their times.
;;;
;;; recycle-gantt-units ()  "Function to recycle all box units between schedule runs"
;;;
;;; GANTT-MOUSEFN  "Top-level mousefn for the gantt chart"
;;;
;;; get-process-box - "Returns a process box for the specified operation on the specified tray"
- called by various routines in
;;; the system to create a process box and stuff tray and operation info into it.
;;;
;;; put-info-on-box  - "Put tray, operation, and label info on a box - determine if it is an X b
ox."
;;;
;;; recycle-box - "Link the box into the front of the free box chain.  Gracefully accepts a null
 box."
;;;
;;; remove-box - "Remove a box from the machine chain, updating its neighbors pointers,
```

```lisp
;;;
;;; delete-box-and-successors - "Removes a box and its same tray successors from the schedule."
;;;
;;; STRUCTURES
;;;
;;; *control-unit* has slots:
;;;     GANTT-MACHINE-LIST - a list of machine classes to display on the gantt chart.
;;;     MSG-OUTPUT-WINDOW - where to print msgs
;;;     CURRENT-GANTT-CHART - the viewport unit for the gantt chart
;;;     BUILD-CONTEXT-TIME, and other times.
;;;
;;; GANTT-CHART unit has slots:
;;;
;;;     WINDOW - the window
;;;     BITMAP - the bitmap that has the static stuff (it just gets bitblt'd to the window)
;;;     REGION for both the bitmap and the window
;;;     TITLE - title for the window
;;;     BORDERS - borders for the window
;;;     LEFTEND - the left margin space for the machine titles
;;;     SCALE - the number of pixels/second - a real number
;;;     START-TIME - the beginning time displayed (changed by horizontal scrolling)
;;;     END-TIME - the end time displayed
;;;     machine-name slot - Each machine has a slot with its name on it with its current y value.
;;;     NUMBER-OF-LINES - has the number of lines on the screen
;;;     VERTICAL-INCR - the increment between lines on the screen
;;;     VERTICAL-SCROLL-P - is non-NIL if we need to vertically scroll
;;;     VERTICAL-SCROLL-OFFSET - has the number of the machine at the bottom of the screen (start
s at 0)
;;; ---------------------------------------------------------------------------------


;; Use this to test new gantt scrolling. (defun btsa () (create-gantt-chart (get.value *control-
unit* 'gantt-machine-list)))

(defun msgout (string)
  "Display a message to the message window."
  (let ((msg-output-window (get.value *control-unit* 'msg-output-window)))
    (format msg-output-window "~%~A" string)))

(defun initialize-gantt-chart ()
  "Creates a gantt chart during initialization."
  (msgout " Generating Gantt Chart related units and blocking out unavailable time on machines "
)
  (setq *time1* (time))
  (when (null (get.value *control-unit* 'current-gantt-chart))
    (create-gantt-chart (get.value *control-unit* 'gantt-machine-list)))
  (put.value 'scheduler-gantt-chart 'start-time (get.value *control-unit* 'build-context-time))
  (repaint-gantt-window)
  )

(defun initialize-gantt-units ()
  "Creates boxes for process boxes for trays ordered."
  (let ((msg-output-window (get.value *control-unit* 'msg-output-window)))
    (create-boxes-for-chart)
    (setq *time2* (time))
    (report-execution-time msg-output-window)))

(defun recycle-gantt-units ()
  "Function to recycle all box units between schedule runs"
  (let ((msg-output-window (get.value *control-unit* 'msg-output-window)))
   (expose msg-output-window)
   (clear-window-stream msg-output-window)
   (format msg-output-window "~% Recycling boxes and trays from previous schedule")
   (setq *time1* (time))
   (reclaim-boxes)
   ;;(repaint-gantt-window)
   (if (get.value *control-unit* 'current-gantt-chart)
       (remove.all.values (get.value *control-unit* 'current-gantt-chart) 'previous-highlight))
))
```

```
(defun create-gantt-chart ( &optional (machine-list (unit.children 'machines 'subclass)))
  "Creates the gantt chart and associated machine baselines, deadlines, and axis."
  (let* ((screen-height (window-stream-height *kee-root-window*))
         (screen-width  (window-stream-width  *kee-root-window*))
         (gantt-height (round (* 0.840 screen-height)))     ;;  was .875   DHO  2-17-89
         (gantt-width  (round (* 0.98 screen-width)))
         (gantt-leftend (round (* 0.09 gantt-width)))  ; The indentation for the machine names.
         (gantt-middle-area (- gantt-width gantt-leftend))
         (gantt-bottom 33) ; Must leave this many pixels at the bottom.
         (gantt-top 24)    ; Must leave this many pixels at the top.
         (gantt-chart (create.unit 'scheduler-gantt-chart 'gantt)))

    (setq *right-end* gantt-width)
    (put.value gantt-chart 'LEFTEND gantt-leftend)
    (put.value gantt-chart 'REGION (make-reg 0 0 gantt-width gantt-height)) ; Region (lower 7/8
of screen)
    (put.value gantt-chart 'TITLE (format nil "          Gantt Chart Schedule for ~a"
                                          (get.value *control-unit* 'gantt-chart-name)))
; Title
    (put.value gantt-chart 'BORDERS 2)
    (put.value gantt-chart 'LEFTEND gantt-leftend)
    (put.value gantt-chart 'SCALE (/ gantt-middle-area *scroll-incr*))  ;; This is the number of
 pixels per second
    (put.value gantt-chart 'GANTT-BOTTOM  gantt-bottom)

    (setup-window gantt-chart)
    (put.value gantt-chart 'START-TIME (get.value *control-unit* 'BUILD-CONTEXT-TIME))
    (put.value gantt-chart 'END-TIME (+ *scroll-incr* (get.value gantt-chart 'START-TIME)))

    (put.value *control-unit* 'CURRENT-GANTT-CHART gantt-chart)
    ;; (setq gantt-chart 'scroll-no)      ; Dont use standard scrolling.
    (create-baselines gantt-chart machine-list gantt-top gantt-bottom gantt-height)
    (display-machines gantt-chart)
    (repaint-gantt-window (get.value gantt-chart 'WINDOW) nil)
    gantt-chart))


(defun create-title (gantt-chart)
  (let* ((width (region-width (get.value gantt-chart 'region)))
         (title (get.value gantt-chart 'title))
         (title-width (font-string-width fonts:hl10b title))
         (scroll-string '(Scroll      <<24                <8                 8>               2
4>>        "))
         (scroll-string-width (font-string-width fonts:hl10b scroll-string))
         (extra (- width title-width scroll-string-width))
         (white-space (font-string-width fonts:hl10b " ")))
    (concat title (make-string (round (/ extra white-space)) :initial-element #\space) scroll-st
ring)))

;;;  The gantt chart window is made up of four separate windows: the main "parent" window which
is the parent of all the windows,
;;;  the "machine window" which displays the machines on the gantt chart, the "line window" whic
h shows the time line, and the
;;;  "gantt window" which displays the gantt chart itself.

(defun SETUP-WINDOW (gantt-chart)
  "Setup the gantt window with all the typical properties."
  (let* ((region (get.value gantt-chart 'REGION))
         (leftend (get.value gantt-chart 'leftend))
         (bottom-height (get.value gantt-chart 'gantt-bottom))
         (window (make-window-stream :left (region-left region)
                                     :bottom (region-bottom region)
                                     :width (region-width region)
                                     :height (region-height region)
                                     :borders (get.value gantt-chart 'borders)
                                     :title (create-title gantt-chart)
                                     :parent *kee-root-window*
                                     :activate-p t))
         (machine-window (make-window-stream :left (window-stream-inner-left window)
                                             :bottom bottom-height
                                             :width leftend
                                             :height (- (window-stream-inner-height window) bott
```

```
om-height)
                                          :borders 0
                                          :parent window
                                          :activate-p t))
      (line-window (make-window-stream :left (window-stream-inner-left window)
                                          :bottom (window-stream-inner-bottom window)
                                          :width (window-stream-inner-width window)
                                          :height bottom-height
                                          :borders 0
                                          :parent window
                                          :activate-p t))
      (gantt-window (make-window-stream :left (+ (window-stream-inner-left window) leftend)
                                          :bottom (+ (window-stream-inner-bottom window) bott
om-height)
                                          :width (- (window-stream-inner-width window) leften
d)
                                          :height (- (window-stream-inner-height window) bott
om-height)
                                          :borders 1
                                          :parent window
                                          :activate-p t))
      (bitmap (make-bitmap-stream :width (window-stream-width gantt-window)
                                  :height (window-stream-height gantt-window))))

   (setf (window-stream-get window 'GANTT-CHART) gantt-chart)        ; Store the gantt chart uni
t on the window.
   (setf (window-stream-get window 'machine-window) machine-window) ; Store the window which  i
s the machine window.
   (setf (window-stream-get window 'line-window) line-window)        ; Store the window which is
 the time line window.
   (setf (window-stream-get window 'GANTT-window) gantt-window)      ; Store the window which is
 the gantt window.
   (setf (window-stream-truncate-lines-p gantt-window) t)            ; Don't allow wrapping.  Le
t the software truncate the box displays.

   (put.value gantt-chart 'window window)
   (put.value gantt-chart 'bitmap bitmap)
   (add-to-font-set window fonts:h17)
   (add-to-font-set window *medium-bold-font*)
   (add-to-font-set gantt-window fonts:h17)
   (add-to-font-set gantt-window *medium-bold-font*)
   (add-to-font-set machine-window fonts:h17)
   (add-to-font-set machine-window *medium-bold-font*)
   (add-to-font-set line-window *medium-bold-font*)
   (add-to-font-set bitmap *medium-bold-font*)

   (setf (window-stream-font window) *medium-bold-font*)
   (setf (window-stream-font bitmap) *medium-bold-font*)
   (setf (window-stream-font gantt-window) *medium-bold-font*)
   (setf (window-stream-font machine-window) *medium-bold-font*)
   (setf (window-stream-font line-window) *medium-bold-font*)

   ;; SCROLLING -- This is how to do scrolling with scroll bars.
   ;;(setf (window-stream-extent-width window) 10) ;;2000)
   ;;(setf (window-stream-extent-height window) 1000)
   ;;(enable-window-stream-extent-scrolling window )

   ;; The following line expands the gantt chart if it has been shrunk-  LWK 11/22/88
   (setf (window-stream-button (make-icon window)) #'(lambda (stream mouse-state) (ignore mouse
-state) (expand stream)))
   (setf (window-stream-button window) 'gantt-mousefn)
   (setf (window-stream-repaint window) 'repaint-gantt-window)
   (setf (window-stream-button gantt-window) 'gantt-window-mousefn)
   (setf (window-stream-repaint gantt-window) 'repaint-gantt-window)

   (display-timeline gantt-chart window) ; Why here ??? CRJ 3/22/89

   ;; set the who line prompt method
   (setf (window-stream-mouse-cursor-in window) 'gantt-chart-mouse-cursor-in-method)
   (setf (window-stream-mouse-cursor-out window) 'gantt-chart-mouse-cursor-out-method)
   nil))
```

```
(defun create-baselines (gantt-chart machine-list gantt-top gantt-bottom gantt-height)
  ;; Create  a baseline for each machine in the model.
  (let* ((machines
           (remove-duplicates
             (reverse    ; We start from the bottom of the screen.
             (loop for machine-type in machine-list                    ;; e-g- lathes
                   append
                   (sort
                     (loop for machine in (unit.allmembers machine-type)    ;; e-g- lathe1
                           when (or (get.value machine 'generate-gantt-machine)
                                    (when (get.value (car (unit.parents machine 'member)) 'gener
ate-gantt-machine)
                                      (setq machine                                   ;;CRJ 4-14-89
                                            (car (unit.parents machine 'member)))))
                           collect machine)
                     #'(lambda (a b) (string<'(unit.name a) (unit.name b))))) :from-end t))
         (avail-space (- gantt-height (+ gantt-top gantt-bottom)))
         (number-of-machines (length machines))
         (total-space (* number-of-machines *gantt-minimum-baseline-incr*))
         (vertical-scroll-p (> total-space avail-space))
         (incr (max (floor avail-space number-of-machines) *gantt-minimum-baseline-incr*))
         (number-of-lines (floor avail-space incr)))

    (put.values gantt-chart 'MACHINES machines)  ;; Save for displaying them.
   (put.value gantt-chart 'VERTICAL-SCROLL-OFFSET 0)
   (put.value gantt-chart 'VERTICAL-INCR incr)
   (put.value gantt-chart 'NUMBER-OF-LINES number-of-lines)
   (setq *box-height* incr)

   (when vertical-scroll-p
     (msgout "Must scroll vertically")
     (put.value gantt-chart 'VERTICAL-SCROLL-P T))

   ;; Now draw the lines on the bitmap
   (let* ((bitmap (get.value gantt-chart 'BITMAP))
          ;(leftend (get.value gantt-chart 'LEFTEND))
          (region (get.value gantt-chart 'REGION))
          (rightend (region-width region)))
     (loop for machine in machines
           for i from 0 to (1- number-of-lines)
           for y from 4 ;gantt-bottom
           to 100000 by incr
           do
           (when (< y (+ gantt-bottom avail-space))
             (draw-line-xy bitmap 0 y rightend y))))))


(defun display-machines (gantt-chart)
  "Displays the machine labels on the gantt chart."
  (let* ((leftend (get.value gantt-chart 'LEFTEND))
         (machines (get.values gantt-chart 'MACHINES))
         (offset (get.value gantt-chart 'VERTICAL-SCROLL-OFFSET))
         (number-of-lines (get.value gantt-chart 'NUMBER-OF-LINES))
         (incr (get.value gantt-chart 'VERTICAL-INCR))
         (gantt-bottom 4)
         (window (window-stream-get (get.value gantt-chart 'WINDOW) "machine-window)))

    ;;(print (list leftend offset number-of-lines incr gantt-bottom window))

    (loop for machine in machines do
          (put.facet.value gantt-chart (unit.name machine) 'BASELINE-Y nil))   ; initialize
    (loop for i from 0 to (1- number-of-lines)
          for n from offset to 10000
          for y from gantt-bottom to 100000 by incr
          for machine = (nth n machines)
          when machine
          do
          (put.facet.value gantt-chart (unit.name machine) 'BASELINE-Y y))    ; The current Y of
this machine's baseline.
    ;(clear window)
    (loop for i from 0 to (1- number-of-lines)
```

```
        for n from offset to 10000
        for machine = (nth n machines)
        when machine
        do
        (let* ((baseline-y (get.facet.value gantt-chart (unit.name machine) 'BASELINE-Y)))
          (when baseline-y
            (incf baseline-y 4)
            (let* ((string (string-capitalize (mkstring (or (get.value machine 'GANTT-MACH-NAM
E)
                                                              (unit.name machine)))))
                   (width (font-string-width *medium-bold-font* string)))
              ;;(print (list i n machine baseline-y))
              (set-window-stream-cursor-position window (make-position :x (- 85 width) ;(- lef
end (+ 2 width))
                                                                          :y baseline-y))
              (setf (window-stream-font window) *medium-bold-font*)
              (format window "~A" string))))))


(defun display-timeline (gantt-chart window)
  "Draw the timeline and hash marks at the bottom of the screen."
  (let* ((line-window (window-stream-get window 'line-window))
         (region (get.value gantt-chart 'REGION))
         (leftend (get.value gantt-chart 'LEFTEND))
         (scale (get.value gantt-chart 'SCALE))
         (x1 leftend)
         (incr (* 3600 scale))
         (x2 (region-width region))
         (y 19)     ; The y coordinate of the timeline.
         (width (region-width region)))
    (clear line-window)
    (draw-line-xy line-window x1 y x2 y)
    (loop for x from x1 to x2 by incr do
          (draw-line-xy line-window x (- y 5) x y))
    ;; draw vertical lines so you can see where to mouse
    #8(loop for i from 1 to 4 do
          (let* ((x (round (* (/ i 5) width))))
            (draw-line-xy line-window x (- y 12) x (+ y 12) :brush-width 4)))8# ; Rmoved for new
 scroll method. CRJ 3/23/89.
    ))

(defun display-time (gantt-chart window utime)
  "This function displays the overall time (eg 1988-12-01 03:23EST) on the gantt chart."
  (let* ((region (get.value gantt-chart 'REGION))
         (leftend (get.value gantt-chart 'LEFTEND))
         (x1 leftend)
         (x2 (- (region-width region) 20))
         (y 0)
         (one-shift 28800)
         string hmstring hmplus8string)
    (setq string (utime-to-string utime))
    (setq hmstring (subseq (utime-to-string utime) 11 19))
    (setq hmplus8string (subseq (utime-to-string (+ one-shift utime)) 11 19))
    (center-print-in-region window (utime-to-string utime) (round (- (/ (+ x1 x2) 2) 50)) y 100
 20)
    (center-print-in-region window hmstring (round (- x1 50)) y 100 20)
    (center-print-in-region window hmplus8string (round (- x2 50)) y 40 20)))


(defun display-bars (gantt-chart window)
  "This displays the bars, eg for BC, FT1."
  (let ((gstart (get.value gantt-chart 'start-time))
        (gend (get.value gantt-chart 'end-time))
        (he-time (get.value *control-unit* 'horizon-end))
        (eal-time (get.value *control-unit* 'end-of-activity-list)))
    (display-bar gantt-chart window (get.value *control-unit* 'BUILD-CONTEXT-TIME) 'BC)
    (display-bar gantt-chart window (get.value *control-unit* 'FROZEN-TIME-1) 'FT1)
    (cond ((and (>= eal-time gstart) (<= eal-time gend))
           (display-bar gantt-chart window (get.value *control-unit* 'end-of-activity-list) 'EAL
)))
    (cond ((and (>= he-time gstart) (<= he-time gend))
           (display-bar gantt-chart window (get.value *control-unit* 'horizon-end) 'HE)))
    (display-ft2-bars gantt-chart window)))
```

```
(defun display-bar (gantt-chart window time &optional label)
  "This displays 1 bar on the gantt-chart and is called by display-bars."
  (let* ((gantt-window (window-stream-get window 'gantt-window)) ; Added for the new window sche
me. CRJ 3/23/89
         (leftend (get.value gantt-chart 'LEFTEND))
         (x (* (- time (get.value gantt-chart 'START-TIME))
                        (get.value gantt-chart 'SCALE)))
         (height (font-character-height *medium-bold-font*)))
    (draw-line-xy gantt-window x 0 x (window-stream-height gantt-window ))
    (if label (center-print-in-region (window-stream-get window 'line-window) (mkstring label) (
+ x leftend) 20 15 height))))

(defun display-ft2-bars (gantt-chart window)
  "This displays the FT2 bars - at the end of each machine's previously-scheduled boxes."
  (let ((gantt-window (window-stream-get window 'gantt-window))) ; Added for the new window sche
me. CRJ 3/23/89
    (loop for machine in (get.values gantt-chart 'MACHINES) do
          (let* ((ft2 (or (get.value machine 'frozen-time-2) 0))
                 (leftend (get.value gantt-chart 'LEFTEND))
                 (x (round (* (- ft2 (get.value gantt-chart 'START-TIME))
                              (get.value gantt-chart 'SCALE))))
                 (baseline-y (get.facet.value gantt-chart (unit.name machine) 'BASELINE-Y)))
            (when (and baseline-y x)
              (draw-line-xy gantt-window x baseline-y x (+ baseline-y (- *box-height* 2)) :brush
-width 5))))))


(defun REPAINT-GANTT-WINDOW (&optional (window (get.value 'scheduler-gantt-chart 'window)) posit
ion)
  "The repaint and scrolling function for the gantt window."
  (when window
    (let* ((gantt-chart (window-stream-get window 'gantt-chart))
           (bitmap (get.value gantt-chart 'BITMAP))
           (gantt-window (window-stream-get window 'gantt-window)))

      (when position
        (let* ((vertical-scroll-p (get.value gantt-chart 'VERTICAL-SCROLL-P))
               (offset (get.value gantt-chart 'VERTICAL-SCROLL-OFFSET))
               (raw-y (position-y position))
               (y (cond ((not vertical-scroll-p) 0)
                        ((and (minusp raw-y)(zerop offset)) 0)
                        (t raw-y)))
               (y-incr (+ offset (* y (get.value gantt-chart 'NUMBER-OF-LINES))))
               (x-incr (* (position-x position) *scroll-incr*))
               (new-start-time (+ x-incr (get.value gantt-chart 'START-TIME))))

          (put.value gantt-chart 'START-TIME new-start-time)
          (put.value gantt-chart 'END-TIME (+ *scroll-incr* new-start-time))
          (put.value gantt-chart 'VERTICAL-SCROLL-OFFSET y-incr)))

      (clear (window-stream-get window 'gantt-window)) ;Need only clear the "gantt window".  CRJ
 3/22/89.
      (setf (window-stream-hotspot-list gantt-window) nil)
      ;(clearw window)
      (expose window)
      (bitblt bitmap 0 0 gantt-window 0 0) ; bitblt the background - the lines and timeline
      ;(display-machines gantt-chart) ; No need to redisplay.  If vertical scrolling is implemen
ted, this may change. CRJ 3/22/89.
      (display-timeline  gantt-chart window)
      (display-time gantt-chart window (get.value gantt-chart 'START-TIME))
      (display-bars gantt-chart window)
      (loop for box in (unit.children 'boxes 'member)
            when (kk.get.value (box boxes) 'END-TIME)
            do
            (box-open! box t)))))

(defun test-for-unavailable-outside-machine-box (box)
  "If this is a box whose machine is an outside machine, and the box is an unavailable box,
   don't display it since the outside machine now shows multiple machines."
  (unless (and (unit.name.p 'outside-machines)
               (unit.child.p (unit (kk.get.value (box boxes) 'machine)) 'outside-machines 'membe
```

```
r)
            (eq (kk.get.value (box boxes) 'box-type) 'U))
      box))


;;; ************************** MOUSE FUNCTIONS ******************************************

(defun gantt-chart-mouse-cursor-in-method (stream mouse-state)
  "Used to print gantt chart use documentation on the who line on mouse cursor in"
  (ignore stream mouse-state)
  (documentation-print
    "Process box mouse functions:  L: Show Part Routing  M: Display Tray  R: Picture Menu  R2: S
ystem Menu"))

(defun gantt-chart-mouse-cursor-out-method (stream mouse-state)
  "Used to clear the who line on mouse cursor out"
  ;; if who line not cleared docs for kee output windows don't display
  (ignore stream mouse-state)
  (documentation-print ""))

(defun gantt-window-mousefn (stream mouse-state)
  "The mouse function for the gantt subwindow."
  (let* ((position (mouse-state-position mouse-state))
         (item (hotspot-under-position stream position))
         (mouse-button (mouse-state-button-state mouse-state))
         (parent (window-stream-parent stream)))

    (if (window-stream-on-top-p stream)  ; When the window is on top, allow for scrolling, displ
aying, etc.
        (cond ((null item)
               (cond ((equal mouse-button '#öMouse-M)
                      nil)
                     ((equal mouse-button '#öMouse-L)
                      ;(gantt-scroll parent position)
                      )
                     (t (gantt-right-mousefn parent))))
              ((equal mouse-button '#öMouse-M) (box-middlefn parent item))
              ((equal mouse-button '#öMouse-L) (box-leftfn parent item)))
        (progn (expose parent)          ; Otherwise, expose the window and its parent.
               (expose stream)))))

;;; This function has been replaced by the above function.

(defun GANTT-MOUSEFN (stream mouse-state)
  "Top-level mousefn for the gantt chart"
  (let* ((position (mouse-state-position mouse-state))
         (item (hotspot-under-position stream position))
         (mouse-button (mouse-state-button-state mouse-state))
       (parent (window-stream-parent stream)))

       (expose stream)    ; Always bring the window to the top.

    (cond ((null item)    ; no hotspot
           (cond ((equal mouse-button '#öMouse-M)
                  nil)    ; just bring the window to the top
                 ((equal mouse-button '#öMouse-L)
                  (gantt-scroll stream position))    ; scroll the window
                 (t (gantt-right-mousefn parent))))
          ((equal mouse-button '#öMouse-M) (BOX-MIDDLEFN stream item))
          ((equal mouse-button '#öMouse-L) (BOX-LEFTFN stream item)))))


#ö(defun gantt-scroll (stream position)
  "Scroll the window left or right - determine the location, then let repaint do the work."
  (let* ((region (window-stream-region stream))
         (x (position-x position))
         (width (region-width region))
         (midx (+ (/ width 2) (region-left region)))
         (raw-newx (round (/ (- x midx) (floor width 5))))
         (newx (cond ((= raw-newx 2) 3)
```

```
                    ((= raw-newx -2) -3)
                    (t raw-newx)))
       (y (position-y position))
       (height (region-height region))
       (midy (+ (/ height 2) (region-bottom region)))
       (newy (round (/ (- y midy) (floor height 3))))
       (new-position (make-pos newx newy)))
   ;;(msgout (format nil "~a ~a" newx newy))
   (repaint-gantt-window stream new-position)))ö#  ; Old scroll method for gantt chart.  New me
thod allows scrolling in title bar.


(defun gantt-scroll (stream position)
  "Scroll the window left or right - determine the location, then let repaint do the work.
   User scrolls from the title bar ahead or behind 8 or 24 hours."
  (let* ((x (position-x position))
         (y (position-y position))
         (width (window-stream-width stream))
         (string-width (font-string-width fonts:hl10b "                    ")) ; Each scroll spo
t has 20 spaces in which to select.
         (new-x (cond ((>= x (- width string-width))
                       3)
                      ((>= x (- width (* 2 string-width)))
                       1)
                      ((<= x (- width (* 3 string-width)))
                       -3)
                      ((<= x (- width (* 2 string-width)))
                       -1)
                      )))
    (repaint-gantt-window stream (make-pos new-x 0))))

(defun BOX-LEFTFN (stream item)
  stream ; ignore
  (let* ((box (lite-object item))
         (gantt-chart (kk.get.value (box boxes) 'GANTT-CHART)))
    (show-partners box gantt-chart)))

(defun BOX-MIDDLEFN (stream item)
  stream ; ignore
  (let* ((box (lite-object item)))
    (display-box-info box)))

(defun GANTT-RIGHT-MOUSEFN (stream)
  (let (choice)
    (expose stream)
    (setf choice (pop-up-menu-choose
                  '(("BURY" bury)
                    ("CLOSE" close)
                    ("MOVE" move)
                    ("SHRINK" shrink)
                    )
                  :TITLE "Select One:"))
    (cond ((eq choice 'bury) (bury stream))
          ((eq choice 'close) (closew stream))
          ((eq choice 'shrink) (shrink stream))
          ((eq choice 'move) (move stream (get-region))))))


;;;*********************************************************************************

(defun create-boxes-for-chart ()
  "Pre-creates all process boxes required by all the trays"
  (loop for tray in (get-trays-in-system '(assembly-trays sub-assembly-trays component-trays))
;       when (not (unit.ancestor.p 'wip-and-spares-trays tray 'member))
        do
        (let* ((routing (reverse (kk.get.value (tray trays-in-system) 'routing)))
               (last-operation (car routing))
               (last-box (get-process-box tray last-operation t))
               (successor-box last-box)
               (box last-box))
          (kk.put.value (last-box boxes) 'order-type 'customer)
```

```
        (when (tray-waiting-to-be-scheduled last-box last-operation tray)
          (setq last-box nil)
          (setq routing nil))
        (loop for operation in (cdr routing)  ; For each operation
              while routing do
              (setq box (get-process-box tray operation nil))
              (kk.put.value (box boxes) 'order-type 'customer)
              (kk.put.value (successor-box boxes) 'same-tray-predecessor box)
              (kk.put.value (box boxes) 'same-tray-successor successor-box)
              (setq successor-box box))
        (kk.put.value (tray trays-in-system) 'initial-box (or box successor-box))
        (kk.put.value (tray trays-in-system) 'final-box last-box)))
;; Now, for each assembly tray, we link its initial box to the final boxes of its component tra
ys
 (loop for assembly-tray in (get-trays-in-system '(assembly-trays sub-assembly-trays))
       with assembly-box
       do                                         ;For each assembly tray
       (setq assembly-box (kk.get.value (assembly-tray trays-in-system) 'initial-box))
       (kk.put.values (assembly-box boxes) 'same-tray-predecessor
                      (loop for component-tray in (kk.get.values (assembly-tray trays-in-system)
 'component-trays) with component-final-box
                            while (kk.get.value (component-tray trays-in-system) 'final-box)
                            do          ;for each of its component trays
                            (cond ((kk.get.value (component-tray trays-in-system) 'final-box)
                                   (setq component-final-box (kk.get.value (component-tray trays
-in-system) 'final-box))
                                   (kk.put.value (component-final-box boxes) 'same-tray-successo
 assembly-box)))
                            collect component-final-box))))


(defun get-process-box (tray &optional operation oper-type)
  "Returns a process box for the specified operation on the specified tray"
   (let* ((box (boxes-get-empty-box (unit 'boxes))))
     (kk.put.value (box boxes) 'box-type 'P)
     (put-info-on-box tray operation box oper-type)
     box))

(defun put-info-on-box (tray operation box oper-type)
  "Put tray, operation, and label info on a box - determine if it is an X box."
  (let* ((tray-letters (get-tray-id-from-tray-name (string (unit.name tray))))
         (label (format nil "~a ~a" (kk.get.value (tray trays-in-system) 'part-id) tray-letters)
))

    ;; Determine if this box is an assembly box - type X.
    ;; See if the tray's part-id is in the required-parts.

    (when (and (member tray (unit.children 'assembly-trays 'member))
               oper-type)
      (kk.put.value (box boxes) 'box-type 'X))
    (kk.put.value (box boxes) 'strings (list label))
    (kk.put.value (box boxes) 'tray (unit tray))
    (let* ((operation-u (if (unitp operation) operation (unit operation))))
      (kk.put.value (box boxes) 'operation operation-u))  ;;; xxx fix whoever is sending this sy
mbol operation.
    box))


(defun get-setup-box (operation tray)
  "Returns a setup box for the specified operation on the specified tray"
  (if (not tray)
      (format T "Get-setup-box - No tray for operation ~a~%" operation)
      ;; else
      (let* ((box (boxes-get-empty-box 'boxes)))
        (kk.put.value (box boxes) 'strings '("S"))
        (kk.put.value (box boxes) 'box-type 'S)
        (kk.put.value (box boxes) 'tray (unit tray))
        (kk.put.value (box boxes) 'operation operation)
        box)))
```

```
(defun boxes-get-empty-box (self) ; self is 'boxes
  "Return an empty box from the empty box chain, or create a new one"
  (let ((gantt-chart (get.value *control-unit* 'current-gantt-chart))
        (first-empty-box (get.value self 'FIRST-EMPTY-BOX)))
    (cond (first-empty-box
           ;;(cond ((equal first-empty-box (kk.get.value (first-empty-box boxes) 'SAME-MACHINE-S
UCCESSOR))
           ;;(y-or-n-p "Pausing in get-empty-box, first-empty-box has self as successor")))
           ;; link in the second empty box as the new first empty box
           (put.value self 'FIRST-EMPTY-BOX
                      (kk.get.value (first-empty-box boxes) 'SAME-MACHINE-SUCCESSOR))
           (remove.all.values first-empty-box 'SAME-MACHINE-SUCCESSOR))
          (t (setq first-empty-box (create.unit (gentemp "BOX") 'gantt nil self nil nil nil 'com
pact-unit))))
    (kk.put.value (first-empty-box boxes) 'GANTT-CHART gantt-chart)
    first-empty-box))
(defun recycle-box (box)
  "Link the box into the front of the free box chain.  Gracefully accepts a null box.
   The box MUST BE unlinked from its machine chain before this function is called, or chains wil
l become inconsistent."
  (when box
    (reset-box box) ; This must be done before linking the box into free pool-
    (kk.put.value (box boxes) 'same-machine-successor   ; put box in front of the old first-empt
y-box
                  (get.value 'boxes 'first-empty-box))
    (put.value 'boxes 'first-empty-box box)))   ; and make box the first-empty-box

(defun reset-box (box)
  "This resets all of the info on a box."
  (box-lowlight! box 'dontredisplay)
  (box-close! box 'dontredisplay)
  (kk.remove.all.values (box boxes) 'activity-id)
  (kk.remove.all.values (box boxes) 'borders)
  (kk.remove.all.values (box boxes) 'box-type)
  (kk.remove.all.values (box boxes) 'desired-end-time)
  (kk.remove.all.values (box boxes) 'desired-start-time)
  (kk.remove.all.values (box boxes) 'end-time :no.av t)
  (kk.remove.all.values (box boxes) 'from-previous-schedule)
  (kk.remove.all.values (box boxes) 'gantt-chart)
  (kk.remove.all.values (box boxes) 'highlightp)
  (kk.remove.all.values (box boxes) 'immovable)
  (kk.remove.all.values (box boxes) 'inventory)
  (kk.remove.all.values (box boxes) 'machine)
  (kk.remove.all.values (box boxes) 'operation)
  (kk.remove.all.values (box boxes) 'order-type)
  (kk.remove.all.values (box boxes) 'position)
  (kk.remove.all.values (box boxes) 'region)
  (kk.remove.all.values (box boxes) 'same-machine-successor)
  (kk.remove.all.values (box boxes) 'same-machine-predecessor)
  (kk.remove.all.values (box boxes) 'same-tray-successor)
  (kk.remove.all.values (box boxes) 'same-tray-predecessor)
  (kk.remove.all.values (box boxes) 'start-time)
  (kk.remove.all.values (box boxes) 'strings)
  (kk.remove.all.values (box boxes) 'tray)
  (kk.remove.all.values (box boxes) 'width))

(defun reclaim-boxes ()
  "Grabs all the members of boxes and puts them all in a newly created empty chain"
  (let* ((boxes (unit.children 'boxes 'member))
         (previous-box nil))
    (cond ((not boxes)
           (remove.all.values 'boxes 'first-empty-box))
          (t (loop for box in boxes do
                   (reset-box box)
                   (kk.put.value (box boxes) 'borders 1)
                   (kk.put.value (box boxes) 'same-machine-successor previous-box)
                   (setq previous-box box))
             (put.value 'boxes 'first-empty-box previous-box)))))
```

```
(defun create-dummy-boxes-on-machines ()
  "Create first and last boxes on machine at minus and plus eternity"
  (let ((gantt-chart (get.value *control-unit* 'current-gantt-chart)))
  (loop for machine in (UNIT.DESCENDANTS 'MACHINES 'MEMBER) do ;; run-time-constant
        (remove.all.values machine 'FIRST-BOX-ON-MACHINE)
        (remove.all.values machine 'LAST-BOX-ON-MACHINE)
        (let* ((box1 (boxes-get-empty-box 'boxes))
               (box2 (boxes-get-empty-box 'boxes)))
          (kk.put.value (box1 boxes) 'start-time *minus-eternity*)
          (kk.put.value (box1 boxes) 'end-time (1+ (kk.get.value (box1 boxes) 'start-time)) :no.
av T)
          (kk.put.value (box2 boxes) 'start-time *plus-eternity*)
          (kk.put.value (box2 boxes) 'end-time (1+ (kk.get.value (box2 boxes) 'start-time)) :no.
av T)
          (put.value machine 'FIRST-BOX-ON-MACHINE box1)
          (put.value machine 'LAST-BOX-ON-MACHINE box2)
          (loop for box in (list box1 box2) do
                (kk.put.value (box boxes) 'box-type 'E)
                (kk.put.value (box boxes) 'gantt-chart gantt-chart)
                (kk.put.value (box boxes) 'immovable T)
                (kk.put.value (box boxes) 'machine machine))
          (kk.put.value (box1 boxes) 'same-machine-successor box2)
          (kk.put.value (box2 boxes) 'same-machine-predecessor box1)
          (remove.all.values box1 'same-machine-predecessor)
          (remove.all.values box2 'same-machine-successor)))))

(defun remove-box (box)
  "Remove a box from the machine chain, updating its neighbors pointers,
   and if necessary the associated machine's first box on machine pointer. Return the box."
  (when box
    (let* ((previous-box (kk.get.value (box boxes) 'same-machine-predecessor))
           (next-box (kk.get.value (box boxes) 'same-machine-successor)))
;;         (machine (kk.get.value (box boxes) 'machine))
;;      (if (not machine)
;;        (format T "Remove box - no machine on box ~a~%" (unit.name box))        DHO   1-26-89
 not all boxes have machine
          ;; else
          (cond ((not (and box previous-box next-box))                         ; If the event w
as actually scheduled reset pointers
;;                (y-or-n-p (format nil "Remove-box does not have all 3 boxes ~a ~a ~a" box previ
ous-box next-box))
                )
                (t
                 (kk.put.value (previous-box boxes) 'same-machine-successor next-box)
                 (kk.put.value (next-box boxes) 'same-machine-predecessor previous-box)))
        ;;   )
      box)))

(defun delete-box-and-successors (box)
  "Given a box, this will delete the given box and all same-tray-successor boxes.  Will also cal
l regenerate-activity-id to create new
   activity-ids for previously scheduled boxes.   It would be used if a tray was removed from pr
oduction."
  (when box
    (let ((successor-box (kk.get.value (box boxes) 'same-tray-successor))
          (activity-id (kk.get.value (box boxes) 'activity-id)))
      (remove-box box)
      (delete-setups-as-required box)
      (recycle-box box)
      (when activity-id
        (regenerate-activity-id box))
        ;;???? Will any same-tray-successor boxes be same-machine-successor boxes??? If so, wou
ld it be more efficient to regenerate after all boxes
        ;; deleted?  CRJ 3/21/89.
      (when successor-box
         (delete-box-and-successors successor-box) ; If there is same-tray-successors, delete t
he successors.
         ))))


(defun regenerate-activity-id (box)
  box)
```

```
(defun insert-box (box &optional left-box right-box)
  "Insert a box between right box and left box in the machine chain.   If only one is given, the
 other is calculated.
    Generally, only one should be given, to insure internal consistency.  If neither is given,
    the box is linked at the beginning of the machine chain."

  (when (or (eq box left-box) (eq box right-box)(eq left-box right-box))
    (format nil "---> Insert-box has 2 like boxes: Üa Üa Üa" box left-box right-box)
    (break))
  (let* ((machine (kk.get.value (box boxes) 'machine)))
    (cond ((not machine)
           (format T "No machine in insert-box box: ÜaÜ%" box))
          (t
           (cond ((and right-box (not left-box))
                  (setq left-box (kk.get.value (right-box boxes) 'same-machine-predecessor)))
                 ((and left-box (not right-box))
                  (setq right-box (kk.get.value (left-box boxes) 'same-machine-successor))))
           (when (not (and box left-box right-box))
             (format nil "---> Insert-box does not have all 3 boxes Üa Üa Üa" box left-box right
-box)

             (break))

           (kk.put.value (left-box boxes) 'same-machine-successor box)
           (kk.put.value (box boxes) 'same-machine-predecessor left-box)
           (kk.put.value (box boxes) 'same-machine-successor right-box)
           (kk.put.value (right-box boxes) 'same-machine-predecessor box)

           (when (or (not (kk.get.value (box boxes) 'BOX-TYPE))
                     (not (kk.get.value (left-box boxes) 'BOX-TYPE))
                     (Not (kk.get.value (right-box boxes) 'BOX-TYPE)))
             (format T "NIL box-type in insert-boxÜ%")
             (break))
           (when (and (<= (kk.get.value (box boxes) 'end-time) (kk.get.value (box boxes) 'start-
time))

                      (not (eq (kk.get.value (box boxes) 'box-type) 'FM))
                      (not (eq (kk.get.value (box boxes) 'from-previous-schedule) 'ACTIVITY)))
             (format t "Ü% box Üa left Üa right Üa " box left-box right-box)
             (y-or-n-p "pause")
             (let* ((bc-time (get.value *control-unit* 'BUILD-CONTEXT-TIME))
                    (end-time (kk.get.value (box boxes) 'end-time))
                    (start-time (kk.get.value (box boxes) 'start-time)))
               (when (< end-time bc-time)
                 (setq end-time (+ end-time bc-time))
                 (setq start-time (+ start-time bc-time)))
               (format t "Ü%Box: Üa End: Üa Start: Üa End time not later than Start time " (unit
.name box)

                       (utime-to-string end-time) (utime-to-string start-time)))))))


(defun display-box-info (box &rest ignore)
  "Displays box info to the msg-output-window on middle click on box"
  (let* ((window (get.value *control-unit* 'msg-output-window))
         (box-type (kk.get.value (box boxes) 'box-type))
         (start-time (kk.get.value (box boxes) 'start-time))
         (end-time (kk.get.value (box boxes) 'end-time))
         (machine (kk.get.value (box boxes) 'machine))
         ;;(machine-name (if machine (get.value machine 'gantt-mach-name) " "))
         (order (kk.get.value (box boxes) 'order-type))
         (tray (kk.get.value (box boxes) 'tray))
         (part-id (when tray (unit.name (kk.get.value (tray trays-in-system) 'part-id))))
         (operation (kk.get.value (box boxes) 'operation))
         (operation-name (when operation (if (unitp operation) (unit.name operation) operation))
)
         (duration (- end-time start-time))
         (line1 "ÜZ%Box: Üa    Type: Üa    Part: Üa    Op: Üa   Machine: ÜaÜ2%Start: Üa   End: Üa   Du
ration: Üa"))
    (setf (window-stream-get window 'displayed-box) box) ;Added for scrolling to next/previous b
ox. crj 4/19/89.
    (clear window) ; Changed to user level functions clear & select CRJ 4/17/89.
    (select window)
```

```
  (format window line1 (unit.name box) box-type (or part-id "(None)") (or operation-name "(Non
e)") (unit.name machine)
          (subseq (utime-to-string start-time) 5 19)
          (subseq (utime-to-string end-time) 5 19)
          (convert-incr-time-to-string duration))
  (case box-type
    ((D U) nil)
    (PM (format window "Ü2%PM Code: Üa" (kk.get.value (box boxes) 'operation)))
    (t                                   ; S and P boxes
     (let* ((tray-order (kk.get.value (tray trays-in-system) 'order))
            (parts-on-tray (kk.get.value (tray trays-in-system) 'tray-size))
            (order-name (when tray-order (unit.name tray-order))))
       (format window "Ü2%Quantity: Üa   Tray: Üa" parts-on-tray (unit.name tray))
       (cond ((eq order 'safety-stock)
              (format window "Ü%Ü%This part-operation is for safety stock replenishment"))
             ((kk.get.value (box boxes) 'from-previous-schedule)
              (format window "Ü%Ü%This part-operation is from the previous schedule"))
             (t (format window "Ü%Ü%This part-operation is from Üa and is due at: Üa"  order-n
ame
                           (subseq (utime-to-string (kk.get.value ((kk.get.value (box boxes) 'tra
y) trays-in-system) 'due-date)) 5 19))))
       (display-next-box-info window box machine))))))


(defun display-next-box-info (window box machine)
  ;; Display useful stuff about the next box for this tray
  (let* (agv-move-time next-start prev-end prev-machine next-machine
         (next-boxes (kk.get.values (box boxes) 'same-tray-successor))
         (prev-boxes (kk.get.values (box boxes) 'same-tray-predecessor)))

    (when next-boxes
      (loop for next-box in next-boxes do
            (setq next-start (kk.get.value (next-box boxes) 'start-time))
            (setq next-machine (kk.get.value (next-box boxes) 'machine))
            (setq agv-move-time (or (when (and machine next-machine) (get-agv-time machine next-
machine)) 0))
            (format window "Ü%Ü%Next op on this tray: Üa,Üa starts: Üa  Üa" (unit.name next-box)
                    (unit.name (kk.get.value (next-box boxes) 'operation))
                    (subseq (utime-to-string next-start) 5 19)
                    (if (not (synchronous-boxes box next-box))
                        "*** ASYNCH ***"
                        ""))))
    (cond ((equal (kk.get.value (box boxes) 'inventory) 'REPLENISH)
           (format window "Ü%Ü%This tray/operation is for safety stock replenishment"))
          ((and (kk.get.value (box boxes) 'inventory)
                (kk.get.value (box boxes) 'same-tray-predecessor))
           (format window "Ü%Ü%Prev op on this tray came from previous schedule"))
          ((kk.get.value (box boxes) 'inventory)
           (format window "Ü%Ü%Prev op on this tray came from WIP"))
          ;; Display useful stuff about previous boxes for this tray
          (t (loop for prev-box in prev-boxes do
                   (setq prev-end (kk.get.value (prev-box boxes) 'end-time))
                   (setq machine (kk.get.value (box boxes) 'machine))
                   (setq prev-machine (kk.get.value (prev-box boxes) 'machine))
                   (setq agv-move-time (get-agv-time machine prev-machine))
                   (format window "Ü%Prev op on this tray: Üa,Üa ends: Üa  Üa" (unit.name prev-b
ox)
                           (unit.name (kk.get.value (prev-box boxes) 'operation))
                           (subseq (utime-to-string prev-end) 5 19)
                           (if (not (synchronous-boxes prev-box box))
                               "*** ASYNCH ***"
                               ""))))))))

(defun show-partners (process-box gantt-chart)
  "Highlights or un-highlights all process boxes in a tray"
  (let* ((list-of-boxes  (cond ((kk.get.values (process-box boxes) 'same-tray-predecessor)
                                (kk.get.values (process-box boxes) 'same-tray-predecessor))
                               ((kk.get.value (process-box boxes) 'same-tray-successor)
                                (list (kk.get.value (process-box boxes) 'same-tray-successor)))
  )
```

```
        (msg-output-window (get.value *control-unit* 'msg-output-window))
        (lighting-op 'highlight!))
    (setq *highlighted-boxes* nil)
    (when (and (equal (length list-of-boxes) 1)      ; if only assy box follows process remove f
rom list
               (equal (kk.get.value ((first list-of-boxes) boxes) 'box-type) 'X)
               (> (length (kk.get.values ((first list-of-boxes) boxes) 'same-tray-predecessor))
1))
      (setq list-of-boxes nil))
    (when (equal lighting-op 'highlight!)
      (lowlight-previous-gantt-highlights  gantt-chart))
    (if (not (memq (kk.get.value (process-box boxes) 'box-type) '(P X)))
        (format msg-output-window "~%% Non-process boxes can not be highlighted")
        ;; else
        (let (tray-partners)
          (cond ((and (equal lighting-op 'highlight!)        ;; Clicking a second time unhighlig
hts-
                      (member process-box (get.values gantt-chart 'previous-highlight)))
                 (remove.all.values gantt-chart  'previous-highlight)
                 (remove.all.values  gantt-chart 'previous-dateline-highlight))
                (t
                 (remove.all.values gantt-chart  'previous-highlight)
                 (remove.all.values  gantt-chart 'previous-dateline-highlight)
                 (cond ((or (equal (kk.get.value (process-box boxes) 'box-type) 'x)
                            (null list-of-boxes))
                        (when (kk.get.value (process-box boxes) 'inventory)
                          (kk.put.value (process-box boxes) 'borders 6))
                        (box-high-or-low-light! process-box lighting-op 0 'light-gray)
                        (ADD.VALUE GANTT-CHART 'PREVIOUS-HIGHLIGHT  PROCESS-BOX)))
                 (setq *highlighted-boxes* (list (first list-of-boxes) process-box))
                 (loop for predecessor in list-of-boxes                    ;; highlight all associat
d boxes
                       do
                       (find-same-tray-process-boxes predecessor gantt-chart)
                       (setq tray-partners (setq  *highlighted-boxes* (remove-duplicates *highli
ghted-boxes*)))
                       (loop for partner-box in tray-partners do
                             (when (kk.get.value (partner-box boxes) 'inventory)
                               (kk.put.value (partner-box boxes) 'borders 6))
                             (box-high-or-low-light! partner-box lighting-op 0 'light-gray))))))
)))

(defun user-reports ())
(defun trays-from-wip ())
(defun late-assembly-trays ())

(defun highlight-wip-trays ( )
  "Function to highlight boxes for trays that came from WIP and didn't execute entire routing"

  (loop for box in (unit.children 'boxes 'member)
        when (kk.get.value (box boxes) 'inventory)
        do (box-highlight! box 0 'light-gray)))

(defun lowlight-wip-trays ( )
  "Function to lowlight boxes for trays that came from WIP and were previously highlighted"
  (loop for box in (unit.children 'boxes 'member)
        when (kk.get.value (box boxes) 'inventory)
        do (box-lowlight! box 'lowlight!)))


(defun highlight-late-trays ( )
  "Function to highlight late trays and report average days early for assemblies"
  (let* ((late-tray-count 0)
         (assembly-trays 0)
         (hours-early 0)
         (secs-hr 3600)
         (msg-output-window (get.value *control-unit* 'msg-output-window))
         due-date final-operation-end box)
    (loop for tray in (get-trays-in-system 'assembly-trays) ;New tray pool crj 4/19/89.
;;        (loop for tray in (get-final-trays-in-system)           DHO  7-18-89    Add later w/
```

Chris' code

```
        do
        (setq box (kk.get.value (tray trays-in-system) 'final-box))
        (setq final-operation-end (kk.get.value (box boxes) 'end-time))
        (setq due-date (kk.get.value (tray trays-in-system) 'due-date))
        (setq assembly-trays (+ assembly-trays 1))
        (setq hours-early (+ hours-early (- due-date final-operation-end)))
        (cond ((> final-operation-end due-date)
               (box-highlight! box 0 'gray)
;;             (format t "Ü% box Üa at time Üa is late " box (utime-to-string (kk.get.value (b
ox boxes) 'end-time)))
               (setq late-tray-count (+ late-tray-count 1)))))
    (format msg-output-window "Ü2% The number of late trays for the schedule was Üa " late-tray-
count)
    (format msg-output-window "Ü2% Assemblies were completed an average of Üa days early "
            (round-2 (fquotient (fquotient (fquotient hours-early secs-hr) assembly-trays) 24)))
))

(defun lowlight-late-trays ( )
  (let* (box final-operation-end due-date)
  (loop for tray in (get-trays-in-system 'assembly-trays) do
       (setq box (kk.get.value (tray trays-in-system) 'final-box))
       (setq final-operation-end (kk.get.value (box boxes) 'end-time))
       (setq due-date (kk.get.value (tray trays-in-system) 'due-date))
       (when (> final-operation-end due-date)
         (box-lowlight! box)))))

(defun lowlight-previous-gantt-highlights (gantt-chart &optional self)
  " lowlights previously highlighted gantt subpictures"
  self ; ignore
  (let ((previous-highlight (union (get.values gantt-chart 'previous-dateline-highlight)
                                   (get.values gantt-chart 'previous-highlight))))
    (loop for box in previous-highlight
          do (if (kk.get.value (box boxes) 'inventory)
                 (kk.put.value (box boxes) 'borders 1))
          (box-lowlight! box))))


(defun find-same-tray-process-boxes (process-box gantt-chart &optional (relation 'same-tray-succ
essor ))
  " Finds all associated process boxes (operations) for the PROCESS-BOX 'TRAY-"
  ;; Save the process-box reference as highlighted-
  (ADD.VALUE GANTT-CHART 'PREVIOUS-HIGHLIGHT PROCESS-BOX)
  ;; IF you have the boxes's predecessor, AND there is not a box, stop finding the partners and
return the list-
  (if (and (equal relation 'same-tray-predecessor)
           (not (kk.get.value (process-box boxes) 'same-tray-predecessor)))
      (get.values gantt-chart 'previous-highlight)
      ;;Otherwise: IF there is not a successor, THEN the relation = ' same-tray-predecessor
      ;;  Check if successor operation is assembly-  If so reverse direction of highlighting

      (let ((relation
             (cond ((or (not (kk.get.values (process-box boxes) 'same-tray-successor))
                        (and (equal (kk.get.value ((kk.get.value (process-box boxes) 'same-tray
-successor) boxes)
                                                  'box-type) 'X)
                             (not (kk.get.value ((kk.get.value (process-box boxes) 'same-tray-s
uccessor) boxes)
                                                'same-tray-successor))))
                    (cond ((kk.get.value (process-box boxes) 'same-tray-successor)
                           (Add.value GANTT-CHART 'PREVIOUS-HIGHLIGHT (kk.get.value (process-bo
x boxes)
                                                                                  'same-tray-
successor))
                           (setq *highlighted-boxes* (append *highlighted-boxes*
                                                     (list process-box (kk.get.value (process-b
ox boxes) 'same-tray-successor))))))
                    'same-tray-predecessor)      ;; Otherwise:  Keep going in same direction
                   (t relation))))
        (loop for box in (get.values process-box relation) do
```

```
(setq *highlighted-boxes* (append *highlighted-boxes* (list box)))
(find-same-tray-process-boxes box gantt-chart relation)))))


;;; ---------------------- LOW LEVEL BOX LIGHT FUNCTIONS ------------------------------------

;;; Boxes have:  POSITION, WIDTH.  Height is *box-height*
;;;   REGION is where it is displayed in the window.
;;;   If REGION is NIL, it is not displayed.
(defun BOX-HIGH-OR-LOW-LIGHT! (u op &optional num color) ; color is NIL or LIGHT-GRAY
  (if (eq op 'HIGHLIGHT!)
      (box-highlight! u num color)
      ;; else
      (box-lowlight! u)))

(defun BOX-HIGHLIGHT! (u &optional num color) ; color is NIL or LIGHT-GRAY
  num ; ignore
  ;;(box-open! u)
  (let* ((real-color (if (eq color 'LIGHT-GRAY) *dark-grey-color* ; *light-grey-color*
                         (if (eq color 'GRAY) *dark-grey-color* 8)))
         (old-color (kk.get.value (u boxes) 'HIGHLIGHTP)))
    (when (not (eq real-color old-color))
      (box-light u real-color old-color)
      (kk.put.value (u boxes) 'HIGHLIGHTP real-color))))

(defun BOX-LOWLIGHT! (u &optional dontredisplay)
  ;;(box-open! u)
  (let* ((real-color nil)
         (old-color (kk.get.value (u boxes) 'HIGHLIGHTP)))
    (when (not (eq real-color old-color))
      (box-light u real-color old-color dontredisplay)
      (kk.put.value (u boxes) 'HIGHLIGHTP nil))))

(defun BOX-LIGHT (u color &optional old-color dontredisplay) ; color is 10 or 8 or nil
  (when (kk.get.value (u boxes) 'OPENP)
    (let* ((gantt-chart (kk.get.value (u boxes) 'GANTT-CHART))
           (window (window-stream-get (get.value gantt-chart 'WINDOW) 'gantt-window))
           (region (kk.get.value (u boxes) 'REGION)))
      (when (and window region (null dontredisplay))
        (when old-color (invert-region window region old-color))
        (when color (invert-region window region color))))))

(defun INVERT-REGION (stream region color)
  "Change a region's color (to highlight)."
  (draw-filled-rectangle-xy stream (1+ (region-left region))
                            (1+ (region-bottom region))
                            (- (region-width region) 2)
                            (- (region-height region) 3)
                            :operation boole-xor
                            :color color))


(defun BOX-OPEN! (box &optional scrolled)
  "Display this box on the gantt chart"
  (kk.put.value (box boxes) 'REGION nil)  ; Reset to not on screen-
  (kk.put.value (box boxes) 'OPENP t)
  (let* ((start-time (kk.get.value (box boxes) 'START-TIME))
         (end-time (kk.get.value (box boxes) 'END-TIME))
         (gantt-chart (kk.get.value (box boxes) 'GANTT-CHART))
         (gstart (get.value gantt-chart 'START-TIME))
         (gend (get.value gantt-chart 'END-TIME))
         (vertical-scroll-p (get.value gantt-chart 'VERTICAL-SCROLL-P))
         (box-type (kk.get.value (box boxes) 'box-type))
         (machine (kk.get.value (box boxes) 'machine))
         (machine-displayed-on-gantt-chart (get.value machine 'generate-gantt-machine)))

    (when (and start-time end-time gstart gend (> end-time gstart) (< start-time gend)
             (if (and (not machine-displayed-on-gantt-chart)
                      (eq box-type 'u)) ;If the machine is NOT displayed by itself, don't disp
```

```
ay downtimes.  CRJ 4-14-89
                   nil
                   t)
               (or (not vertical-scroll-p)
                   (get.facet.value gantt-chart (unit.name machine) 'BASELINE-Y)))
      ;; OK to display this box.
      (when (not (kk.get.value (box boxes) 'WIDTH)) (box-update box))

      (let* ((position (if scrolled (box-position box)
                           (or (kk.get.value (box boxes) 'POSITION) *default-position*)))
             (window (window-stream-get (get.value (kk.get.value (box boxes) 'GANTT-CHART) 'WIND
OW) 'gantt-window))
             (width (or (kk.get.value (box boxes) 'WIDTH) 0))
             (height (1- *box-height*)) ; Let the box fit between the lines.
             (region (make-reg (position-x position) (position-y position)
                               width height)))
        (kk.put.value (box boxes) 'REGION region)
        (draw-rectangle window position (+  0 ;;  FOOBAR is unbound; why is it here?  MJJ 12/27/
88
                                          width) height :operation boole-1)
        (let* ((hotspot (GANTT-PRINT-LABEL-IN-REGION box (first (kk.get.value (box boxes) 'STRIN
GS)) window region))
               (hlist (window-stream-hotspot-list window)))
          (setf (window-stream-hotspot-list window) (cons hotspot hlist)))
        (when (kk.get.value (box boxes) 'HIGHLIGHTP) (box-light box (kk.get.value (box boxes) 'H
IGHLIGHTP))))))
  nil)

(defun BOX-CLOSE! (box &optional dontredisplay)
  "Erase the box from the gantt chart - by bitblt'ing the corresponding part from the bitmap.
   Note that if 2 boxes overlap, the second will be partially obliterated.  However, the user ty
pically does not want to watch
   the boxes being moved, so this is not a problem.  When scrolling the screen, the entire screen
 is cleared and repainted."

  (when (kk.get.value (box boxes) 'OPENP)
    (kk.put.value (box boxes) 'OPENP nil)
    (let* ((gantt-chart (kk.get.value (box boxes) 'GANTT-CHART))
           (region (kk.get.value (box boxes) 'REGION))
           (window (window-stream-get (get.value gantt-chart 'WINDOW) 'gantt-window)))
      (when (and gantt-chart region window)
        (kk.remove.all.values (box boxes) 'REGION)
        (unless dontredisplay
          (let* ((bitmap (get.value gantt-chart 'BITMAP))
                 (hotspot-list (window-stream-hotspot-list window))
                 (this-lite nil))

            ;; We assume there is only 1 hotspot/lite for each box-
            (loop for lite in hotspot-list
                  while (not this-lite)
                  when (equal (lite-object lite) (unit.name box))
                  do
                  (setf (window-stream-hotspot-list window) (remove lite hotspot-list))
                  (setf this-lite lite))

            (bitblt bitmap (region-left region) (region-bottom region)
                    window (region-left region) (region-bottom region)
                    (region-width region) (region-height region)  ;; + 10 ???
                    boole-1))))
      nil)))

(defun BOX-MOVE! (box &optional end-times)
  "Move a box from one location to another.  See the comment on box.close!"
  (let* ((openp (kk.get.value (box boxes) 'OPENP)))
    (when openp (box-close! box))
    (box-update box end-times)
    (box-open! box)
    nil))
```

```
(defun BOX-UPDATE (box &optional end-times)
  "Update the box with its new position on the screen."
  (let* (position width)
    (multiple-value-setq (position width) (box-position box end-times))
    (kk.put.value (box boxes) 'WIDTH width)
    (kk.put.value (box boxes) 'POSITION position)
    nil))

(defun box-position (box &optional end-times)
  "Calculate the box position on the screen."
  (let* ((gantt-chart (kk.get.value (box boxes) 'GANTT-CHART))
         (gstart (or (get.value gantt-chart 'START-TIME) 0))
         (scale (get.value gantt-chart 'SCALE))
         (machine (kk.get.value (box boxes) 'MACHINE))
         (baseline-y (or (get.facet.value gantt-chart (unit.name machine) 'BASELINE-Y)
                         (get.facet.value gantt-chart (unit.name (car (unit.parents machine 'mem
ber))) 'baseline-y) ;CRJ 4-14-89
                         0))
         (start-time (kk.get.value (box boxes) 'start-time))
         (end-time (if end-times (first end-times) (kk.get.value (box boxes) 'end-time)))
         (pixel-start-time (round (* scale (- start-time gstart))))
         (pixel-end-time   (round (* scale (-   end-time gstart))))
         (position (make-pos pixel-start-time baseline-y))
         (width (- pixel-end-time pixel-start-time)))  ;;(round (* scale (- end-time start-time)
))))
    (values position width)))



;;;***********************************************************************************
;; To move a box:  erase the old box, reset the hotspot list to contain lite with
;; new region of box, redraw the box in new region---
;;;***********************************************************************************


;;;***********************************************************************************
(defun GANTT-PRINT-LABEL-IN-REGION (item label window region)
  "This is a local version of print-label-in-region that prints a label in a region and returns
 the hotspot"
  (let* ((hregion (make-reg (region-left region) (+ 3 (region-bottom region)) ; Need the 3 becau
se hotspots occur low.
                            (+ -1 (region-width region))(+ 1 (region-height region)))))
    (b-center-print-in-region window (mkstring label) region)
    ;;                      (region-left region) (region-bottom region)
    ;;                      (region-width region) (region-height region))
    (setf (window-stream-x-position window) (region-left hregion))
    (setf (window-stream-y-position window) (region-bottom hregion))
    (print-object window item  :label " " :minimum-height (region-height hregion)
                  :minimum-width (region-width hregion))))
(defun b-center-print-in-region (window string region)
  "This is the local version of center-print-in-region"
  (let* ((left (region-left region))
         (bottom (region-bottom region))
         (width (region-width region))
         (height (region-height region))
         (font fonts:h17)
         (twidth (font-string-width font string))
         (theight (font-character-height font))
         (x (+ left (round (- (/ width 2) (/ twidth 2)))))
         (y (+ bottom (round (- (/ height 2) (/ theight 2)))))
         (position (make-position :x x :y y)))
    (when (and (> x 0) (< (+ x twidth 14) *right-end*))  ;;; Increment the 17 if wraparound
      (set-window-stream-cursor-position window position)
      (setf (window-stream-font window) font)
      (format window "~A" string)
      (setf (window-stream-font window) *medium-bold-font*))))


;;;----------------------------------------
```

```
;; These are covering functions for the methods, AVs, and button fns in the GANTT KB.

;; 8/19/88  M. Jeffery
;;
;; The function files for ESS contain uses of the KK macro package.
;; Use of KK macros requires that the GANTT KB (in particular,
;; the BOXES compact class unit) already be loaded when those
;; macros are being compiled.  But normally the function file
;; would be loaded BEFORE the KB, in order to keep KEE from
;; generating METHOD valueclass errors.
;;
;; These covering functions, when loaded before the KB,
;; will permit the rest of the functions to be loaded AFTER
;; the KB without generating any valueclass errors, and
;; also will permit the KK macro package to be loaded
;; both after the KB and before the function file that
;; uses them, so that compilation can go smoothly.
;; Got that?
;(defun BOXES-GET-EMPTY-BOX (&rest args)
;  (declare (ignore args))
;  (error "Cover function for proper loading; should never actually be called-"))
;
;(defun END-TIME-AVPUT (&rest args)
;  (declare (ignore args))
;  (error "Cover function for proper loading; should never actually be called-"))
;
;(defun SHOW-PARTNERS (&rest args)
;  (declare (ignore args))
;  (error "Cover function for proper loading; should never actually be called-"))
;
;(defun DISPLAY-BOX-INFO (&rest args)
;  (declare (ignore args))
;  (error "Cover function for proper loading; should never actually be called-"))

(defun count-boxes ()
  (let* ((e-boxes 0)
         (p-boxes 0)
         (s-boxes 0)
         (pm-boxes 0)
         (u-boxes 0))
    (loop for box in (unit.children 'boxes 'member) do   ;;Changed to unit.children.  CRJ 4/17/8
9
          (when (eq (kk.get.value (box boxes) 'box-type) 'E)
            (setq e-boxes (+ 1 e-boxes)))
          (when (eq (kk.get.value (box boxes) 'box-type) 'S)
            (setq s-boxes (+ 1 s-boxes)))
          (when (eq (kk.get.value (box boxes) 'box-type) 'PM)
            (setq pm-boxes (+ 1 pm-boxes)))
          (when (eq (kk.get.value (box boxes) 'box-type) 'U)
            (setq u-boxes (+ 1 u-boxes)))
          (when (or (eq (kk.get.value (box boxes) 'box-type) 'P)
                    (eq (kk.get.value (box boxes) 'box-type) 'X))
            (setq p-boxes (+ 1 p-boxes))))
    (format t "~%X e: ~a S: ~a PM: ~a U: ~a P: ~a " e-boxes s-boxes pm-boxes u-boxes p-boxes)))
;;; -*- Mode:Common-Lisp; Package:KEE; Base:10; Fonts:(cptfont HL10B cptfont HL12B HL12BI) -*-

;;; GLOBALS.LISP

(defvar *minus-eternity* -90000000000)
(defvar *plus-eternity*   90000000000)
(defvar *minus-infinity* 0)
(defvar *minus-infinity-bc* 0)
(defvar *halfway-to-minus-infinity* 10000000) ; 100 days
(defvar *plus-infinity* 10000000000)
(defvar *additional-days* 0)
(defvar *control-unit* nil)
(defvar *dynamic-date* nil)

(defvar *time-zone* 0)    ; use EST for consistency across test cases
(defvar *time1* nil)      ; For timing how long each routine takes
(defvar *time2* nil)
```

```
(defvar *count* 0)
(defvar *last-part* nil)
(defvar *last-highlighted-box* nil)
(defvar *jumped-box-successor* nil)
(defvar *nil-pocket-box* nil)
(defvar *blocking-box-type* nil)
(defvar *parts-to-order* nil)
(defvar *steps-to-schedule* nil)

;;; Vars for the gantt chart window.
(defvar *highlighted-boxes* nil)
(defvar *box-height* 0)   ;; Height of a box in pixels.  Calculated during initialization.
(defvar *light-grey-color* 10)
(defvar *dark-grey-color* 6)
(defvar *scroll-incr* 28800)   ;  Number of seconds to show horizontally on the screen (28800 is
 8 hours).
(defvar *gantt-minimum-baseline-incr* 15) ;; This is the minimum number of pixels for each machi
ne vertically. (cannot mash them closer)
(defvar *right-end* 0)  ; Width of the gantt window.  Calculated during initialization.
(defvar *default-position* (make-pos))

(defvar *do-dummy-fcs* nil)
(defvar *shift-right-bc-time* nil)
(defvar *shift-right-fti-time* nil)
(defvar *number-nonsync-opers* nil)
(defvar *total-number-opers* nil)
(defvar *last-oper-box-end* nil)

(defvar *component-order-name*)
(defvar *default-due-date*)
(defvar *chosen-table*)
(defvar *chosen-component-table*)
(defvar *order-name*)
(defvar *default-due-date-string*)
(defvar *selection-table*)
(defvar *parts-list*)
(defvar *qty-list*)
(defvar *warning-window* (make-window-stream
                          :left 0 :bottom 0 :width 445 :height 175 :borders 2
                          :title "WARNING !!!"
                          :title-font *title-font* :font-set (list (open-font 'helvetica 'bold
                          :parent *kee-root-window* :type 'window-stream))
(defvar *watch-window* nil)                     ;; The watch process writes to this window.

(defvar *current-parameter* nil)        ; Used to track which parameter is currently being modifie
d by the user

(defvar *rescheds* nil)                 ;; For debugging only -- This contains the list of actions
 taken.
(defvar *resched-report* nil)           ;; For reporting on the results -- This contains the list
of actions taken.
(defvar *resched-number* 0)
(defvar *resched-debug* nil)            ;; Set this variable to a unit.name and debug msgs will pr
int out.
(defvar *left-box* nil)
(defvar *right-box* nil)

;;; -*- Mode:Common-Lisp; Package:KEE; Base:10 -*-


(in-package 'kee)

;;;  Incremental Bridge translation       M. Jeffery

;;;  Take in the incremental bridge file from the FCS side,
;;;  and parse the records into the proper FCS KB units.


;;  Filename for PM Bill of Materials file: PMMATERIALS.DAT
;;  unitnames:  pm-bill-of-materials-file;  manpower-skill-file;   resource-file
```

```
(defun read-pm-bill-of-materials (&optional (filename "pmmaterials.dat"))
  "Read the PM Bill of materials input file into the FOE KB."

  ; called by do-pre-processing; READDAT has code for rest of input files.

  (let ((*ibridge-test* nil))
    (declare (special *ibridge-test*))  ; turnoff printout eventually...
    (with-open-file (stream (merge-pathnames filename *data-dir*) :direction :input)
      (let ((first-line (read-lines stream 1))) ; throw away header
        (unless (eq first-line 'eof)
          (loop for line = (read-lines stream 1 nil :eof-acceptable t)  ; ok if hit eof.
                with pm-count = 0
                with res-count = 0
                with man-count = 0
                until (eq line 'eof)
                do (let* ((new-record (add-record 'pm-bill-of-materials-file stream line 'pm-cor
e :name-prefix ""))
                          (num-resource (parse-integer (or (get.value new-record 'no-of-resource
-records) "0")))
                          (num-skill (parse-integer (or (get.value new-record 'no-of-skill-recor
ds) "0"))))
                     (incf pm-count)
                     (dotimes (x num-resource)
                       (incf res-count)
                       (add-record 'resource-file stream nil 'functional-code :name-prefix ""))
                     (dotimes (x num-skill)
                       (incf man-count)
                       (add-record 'manpower-skill-file stream nil 'manpower-trade/skill :name-p
refix "")))
                finally (inform 'progress "Ü&Ü%U4,' d records read from PM-BILL-OF-MATERIALS-FI
LE of type ÜaÜa"
                                pm-count "PM-BILL-OF-MATERIALS"
                                res-count "RESOURCE"
                                man-count "MANPOWER-SKILL")))))))


(defparameter *last-group-id* nil)

(defvar *ibridge-discard* nil)  ; if T, discard instead of delete.  NIL is normal.
(defvar *ibridge-test* t)       ; if T, give verbose messages.


(defparameter *record-ids*
              '("PP A" "PP M" "PP D" "OPRN_INPT" "OPRN_OUTT"
                "OP M" "OP R"                                  ; NOTE: OPRN must be last, since it is
 a substring
                "RT A" "RT D" "OPRN_FREF" "OPRN")              ;       of some of the other record ID
 names.
              "A list of all the strings that are legal record ids for the incremental bridge fi
le.")


(defun read-incremental-bridge (&optional (filename "incrbrdg.dat"))
  (with-open-file (stream (merge-pathnames filename (merge-pathnames "incrbrdg.dat" *data-dir*))
 :direction :input)
    (inform 'special "ÜÜReading Incremental Bridge file Üa%" (namestring (truename stream)))
    (let ((first-line (read-lines stream 1)))  ; throw away header.
      (unless (eq first-line 'eof)
        (loop for line = (read-lines stream 1 nil :eof-acceptable t)
              until (eq line 'eof)
              do
              (check-line-length line)
              (unless (= (length line) 0) (parse-line stream line)))))))


(defun parse-line (stream line)
  (let ((record-id (find-record-id line)))
    (if record-id
        (setq *last-group-id*
              (cond ((and (member *last-group-id* '(ÜOP RÜ 'ÜOPRN_INPT MÜ 'ÜOPRN_OUTT MÜ) :test
```

```
#'eq)  ; Previous OP R case
                              (member record-id '(%OPRN_INPT% '%OPRN_OUTT%) :test #'eq))
       ; and not a new case
                       (intern (format nil "~a M" record-id) 'kee))
                      (t record-id)))
        (perform-action stream *last-group-id* line)))) ;if line isn't a rec id, then assume it'
s record of same type.


(defun perform-action (stream record-code &optional first-line)
  (ccase record-code    ; only first 5 have been tested.    ; NOTE: must never delete machines...
    (%PP A%          (add-record 'productive-parts-listing-file stream first-line 'functional-code
))
    (%PP M%          (modify-record 'productive-parts-listing-file stream first-line 'functional-c
ode))
    (%PP D%          (delete-records 'productive-parts-listing-file stream first-line 'schedule-re
source-type nil 10))
    (%OPRN_INPT%     (add-record 'input-parts-to-operations-file stream first-line 'operation-name
))
    (%OPRN_OUTT%     (add-record 'output-parts-from-operations-file stream first-line 'operation-n
ame))
    (%OR A%          (add-record 'other-resources-listing-file stream first-line 'functional-code)
)
    (%OR M%          (modify-record 'other-resources-listing-file stream first-line 'functional-co
de))
    (%OR D%          (delete-records 'other-resources-listing-file stream first-line 'schedule-res
ource-type nil 10))
    (%OPRN_OTHR%     (add-record 'other-resources-used-in-operations-file stream first-line 'opera
tion-name))
    (%OP M%          (modify-record 'operations-listing-file stream first-line 'operation-name))
    (%OP R%          (format t "~%OP R record ID not followed by OPRN_INPT or OPRN_OUTT~%"))
    (%OPRN_INPT M% (modify-record 'input-parts-to-operations-file stream first-line 'operation-n
ame))  ; OP R case
    (%OPRN_OUTT M% (modify-record 'output-parts-to-operations-file stream first-line 'operation-
n
ame)) ; OP R case
    (%RT A%          (add-record 'routings-file stream first-line 'routing-name))
    (%RT D%          (delete-records 'routings-file stream first-line 'routing-name nil 20)
                     (setq *last-group-id* '%SOT D%))  ; read SOT specs; don't delete them; may st
ill be used elsewhere.
    (%SOT D%         )  ; do nothing but read the records -- might still be used elsewhere.
    (%OPRN%          (add-record 'operations-listing-file stream first-line 'operation-name))
    (%OPRN_PREF%     (add-record 'operations-facility-preferences-file stream first-line 'operatio
n-name))
    ))


(defun MODIFY-RECORD (fcs-record-type stream first-line id-slot)
  "Read a record of the indicated type from the stream and delete any records with the same valu
e ID slot."
  (let* ((new-record (add-record fcs-record-type stream first-line id-slot 'no-parent t)))
    (delete-records fcs-record-type stream nil id-slot (get.value new-record id-slot))  ; should
 only be one record.
    (most.parents new-record fcs-record-type nil 'member)         ; now add in the new record.
    (and *bridge-test* (bridge-msg "Replacement" (get.value new-record id-slot) (unit.name new
-record)))
    (unit new-record)))


(defun DELETE-RECORDS (fcs-record-type stream first-line id-slot &optional id-value size)
  "Delete all members of the indicated class that have the given slot value."
  (loop for record-unit in (unit.descendants fcs-record-type 'member)
        with id-value = (or id-value (get-initial-field stream first-line size))
        when (equal id-value (get.value record-unit id-slot))
        do
        (bridge-msg "DELETION" (string-trim '(#\space) id-value) (unit.name record-unit))
        (if *bridge-discard*
            (discard-unit record-unit)
            (delete.unit record-unit))))
```

```
(defun GET-INITIAL-FIELD (stream string size)
  (let ((string (or string (read-lines stream 1))))
    (subseq (the string string) 0 (the number size))))


(defun ADD-RECORD (fcs-record-type stream first-line id-slot &key no-parent (name-prefix "BRIDGE
-"))
  "Read a record of the specified type from the stream."
  (let* ((string-record (read-lines stream (record-length-in-lines fcs-record-type) first-line))
)
    (when (or (null string-record) (eq string-record 'eof)) (return-from add-record nil))
    (let ((new-record-name (gentemp (format nil "~a~a-" name-prefix (get.value fcs-record-type '
fcs-record-name))
                                    'kee))) ; generate unique symbol
      (translate-record-to-unit fcs-record-type string-record new-record-name :no-parent no-pare
nt)
      (record-sequence new-record-name fcs-record-type)  ; used to enforce facility preference o
rder.
      (when (and *ibridge-test* (null no-parent))
        (ibridge-msg "Addition" (get.value new-record-name id-slot) (unit.name new-record-name))
)
      (unit new-record-name))))
(defun ibridge-msg (operation id record)
  (inform 'progress "~%~14a<~a:~>~25a<~a~>  ~a" operation id (unit.name record)))


(defun find-record-id (string)
  "If the string starts with a legal record id, return the symbol for the id."
  (declare (special *record-ids*))
  (loop for record-id in *record-ids*
        when (string= record-id string :end2 (length record-id))
        return (intern record-id 'kee)
        finally (return nil)))


(defun translate-record-to-unit (fcs-record-type string-record record-unitname &key no-parent)
  "Translate from the string form of the record into a unit and slots."
  (let* ((field-format (get.value fcs-record-type 'fcs-field-format))  ; borrowed from Ketan...
         (field-names (get.value fcs-record-type 'fcs-field-names))
         (unit (create.unit record-unitname 'fcs nil (if no-parent nil fcs-record-type))))
    (declare (special unit)) ; check: is this needed for the lambda?? Seem to be in readdat.
;;  (format t "~2%~a record length: ~a~%" (unit.name fcs-record-type) (length string-record))
    (map nil #'(lambda (slot val) (put.value unit slot val))
         field-names
         (string-to-list string-record field-format nil nil))
    unit))


(defun record-length-in-lines (fcs-record-unit)
      (when (unit.exists.p fcs-record-unit)
        (let ((field-format (get.value fcs-record-unit 'fcs-field-format)))
          (ceiling (+ (reduce #'+ field-format)
                      (1- (length field-format)))
                   80))))


(defun read-lines (stream n &optional initial-line &key eof-acceptable (eof-return 'eof))
  "Read n lines from the specified stream, if possible."
  (cond ((not (numberp n)) (error "Input ~a to READ-LINES not a number." n))
        ((and (= (the number n) 1) initial-line)
         (check-line-length initial-line))  ; common case; handle efficiently.
        ((= n 0) nil)
        (t (catch 'eof
             (inform 'debug   ; note: inform return string...
                     (with-output-to-string (output-stream)     ; do this to keep from copying s
tring over and over.
                       (if initial-line (format output-stream (check-line-length initial-line)))
                       (loop for count from (if initial-line 2 1) to n
                             for line = (read-line stream nil 'eof)
                             do
```

```
                    (when (eq line 'eof)
                      (unless (and (= count 1) eof-acceptable)
                        (format t "U2%Premature EOF while reading file Ua.U%" (namestri
ng (truename stream))))
                      (throw 'eof eof-return))
                    (format output-stream (check-line-length line)))))))))


(defun check-line-length (line &optional (length 80))
  (if (and line (not (= (length (the string line)) length)))
      (progn (inform 'warning "U2%Warning: Line has length Ua; should be Ua: U%UaUU%" (length li
ne) length line)
             (cond ((< (length line) length)
                    (inform 'warning "U%Right-padding line with spaces to Ua chars.U%" length)
                    (format nil "Uv<UaU>" length line))
                   (t line)))
      line))



;;; ------------------------------------
;;;  MESSAGE CONTROL      MJJ 9/22/88
;;; ------------------------------------

;;; The user-level function SET-MESSAGE-DETAIL can be used to control the
;;; amount and type of output from the interface processing.

;;; There are currently three user-level settings: MIN, DISCARDS, and MAX.


;;; The underlying INFORM system permits fairly fine control over which
;;; messages appear in which modes...


;; ----------------------------
;;   End User-level functions
;; ----------------------------

(defun set-message-detail (&optional (one-of-min-discards-max 'discards))   ; make this a menu??
  "Set the level of message detail to one of MIN, DISCARDS, or MAX"
  (ecase one-of-min-discards-max
    (min (set-inform-modes '(error special result))
         (format t "U2%Minimal output.U%"))
    (discards (set-inform-modes '(error warning stage discard special summary result))
              (format t "U2%Summarize output, plus any discards.U%"))
    (careful (set-inform-modes '(error warning stage caution notification special summary result
))
             (format t "U2%All notifications plus summary.U%"))
    (max (set-inform-modes
          '(error warning stage caution notification discard special query summary terse progre
ss detailed result))
                        ; detailed, debug not here.
         (format t "U2%Maximal output.U%")))
  (values))


;;; ----------------------------------------
;;;   Interactive control of inform modes
;;; ----------------------------------------

(defun set-inform-modes (modes &key add remove stage)   ; add,remove,replace??

  ;; (set-inform-modes :all)                        ; See everything.
  ;; (set-inform-modes '(debug detailed) :remove t)  ; get rid of some stuff.
  ;; (set-inform-modes '(error special result) ; a good minimum.
  ;; (set-inform-modes nil)                         ; turn off all msg output.
  ;; (set-inform-modes 'result)                     ; only get the actual result.
  ;; (set-inform-modes 'query :remove t)            ; automatic operation...

  ;; The global *all-inform-modes* has the choices.
  ;; Giving a stage permits that stage to be separately controlled.
```

```
;; Must manually set the global *active-stage* when the stage is active.

(declare (special *all-inform-modes* *default-inform-modes* *stage-inform-modes* *active-infor
m-modes*))
(when (eq modes :all) (setq modes (copy-list *all-inform-modes*)))
(when (eq modes :default) (setq modes (copy-list *default-inform-modes*)))
(setq modes (if (listp modes) (copy-list modes) (list modes))) ; symbol-->list of symbol; NIL
is OK -- means QUIET!!
(let ((current-modes (copy-list (inform-modes stage))))
  (cond (add    (loop for mode in modes do (pushnew mode current-modes)))
        (remove (loop for mode in modes do (setq current-modes (delete mode current-modes))))
        (t      (setq current-modes modes)))
  (let ((assoc (assoc stage *stage-inform-modes*)))
    (if assoc
        (rplacd assoc current-modes)                                  ; if there, update it.
        (if stage
            (push (cons stage current-modes) *stage-inform-modes*)  ; if not there, and stage
is given, add.
            (setq *active-inform-modes* current-modes))))       ; else change global.
  current-modes))


(defun inform-modes (&optional stage)
  "Indicate which inform modes are active (active for that stage, if supplied)."

  (declare (special *stage-inform-modes* *active-inform-modes*))
  (if stage (or (cdr (assoc stage *stage-inform-modes*)) *active-inform-modes*)
      *active-inform-modes*))


;;; -----------------------
;;;    Programmer level
;;; -----------------------

(defun inform (mode object &rest args)   ; maybe permit mode to be a list??
  "If the indicated mode is active, format to the screen as if the rest were format args,
   but return the string, rather than NIL.
   If OBJECT is not a string, use PRINT, so that (inform 'debug (<random form>)) works."

  ;; Note that if the object is not a string, then it is PRINTed, facilitating the
  ;; use of (inform 'debug (random form)), since print returns the object printed.
  ;; Also note that if the common lisp variable *break-on-warnings* is true, the inform
  ;; mode WARNING will cause a common lisp BREAK.
  ;; Improvement: permit a break on any of error, warning, caution, notification, debug...

  ;; Improvement: enable a way for each msg to identify its inform mode as its being
  ;; printed, in order to make it easier to track what msg goes with which mode.

  (declare (special *active-stage*))
  (if (active-inform-mode mode *active-stage*)
      (prog1 (if (and (null args) (not (stringp object)))
                 (print object)
                 (let ((string (apply #'format nil object args)))
                   (format t string)
                   string))
             (when (and (eq mode 'warning) *break-on-warnings*)  ; maybe have list of modes for
BREAKing.
               (break)))
      object))

(defun ACTIVE-INFORM-MODE (mode &optional stage)
  "Predicate to find out if a mode is currently active."
  ;;  Example: (if (active-inform-mode 'query) (yes-or-no-p ...))
  (member mode (inform-modes stage) :test #'eq))



;;; -------------------------
;;;     Globals
;;; -------------------------
```

```
(defparameter *default-inform-modes* '(error warning stage discard special query summary result)
)

(defparameter *all-inform-modes*
        '(error warning stage caution notification discard special query summary terse progress
detailed debug result))
;; abbrev progress mode (dots...)?     frantic -- level up from debug?
;; interrogate, step up from query?    report -- level up from result?

(defparameter *active-inform-modes* '(error special result))    ; initial setting corresponds to
 MIN...

(defparameter *stage-inform-modes* nil)

(defparameter *all-stages* '(input pre-test translate post-test schedule output))

(defvar *active-stage* nil) ; the program stage that is currently active.  User must set this.
     ;; improvement: allow an (inform 'stage ..) to include a stage setting: (inform '(stage ou
tput) ...)


;;; ------------------------
;;;   Utilities
;;; ------------------------

(defun reset-inform-modes (&optional stage)
  (if stage (set-inform-modes :default :stage stage)
      (prog1 (set-inform-modes :default) (setq *stage-inform-modes* nil))))


(defun inform-nothing (object) object)
;; -*- Mode:Common-Lisp; Package:KEE; Fonts:(cptfont HL10B cptfont HL12B HL12BI); Base:10 -*-

;;  INIT.LISP

(defvar *all-actions*
        '(("FCS to EES Data Translator" 'do-pre-processing)
;;        ("FCS to EES Data Translator" 'do-pre-processing-all)        ;;  for LX machine    DHO
  12-13
          ("Initialize and Develop Schedule   (mandatory)" 'init-and-run)
          ("Utilize Inventory and Safety Stock" 'utilize-onhand-inventory)
          ("Shift Schedule   (mandatory)" 'shift-schedule-right)
;;;       ("Schedule Purchased Parts" 'schedule-purchased-parts)
          ("Schedule Preventive Maintenance" 'schedule-pm)
          ("Compact Schedule Left" 'reschedule-left)
          ("Replenish Safety Stock" 'replenish-safety-stock)
          ("Compact Schedule Left" 'reschedule-left-2)
          ("Schedule Component Orders" 'schedule-component-orders)
          ("Compact Schedule Left" 'reschedule-left-3)
          ("Write FCS Commit Files" 'write-commit-files)))

;;;  These functions simply execute reschedule left.  They are used to properly set up the above
 global variable.
(defun reschedule-left-2 () (reschedule-left))
(defun reschedule-left-3 () (reschedule-left))


(defun do-it-all-option ()
  "This is the menu used for DO-IT-ALL"
  '(("Perform all scheduling steps"
    (format t "~%Please select one of the sub-items regarding scheduling steps")
   "Perform User-specified scheduling steps."
   :SUBITEMS ("Perform all scheduling steps"
              'DO-IT-ALL
              "Perform User-specified scheduling steps")
             ("Review steps which will be performed"
              'STEPS-TO-PERFORM
              "Look at the steps to be performed by the scheduler")
             ("Update scheduling steps to perform"
              'SPECIFY-STEPS-TO-PERFORM
              "Specify the steps to perform automatically"))))
```

```
(defun do-it-all ()
  "Used to perform the steps specified by the global variable *steps-to-schedule*.
    Each item in the global variable is a function name"
  (cond ((not *steps-to-schedule*)
         (format t"~%Please specify which steps to schedule"))
        (t ;; else
         (loop for step in  *steps-to-schedule* do
               (let ((function (list (eval step))))
                 (eval function)))
         (format t "~%Done"))))

(defun specify-steps-to-perform ()
  "This option allows the user to specify which steps to perform when the user selects Perform a
ll scheduling steps.
    It puts all the selected steps on *steps-to-schedule*."
  (let ((steps-to-perform (choice *all-actions* "Please select the options run")))
    (unless (eql steps-to-perform :ABORTED)
      (setq *steps-to-schedule* nil)
;;    (when (and (member 'init-and-run    steps-to-perform)
                 (member 'shift-schedule-right   steps-to-perform))
        (loop for entry in (reverse *all-actions*) do
              (when (member (eval (second entry)) steps-to-perform)
                (push (second entry) *steps-to-schedule*)))))))

(defun steps-to-perform ()
  "This prints out which scheduling steps will be run when running the option Perform all schedu
ling steps"
  (cond ((not *steps-to-schedule*)
         (format t "~%No steps have been selected - Please choose the steps to perform"))
        (t ;; else
         (format t "~2%The following steps will be performed when doing all steps~%")
         (loop for entry in *all-actions* with i = 1 do
               (when (member (second entry)  *steps-to-schedule*)
                 (format t "~%~a.  ~a" i (first entry))
                 (incf i))))))

(defun check-action (next-action)  ;; this should be cleaned out of everywhere.
  next-action ; ignore
  nil)


;(defvar *last-action* nil)
;(defun next-action ()
;  "Determines the next action that should be taken by the user."
;  (if (not *last-action*)
;      (first *all-actions*)
;      (let* ((l (memq *last-action* *all-actions*)))
;       (second l))))
;
;(defun check-action (next-action)
;  "Used to assure that scheduling steps are performed in the proper order."
;  (when (not (eq next-action (next-action)))
;    nil)
;  (setq *last-action* (next-action)))


(defun run-remaining-phases? ()
  "check control unit to see if we continue to run remaining phases
   with no user interaction-"
  (cond ((equal (get.value *control-unit* 'run-all-phases) 'yes)
         (utilize-onhand-inventory)
         (shift-schedule-right)
         (schedule-purchased-parts)
         (schedule-pm)
         (replenish-safety-stock)
         (schedule-component-orders))
        (t)))


;;; ---------------------- THE REAL INITIALIZATION CODE ----------------------
```

```
(defun init-and-run ()
  "Used to initialize and develop the schedule."
   (let ((msg-output-window (get.value 'control-unit 'msg-output-window)))
     (expose msg-output-window)
     (clear-window-stream msg-output-window)
     (init-only)
     (format msg-output-window "~% Generating a Schedule for selected orders")
     (setq *time1* (time))
     (generate-schedule)
    (last-event-from-prev-sched)
    (check-backschedule-times)
    (setq *time2* (time))
    (report-execution-time msg-output-window)
    (feasibility-caller)
    (run-remaining-phases?)))


(defun init-only ()
  "Used to initialize the schedule.  Calls all the separate initialization functions."
   (mouse-to-hourglass)
  (check-action 'init-only)
  (classes-to-dedicate)
  (max-times-for-add2-batching)
   (determine-ranked-operations)
  (setf *control-unit* (unit 'CONTROL-UNIT))
  (when *do-dummy-fcs*
     (initialize-time-parameters))           ;; set bc time, ft1, eal and eoh for non-integrated
sites
  ;;;     (change-ptt))                      ;; if using the dummy data ask about heat-treat time --
- commented out for now but keep here
  (initialize-calendar)
  (when (not *do-dummy-fcs*)
    (restore-initial-slot-values))
   (check-for-feasible-input-times)     ;; checks times to use for build context, end of horizon,
 etc. for feasibility
  (setf valueclasscheck nil)
   (setf cardinalitycheck nil)
  (setf no.mark.modify nil))
  (initialize-setup-times)              ;; temporary function to set the setup times for operatio
ns
   (determine-parts-to-batch)
  (let ((msg-output-window (get.value *control-unit* 'msg-output-window)))
    (orders-selected?)          ;; check to see that at least one order was selected
    (recycle-gantt-units)                 ;; recycle the process and setup boxes that were allocat
ed during the prior scheduling run
    (return-trays-to-free-pool) ;;  recycle the trays from previous runs if any
    (initialize-machines-and-operations-slots)
    (update-machine-unit)
     (set-machine-parameters 'prod)
    (setq *time2* (time))
    (report-execution-time msg-output-window)
    (initialize-gantt-chart)
     (create-dummy-boxes-on-machines)
     (set-time-parameters)
     (generate-machine-unavailability)                                                   ;; block out t
he down times
     (check-order-due-date)                                                           ;; check for acce
ptable due dates
    (read-fcs-file)
;-   (decrement-orders-from-inventory) ;; WARNING: must call this, or call fns to restore initial
 slot values. MJJ 12/27/88
    ;;  customer and component
    (schedule-unassigned-parts)
    (dolist (order (get.values *control-unit* 'selected-orders))
      (allocate-final-trays-from-order order))
    (initialize-gantt-units)
    (determine-all-pm-jobs)
    (determine-bottleneck)
    (update-eligible-machine)
```

```
   (mouse-to-arrow)
   nil))

(defun again ()
  (check-action 'again)
  (let ((msg-output-window (get.value *control-unit* 'msg-output-window)))
    (expose msg-output-window)
    (clear-window-stream msg-output-window)
    (format msg-output-window "~%% Generating a Schedule for selected orders")
    (setq *time1* (time))
    (generate-schedule)
    (last-event-from-prev-sched)
    (check-backschedule-times)
    (setq *time2* (time))
    (report-execution-time msg-output-window)
    (feasibility-caller)
    (run-remaining-phases?)))

;;; ---------------------------------- MISCELLANEOUS INITIALIZATION FUNCTIONS -------------------
---

(defun check-for-feasible-input-times ()
  "This makes sure that:
     o  Build context time is before Frozen time 1.
     o  Frozen time 1 is before the Horizon end.
     o  The End of activity list is before the Horizon end.
     o  Order due dates are before the Horizon end."
  (let* ((bc-time (get.value *control-unit* 'build-context-time))
         (ft1-time (get.value *control-unit* 'frozen-time-1))
         (horizon-end (get.value *control-unit* 'horizon-end))
         (end-of-activity-list (get.value *control-unit* 'end-of-activity-list))
         (selected-orders (get.values *control-unit* 'selected-orders))
         due-date)
    (if (> bc-time ft1-time)
        (format t "~%% Build context time ~a is greater than frozen time 1 ~a " (utime-to-string
bc-time)
                (utime-to-string ft1-time)))
    (if (> ft1-time horizon-end)
        (format t "~%% Frozen time 1 ~a is greater than horizon end ~a " (utime-to-string ft1-tim
e)
                (utime-to-string horizon-end)))
    (if (> end-of-activity-list horizon-end)
        (format t "~%% End of activity list ~a is greater than horizon end ~a " (utime-to-string
end-of-activity-list)
                (utime-to-string horizon-end)))
    (loop for order in selected-orders do
          (setq due-date (fourth (first (get.value order 'order-table))))
          (if (> due-date horizon-end)
              (format t "~%% Order ~a has a due date ~a greater than the horizon end ~a.  Correct
 order data before generating a schedule " (unit.name order) (utime-to-string due-date) (utime-t
o-string horizon-end)))))

;;; ------------------------------------------------------------------------------------------
---------------------

(defun update-eligible-machine ()
  " This uses the preferred-machines slot to update the eligible-machines slot."
  (update-eligible-machine-1)
  (update-eligible-machine-2)
  nil)

(defun update-eligible-machine-1 ()
  " This determines the number of primary machines and builds the eligible-machines values.
     The number of primary machines is based on the time on the bottleneck."
  (let* ((bn-time (get.value *control-unit* 'bottleneck-cycle-time))
  (bn-tray-size (get.value *control-unit* 'bottleneck-min-tray-size)))
    (loop for oper in (unit.children 'operations 'member) do
          (loop for machines in (get.values oper 'preferred-machines) do
                (let* ((machine-class (first (unit.parents (car machines) 'member)))
                       (number-machines 0)
                       (number-preferred-machines (length machines))            ;;  6-1-89  DHO
 correct no. machines
                       (part-id (get.value oper 'part-id))
                       tray-size cycle-item cycle-time)
```

```
                (when (equal 'no (get.value machine-class 'infinite-capacity))
                  (setq tray-size (if part-id (get.value part-id 'maximum-tray-size) 0))
                  (setq cycle-item (match-tss (get.value oper 'cycle-time)))
                  (setq cycle-time (second cycle-item))
                  (setq number-machines (ceiling (/ (* tray-size cycle-time)
                                                      (* (max tray-size bn-tray-size) (/ part
inv bn-tray-size))))))
;;              (when (> number-machines (length machines))
;;                (format t "Not enough machines for oper ~a  Number=~a  ~a~%" (unit.name oper
) number-machines machines))
                (add.value oper 'eligible-machines
                           (cons number-preferred-machines machines))))))

(defun update-eligible-machine-2 ()
  " Now distribute the machines among the parts."
  ;;; ?Dave - how are they distributed?
  (loop for oper in (unit.children 'operations 'member) do
       (let* ((part-list nil))
         (loop for elig in (get.values oper 'eligible-machines) do
               (let* ((part-id (get.value oper 'part-id))
                      (primaries (first elig))
                      (part-entry (assoc part-id part-list)))
                 (cond ((not part-entry)
                        (setq part-list (list (list primaries))))
                       ((> primaries (second part-entry))
                        (setq part-list (substitute (list primaries) part-entry part-list)))
                       (t nil))))
         part-list)))


(defun match-tss (l &optional machine)
  " This returns the first entry in l that matches -- more specific match before general.
    The more specific entries must be earlier in l."
  ;;; ?Dave is this still used?     Update-eligible-machine-1 calls it.     DHO   1-25-89
  (let* ((result nil))
    (loop for item in l
          while (not result)
          do
          (let* ((m (first item)))
            (when (or (not machine)
                      (eq m machine)
                      (eq m nil))
              (setq result item))))
    result))


(defun determine-parts-to-batch ( )


 " Function to be fired when any part related data is updated.  It will determine whether to bat
ch part-operation."
  ;;; ?Dave - how?  Where does it leave its results?     Called from init-only every run   DHO
1-25-89
  (remove.all.values *control-unit* 'parts-to-batch)
;;   combinations to further minimize setups or not.  Done by machine class.
  (loop for machine-class in (unit.descendants 'machines 'subclass) do      ;;loop for machine
classes
        (loop for oper in (unit.children 'operations 'member) do
              (when (equal (get.value oper 'possible-machs-class) (unit.name machine-class))  ;;
 find operation machine class match
                (dolist (entry (get.value oper 'cycle-time))         ;; find max percent ratio of
 all setup to process times
                  (let* ((part-id (get.value oper 'part-id))
;;                       (machine (first entry))
                         (cycle-time (second entry))
                         (tray-size (if part-id (get.value part-id 'maximum-tray-size) 0))
                         (tray-process-time (* cycle-time tray-size))
                         (setup-time (fourth (get.value oper 'setup-times)))
                         setup-process-ratio)
                    (when (not (= 0 tray-process-time))                                ;;  ma
```

```
ke sure not to divide by zero
                        (setq setup-process-ratio (round (* 100 (/ setup-time trey-process-time))
)
                        (when (> setup-process-ratio (get.value machine-class 'setup-process-perce
nt-to-batch))
                          (add.value *control-unit* 'parts-to-batch
                                     (list part-id machine-class)))))))))

(defun determine-ranked-operations ()
  ;; "Dave - what does this do, and who uses its results?   Ranks operations from highest to lo
west (i.e op70, op60,
  ;;        ....., op10.  It's used then for safety stock usage and replenishment (order of usa
ge and repolenishment)  DHO  1-25-89
  (let* ((parts (unit.descendants 'parts 'member))
        (routings (loop for part in parts append
                        (loop for operation in (reverse (get.value part 'ROUTING))
                              for i from 1 by 1
                              collect (list operation i))))
        (sorted-routings (sort routings #'(lambda (a b) (< (second a) (second b)))))
        (results (remove-duplicates (loop for item in sorted-routings collect (first item)))))
    (put.value *control-unit* 'ranked-opers-for-safety-stock results)))


(defun create-master-record-file ()
  "This reads in the manuf-cells-activity-file and creates 2 new files - the FCS system bundles
them into 1 file, we split into 2."
  (let* ((path *data-dir*))
    (delete-file (format nil "UaUa" path "MANFACTV1.DAT"))  ; Delete the current version to keep
 file build-up down.
    (delete-file (format nil "UaUa" path "MANFACTV2.DAT"))  ; Delete the current version to keep
 file build-up down.
    (fs:expunge-directory *data-dir*)
    (with-open-file (stream (format nil "Uaua" path "MANFACTV.DAT") :direction :input)
      (with-open-file (ostream1 (format nil "UaUa" path "MANFACTV1.DAT") :direction :output)
        (with-open-file (ostream2 (format nil "UaUa" path "MANFACTV2.DAT") :direction :output)
          (let* (a)
            (setq a (read-line stream))
            (format ostream1 "U80manfactv1U%")
            (setq a (read-line stream nil nil)) ;; File 1 has 2 80 char records of data
            (format ostream1 "UaU%" a)
            (setq a (read-line stream nil nil))
            (format ostream1 "UaU%" a)
            (format ostream2 "U80manfactv2U%")
            (loop while (setq a (read-line stream nil nil)) do
                  (format ostream2 "UaU%" a))
            nil)))))

(defun determine-bottleneck ()
  "This function is used to determine the cell pool that is the bottleneck.  This is used
  down the line to produce an optimal schedule.
  The heuristics used are as follows:
     a.  Compute the total demand for each ordered part.  If the part is an assembly, the demar
d
          for each of the component parts must also be taken into consideration.
     b.  For each operation in each part routing, calculate the cell pool utilization.
           The cell pool is the class which a preferred machine for the operation belongs.
           Cell pool utilization = cell pool utilization +
                                   (process time for part operation * (total demand for part -
inventory).
            Note that inventory cascades down-  In other words, if there is inventory availabl
e at
            operation 2, an event will not be scheduled for operation 2 !!! OR !!! operation 1
.
     For each cell pool, calculate cell pool % utilization.
           Cell pool % utilization = cell pool utilization / cell pool availability-
           Cell pool availability is equal to the total time available (excluding downtime) acr
```

```
oss all
          non-infinite capacity machines in the pool.
      The bottle neck is the cell pool with the largest % utilization.
      Finally, fill the slots that have to do with the bottleneck."
 (let ((selected-orders (get.values *control-unit* 'selected-orders))
       (part-list nil)
       (quantity-to-schedule 0)
       (cell-pool-percent-utilization 0)
       bottleneck
       (cell-pool-class-list nil))                    ; The cell-pool-class-list is a list of
 cell pool classes.
   (loop for order in selected-orders do
         (loop for order-entry in (get.value order 'order-table) do
               (let* ((part (first order-entry))
                      (quantity (third order-entry))
                      (part-quantity-list (create-part-quantity-list part quantity)))  ; The pa
rt may be an assembly.
                 (loop for entry in part-quantity-list do
                       (setq part (first entry))
                       (setq quantity (second entry))
                       (cond ((not (member part part-list))
                              (setf part-list (cons part part-list))   ; put the part in the pa
rt list
                              (setf (get (car part-list) 'total-ordered-quantity) quantity))
                             (t (let ((part-in-list (find part part-list)))    ; else just upda
te the quantity.
                                  (setf (get part-in-list 'total-ordered-quantity)
                                        (+ (get part-in-list 'total-ordered-quantity) quantity)
)))))))))
   (loop for part in part-list do
         (setq quantity-to-schedule (get part 'total-ordered-quantity))
         (loop for op in (reverse (get.value part 'routing)) do          ; Loop through the rou
ting from the highest op first

               (decf quantity-to-schedule (part-op-inventory part op))
               (let* ((cell-pool (get.value op 'possible-machs-class))
                      (utilization-increment (* (/ (retrieve-process-times part op (preferred-m
achine op) nil t)
                                                   (get.value part 'maximum-tray-size))
                                                quantity-to-schedule)))
                 (cond ((not (member cell-pool cell-pool-class-list))
                        (setf cell-pool-class-list (cons cell-pool cell-pool-class-list))
                        (setf (get (car cell-pool-class-list) 'cell-pool-utilization)
                              utilization-increment))
                       (t (let ((cell-pool-in-list (find cell-pool cell-pool-class-list)))
                            ; If we have enough inventory, decrement the inv- temp and return (
no other suceeding
                             ; cell pools will have any utilization because inventory is being
 utilized.
                            (setf (get cell-pool-in-list 'cell-pool-utilization)
                                  (+ (get cell-pool-in-list 'cell-pool-utilization)
                                     utilization-increment))))))))
    (loop for cell in cell-pool-class-list do          ; Set up the availability of the cell
          (setf (get cell 'cell-pool-availability) (cell-pool-availability cell))
          (if (and (numberp (get cell 'cell-pool-availability))
                   (> (/ (get cell 'cell-pool-utilization)
                         (get cell 'cell-pool-availability))
                      cell-pool-percent-utilization))
              (progn (setq cell-pool-percent-utilization (/ (get cell 'cell-pool-utilization)
                                                            (get cell 'cell-pool-availability)))
                     (setq bottleneck cell))))
    (if (not bottleneck)                                ;; DHO    7-10-89    Fix when inven
tory > order qty and no bottleneck
        (setq bottleneck (car cell-pool-class-list))       ;; set it arbitrarily - it won't imp
act any calculations
        (format t "U3%!!! The bottleneck is:  Ua" bottleneck))
    (fill-bottleneck-slots bottleneck)))
```

```
(defun fill-bottleneck-slots (bottleneck)
  "For each factory part, remove the value in the BOTTLENECK-CYCLE-TIME slot.  Keep track of the

   maximum bottleneck cycle time and the minimum tray size of the part that goes throught the bo
ttleneck.
   Once all parts have been updated properly, update the slots on the control-unit."
  (let ((factory-parts (loop for part in (unit.descendants 'parts 'member) collect (unit.name pa
rt)))
        (max-bottleneck-cycle-time 0)
        (min-bottleneck-tray-size 99999)
        (operations-on-bottleneck (loop for operation in (unit.children 'operations 'member)
                                        when (eql bottleneck (get.value operation 'possible-mach
e-class))

                                        collect (unit.name operation))))
    (loop for part in factory-parts do
          (remove.all.values part 'last-bottleneck-operation)
          (let ((part-bottleneck-cycle-time (fill-last-bottleneck-operation part operations-on-b
ottleneck)))
            (if (> part-bottleneck-cycle-time max-bottleneck-cycle-time)
                (setq max-bottleneck-cycle-time part-bottleneck-cycle-time))
            (if (and (> part-bottleneck-cycle-time 0)                    ; The part goes through the bot
tleneck
                     (< (get.value part 'maximum-tray-size) min-bottleneck-tray-size))
                (setq  min-bottleneck-tray-size (get.value part 'maximum-tray-size)))))
    (put.value *control-unit* 'bottleneck bottleneck)
    (put.value *control-unit* 'bottleneck-cycle-time max-bottleneck-cycle-time)
    (put.value *control-unit* 'bottleneck-min-tray-size min-bottleneck-tray-size)))

(defun fill-last-bottleneck-operation (part operations-on-bottleneck)
  "Each part has a slot called LAST-BOTTLENECK-OPERATION.  If a part's
   routing has an operation that is run on the bottleneck, then the
   cycle time for that operation is placed in this slot.  If the
   part has multiple operations that are run on the bottleneck,
   the maximum cycle time is placed in this slot.  The maximum cycle
   time is returned.  If the value is 0, then the part did NOT go
   through the bottleneck."
  (let ((part-bottleneck-cycle-time 0)
        (last-bottleneck-operation nil))
    (loop for operation in (get.value part 'routing)
          when (member (unit.name operation) operations-on-bottleneck) do
          (setq last-bottleneck-operation operation)
          (setq part-bottleneck-cycle-time
                (max
                  part-bottleneck-cycle-time
                  (retrieve-process-times part operation (preferred-machine operation) nil t))))
    (if (> part-bottleneck-cycle-time 0)
        (put.value part 'last-bottleneck-operation last-bottleneck-operation))
    part-bottleneck-cycle-time))

(defun preferred-machine (op)
  "Returns the first machine for this part-op combination"
  (let (machine)
    (loop for entry in (get.values op 'preferred-machines) do
          (setq machine (first entry)))
    (if (not (eql machine nil))
        machine                                           ; Return the machine.
        (format t "U%No preferred machine for this part-op combination!!!"))))  ; Else return a
warning and NIL.

(defun cell-pool-availability (cell-pool)
  "The following function takes a cell pool as a passed parameter and:
     If the cell-pool contains a machine which is infinite capacity,
     returns the availability value B"infinityB".
     If not, all up time between build context and the end of
     activity list on all possible machines is summed up and returned."
```

```
(let* ((infinite-capacity 'no)
       (possible-machines (unit.children cell-pool 'member))
       (non-availability 0)
       (frozen-time-2 (get.value *control-unit* 'cutoff-for-ft2))
       (end-of-horizon-list (get.value *control-unit* 'horizon-end))
       (total-time (* (length possible-machines) (- end-of-horizon-list frozen-time-2))))
  (loop for machine in possible-machines do
        (setq frozen-time-2 (get.value machine 'frozen-time-2))
        (if (eql (get.value machine 'infinite-capacity) 'yes)
            (setq infinite-capacity 'yes)
            (loop for entry in (get.values machine 'non-pm-downtime) do
                  (let ((start-time (first entry))
                        (end-time (second entry)))
                    (cond ((and (<= start-time frozen-time-2)
                                (> end-time frozen-time-2))
                           (incf non-availability (- end-time frozen-time-2)))
                          ((and (> start-time frozen-time-2)
                                (< end-time end-of-horizon-list))
                           (incf non-availability (- end-time start-time)))
                          ((and (< start-time end-of-horizon-list)
                                (> end-time end-of-horizon-list))
                           (incf non-availability (- end-of-horizon-list start-time)))
                          (t ))))))
  (if (eql infinite-capacity 'yes)
      "infinity"
      (- total-time non-availability))))

(defun part-op-inventory (part op)
  "This function takes a part and operation and returns
   the number of parts (NOT trays) at that operation in inventory."
  (let ((inventory 0)
        (inventory-list (get.values op 'on-hand-wip)))
    (loop for entry in inventory-list do
          ;;  Mark - I commented out the line below.  Was it correct (i.e what if there were mul
tiple entries for a
          ;; given part (23ft 5 bc-time) (23ft 4 12-7-88) etc........).  Don't they need to be s
ummed up for all trays
          ;; and then multiplied?                          DAVE  12-5-88
;;        (setq inventory (first entry))     ;; Dave: I didn't write this fn; it looks like it p
re-dates dated on-hand-wip.
                                                  ;;        To find inventory, you should sum only over
 those parts available
                                                  ;;        as of the time you need them.  MJJ 12/27/88
          (setq inventory (+ inventory (first entry))))
    (* (get.value part 'maximum-tray-size) inventory)))

(defun create-part-quantity-list (part quantity)
  "This function is used to generate a parts listing for an SUB-ASSEMBLIES or ASSEMBLY parts.
   It creates a list in the form:
    ((part quantity) (component-part-1 component-quantity-1)
     (component-part-2 component-quantity-2) ... ).
   The first entry in the list is the part and the quantity passed.
   The generated list can then be used to see exactly what needs
   to be scheduled (i.e. the required component
   parts (and quantity), and the assembly itself."
  (let ((part-quantity-list (list (list part quantity)))
        (oper-required-parts (get.value (first (get.value part 'routing)) 'required-parts)))
    (loop for entry in (get.value (first (get.value part 'routing)) 'required-productive-parts)
until
          (cond ((eql (car entry) part)
                 (setq part-quantity-list (append (loop for comp-entry in (cdr oper-required-par
ts) collect
                                                         (list (car comp-entry) (* (second comp-e
ntry) quantity)))
                                                   part-quantity-list)))
                (t nil)))
    part-quantity-list))
```

```
;;; ---------------------- INITIALIZATION FOR MAX-BATCHING-ADD2 ----------------------
(defun max-times-for-add2-batching ()
  "Function to calculate the total possible time for an add2 (setups) for a part (operation).
   This is to insure we can always eventually schedule a part (even if it's an add2 for batched
parts)"
  ;;; ???Dave, what does this do?  Insures that we never get into infinite loops in trying to f
ind
  ;;;          alternatives for a box (i.e. if (* window-span process-time) not big enough for a
 case
  ;;;          where we do both an add left setup and add right setup we used to loop.  This fun
ction just
  ;;;        initializes the required time to avoid looping into the operations slot.  dho  1-25

89
  (let* ((total-setup-time 0)
         (process-time 0)
         machine)
    (loop for part in (unit.descendants 'parts 'member) do
          (loop for operation in (get.value part 'routing) do
                (loop for entry in (get.values operation 'preferred-machines)
                      do
                      (setq machine (first entry)))
                (setq process-time (retrieve-process-times part operation machine nil 'PART))
                (setq total-setup-time (* 2 (max-setup-time operation)))
                (put.value operation 'max-batching-add2 (+ process-time total-setup-time))))))

(defun max-setup-time (operation)
  "This function returns maximum setup time for the operation"
  (let* ((time-table (get.values operation 'setup-times))
         (max-setup-time 0))
    (if time-table
        (loop for entry in time-table do
              (if (> (fourth entry) max-setup-time)
                  (setq max-setup-time (fourth entry))))
        (setq max-setup-time (get.value (get.value operation 'possible-machs-class) 'default-set
up-time)))
    max-setup-time))

(defun classes-to-dedicate ()
  " Determine which machine classes to apply machine dedication to"
  ;;; ???Dave, which are they??? what does this do?   Just a check to see if less than all machi
nes
  ;;;            in a class are preferred.  If so, its likely that there is some sort of machi
ne dedication.   DHO  1-25-89
  (let* (machine-class updated-mach-classes)
    (remove.all.values 'control-unit 'machine-classes-for-dedication)
    (loop for oper in (unit.children 'operations 'member) do
          (setq machine-class (unit (get.value oper 'possible-machs-class)) )
          (when (< (length (get.value oper 'preferred-machines))
                   (length (unit.children machine-class 'member)))
            (when (not (member machine-class updated-mach-classes))
              (setq updated-mach-classes (append updated-mach-classes (list machine-class))))))
    (put.value 'control-unit 'machine-classes-for-dedication updated-mach-classes)))


(defun initialize-machines-and-operations-slots ()
  (loop for machine in  (UNIT.DESCENDANTS 'MACHINES 'MEMBER) do  ;; run-time-constant
        (when *do-dummy-fcs*
          (remove.all.values machine 'STARTUP-OPERATION-STATUS)
          (remove.all.values machine 'STARTUP-ACTIVITY-STATUS)
          (remove.all.values machine 'SCHEDULED-PM-FREQUENCY))
        (remove.all.values machine 'SCHEDULED-PM)
        (remove.all.values machine 'DELETED-EVENT-FROM-FT2)
        (remove.all.values machine 'FROZEN-TIME-2))
  (loop for operation in (unit.children 'operations 'member) do
        (when *do-dummy-fcs*
          (remove.all.values operation 'ON-HAND-WIP)
          (remove.all.values operation 'SAFETY-STOCK))
        (remove.all.values operation 'SAFETY-STOCK-USED)
        (when (eq 0 (second (first (get.value operation 'cycle-time))))    ;; check for cycle ti
```

```
res of zero
          (let* (new-cycle-time)
          (setq new-cycle-time (list (list (first (first (get.value operation 'cycle-time))) 1)))
          (remove.all.values operation 'cycle-time)
          (format t "~% Operation ~a has a cycle time of 0.  It is being set to 1 second." (unit
.name operation))
          (add.value operation 'cycle-time new-cycle-time))))

;;; -*- mode:Common-Lisp; Package:KEE; Base:10; Fonts:(cptfont HL10B cptfont HL12B HL12BI) -*-


;; This file contains all function related to orders.  An order may be any combination of part t
ypes, qtys, and due dates.
;; Once created an order may be updated.
;; A new order similar to an existing order may be created by updating the old order and changin
g its nam.
;; One or more orders may be selected to create a schedule fulfilling the order(s).


(defun create-order ()
  " High level function to create orders."
  (create-order-name)
  (create-part-type-list)                    ;; set the current part type list
  (REMOVE.ALL.VALUES 'FACTORY-ORDERS 'CURRENT-ORDER-TABLE)
  (order-menu nil))                       ;; create and accept input from the order menu

(defun update-order ()
  " High level function to update orders."
  (let ((order-name (choose-one-order 'factory-orders)) )
    (cond (order-name                     ;; if an order was selected then update it
            (PUT.VALUE 'FACTORY-ORDERS 'ORDER-NAME ORDER-NAME)
            (PUT.VALUES 'FACTORY-ORDERS
                           'CURRENT-ORDER-TABLE
                           (COPY-TREE (GET.VALUES ORDER-NAME 'ORDER-TABLE)))
            (create-part-type-list)
            (order-menu t)))))

(defun delete-order ()
  " High level function to delete orders-"
  (let ((order-name (choose-one-order 'factory-orders)) )      ;; simply select an order then sen
d it a delete msg.
    (if order-name
        (cond ((mouseconfirm (format nil "~%Do you want to delete order ~a" order-name) "Mouse l
eft to confirm")
                 (cond ((member order-name (get.values *control-unit* 'selected-orders))
                          (remove.value *control-unit* 'selected-orders order-name)))
                 (DELETE.UNIT ORDER-NAME) )) )))

(defun select-order ()
   " High level function to select orders."
  (let* ((orders (choose-multiple-orders 'factory-orders)))
    ;; if orders have been selected then save and display them
    (cond ((listp orders)
            (REMOVE.ALL.VALUES *CONTROL-UNIT* 'SELECTED-ORDERS)
            (output-selected-orders orders)))))

(defun save-order ()
  "This function saves the ORDERS KB quietly.  This is used
   so the user can permanently save created orders."
  (save.kb 'ORDERS 'QUIET)
  (tic1:beep)
  (format t "~2% Orders sucessfully saved.~%"))

(defun choose-one-order (parent)
  "Pop up a menu for the user to choose one order."
  (let* ((orders-parent parent)
         item-list
         order-name)
```

```
   ;; set item list to the orders that may be selected
   (setq item-list (loop for item in  (append (UNIT.DESCENDANTS ORDERS-PARENT 'MEMBER)
                                               (UNIT.DESCENDANTS 'NET-ORDER-DEMAND-ORDERS 'MEMBE
R))
                        collect (unit.name item)))
   (if item-list                                ;; if there are orders to choose from then dis
play the menu
       (setq order-name (tic1:send (tv:make-window 'tv:momentary-menu
                                                    :label "Select an Order"
                                                    :item-list item-list)
                                   :choose)))
   order-name))

(defun choose-multiple-orders (parent)
  "Pop up a menu for the user to choose one or more orders."
  (let* ((orders-parent parent)
         item-list order-name-list)
   ;; set item list to the orders that may be selected
;;                  Updated to select the correct set of orders (component or customer)        6
-15-89      DHO
    (setq item-list (if (not (eq parent 'COMPONENT-ORDERS))
                        (loop for item in (append (UNIT.CHILDREN ORDERS-PARENT 'MEMBER)
                                                   (UNIT.CHILDREN 'NET-ORDER-DEMAND-ORDERS 'MEMBE
R))
                              collect (unit.name item) )
                        (loop for item in (UNIT.CHILDREN ORDERS-PARENT 'MEMBER)
                              collect (unit.name item))))
    ;; if there are orders to choose from then display the menu
    (if item-list
        (setq order-name-list (choice item-list "Select Mutiple Orders  Scroll down if selecting
 all") ))
    order-name-list))

(defun order-menu (update-flag)
  "Display and control the processing of the order menu."
  (let* (end-menu-flag new-table due-date)          ;; end-menu-flag is used to control process af
ter the menu is exited via the throw function
                                                  ;; set global variables needed in the menu  (T
hese could have been declared
                                                  ;; special in the function binding and thus be
en lexically scoped.)
    (setq *order-name* (get.value 'factory-orders 'order-name))
    (setq *default-due-date* (get.value *control-unit* 'horizon-end))
    (setq *default-due-date-string* (utime-to-string *default-due-date*))
    (setq *chosen-table* (get.value 'factory-orders 'current-order-table))
    (loop for entry in *chosen-table* do
          (setq due-date (subseq (utime-to-string (fourth entry)) 0 16))
          (setq new-table (append new-table (list (list (first entry) (second entry) (third ent
ry) due-date)))))
    (setq *chosen-table* new-table)
    (setq end-menu-flag
          ;; set end-menu-flag to whatever the throw and catch returns, its ugly but it works!
          (catch 'end-menu
            ;; create and display the order menu
            (tv:choose-variable-values
              '((*order-name* "Order Name"
                             :documentation "The name of this order"
                             :any)
                (*default-due-date-string* "Default Due Date/Time"
                                   :documentation "Date used in Selection Menu"
                                   :edit)
                "-----------------------------------------------------------------------"
                (*chosen-table*
                  (0  "       Tray Type"
                      :documentation "List of all part types-"
                      :menu (reverse (get.value 'factory-orders 'current-part-list)))
                  (1  "       Operation"
                      :documentation "List of all operation-"
                      :any)
```

```
                (2 " Quantity"
                    :documentation "Left click to change the number of parts to be ordered- Z
ero = no parts ordered-"
                    :number)
                (3 "   Due Date/Time"
                    :documentation "Left click to change the time this part order is due-"
                    :edit)))
            :width 50
            :Label '(:font fonts:hl12bi
                            :string "Develop a Saginaw Vanguard FOF Order")
            :margin-choices '("Done"
                                ("Abort" (throw 'end-menu 'abort))
                                ("Display" (display-tray-order))
                                ("Select" (progn
                                            (PUT.VALUE 'FACTORY-ORDERS 'DEFAULT-DUE-DATE *DE
FAULT-DUE-DATE*)
                                            (part-selection-menu)
                                            ;; this will allow for automatically updating th
e Order Menu with the Selection Menu
                                            (throw 'end-menu 'select))))))
    (cond ((not (equal end-menu-flag 'abort))
           (cond (update-flag
                  (setq new-table nil)
                  (loop for entry in *chosen-table* do
                        (setq due-date (string-to-utime (fourth entry)))
                        (setq new-table (append new-table (list (list (first entry) (second entr
y) (third entry) due-date))))
                        (put.value *order-name* 'order-table new-table))
                  (setq *chosen-table* new-table)
                  (put.value *order-name* 'order-table *chosen-table*)
                  (put.value 'factory-orders 'current-order-table *chosen-table*)))
           ;; save the order name, default-due-date, and order table
           (PUT.VALUE 'FACTORY-ORDERS 'ORDER-NAME *ORDER-NAME*)
           (PUT.VALUE 'FACTORY-ORDERS 'DEFAULT-DUE-DATE *DEFAULT-DUE-DATE*)
           (process-order-menu)
           (cond ((equal end-menu-flag 'select)
                  (order-menu t)))))))

(defun create-table (current-list tray-types)
  "Parts are selected from the list of part types created
   by this function.
   Build the list as it first is to appear in a
   selection menu --- check on assembly-part or not
   --- set list accordingly."
  (cond (trey-types
         (if (equal (get.value (car tray-types) 'assembly-part) 'n)
             (setq current-list (append (create-table current-list (cdr tray-types))
                                        (list (list (car tray-types)
                                                    (unit.name (first (last (get.value (car tray
-types) 'routing))))

                                                    nil nil))))


             (setq current-list (append (create-table current-list (cdr tray-types))
                                        (list (list (car tray-types)
                                                    (unit.name (first (last (get.value (car tray
-types) 'routing))))
                                                    '0 (subseq *default-due-date-string* 0 16)))
))))
  current-list)

(defun part-selection-menu ()
  " Display and control the processing of the selection menu."
  (let* ((part-types (get.value 'factory-orders 'current-part-list))
         aborted? )                         ;; aborted? is a flag used to control processing
 after exiting the menu
    (setq *selection-table* (create-table nil part-types))
    (setq aborted?                          ;; set aborted? to whatever the throw and catch
```

```
returns
        (catch 'end-this-menu
          (tv:choose-variable-values                    ;; create and display the order menu
            '((*selection-table*
                (0 "   Tray Type"
                    :documentation "List of all part types."
                    :menu (get.value 'factory-orders 'current-part-list))
                (1 "             Operation"            ;;  moved over 7 spaces for 19 char op name
 DHO  12-19-88
                    :documentation "List of operation."
                    :any)
                (2 " Quantity"
                    :documentation "Left click to change the number of parts to be ordered. Z
ero = no parts ordered."
                    :number)
                (3 "   Due Date/Time"
                    :documentation "Left click to change the due date of this part type."
                    :edit)))
            :label '(:font fonts:hl12bi
                        :string "For Each Part Type Select Quantity, Due Date/Time")
            :margin-choices '("Done"
                        ("Abort" (throw 'end-this-menu t)))
            :near-mode (list ':window tv:selected-window) )) )
    (cond ((not aborted?)                                   ;; if not aborted then process the n
ew selections
        (process-part-selection-menu *selection-table*)))))

(defun process-part-selection-menu (selections)
  " Process the Selections Menu placing all new
    selections in the Order menu."
  (let* ((part (first (first selections)))
         (operation (unit.name (car (last (get.value part 'routing)))))
         (qty (third (first selections)))
         (due-date (string-to-utime (fourth (first selections))))
         (current-list (get.value 'factory-orders 'current-order-table)))
    ;;  if the current list is the default nil list then remove the (nil nil nil) entry
    (if (equal current-list '((nil nil nil nil)))
        (setq current-list nil))
    (cond ((< 0 qty)                                          ;; update the current part list
           (PUT.VALUE '(FACTORY-ORDERS orders)  'CURRENT-ORDER-TABLE
                      (APPEND CURRENT-LIST (LIST (LIST PART OPERATION QTY DUE-DATE))))
           (setq *chosen-table* (append *chosen-table* (list (car selections))))))
    (if (cdr selections)
        (process-part-selection-menu (cdr selections))) ))

(defun process-part-selection-menu (selections)
  " Process the Selections Menu placing all new
    selections in the Order menu."
  (let* ((part (first (first selections)))
         (operation (unit.name (car (last (get.value part 'routing)))))     ; (second (first sel
ections))) LWK 11/21/88
         (qty (third (first selections)))
         (due-date (string-to-utime (fourth (first selections))))
         (current-list (get.value 'factory-orders 'current-order-table)))
    ;; if the current list is the default nil list then remove the (nil nil nil) entry
    (if (equal current-list '((nil nil nil nil)))
        (setq current-list nil))
    (cond ((< 0 qty)                                          ;; update the current part list
           (PUT.VALUE '(FACTORY-ORDERS orders)  'CURRENT-ORDER-TABLE
                      (APPEND CURRENT-LIST (LIST (LIST PART OPERATION QTY DUE-DATE))))
           (setq *chosen-table* (append *chosen-table* (list (car selections))))))
    (if (cdr selections)
        (process-part-selection-menu (cdr selections))) ))
```

```
(defun process-order-menu ()
  "When 'DONE' is selected from the Order Menu,
   process the order."
  (let ((order-unit (get.value 'factory-orders 'order-name)) )
    (create-order-unit order-unit)
    ;; process the order-table into a piece order (qtys of pieces not qty of trays)
    (process-order-table order-unit (get.value 'factory-orders 'current-order-table))
    ;; take the piece order and make a tray order
    (create-tray-order-from-piece-order order-unit)))

(defun create-order-unit (order-unit)
  "Create the actual unit, with the name from
   the Order Menu, that contains the order."
  (let ((selected-order? (if (unit.exists.p order-unit)
                             (member (unit.name order-unit) (get.values *control-unit* 'selected
-orders))))
        parent-unit)
    (setq parent-unit 'factory-orders)
    ;; if updating an existing order then delete the old unit and create a new unit of the same
name
    (cond ((unit.exists.p order-unit)
           ;; if selected then remove the reference from the selected orders slot
           (if selected-order?  (REMOVE.VALUE *CONTROL-UNIT* 'SELECTED-ORDERS (UNIT.NAME ORDER
-UNIT))  )
           (DELETE.UNIT ORDER-UNIT) )
          (t                                                  ;; else if creating a new order incre
ment the number of orders counter
           (PUT.VALUE 'FACTORY-ORDERS
                      'NUMBER-OF-CREATED-ORDERS
                      (1+ (GET.VALUE 'FACTORY-ORDERS 'NUMBER-OF-CREATED-ORDERS)))    ) )
    (create.unit order-unit 'orders nil parent-unit "Contains the number of parts and each tray
used in this order.")
    ;; if selected then add it back to the slot
    (cond (selected-order?
           (ADD.VALUE *CONTROL-UNIT* 'SELECTED-ORDERS (UNIT.NAME ORDER-UNIT))))
    (PUT.VALUE ORDER-UNIT 'ORDER-TABLE                        ;; save the order table for later ref
erence
               (GET.VALUE 'FACTORY-ORDERS 'CURRENT-ORDER-TABLE))))

(defun process-order-table (order-unit order-table)
  "Process the order table from the Order Menu
  to build a piece order.
  The order table is in the form
  '((part qty due-date) (part qty due-date)...)'"
 (let*  (part-order (first order-table))
        (qty (third part-order)) )
   (cond ((and (not (null qty))
               (< 0 qty))                                     ;; for the current part qty and due
date, save this entry in the order unit
          (explode-part-and-save-the-components order-unit part-order) ))
   (if (cdr order-table)
       (process-order-table order-unit (cdr order-table)))))   ;; process the next part order

(defun explode-part-and-save-the-components (order-unit part-order)
  "Order each component for the given part."
  (let* ((required-parts-list nil)
         (ordered-assembly (car part-order))
         (match nil))
    (loop for oper in (get.value ordered-assembly 'routing) do
          (setq required-parts-list (get.values oper 'required-productive-parts))
          (cond (required-parts-list
                 (loop for item in required-parts-list
                       until (or (null item) match) do
                       (cond ((equal (unit ordered-assembly) (caar item))
                              (setq required-parts-list item)
                              (setq match t)))))))
    (if required-parts-list                                   ;; recursively order the components of this part
        (create-component-order order-unit part-order (car required-parts-list)))))
```

```
(defun create-component-order (order-unit part-order required-parts-list)
  "Create the appropriate number of components
   for this order.
   This is creating a piece order for the component."
  (let* ((qty (third part-order))
         (due-date (fourth part-order))
         (component (caar required-parts-list))
         (component-qty (cadar required-parts-list))
         (number-of-this-component-needed (* qty component-qty))
         (current-list (get.value order-unit (unit.name component)))
         (current-entry (assq due-date current-list))
         (current-qty (cdr current-entry)) )
    (ADD.VALUE ORDER-UNIT 'TRAYS-USED (unit.name COMPONENT))
    ;; if there is already a qty for this due date then add the new qty to the exiting qty
    (if current-entry (setq number-of-this-component-needed (+ number-of-this-component-needed c
urrent-qty)))
    (setq current-list (list (cons due-date number-of-this-component-needed )))
    (put.value order-unit (unit.name component) current-list)
    (if (cdr required-parts-list)
        (create-component-order order-unit part-order (cdr required-parts-list))) ))

(defun create-tray-order-from-piece-order (order-unit)
  "Loop thru all tray types used and calculate from
   the piece qty the number of trays to be ordered.
   Trays used lists all trays types needed
   to complete the order."
  (loop with all-trays-used = (get.values order-unit 'trays-used)
         for tray-type in all-trays-used
         with list-with-piece-qty
         with list-with-tray-qty
         do
         (setq list-with-piece-qty (get.value order-unit tray-type))
         (setq list-with-tray-qty (copy-list list-with-piece-qty))
         (calculate-trays-needed order-unit tray-type list-with-tray-qty list-with-piece-qty) )
)

(defun calculate-trays-needed (order-unit tray-type list-with-tray-qty list-with-piece-qty)
  "For the tray type convert the piece qty to a tray qty."
  (let* ((order-pair (car list-with-piece-qty))
         (due-date (car order-pair))
         (piece-qty (cdr order-pair))
         (pieces-per-tray (GET.VALUE TRAY-TYPE 'MAXIMUM-TRAY-SIZE))
         (tray-qty (ceiling (/ PIECE-QTY PIECES-PER-TRAY))) )
    (setq list-with-tray-qty (list (cons Due-date tray-qty)))
    (if (cdr list-with-piece-qty)
        (calculate-trays-needed order-unit tray-type list-with-tray-qty (cdr list-with-piece-qty
))
        (PUT.VALUE ORDER-UNIT TRAY-TYPE LIST-WITH-TRAY-QTY))))

(defun display-tray-order ()
  "Decomposes the Parts Order into trays and then
   displays the tray order.
   The default unit is ORDER-0000"
  (create-default-tray-unit)
  ;; process the order-table into a piece order (qtys of pieces not qty of trays)
  (process-order-table 'order-0000 (get.value 'factory-orders 'current-order-table))
  ;; take the piece order and make a tray order
  (create-tray-order-from-piece-order 'order-0000)
  (display-tray-order-on-screen))

(defun create-default-tray-unit ()
  "Either creates or initializes the unit 'order-0000
   If the unit exists then delete it."
  (cond ((unit.exists.p 'order-0000)
           (loop for slot in (unit.slots 'order-0000 'own)
                 do
                 (delete.slot 'order-0000 (slot.name slot) nil 'own)))
          (t (create.unit 'order-0000 'orders nil nil
                     "This is temporarily used for displaying tray orders and is not really a
n order."))))
```

```
(defun display-tray-order-on-screen ()
  "Actually display the tray order onto the screen."
  (let* ((tray-list (get.values 'order-0000 'trays-used))
         (sorted-tray-list (sort tray-list #'(lambda (x y) (string-lessp x y)))))
    ;; reset global variables needed for the menu
    (setq *parts-list* nil)
    (setq *qty-list* nil)
    ;; format the data for the menu
    (loop for part-type-ref in sorted-tray-list
          with part-type
          with part-qty
          do
          ;; set the left column
          (setq part-type (unit.name part-type-ref))
          ;; set the right column by summing the entire qty trays needed for this part type
          (setq part-qty (determine-part-qty 0 (get.value 'order-0000 part-type)))
          ;; format the information so that the menu can use it
          (setq *parts-list* (append *parts-list* (list (list part-type ':no-select 'ignored-pa
ram))))
          (setq *qty-list* (append *qty-list* (list (list (read-from-string (format nil "~r" pa
rt-qty))
                                                            ':no-select 'ignored-param)))))
    ;; display the trays using a temporary menu
;;    (tv:multicolumn-menu-choose
    (w:multiple-menu-choose
      '(("Part on Tray" *parts-list* :font fonts:hl12i)
        ("Quantity" *qty-list* :font fonts:hl12i))
      '(:font fonts:hl12bi :string "Trays required to fulfill this order:")
      (list ':window tv:selected-window))))

(defun determine-part-qty (qty qty-list)
  "Sum the tray qty's for a given part type."
  (setq qty (+ qty (cdar qty-list)))
  (if (cdr qty-list)
      (determine-part-qty qty (cdr qty-list))
      qty))

(defun create-part-type-list ()
  "Create and save the type of parts that can
   be selected for an order."
  (PUT.VALUE 'FACTORY-ORDERS 'CURRENT-PART-LIST
             (SORT (MAPCAR 'UNIT.NAME (UNIT.DESCENDANTS 'PARTS 'MEMBER))
                   (FUNCTION (LAMBDA (X Y)
                                     (STRING-GREATERP X Y))))))

(defun create-order-name ()
  "Generate a unique order name and save it on factory-orders.
   This is used when creating a new order."
  (let ((order-number (1+ (GET.VALUE 'FACTORY-ORDERS 'NUMBER-OF-CREATED-ORDERS))  ))
    ;; generate and save the default name, if it works is it really ugly?
    (PUT.VALUE 'FACTORY-ORDERS 'ORDER-NAME
               (READ-FROM-STRING (CONCAT "order-"
                                         (STRING-RIGHT-TRIM "." (FORMAT NIL "~0,4,1,0@" ORDER-NU
MBER)))))))

(defun orders-selected? ()
  "Edit check the orders selected--
   Set any-orders? to the number of order
   to select from."
  (let* ((msg-output-window (get.value *control-unit* 'msg-output-window))
         (any-orders? (if (or (UNIT.DESCENDANTS 'FACTORY-ORDERS 'MEMBER)
                              (UNIT.DESCENDANTS 'net-order-demand-orders 'MEMBER))
                          1 0)))
    ;; if the number of orders to select from is zero then display warning message
    (cond ((equal any-orders? 0)
           (expose msg-output-window)
           (format msg-output-window
```

```
                "Ü%** WARNING ** - Run was ABORTED since no orders. You must create and sel
ect at least one new order to make a run.")
             (ticl:send global:current-process :kill))
            ;; if no orders are selected then
            ((not (get.values *control-unit* 'selected-orders))
             (expose msg-output-window)
             (format msg-output-window "Ü%You must select at least one order before continuing."
)
             (get-orders)))))

(defun get-orders ()
  "In adaptive force the user to select orders
   for the simulation."
  (REMOVE.ALL.VALUES *CONTROL-UNIT* 'SELECTED-ORDERS)
  ;; call the select order function from orderfns
  (select-order)
  ;; call get-orders until the user finally chooses an orders
  (if (not (get.values *control-unit* 'selected-orders))
      (get-orders)))

(defun output-selected-orders (orders)
  "Remove selected orders from the CONTROL-UNIT
   SELECTED-ORDERS slot and then add each
   selected order to it."
  (REMOVE.ALL.VALUES *CONTROL-UNIT* 'SELECTED-ORDERS)
  (loop for order in orders  do
        (ADD.VALUE *CONTROL-UNIT* 'SELECTED-ORDERS (unit.name ORDER))))

(defun select-all-orders ()
  "What can I say? Select all orders which are
   descendants of factory orders."
  (put.values *control-unit* 'selected-orders
              (loop for order in (unit.descendants 'factory-orders 'member)
                    collect (unit.name order))))

(defun check-order-due-date ()
  "Function to check for orders with unrealistic
   due dates -- per Ken more than a month out
   of date = no good    DHO  10-3-88"
  (let* (due-date order-parent)
    (loop for order in (get.values *control-unit* 'selected-orders) do
          (setq order-parent (unit.name (car (unit.parents order 'MEMBER))))
          (cond ((eq order-parent 'NET-ORDER-DEMAND-ORDERS)
                 (setq due-date (get.value order 'date/time-due))
                 (valid-due-date due-date order order-parent))
                (t (loop for entry in (get.value order 'order-table)do
                         (setq due-date (utime-to-string (fourth entry)))
                         (valid-due-date due-date order order-parent)))))))

(defun valid-due-date (due-date order order-parent)
  " Verify good data for order due date."
  (let* ((bc-time (get.value *control-unit* 'build-context-time))
         (one-year (* 365 24 3600))
         (two-months (* 60 24 3600))
         (early-allowable-due-date (- bc-time two-months))
         (latest-allowable-due-date (+ bc-time one-year))
         (due-date-time (string-to-utime due-date)))
    (cond ((or (< due-date-time early-allowable-due-date)
               (> due-date-time latest-allowable-due-date))
           (if (equal order-parent 'NET-ORDER-DEMAND-ORDERS)
               (replace.parent order 'NET-ORDER-DEMAND-ORDERS 'REJECTED-ORDERS 'member))
           (format t "Ü% The order Üa is due at Üa.  This order will not be scheduled since it f
alls outside of the allowable range of two months before build context time or one year after bu
ild context time. " order due-date)
           (remove.value *control-unit* 'selected-orders order)))))
```

```
;;; -*- Mode:Common-Lisp; Package:KEE; Base:10; Fonts:(cptfont HL10B cptfont HL12B HL12BI) -*-

;;; The following set of functions has very similar functionality to that of
;;; ORDERFNS.LISP.

(defun create-top-level-component-order ()
  " High level function to create orders."
  (create-component-order-name)
  (create-part-type-list)                              ;; set the current part type list (this funtion
 is in orderfns)-
  (REMOVE.ALL.VALUES 'component-ORDERS 'CURRENT-ORDER-TABLE)
  (component-order-menu nil))

(defun update-component-order ()
 " High level function to update component orders."
  (let ((component-order-name (choose-one-component-order 'component-orders)) )
    (cond (component-order-name                                           ;; if an order was select
ed then update it
              (PUT.VALUE 'component-ORDERS 'ORDER-NAME component-ORDER-NAME)
              (PUT.VALUES 'component-ORDERS
                          'CURRENT-ORDER-TABLE
                          (COPY-TREE (GET.VALUES component-ORDER-NAME 'ORDER-TABLE)))
              (create-part-type-list)
              (component-order-menu t))) ))

(defun delete-component-order ()
  " High level function to delete orders."
  (let ((component-order-name (choose-one-component-order 'component-orders)) )   ;; simply sele
ct an order then send it a delete msg
    (if component-order-name
        (cond ((mouseconfirm (format nil "U%Do you want to delete order Ua" component-order-name
) "Mouse left to confirm")
               (cond ((member component-order-name (get.values *control-unit* 'selected-orders
))
                      (remove.value *control-unit* 'selected-orders component-order-name)))
               (DELETE.UNIT component-ORDER-NAME) )) )))

(defun select-component-orders ()
   "High level function to select orders.
   An order can only be selected once."
  (let* ((component-orders (choose-multiple-orders 'component-orders)))
    (cond ((not (eq component-orders :aborted))
           (loop for order in component-orders do
               (apply-component-selections (get.value order 'order-table)))))))

(defun any-component-orders-selected? ()
  "High level function to check if any component orders have been selected"
  (let* (orders)                                        ;;   New function added   6-27-89   DHO
    (loop for operation in (unit.children 'OPERATIONS 'member) do
       (when (get.value operation 'component-parts-ordered)
          (setq orders T)))
    (when (not orders)
      (select-component-orders))))

(defun choose-one-component-order (parent)
  "Pop up a menu for the user to choose one order."
  (let* (item-list
        order-name)
    ;; set item list to the orders that may be selected
    (setq item-list (loop for item in (UNIT.DESCENDANTS PARENT 'MEMBER)

                        collect (unit.name item)))
    (if item-list                                       ;; if there are orders to choose from then dis
play the menu
        (setq order-name (ticl:send (tv:make-window 'tv:momentary-menu
                                                    :label "Select an Order"
                                                    :item-list item-list)
                                    :choose)))
    order-name))
```

```
(defun apply-component-selections (selections)
  "Validate that the operation selected is legitimate for the part ordered"
  (let* ((item (first selections))
         (part (first item))
         (operation (second item))
         (quantity (third item))
         (due-date (fourth item))
         (order (get.value 'component-orders 'order-name)))
    (cond ((< 0 quantity)
           (if (member (unit operation) (get.value part 'routing))
               (add.value (unit operation) 'component-parts-ordered (list part quantity due-da
te order) 'own nil :append t)
               (format t
                 "~%% For part ~a the ~a operation is not valid in the routing" (unit.name par
t) (unit.name operation)))))
    (if (cdr selections)
        (apply-component-selections (cdr selections))) ))

(defun component-order-menu (update-flag)
  "Generate a menu for the user to place a component order"
  (let* (end-menu-flag due-date
         new-component-table)
    (setq *default-due-date*        (get.value *control-unit* 'horizon-end))
    (setq *default-due-date-string* (convert-date-to-string *default-due-date*))
    (setq *component-order-name*    (get.value 'component-orders 'order-name))
    (setq *chosen-component-table*  (get.value 'component-orders 'current-order-table))
    (loop for entry in *chosen-component-table* do
          (setq due-date (convert-date-to-string (fourth entry)))
          (setq new-component-table (append new-component-table
                                     (list (list (first entry) (second entry) (third ent
ry) due-date)))))
    (setq *chosen-component-table* new-component-table)
    (setq end-menu-flag
          (catch 'end-menu
            (tv:choose-variable-values
              '((*component-order-name* "Order Name"
                                        :documentation "The name of this order"
                                        :any)
                (*default-due-date-string* "Default Due Date/Time"
                                           :documentation "Date used in Selection Menu"
                                           :edit)
                "-----------------------------------------------------------------------"
                (*chosen-component-table*
                  (0 "    Part Type"
                     :documentation "List of all part types-"
                     :menu (get.value '(orders orders) 'current-components-list))

                  (1 "     Operation"
                     :documentation "Left click to input the opn for the part"
                     :side-effect check-operation
                     :menu 'create-operation-list))
                  (2 " Quantity"
                     :documentation "Left click to change the number of parts to be ordered- Ze
ro = no parts ordered-"
                     :number)
                  (3 "Due Date/Time"
                     :documentation "Left click to change the time this part order is due-"
                     :edit)))
              :width 50
              :Label '(:font fonts:hl12bi
                       :string "Develop a Saginaw Vanguard FOF Order")
              :margin-choices '("Done"
                                ("Abort" (throw 'end-menu 'abort))
                                ("Select" (progn
                                            (PUT.VALUE 'component-ORDERS 'DEFAULT-DUE-DATE *DEF
AULT-DUE-DATE*)

                                            (component-part-selection-menu)
                                            (throw 'end-menu 'select)))))))
```

```
    (cond ((not (equal end-menu-flag 'abort))
          (cond (update-flag
                (setq new-component-table nil)
                (loop for entry in *chosen-component-table* do
                      (setq due-date (string-to-utime (fourth entry)))
                      (setq new-component-table
                            (append new-component-table
                                    (list (list (first entry) (second entry) (third entry) du
e-date))))
                      (put.value *component-order-name* 'order-table new-component-table))
                (setq *chosen-component-table* new-component-table)
                (put.value *component-order-name* 'order-table *chosen-component-table*)
                (put.value 'component-orders 'current-order-table *chosen-component-table*)))
          (PUT.VALUE 'component-ORDERS 'ORDER-NAME *component-ORDER-NAME*)
          (PUT.VALUE 'component-ORDERS 'DEFAULT-DUE-DATE *DEFAULT-DUE-DATE*)
          (process-component-order-menu)
          (cond ((equal end-menu-flag 'select)
                (component-order-menu t))))))

(defun component-table (current-list tray-types)
  "Component Parts are selected from the list of part types created here"
  (when  tray-types
    (setq current-list (append (component-table current-list (cdr tray-types))
                               (list (list (car tray-types) 'operation '0 *default-due-date-stri
ng*)))))
  current-list)

(defun component-part-selection-menu ()
  " Display and control the processing of the selection menu"
  (let* ((part-types (get.value 'factory-orders 'current-part-list))
         aborted? )                                      ;; aborted? is a flag used to control proce
ssing after exiting the menu
    (setq *selection-table* (component-table nil part-types))
    (setq aborted?
          ;; set aborted? to whatever the throw and catch returns
          (catch 'end-this-menu
            ;; create and display the order menu
            (w:choose-variable-values
              '((*selection-table*
                (0  "   Tray Type"
                    :documentation "List of all part types-"
                    :menu (get.value 'factory-orders 'current-part-list))
                (1 "            Operation"             ;;  moved over 7 spaces for 19 char op na
e DHO  12-19-88
                   :documentation "Left click to input the opn for the part"
                   :side-effect check-operation
                   :menu (create-operation-list))
                (2 " Quantity"
                    :documentation "Left click to change the number of parts to be ordered- Z
ero = no parts ordered-"
                    :number)
                (3 "   Due Date/Time"
                    :documentation "Left click to change the due date of this part type-"
                    :edit)))
              :label '(:font fonts:hl12bi
                       :string "For Each Part Type Select Quantity Operation, Due Date/Tim
e")
              :margin-choices '("Done"
                               ("Abort" (throw 'end-this-menu t)))
              :near-mode (list ':window tv:selected-window))))
    (deactivate *warning-window*)
    (if (not aborted?)                                   ;; if not aborted then process the new
selections
      (process-component-selections-menu *selection-table*))))
```

```
(defun process-component-selections-menu (selections)
  "Process the Selections Menu placing all new
   selections in the Order menu"
  (let* ((part (first (first selections)))
         (operation (second (first selections)))
         (qty (third (first selections)))
         (due-date (string-to-utime (fourth (first selections))))
         (current-list (get.value 'component-orders 'current-order-table)))
    ;; if the current list is the default nil list then remove the (nil nil nil) entry
    (if (equal current-list '((nil nil nil nil)))
        (setq current-list nil))
    (cond ((< 0 qty)                                                        ;; update the curr
ent part list
           (PUT.VALUE 'component-orders 'CURRENT-ORDER-TABLE
                      (APPEND CURRENT-LIST (LIST (LIST PART OPERATION QTY DUE-DATE))))
           (setq *chosen-component-table* (append *chosen-component-table* (list (car selectio
ns))))))
    (if (cdr selections)
        (process-component-selections-menu (cdr selections))) ))

(defun process-component-order-menu ()
  "Create the actual unit, with the name from
   the Order Menu, that contains the order"
  (let ((parent-unit 'component-orders)
        (order-unit (get.value 'component-orders 'order-name)))
    ;; if updating an existing component order, delete the old unit and create a new unit of the
 same name
    (cond ((unit.exists.p order-unit)
           (DELETE.UNIT ORDER-UNIT) )
          (t                                ;; else if creating a new order increment the number of
 orders counter
           (PUT.VALUE 'COMPONENT-ORDERS
                      'NUMBER-OF-CREATED-ORDERS
                      (1+ (GET.VALUE 'component-ORDERS 'NUMBER-OF-CREATED-ORDERS)))    ) )
    (create.unit order-unit 'orders nil parent-unit "Contains the number of parts and each tray
used in this order-")
    (PUT.VALUE ORDER-UNIT 'ORDER-TABLE                               ;; save the order table for l
ater reference
               (GET.VALUE 'component-ORDERS 'CURRENT-ORDER-TABLE))))

(defun create-component-list ()
  " Create a list of schedulable component parts"
  (PUT.VALUE 'FACTORY-ORDERS 'current-components-list
             (SORT (MAPCAR 'UNIT.NAME (unit.descendants 'component-parts 'MEMBER))
                   (FUNCTION (LAMBDA (X Y) (STRING-GREATERP X Y))))))

(defun create-component-order-name ()
  "Generate a unique order name and save it on
   factory-orders- This is used when creating a new order"
  (let ((order-number (1+ (GET.VALUE 'component-ORDERS 'NUMBER-OF-CREATED-ORDERS))   ))
    ;; generate and save the default name, if it works is it really ugly?
    (PUT.VALUE 'component-ORDERS 'ORDER-NAME
               (READ-FROM-STRING (CONCAT "order-"
                                         (STRING-RIGHT-TRIM "-" (FORMAT NIL "U0,4,1,0U" ORDE
R-NUMBER))))))

(defun process-component-selection-menu (selections)
  (let* ((item (first selections))
         (part (first item))
         (operation (second item))
         (quantity (third item))
         (due-date (string-to-utime (fourth item)))
         (order *component-order-name*))
    (cond ((< 0 quantity)
           (if (member (unit operation) (get.value part 'routing))
               (add.value (unit operation) 'component-parts-ordered (list part quantity due-da
te order) 'own nil :append t)
               (format t "U% For part Ua the Ua operation is not valid in the routing"
                       (unit.name part) (unit.name operation)))))
```

```
    (if (cdr selections)
        (process-component-selection-menu (cdr selections))) ))

(defun create-operation-list ()
  "Create a list of all possible operations."
  (loop for operation in (unit.children 'operations 'member)
        collect (unit.name operation)))

(defun check-operation (ignore &optional ignore ignore ignore ignore)
  "This function is used as a side effect for when an invalid
   operation is chosen for a given part- This is not pretty, but
   it does keep a potential bug out of the system-"
  (loop for row in *selection-table* do
        (cond ((and (> (third row) 0) (not (valid-operation-for-this (first row) (second row))))
               (ticl:beep)
               (expose *warning-window*)
               (format *warning-window* " ~a is not a valid operation for ~a~%" (second row) (fi
rst row))))))

(defun valid-operation-for-this (part operation)
  "Check to see if the operation specified is valid
   for the part (see if the operation is in the routing)-
   If it is, return T, else NIL-"
  (let* ((valid-operations (get.value part 'routing))
         (valid-operation-name))
    (loop for x in valid-operations do
          (setq valid-operation-name (unit.name x))
          (cond ((eq valid-operation-name operation)
                 (return T))))))

;; -*- Mode:Common-Lisp; Package:KEE; Fonts:(cptfont HL10B cptfont HL12B HL12BI); Base:10 -*-
#○○
```

The following set of functions is used to drive the User Tuning Parameter upadate and explain functionality. Most of the following functions are called directly from a menu and are at a high level. No other functions from other files are called.

The functionality for reviewing and updating the tuning parameters is as follows:

- The tuning parameters are shown on the left hand side of the main image panel.
- An "explanation window" is in the middle of the image panel.
- All machines that are modeled by ESS are shown on the right hand side of the image panel.

When the user left clicks on a tuning paramter value, he has the choice of updating it or getting an explanation of what the parameter is and how it effects the system. If he updates the parameter, an horizontal bar graph actuator is created and the user can modify the value by left clicking at the appropriate value. If he choosed to receive an explanation of the parameter, a display of the slot's comment facet is given in the explanation window.

Notice how the default values are no longer displayed, as is indicated by the message in the upper right hand corner. If the user left clicks on this box, the parameters shown will revert back to the original default values before changes were made.

When the user left.clicks on one of the machines, the current value of that machine's tuning parameters are shown in the explanation window. Left clicking also selects the machine. To deselect the machine, left.click on the machine again.

In the very top right hand corner of the image panel, a box called Update Selected Machines is displayed. Left.clicking on this box, will update the selected machines with the values specified by the tuning parameters on the left hand side of the window. As each machine is updated, it becomes deselected, as is shown.

Two important notes - if the default values are presently displayed, the values for the sel ected machines will be inherited from the MACHINES class. Thus, if the defaults are changed at a later date, those machines that were selected will inherit the new value. The second thing is that if the machine DEFAULT, which is at the top of the machines list, is selected when left.clicking on Update Selected Machines, a warning is given to the user that he is about to change the default values. If he answers Y (Yes) to go ahead, the default values will change to those shown by the value meters on the left hand side of the image panel.

At the time of this writing, the default Tuning Parameter Values are as follows:

```
ORIGINAL VALUES OF ESS TUNING PARAMETERS        11/14/88

1. Gap for batching :                           1 second
2. Fraction full for inventoy:                  0.75
3. Window span:                                 7
4. Window span for batching:                    4
5. Max window increments for dedication:        2
6. Percentage of fit:                           60
7. setup process percent to batch:              80
8. Acceptable prox. of operation to completion: 10
9. Percent required for overlap:                50


Lee Klaus  11/14/88
db#

(defun user-parameter-menu ()
  '("Tuning Parameters"
    nil
    "Explain/Update or Save ESS Tuning Parmaeters"
    (SUBITEMS ("Explain/Update Tuning Parameters"
               'display-tuning-parameters
               "Explain and/or update all ESS tuning parameters")
              ("Close Tuning Parameter Window"
               'close-tuning-parameter-window
               "Close the window used to explain and/or update all ESS tuning parameters")
              ("Save Current Tuning Parameter Settings"
               'save-axle-kb
               "Permanently save current tuning parameter settings")
              ("Modify FT2 Cutoff Times"
               'update-ft2
               "Modify FT2 Cutoff Times")
              ("Modify Cutoff Time for Activities for FCS."
               'update-end-activities
               "Modify Cutoff Time for Activities for FCS.")
              ("Modify Time Gap for Adding Setups in Compact Left Phase."      ;;  time gap for
add2 setups in compact left  DHO  4-12-89
               'update-gap-for-batched-in-compact-left                         ;; maybe temp fix
 -- let Saginaw decide
               "Modify Time Gap for Adding Setups in Compact Left Phase."))))

(defun display-tuning-parameters ()
  (unitmsg (get.value *control-unit* 'tuning-parameter-panel) 'open-panel!))

(defun close-tuning-parameter-window ()
  (unitmsg (get.value *control-unit* 'tuning-parameter-panel) 'close-panel!))

(defun save-axle-kb ()
  "This function saves the AXLE KB quietly    Lee Klaus  11/15/88."
  (close-tuning-parameter-window)
  (save.kb 'AXLE 'QUIET)
  (ticl:beep)
  (format t "~2% Sucessfully saved-~2%"))
```

```
(defun parameter-menu (keepicture viewport mousestate x y)
  "This function sets up a simple menu of the items when getting the slot menu-
   Once an option is selected, the appropriate function is executed-"
  (ignore viewport mousestate x y)
  (let ((command (menu (GET-SLOT-MENU 'MENUITEMS-FOR-USER-PARAMETERS 'CONTROL-UNIT))))
      (when command
        (if (functionp command)
            (funcall command keepicture)
            (format t "U% Option UA not yet implemented" command)))))

(defun display-parameter-information (keepicture)

  "This function simply prints out the comment facet of the slot
   this image is attached to"
  (let* ((attached-slot (get.value keepicture 'attached-objects))
         (comment (car (slot.facet.values attached-slot 'comment))))
    (put.value 'box.string.3 'strings comment)))

(defun restore-defaults-to-screen (keepicture viewport mousestate x y)
  "This function is called when the user wished to restore the defaults
   to the slot values shown on the screen (He does this by left-clickig
   on the KEE picture in the upper left hand corner).  It does this by
   removing all the slot values from machines so that the default values
   will be used (There is a default value specified by the Default
   Values facet).  Once this is done, the picture name is set back to
   Default Values Displayed."
  (ignore keepicture viewport mousestate x y)
  (remove.all.values 'machines 'acceptable-proximity-of-operation-to-completion)
  (remove.all.values 'machines 'percentage-of-fit)
  (remove.all.values 'machines 'percentage-required-for-overlap)
  (remove.all.values 'machines 'max-window-increments-for-dedication)
  (remove.all.values 'machines 'setup-process-percent-to-batch)
  (remove.all.values 'machines 'window-span)
  (remove.all.values 'machines 'window-span-for-batching)
  (put.value 'box.string.1 'strings "Default Values Displayed")
  (if *current-parameter*
        (progn
          (delete.unit (get.facet.value (slot.unit *current-parameter*) (slot.name *current-para
meter*) 'activeimages3))
          (setq  *current-parameter* nil))))

(defun display-machine-parameters (self slot newvalues oldvalues unit slottype &optional world)
  "When the user left-clicks on a machine, an AVPUT routine is fired.  This function is what
   is in that AVPUT.  Notice how it simply prints out what the values of the machine parameters
   are currently set at and then returns newvalues."
  (ignore self slot unit slottype world)
  (let ((machine (car newvalues)))
    (if (eql machine 'DEFAULT)
        (setq machine 'MACHINES))
    (if (and machine
             (not (member machine oldvalues)))
        (put.value 'box.string.3 'strings
                   (concat
                     (format nil "Machine: Ua   ACCEPTABLE-PROXIMITY-OF-OPERATION-TO-COMPLETION:
 Ua"
                             machine (get.value machine 'acceptable-proximity-of-operation-to-co
mpletion))
```

```
(format nil "  PERCENTAGE-OF-FIT: ~a" (get.value machine 'percentage-of-fit
))
(format nil "  PERCENTAGE-REQUIRED-FOR-OVERLAP: ~a"
       (get.value machine 'percentage-required-for-overlap))
(format nil "  MAXIMUM-WINDOW-INCREMENTS-FOR-DEDICATION: ~a"
       (get.value machine 'max-window-increments-for-dedication))
(format nil "  SETUP-PROCESS-PERCENT-TO-BATCH: ~a"
       (get.value machine 'setup-process-percent-to-batch))
(format nil "  WINDOW-SPAN: ~a" (get.value machine 'window-span))
(format nil "  WINDOW-SPAN-FOR-BATCHING: ~a"
       (get.value machine 'window-span-for-batching)))))
 newvalues)


(defun update-parameter (keepicture)

  "1. Let the user know that, since he now has the option of
      modifying the parameters, the Default values are no longer
      displayed.
   2. Delete the active image from the *current-parameter* slot
      if *current-parameter* is non nil.
   3. Create a level actuator on the attached slot.
   4. Set the *current-parameter* equal to the attached slot REF."
  (let* ((attached-slot (get.value keepicture 'attached-objects)))
    (put.value 'box.string.1 'strings "Default Values NOT Displayed")
    (if *current-parameter*
        (progn
          (delete.unit (get.facet.value (slot.unit *current-parameter*) (slot.name *current-para
meter*) 'activeimages3))))
    (unitmsg 'horizontal-bar-graph-actuators 'create-image!
             (list attached-slot)
             NIL
             'viewport-control.unit.2
             `((unit-name . actuator)
               (region .,(make-reg 210 8 587 75))
               (borders . 2)
               (title .,(concat (string (slot.name attached-slot)) "   Left click at the appropr
iate value."))))
    (setq *current-parameter* attached-slot)))


(defun update-machine-parms (keepicture viewport mstate x y)
  "1.  Figure out what the parameters are currently set to.
   2.  If the values are NOT the default values, place the new value of
       each parameter in each selected machine's appropriate slot.
   3.  If the values ARE the default values, REMOVE the values of each
       selected machine's tuning parameter slots.  This way, the defult
       value can inherit down correctly.
   4.  Deselect the machines as they are updated.
   5.  Remove the horizontal bar graph actuator and set
       *current-parameter* back to NIL (since no parameters are
       currently selected to be modified)."
  (ignore keepicture viewport mstate x y)
  (let* ((m 'machines)
         (acceptable-proximity-of-operation-to-completion (get.value m 'acceptable-proximity-of-
operation-to-completion))
         (percentage-of-fit                              (get.value m 'percentage-of-fit))
         (percentage-required-for-overlap                (get.value m 'percentage-required-for-
overlap))
         (maximum-window-increments-for-dedication       (get.value m 'max-window-increments-fo
r-dedication))
         (setup-process-percent-to-batch                 (get.value m 'setup-process-percent-to
-batch))
         (window-span                                    (get.value m 'window-span))
         (window-span-for-batching                       (get.value m 'window-span-for-batching
))
```

```
(loop for machine in (get.values *control-unit* 'factory-machines) do
     (if (and (eql machine 'DEFAULT)
              (setq machine 'MACHINES)
              (y-or-n-p "Are you SURE you want to CHANGE the DEFAULT machine parameters???
"))
         (progn
           (put.facet.value machine 'acceptable-proximity-of-operation-to-completion 'DEFAU
LT
                     acceptable-proximity-of-operation-to-completion)
           (put.facet.value machine 'percentage-of-fit 'DEFAULT
                     percentage-of-fit)
           (put.facet.value machine 'percentage-required-for-overlap 'DEFAULT
                     percentage-required-for-overlap)
           (put.facet.value machine 'max-window-increments-for-dedication 'DEFAULT
                     maximum-window-increments-for-dedication)
           (put.facet.value machine 'setup-process-percent-to-batch 'DEFAULT
                     setup-process-percent-to-batch)
           (put.facet.value machine 'window-span 'DEFAULT
                     window-span)
           (put.facet.value machine 'window-span-for-batching 'DEFAULT
                     window-span-for-batching)))
     (if (equal (get.value 'box.string.1 'strings) '("Default Values Displayed"))
         (progn
           (remove.all.values machine 'ACCEPTABLE-PROXIMITY-OF-OPERATION-TO-COMPLETION)
           (remove.all.values machine 'PERCENTAGE-OF-FIT)
           (remove.all.values machine 'PERCENTAGE-REQUIRED-FOR-OVERLAP)
           (remove.all.values machine 'MAX-WINDOW-INCREMENTS-FOR-DEDICATION)
           (remove.all.values machine 'SETUP-PROCESS-PERCENT-TO-BATCH)
           (remove.all.values machine 'WINDOW-SPAN)
           (remove.all.values machine 'WINDOW-SPAN-FOR-BATCHING))
         (progn
           (put.value machine 'ACCEPTABLE-PROXIMITY-OF-OPERATION-TO-COMPLETION
                     acceptable-proximity-of-operation-to-completion)
           (put.value machine 'PERCENTAGE-OF-FIT
                     percentage-of-fit)
           (put.value machine 'PERCENTAGE-REQUIRED-FOR-OVERLAP
                     percentage-required-for-overlap)
           (put.value machine 'MAX-WINDOW-INCREMENTS-FOR-DEDICATION
                     maximum-window-increments-for-dedication)
           (put.value machine 'SETUP-PROCESS-PERCENT-TO-BATCH
                     setup-process-percent-to-batch)
           (put.value machine 'WINDOW-SPAN
                     window-span)
           (put.value machine 'WINDOW-SPAN-FOR-BATCHING
                     window-span-for-batching)))
     (remove.value *control-unit* 'factory-machines (if (eql machine 'MACHINES) 'DEFAULT ma
chine))
     (if *current-parameter*
         (progn
           (delete.unit (get.facet.value (slot.unit *current-parameter*)
                                         (slot.name *current-parameter*) 'activeimages3))
           (setq *current-parameter* nil)))))

(defun update-factory-machines ()
  "This function is used to the FACTORY MACHINES slot of the control unit.
   This will only be called when machines are added or deleted."
  (remove.all.values *control-unit* 'factory-machines)
  (delete.facet *control-unit* 'factory-machines 'valueclass)
  (create.facet *control-unit* 'factory-machines 'valueclass
                (append '(one.of) '(default)
                        (sort (loop for machine in (unit.descendants 'machines 'MEMBER) collect

                                (unit.name machine)) #'string-lessp))))
```

```
;;; -*- Mode:Common-Lisp; Package:KEE; Fonts:(cptfont HL10B cptfont HL12B HL12BI); Syntax:ZETALI
SP; Base:10 -*-


;;;----------- ---------------------- SCHEDULE-PM ---------------------------------
;;; Schedule PM jobs within their defined window of time.
;;;
;;; 1.  Get the each pm entry from each machine.  The entry has the allowable window and the dur
ation.
;;; 1B. Sort all the entries by window-start.
;;; 2.  Get all the pockets in the window using pockets-in-range.
;;; 3.  Start from the left pocket, try to fit entirely within a pocket ("100% fit").
;;; 4.  If cant fit 100%, add up the cumulative time available within the window.
;;; 5.  If cum-time < duration, find first non-zero pocket without an S to the left. (first-pock
et)
;;; 6.  If cant, then use the largest-pocket.
;;; 7.  If no pockets, force in right end. (last-pocket)
;;; 8.  If no pockets, and null last-pocket, then print msg and force PM in late anyway.
;;;
;;; a.  Note that first- and largest- and last-pocket must have enough time before U or D box to
 do PM.
;;; b.  In any case, we do not want to schedule a PM between an S box and its P box to the right
.
;;;
;;; The function check-pm makes sure we are successful.
;;; ------------------------------------------------------------------------------

(defun schedule-pm ()
  (check-action 'schedule-pm)
  " Function to schedule preventive maintenance events on machines.
    We loop thru all the machines, and all the PM events on each machine, and call schedule-pm-
entry."
  (let* ((msg-output-window (get.value *control-unit* 'msg-output-window))
         (entries nil))
    (format msg-output-window "~%Scheduling Preventive Maintenance")
    (setq *time1* (time))
    (loop for machine in  (unit.descendants 'machines 'member) do
          (let* ((allowable-pm-start (get.value machine 'FROZEN-TIME-2)))
            (loop for pm-entry in (get.values machine 'SCHEDULED-PM) do
                  (let* ((duration (fourth pm-entry)))
                    (cond ((> duration 86400) ;; PM takes longer than a day -- error
                           (format T "Machine ~a has too long duration ~a  ~a  pm-entry ~a~%"
                                   (unit.name machine) duration (seconds-to-string duration) pm-
entry))
                          (t (push (list machine pm-entry allowable-pm-start) entries)))))
            ;;(remove.value machine 'SCHEDULED-PM pm-entry)
            ))
    (setq entries (sort entries #'(lambda (a b)(< (second (second a))(second (second b))))))
    (loop for item in entries do
          (schedule-pm-entry (first item) (second item)(third item)))

    (setq *time2* (time))
    (report-execution-time msg-output-window)))


(defun get-pm-box (pm-job machine window-start window-end)
  "This just puts the slot values into a new PM box."
  (let* ((box (boxes-get-empty-box 'boxes)))
    (kk.put.value (box boxes) 'BOX-TYPE 'PM)
    (kk.put.value (box boxes) 'OPERATION pm-job)
    (kk.put.value (box boxes) 'STRINGS (list "PM"))
    (kk.put.value (box boxes) 'MACHINE machine)
    (kk.put.value (box boxes) 'IMMOVABLE (list window-start window-end))
    (box-highlight! box 1 'GRAY)
    box))
```

```
(defun schedule-pm-entry (machine pm-entry allowable-pm-start)
  "Schedule 1 pm entry on 1 machine.  This loops thru all the pockets and calls pm-examine-pocke
ts to find a good one (100% fit).
     If an ok-pocket is found, we finish it.  Otherwise, we call schedule-pm-partial to squeeze
it in."
  (let* ((cum-free-time 0)
         (largest-pocket-duration 0)
         (largest-pocket nil)
         (first-pocket nil)
         (last-pocket nil)
         (pm-job (first pm-entry))
         (window-start (second pm-entry))
         (window-end (third pm-entry))
         (duration (fourth pm-entry))
         (box (get-pm-box pm-job machine window-start window-end))   ;; get new PM box
         eligible-pockets start-time end-time ok-pocket)

    (setq window-start (max allowable-pm-start window-start))
    (setq eligible-pockets (pockets-in-range machine window-start window-end))
    (cond ((and eligible-pockets
                (progn (loop for pocket in eligible-pockets    ;; Examine all the pockets.
                             while (not ok-pocket)
                             do
                             (multiple-value-setq
                               (ok-pocket start-time end-time cum-free-time largest-pocket large
st-pocket-duration
                                first-pocket last-pocket)
                               (pm-examine-pockets pocket duration cum-free-time largest-pocket
largest-pocket-duration
                                                     first-pocket last-pocket window-start window-
end)))
                       ok-pocket))
           (kk.put.value (box boxes) 'START-TIME start-time)
           (kk.put.value (box boxes) 'END-TIME end-time)
           (insert-box box (third ok-pocket)))

          (t
           (schedule-pm-partial box duration first-pocket last-pocket cum-free-time largest-pock
et
                               window-start window-end)))
    ;; A final test for the PM being within the required window, just to catch errors immediatel
y.
    (when (not (and (<= window-start (kk.get.value (box boxes) 'START-TIME))
                    (>= window-end   (kk.get.value (box boxes) 'END-TIME))))
      (format T "PM: Box ~a not within bounds ~a to ~a  start ~a end ~a~%" (unit.name box) windo
w-start window-end
              (kk.get.value (box boxes) 'START-TIME)(kk.get.value (box boxes) 'END-TIME)))))


(defun pm-examine-pockets (pocket duration cum-free-time largest-pocket largest-pocket-duration
                          first-pocket last-pocket window-start window-end)
  "This runs through the pockets and looks for the first pocket that can fit a PM box.
  In case that no pocket fits 100%, it also calculates: cum-free-time, largest-pocket, first-p
ocket, etc"
  (let* ((pocket-duration 0)
         (left-box (third pocket))
         ;;(right-box (fourth pocket))
         (ok-pocket nil)
         (maybe-pocket (enough-time-to-immovable-and-not-between-S-and-P left-box (first pocket)
 (second pocket) duration))
         start-time end-time)
    ;;(setq foo pocket)

    (when (and (not first-pocket)        ;; Find the first pocket that is not just after an S box

               left-box
               maybe-pocket)
      (setq first-pocket pocket))
```

```
  ;; Find the last-pocket -- the pocket that we can fit the PM box into if we slide the right-
box right.
   (when maybe-pocket
     (setq last-pocket pocket))

   (setq pocket-duration (- (second pocket) (first pocket)))
   (setq cum-free-time (+ cum-free-time pocket-duration))   ;; Calculate the cum-free-time.
   (when (and (> pocket-duration largest-pocket-duration)  ;; Find the largest pocket.
              maybe-pocket)
     (setq largest-pocket pocket)
     (setq largest-pocket-duration pocket-duration))
   (setq start-time (max window-start (first pocket)))
   (setq end-time (min window-end (second pocket)))

   (when (and (<= (+ start-time duration) end-time)
              maybe-pocket)
     (setq end-time (+ start-time duration))  ;; Shorten the end-time to the actual duration.
     (setq ok-pocket pocket))
   (values ok-pocket start-time end-time cum-free-time largest-pocket largest-pocket-duration f
irst-pocket last-pocket)))


(defun enough-time-to-immovable-and-not-between-S-and-P (left-box pocket-start pocket-end durati
on)
  "Returns T if there is enough time after pocket-start to fit duration before the next immovabl
e box."
  (let* ((machine (kk.get.value (left-box boxes) 'MACHINE))
         (next-immovable-box (next-immovable-box left-box machine))
         (next-movable-box (next-movable-box left-box machine)))
    (and
      (<= duration
          (- (min pocket-end (kk.get.value (next-immovable-box boxes) 'START-TIME))
             pocket-start))
      (or (not next-movable-box)
          (not (eq 'P (kk.get.value (next-movable-box boxes) 'BOX-TYPE)))
          (not (eq 'S (kk.get.value (left-box boxes) 'BOX-TYPE)))))))


(defun schedule-pm-partial (box duration first-pocket last-pocket cum-free-time largest-pocket
                            window-start window-end)
  "The PM box did not fit, so we try to force fit it."
  ;;; 5.  If cum-time < duration, find first non-zero pocket without an S to the left. (first-po
c
ket)
  ;;; 6.  If cant, then use the largest-pocket.
  ;;; 7.  If no pockets, force in right end. (last-pocket)
  ;;; 8.  If no pockets, and null last-pocket, then print msg.
  (let* ((pocket nil))

    (when (> cum-free-time duration)  ;; If we have enough time, put it at the far left -- maybe
 nobody will have to slide right.
      (cond (first-pocket
             (setq pocket first-pocket))
            (largest-pocket
             (setq pocket largest-pocket))))

    (when (and (not pocket) last-pocket)
      (setq pocket last-pocket))

    (when (not pocket)
      (format t "~%% no room at to schedule PM box ~a window start ~awindow end ~a "
             (unit.name box) (utime-to-string window-start) (utime-to-string window-end))
      (setq pocket (force-pm box duration window-start window-end)))
```

```
    (cond ((not pocket)
           (format T "U%schedule-pm-partial: Horrible bug -- force-pm cannot make a pocketU%"))
          (t
           (let* ((start-time (first pocket))   ;;; xxx or left-box's END-TIME???
                  (left-box (third pocket))
                  (right-box (fourth pocket)))
             (kk.put.value (box boxes) 'START-TIME start-time)
             (kk.put.value (box boxes) 'END-TIME (+ start-time duration))

             (cond ((and left-box right-box) (insert-box box left-box right-box))
                   (t (format T "Schedule-pm-partial: Horrible error - no boxes in pocket")))
             (when (< (kk.get.value (right-box boxes) 'START-TIME)
                      (kk.get.value (box boxes) 'END-TIME))
               (format T "PM: Adjusting right: UaU%" (unit.name box)))
             (adjust-right right-box (kk.get.value (box boxes) 'END-TIME) nil))))))


(defun force-pm (pm-box duration window-start window-end)
  "Force the PM box in any time after window-start.  Return a pocket.  This must work because th
e upper limit is infinity."
  window-end ; ignore.
  (let* ((machine (kk.get.value (pm-box boxes) 'MACHINE))
         (done nil)
         (left-box (get.value machine 'FIRST-BOX-ON-MACHINE)))

    ;; Find the first box that we can fit a PM in after.
    (loop while (not done)
          do
          (if (and (>= (kk.get.value (left-box boxes) 'END-TIME) window-start)
                   enough-time-to-immovable-and-not-between-S-and-P left-box *minus-infinity* *
plus-infinity* duration))
              (setq done t)
              ;; else
              (setq left-box (kk.get.value (left-box boxes) 'SAME-MACHINE-SUCCESSOR))))
    (let* ((end-time (kk.get.value (left-box boxes) 'END-TIME))
           (right-box (kk.get.value (left-box boxes) 'SAME-MACHINE-SUCCESSOR)))
      (list end-time *plus-infinity* left-box right-box))))


;;; ---------------------- End of new PM code ----------------------



;(defun total-downtime-duration (box)
;  "This function starts with the box passed and finds the total amount of downtime both in fron
t and
;   behind it.  The total span of downtime found is then returned (in seconds).  This funtion as
sumes
;   that the box you pass it is a DOWNTIME box.        Lee Klaus  09/22/88"
;  (let ((right-box (kk.get.value (box boxes) 'same-machine-successor))
;        (left-box (kk.get.value (box boxes) 'same-machine-predecessor))
;        (downtime-duration 0))
;    (setq downtime-duration (+ (- (kk.get.value (box boxes) 'end-time) (kk.get.value (box boxes
) 'start-time))
;                               (right-downtime-duration right-box 0)
;                               (left-downtime-duration left-box 0)))))

;(defun right-downtime-duration (box duration)
;  "The following function is called by total-downtime-duration and is used to find the total am
ount of downtime
;   starting with this box and working to the right.  The boxes must be downtimes and adjacent t
o each other - as
;   soon as that link is broken, the function returns with the total duration found.   Lee Klaus
  9/22/88"
;  (let ((right-box (kk.get.value (box boxes) 'same-machine-successor))
;        (left-box (kk.get.value (box boxes) 'same-machine-predecessor)))
;    (cond ((and (memq (kk.get.value (box boxes) 'box-type) '(D U))
;                (= (kk.get.value (box boxes) 'start-time) (get.value left-box 'end-time)))
;           (setq duration (+ duration (- (kk.get.value (box boxes) 'end-time) (kk.get.value (box
 boxes) 'start-time)))
```

```
;          (right-downtime-duration right-box duration))
;         (t duration))))

;(defun left-downtime-duration (box duration)
;  "The following function is called by total-downtime-duration and is used to find the total am
ount of downtime
;   starting with this box and working to the left. The boxes must be downtimes and adjacent to
each other - as
;   soon as that link is broken, the function returns with the total duration found.   Lee Klaus
 9/22/88".
;  (let ((left-box (kk.get.value (box boxes) 'same-machine-predecessor))
;        (right-box (kk.get.value (box boxes) 'same-machine-successor)))
;    (cond ((and (memq (kk.get.value (box boxes) 'box-type) '(D U))
;                (= (kk.get.value (box boxes) 'end-time) (get.value right-box 'start-time)))
;           (setq duration (+ duration (- (kk.get.value (box boxes) 'end-time) (kk.get.value (box
 boxes) 'start-time))))
;          (left-downtime-duration left-box duration))
;         (t duration))))



(defun first-downtime-start (box)
  (cond ((> (kk.get.value (box boxes) 'START-TIME) (get.value *control-unit* 'frozen-time-1))
         (let ((left-box (kk.get.value (box boxes) 'SAME-MACHINE-PREDECESSOR)))
           (cond ((and (memq (kk.get.value (box boxes) 'box-type) '(D U))
                       (= (kk.get.value (box boxes) 'start-time) (kk.get.value (left-box boxes)
'end-time)))
                  (first-downtime-start  left-box ))
                 (t (list box (kk.get.value (box boxes) 'start-time))))))
        (t (list box (kk.get.value (box boxes) 'start-time)))))

(defun last-downtime-end (box)
  (cond ((not (eq (kk.get.value (box boxes) 'box-type) 'E))
         (let ((right-box (kk.get.value (box boxes) 'same-machine-successor)))
           (cond ((and (memq (kk.get.value (box boxes) 'box-type) '(D U))
                       (= (kk.get.value (box boxes) 'end-time) (kk.get.value (right-box boxes) '
start-time)))
                  (last-downtime-end  right-box ))
                 (t (list box (kk.get.value (box boxes) 'end-time))))))
        (t (list box (kk.get.value (box boxes) 'end-time)))))



;  "The following function is used to determine all PM jobs for each cell in the factory.
;   It works as follows:
;      - Remove all old PM jobs hanging around the the SCHEDULED-PM slot of each cell.
;      - For each machine, find out what PM functions need to be performed, when, and how often
.
;        The window in which the PM is to be performed may have to be shifted if the window
;        is disrupted by cell downtime.
;      - There are three cases which may effect the PM window position.  They are:
;          o  The window window is not blocked by any downtime.  In this case the window is pos
itioned
;             exactly where specified by the slot entry.
;          o  The window is partially blocked by downtime.  If there is still enough time to sc
hedule the
;             PM, the window does not move.  If there is NOT enought time, the window start is
moved
;             immediately right of the downtime.
;          o  The window is completely blocked by downtime.  Move the window immediately to the
 right
;             of the downtime and continue scheduling PM's with respect to the new window posit
ion.
;   This function also forces all PM jobs to be at least one second in duration so that the sche
duling
;   functions work properly and the PM appears on the gantt chart.                            Lee
 Klaus  9/23/88"

(defun determine-all-pm-jobs ()
  "This determines all PM jobs for each cell in the factory."
```

```
(loop for mach in (unit.descendants 'MACHINES 'MEMBER) do
      (remove.all.values mach 'SCHEDULED-PM))
 (let* ((schedule-horizon-end (get.value *control-unit* 'HORIZON-END))
        allowable-start-for-pm)
   (loop for machine in (unit.descendants 'MACHINES 'MEMBER) do
         (setq allowable-start-for-pm (get.value machine 'FROZEN-TIME-2))        ;; PM can NOT
be scheduled before FT2
         (loop for entry in (get.values machine 'SCHEDULED-PM-FREQUENCY) do
               (let* ((pm-job (first entry))
                      (window-start (second entry))
                      (window-end (third entry))
                      (window-span (- window-end window-start))
                      (duration (fourth entry))
                      (frequency (fifth entry)))
                ;; If the window start-time for a PM from the FCS was before build context tim
e, assume that a required PM has not been done.
                ;; Move the window to the first allowable time to schedule PM's.   Karon Barbe
r, Lee Klaus  09/22/88.
                (when (<= window-start allowable-start-for-pm)
                  (setq window-start allowable-start-for-pm)
                  (setq window-end (+ allowable-start-for-pm window-span)))

               (loop until (> window-start schedule-horizon-end) do
                     (let* ((possible-pockets (pockets-in-range machine window-start window-end
))
                            (pocket-is-found nil))
                       (loop for pocket in possible-pockets until pocket-is-found do
                             (when (>= (time-between (third pocket) (fourth pocket)) duration)
                               (setq pocket-is-found t)
                               (add.value machine 'SCHEDULED-PM (list pm-job window-start windo
w-end duration))
                               (setq window-start (+ window-start frequency))
                               (setq window-end (+ window-start window-span))))
                       (cond ((not pocket-is-found)
                              (let ((last-downtime-end-time
                                      (second (last-downtime-end (get-box-covering machine wind
ow-start))))
                                    (first-downtime-start-time
                                      (second (first-downtime-start (get-box-covering machine w
indow-start)))))
                                (cond ((>= first-downtime-start-time (+ allowable-start-for-pm
duration))
                                       (add.value machine 'SCHEDULED-PM
                                                  (list pm-job
                                                        (- first-downtime-start-time window-spa
n)   ; window start
                                                        first-downtime-start-time
     ; window end
                                                        duration))
                                       (setq window-start (+ last-downtime-end-time frequency))
                                       (setq window-end (+ window-start window-span)))
                                      (t (setq window-start last-downtime-end-time)
                                         (setq window-end (+ window-start window-span))
                                         (add.value machine 'SCHEDULED-PM (list pm-job window-s
tart window-end duration)))
                                      ))))))))))


;(defun pm-alternate-placement (first-box window-end)
;  (let* (box next-box done)
;    (setq next-box first-box)
;    (setq box first-box)
;    (loop until done do
;          (cond ((or (null next-box)
;                     (and (<= (kk.get.value (box boxes) 'end-time) window-end)
;                          (>= (kk.get.value (next-box boxes) 'end-time) window-end)))
;                 (setq *nil-pocket-box* box)
;                 (setq done t))
;                (t (setq box next-box)
;                   (setq next-box (kk.get.value (box boxes) 'same-machine-successor)))))))
;
```

```
;(defun force-event-around-box (*nil-pocket-box*)
;  " Function to determine where to schedule a pm event when there are no time pockets in the wi
ndow"
;  (let* ((candidate-box (previous-movable-box *nil-pocket-box*))
;         candidate-predecessor)
;    (setq candidate-box (get.value candidate-box 'same-machine-predecessor))
;    (if candidate-box
;       (setq candidate-predecessor (previous-movable-box candidate-box)))
;    (if candidate-predecessor
;       (if (equal (get.value candidate-box 'box-type) 'S)
;           (setq *nil-pocket-box* candidate-predecessor)
;           (setq *nil-pocket-box* candidate-box))
;       (setq *nil-pocket-box* candidate-box))))
;
;(defun reschedule-pm-event (pm-blocker-box)
;  " Function to reschedule pm when right shifting if boxes need to jump pm and pm can be left s
hifted"
;  (let* ((box-to-move (get.value pm-blocker-box 'same-machine-predecessor))
;         (pm-window-start (first (get.value pm-blocker-box 'immovable)))
;         (pm-duration (- (get.value pm-blocker-box 'end-time) (get.value pm-blocker-box 'start-t
ime)))
;         (predecessor-of-box-to-move (get.value box-to-move 'same-machine-predecessor))
;         shift-amount predecessor-end-time setup-duration)
;    (if predecessor-of-box-to-move
;       (setq predecessor-end-time (get.value predecessor-of-box-to-move 'end-time))
;       (setq predecessor-end-time 0))
;    (put.value pm-blocker-box 'start-time (max pm-window-start predecessor-end-time))
;    (cond ((and (> pm-window-start predecessor-end-time)
;                (equal (get.value predecessor-of-box-to-move 'box-type) 'S))
;           (setq setup-duration (- (get.value predecessor-of-box-to-move 'end-time)
;                                   (get.value predecessor-of-box-to-move 'start-time)))
;           (put.value predecessor-of-box-to-move 'start-time (- (get.value pm-blocker-box 'start
-time) setup-duration))
;           (put.value predecessor-of-box-to-move 'end-time (+ (get.value predecessor-of-box-to-m
ove 'start-time)
;                                                               setup-duration))))
;    (put.value pm-blocker-box 'end-time (+ (get.value pm-blocker-box 'start-time) pm-duration))
;    (setq shift-amount (- (get.value pm-blocker-box 'end-time) (get.value box-to-move 'start-ti
me)))))


(defun set-machine-parameters (&optional run-type)
  "Sets slots in Control-Unit and machine classes to required values for the scheduling of spare
 parts and components ordered by other plants"
  (cond ((equal run-type 'PROD)
         (put.value *control-unit* 'GAP-FOR-BATCHING 1)
         (loop for machine-class in (unit.children 'MACHINES 'SUBCLASS) do
               (put.value machine-class 'PERCENTAGE-OF-FIT 60)
               (put.value machine-class 'WINDOW-SPAN 2)
               (put.value machine-class 'WINDOW-SPAN-FOR-BATCHING 4)
               (if (member machine-class (get.value *control-unit* 'MACHINE-CLASSES-FOR-DEDICATI
ON))
                   (put.value machine-class 'RUN-WITH-DEDICATED-MACHINES 'YES)
                   (put.value machine-class 'RUN-WITH-DEDICATED-MACHINES 'NO))))
        (t
         (put.value *control-unit* 'GAP-FOR-BATCHING 0)
         (loop for machine-class in (unit.children 'MACHINES 'SUBCLASS) do
               (put.value machine-class 'PERCENTAGE-OF-FIT 100)
               (put.value machine-class 'WINDOW-SPAN 7)
               (put.value machine-class 'WINDOW-SPAN-FOR-BATCHING 7)))))
(defun set-time-parameters ()
  " Function to set time related parameters after horizon end has been determined"
  (let* ((horizon-end (get.value *control-unit* 'HORIZON-END))
         (delta *additional-days*))
    (put.value *control-unit* 'HORIZON-END-PLUS (+ horizon-end delta))))


;;; ---------------------- GENERAL DESCRIPTION OF SAFETY STOCK REPLENISHMENT (SCHEDULING) ------
---------------
```

```
;;;
;;; The purpose of this functionality is to utilize excess idle machine  capacity to
;;; build safety stock (trays of parts at any operation). Parts are built until either:
;;;
;;;      a.  the target number of trays has been reached or,
;;;      b.  no more parts can be scheduled prior to the horizon end.
;;;
;;;      The top level function that initiates the process is: REPLENISH-SAFETY-STOCK
;;;
;;; Below is a description of the major steps in the replenishment of safety stock:
;;;
;;; 1.  Initially, check the ON-HAND-WIP slot of each operation to see if any parts
;;;     exist that are not classified as safety stock.  This would be inventory that
;;;     was unused in the previous schedule generation.  Call ADD-WIP-TO-SAFETY-STOCK
;;;     to add these parts (trays) to any existing safety stock until the targeted
;;;     level is reached or the onhand inventory is exhausted.  As these are added to
;;;     safety stock they are also decremented from ON-HAND-WIP.
;;; 2.  Next, schedule the  replenishment of safety stock as  required by calling
;;;     SCHEDULE-SAFETY-STOCK.  This begins by calling SET-MACHINE-PARAMETERS to
;;;     reset a number of the user parameters for the forward scheduling heuristics.
;;;     Then, for each operation, determine if safety stock is desired.   If so,
;;;     determine the number of trays that need to be built (targeted level - on hand).
;;; 3.  Now, create trays and the associated boxes for the parts to be built.
;;; 4.  Begin forward scheduling by determining the eligible machines that could
;;;     potentially schedule this part-operation  (DETERMINE-POSITION-FORWARD).
;;;     Iterate until either a valid alternative is calculated or we've reached the
;;;     end of the horizon without having scheduled the process.
;;; 5.  If a feasible alternative is generated call IMPLEMENT-ALTERNATIVE to actually
;;;     schedule the event.  Then recursively do the remaining operations in the part's
;;;     routing (SAME-TRAY-SUCCESSOR's).
;;; 6.  If no feasible alternatives were generated (determined by calling function
;;;     (NOT-ALL-OPERATIONS-SCHEDULED) at a given operation then stop trying to
;;;     schedule that particular part since there is not sufficient machine capacity
;;;     to schedule it prior to horizon end.
;;; 7.  The forward scheduling heuristics utilize code that is basically the mirror image
;;;     of GENERATE-ALTERNATIVES (GENERATE-ALTERNATIVES-FORWARD).  The primary consider-
;;;     ations in forward scheduling are:
;;;
;;;         a.  allow alternatives only if they fit entirely in a time pocket (100% fit)
;;;         b.  do not allow alternatives if the would require adding 2 setups (i.e.
;;;             inserting an unlike part between 2 like parts).
;;;
;;; ------------------------------------------------------------------------------------------
----------------


(defun replenish-safety-stock ()
  " Main routine that calls other functions to actually replenish safety stock"
  (check-action 'replenish-safety-stock)
  (let* ((msg-output-window (get.value *control-unit* 'msg-output-window)))
    (format msg-output-window "~% Replenishing Safety Stock")
    (setq *time1* (time))
    (add-wip-to-safety-stock)
    (schedule-safety-stock)
    (setq *time2* (time))
    (report-execution-time msg-output-window)))

(defun add-wip-to-safety-stock ()
  " Function to add any WIP into safety stock if not already at maximum level"
  ;; For all operations:  For all ON-HAND-WIP for an operation:
  (loop for oper in (unit.children 'OPERATIONS 'MEMBER) do
       (loop for wip in (get.values oper 'ON-HAND-WIP) do
             (let* ((number-wip-trays (first wip))
                    (safety-stock (get.value oper 'SAFETY-STOCK)))  ;;; has only 1 entry just s
et to get.value

              (cond ((not safety-stock)
                     (when (> number-wip-trays 0)
                       (add.value oper 'SAFETY-STOCK (list number-wip-trays number-wip-trays)
)

                     (remove.value oper 'ON-HAND-WIP wip))
```

```
(t
 (let* ((current-safety-stock (first safety-stock))  ;; This gets updated .
as we loop.
       (target (second safety-stock))
       (stock-to-replenish (- target current-safety-stock)))

  (when (plusp stock-to-replenish)  ;; We have to replentish some safety
stock.
   (cond ((> stock-to-replenish number-wip-trays)  ;; Use all of the WIP
.
       (when (> number-wip-trays 0)    ;; If we have any
        (remove.value oper 'ON-HAND-WIP wip)
        (replace.value oper 'SAFETY-STOCK (list current-safety-stock
 target)

                 (list (+ current-safety-stock number-wip-tray
s) target)))))
      (t   ;; Use some of the WIP.
       (replace.value oper 'ON-HAND-WIP (list number-wip-trays)
                 (list (- number-wip-trays stock-to-replenish)))
       (replace.value oper 'SAFETY-STOCK (list current-safety-stock t
arget)

                 (list (+ current-safety-stock stock-to-replenis
h) target))))))))))))


(defun schedule-safety-stock ()
  " Function to determine how much safety stock to replenish"
  (mouse-to-hourglass)
  (let* ((ranked-operations (get.value *control-unit* 'RANKED-OPERS-FOR-SAFETY-STOCK))
        (allowable-start-time (get.value *control-unit* 'BUILD-CONTEXT-TIME)))
    (set-machine-parameters)

    (loop for oper in ranked-operations do
          (loop for entry in (get.values oper 'SAFETY-STOCK) do
               (let* ((part (get.value oper 'PART-ID))
                      (stock-on-hand (first entry))
                      (target (second entry))
                      (trays-to-build (- target stock-on-hand)))  ;; The number of trays to bui
l
d to replentish safety stock.

                  (loop for count from 0 to (1- trays-to-build)
                      while (plusp trays-to-build)
                      do
                      (let* ((tray (get-any-tray-from-free-pool 'component-trays))
                            leadoff-box
                            initial-box)
                        (initialize-tray-slots tray part 'ORDER-0000 20)
                        (create-boxes-for-safety-stock-or-component-orders tray (unit oper) 'S
AFETY-STOCK)

                        (setq leadoff-box (kk.get.value (tray trays-in-system) 'INITIAL-BOX))
                        (determine-position-forward leadoff-box allowable-start-time t)  ; xxx
 s/b last unresequenced box in ft2
                        (cond ((kk.get.value (tray trays-in-system) 'ALL-OPERS-SCHEDULED)
                              (setq trays-to-build (1- trays-to-build))
                              (replace.value oper 'SAFETY-STOCK (list stock-on-hand target)
                                      (list (setq stock-on-hand (+ stock-on-hand 1)) t
arget)))

                             (t (setq trays-to-build 0)
                               (setq initial-box (kk.get.value (tray trays-in-system) 'initi
al-box))

                                (if  (or (null initial-box)          ; No operations are
scheduled

                                     (null (kk.get.value (initial-box boxes) 'start-time
)))

                                  (recycle-tray-to-free-pool tray)))))))))

  (mouse-to-arrow))


(defun create-boxes-for-safety-stock-or-component-orders (tray final-operation &optional safety-
stock)
```

```
  "Pre-creates all process boxes required by all the trays"
  (let* ((routing (kk.get.value (tray trays-in-system) 'ROUTING))
         (first-operation (car routing))
         (oper-type (when (equal (last routing) first-operation) T)) ;; This is T if it is the l
ast in the routing. xxx ???
         (first-box (get-process-box tray first-operation oper-type))
         (predecessor-box first-box)
         (box first-box)
         end)
    (when (equal first-operation final-operation)
      (when safety-stock
        (kk.put.value (first-box boxes) 'INVENTORY 'REPLENISH))
      (setq end t))
    (kk.put.value (first-box boxes) 'ORDER-TYPE (if safety-stock 'SAFETY-STOCK 'COMPONENT))

    (loop for operation in (cdr routing)        ; For each operation
          until end do
          (if (equal (last routing) operation)
              (setq oper-type  t)
              (setq oper-type nil))
          (setq box (get-process-box  tray operation oper-type))
          (kk.put.value (box boxes) 'ORDER-TYPE (if safety-stock 'SAFETY-STOCK 'COMPONENT))

          (kk.put.value (predecessor-box boxes) 'SAME-TRAY-SUCCESSOR box)
          (kk.put.value (box boxes) 'SAME-TRAY-PREDECESSOR predecessor-box)
          (setq predecessor-box box)
          (when (equal operation final-operation)
            (when safety-stock
              (kk.put.value (box boxes) 'INVENTORY 'REPLENISH))
            (setq end t)))
    (kk.put.value (tray trays-in-system) 'INITIAL-BOX first-box)
    (kk.put.value (tray trays-in-system) 'FINAL-BOX box)))


(defun determine-position-forward (box desired-start-time safety-stock)
  " Function to forward schedule both safety stock replenishment and component orders"
  (let* (best-alternative)
    (kk.put.value (box boxes) 'DESIRED-START-TIME desired-start-time)
    (setq best-alternative (forward-schedule-machine-for-this-process box safety-stock)) ; find
best time  on  machine
    (cond (best-alternative
           ;;(print (list "Found an alt for: " (unit.name box)))
           (implement-alternative best-alternative box)
           (when (kk.get.value (box boxes) 'SAME-TRAY-SUCCESSOR)
             (determine-position-forward (kk.get.value (box boxes) 'SAME-TRAY-SUCCESSOR)
                                         (kk.get.value (box boxes) 'END-TIME) safety-stock)))
          (t (not-all-operations-scheduled box safety-stock)))))


(defun forward-schedule-machine-for-this-process (box safety-stock)
  " Similar to determine-machine-for-this-process except modified for forward scheduling"
  (let* (primary-machines
         (tray (kk.get.value (box boxes) 'TRAY))
         (possible-machines (dolist (entry (get.values (kk.get.value (box boxes) 'OPERATION) 'EL
IGIBLE-MACHINES))
                              (dotimes (number-machines (first entry))
                                (setq primary-machines (append primary-machines
                                                               (list (nth (+ 1 number-machines)
entry)))) )
                              (return (cdr entry))))
         alternative)
    (when (not possible-machines)
      (format t "~%% No preferred machines for part ~a "
              (unit.name (kk.get.value ((kk.get.value (box boxes) 'TRAY) trays-in-system) 'PART-
ID))))
    (alternatives-recycle-alternatives)
    (loop until (or (setq alternative (get.value 'ALTERNATIVES 'BEST-ALTERNATIVE))
                    (not (kk.get.value (tray trays-in-system) 'ALL-OPERS-SCHEDULED)))   ;  could
n't schedule all opers for safety stock
          for window-increment from 1 do
          (generate-alternatives-forward primary-machines window-increment possible-machines box
```

```
safety-stock)) ; rescheduled))
    alternative))

(defun batchable-p (process-box &optional machine)
  "A predicate that determines if a given process-box is batchable on the specified machine.
    Returns nil if box is null.  If machine is not specified it is determined from the box."
  (when process-box
    (when (null machine)
      (setq machine (kk.get.value (process-box boxes) 'MACHINE)))
    (member (car (unit.parents machine 'member))
            (kk.get.value ((kk.get.value (process-box boxes) 'TRAY) trays-in-system) 'MACHINES-T
O-BATCH))))

(defun not-all-operations-scheduled (box safety-stock)
  " Function to execute when we can't schedule an operation in forward scheduling.  This unlinks
 the previous tray box,
   updates the safety-stock for the previous operation, and recycles the boxes."
  (ignore safety-stock)
  (let* ((same-tray-predecessor (kk.get.value (box boxes) 'SAME-TRAY-PREDECESSOR))
         (part (unit.name (kk.get.value ((kk.get.value (box boxes) 'TRAY) trays-in-system) 'PART
-ID)))
         predecessor-operation current-safety-stock target done)
    (when same-tray-predecessor
      (kk.remove.all.values (same-tray-predecessor boxes) 'SAME-TRAY-SUCCESSOR)       ;;  undo t
he pointers from previous tray box

      ;; Update SAFETY-STOCK
      (setq predecessor-operation (kk.get.value (same-tray-predecessor boxes) 'OPERATION))
      (loop for entry in (get.values predecessor-operation 'SAFETY-STOCK)
            until done
            do
            (when (equal part (get.value predecessor-operation 'PART-ID))
              (setq current-safety-stock (first entry))
              (setq target (second entry))
              (replace.value predecessor-operation 'SAFETY-STOCK (list current-safety-stock targ
et)
                             (list (setq current-safety-stock (1+ current-safety-stock))
                                   target))                                           ;; increment
 safety stock count
              (setq done t)))
      (when (not done)
        (add.value predecessor-operation 'SAFETY-STOCK (list 1 1))))

    ;; Recycle all the same-tray-successor boxes and this box.
    (loop for box = box
          then (kk.get.value (box boxes) 'SAME-TRAY-SUCCESSOR)
          until (null box) do
          (remove-box box)                                                                    ;;
 unlink box and recycle it
          (recycle-box box))))



(defun schedule-component-orders ()
  " Function to schedule component orders"
  (any-component-orders-selected?)                       ;;    DHO    6-27-89
  ;; This makes sure that component orders are selected and used for this run.  This is done by
removing all values in the
  ;; COMPONENTS-ORDERED slot on all operations, and then applying the selected component orders.
     Lee Klaus  9/26/88

  (mouse-to-hourglass)
  (check-action 'schedule-component-orders)
  (let* ((ranked-operations (get.value *control-unit* 'RANKED-OPERS-FOR-SAFETY-STOCK))
         (msg-output-window (get.value *control-unit* 'MSG-OUTPUT-WINDOW))
         (allowable-start-time (get.value *control-unit* 'BUILD-CONTEXT-TIME)))

    (set-machine-parameters)
    (format msg-output-window "~%% Scheduling Component Orders")
    (setq *time1* (time))
```

```
(loop for oper in ranked-operations do
      (loop for entry in (get.values oper 'COMPONENT-PARTS-ORDERED) do
            (let* ((part (first entry))
                   (quantity (second entry))
                   (due-date (third entry))
                   (order (fourth entry))

                  (pieces-per-tray (get.value part 'MAXIMUM-TRAY-SIZE))
                  (trays-to-build (ceiling (fquotient quantity pieces-per-tray)))
                  tray leadoff-box)
             (loop for count from 0 to (1- trays-to-build)
                   while (plusp trays-to-build)
                   do
                   (setq tray (get-any-tray-from-free-pool 'component-trays))
                   (initialize-tray-slots tray part order due-date)
                   (create-boxes-for-safety-stock-or-component-orders tray (unit oper))
                   (setq leadoff-box (kk.get.value (tray trays-in-system) 'INITIAL-BOX))
                   (determine-position-forward leadoff-box allowable-start-time nil) ;;; xx
x s/b last unresegncd box in ft2
                   (cond ((kk.get.value (tray trays-in-system) 'ALL-OPERS-SCHEDULED)
                          (setq trays-to-build (- trays-to-build 1)))
                         (t (setq trays-to-build 0)))))))
   (setq etime1* (time))
   (report-execution-time msg-output-window)
   (mouse-to-arrow)))


;;; ---------------------------------- DEBUGGING FUNCTIONS ----------------------------------

(defun look-at-boxes ()
  "This is a debugging function to show the numbers of each type of box"
  (let* ((boxes (unit.children 'boxes 'member))
         (unum 0)(utime 0)(dnum 0)(dtime 0)(pmnum 0)(pmtime 0)
         (snum 0)(stime 0)(sanum 0)(satime 0)(compnum 0)(comptime 0)(custnum 0)(custtime 0))
    (loop for box in boxes
          when (kk.get.value (box boxes) 'END-TIME)
          do
          (let* ((duration (- (kk.get.value (box boxes) 'END-TIME) (kk.get.value (box boxes) 'ST
ART-TIME))))
            (case (kk.get.value (box boxes) 'BOX-TYPE)
              (U (incf unum) (incf utime duration))
              (D (incf dnum) (incf dtime duration))
              (PM (incf pmnum) (incf pmtime duration))
              (S (incf snum) (incf stime duration))
              (P (case (kk.get.value (box boxes) 'ORDER-TYPE)
                   (SAFETY-STOCK (incf sanum)(incf satime duration))
                   (COMPONENT (incf compnum)(incf comptime duration))
                   (T (incf custnum)(incf custtime duration)))))))
    (format T "d%Type   Number  TimeU%u%")
    (loop for type in '(U D PM S CUST SAFETY COMP) do
          (format T "U6a  U4d   UaU%" type
                  (case type (U unum)(D dnum)(PM pmnum)(S snum)(CUST custnum)(SAFETY sanum)(COMP
 compnum))
                  (seconds-to-string
                    (case type (U utime)(D dtime)(PM pmtime)(S stime)(CUST custtime)(SAFETY sati
me)(COMP comptime)))))))

(defun check-pm ()
  "This is a debugging function to check if all the PM boxes are within their correct window."
  (let* ((boxes (unit.children 'boxes 'member)))
    (loop for box in boxes
          when (eq 'PM (kk.get.value (box boxes) 'BOX-TYPE))
          do
          (let* ((window (kk.get.value (box boxes) 'IMMOVABLE))
                 (window-start (first window))
                 (window-end (second window))
                 (machine (kk.get.value (box boxes) 'MACHINE))
                 (next-movable-box (next-movable-box box machine))
                 (previous-movable-box (previous-movable-box box)))

            (when (or (> window-start (kk.get.value (box boxes) 'START-TIME))
```

```
                (< window-end (kk.get.value (box boxes) 'END-TIME)))
            (format T "PM box ~a out of window range" (unit.name box)))
          (when (and next-movable-box previous-movable-box
                     (eq 'S (kk.get.value (previous-movable-box boxes) 'BOX-TYPE))
                     (eq 'P (kk.get.value (next-movable-box boxes) 'BOX-TYPE)))
            (format T "PM box ~a is between S box ~a and P box ~a~%"
                    (unit.name box)(unit.name previous-movable-box)(unit.name next-movable-box
)))))))

(defun gopm ()
  (init-and-run)
  (utilize-onhand-inventory)
  (shift-schedule-right)
  (format T "~%Ready to PM~%~%"))


(defun make-pm-difficult ()  ;; This is for debugging.
  (loop for machine in  (unit.descendants 'machines 'member) do
        (let* ((old-vals (get.values machine 'SCHEDULED-PM)))
          (put.values machine 'SCHEDULED-PM (append old-vals old-vals)))))
;;; -*- Mode:Common-Lisp; Package:KEE; Base:10 -*-

(in-package 'kee)

;; The files are read from the directory *data-dir*.
;; The format for the files is read from the file filfrmt.lisp, normally in the sys dir.


(defconstant *error-token* 'error)   ; SYMBOL installed when empty string is encountered...

(defparameter *data-kb-member-unit-type* 'classic-unit)

(defconstant *system-slots*
            '(self record-sequence parent-member-units parent-class-units ancestors failed-test
))

(defvar *record-counter* 0) ;  record-counter added 9/20/88 by MJJ

(defun record-sequence (record &optional class)
  "Record a number so order can be recovered for Preferred Machines."  ; also used in debugging
match-on-name. xxx
  (declare (ignore class))
  (incf *record-counter*)   ; maybe limit to only the FCS classes that its needed for?  Useful
for debugging. xxx
  (put.value record 'record-sequence *record-counter*))


;************************************************************************

(defun DELETE-INSTANCES-OF (parent)
  (map nil #'delete.unit (class-members parent)))

;************************************************************************
;Makes the static portion of the KB
(defun make-kb ()
  (declare (special *data-kb* *data-dir*))
  (let ((data-kb *data-kb*)
        (data-file-dir *data-dir*)
        (data-info-file (merge-pathnames "filfrmt.lisp" *sys-dir*)))
    (inform 'stage "~2%Reading in file definitions and formats.~%")
    (delete.kb data-kb t)
    (setq *record-counter* 0)                        ; reset record counter.   mjj 10/3/88
    (create.kb data-kb)
    (goto.kb data-kb)
    (create.unit 'fcsroot data-kb nil nil nil `((load-me! read-and-represent-data method method)
                                                (fcs-dir-name ,data-file-dir nil string)))
    (with-open-file (make-kb-stream data-info-file :direction :input)
      (do ((file-name nil (cond ((read-line make-kb-stream nil nil))(t "end"))))
          ((equal "end" file-name))
        (cond ((not (equal nil file-name))
```

```
(let ((record-name (coerce-to-symbol (read-line make-kb-stream)))
      (field-format (newproc (read-line make-kb-stream)))  ; list of names
      (field-names (newproc (read-line make-kb-stream))))  ; list of numbers
  (create.unit record-name
               data-kb
               é(,(unit 'fcsroot *data-kb*))
               nil
               nil
               é(,&*system-slots* ,&field-names)
               é((fcs-file-name ,file-name nil string)
                (fcs-record-name ,record-name)
                (fcs-field-names ,(list field-names))
                (fcs-field-format ,(list field-format))
                ))
(add.parent (unit record-name'*data-kb*) 'compact.class.av 'subclass)
(put.values (unit record-name *data-kb*) 'local.compact.unit.slotnames
            é(,&*system-slots* ,&field-names))))))));


;***********************************************************************************


(defun INSTANTIATE-KB ()
  "Read the data-files and instantiate the KB."
  (inform 'stage "U2%Loading FCS data from directory  UaU%" (namestring *data-dir*))
  (dolist (record-name (unit.children  'fcsroot  'subclass))
    (unitmsg record-name 'load-me)))


;***********************************************************************************

(defun NEWPROC (strg)
  (let ((val (multiple-value-list (read-from-string strg))))
    (cond ((equal (length strg)(cadr val))
            (list (car val)))
           (t (cons (car val) (newproc (subseq strg (cadr val))))))))

;***********************************************************************************

(defun READ-AND-REPRESENT-DATA (thisunit)  ; new version 9/88 MJJ   Error checking; multi-line r
ecord; record order.
  (declare (special *data-kb*))
  (let* ((file-name (merge-pathnames (get.value thisunit 'fcs-file-name) (get.value thisunit 'fc
s-dir-name)))
         (record-name (get.value thisunit 'fcs-record-name))
         (field-names (get.value thisunit 'fcs-field-names))
         (field-format (get.value thisunit 'fcs-field-format))
         (no-of-lines (ceiling (+ (reduce #'+ field-format)
                                  (1- (length field-format)))
                               80))
         (record-count 0))
    (when (equal "dummy.file" (get.value thisunit 'fcs-file-name))
      (inform 'progress "U% Not reading recs from Ua" record-name)
      (return-from read-and-represent-data nil))
    (with-open-file (fcs-stream file-name :direction :input)
      (let ((header-line (read-lines fcs-stream 1)))     ; throw away header.
        (unless (eq header-line 'eof)
          (loop for record = (read-lines fcs-stream no-of-lines nil :eof-acceptable t)
                do
                (if (eq record 'eof) (return))
                (incf record-count)
                (let ((record-unit (create.unit (coerce-to-symbol (format nil "Ua-Ua" record-nam
e record-count))
                                                   *data-kb* nil record-name nil nil nil *data-kb-m
ember-unit-type*)))
                  (declare (special record-unit))    ; why is this needed? The lambda should
have gotten it??
                  (record-sequence record-unit record-name)      ; 9/20/88 MJJ sequence for recov
ering preferred machine order.
                  (map nil #'(lambda (slot val) (inform 'debug (list record-unit slot val))
```

```
                    (put.value record-unit slot val))
              field-names
              (string-to-list record field-format record-name record-count))
          (put.value record-unit 'self (unit.name record-unit))))      ; added 12/19/88
%UJ; order translation...
     (inform (if (= record-count 0)
                 'summary
                 'progress)
        "U%U4,' d records read from Ua" record-count record-name)))))


;*****************************************************************************
; Converts a string of fields to a list of fields
; eg. "aa bbb ccccc" becomes ("aa" "bbb" "ccccc"). A Provided of course, that field-format is '(
2 3 5) A
; If there are more fields in 'record' than required by field-format, they are ignored.
; "record" is a string. Each field is separated by a single space.
; 'field-format" is a list of field lengths.

(defun STRING-TO-LIST (record field-format &optional record-name i)
  (declare (special *error-token*))
  (let ((leng (car field-format)))
    (cond (field-format
           (cons (cond ((equal "" (remove #\space (subseq record 0 leng)))
                        (format nil "U&Ua-Ud has no value in Ud" record-name i leng)
                        *error-token*)
                       (t (subseq record 0 leng)))
                 (string-to-list (subseq record (1+ leng))(cdr field-format) record-name i))))))
;eg. string-to-list of "aa bb cc" = cons (aa  &  string-to-list of "bb cc"))
;; -*- Mode:Common-Lisp; Package:KEE; Fonts:(cptfont HL10B cptfont HL12B HL12BI); Base:10 -*-
#00

     The following file contains the functions that support the reporting facilities for the
 ESS system- The reports available to the end user are :

    o  Machine utilization report
    o  Cell activity report
    o  Makespan by part type
    o  Safety stock useage
    o  Highlight trays from WIP  (on the gantt chart)
    o  Highlight late trays  (on the gantt chart)

     All of the generated reports go to the report output window or the printer except the last
 two-

Ob#
(defun make-report-output-window (control-unit)
  "This function creates a window (if it doesn't already exist) for displaying
   ESS reports-"
  (ignore control-unit)
  (let* ((window nil)
         (left 0) (bottom 25) (width 1020) (height 720))
    (cond ((null (get.value *control-unit* 'report-output-window))
           (setq window (make-window-stream
                         :left left :bottom bottom :width width :height height :borders 2
                         :title-font *title-font* :font-set (list fonts:cptfont)
                         :font fonts:cptfont
                         :parent *kee-root-window* :type 'window-stream))
           (PUT.VALUE *CONTROL-UNIT* 'REPORT-OUTPUT-WINDOW WINDOW)
           (enable-window-stream-page-scrolling window :more-p t)
           (expose window)
           (setf (window-stream-button window) 'output-window-button-method)
           (setf (window-stream-hotspot-list window) (make-row-hotspots left bottom width height
))
           (clear-window-stream window)
           (list window))
          (t (clear-window-stream (GET.VALUE *CONTROL-UNIT* 'REPORT-OUTPUT-WINDOW))))))

(defun make-row-hotspots (left bottom width height)
  "This function sets up hot spot rows so that the user can see which row he is on-
   This is a feature of common windows-"
```

```
(ignore bottom)
(let* ((row-height (+ (w:font-char-height fonts:cptfont) 2))
       (title-height (+ (w:font-char-height *title-font*) 5))
       (top-of-window-minus-the-title (- height title-height))
       (y top-of-window-minus-the-title)                    ;;; (* 5 row-height)))
       (hotspot-list nil))
  (loop until (<= y 0) do
        (setq y (- y row-height))
        (setq hotspot-list (append (list (make-hotspot :region (make-region
                                                                :left left
                                                                :bottom y
                                                                :width width
                                                                :height row-height)))
                                   hotspot-list)))
  hotspot-list))

(defun summary-reports ()
  "This function is used to set up the user menu for the reports available.  The
 menu is a Common Windows CHOOSE VARIABLE VALUES type of menu."
 '("Generate Summary Reports"
   'USER-REPORTS
   "Miscellaneous statistics and reports"
   (SUBITEMS ("Machine Utilization Report"
              'machine-util-report
              "Generate a Machine Utilization Report")
             ("Cell Activity Report"
              'cell-activity-report
              "Generate a Cell Activity Report")
             ("Makespan by Part Type"
              'determine-makespans
              "Generate a Makespan Report")
             ("Onhand WIP Report"
              'onhand-wip-report
              "Generate an onhand Work In Progress Report")
             ("Safety Stock Usage Report"
              'determine-safety-stock-used
              "Generate a Safety Stock Usage Report")
             ("Highlight Trays From WIP"
              'TRAYS-FROM-WIP
              "Show User Trays Coming from WIP"
              (SUBITEMS ("Highlight"
                         'Highlight-WIP-Trays
                         "Highlight Trays Coming From WIP")
                        ("Lowlight"
                         'Lowlight-WIP-Trays
                         "Lowlight Trays Coming From WIP")))
             ("Highlight Late Trays"
              'LATE-ASSEMBLY-TRAYS
              "Show User Late Assembly Trays"
              (SUBITEMS ("Highlight"
                         'Highlight-Late-Trays
                         "Highlight Late Assembly Trays")
                        ("Lowlight"
                         'Lowlight-Late-Trays
                         "Lowlight Late Assembly Trays"))))))

(defun machine-util-report ()
  "The following function is used to generate a Machine Utilization Report.  The machine
  utilization report consists of the following fields for each machine:
   0-  Machine ID.
   1-  Total number of hours a machine is scheduled for (horizon end - build context).
   2-  Total planned downtime (hours).
   3-  Total unplanned downtime (PM's and downtime specified by the FCS (hours).
   4-  Available time to perform events (1 - (2 + 3)) (hours).
   5-  Total setup time between build context and end of horizon (hours).
   6-  Total process time between build context and end of horizon (hours).
   7-  Total idle time (4 - (5 + 6)).
   8-  Number of setups between build context and end of horizon.
   9-  Number of processes between build context and end of horizon.
   10- Number of unplanned downtimes (PM's and downtime specified by the FCS.
```

```
        11- Machine utilization ((6 / 4) * 100).
        12- Percentage of setup time to process time (5 / (5 + 6) * 100)."
      (make-report-output-window nil)
      (let* ((machine-classes-list (unit.children 'machines 'subclass))
             (report-window (get.value *control-unit* 'report-output-window))
             (horizon-end (get.value *control-unit* 'horizon-end))
             (build-context-time (get.value *control-unit* 'build-context-time)))
        (expose report-window)
     (write-title report-window " Machine  Utilization  Report  (Time in hours)")

     (format report-window "
Machine       Total   Planned   Unplanned   Net-Hrs   Setup   Process   Idle   Number  Number  N
umber  Machine  Setup:Proc-
Id            Hours   Downtime  Downtime    Avail-    Time    Time      Time   Setups  Proc-   D
untmes  Util- %   Percentage
  ")

     (loop for machine-type in machine-classes-list     do
         (loop for machine in (sort (loop for unit in  (unit.children machine-type 'member)
                                    collect (unit.name unit))
                               #'string-lessp) do
            (calculate-mach-util machine horizon-end build-context-time)))))


(defun calculate-mach-util (machine horizon-end build-context-time)
  " Function to do calculations for Machine Utilization Report"
  (if (and (equal (get.value machine 'infinite-capacity) 'no)
         (get.value machine 'generate-gantt-machine))
     (let* ((setup-events 0)                      (process-events 0)
            (unplanned-downtime-events 0)         (setup-time 0.0)
            (process-time 0.0)                    (secs-hr 3600.0)
            (idle-time 0.0)                       (utilization 0.0)
            (net-hours-avail 0.0)                 (unplanned-downtime 0.0)
            (planned-downtime 0.0)
            (total-hours (/ (- horizon-end build-context-time) secs-hr))
            (setup-process-ratio 0.0)
            (event (get.value machine 'first-box-on-machine))
            (report-window (get.value *control-unit* 'report-output-window)))
       (expose report-window)
       (loop until (> (kk.get.value (event boxes) 'start-time) build-context-time) do
            (setq event (kk.get.value (event boxes) 'same-machine-successor)))
       (loop while (< (kk.get.value (event boxes) 'end-time) horizon-end) do
            (let* ((start-time (kk.get.value (event boxes) 'start-time))
                   (end-time (kk.get.value (event boxes) 'end-time))
                   (duration (- end-time start-time))
                   (event-type (kk.get.value (event boxes) 'box-type)))
              (cond ((equal event-type 'S)
                     (incf setup-events)
                     (incf setup-time duration))
                    ((or (equal  event-type 'P)
                         (equal  event-type  'X))
                     (incf process-events)
                     (incf process-time duration))
                    ((equal event-type  'U)
                     (incf planned-downtime duration))
                    ((or (equal event-type 'D)
                         (equal event-type 'PM))
                     (incf unplanned-downtime-events)
                     (incf unplanned-downtime duration))
                    ((equal event-type 'E) "This is the last box on the machine")
                    (t (format t
   "ü%This event type, üa, on event üa does not match any type of event know to the report gene
rator-"
                               event-type event))))
            (setq event (kk.get.value (event boxes) 'same-machine-successor)))
       (setq setup-time                  (/ setup-time secs-hr))
       (setq process-time                (/ process-time secs-hr))
       (setq planned-downtime            (/ planned-downtime secs-hr))
```

```
        (setq unplanned-downtime            (/ unplanned-downtime secs-hr))
        (setq net-hours-avail               (- total-hours (+ planned-downtime unplanned-downtime
)))
        (setq idle-time                     (- net-hours-avail (+ process-time setup-time)))
        (if (> net-hours-avail 0.0)
            (setq utilization (* (/ process-time net-hours-avail) 100))
            (setq utilization 100.00))
        (if (> setup-time 0.0)
            (setq setup-process-ratio (* (fquotient setup-time (+ setup-time process-time)) 100)
)
            (setq setup-process-ratio 00.00))
        (format report-window "~% ~14a~5,1f~8,1f~11,1f~11,1f~8,1f~9,1f~10,1f     ~9a~8a~4a~7,1f
~7,1f ~%"
                (get.value machine 'gantt-mach-name)
                total-hours
                planned-downtime
                unplanned-downtime
                net-hours-avail
                setup-time
                process-time
                idle-time
                setup-events
                process-events
                unplanned-downtime-events
                utilization
                setup-process-ratio))))


(defun cell-activity-report ()
  "The following top-level report function asks the user for : cut-off date - all cell activitie
s with a date greater
                                                                                than the cut-off d
ate are NOT reported on-
                                                                   printer and/or screen - specifies
 where the output will go-

   The file read (input) is specified by:  data-directory;CELLACTV-DAT
   The report output file is specified by: data-directory;CELLACTV-REP   "
  (unitmsg *control-unit* 'make-report-output-window!)
  (when *commit-dir*
  (let* ((input-file "lm:ess-fcsdata-out;cellactv.lisp")
         (report-title "Cell Activity Report")
         (output-to-screen t)
         (output-to-printer nil)
         (output-window (get.value *control-unit* 'report-output-window))
         (default-cutoff 24)
         (number-of-copies 1)
         (bc-time (get.value *control-unit* 'build-context-time))
         (end-menu-flag nil))
    (declare (special report-title output-to-screen output-to-printer default-cutoff number-of-c
opies ))
    (setq end-menu-flag
          ;; set end-menu-flag to whatever the throw and catch returns
          (catch 'end-menu
            ;; The following section of code displays the user menu
            (tv:choose-variable-values
              '((report-title "Report title"
                              :documentation "Left click on this field to change the title of th
e report-"
                              :any)
                (default-cutoff   "Cut-off time (hours from build-context time)"
                                   :documentation
                  "Cell Activities with a build date later than Build Context + this number of h
ours will not be reported-"
                  :number)
                (output-to-screen  "Print to Screen"     :boolean
                                   :documentation "Yes to view the report on the screen-")
                (output-to-printer "Route to Printer"  :boolean
                                   :documentation "Yes to route the report to the printer-")
                (number-of-copies    "Number of copies to be printed"
```

```
                      :number
                      :documentation "Select the number of copies you would like to
print-"))
       :width 45
       :Label '(:font fonts:hl12bi
                 :string "Generate a Cell Activity Report")
       :margin-choices '(("Abort" (throw 'end-menu 'aborted))))))
 ;  First, handle the hard report
 (cond ((and (not (eq end-menu-flag 'aborted))
        output-to-printer)
     (ticl:print-stream
      (make-string-input-stream
       (with-output-to-string (printer-stream)
        (do ((i 0 (+ i 1)))
            ((eq i number-of-copies))
          (with-open-file (input-stream input-file)
            (read-line input-stream)                                     ;;; Strip off
 the header and print out
            (if (eq i 0)
              (format printer-stream
                "Cell Name  Operation Name        Quantity    Start Time
   Early Start TimeÜ%")
              (format printer-stream
                "Ü%Cell Name  Operation Name        Quantity    Start Time
    Early Start TimeÜ%"))
            (loop for record = (concat (read-line input-stream nil 'EOF) (read-line i
nput-stream nil 'EOF))
                  until (equal (subseq record 0 3) "EOF") do
                  (let ((cell-name (subseq record 12 19))
                        (operation-name (subseq record 20 39))
                        (quantity (subseq record 99 107))
                        (start-time (subseq record 40 63))
                        (early-start-time (subseq record 64 87)))
                    (cond ((<= (string-to-utime start-time) (+ bc-time (* 3600 defaul
t-cutoff)))
                          (format printer-stream "Ü%Üa    Üa    Üa    Üa    Üa"
                                  cell-name operation-name quantity start-time early
-start-time))))))))))))
     ;;  Now we can handle the reporting to the screen
 (cond ((and (not (eq end-menu-flag 'aborted))
        output-to-screen 'yes)
     (with-open-file (input-stream input-file)
       (read-line input-stream)                                          ;;; Strip off
the header and print out
       (openw output-window)                                             ;;; a title bl
ock
       (clearw output-window)
        (write-title output-window (string report-title))
        (format output-window
               "Cell Name  Operation Name        Quantity    Start Time
Early Start TimeÜ%")
       (loop for record = (concat (read-line input-stream nil 'EOF) (read-line input-str
eam nil 'EOF))
             until (equal (subseq record 0 3) "EOF") do
             (let ((cell-name (subseq record 12 19))
                   (operation-name (subseq record 20 39))
                   (quantity (subseq record 99 107))
                   (start-time (subseq record 40 63))
                   (early-start-time (subseq record 64 87)))
               (cond ((<= (string-to-utime start-time) (+ bc-time (* 3600 default-cutoff
)))
                     (format output-window "Ü%Üa    Üa    Üa    Üa    Üa"
                             cell-name operation-name quantity start-time early-start-t
ime)
                     ))))
       (format output-window
              "Ü2%--------------------------------------  End of Report  --------------
--------------------"))))))
```

```
(defun determine-makespans ( )
  " Function to calculate average makespan for each part "
  (let* ((output-window (get.value *control-unit* 'msg-output-window))
         (secs-hr 3600)
         (part-count 0)
         (part-time 0)
         (trays (loop for tray in (get-trays-in-system) ;xxx???yyycrj
                       collect (list (unit.name tray) (get.value tray 'part-id))))
         (sorted-trays (sort trays #'(lambda (a b) (string< (second a) (second b)))))
         tray part-id)
    (clear output-window) ;;Changed to user level function crj 4/18/89
    (loop for entry in sorted-trays do
          (setq tray (first entry))
          (if (get.value tray 'final-box)
              (cond ((equal 'customer (kk.get.value ((get.value tray 'final-box) boxes) 'order-t
ype))  ;; tray is not a spare
                     (cond ((equal part-id (get.value tray 'part-id))
                            (setq part-count (+ part-count 1))
                            (setq part-time (+ part-time (- (kk.get.value ((get.value tray 'fina
l-box) boxes) 'end-time)
                                                            (kk.get.value ((get.value tray 'init
ial-box) boxes) 'start-time)))))
                           (t (if (> part-count 0)
                                  (format output-window "~% Avg makespan for part ~a is ~a hours
" (unit.name part-id)
                                          (round-2 (fquotient (fquotient part-time secs-hr) part
-count))))
                              (setq part-id (get.value tray 'part-id))
                              (setq part-count 1)
                              (setq part-time (- (kk.get.value ((get.value tray 'final-box) boxe
s) 'end-time)
                                                 (kk.get.value ((get.value tray 'initial-box) bo
xes) 'start-time)))))))))
    (if (> part-count 0)
        (format output-window "~% Avg makespan for part ~a is ~a hours" (unit.name part-id)
                (round-2 (fquotient (fquotient part-time secs-hr) part-count))))))

(defun last-event-process-or-setup (final-event)
  (let* ((number-downtimes 0)
         (downtime 0.0)
         (unavailable-time 0.0)
         (last-event-end (get.value final-event 'end-time))
         (event (if (or (equal (get.value final-event 'box-type) 'D)
                        (equal (get.value final-event 'box-type) 'U))
                    final-event)))
    (loop while event  do
          (cond ((equal (kk.get.value (event boxes) 'box-type) 'D)
                 (setq number-downtimes (+ 1 number-downtimes))
                 (setq downtime (+ downtime (- (kk.get.value (event boxes) 'end-time) (kk.get.va
lue (event boxes) 'start-time)))))
                ((equal (kk.get.value (event boxes) 'box-type) 'U)
                 (setq unavailable-time (+ unavailable-time (- (kk.get.value (event boxes) 'end-
time) (kk.get.value (event boxes) 'start-time))))))
          (if (kk.get.value (event boxes) 'same-machine-predecessor)
              (cond ((or (equal (kk.get.value ((kk.get.value (event boxes) 'same-machine-predece
ssor) boxes) 'box-type) 'D)
                         (equal (kk.get.value ((kk.get.value (event boxes) 'same-machine-predece
ssor) boxes) 'box-type) 'U))
                     (setq event (kk.get.value (event boxes) 'same-machine-predecessor)))
                    (t (setq last-event-end (kk.get.value ((kk.get.value (event boxes) 'same-mac
hine-predecessor) boxes) 'end-time))
                       (setq event nil)))
              (setq event nil)))
    (list last-event-end number-downtimes downtime unavailable-time)))

(defun onhand-wip-report ( )
  "Function for generating a WIP Report"
  (unitmsg 'control-unit 'make-report-output-window!)
  (let* ((report-window (get.value 'control-unit 'report-output-window))
         (parts-reported nil))
```

```
    (write-title report-window " Onhand Inventory Report")
    (expose report-window)
    (format report-window "Ü2%
           Operation              Part                 Part Id              Trays Available      Trays A
vailable     Trays Used
                                  Name                                      Before Run           After T
his Run      This RunÜ%")
    (loop for oper in (unit.children 'operations 'member) do
          (setq parts-reported nil)
          (cond ((and (not (equal (unit.name oper) 'SETUP)) )
;;                      (not (equal (unit.name oper) 'ASSEMBLY)))      ;; WHY???  DHO  4-17-89
                  (loop for entry in (get.values oper 'on-hand-wip) do
                        (if (not (member (get.value oper 'part-id) parts-reported))
                            (let* ((part (get.value oper 'part-id))
                                   (original-trays 0)
                                   (ending-trays 0)
                                   (trays-of-this-part-used 0)
                                   (output-part (get.value oper 'data-output-part-code)))
                              (loop for entry in (get.values oper 'initial-on-hand-wip)
                                    do (setq original-trays (+ original-trays (first entry))))
                              (loop for entry in (get.values oper 'on-hand-wip)
                                    do (setq ending-trays (+ ending-trays (first entry))))
                              (setq trays-of-this-part-used (- original-trays ending-trays))
                              (setq parts-reported (cons part parts-reported))
                              (when output-part
                                (format report-window "Ü%      Ü25aÜ12aÜ31aÜ21aÜ18aÜ12a"
                                        (unit.name oper)
                                        part
                                        output-part
;;                                     (get-functional-code oper part)
                                        original-trays
                                        ending-trays
                                        (max 0 trays-of-this-part-used)))))))))))


(defun determine-safety-stock-used ( )
  "Function for generating a Safety Stock Usage Report"
  (unitmsg *control-unit* 'make-report-output-window!)
  (let* ((report-window (get.value *control-unit* 'report-output-window)))
    (write-title report-window " Safety  Stock  Usage  Report")
    (expose report-window)                            ;; added initial safety stock  6-28-89
DHO
    (format report-window "Ü2%
           Operation              Part          Safety Stock   Available      Initial        Trays U
sed   Trays Replenished
                                  Name          Target         Safety Stock   Safety Stock   This Ru
n     This RunÜ%")
    (loop for oper in (unit.children 'operations 'member) do
        (cond ((and (not (equal (unit.name oper) 'SETUP))
                    (not (equal (unit.name oper) 'ASSEMBLY)))
               (loop for entry in (get.values oper 'safety-stock) do
                     (let* ((part (get.value oper 'part-id))
                            (original-trays (loop for entry in (get.values oper 'initial-safet
y-stock)
                                                  do (return (first entry))))
                            (current-trays (first entry))
                            (target-trays (second entry))
                            (trays-of-this-part-used (or (loop for entry in (get.values oper '
safety-stock-used)
                                                              do (return (first entry))) 0))
                            (trays-replenished-this-run (+ (- current-trays original-trays) tr
ays-of-this-part-used)))
                       (when part
                         (format report-window "Ü%         Ü24aÜ18aÜ14aÜ14aÜ14aÜ14aÜ14a"   ;;
 DHO Ü22a (was 16a)  12-12
                                 (unit.name oper)
                                 part
;;                        (get-functional-code (get.value oper 'short-name) part)   ;; DHO u
pdate 1st arg to call  12-12
```

```
                          target-trays
                          current-trays
                          original-trays
                          trays-of-this-part-used
                          trays-replenished-this-run))))))))

(defun report-build-context (stream)
  (let* ((bc-time (get.value *control-unit* 'build-context-time))
         (ft1 (get.value *control-unit* 'frozen-time-1))
         (horizon-end (get.value *control-unit* 'horizon-end))
         (cycle-time-code (get.value *control-unit* 'cycle-time-code))
         (operations (unit.children 'operations 'member))
         (machines (unit.descendants 'machines 'member)))

    (format stream "ü%      ----- BUILD CONTEXT DATA ----- ü%")
    (format stream "Build-context-time: üa  Frozen-time-1: üa  Horizon-end: üa  Cycle-time-code:
üaü%"
            (utime-to-string bc-time) (utime-to-string ft1) (utime-to-string horizon-end)
            cycle-time-code)
    (format stream "ü% --- WIP ---ü%")
    (loop for op in operations do
          (format stream "üa -- üaü%" (unit.name op) (get.values op 'on-hand-wip)))
    (format stream "ü% --- PM DATA ---ü%")
    (loop for m in machines do
          (format stream "üa -- ü%" (unit.name m))
          (loop for item in (get.values m 'SCHEDULED-PM-FREQUENCY) do
                (format stream "  üa  Start: üa  End: üa  Duration: üa  Freq: üaü%"
                        (first item)
                        (utime-to-string (second item))
                        (utime-to-string (third item))
                        (convert-incr-time-to-string (fourth item))
                        (convert-incr-time-to-string (fifth item)))))
    (format stream "ü% --- STARTUP STATUS ---ü%")
    (loop for m in machines do
          (format stream "üa -- ü%" (unit.name m))
          (loop for item in (get.value m 'STARTUP-STATUS) do
                ;;(print item)
                (format stream "  üa üa  Duration/Time rem: üa  Start: üa  Type: üa  Activity-id
: üa  Qty: üaü%"
                        (first item) (second item)
                        (convert-incr-time-to-string (third item))
                        (utime-to-string (fifth item))
                        (sixth item) (seventh item) (eighth item))))
    nil))

(defun report-bridge (stream)
  (let* ((parts (unit.descendants 'parts 'member))
         (operations (unit.children 'operations 'member))
         (machines (unit.descendants 'machines 'member)))

    (format stream "ü%      ----- BRIDGE -- ENGINEERING DATA ----- ü%")
    (format stream "ü% --- ROUTINGS ---ü%")
    (loop for part in parts do
          (format stream "üa -- üaü%" (unit.name part) (unit.names (get.value part 'ROUTING))))
    (format stream "ü% --- MAXIMUM-TRAY-SIZE ---ü%")
    (loop for part in parts do
          (format stream "üa -- üaü%" (unit.name part) (get.value part 'MAXIMUM-TRAY-SIZE)))
    (format stream "ü% --- POSSIBLE-MACHS-CLASS ---ü%")
    (loop for op in operations do
          (format stream "üa -- üaü%" (unit.name op) (get.value op 'POSSIBLE-MACHS-CLASS)))
    (format stream "ü% --- PREFERRED-MACHINES ---ü%")
    (loop for op in operations do
          (format stream "üa -- üaü%" (unit.name op) (get.value op 'PREFERRED-MACHINES)))
    (format stream "ü% --- CYCLE-TIME ---ü%")
    (loop for op in operations do
          (format stream "üa -- üaü%" (unit.name op) (get.value op 'CYCLE-TIME)))
    (format stream "ü% --- AGV-MOVE-TIME ---ü%")
    (loop for m in machines do
          (format stream "üa -- üaü%" (unit.name m) (get.value m 'AGV-MOVE-TIME)))

    nil))
```

```
(defun unit.names (l)
  (loop for u in l collect
        (if (unitp u) (unit.name u) u)))

;;; -*- Mode:Common-Lisp; Package:KEE; Base:10; Fonts:(cptfont HL10B cptfont HL12B HL12BI) -*-

;; Scheduling Functions as Basis for Expert System Scheduler

;;; questions for Dave:

;;; 1.  adjust-left-box is never called.
;;; 2.  nothing is ever disqualified.
;;; 3.  Comment #1 below - all of tray 1's boxes before any of tray 2.

;;==============================================================================
;;======================   Top Level Scheduling Functions   ======================
;;==============================================================================

;;; ---------------------- BACKSCHEDULE CUSTOMER ORDERS ----------------------
;;; This takes all the trays corresponding to orders and lays down the tray boxes on the chart,
;;; starting from the last box (the latest box) and working backwards.
;;;
;;; 1.  generate-schedule -- For all trays, use ordered-final-boxes to order the final boxes on
the trays.
;;; We want to take the latest tray and schedule it first.  Then call determine-position on each
 final box.
;;; NOTE, however, that determine-position calls itself recursively for each box; thus we lay do
wn the entire set
;;; of boxes for the first tray before starting with any boxes on the second tray.
;;;
;;; 2.  determine-position -- The top-level scheduling function for a process box (and recursive
ly, predecessors).
;;; First,  call Determine-Machine-For-This-Process to get the best position for this box
;;; Second, we implement the best alternative by calling Implement-Alternative.
;;; Third, we recurse on the box's tray predecessors, either by calling Determine-Position direc
tly,
;;; or for assemblies, by calling Process-Assembly-Box-Predecessors, which calls Determine-Posit
ion on each
;;; of the predecessors, possibly allowing for staggered arrival of a part's trays at assembly.
;;;
;;; 3.  determine-machine-for-this-process -- This determines what machines to use, and then cal
ls generate-alternatives
;;; to determine which machine and where to put the box.
;;;
;;; 4.  generate-alternatives -- This set of functions has all the heuristics for how to lay dow
n boxes.
;;; This creates a set of "alternatives" for a box, where an alternative is a possible location
for the box.
;;; For each alternative, it calls suggest-alternative, which compares the new alternative to th
e previous
;;; "best" alternative, and chooses 1 of them to be the new best alternative.
;;;
;;; In more detail:   For each machine in the primary-machines:
;;;  a.  Get all the "process pockets" - the pockets between P boxes (or E or X boxes).
;;;  b.  For each pocket:
;;;    i.   See if the P and optional S boxes will fit by calling fit-box-p.
;;;    ii.  If ok, create an alternative.
;;;    iii. Try to disqualify the alternative based on percent of fit etc.
;;;    iv.  Compare this alternative against the current best-alternative, and choose 1 to be the
 next best-alternative.
;;;
;;; NOTE - ALL OF THE HEURISTICS are in the generate-alternatives functions and the suggest-alte
rnative function.
;;; These compare alternatives based on expert-specific heuristics.  The low-level function fit-
b
ox-p should not
;;; have any heuristics; it just does the mechanical work of determining if a P box with its set
ups will fit.
;;;
;;; 5.  implement-alternative -- This actually places the box.  It also takes care of setup boxe
s required.
```

```
;;; It calls adjust-left (if necessary) to squeeze a box in.
;;;
;;; 6.  adjust-left -- This slides boxes to the left, jumping over immovable boxes.
;;;
;;; ---------------------------------------------------------------------------

(defvar *alternatives* nil)  ; A cached variable for the unit 'ALTERNATIVES.

(defun fix-alts ()
  (let* ((l '(
              box box-before-box box-after-left-setup box-after-right-setup left-box left-setup-
duration left-start-time
              machine
              machine-primary-p
              net-setup-duration
              process-start-time
              process-duration
              right-setup-duration
              right-start-time

              percent-from-desired-end-time
              setup-box-to-delete

              reschedule-setup rescheduled)))
    (loop for u in (unit.descendants 'alternatives 'member) do (delete.unit u))
    (loop for slot in (unit.slots 'alternatives 'member) do
          (delete.slot 'alternatives (slot.name slot) nil 'member))
    (loop for slotname in l do
          (create.slot 'alternatives slotname 'member))
    (put.values 'alternatives 'local.compact.unit.slotnames l)))


(defun generate-schedule ()
  "This function calls the DETERMINE-POSITION function with the final assembly process boxes (re
trieved from the final trays).
   DETERMINE-POSITION will in turn recursively step backward in the process chain assigning proc
ess boxes to machines"
  (setq *alternatives* (unit 'alternatives))
  (setq *events* 0)  ;; 081789
  (loop for box in (ordered-final-boxes 'assembly-trays) do
        (let* ((tray-on-box (kk.get.value (box boxes) 'TRAY))
               (due-date (kk.get.value (tray-on-box trays-in-system) 'DUE-DATE)))
          (determine-position box due-date))))

(defun ordered-final-boxes (tray-types)
  "This function will first find all the assembly trays in the system.
     Then it will return the process boxes for these trays sorted by due date and part type.
    (i.e. trays with later due dates or trays which pass through the bottleneck should be schedu
led first -  appearing earlier in the returned list)"
  (let* ((all-trays (get-trays-in-system tray-types))
         (final-boxes (loop for tray in all-trays
                            for value = (kk.get.value (tray trays-in-system) 'FINAL-BOX)
                            when value
                            ;;  only get trays that need to be scheduled
                            unless (kk.get.value (value boxes) 'from-previous-schedule)
                            collect
                            ;; collect:  (list tray due-date numeric-tray-code)
                            (list value
                                  (kk.get.value (tray trays-in-system) 'DUE-DATE)
                                  (or (kk.get.value (tray trays-in-system) 'NUMERIC-TRAY-CODE) 0
)))))
    ;; Now sort the boxes by their due dates and part type and return the boxes.  New sort added
 to sort on
    ;; due date as primary field and part type (numeric code) as secondary field.
    (loop for box-record in (sort final-boxes #'sort-by-due-date-and-numeric-tray-code)
          collect (first box-record))))


;;===========================================================================================
;;=====================    CORE SCHEDULING FUNCTIONS    ========================
;;===========================================================================================
```

```
(defun determine-position (box desired-end-time)
  "The top-level scheduling function for a process box (and recursively, predecessors).  We adh
ere to synchronicity.
   Positioning is accomplished in the following way:
   1.  Call Determine-Machine-For-This-Process to get the best position for this box.
   2.  Implement the best alternative by calling Implement-Alternative.
   3.  Recurse on the box's tray predecessors, either by calling Determine-Position directly, o
r for assemblies, by
       calling Process-Assembly-Box-Predecessors, which calls  Determine-Position on each of th
e predecessors, possibly
     . allowing for staggered arrival of a part's trays at assembly."
  (let* ((best-alternative nil)
        (part (kk.get.value ((kk.get.value (box boxes) 'TRAY) trays-in-system) 'PART-ID))
        (part-unit (unit part)))
    (kk.put.value (box boxes) 'DESIRED-END-TIME desired-end-time)
    (setq best-alternative (determine-machine-for-this-process box))    ; find the best time slo
t on a machine
    (when best-alternative
      (implement-alternative best-alternative box)
      (cond ((or (member part-unit (unit.children 'assemblies 'member))          ;; run-time-c
onstant
                 (member part-unit (unit.children 'sub-assemblies 'member)))        ;; run-time-
constant
             (process-assembly-box-predecessors box))
            ((and (kk.get.value (box boxes) 'SAME-TRAY-PREDECESSOR)
                  (not (equal (kk.get.value ((kk.get.value (box boxes) 'SAME-TRAY-PREDECESSOR) b
oxes) 'INVENTORY) ;;austral
                              'ASSIGNED)))
             (determine-position (kk.get.value (box boxes) 'SAME-TRAY-PREDECESSOR)
                                 (kk.get.value (box boxes) 'START-TIME))))))


(defun process-assembly-box-predecessors (assembly-box)
  "Schedule each component box of this assembly box, with appropriate lags in the arrivals of mu
ltiple trays of the same component part"
  (let* ((assembly-start-time (kk.get.value (assembly-box boxes) 'START-TIME))
         (assembly-end-time (kk.get.value (assembly-box boxes) 'END-TIME))
         (assembly-duration (when assembly-start-time
                              (- assembly-end-time assembly-start-time))))

    (loop for component-box in (kk.get.values (assembly-box boxes) 'SAME-TRAY-PREDECESSOR)
          do
          (let* ((component-tray (kk.get.value (component-box boxes) 'TRAY))
                 (offset-fraction (or (second (kk.get.value (component-tray trays-in-system) 'AS
SEMBLY-TRAY))
                                      0))
                 desired-end-time)
            (if (or (not offset-fraction)
                    (equal 0.0 offset-fraction))
                (setq offset-fraction 0))
            (setq desired-end-time (when assembly-start-time      ;; don't set in LET because o
f floating point cases  DHO
                                     (+ assembly-start-time (* assembly-duration offset-fraction
))))
            (determine-position component-box desired-end-time)))))


(defun determine-machine-for-this-process (box)
  "This determines what machines to use, and then calls generate-alternatives to determine which
 machine and where to put the box."
  (let* ((operation (kk.get.value (box boxes) 'OPERATION))
         (machine-class (get.value operation 'POSSIBLE-MACHE-CLASS))
         primary-machines machine
         (possible-machines (dolist (entry (get.values operation 'ELIGIBLE-MACHINES))
                              (dotimes (number-machines (1+ (first entry))) ;;; xxx why do we ad
d 1???
                                (setq primary-machines (append primary-machines
                                                               (list (nth (+ 1 number-machines)
entry)))))
                              (return (cdr entry))))
```

```
        alternative)
  (when (not primary-machines)
     (format T"~%% No primary machines for box ~a" box)
     (break))

   (when (not possible-machines)
     (format t "~%% No preferred machines for part ~a and operation ~a "
             (unit.name (kk.get.value ((kk.get.value (box boxes) 'TRAY) trays-in-system) 'PART-
ID)) ;CPJ get.value => kk.get.value 4/17/89
             (unit.name (kk.get.value (box boxes) 'OPERATION)))
     (setq possible-machines (unit.children machine-class 'member))
     (setq primary-machines possible-machines))

   (setq machine (first primary-machines))
   (alternatives-recycle-alternatives)

   (loop until (setq alternative (get.value 'alternatives 'BEST-ALTERNATIVE))
         for window-increment from 1 do
         (generate-alternatives  primary-machines window-increment possible-machines box)
         ;;  check to see if downtime is causing a problem with scheduling a part to be dedicat
ed.  If so undedicate and schedule      12/04/87
         (when (and (= window-increment (get.value machine-class 'MAX-WINDOW-INCREMENTS-FOR-DED
ICATION))
                    (equal (get.value machine-class 'RUN-WITH-DEDICATED-MACHINES) 'yes)
                    (null (get.value 'alternatives 'BEST-ALTERNATIVE))
                    (downtime-in-window box machine-class machine window-increment))
           (put.value machine-class 'RUN-WITH-DEDICATED-MACHINES 'no)
           (determine-machine-for-this-process box)
           (put.value machine-class 'RUN-WITH-DEDICATED-MACHINES 'yes)))
   alternative))

(defun downtime-in-window (box machine-class machine window-increment)
  ;;; ?Dave - what does this do?  What are its results?
  (let* ((desired-end-time (kk.get.value (box boxes) 'desired-end-time)) ;; austral
         (process-duration (get-process-duration machine box))
         (machines-to-batch (kk.get.value ((kk.get.value (box boxes) 'tray) trays-in-system) 'ma
chines-to-batch)) ;; austral
         (window-span (if (member (unit machine-class) machines-to-batch)
                          (get.value machine 'window-span-for-batching)
                          (get.value machine 'window-span)))
         (window-start (- desired-end-time (* window-increment process-duration window-span)))
         (this-box (get.value machine 'first-box-on-machine))
         done)
    (loop until done                              ; Loop through the boxes until we're beyond the
window's end
          do                                      ;  or have found a downtime event in the specifi
ed range
          (let* ((start-time (kk.get.value (this-box boxes) 'START-TIME))
                 (end-time   (kk.get.value (this-box boxes) 'END-TIME)))
            (cond ((or (and (memq (kk.get.value (this-box boxes) 'box-type) '(d u))
                            (or (and (<= start-time desired-end-time)
                                     (>= end-time desired-end-time))
                                (and (<= start-time window-start)
                                     (>= end-time window-start))
                                (and (>= start-time window-start)
                                     (<= end-time desired-end-time))))
                       (>= start-time desired-end-time))
                   (setq done t))
                  (t (setq this-box (kk.get.value (this-box boxes) 'same-machine-successor))
                     (if (not this-box)
                         (setq done t))))))))

(defun generate-alternatives (primary-machines window-increment machine-list box)
  "This function will generate alternatives which may include more than one time pocket record f
or a machine.
   Alternatives include the following information:  Machine, times to start and durations, etc.
 (See below).
   This function will generate alternatives containing the machine,  how many setups are require
d for the current operation,
 and the latest possible time the machine is available for the percentage of chunk of time spec
ified."
```

```
  (let* ((tray (kk.get.value (box boxes) 'TRAY))   ;;; austral - all this fn
         (operation (kk.get.value (box boxes) 'operation))
         (machines-to-batch (kk.get.value (tray trays-in-system) 'MACHINES-TO-BATCH))
         (same-tray-successor (kk.get.value (box boxes) 'SAME-TRAY-SUCCESSOR)))

    (loop for machine in machine-list do
          (let* ((process-duration (get-process-duration machine box))
                 (total-possible-duration (get.value operation 'max-batching-add2))
                 (desired-end-time   ; Get the latest time this box can end, based on AGV and LE
AD to same-tray-successor.
                   (- (kk.get.value (box boxes) 'DESIRED-END-TIME)
                      (if (not same-tray-successor)
                          0
                          ;; else
                          (+ (or (get-agv-time machine (kk.get.value (same-tray-successor boxes)
 'MACHINE) tray)
                                 0)
                             (retrieve-process-times tray (kk.get.value (box boxes) 'OPERATION)
                                                     machine 'LEAD-TIME)))))
                 (machine-class (car (unit.parents machine 'member)))
                 (cycle (get.value machine 'CYCLES))
                 (box-batchable-p (member machine-class machines-to-batch))      ; Is this box ba
tchable on this machine?
                 (window-span (if box-batchable-p
                                  (get.value machine 'WINDOW-SPAN-FOR-BATCHING)
                                  (get.value machine 'WINDOW-SPAN)))

                 ;;;  next two lines have total-possible-duration replacing process-duration   D
HO  12-14
                 (window-start (- desired-end-time (* window-increment total-possible-duration w
indow-span)))
                 (window-end (+ (* window-span total-possible-duration) window-start))
                 (required-percentage-of-fit (get.value machine-class 'PERCENTAGE-OF-FIT)))
            (loop for pocket in (nreverse (process-pockets-in-range machine window-start window-
end box-batchable-p)) do
                  ;; added nreverse 3/6/89 cliff nnn
                  (generate-alternatives-2 'RIGHT pocket box machine box-batchable-p process-dur
ation cycle
                                           nil desired-end-time required-percentage-of-fit primary
-machines nil))))))

(defun generate-alternatives-forward (primary-machines window-increment machine-list box safety-
stock)
  "This function will generate alternatives which may include more than one time pocket record f
or a machine.
   Alternatives include the following information:  Machine, times to start and durations, etc.
 (See below).
   This function will generate alternatives containing the machine,  how many setups are require
d for the current operation,
  and the latest possible time the machine is available for the percentage of chunk of time spec
ified."

  (let* ((tray (kk.get.value (box boxes) 'TRAY))  ;;; austral -- this fn too.
         (operation (kk.get.value (box boxes) 'operation))    ;; added for batching logic to avo
id infinite loop  DHO  12-14
                                                               ; get.value => kk.get.value CRJ 4/17/
89
         (machines-to-batch (kk.get.value (tray trays-in-system) 'MACHINES-TO-BATCH))
         (same-tray-predecessor (kk.get.value (box boxes) 'SAME-TRAY-PREDECESSOR))
        ;; changed line below to infinity per ken - wants to schedule safety stock beyond end o
f horizon  DHO   3-3-89
         (due-date (cond (safety-stock  *plus-infinity*)
;;                        (get.value *control-unit* 'HORIZON-END))      ;;; 777 need these few l
ines
                        ((equal 'CUSTOMER (kk.get.value (box boxes) 'ORDER-TYPE)) *plus-infinit
y*)
                        (t (kk.get.value (tray trays-in-system) 'DUE-DATE))))
         (early-window-end *plus-infinity*)                                        ;;; 777
         (left-process-box (previous-process-box (kk.get.value (box boxes) 'SAME-MACHINE-SUCCESS
OR)))) ;;; 777
```

```
  (loop for machine in machine-list do
       (let* ((process-duration (get-process-duration machine box))
              (total-possible-duration (get.value operation 'MAX-BATCHING-ADD2))      ;; see
above comment  DHO  12-14
              (projected-setup-time (get-setup-time left-process-box box machine))     ;;; 77
7
              (desired-start-time
;;; 777
                (+ (max (kk.get.value (box boxes) 'DESIRED-START-TIME) ;;; nnn
                        (+ (get.value machine 'FROZEN-TIME-2) projected-setup-time))
                   (cond (same-tray-predecessor
                          (+ (get-agv-time machine (kk.get.value (same-tray-predecessor boxes
   'MACHINE))
                             (retrieve-process-times tray (kk.get.value (same-tray-predecess.i
r boxes) 'OPERATION)
                                                     (kk.get.value (same-tray-predecessor boxes
)  machine) 'LEAD-TIME)))
                         (t 0))))
              (desired-end-time (or (kk.get.value (box boxes) 'DESIRED-END-TIME) *plus-infini
ty*)) ;;; nnn

              (machine-class (car (unit.parents machine 'MEMBER)))
              (cycle (get.value machine 'CYCLES))
              (box-batchable-p (member machine-class machines-to-batch))      ; Is this box ba
tchable on this machine?
              (window-span (if box-batchable-p
                               (get.value machine 'WINDOW-SPAN-FOR-BATCHING)
                               (get.value machine 'WINDOW-SPAN)))
              (window-end (min desired-end-time
                               (+ desired-start-time (* window-increment total-possible-durat
ion window-span))))
              (window-start (max desired-start-time (- window-end (* window-span process-dura
tion))))
              (required-percentage-of-fit 100)) ;;; nnn xxx (get.value machine-class 'PERCENT
AGE-OF-FIT)))
          (when (< window-end early-window-end)
;;; 777
            (setq early-window-end window-end))
          (loop for pocket in (process-pockets-in-range machine window-start window-end box-ba
tchable-p) do
                (generate-alternatives-2 'LEFT pocket box machine box-batchable-p process-dura
tion cycle
                                         desired-start-time due-date required-percentage-of-fit
primary-machines
                                         'not-2-setups))))
    ;;  three lines below - probably not needed anymore per safety stock change of scheduling be
yond end of horizon
     ;;  but keep the code here in case ken changes his mind as we need to reimplement       DHO
      3-3-89
;;    (if (and (> early-window-end due-date)                            ;;; 777
;;           (not (get.value 'alternatives 'best-alternative)))
;;       (kk.put.value (tray trays-in-system) 'all-opers-scheduled nil))
    ))

; www

;;----------- The following slots are in each alternative; they are used in implement-alternativ
e.-----------

;
;  box                        ; the box -- to insert between left-box and right-box
;  box-before-box        ; the box to the LEFT of where to put box -- used in insert-box
;  box-after-left-setup ; the box after the left-setup-box -- could be box itself or a U box
;  box-after-right-setup        ; the box after the right-setup-box
;  left-box               ; the box that we may have to adjust-left
;  left-setup-duration  ; the setup-time duration for a setup between the left-box and box, or 0
;  left-start-time       ; the start time of the left-setup-box, or NIL
;  machine               ; machine to put the box on.
;  machine-primary-p    ; This is non-nil if the machine is a primary for this box's operation.
```

```
;  net-setup-duration   ; This is the additional setup-time that this alternative will require.
;  process-start-time   ; THE ANSWER - where to put box
;  process-duration     ; the duration of box
;  right-setup-duration ; the duration for right-setup-box, or 0
;  right-start-time     ; the start time of the setup box to the right, or NIL
;  setup-box-to-delete  ; the previous setup box between left-box and right-box -- delete it
;  percent-from-desired-end-time  ; the percentage (0-100) of the total-duration that is between
 end-time and desired-end-time

;  ;; the following attributes are on the alternative unit, but are not needed here.
;  ;;rescheduled              ; is non-NIL if the alternative moves a box from one machine to
another.
;  ;;reschedule-setup

;; (left-setup-duration left-start-time box-after-left-setup duration start-time box-BEFORE-box
right-setup-duration right-start-time box-after-right-setup)

(defun generate-alternatives-2 (left-or-right pocket box machine box-batchable-p process-duratio
n cycle
                              desired-start-time desired-end-time percent-of-fit primary-machine
s
                              &optional not-2-setups)
  "First, see if the box and any required setups fit in the pocket.
    A pocket looks like:  (left-box right-box) where either or both can be NIL."
  (let* ((left-box (first pocket))
         (right-box (second pocket))
         (results
           (fit-box-p box machine left-box right-box desired-start-time desired-end-time left-or
-right nil percent-of-fit)))
    (when (and results
               (or (not not-2-setups)          ;; We allow 2 setups.
                   (not (first results))       ;; no left setup
                   (not (seventh results))))   ;; no right setup
      ;; Fits, so create an alternative and test some heuristics.
;      (when (and (first results)(second results)(not (= (fifth results)(+ (first results)(secon
d results)))))
;       (print "left setup not abut")
;       (break))
;;;     (when (and (seventh results)(eighth results)        ;;  comment out this message to get
 around infinite loop    DHO  . 3-3-89
;;;                (not (= (get.value right-box 'start-time)(+ (seventh results)(eighth results))))
;;
;;;     (print (list "right setup not abut" right-box))
;;;     (break))

      (generate-alternatives-3 left-or-right results left-box right-box box machine box-batchabl
e-p process-duration cycle
                              desired-start-time desired-end-time primary-machines))))

(defun generate-alternatives-3 (left-or-right results left-box right-box box machine box-batchab
le-p process-duration cycle
                              desired-start-time desired-end-time primary-machines)
  "Create and fill an alternative."
  (let* ((left-setup-duration (or (first results) 0))
         (right-setup-duration (or (seventh results) 0))
         (start-time (fifth results))
         (setup-box-to-delete (let* ((maybe-old-setup-box (previous-setup-or-process-box right-b
ox))) ;; 1/19/89
                              (when (and maybe-old-setup-box
                                         (not (eq right-box box))  ;; Dont delete our own setu
p
box.  8/15/89 bf
                                         (eq 'S (kk.get.value (maybe-old-setup-box boxes) 'BOX
-TYPE)))
                              maybe-old-setup-box)))
        (old-setup-time (or (when setup-box-to-delete (box-duration setup-box-to-delete))
                            0))
        (alternative (alternatives-get-alternative)))
```

```
(kk.put.value (alternative alternatives) 'box box)
(kk.put.value (alternative alternatives) 'box-before-box (sixth results))
(kk.put.value (alternative alternatives) 'box-after-left-setup (third results))
(kk.put.value (alternative alternatives) 'box-after-right-setup (ninth results))
(kk.put.value (alternative alternatives) 'left-box left-box)
(kk.put.value (alternative alternatives) 'left-or-right left-or-right)
(kk.put.value (alternative alternatives) 'left-setup-duration left-setup-duration)
(kk.put.value (alternative alternatives) 'left-start-time (second results))
(kk.put.value (alternative alternatives) 'machine machine)
(kk.put.value (alternative alternatives) 'machine-primary-p (member machine primary-machines
))
(kk.put.value (alternative alternatives) 'net-setup-duration (- (+ left-setup-duration right
-setup-duration)
                                                    old-setup-time))
(kk.put.value (alternative alternatives) 'process-start-time start-time)
(kk.put.value (alternative alternatives) 'process-duration process-duration)
(kk.put.value (alternative alternatives) 'right-setup-duration right-setup-duration)
(kk.put.value (alternative alternatives) 'right-start-time (eighth results))
(kk.put.value (alternative alternatives) 'setup-box-to-delete setup-box-to-delete)

(let* ((process-end-time (+ start-time process-duration))
       (total-duration (+ left-setup-duration process-duration right-setup-duration))
       (right-batchable-p (when (eq 'P (kk.get.value (right-box boxes) 'BOX-TYPE)) (batchabl
e-p right-box machine))))
  ;;(when cycle ;;; xxx delete? yyy
  ;;(setq desired-end-time (- (second pocket) (* cycle (ceiling (fquotient (- (second pocket
) desired-end-time)
  ;;(max 1 cycle)))))))

  (generate-alternatives-4 left-or-right alternative box left-box right-box process-end-time
 total-duration
                           right-batchable-p desired-start-time desired-end-time
                           box-batchable-p))))

(defun generate-alternatives-4 (left-or-right alternative box left-box right-box process-end-tim
e total-duration
                                right-batchable-p desired-start-time desired-end-time box-batchabl
e-p)
  "Test out some heuristics to see if we should disqualify this alternative."
  "NOTE -- HERE ARE SOME HEURISTICS."
  ;; total-duration      ; = left-setup-duration + process-duration + right-setup-duration
  ;; right-batchable-p   ; set to T if the following box is batchable

  (let* ((disqualified nil)
         (right-setup-duration (kk.get.value (alternative alternatives) 'RIGHT-SETUP-DURATION))
         (process-duration (kk.get.value (alternative alternatives) 'PROCESS-DURATION))
         (process-start-time (kk.get.value (alternative alternatives) 'PROCESS-START-TIME))
         (left-start-time (kk.get.value (alternative alternatives) 'LEFT-START-TIME))
         (right-start-time (kk.get.value (alternative alternatives) 'RIGHT-START-TIME))
         (start-time (kk.get.value (alternative alternatives) 'PROCESS-START-TIME))

         ;; There is some question if right-setup-duration s/b included in the percent-of-fit ca
l
culation.
         (percent-of-fit                    ; the percentage (0-100) of the total-duration that fits
 in the pocket  ;;; xxx not used really
           (case left-or-right
             (RIGHT (floor (* 100 (fquotient (+ (-  process-end-time (kk.get.value (left-box box
es) 'END-TIME))
                                                 right-setup-duration)
                                              (max 1 total-duration)))))
             (LEFT  (floor (* 100 (fquotient (+ (- (kk.get.value (right-box boxes) 'START-TIME)
process-start-time) ;;777
                                                 right-setup-duration)
                                              (max 1 total-duration))))))))

    (when (and right-start-time
               (not (zerop right-start-time))
               (< right-start-time (+ process-start-time process-duration)))
      (print 'BUGGGG)
      (break))
```

```
    (kk.put.value (alternative alternatives) 'PERCENT-FROM-DESIRED-END-TIME
                  (case left-or-right
                    (RIGHT (* 100 (fquotient (- desired-end-time process-end-time) (max 1 proces
s-duration))))
                    (LEFT  (* 100 (fquotient (- process-start-time desired-start-time) (max 1 pr
ocess-duration)))))) ;;777

    (when (< start-time *minus-infinity*)  ;; Dont allow before previous schedule.
      (setf disqualified t))

    ;; Here we worry about handling a batchable part/op requiring two setups.  It's ok if two se
tups
    ;; are allowed (it's not batchable), or we needn't do two setups, or the fit is >= 100% even
 with 2 setups.
;;;    (when (and (plusp right-setup-duration)  ; need at least 1 new setup
;;;               box-batchable-p  ; for a batchable part/op
;;;               (< percent-of-fit 100))  ; with less than 100% fit,
;;;      (print "Discarding alt: batchable + setup but not 100% fit")
;;;      (setf disqualified t)) ; disqualify it!
;;;      )


;    (when (and left-start-time right-start-time box-batchable-p)   ;;; 2/3/89 billf
;;      (print "discarding batch box with 2 setups")                         ;; DHO  3-3-89   comme
nted out this -- many printed
;      (setf disqualified t))   ; disqualify it!

;    (when (not disqualified)
;      (when (not (or (>= percent-of-fit required-percent-of-fit)
;                     (and box-batchable-p (same-pvor-p box left-box))
;                     (and right-batchable-p (not (kk.get.value (alternative alternatives) 'RIGHT
-START-TIME)))))
;        (print (list 'percent-of-fit percent-of-fit required-percent-of-fit))
;        (setf disqualified t))) ; disqualify it!

    (if disqualified
        (recycle-alternative alternative)  ; not good, throw it back.
        ;; else send it off to be tested against the current best alternative.
        (alternatives-suggest-alternative alternative))))
(defvar *alt-test* nil) ;; 'gen-broach-1)

(defun implement-alternative (alternative box &optional remove-box)
 ;; (princ (list 'implement (unit.name box))).
  "Implements the selected alternative with respect to box and the current schedul."
  (let* ((machine (kk.get.value (alternative alternatives) 'MACHINE))
         (process-start-time (kk.get.value (alternative alternatives) 'PROCESS-START-TIME))
         (process-duration (kk.get.value (alternative alternatives) 'PROCESS-DURATION))
         (left-start-time (kk.get.value (alternative alternatives) 'LEFT-START-TIME))
         (right-start-time (kk.get.value (alternative alternatives) 'RIGHT-START-TIME))
         (left-box (kk.get.value (alternative alternatives) 'LEFT-BOX))
         (setup-box-to-delete (kk.get.value (alternative alternatives) 'SETUP-BOX-TO-DELETE))
         (box-before-box (kk.get.value (alternative alternatives) 'BOX-BEFORE-BOX))
         (left-setup-duration (kk.get.value (alternative alternatives) 'LEFT-SETUP-DURATION))
         (box-after-left-setup (kk.get.value (alternative alternatives) 'BOX-AFTER-LEFT-SETUP))
         (right-setup-duration (kk.get.value (alternative alternatives) 'RIGHT-SETUP-DURATION))
         (box-after-right-setup (kk.get.value (alternative alternatives) 'BOX-AFTER-RIGHT-SETUP)
)
         (left-or-right (kk.get.value (alternative alternatives) 'LEFT-OR-RIGHT)))

    (when (and left-start-time (minusp left-start-time))
      (print left-start-time)
      (print alternative)
      (break))

    (implement-alternative-aux box machine left-setup-duration left-start-time box-after-left-se
tup
                               process-duration process-start-time box-before-box
                               right-setup-duration right-start-time box-after-right-setup
                               setup-box-to-delete left-box nil left-or-right remove-box)))
```

```
;;  (left-setup-duration left-start-time box-after-left-setup duration start-time box-BEFORE-box
 right-setup-duration right-start-time box-after-right-setup)


(defvar *events* 0)

(defun implement-alternative-aux (box machine left-setup-duration left-start-time box-after-left
-setup
                               process-duration process-start-time box-before-box
                               right-setup-duration right-start-time box-after-right-setup
                               setup-box-to-delete &optional left-box pocket left-or-right remo
ve-box)
;;  (princ (list 'implement (unit.name box) (unit.name machine)))
  ;;    (when (eq (unit.name machine) *ALT-TEST*)  (print 'before) (show-boxes *alt-test* '(U))
(break))
  pocket ; ignore - for debugging.
  (setq *events* (+ *events* 1))

  (when setup-box-to-delete     ; this would occur for a batching operation or Move

    (remove-box setup-box-to-delete)     ; unlink it
    (recycle-box setup-box-to-delete))  ; free it

  (when remove-box
    (remove-box box)     ; unlink it
    (delete-setups-as-required box))  ; and its former setup boxes.

  ;;(setq foobar2 (list (kk.get.value (box boxes) 'start-time) (kk.get.value (box boxes) 'end-ti
me)
  ;;(kk.get.value (box boxes) 'same-machine-predecessor) (kk.get.value (box boxes) 'same-machine
-successor)))

  (kk.put.value (box boxes) 'MACHINE machine)    ; Now we do the actual process box
  (kk.put.value (box boxes) 'START-TIME process-start-time)
  (kk.put.value (box boxes) 'END-TIME (+ process-start-time process-duration))
  (check-insert left-or-right box box-before-box nil)
  (insert-box box box-before-box)

  (when left-start-time      ;; We need a left setup-box.
    (create-setup-box machine (kk.get.value (box boxes) 'OPERATION) (kk.get.value (box boxes) 'T
RAY)
                      left-setup-duration
                      left-start-time
                      box-after-left-setup left-or-right))

  (when right-start-time      ;; We need a right setup-box.
    (let* ((next-process-box (next-process-box box machine)))
      (create-setup-box machine (kk.get.value (next-process-box boxes) 'OPERATION)
                        (kk.get.value (next-process-box boxes) 'TRAY)
                        right-setup-duration
                        right-start-time
                        box-after-right-setup left-or-right)))
;    (when (eq (unit.name machine) *ALT-TEST*)   (print 'after)  (show-boxes *alt-test* '(U)) (b
reak))

  (case left-or-right
    ;;   -bill - next line i added the AND w/ desired-end-time to insure we don't  left shift in
 forward scheduling (no need w/ 100% fits)      DHO     3-3-89
    ;;  i'm not sure i understand the terminology LEFT and RIGHT - looks like you use RIGHT w/ b
achscheduling and LEFT w/ forward ??
    ;;  as we backschedule i think of going to the LEFT and forward scheduling goes to the right
    (RIGHT (when (and left-box (kk.get.value (box boxes) 'desired-end-time)) (adjust-left left-b
ox)))
    (LEFT  (when box-after-right-setup (adjust-right box-after-right-setup (+ right-start-time r
ight-setup-duration))))))
```

```
;    (when (get.value alternative 'RESCHEDULED)        ;; if rescheduling reset pointers
;      (when (get.value alternative 'RESCHEDULE-SETUP)
;       (setq setup-box-to-reschedule (previous-setup-box box)))
;      (remove-box box))
;
;   (when (and (get.value alternative 'RESCHEDULE-SETUP)
;              (equal (get.value machine 'INFINITE-CAPACITY) 'no))
;     (let* ((next-box (next-process-box setup-box-to-reschedule machine)))
;       (reschedule-setup setup-box-to-reschedule next-box next-box)))


(defun create-setup-box (machine operation tray duration start-time box-after-box left-or-right)
  ;; Create a setup box and insert it before box-after-box.

  (let* ((box (get-setup-box operation tray)))
    (kk.put.value (box boxes) 'START-TIME start-time)
    (kk.put.value (box boxes) 'END-TIME (+ start-time duration))
    (kk.put.value (box boxes) 'MACHINE machine)

    (when (or (not (kk.get.value (box-after-box boxes) 'same-machine-successor))
              (not (kk.get.value (box-after-box boxes) 'same-machine-predecessor)))
     (print (list 'badpred box-after-box))
     (break))
   (check-insert left-or-right box nil box-after-box)
   (insert-box box nil box-after-box)
   ;;(check-box box)
   box))

(defun check-insert (left-or-right box before after)
  (unless before (setq before (kk.get.value (after  boxes) 'SAME-MACHINE-PREDECESSOR)))
  (unless after  (setq after  (kk.get.value (before boxes) 'SAME-MACHINE-SUCCESSOR)))
  (let* ((start-time (kk.get.value (box boxes) 'START-TIME))
         (end-time (kk.get.value (box boxes) 'END-TIME))
         (before-end-time (kk.get.value (before boxes) 'END-TIME))
         (after-start-time (kk.get.value (after boxes) 'START-TIME)))
    (when (or (and (not (eq left-or-right 'RIGHT)) (< start-time before-end-time))
              (and (not (eq left-or-right 'LEFT))  (> end-time after-start-time)))
      (print (list "Check-insert - bad boxes:" box before after left-or-right))
      ;(break)
      )))

(defun check-box (box)
  (when (not (or (kk.get.value (box boxes) 'same-machine-predecessor) (kk.get.value (box boxes)
'same-machine-successor)))
    (format T "Bad pred/succ ~a" box)
    (break))
  (when (not (and (kk.get.value (box boxes) 'start-time)(kk.get.value (box boxes) 'end-time)
                  (kk.get.value (box boxes) 'machine)))
    (format T "Bad times ~a" box)
    (break)))

(defun delete-setups-as-required (box)
  " Function called for constraints that pull boxes out and move them.   Objective is to remove
'old' setups (left or right) as required,
    and leave a setup box if needed."
  (unless (memq (kk.get.value (box boxes) 'box-type) '(X P))
    (format T "Bad arg to delete-setups-as-rqd. box: ~a  box-type: ~a~%" box (get.value box 'box
-type)) (break))
  (let* ((machine (kk.get.value (box boxes) 'MACHINE))
         (left-movable-box (previous-setup-or-process-box box))
         (right-movable-box (next-setup-or-process-box box machine))
         (left-setup-box (when (and left-movable-box
                                    (eq 'S (kk.get.value (left-movable-box boxes) 'BOX-TYPE)))
                           left-movable-box))
         (right-setup-box (when (and right-movable-box
                                     (eq 'S (kk.get.value (right-movable-box boxes) 'BOX-TYPE)))
                            right-movable-box))
         (previous-process-box (previous-process-box box))
         (next-process-box (next-process-box box machine))
         (need-a-setup (and previous-process-box next-process-box
```

```
                    (not (same-pvor-p previous-process-box next-process-box))))
        (setup-duration (when need-a-setup (get-setup-time previous-process-box next-process-bo
x machine)))
        (new-setup-box nil))
    (when (or (not setup-duration)(zerop setup-duration))
      (setq need-a-setup nil))

    (cond ((not need-a-setup)             ;; Delete both setup boxes.
           (when left-setup-box
             (remove-box left-setup-box)
             (recycle-box left-setup-box))
           (when right-setup-box
             (remove-box right-setup-box)
             (recycle-box right-setup-box)))

          ;; Else, we still need a setup box.  Which one will we use?
          (right-setup-box                ;; Use the right box
           (when left-setup-box
             (remove-box left-setup-box)
             (recycle-box left-setup-box))
           (setq new-setup-box right-setup-box))
          (left-setup-box                 ;; Use the left box
           (when right-setup-box
             (remove-box right-setup-box)
             (recycle-box right-setup-box))
           (setq new-setup-box left-setup-box))
          (t
           (print "Bug in delete-setups-as-rqd - no setup boxes to use")
           (print (list box left-setup-box right-setup-box previous-process-box next-process-box
machine))
           (break)
           ))

    (when new-setup-box      ;; Fix this box - place it correctly: pointers and times.
      (multiple-value-bind (setup-start-time dummy-box right-box)
          ;;Return multiple values: result-start-time and new-left-box (box which we should inse
rt after)."
          (fit-duration 'RIGHT setup-duration machine previous-process-box next-process-box nil
                        (kk.get.value (next-process-box boxes) 'start-time) '(8) nil)
        (if (not setup-start-time)
            (progn (print "Bug in delete-setups-as-rqd - cant fit setup box") (break))
            ; else ok
           (kk.put.value (new-setup-box boxes) 'START-TIME setup-start-time)
           (kk.put.value (new-setup-box boxes) 'END-TIME (+ setup-duration setup-start-time))
           (remove-box new-setup-box)
           (insert-box new-setup-box nil right-box)))))


    ;;(when  right-setup-box                            ;; added when for right su box - assy not a
lways with setups     DHO     2-20-89
    ;;(kk.put.value (right-setup-box boxes) 'START-TIME
    ;;(- (kk.get.value (right-setup-box boxes) 'END-TIME) setup-duration)))))


;           (kk.put.value (left-setup-box boxes) 'END-TIME
;                         (kk.get.value ((kk.get.value (box boxes) 'SAME-MACHINE-SUCCESSOR) boxes
) 'START-TIME))
;           ;; 6-16 previous line was END-TIME instead of START-TIME.
;           (kk.put.value (left-setup-box boxes) 'START-TIME
;                         (- (kk.get.value (left-setup-box boxes) 'END-TIME) setup-duration)))

;;=========================================================================================
;;=====================     TIME MANAGEMENT FUNCTIONS     =========================
;;=========================================================================================

(defun get-agv-time (source-machine destination-machine &optional info)
  "Returns the time it takes to move a tray from the source to the destination machine."
  (ignore info)
  (or
    (let* ((source-class (first (unit.parents source-machine 'member)))
```

```
        (destination-class (first (unit.parents destination-machine 'member)))
        agv-move-time)
    (loop for entry in (get.values source-class 'AGV-MOVE-TIME) until agv-move-time
          do
          (when (equal destination-class (first entry))
            (setq agv-move-time (second entry))))
    ;;(unless agv-move-time
    ;; (format t"~%% No agv move time for machine ~a and machine ~a info ~a" source-machine des
tination-machine info)))

      agv-move-time)
    0))


(defun get-setup-time (from-box to-box machine)
  "Returns the setup time for the specified machine to convert from processing from-box to proce
ssing to-box.
    Same pvor or null to-box => no setup."
  (if (or (null to-box)
          (not (memq (kk.get.value (to-box boxes) 'BOX-TYPE) '(P X)))) ;;; xxx is this OK, do X'
s have setups?
      0
      ;; else
      (let* ((pvor-1 (get-box-pvor from-box))
             (pvor-2 (get-box-pvor to-box)))
        (if (equal pvor-1 pvor-2) 0
            ;; else
            (let* ((from-part (when pvor-1 (first pvor-1)))
                   (to-part (first pvor-2)))
              (retrieve-setup-times from-part to-part (kk.get.value (to-box boxes) 'OPERATION) m
achine))))))


(defun retrieve-setup-times (from-part to-part operation machine)
  ;;; xxx
  "This function returns setup time for the part-operation
   combination based on previous part processed."
  (let* ((time-table (get.values operation 'setup-times))
         setup-time done)
    (loop for entry in time-table until done do
          (cond ((and (or (equal from-part (first entry))
                          (equal nil (first entry))
                          (and (equal from-part nil) (equal to-part (second entry))))
                      (or (equal to-part (second entry))
                          (equal nil (second entry)))
                      (or (equal machine (third entry))
                          (equal nil (third entry))))
                 (setq done t)
                 (setq setup-time (fourth entry)))))
    (cond ((not done)
           (format t "~%% Setup time table exhausted with no match.  ")
           (format t "Default time of 900 to be used for part ~a and operation ~a" (unit.name to
-part)(unit.name operation))
           (setq setup-time 900)))
    setup-time))

(defun initialize-setup-times ()
  "Code to extract setup times and put into the setup-times slot of the operation"
  (loop for operation in (unit.children 'operations 'member) do
        (when (not (get.value operation 'setup-times))
          (let* ((machine-class (get.value operation 'possible-machs-class)))
            (when machine-class
              (let* ((setup-time (get.value machine-class 'default-setup-time)))
                (add.value operation 'setup-times (list nil nil nil setup-time)))))))))

(defun get-process-duration (machine box)
  "Return the process duration for a box on a machine"
  (retrieve-process-times (kk.get.value (box boxes) 'tray) (kk.get.value (box boxes) 'operation)
machine))
```

```
(defun retrieve-process-times (tray-or-part operation machine &optional get-lead-time arg4)
  (ignore arg4)
  "This function returns a list containing process time and setup time for the part-operation co
mbination"
  (let* ((time-table (get.value operation (if get-lead-time 'LEAD-TIME-FOR-OPERATION 'CYCLE-TIME

         (part-id (unit.name (get.value operation 'PART-ID)))
         (actual-part-count (get.value part-id 'maximum-TRAY-SIZE)))
    (loop do
         (cond ((equal time-table nil)          ;;  Display error message and use default value
s
                (cond (get-lead-time (return 0))
                      (t
                       (format t "~% Process time table exhausted with no match for part ~a." (
unit.name tray-or-part))
                       (format t "  Default times of 30 minutes to be used for part ~a and oper
ation.~a"
                                 part-id (unit.name operation))
                       (return 1800))))
               (t
                (let* ((time-item (first time-table)))
                  (cond ((or (equal machine (first time-item))
                             (not (first time-item)))
                         (cond ((and (not (get.value machine 'CYCLES))
                                     (equal 'no (get.value (get.value operation 'POSSIBLE-MACHE
-CLASS) 'INFINITE-CAPACITY)))
                                (if (not get-lead-time)
                                (return (* actual-part-count (second time-item)))
                                (return (second time-item))))
                               (t (return (second time-item)))))
                        (t
                         (setq time-table (cdr time-table))))))))))

(defun process-pockets-in-range (machine window-start window-end &optional get-batch-pockets-p)
  "Returns a list of process box pairs; or E boxes for the ends of the time spectrum.   The spac
e between them must intersect
    the range window-start to window-end.  The space between them must either be non-zero, or be
 batchable."

  (let* ((done nil)
         (first-box (get.value machine 'FIRST-BOX-ON-MACHINE))
         pocket)

    (cond ((= window-start window-end)
           nil)
          ((eq 'YES (get.value machine 'infinite-capacity))       ;; A process box can go anywhe
re - unconstrained by other P boxes.
           (list (list first-box (get.value machine 'LAST-BOX-ON-MACHINE))))
          (T
          ;; Loop through the boxes until we're beyond the window's end
          ;; Calculate the pocket defined by box and next-box
          (loop for box = first-box
                then (kk.get.value (box boxes) 'SAME-MACHINE-SUCCESSOR)
                until (or (not box)
                          done)
                do
                ;;(print (list 'ok box))
                (setq pocket nil)  ;reinitialize-pocket so the last pocket isn't collected over
 again CRJ 5/8/89
                (when (memq (kk.get.value (box boxes) 'BOX-TYPE) '(P X E))
                  (let* ((next-box (next-xpe-box box machine)) ;; rrr
                         (next-start-time (if next-box (kk.get.value (next-box boxes) 'START-TI
ME) 0))

                         (end-time (kk.get.value (box boxes) 'END-TIME)))
                    (when (eq box next-box)
                      (format T "Bad ptrs found in process-pockets-in-range ~a~%" box) (break))
                    (when (or (not next-box)
                              (< window-end next-start-time))
                      (setq done T))
                    (when (or get-batch-pockets-p
```

```
                    (and (< window-start next-start-time)
                         (< end-time next-start-time)))
               (setq pocket (list box next-box)))))

          when pocket    ;If a pocket exists, collect it
          collect pocket)))))


(defun pockets-in-range (machine window-start window-end &optional get-batch-pockets-p)
  "Returns a list of the free time pockets that fall within the specified window for the machine
, in the form (start-time end-time left-box right-box).
   Pockets that abut, but do not intersect, the window are NOT returned."
  (let* ((box (get.value machine 'FIRST-BOX-ON-MACHINE))
         (infinite-capacity (get.value machine 'infinite-capacity))
         (done nil)
         next-box pocket)

    ;; Loop through the boxes until we're beyond the window's end
    ;; Calculate the pocket defined by box and next-box
    (loop until done
          do
          (setq next-box (kk.get.value (box boxes) 'SAME-MACHINE-SUCCESSOR))

          (when (eq 'yes infinite-capacity)       ; For an infinite capacity, ignore all movable
 boxes.
            (setq box (previous-immovable-box box))  ; This will not loop infinitely because we
set box to next box.
            (setq next-box (next-immovable-box box machine)))

          (setq pocket (calculate-pocket box next-box get-batch-pockets-p))

          (when (or (null next-box)              ;; Are we done?
                    (eq 'E (kk.get.value (next-box boxes) 'BOX-TYPE))  ; found E box
                    (>= (kk.get.value (next-box boxes) 'START-TIME) window-end))  ; past the end
 of the window
            (setq done T))
          (setq box next-box)
         when (and pocket                                        ;If a pocket exists and it's in the wind
ow, collect it
                   (> (second pocket) window-start)
                   (< (first pocket) window-end))
          collect pocket)))

(defun calculate-pocket (left-box right-box get-batch-pockets-p)
  "Calculates the pocket between the left box and the right box. Any or all of the boxes may be
nil.
    Return a list of (left-end right-start left-box right-box).
    If get-batch-pockets-p, then we return pockets of 0 time where the right-box is batchable."
  (cond ((and left-box right-box)                   ; They both exist
         (let ((pocket-start (kk.get.value (left-box boxes) 'END-TIME))
               (pocket-end (kk.get.value (right-box boxes) 'START-TIME)))
           (when  (or (< pocket-start pocket-end)            ;; if overlapping boxes its no pock
et
                      ;;(and get-batch-pockets-p
                      ;;(batchable-p right-box)))
                      )
             (list pocket-start pocket-end left-box right-box))))
        (left-box
         (list (kk.get.value (left-box boxes) 'end-time) *plus-infinity* left-box nil))
        (right-box
         (list *minus-infinity* (kk.get.value (right-box boxes) 'start-time) nil right-box))
        (t (list *minus-infinity* *plus-infinity* nil nil))))

(defun time-between (left-box right-box)
  "Given two boxes (any combination of nils allowed), calculate the free time between them.  Ass
umes that the boxes are ordered in time."
  (let* ((pocket (calculate-pocket left-box right-box nil)))
    (cond (pocket
           (- (second pocket) (first pocket)))
          (t 0))))
```

```
(defun box-duration (box)
  "Returns a box's duration, or 0 if the box is NIL"
  (cond (box
         (- (kk.get.value (box boxes) 'END-TIME)
            (kk.get.value (box boxes) 'START-TIME)))
        (t 0)))


;;=================================================================================
;;===================   Box Manipulation and Shifting Functions   ===================
;;=================================================================================

(defun abutting-setup-box (process-box)
  "Returns a process box's left abutting setup box.  A null box returns nil."
  (when process-box
    (let ((previous-box (kk.get.value (process-box boxes) 'same-machine-predecessor)))
      (when (and previous-box
                 (equal 'S (kk.get.value (previous-box boxes) 'box-type)))
        previous-box))))

(defun next-xps-box (box machine box-types &optional start-with-this-box-p)
  "This is the low-level routine."
  "Returns the next box whose box-type is in box-types."
  (let ((first-box (cond ((null box)
                          (get.value machine 'FIRST-BOX-ON-MACHINE))
                         (start-with-this-box-p box)
                         (t (kk.get.value (box boxes) 'SAME-MACHINE-SUCCESSOR)))))
   (loop for possible = first-box
         then (kk.get.value (possible boxes) 'SAME-MACHINE-SUCCESSOR)
         until (null possible)
         for box-type = (kk.get.value (possible boxes) 'BOX-TYPE)
         when (cond ((eq box-types 'MOVABLE)
                     (movable-p possible))
                    ((eq box-types 'IMMOVABLE)
                     (not (movable-p possible)))
                    (t
                     (memq box-type box-types)))
        return possible)))


(defun next-xpe-box (box machine &optional start-with-this-box-p)
  "Returns the next process (or assembly) box, after this box, on this machine.  If box is null,
 it starts with the first box on the machine."
  (next-xps-box box machine '(X P E) start-with-this-box-p))

(defun next-process-box (box machine &optional start-with-this-box-p)
  "Returns the next process (or assembly) box, after this box, on this machine.  If box is null,
 it starts with the first box on the machine."
  (next-xps-box box machine '(X P) start-with-this-box-p))

(defun next-setup-or-process-box (box machine &optional start-with-this-box-p) ;; 1/19/89
  "Returns the next box on the machine that is movable. If box is null, it starts with the first
 box on the machine."
  (next-xps-box box machine '(X P S) start-with-this-box-p))


(defun next-movable-box (box machine)
  "Returns the next box on the machine that is movable. If box is null, it starts with the first
 box on the machine."
  (next-xps-box box machine 'MOVABLE))

(defun next-immovable-box (box machine)
  "Returns the next immovable box, after this box, on this machine.    If box is null, it starts
 with the first box on the machine."
  (next-xps-box box machine 'IMMOVABLE))

(defun next-scheduled-box (box machine)
  "Returns the next box on the machine that has been scheduled. If box is null, it starts with t
he first box on the machine."
  (let ((first-box (cond ((null box)
```

```
                          (get.value machine 'first-box-on-machine))
                         (t (kk.get.value (box boxes) 'same-machine-successor))))
      box-type)
   (loop for possible = first-box
         then (kk.get.value (possible boxes) 'same-machine-successor)
         until (null possible)
         do (setq box-type (kk.get.value (possible boxes) 'box-type))
         when (and (not (kk.get.value (box boxes) 'from-previous-schedule))
                   (memq box-type '(X P)))
         return possible)))


(defun previous-xsp-box (box box-types)
  "Returns the previous box on this machine whose type is in box-types."
  (when box
    (loop for possible = (kk.get.value (box boxes) 'SAME-MACHINE-PREDECESSOR)
          then (kk.get.value (possible boxes) 'SAME-MACHINE-PREDECESSOR)
          until (null possible)
          for box-type = (kk.get.value (possible boxes) 'BOX-TYPE)
          when (cond ((eq box-types 'MOVABLE)
                      (movable-p possible))
                     ((eq box-types 'IMMOVABLE)
                      (not (movable-p possible)))
                     (t
                      (memq box-type box-types)))
          return possible)))

(defun previous-setup-box (box)
  "Returns the previous setup box on this machine. If box is null, it returns nil."
  (previous-xsp-box box '(S)))

(defun previous-process-box (box)
  "Returns the previous process (or assembly) box, INCLUDING this box, on this machine.    If bo
x is null, it returns nil."
  (previous-xsp-box box '(X P)))

(defun previous-setup-or-process-box (box) ;;; 1/19/89 bf
  "Returns the previous box on the machine that is movable."
  (previous-xsp-box box '(X P S)))

(defun previous-movable-box (box)
  "Returns the previous box on the machine that is movable."
  (previous-xsp-box box 'MOVABLE))

(defun previous-immovable-box (box)
  "Returns the previous immovable box, INCLUDING this box, on this machine. If box is null, it r
eturns nil."
  (when box
    (loop for possible = box
          then (kk.get.value (possible boxes) 'same-machine-predecessor)
          with immovable
          until (null possible)
          do (setq immovable (kk.get.value (possible boxes) 'immovable))
          when immovable
          return possible)))

(defun last-event-from-prev-sched ()
  "Find the last event on each machine from the previous schedule passed back from FCS."
  (let* (last-known-process next-process quit)
    (loop for machine in (unit.descendants 'machines 'member) do
          (setq quit nil)
          (setq last-known-process nil)
          (setq next-process nil)
          (loop for box = (next-movable-box nil machine)
                then (next-movable-box box machine)
                until (or (not box) quit)
                do
                (setq next-process box)
                (if (kk.get.value (box boxes) 'FROM-PREVIOUS-SCHEDULE)
                    (setq last-known-process box)
```

```
                ;; else
                (setq quit t)))
        (when (and last-known-process next-process
                   (not (eq last-known-process next-process)))
          (check-redundant-setups last-known-process next-process)))))

(defun check-redundant-setups (last-process-box box)
  "Check and resolve extra setups on scheduled events that were already setup from prior schedul
e"
  ;;   need to be checking operations and not part id -- caused setups to be erroneously be remo
ved at times     DHO     6-20-89
  (let* ((last-oper (when last-process-box
                      (kk.get.value (last-process-box boxes) 'operation)))
         (next-oper (when box (kk.get.value (box boxes) 'operation))))

    (when (and (eq (kk.get.value (box boxes) 'box-type) 'S)          ;; if setup and same part as
 previous delete the setup box
               (eq last-oper next-oper))
      (remove-box box)
      (recycle-box box))))

;;=====================================================================================
;;==================     PREDICATES AND UTILITY FUNCTIONS    ======================
;;=====================================================================================

(defun sort-by-due-date-and-numeric-tray-code (item1 item2)
  "This function expects two items (both of which
   are lists in the form:
      (process-box due-date numeric-tray-code)
   Sort the list by latest due date and then by numeric-tray-code."
  (if (or (> (second item1) (second item2))
      (and (= (second item1) (second item2))
           (< (third item1) (third item2)))) t))

(defun sort-by-time (item1 item2)
  "This function expects two items (both of which
   are lists in the form: (process-box time purchased-part quantity)
   Sort the list by time in ascending order."
  (if (< (second item1) (second item2))
      t))

(defun sort-by-time-avail (item1 item2)
  "  Sort the list by time in ascending order."
  (if (< (second item1) (second item2))
      t))

(defun get-box-pvor (box)
  "Returns a box's pvor in the form (part-id operation).
   A null box returns nil."
  (when box
    (let* ((tray (kk.get.value (box boxes) 'tray)))
      (when tray
        (list (kk.get.value (tray trays-in-system) 'part-id)
              (kk.get.value (box boxes) 'operation))))))

(defun same-pvor-p (box1 box2)
  "Predicate to test if box1 and box2 have the same pvor.
   Either or both boxes can be nil."
  (equal (get-box-pvor box1) (get-box-pvor box2)))

(defun initialize-time-parameters ()
  "  This function initializes build context time, frozen time 1, end of activity list and
     end of horizon for non-integrated ESS model sites"
  (let* ((five-days (* 5 24 60 60))
      (seven-days (* 7 24 60 60))
      horizon-start)
 (setq horizon-start (get-universal-time))
 (put.value *control-unit* 'build-context-time horizon-start)
 (put.value *control-unit* 'frozen-time-1 horizon-start)
 (put.value *control-unit* 'end-of-activity-list (+ five-days horizon-start))
 (put.value *control-unit* 'horizon-end (+ seven-days horizon-start))))
```

```
;;; ------------------------------- ALTERNATIVES ----------------------------------------

;; The methods for handling alternatives units, and evaluating them.

;;; The unit ALTERNATIVES has the following slots:
;;;
;;; 1.  BEST-ALTERNATIVE - the unit that is the best alternative
;;; 2.  FREE-ALTERNATIVES - alternative units that have been created and are recycled for future
 use.
;;; Either an alternative unit is in the FREE-ALTERNATIVES slot, or it is in use.
;;;


(defun alternatives-delete-all-alternatives (self)
  "Deletes all children and internal references to them. Used before KB save."
  (loop for unit in (unit.children self 'member) do
        (delete.unit unit))
  (loop for slot in '(BEST-ALTERNATIVE FREE-ALTERNATIVES) do
        (remove.all.values self slot)))


(defun alternatives-recycle-alternatives ()
  "Recycle all the alternatives in preparation for a new event to schedule."
  (let* ((self *alternatives*)
         (alternatives (unit.children self 'member)))
    (remove.all.values self 'BEST-ALTERNATIVE)
    (add.values self 'FREE-ALTERNATIVES alternatives)
    (loop for alt in (unit.children self 'member) do
          (kk.remove.all.values (alt alternatives) 'RESCHEDULE-SETUP)
          (kk.remove.all.values (alt alternatives) 'RESCHEDULED))))

(defun alternatives-get-alternative ()
  "Returns an alternative unit, from the free pool or by creation."
  (let* ((self *alternatives*)
         (alternatives (get.values self 'FREE-ALTERNATIVES))   ;;??? Why not (get.value self 'fr
ee-alternatives) CRJ 4/17/89
         (alternative (first alternatives)))
    (cond (alternative
           (put.values self 'FREE-ALTERNATIVES (rest alternatives)) ;;Then (remove.value self al
ternative)
           alternative)
          (t (create.unit (gentemp 'alt-) (unit.kb self) nil self nil nil nil 'compact-unit)))))

(defun recycle-alternative (alt)
  (add.value *alternatives* 'FREE-ALTERNATIVES alt))

(defun alternatives-suggest-alternative (new-alternative)
  "Suggest a new-alternative -- compare it to the best-alternative.  Always favor the best-alter
native."
  "NOTE -- HERE ARE SOME HEURISTICS."
  (let* ((self *alternatives*)
         (best-alternative (get.value self 'BEST-ALTERNATIVE)))

    (or (when (not best-alternative)                           ;; No best-alternative -- make t
he new one the best
          (put.value self 'BEST-ALTERNATIVE new-alternative)
          T)

        ;; If one alt is on the primary-machine and the other is not, discard the not. ;;; xxx l
ooks like a bug if both are non-nil. zzz
        (when (not (equal (kk.get.value (best-alternative alternatives) 'MACHINE-PRIMARY-P)
                          (kk.get.value (new-alternative alternatives) 'MACHINE-PRIMARY-P)))
          (if (kk.get.value (best-alternative alternatives) 'MACHINE-PRIMARY-P)
              (alternatives-discard-alternative self new-alternative)
              ;; else
              (alternatives-discard-alternative self best-alternative)
              (put.value self 'best-alternative new-alternative))
          T)

          ;; Choose one if it is close-enough-to-desired-completion
```

```
      (let* ((close-enough-to-desired-completion-best (close-enough-to-desired-completion best
-alternative))
             (close-enough-to-desired-completion-new  (close-enough-to-desired-completion new-
alternative)))
        (cond (close-enough-to-desired-completion-best
               (when (not close-enough-to-desired-completion-new) ;; xxx why not just discard
it all the time?
                 (alternatives-discard-alternative self new-alternative)
                 T))
              (close-enough-to-desired-completion-new
               (alternatives-discard-alternative self best-alternative)
               (put.value self 'best-alternative new-alternative)
               T)))

      (alternatives-suggest-alternative-aux self best-alternative new-alternative))))


(defun alternatives-suggest-alternative-aux (self best-alternative new-alternative)

  ;; Choose the fewest number of setups
  (or (let* ((setups-best (kk.get.value (best-alternative alternatives) 'net-setup-duration))
             (setups-new (kk.get.value (new-alternative alternatives) 'net-setup-duration)))
        (cond ((< setups-best setups-new)
               (alternatives-discard-alternative self new-alternative)
               T)
              ((> setups-best setups-new)
               (alternatives-discard-alternative self best-alternative)
               (put.value self 'best-alternative new-alternative)
               T)))

      ;; If new-alternative is has less percent-from-desired-end-time, take it
      (when (> (kk.get.value (best-alternative alternatives) 'percent-from-desired-end-time)
               (kk.get.value (new-alternative alternatives) 'percent-from-desired-end-time))
        (alternatives-discard-alternative self best-alternative)
        (put.value self 'best-alternative new-alternative)
        T)

      ;; the champion wins ties!
      (alternatives-discard-alternative self new-alternative)))
(defun close-enough-to-desired-completion (alternative)
  "This function will determine if an alternative is within the acceptable-proximity-of-operatio
n-to-completion
    percentage for the machine (the defaulted value in the machines unit is 10 (%)."

  (<= (kk.get.value (alternative alternatives) 'percent-from-desired-end-time)
      (get.value (kk.get.value (alternative alternatives) 'machine)
                 'acceptable-proximity-of-operation-to-completion)))


(defun alternatives-discard-alternative (self alternative)
  "Returns an alternative to the free alternative pool"
  (add.value self 'free-alternatives alternative))


;(defun alternatives-discard-alternative (self alternative &optional not-yet-suggested)
;  "Returns an alternative to the free alternative pool"
;  (add.value self 'free-alternatives alternative)
;  (cond ((not not-yet-suggested)
;         (remove.value self 'possible-alternatives alternative))))

(defun get-box-covering (machine time)
  "This function searches for a box which uses the instant of time specified by the time in the
call.
    If no box is found, it returns nil."
  (loop for box = (get.value machine 'first-box-on-machine)
        then (kk.get.value (box boxes) 'same-machine-successor)
        for start-time = (kk.get.value (box boxes) 'START-TIME)
        until (> start-time *plus-infinity*)
        do
        (when (and (< start-time time)
                   (> (kk.get.value (box boxes) 'END-TIME) time))
          (return (kk.get.value (box boxes) 'same-machine-successor)))))
```

```
;;; ------------------------------------------------------------------------------------------------
;;; ---------------------------------------- FIT-BOX-P ---------------------------------------------
;;; ------------------------------------------------------------------------------------------------

;;; ------------------------------------------------------------------------------------------------
;;; The following is a generalized routine for trying to insert a P box between 2 other P boxes.
;;; It determines whether S boxes are needed and will fit, and will allow an arbitrary combinati
on of U boxes
;;; between the P boxes.  However, S boxes must ALWAYS abut the P box to their right.
;;; This routine is used by compact-left, back-scheduling, and forward scheduling.
;;; left-box and right-box box-types are P or E.
;;; Hopefully, this will only have to be written once for everyone's needs.
;;; ------------------------------------------------------------------------------------------------

(defun fit-box-p (box machine left-box right-box earliest-start-time latest-end-time lean-left-o
r-right overlap-p
                  &optional percent-of-fit)
  "Determine if this box will fit between left-box and right-box, which are P boxes or nil, and
return a list of:
    (left-setup-duration left-start-time box-after-left-setup duration start-time box-BEFORE-box
right-setup-duration right-start-time box-after-right-setup)
    Note that box-after-left-setup may be box; the box-after is the right box for insert-box."
  (cond ((and left-box (not (memq (kk.get.value (left-box boxes) 'BOX-TYPE) '(X P E))))
         (format T "Bad left-box in fit-box-p box-type: ~a" (kk.get.value (left-box boxes) 'BOX-
TYPE))
         (break))
        ((and right-box (not (memq (kk.get.value (right-box boxes) 'BOX-TYPE) '(X P E))))
         (format T "Bad right-box in fit-box-p box-type: ~a" (kk.get.value (right-box boxes) 'BO
X-TYPE))
         (break))

        (t
         (let* ((need-a-setup (or (not left-box)
                                  (not (same-pvor-p left-box box))
                                  (not (same-pvor-p right-box box))))
                (duration (get-process-duration machine box))
                (percent-for-overlap (when overlap-p (get.value machine 'PERCENTAGE-REQUIRED-FOR
-OVERLAP)))
                (overlap-min-duration (when overlap-p (floor (* duration percent-for-overlap) 10
0))))
           (if (not need-a-setup)
               ;; Just try to fit the box into the existing gap -- dont change any setup -- rig
ht setup either not needed or already there.
               (multiple-value-bind (result-start-time new-left-box)
                   (case lean-left-or-right
                     (LEFT  (fit-duration 'LEFT duration machine left-box right-box earliest-sta
rt-time nil
                                          '(S) overlap-min-duration percent-of-fit))
                     (RIGHT (fit-duration 'RIGHT duration machine left-box right-box nil latest-
end-time
                                          '(S) overlap-min-duration percent-of-fit)))
                 (when result-start-time
                   (list nil nil nil duration result-start-time new-left-box nil nil nil)))

               ;; else, we must deal with setups.
               (fit-box-setups box machine left-box right-box earliest-start-time latest-end-tim
e lean-left-or-right
                               overlap-min-duration percent-of-fit))))))


;;; ---------------------------------- FIT DURATION ----------------------------------
(defun fit-duration (left-or-right duration machine left-box right-box
                     &optional earliest-start-time latest-end-time boxes-to-ignore overlap-min-dur
ation percent-of-fit)
  "Try to fit this duration somewhere between left-box and right-box, starting no earlier than e
arliest-start-time, ending no later than latest-end-time.
    If left-or-right is 'LEFT,  and we should place the box as far to the left as possible.  For
  'RIGHT, the opposite is true.
    We ignore boxes-to-ignore boxes as if they did not exist.
    Return multiple values: result-start-time and new-left-box (box which we should insert after
)."
```

```
;; If not set, use boxes to set them.
(when (not left-box)
  (setq left-box (get.value machine 'FIRST-BOX-ON-MACHINE)))
(when (not right-box)
  (setq right-box (get.value machine 'LAST-BOX-ON-MACHINE)))
(when (not earliest-start-time)
  (setq earliest-start-time (kk.get.value (left-box boxes) 'END-TIME)))
(when (not latest-end-time)
    (setq latest-end-time (kk.get.value (right-box boxes) 'START-TIME)))

;  (when (eq (unit.name machine) *ALT-TEST*)
;    (print 'in-fit-duration)
;    ;;(break)
;    )
  (fit-duration-2 left-or-right duration left-box right-box earliest-start-time latest-end-time
boxes-to-ignore
                overlap-min-duration percent-of-fit))

(defun fit-duration-2 (left-or-right duration left-box right-box earliest-start-time latest-end-
time boxes-to-ignore
                     overlap-min-duration percent-of-fit)
  (let* ((done nil)
         result-start-time result-left-box result-right-box pocket-size)
     (loop while (not done) do
          (case left-or-right
            (LEFT
             (let* ((start-time (max earliest-start-time (kk.get.value (left-box boxes) 'END-TIM
E'))) ; The candidate start-time.
                    (next-box (kk.get.value (left-box boxes) 'SAME-MACHINE-SUCCESSOR)))
               (loop while (and boxes-to-ignore   ; We can ignore a box and put duration right o
n top of it. loop until we find a box not to ignore.
                                (memq (kk.get.value (next-box boxes) 'BOX-TYPE) boxes-to-ignore)
) do
                    (setq next-box (kk.get.value (next-box boxes) 'SAME-MACHINE-SUCCESSOR)))
               (setq pocket-size (- (kk.get.value (next-box boxes) 'START-TIME) start-time))
               ;;(princ "!")
               ;;(print (list duration pocket-size (unit.name left-box)(get.value left-box 'box-
type)
               ;;(unit.name next-box)(get.value next-box 'box-type) percent-of-fit))
               (cond ((or (<= duration pocket-size)  ; Found a solution.
;;        Bill - added the "=" above - causes almost 200 additional boxes to get compacted left
    DHO     3-3-89
                          (and overlap-min-duration
                               (equal 'U (kk.get.value (next-box boxes) 'BOX-TYPE))  ;; these 2
lines allow overlap when no setups.
                               (< overlap-min-duration pocket-size))
                          (and percent-of-fit (movable-p next-box)
                               (< (/ (* percent-of-fit duration) 100) pocket-size)))
                      (setq result-start-time start-time)
                      (setq result-left-box left-box)
                      (setq result-right-box next-box)
                      (setq done T))
                     ((eq next-box right-box)  ; Done, reached the max box with no solution.
                      (setq done T))
                     ((<= latest-end-time (kk.get.value (next-box boxes) 'END-TIME)) ;; 6-16  ju
ne ; put in RIGHT case...
                      (setq done T))
                     (T (setq left-box next-box)))))  ; Press on with the next box.
            (RIGHT
             (let* ((end-time (min latest-end-time (kk.get.value (right-box boxes) 'START-TIME))
)  ; The candidate start-time.
                    (next-box (kk.get.value (right-box boxes) 'SAME-MACHINE-PREDECESSOR)))
               (loop while (and boxes-to-ignore   ; We can ignore a box and put duration right o
n top of it. loop until we find a box not to ignore.
                                (memq (kk.get.value (next-box boxes) 'BOX-TYPE) boxes-to-ignore)
) do
                     ;;(princ ",")
                     (setq next-box (kk.get.value (next-box boxes) 'SAME-MACHINE-PREDECESSOR)))
```

```
                (setq pocket-size (- end-time (kk.get.value (next-box boxes) 'END-TIME)))
             ;;  Bill - if we're adding right setup we've added the process immediately left of
where we want
                ;; to insert a setup.  Thus, we're constrained on the left not by left box but by
 the end time
                ;; of the process box we are about to insert.            DHO     4-29-89
                (setq pocket-size (- end-time (max earliest-start-time (kk.get.value (next-box bo
xes) 'END-TIME))))
                ;;(princ "!")
                ;;(print (list (get.value right-box 'start-time) latest-end-time end-time earlies
t-start-time
                ;;(kk.get.value (next-box boxes) 'END-TIME)))
                ;;(print (list duration pocket-size (unit.name next-box)(get.value next-box 'box-
type)
                ;;(unit.name right-box)(get.value right-box 'box-type) percent-of-fit))
                (cond ((or (<= duration pocket-size)  ; Found a solution.
                           (and percent-of-fit (movable-p next-box)
                                (< (/ (* percent-of-fit duration) 100) pocket-size)))
                       (setq result-start-time (- end-time duration))
                       (setq result-left-box next-box)
                       (setq result-right-box right-box)
                       (setq done T))
                      ((not next-box)
                       (setq done T))
                      ((eq next-box left-box)  ; Done, reached the max box with no solution.
                       (setq done T))
                      ((>= earliest-start-time (kk.get.value (next-box boxes) 'START-TIME)) ;; 6-
16  june
                       (setq done T))
                      (T (setq right-box next-box))))))  ; Press on with the next box.
    (when result-start-time
      (values result-start-time result-left-box result-right-box))))


;;; --------------------------------------------------------------------------------------

(defun fit-box-setups (box machine left-box right-box earliest-start-time latest-end-time lean-l
eft-or-right
                       overlap-min-duration percent-of-fit)
  "left-box and right-box are P boxes or NIL.
   Return:
    (left-setup-duration left-start-time box-after-left-setup duration start-time box-BEFORE-box
 right-setup-duration right-start-time box-after-right-setup)
   Same as fit-box-p, but we need to put in a left setup box."
  ;; Dont forget: the P box can start after the same-tray-predecessor end-time; the left S box c
an start at the max
  ;; of the P box - setup-duration, or at the end-time of the previous non-setup box.
  ;; The strategy (since it is so complex with U boxes being in the middle) is to actually calcu
late the start times
  ;; for the S, P, and S boxes.  If we can calculate them all, then we can fit the box.

  ;; Left is for compact-left; right is for back-scheduling.
  (let* ((need-left-setup (and left-box
                               (or (eq 'E (kk.get.value (left-box boxes) 'BOX-TYPE))
                                   (not (same-pvor-p left-box box)))))
         (duration (get-process-duration machine box))
         (need-right-setup (and right-box (not (eq 'E (kk.get.value (right-box boxes) 'BOX-TYPE)
))
                                (not (same-pvor-p right-box box))))
         (left-setup-duration (get-setup-time left-box box machine))
        (right-setup-duration (when need-right-setup (get-setup-time box right-box machine))))
    (when (and need-left-setup (zerop left-setup-duration))   (setq need-left-setup nil))
    (when (and need-right-setup (zerop right-setup-duration))  (setq need-right-setup nil))

    (case lean-left-or-right
      (LEFT  (fit-box-setups-left
                box machine left-box right-box earliest-start-time latest-end-time overlap-min-du
ration percent-of-fit
                need-left-setup need-right-setup duration left-setup-duration right-setup-duratio
n))
```

```
(RIGHT 'fit-box-setups-right
          box machine left-box right-box earliest-start-time latest-end-time overlap-min-du
ration percent-of-fit
          need-left-setup need-right-setup duration left-setup-duration right-setup-duratio
n)))


(defun fit-box-setups-right (box machine left-box right-box earliest-start-time latest-end-time
overlap-min-duration
                    percent-of-fit
                    need-left-setup need-right-setup duration left-setup-duration right-s
etup-duration)
  (let* ((left-start-time nil)
        dummy-box after-left-setup-box box-before-box box-after-box after-right-setup-box
        start-time right-start-time fit-p)
    (when (and need-right-setup right-setup-duration (plusp right-setup-duration))
; Place the right setup box.
      (multiple-value-setq (right-start-time dummy-box after-right-setup-box)
        (fit-duration 'RIGHT right-setup-duration machine left-box right-box nil latest-end-time
 '(S) nil))) ; 8/15/89 bf

    (multiple-value-setq (start-time box-before-box box-after-box)          ; Do the P box.
      (fit-duration 'RIGHT duration machine left-box right-box earliest-start-time ;;; austral -
 used to ignore earlist-s-t
              (min (or right-start-time *plus-eternity*) latest-end-time)
              '(S) overlap-min-duration percent-of-fit))

    (when start-time                          ; Otherwise, we cant fit the process box, so ret
urn NIL.
      (when need-left-setup
        (multiple-value-setq (left-start-time dummy-box after-left-setup-box)   ; Place the left
 setup box.
          (fit-duration 'RIGHT left-setup-duration machine left-box right-box earliest-start-tim
e start-time
                  '(S) overlap-min-duration))
        (setq after-left-setup-box
              (if (eq after-left-setup-box box-after-box) box after-left-setup-box)))
      (setq fit-p (and (or (not need-left-setup)
                           (and left-setup-duration left-start-time))
                       start-time
                       (or (not need-right-setup)
                           (zerop right-setup-duration)
                           (and right-setup-duration right-start-time))))
      (when (and fit-p need-left-setup (not left-start-time))
        (print "Cant find a place for left setup") (break))
;      (when (eq *alt-test* (unit.name machine))
;        (print (list "!!!" fit-p left-setup-duration left-start-time start-time
;          need-right-setup right-setup-duration right-start-time))
;        (print (list left-setup-duration left-start-time after-left-setup-box right-box duration
 start-time box-before-box
;                 right-setup-duration right-start-time after-right-setup-box)))
      (when fit-p
        ;; Dont need to slide setup boxes to right to abut P boxes because we are leaning to the
 right.
        (list left-setup-duration left-start-time after-left-setup-box duration start-time box-b
efore-box
            right-setup-duration right-start-time after-right-setup-box)))))


(defun fit-box-setups-left (box machine left-box right-box earliest-start-time latest-end-time o
verlap-min-duration
                    percent-of-fit need-left-setup need-right-setup duration left-setup-du
ration right-setup-duration)
  (let* ((left-start-time nil)
        (left-earliest-start-time (kk.get.value (left-box boxes) 'END-TIME)) ;; 6-16
        dummy-box after-left-setup-box box-before-box box-after-box after-right-setup-box
        start-time right-start-time fit-p)
    (when (and need-left-setup left-setup-duration (plusp left-setup-duration))     ; Place
the left setup box.
      (multiple-value-setq (left-start-time dummy-box after-left-setup-box)
```

```
      (fit-duration 'LEFT left-setup-duration machine left-box right-box left-earliest-start-t
ime nil '(S) nil))) ; 9/15/89bf

    (multiple-value-setq (start-time box-before-box box-after-box)                   ; Do the
 P box.
     (fit-duration 'LEFT duration machine left-box right-box
                   (if left-start-time (max (+ left-start-time left-setup-duration) earliest-star
t-time)
                       earliest-start-time)
                   latest-end-time '(S) overlap-min-duration percent-of-fit))
    (when start-time                                    ; Otherwise, we cant fit the process box, so ret
urn NIL.
      (when need-right-setup
        (multiple-value-setq (right-start-time dummy-box after-right-setup-box)
          ;; NOTE --- THE "RIGHT" in the next line -- we want to abut the new S box as close as
possible to its P box.
          (fit-duration 'RIGHT right-setup-duration machine left-box right-box (+ start-time dur
ation)
                        (min latest-end-time (kk.get.value (right-box boxes) 'START-TIME)) '(S) ni
l))) ; 8/15/89 bf

      (setq fit-p (and (or (not need-left-setup)
                           (and left-setup-duration left-start-time))
                       start-time
                       (or (not need-right-setup)
                           (and right-setup-duration right-start-time))))
      (box-debug box 'fit-box-setups-left)
      (when fit-p
        ;; Need to move left setup box to the right to abut the P box. The right setup box used
'RIGHT in fit-duration above.
        (when need-left-setup
          (multiple-value-setq (left-start-time dummy-box after-left-setup-box)
            (fit-duration 'RIGHT left-setup-duration machine left-box right-box left-earliest-st
art-time start-time '(S)
                          overlap-min-duration))
          (when (not (and left-start-time after-left-setup-box))
            (print "fit-box-setups-left bug") (break))
          (when (> (kk.get.value (after-left-setup-box boxes) 'START-TIME) start-time)
            (setq after-left-setup-box box)))
        (list left-setup-duration left-start-time after-left-setup-box
              duration start-time box-before-box
              right-setup-duration right-start-time after-right-setup-box))))))




(defun box-debug (box fn)
  (let* ((box-name 'box1420))
    (when (eq box-name (unit.name box))
      (format T "Found box ~a in fn ~a~%" (unit.name box) fn)
      (break))))


(defun slide-to-right-old (box machine left-box right-box setup-start-time setup-duration proces
s-start-time)
  "Slide a duration for an S box over to the right to abut a P box.  Return the correct start ti
me for the S box."
  box ; ignore for now.
  (when (eq 'S (kk.get.value (left-box boxes) 'BOX-TYPE))
    (setq left-box (kk.get.value (left-box boxes) 'SAME-MACHINE-PREDECESSOR)))
  (when (eq 'S (kk.get.value (right-box boxes) 'BOX-TYPE))
    (setq right-box (kk.get.value (right-box boxes) 'SAME-MACHINE-SUCCESSOR)))
  (let* (new-start-time)
    (multiple-value-setq (new-start-time)
      (fit-duration 'RIGHT setup-duration machine left-box right-box setup-start-time process-st
art-time '(S)))
;;    (when (and new-start-time (not (= new-start-time setup-start-time)))
;;    (princ "Sliding "))
    ;; (when new-start-time
```

```
    ;;(when (not (= (+ left-start-time setup-duration) process-start-time))
    ;;(format T "Slide-to-right - not abutting S box and P box ~a mach ~a~%" (unit.name box) (un
it.name machine))
    ;;(break))
    (when (and new-start-time
               (> (abs (- new-start-time setup-start-time)) 40000))
      (print "Slide to right too large")
      (break))
    (or new-start-time setup-start-time)))


(defun extra-setups? ()
  "  Function to remove any extra setups if they exist"
  (let* ((last-box-type nil)
         (last-box nil))
  (loop for machine in (unit.descendants 'machines 'member) do
        (setq last-box-type nil)
        (setq last-box nil)
        (loop for box = (get.value machine 'first-box-on-machine)
                          then (next-movable-box box machine)
                          until (null box) do
                          (when (and (eq (kk.get.value (box boxes) 'box-type) 'S)
                                     (eq last-box-type 'S)
                                     (not (kk.get.value (last-box boxes) 'from-previous-schedule
)))
                            (remove-box last-box)
                            (recycle-box last-box))
                          (when (and (eq (kk.get.value (box boxes) 'box-type) 'S)          ;; a
dded next 4 lines  DHO   6-16-89
                                     (same-pvor-p box last-box))
                            (remove-box box)
                            (recycle-box box))
                          (setq last-box-type (kk.get.value (box boxes) 'box-type))
                          (setq last-box box)))))

;;; ------------------------------------------- Temp debugging fns ----------------------

(defun find-boxes ()
  (let* ((boxes (unit.children 'boxes 'member)))
    (loop for box in boxes
          when (and (memq (kk.get.value (box boxes) 'BOX-TYPE) '(P S)) ;get.value => kk.get.valu
e CRJ 4/17/89
                    (not (kk.get.value (box boxes) 'ACTIVITY-ID))
                    (kk.get.value (box boxes) 'END-TIME)) ;get.value => kk.get.value CRJ 4/17/8
          do
          (print (list (unit.name box) (utime-to-string (kk.get.value (box boxes) 'END-TIME))))
)) ;get.value => kk.get.value CRJ 4/17/89

(defun s-b (box) (show-boxes (kk.get.value (box boxes) 'machine) nil box))
(defun show-boxes (machine &optional box-types-to-ignore box-to-start)
  (let* ((count 100000)
         start-printing)
    (format T "~% Machine: ~a~%" (unit.name machine))
    (loop ;;for i from 1 to 10
          for box = (get.value machine 'FIRST-BOX-ON-MACHINE)
          then (kk.get.value (box boxes) 'SAME-MACHINE-SUCCESSOR)
          while (plusp (setq count (1- count)))
          do
          (when (and box-to-start (eq box (unit box-to-start)))
            (setq start-printing t)
            (setq count 10))
           when (and (not (memq (kk.get.value (box boxes) 'BOX-TYPE) box-types-to-ignore))
                     (or (not box-to-start) start-printing))
            (format T "~a  Start: ~a  End: ~a  Type: ~a  Act-id: ~a ~a ~a~%"
                    (unit.name box) (utime-to-string (kk.get.value (box boxes) 'START-TIME))
                    (utime-to-string (kk.get.value (box boxes) 'END-TIME))
                    (kk.get.value (box boxes) 'BOX-TYPE) (kk.get.value (box boxes) 'activity-id)
 (kk.get.value (box boxes) 'start-time)
                    (kk.get.value (box boxes) 'end-time)))))
```

```
(defun bb (box &optional follow-down-machine)
  (format t "Box ~a  box-type: ~a  pred: ~a  succ: ~a start: ~a end: ~a~%"
          (unit.name box) (kk.get.value (box boxes) 'box-type)
          (kk.get.value (box boxes) 'same-machine-predecessor) (kk.get.value (box boxes) 'same-m
achine-successor)
          (utime-to-string (kk.get.value (box boxes) 'start-time)) (utime-to-string (kk.get.valu
e (box boxes) 'end-time)))
  (when follow-down-machine
    (let* ((next-box (kk.get.value (box boxes) 'same-machine-successor)))
      (when next-box (read-line) (bb next-box T)))))

;;; --------------------------------- ADDITIONAL COMMENTS ----------------------

;;; Add the member slot  LEFT-OR-RIGHT  to ALTERNATIVES.
;;; Add the value LEFT-OR-RIGHT to the LOCAL.COMPACT.UNIT.SLOTNAMES slot of ALTERNATIVES.

(defun feb-fix ()
  (create.slot 'alternatives 'LEFT-OR-RIGHT 'member)
  (add.value 'alternatives 'LOCAL.COMPACT.UNIT.SLOTNAMES 'LEFT-OR-RIGHT))

;;; ---------------------- changes 2/10/89
;;;
;;; In general, the whole file changed, so maybe just replace with this file.
;;; Otherwise, here is a list of changes (a lot marked with "rnn")
;;;
;;; 1.  Commented out in generate-schedule the lines that were resetting spans.
;;;
;;; 2.  In generate-alternatives, added nreverse to pockets.
;;;
;;; 3.  Changed lots from generate-alternatives thru delete-setups-as-required
;;;
;;; 4.  Changed lots from fit-box-p through the end of the file.
;;;
;;; -*- mode:Common-Lisp; Package:KEE; Base:10; Fonts:(cptfont HL10B cptfont HL12B HL12BI) -*-

;;; SHIFT.LISP

(in-package 'kee)


;;; **************************************************************************************
;;; ---------------------- SHIFT-SCHEDULE-RIGHT ----------------------
;;;
;;; This routine shifts boxes to the right so that the earliest boxes start at BC time.
;;; It allows boxes to jump over immovable boxes, and pushes same-tray-successor and same-machin
e-successor
;;; boxes as well to maintain a feasible schedule.
;;;
;;; 1-  shift-schedule-right -- call shift-negative-boxes-right to do all the work.
;;;
;;; 2-  shift-negative-boxes-right -- get the first-box-on-machine for all machines; take each i
n sorted order
;;;     that need to be shifted (left of bc-time, or left of ft1 and not from-previous-schedule)
;;;     and call adjust-right to move the box right.
;;;
;;; 3-  adjust-right -- THIS IS THE MAIN FUNCTION -- We have a box.  The general idea is to assu
me that most boxes
;;;     will move and will stay linked in the same order.  So we just change the movable boxes'
times, not their
;;;     same-machine pointers.  For immovable boxes, we have to see where to move its pointers.
;;;
;;;     a.  If the box is movable, use determine-right-shift-amount to figure out how far to mov
e this box.
;;;     Then simply change its start-time and end-time; do not move pointers, because we assume
that we
;;;     will have to move its succeeding boxes.
;;;
;;;     b.  If the box is immovable, then we have to move the pointers- Start with the previous
 box and look for
;;;     the first box that lies complete before this box.  Then use right-shift-pointer-update t
o shift the pointers.
```

```
;;;
;;;     c.  Call yourself recursively, first to do the same-machine-successor, then to do the sa
me-tray-successor.
;;;
;;; 4-  determine-right-shift-amount -- take into account agv-move-time, load-time, same-tray-su
ccessor, frozen-time-1,etc
;;;     to determine the minimum time that this box must be shifted.  Also use jump-right-over-f
ixed-boxes to determine
;;;     how far to jump if there are fixed boxes to jump over.
;;;
;;; ------------------------------------------------------------------------------------------

(defun shift-schedule-right ( )
  "A covering function that calls shift-negative-boxes-right"
  (check-action 'shift-schedule-right)  ; This function does nothing!!!  Defined in file init.
CRJ 3/21/89.
  (let* ((msg-output-window (get.value *control-unit* 'msg-output-window)))
    (format msg-output-window "0% Right shifting and compressing schedule")
    (setq *jumped-box-successor* nil)
    (setq *time1* (time))
    (shift-negative-boxes-right)
    (recompute-machines-ft2)                                    ;;   added for ft2's that change due to i
n
ventory unavailability     DHO     6-28-89
    (setq *time2* (time))
    (report-execution-time msg-output-window)
    (feasibility-caller)))

(defun shift-negative-boxes-right ( )
  "This function shifts the start times of all boxes with negative start times.  It makes their
new start time be 0.
    All successor boxes are shifted accordingly."
  (setq *shift-right-bc-time* (get.value *control-unit* 'build-context-time))
  (setq *shift-right-ft1-time* (get.value *control-unit* 'frozen-time-1))
  (let* ((bc-time *shift-right-bc-time*)
         (ft1-time *shift-right-ft1-time*))
    ;; Push all boxes that are left of bc-time to the right of bc-time (both from-previous-sched
ule and not).
    (loop with boxes = (first-boxes-on-machines bc-time)
          for box = (earliest-box-before-time boxes bc-time)
          while box do
          (adjust-right box bc-time))
    ;; Look at boxes to the right of bc-time and push them if they are not from-previous-schedul
e.
    (loop for machine in (unit.descendants 'machines 'member) do
          (let* ((box (get.value machine 'first-box-on-machine)))
            ;; Find the first interesting box-
            (loop while (and box (memq (kk.get.value (box boxes) 'box-type) '(E D U))) do
                  (setq box (kk.get.value (box boxes) 'same-machine-successor)))
            (when (and box
                       (not (kk.get.value (box boxes) 'from-previous-schedule))
                       (< (kk.get.value (box boxes) 'start-time) ft1-time))
              (adjust-right box ft1-time))))))


(defun earliest-box-before-time (boxes before-time)
  "Return the earliest of the input boxes before the before-time."
  (when boxes
    (multiple-value-bind (min-box min-time)
        (minimum-element boxes :key #'(lambda (x) (kk.get.value (x boxes) 'start-time)))
      (if (< min-time before-time)
          (values min-box min-time)
          (values nil before-time)))))

(defun first-boxes-on-machines (before-time)
  "Return the first boxes on all the machines."
  (loop for machine in (unit.descendants 'machines 'member) ;; run-time-constant
        for box = (next-movable-box nil machine)
        when (and box (< (kk.get.value (box boxes) 'start-time) before-time))
        collect box))
```

```
(defun minimum-element (list &key (key #'identity) (less-than-fun #'<))
  "Returns the least element in LIST.  If KEY is specified, applies KEY to each element to retur
n a numeric value to be used for comparison."
  (loop with min
        with min-element
        for element in list
        for x = (funcall key element)
        do
        ;; reset the min and min-element if the current element is lower,
        ;; or if this is the first time through the loop (min is NIL)
          (unless (and min (funcall less-than-fun min x))
            (setq min x)
            (setq min-element element))
        finally (return (values min-element min))))


;;; ---------------------- ADJUST-RIGHT ----------------------
;;;JJB
(defun adjust-right (box last-adjusted-end &optional call)
  "Adjust this box right, beyond the last-adjusted-end.  If movable, move its times. If immovabl
e, shift its pointers."
  call  ; ignore -- used for debugging only
  ;; Called first with last-adjusted-end = bc-time.
  (let* (same-machine-successor same-tray-successor)
    (cond ((movable-p box)
           ;; box is movable
           (when (not (kk.get.value (box boxes) 'FROM-PREVIOUS-SCHEDULE))
             (setq last-adjusted-end (max last-adjusted-end *shift-right-ft1-time*)))
           (let* ((shift-amount (determine-right-shift-amount box last-adjusted-end))
                  (start-time (+ (kk.get.value (box boxes) 'START-TIME) shift-amount))
                  (end-time (+ (kk.get.value (box boxes) 'END-TIME) shift-amount)))
             (when (> shift-amount 0)   ; otherwise, quit.
               (setf same-machine-successor (kk.get.value (box boxes) 'SAME-MACHINE-SUCCESSOR))
               (setf same-tray-successor (kk.get.value (box boxes) 'SAME-TRAY-SUCCESSOR))
               (kk.put.value (box boxes) 'START-TIME start-time)        ; adjust current box
               (kk.put.value (box boxes) 'END-TIME end-time)
               (setq last-adjusted-end end-time))))

          ;; else box is immovable -- find the place to slide it left to.
          (t (let* ((start-time (kk.get.value (box boxes) 'START-TIME))
                    (prev-box (kk.get.value (box boxes) 'SAME-MACHINE-PREDECESSOR))
                    (prev-prev-box (when prev-box (kk.get.value (prev-box boxes) 'SAME-MACHINE-P
REDECESSOR))))
               ;; The next 2 lines use the start-time of the prev-box to allow for overlap-
               (when (and prev-box (> (kk.get.value (prev-box boxes) 'START-TIME) start-time))
; otherwise, quit.
                 (loop while (and prev-prev-box (> (kk.get.value (prev-prev-box boxes) 'START-TI
ME) start-time))
                       do
                       (setq prev-box prev-prev-box)
                       (setq prev-prev-box (kk.get.value (prev-box boxes) 'SAME-MACHINE-PREDECES
SOR)))
                 (setf same-machine-successor (kk.get.value (box boxes) 'SAME-MACHINE-SUCCESSOR)
)
                 (right-shift-pointer-update prev-box box)))))
    (when same-machine-successor
      (if (eq (get.value (kk.get.value (box boxes) 'machine) 'infinite-capacity) 'YES)
          (setq last-adjusted-end 0))                                      ;;  don't worry about last b
ox moved if infinite capacity machine
      (adjust-right same-machine-successor last-adjusted-end 'SAME-MACH))

    (when same-tray-successor                             ;; Use the next setup box for the tray.
      (let* ((tray-successor-machine-predecessor (kk.get.value (same-tray-successor boxes) 'SAME
-MACHINE-PREDECESSOR)))
        (when (and tray-successor-machine-predecessor
                   (eq 'S (kk.get.value (tray-successor-machine-predecessor boxes) 'BOX-TYPE)))
          (setq same-tray-successor tray-successor-machine-predecessor))))
    (when same-tray-successor
      (adjust-right same-tray-successor 0 'SAME-TRAY))))

(defun determine-right-shift-amount (box last-adjusted-end)
```

```
 "Readjusts how much to shift a box to the right at the end of a schedule.
   Returns shift-amount -- We are positive that the box can be placed at the returned location.
   The box must be moved a minimum of last-adjusted-end to the right."
 (let* ((box-type (kk.get.value (box boxes) 'BOX-TYPE))
        (old-start-time (kk.get.value (box boxes) 'START-TIME))
        (old-end-time (kk.get.value (box boxes) 'END-TIME))
        (latest-predecessor-end nil))
   (setq latest-predecessor-end (latest-predecessor-end-and-move box))
   (when (eq 0 latest-predecessor-end)
     (setq latest-predecessor-end nil))
        ;; Figure out when to start the setup if box is S.
   (let* ((setup-start-time (or (when (and (eq box-type 'S) latest-predecessor-end)
                                   (- latest-predecessor-end (- old-end-time old-start-time)))
                                 0))
        (stp-end-time (or (when (and latest-predecessor-end (not (eq box-type 'S)))
                               latest-predecissor-end)
                             0))
        (fixed-fti-start-time
          (or (when (< old-start-time *halfway-to-minus-infinity*) ;; simple, fast test
                (let* ((bc-time *shift-right-bc-time*)
                       (fti-time *shift-right-fti-time*))
                  (if (< old-start-time (+ *minus-infinity* (- fti-time bc-time)))
                      (- (+ old-start-time bc-time) *minus-infinity*)
                      0)))
              0))
        (start-time (max setup-start-time old-start-time stp-end-time last-adjusted-end fixed-f
ti-start-time))
        shift-amount)
   (setq shift-amount (- start-time old-start-time))
   (when (minusp shift-amount) (setq shift-amount 0))
   (when (plusp shift-amount)                                    ; we must shift right
     (setq shift-amount (jump-right-over-fixed-boxes shift-amount start-time (- old-end-time ol
d-start-time) box)))
   shift-amount)))

(defun determine-same-tray-predecessor  (box)
  "  Return all tray predecessors of box"
  (let* ((process-box (if (eq (kk.get.value (box boxes) 'box-type) 'S)
                          (kk.get.value (box boxes) 'same-machine-successor)
                          box))
        (list-to-search (when process-box (kk.get.values (process-box boxes) 'same-tray-predece
ssor))))
    list-to-search))

(defun right-shift-pointer-update (prev-box box)
  "Prev-box is somewhere left of box- Move box just to the left of prev-box-   Fix all the point
ers-"
  (remove-box box)
  (insert-box box nil prev-box))

(defun latest-predecessor-end-and-move (box)
  (let* ((predecessor-boxes (determine-same-tray-predecessor box))
         (current-end-time 0)
         (max-end-time 0))
    (when predecessor-boxes
      (loop for entry in  predecessor-boxes
            do
            (let* ((predecessor-tray (kk.get.value (entry boxes) 'tray))              ;;   2-14 pr
ed tray also     DHO
                   (predecessor-machine (kk.get.value (entry boxes) 'machine)))
              (setq current-end-time (+ (kk.get.value (entry boxes) 'end-time)          ;; 2-14 DH
O pred end time
                                        (get-agv-time (kk.get.value (entry boxes) 'machine)
                                                      (kk.get.value (box boxes) 'machine)
                                                      (list box predecessor-tray entry))
                                        (retrieve-process-times predecessor-tray (kk.get.value (
entry boxes) 'operation)
                                                                 predecessor-machine 'lead-time)))
              (when (> current-end-time max-end-time)
                (setq max-end-time current-end-time)))))
    max-end-time))
```

```
;(defun right-shift-pointer-update-old (prev-box box)
;  (let* ((former-predecessor (kk.get.value (box boxes) 'SAME-MACHINE-PREDECESSOR))
;         (former-successor (kk.get.value (box boxes) 'SAME-MACHINE-SUCCESSOR))
;         (left-box (kk.get.value (prev-box boxes) 'SAME-MACHINE-PREDECESSOR)))
;    (when former-predecessor
;      (kk.put.value (former-predecessor boxes) 'SAME-MACHINE-SUCCESSOR former-successor))
;    (when former-successor
;      (kk.put.value (former-successor boxes) 'SAME-MACHINE-PREDECESSOR former-predecessor))

;    (kk.put.value (prev-box boxes) 'SAME-MACHINE-PREDECESSOR box)
;    (kk.put.value (box boxes) 'SAME-MACHINE-SUCCESSOR prev-box)
;    (kk.put.value (box boxes) 'SAME-MACHINE-PREDECESSOR left-box)
;    (when left-box (kk.put.value (left-box boxes) 'SAME-MACHINE-SUCCESSOR box))
;    nil))


(defun jump-right-over-fixed-boxes (shift-amount start-time duration in-box)
  "This returns the shift-amount for in-box where in-box can be placed (shifting right)-  It mus
t be placed at least at start-time, and in-box is duration long-
      Go down the chain of boxes-
      If the box (end-time) is before the current-start-time, ignore it-
      If cst+duration <= box start-time, done - exit-
      If the box is of type U, and cst+(duration * percent / 100) <= start-time, done - exit-
      If the box is immovable, bump current-start-time up to its end, go to next box-
      If cst+duration <= next-box start-time, done - exit-
      Else go to next box-"

   (when (eq 'S (kk.get.value (in-box boxes) 'BOX-TYPE))   ;; Increase duration to include the fo
llowing P box-    bill   2/9/89
    (let* ((machine (kk.get.value (in-box boxes) 'MACHINE))
           (next-process-box (next-process-box in-box machine)))
      (when next-process-box
        (setq duration (+ duration (- (kk.get.value (next-process-box boxes) 'END-TIME)
                                      (kk.get.value (next-process-box boxes) 'START-TIME)))))))

  (let* ((current-start-time start-time)
         (done nil)
         (percent (if (eq 'ACTIVITY (kk.get.value (in-box boxes) 'FROM-PREVIOUS-SCHEDULE))
                      0                       ;; must always keep current activities - thus, any overl
ap is ok
                      (get.value (kk.get.value (in-box boxes) 'MACHINE) 'PERCENTAGE-REQUIRED-FOR
-OVERLAP)))
         (in-box-type (kk.get.value (in-box boxes) 'BOX-TYPE))
         next-box)
    (loop for box = in-box
          then next-box
          for start-time = (when box (kk.get.value (box boxes) 'START-TIME))
          until (or (null box) done)
         do
         (setq next-box (kk.get.value (box boxes) 'SAME-MACHINE-SUCCESSOR))
         (when (< current-start-time (kk.get.value (box boxes) 'END-TIME))     ; otherwise, ign
ore it-
           (cond ((<= (+ current-start-time duration) start-time)
                  (setq done T))
                 ;;; !!!:! This is the piece of code that allows overlaps !!!!!!!
                 ((and (equal 'U (kk.get.value (box boxes) 'BOX-TYPE))
                       (equal 'P in-box-type)
                       (<= (+ current-start-time (floor (* percent duration) 100)) start-time))
                  (setq done T))
                 ((not (movable-p box))
                  (setq current-start-time (max current-start-time (kk.get.value (box boxes) 'E
ND-TIME))))
                 (t (let* ((next-box-start-time
                             (if next-box (kk.get.value (next-box boxes) 'START-TIME) *plus-inf
inity*)))
                      (when (<= (+ current-start-time duration) next-box-start-time)
                        (setq done T)))))))
    (+ shift-amount (- current-start-time start-time))))


(defun ee (n) (- n 2792000000))
```

```
(defun movable-p (box)
  "This is separated out into a function so that the definition of movable can change- Currently
, every box-type except D and U are movable;  PM is movable-"
  (or (not (kk.get.value (box boxes) 'IMMOVABLE))
      (eq 'PM (kk.get.value (box boxes) 'BOX-TYPE))))



;;; --------------------------------------------------------------------------------
;;;444
(defun adjust-left (box)
  "Readjusts a box leftward, moving other boxes on its machine and tray predecessors, relinking
immovable boxes to its right, if required-"
  "First determine what the box's end-time must be, as determined by is tray/machine successors
etc-"
   (when (movable-p box)         ; dont do immovable boxes
     (let* ((same-machine-successor (kk.get.value (box boxes) 'SAME-MACHINE-SUCCESSOR))
            (same-tray-successor (kk.get.value (box boxes) 'SAME-TRAY-SUCCESSOR))
            (tray (kk.get.value (box boxes) 'TRAY))
            (machine (kk.get.value (box boxes) 'MACHINE))
            (agv-move-time (when same-tray-successor
                             (+ (get-agv-time machine (kk.get.value (same-tray-successor boxes)
'MACHINE) tray)
                                (retrieve-process-times tray (kk.get.value (box boxes) 'OPERATIO
N) machine  LEAD-TIME))))
            (sms-start-time (if same-machine-successor
                                (kk.get.value (same-machine-successor boxes) 'START-TIME)
                                *plus-infinity*))
            (sts-start-time (if same-tray-successor
                                (cond ((and (equal 'X (kk.get.value (same-tray-successor boxes)
'BOX-TYPE))
                                            (not (equal tray (kk.get.value (same-tray-successor
boxes) 'TRAY))))
                                                ; calculate assembly part arrival offset
                                       (- (+ (kk.get.value (same-tray-successor boxes) 'START-TI
M
E)
                                             (* (second (kk.get.value (tray trays-in-system) 'AS
SEMBLY-TRAY))
                                                (box-duration same-tray-successor)))
                                          agv-move-time))
                                      (t (- (kk.get.value (same-tray-successor boxes) 'START-TIM
E)
                                            agv-move-time)))
                                *plus-infinity*))
            (old-end-time (kk.get.value (box boxes) 'END-TIME))
            (end-time (min old-end-time sts-start-time sms-start-time)))
       ;; end-time is the latest time this box can end-
       (when (not (equal end-time old-end-time))        ; we must shift left
         (adjust-left-box box end-time)))))

;;; !!!!!!!! DANGER !!!!!!!!!!
;;;
;;; This routine will work if there are not 2 immovable boxes in a row-  In the left-blocker cod
e below,
;;; we find the leftmost blocker box and take it out and move it to the right of our P box-  The
 others
;;; do not get moved-
;;; If this ceases to be the case, the routine should be patterned after the ADJUST-RIGHT routin
e-

;;;555
(defun adjust-left-box-old (box end-time)
  (let* ((old-end-time (kk.get.value (box boxes) 'END-TIME))
         (old-start-time (kk.get.value (box boxes) 'START-TIME))
         (shift-amount (- old-end-time end-time))
         (start-time (- old-start-time shift-amount))
         (box-type (kk.get.value (box boxes) 'BOX-TYPE))
         (setup-box (when (memq box-type '(X P)) (abutting-setup-box box)))
         (setup-start-time (when setup-box (- (kk.get.value (setup-box boxes) 'START-TIME) shift
```

```
-amount)))
        (setup-end-time (when setup-box (- (kk.get.value (setup-box boxes) 'END-TIME) drift-amo
unt)))
        (range-to-clear-start-time (if setup-box setup-start-time start-time))
        (range-to-clear-duration (- end-time range-to-clear-start-time))
        (same-machine-predecessor (if setup-box
                                      (kk.get.value (setup-box boxes) 'SAME-MACHINE-PREDECESSOR
)
                                      (kk.get.value (box boxes) 'SAME-MACHINE-PREDECESSOR)))
        (left-blocker-box (left-blocker end-time range-to-clear-duration box))  ;; The leftmost
 blocker
        jumped-box)
    (cond (left-blocker-box      ;move the blocker to my right and recursively try to adjust me l
eft
           (remove-box left-blocker-box)  ; This works because we eventually move all the same-m
achine-pred boxes of box-
           (insert-box left-blocker-box box)
           (adjust-left box))

;          ((setq jumped-box (jumping-immovable-backward? box start-time end-time))
;           (princ "-")
;           (setq same-machine-predecessor (kk.get.value (jumped-box boxes) 'SAME-MACHINE-PREDECE
SSOR))
;           (kk.put.value (box boxes) 'START-TIME start-time)
;           (kk.put.value (box boxes) 'END-TIME end-time)
;           (remove-box box)
;           (insert-box box nil jumped-box)
;           (when setup-box       ; adjust my setup box, if there is one
;             (kk.put.value (setup-box boxes) 'START-TIME setup-start-time)
;             (kk.put.value (setup-box boxes) 'END-TIME setup-end-time)
;             (remove-box setup-box)
;             (insert-box setup-box nil box))
;           (when same-machine-predecessor        ; adjust my machine predecessor, if there is one
;             (adjust-left same-machine-predecessor))
;           (loop for box in (kk.get.values (box boxes) 'SAME-TRAY-PREDECESSOR) do
;                 (adjust-left box)))

          (t (kk.put.value (box boxes) 'START-TIME start-time)
             (kk.put.value (box boxes) 'END-TIME end-time)
             (when setup-box     ; adjust my setup box, if there is one
               (kk.put.value (setup-box boxes) 'START-TIME setup-start-time)
               (kk.put.value (setup-box boxes) 'END-TIME setup-end-time))
             (when same-machine-predecessor      ; adjust my machine predecessor, if there is one
               (adjust-left same-machine-predecessor))
             (loop for box in (kk.get.values (box boxes) 'SAME-TRAY-PREDECESSOR) do
                   (adjust-left box))))))


;(defun jumping-immovable-backward? (box start-time end-time)
;  (let* ((previous-box (kk.get.value (box boxes) 'SAME-MACHINE-PREDECESSOR))
;         jumped)
;    (when (eq 'S (kk.get.value (previous-box boxes) 'BOX-TYPE))
;      (setq previous-box (kk.get.value (previous-box boxes) 'SAME-MACHINE-PREDECESSOR)))
;    (when previous-box
;      (loop for current-box = previous-box
;            then (kk.get.value (current-box boxes) 'SAME-MACHINE-PREDECESSOR)
;            until (equal 'E (kk.get.value (current-box boxes) 'BOX-TYPE))
;            do
;            (let* ((box-prior-to-current (kk.get.value (current-box boxes) 'SAME-MACHINE-PREDECE
SSOR))
;                   (previous-box-type (kk.get.value (box-prior-to-current boxes) 'BOX-TYPE)))
;              (when (kk.get.value (current-box boxes) 'IMMOVABLE)
;                (when (or (memq previous-box-type '(X P))
;                          (and (memq previous-box-type '(D U))
;                               (>= start-time (kk.get.value (box-prior-to-current boxes) 'END-TI
ME))

;                               (<= end-time (kk.get.value (current-box boxes) 'START-TIME))))

;                  (setq jumped t))))
;            when (and jumped (<= end-time (kk.get.value (current-box boxes) 'START-TIME)))
;            return current-box))))
```

```
(defun left-blocker (range-to-clear-end-time range-to-clear-duration right-box)
  "This function determines if there are any immovable blocks in the range
      Ä(range-to-clear-end-time - range-to-clear-duration), range-to-clear-end-timeA-
    It returns the first block, if one exists, else nil-
   Right-box is the box to start with- It must be either the rightmost possible box in the range
, or right of it-"

  "We loop thru boxes from right to left, and collect from right to left; thus the front of the
list is the leftmost blocker-"
  (when (plusp range-to-clear-duration)
    (let* ((range-to-clear-start-time (- range-to-clear-end-time range-to-clear-duration))
           earliest-start
           (blockers                          ; a list of immovables in the target range
             (loop for box = right-box
                   then (kk.get.value (box boxes) 'SAME-MACHINE-PREDECESSOR)
                   until (or (null box)
                             (<= (kk.get.value (box boxes) 'END-TIME) range-to-clear-start-time)
)
                   do (if (equal (kk.get.value (box boxes) 'BOX-TYPE) 'PM)
                          (setq earliest-start (first (kk.get.value (box boxes) 'IMMOVABLE)))
                          (setq earliest-start *minus-infinity*))
                   when (and (< (kk.get.value (box boxes) 'START-TIME) range-to-clear-end-time)
                             (or (equal (kk.get.value (box boxes) 'IMMOVABLE) t)
                                 (and (< (- range-to-clear-start-time (- (kk.get.value (box boxe
s) 'END-TIME)
                                                                            (kk.get.value (box boxe
s) 'START-TIME)))
                                         earliest-start)
                                      (not (equal right-box box)))))
                   collect box)))
      (when blockers    ; the leftmost blocker
        (first blockers)))))


;;; ---------- Comments on changing shift-schedule-right
;;;
;;; 1-  No boxes are discarded here-  They are discarded in delete-past-ft2 in fcs-lisp-
;;;  Simply check to make sure the box is not an initial activity (another slot?)-
;;;
;;; 2-  To overlap process and down (unavailable) boxes in shift-schedule-right:
;;;  a-  Jump-over-fixed-boxes should jump over just the non-U boxes-
;;;      For U boxes, and the box being shifted is a P box,
;;;       it should jump over them if the start-time < current-start-time- (at the last line)
;;;  b-  In adjust-right, when find a place for an immovable box, if the box is U
;;;       look for prev-box-start-time < start-time, as opposed to prev-box-end-time < start-time
-
;;;


;;;  ---------------------------- RESCHEDULE LEFT ----------------------------


;;; -------------------- GENERAL DESCRIPTION OF RESCHEDULE-LEFT --------------------
;;;
;;; The purpose of this function is to move boxes to the left, thus front-loading the factory
;;; with work-  This changes the nature of the scheduler and removes some of the JIT quality
;;; of the schedule-
;;; The following is a pseudo-code description of the algorithm:
;;;
;;; 1-  reschedule-left -- Get all the boxes on all the trays and sort these boxes by time-
;;;      For each box (in sorted order), use reschedule-box-left to use agv-time and lead-time an
d
;;;      do fit-box-left on this box-
;;;
```

```
;;; 2-  fit-box-left -- For this box (which must be a P box), try to just slide it over to the l
eft to
;;;     abut the predecessor box (if it is a P box and the left-box is an S box, move them both)
-
;;;     Then call fit-box-left-jump to try to jump the box over the left boxes-
;;;
;;; 3-  fit-box-left-jump -- Find the first box on this machine that ends after the earliest-sta
rt-time-
;;;     Then after each box, try to find a big enough gap using fit-box-p-
;;;     Use moving-nowhere to check for just trying to jump over our own setup box-
;;;     Then call insert-box-left to insert the box in this gap-
;;;
;;; 4-  insert-box-left -- move a box to a new location, use delete-setup-box to delete setup bo
xes-
;;;     a-  Remove the box from its current location and delete any unnecessary setup boxes in t
his old location-
;;;     b-  Remove any unnecessary setup boxes in the new location-
;;;     c-  Insert the box-
;;;     d-  Create any new setup boxes required using create-setup-box-
;;;
;;; 5-  fit-box-p -- Determine if this box will fit, and return a list of
;;;         (left-setup-duration right-setup-duration start-time left-start-time right-start-time
)
;;;     where these 2 setup times are the amount of time needed for a setup on the left and a se
tup on the right-
;;;
;;;     a-  The previous process box may have the same pvor, in which case we can just insert th
e box-
;;;     b-  Otherwise, we must add a left setup-box-  Now determine how large the pocket is, bas
ed on
;;;     earliest-start-time (which takes care of agv-move-time + end-time of same-tray-predecess
or)-
;;;     Remember that the process box can only start after earliest-start-time, but the left set
up box
;;;     can start after the left-box end-time-  Be careful with the logic-


;;;================================================================ 9/13/88 ------------- NEWEST
(defvar *resched-events* 0)
(defun reschedule-left (&optional (delta-time (* 5 86400)))      ; default is 5 days forward
  "This is also known as compact-left"
  (let ((msg-output-window (get.value *control-unit* 'msg-output-window)))
    (expose msg-output-window)
    (format msg-output-window "~%% Compacting the schedule left ")
    (resched-rating)
    (setq *time1* (time))
    (setf *events* 0)
    (setf *resched-events* 0)
    (loop for i from 1 to 2
          while (or (= i 1)(not (zerop *resched-number*)))
          do
          (reschedule-left-aux delta-time)
          (format msg-output-window "(moved ~a) " *resched-events*))
    (setq *time2* (time))
    (report-execution-time msg-output-window)
    (extra-setups?)
    ;;(feasibility-caller)
    (check-all)
    nil))

(defun reschedule-left-aux (&optional (delta-time (* 5 86400))) ; default is 1 day forward --- N
EWEST
  "This function reschedules boxes within a time period of BC to BC+delta-time-
   It tries to move boxes to the left as far as possible (but greater than frozen-time-1), jump
ing over boxes-
   All same-tray-successor boxes are shifted as well-
   Do this only for trays whose start boxes are greater than frozen-time-1 and within the BC+de
lta-time-"
  ;; Loop thru all the trays and start with the initial box on each tray-  Only use the boxes th
at are on trays, ie, just the P boxes-
```

```
(setf *rescheds* nil)
(setf *resched-reports* nil)
(let* ((bc-time (get.value *control-unit* 'BUILD-CONTEXT-TIME))
      ;;      (frozen-time-1 (get.value *control-unit* 'FROZEN-TIME-1))
      (final-time (+ delta-time bc-time))
      (boxes nil)
      sorted-boxes setup-time earliest-start-time frozen-time-2)

;    (setq boxes
;         (loop for box in (unit.children 'boxes 'member)
;               for machine = (kk.get.value (box boxes) 'machine)
;               for frozen-time-2 = (when machine (get.value machine 'frozen-time-2))
;               for start-time = (kk.get.value (box boxes) 'start-time)
;               for box-type = (kk.get.value (box boxes) 'box-type)
;               when (and start-time
;                         (memq box-type '(X R))
;                         (< start-time final-time)
;                         (> start-time frozen-time-2))
;               collect box))

  (loop for tray in (get-trays-in-system)
        ;;xxx???yyycrj          ; get all boxes on a tray for all trays
        do
        (let* ((box (kk.get.value (tray trays-in-system) 'INITIAL-BOX)))
          (when box
            (setq frozen-time-2 (get.value (kk.get.value (box boxes) 'machine) 'frozen-time-2)
)
            (loop while (and box (kk.get.value (box boxes) 'START-TIME)
                             (let ((start-time (kk.get.value (box boxes) 'START-TIME)))
                               (and (< start-time final-time)
                                    (> start-time frozen-time-2))))
                  (push box boxes)
                  (setq box (kk.get.value (box boxes) 'SAME-TRAY-SUCCESSOR))))))

  (setq sorted-boxes (sort boxes #'(lambda (box1 box2) (< (kk.get.value (box1 boxes) 'START-TI
ME)
                                                        (kk.get.value (box2 boxes) 'START-TI
ME)))))
  ;;;(setq sorted-boxes (left-shift-sorted-boxes ))
  (loop for box in sorted-boxes do
        (let* ((start-time (kk.get.value (box boxes) 'START-TIME))) ;; 8/15/89
          ;;   add the line below to reset ft2 for each box considered in compact left
DHO       4-24-89
          (setq frozen-time-2 (get.value (kk.get.value (box boxes) 'MACHINE) 'FROZEN-TIME-2))
          (when (eq *resched-debug* (unit.name box)) (print (list 'rel box start-time frozen-t
ime-2))) ;; 8/15/89
          ;;(push (list box (min frozen-time-2 (kk.get.value (box boxes) 'start-time))) *rtime
s*)
          ;;   4-24-89  DHO  changed slot from activity-id to from-previous-schedule on next l
ine -- in case any regeneration of activity id's
          (when (and (not (kk.get.value (box boxes) 'FROM-PREVIOUS-SCHEDULE)) ; Dont move the
boxes from previous schedule-
                     (< frozen-time-2 start-time))  ;;; 6-16 - test for before frozen-time-2
;
8/15/89
          ;;   adjust possible early start to consider setup time - can't compact the setup
left of FT2       DHO      6-30-89
            (setq setup-time (fourth (get.value (kk.get.value (box boxes) 'operation) 'setup-t
imes)))
            (setq earliest-start-time (+ frozen-time-2 setup-time))
            (when (< earliest-start-time start-time)  ;; 8/15/89 -- Dont try to resched: earli
est-start-time too late.
              (reschedule-box-left box earliest-start-time)))))))


(defvar *reschedule-left-version* 'OLD)                ;; Value is OLD or NEW.


(defun reschedule-box-left (box earliest-start-time)
  ;;   changed 2-14-89 to handle multiple tray predecessors in compact left phase        DHO
  (let* ((latest-predecessor-end (latest-predecessor-end-and-move box))
```

```
(when latest-predecessor-end
  (setq earliest-start-time (max earliest-start-time latest-predecessor-end)))

(case *reschedule-left-version*
('OLD (fit-box-left box earliest-start-time))
('NEW (determine-position-forward-left box earliest-start-time))
(T nil))))



;;; ---------------------- Don't move to other machines ----------------------
(defvar *resched-test* 0)

(defun fit-box-left (box earliest-start-time)
  (cond ((eq (get.value (kk.get.value (box boxes) 'machine) 'infinite-capacity) 'YES)
        ;; Special case -- use original earliest-start-time for start-time for infin-cpy.
        (let* ((duration (- (kk.get.value (box boxes) 'end-time) (kk.get.value (box boxes) 'sta
rt-time))))
          (kk.put.value (box boxes) 'start-time earliest-start-time)
          (kk.put.value (box boxes) 'start-time (+ earliest-start-time duration))))
       (t
        (fit-box-left-jump box earliest-start-time))))

;;; 3-  fit-box-left-jump -- Find the first box on this machine that ends after the earliest-sta
rt-time-
;;;     Then after each box, try to find a big enough gap using fit-box-p-
;;;     Use moving-nowhere to check for just trying to jump over our own setup box-
;;;     Then call insert-box-left to insert the box in this gap-
;;;

(defvar *bill* nil)  ;;'(box2063))

(defun fit-box-left-jump (box earliest-start-time &optional dont-delete)
  "Try to jump over other P boxes; therefore, we might add and/or delete S boxes."
  (let* ((machine (kk.get.value (box boxes) 'MACHINE))
        (old-start-time (kk.get.value (box boxes) 'START-TIME))
        (next-xpe-box (next-xpe-box box machine))
        (latest-end-time (if (eq (get.value machine 'INFINITE-CAPACITY) 'YES) *plus-eternity*
                             (kk.get.value (next-xpe-box boxes) 'START-TIME)))
        (batchable-part (batchable-part-and-machine box))        ;;  added 4-24-89   DHO
        (results nil)
        (real-pocket nil)
        ;;  added slot to control.unit for parameterization of batched parts in reschedule left
   DHO  4-12-89
        (batch-gap (* 3600 (get.value 'CONTROL-UNIT 'TIME-GAP-FOR-ALLOWING-TWO-SETUPS-IN-RESCHE
DULE-LEFT)))
        (required-overlap (get.value machine 'percentage-required-for-overlap))        ;;  DHO   6
-26-89
        (left-process (previous-process-box box))                                      ;;  DHO   6
-26-89
        (right-process (next-process-box box machine))                                 ;;  DHO  6-
26-89
        (old-pocket (list left-process right-process))                                 ;;  DHO  6-
26-89
        pockets new-start-time)
    (recheck9 'tryjump box results real-pocket)

    (unless dont-delete
      (remove-box box)            ; Remove from current location
      (delete-setups-as-required box))  ;; Delete setups from where we are removing the box

    (setq pockets (process-pockets-in-range machine earliest-start-time latest-end-time))

    (loop for pocket in pockets
          for first-pocket = (first pocket)
          for second-pocket = (second pocket)
          while (not real-pocket)
          when (and (not (eq box first-pocket))(not (eq box second-pocket))) ;; pockets-in-range
 will get this box also - so filter it here.
          do
```

```
        ;;(print (list box pocket))
;  (left-setup-duration left-start-time box-after-left-setup duration start-time box-BEFORE-box
right-setup-duration right-start-time box-after-right-setup)
        (setq results (fit-box-p box machine first-pocket second-pocket earliest-start-time la
test-end-time 'LEFT
                                 required-overlap))
        (let* ((left-setup-duration (or (first results) 0))
               (right-setup-duration (or (seventh results) 0)))
          (setq new-start-time (fifth results))
          (when
            (and results
                 (<= new-start-time old-start-time)
                 (or (not batchable-part)
                     (= new-start-time old-start-time)
                     (equal old-pocket pocket)                               ;;;     DHO    6-26-8
9
                     ;; If it is batchable:
                     (if (or (zerop left-setup-duration) (zerop right-setup-duration))
                         T   ;; batchable parts that add 0 or 1 setup
                         ;; else adding 2 setups case -- we might allow if a big enough gap
                         (> (- (kk.get.value (second-pocket boxes) 'START-TIME)
                               (kk.get.value (first-pocket boxes) 'END-TIME))
                            batch-gap))))
            (recheck1 box machine pocket results)
            (setq real-pocket pocket))))

    (when (not real-pocket)
      (format t "0% Didn't find a time pocket for box ~a " (unit.name box)) (break))
    (when real-pocket                          ;;(princ ".")
      (when (not (eql old-start-time new-start-time))
        (incf *resched-events*))
      (when (eq box (sixth results)) (print "Found bug") (break))
;;      (when (or (second results)(eighth results)) (princ "S"))
      (let* ((box-before-box (sixth results))
             (next-process-box (next-process-box box-before-box machine))
             (maybe-old-setup-box (previous-setup-or-process-box next-process-box)) ;;(second re
al-pocket)))
             (setup-box-to-delete (when (and maybe-old-setup-box
                                             (eq 'S (kk.get.value (maybe-old-setup-box boxes) 'B
OX-TYPE)))
                                    maybe-old-setup-box)))
;;      (when setup-box-to-delete (princ "D"))

        (implement-alternative-aux
          box machine
          (first results)(second results)(third results)(fourth results)(fifth results)(sixth re
sults)
          (seventh results)(eighth results)(ninth results) setup-box-to-delete nil real-pocket '
LEFT nil) ; 'REMOVE-BOX)
        (recheck2 box machine real-pocket results box 2)
        (recheck3 box machine real-pocket results box 3)
        ))))


(defun get-my-setup-box (box)
  (let* ((maybe-setup-box (previous-setup-or-process-box box)))
    (when (eq 'S (kk.get.value (maybe-setup-box boxes) 'BOX-TYPE)) maybe-setup-box)))


(defun recheck9 (msg box results real-pocket)
  (when (memq (unit.name box) *bill*)
    (print msg)(print box)(print results)(print real-pocket)(break)))


(defun recheck1 (box machine pocket results) nil)

(defun recheck19 (box machine pocket results)
  "Check BEFORE moving the box"
  (unless (eq (get.value machine 'INFINITE-CAPACITY) 'YES)
```

```
   (let* (;;(left (first pocket))
          ;;(right (second pocket))
          (right (next-process-box (sixth results) machine))
          (left (previous-process-box right))
          (left-type (kk.get.value (left boxes) 'BOX-TYPE))
          (right-type (kk.get.value (right boxes) 'BOX-TYPE)))
     (when (or (and (eq left-type 'P) (not (same-pvor-p box left)) (not (second results)))
               (and (eq right-type 'P)(not (same-pvor-p box right)) (not (eighth results))))
       (print "Recheck1 found one")
       (print box)
       (print pocket)
       (print results)
       (break)))))


(defun recheck2 (box machine pocket results orig-box n)
  "Check AFTER moving the box"
  (unless (eq (get.value machine 'INFINITE-CAPACITY) 'YES)
    (let* ((prev (previous-setup-or-process-box box))
           (prev-proc (when prev (if (not (eq 'S (kk.get.value (prev boxes) 'BOX-TYPE))) prev
;; added WHEN PREV  6-29-89
                                      (previous-setup-or-process-box prev))))
           (machine (kk.get.value (box boxes) 'machine))
            ;;   don't always need setup between different PVOR's        DHO        6-30-89
           (need-setup (if (not (eql 0 (get-setup-time prev-proc box machine)))
                           T
                           NIL)))
      (when (and prev prev-proc
                 (not (same-pvor-p box prev-proc))
                 (not (eq 'S (kk.get.value (prev boxes) 'BOX-TYPE)))
                 need-setup)
        (print (list "Recheck2 found one" n))
        (print box)
        (print orig-box)
        (print pocket)
        (print results)
        (break))

      (when prev
        (when (eq 'S (kk.get.value (prev boxes) 'BOX-TYPE))
          (let* ((prev-next (kk.get.value (prev boxes) 'same-machine-successor))
                 (prev-end (kk.get.value (prev boxes) 'END-TIME))
                 (next-start (kk.get.value (prev-next boxes) 'START-TIME)))
            (when (not (= prev-end next-start))
              (print (list "Recheck2 found setup not abutting next box" n))
              (print (list 'end (utime-to-string prev-end) 'start (utime-to-string next-start)))
              (print box)
              ;;(print orig-box) (print pocket) (print results)
              (break)))))))


(defun recheck3 (box machine real-pocket results orig-box n)
  (let* ((next (next-process-box box machine)))
    (when next
      (recheck2 next machine real-pocket results orig-box n))))

(defun batchable-part-and-machine (box)
  "Function to see if a box is batchable (for this part and machine) "
  (let* ((box-part (unit.name (kk.get.value ((kk.get.value (box boxes) 'TRAY) trays-in-system) '
PART-ID)))
         (box-machine-class (unit.name (get.value (kk.get.value (box boxes) 'OPERATION) 'POSSIBL
E-MACHS-CLASS)))
         match part machine-class)
    (loop for entry in (get.values 'CONTROL-UNIT 'PARTS-TO-BATCH)
          until match do
          (setq part (first entry))
          (setq machine-class (unit.name (second entry)))
          (when (and (eq box-part part) (eq box-machine-class machine-class))
            (setq match t)))
    match))
```

```
;;; ---------------------- Reschedule to different machines ----------------------
(defun determine-position-forward-left (box desired-start-time)
  " Function to forward schedule both safety stock replenishment and component orders"
  (let* (test-alternative)
    (kk.put.value (box boxes) 'DESIRED-START-TIME desired-start-time)
    (kk.put.value (box boxes) 'DESIRED-END-TIME (kk.get.value (box boxes) 'END-TIME))
    (setq best-alternative (forward-schedule-left box)) ; find best time  on  machine
    (cond ((and best-alternative
                (< (kk.get.value (best-alternative alternatives) 'PROCESS-START-TIME)
                   (kk.get.value (box boxes) 'START-TIME)))
           ;;(print (list "Found an alt for: " (unit.name box)))
           (implement-alternative best-alternative box 'remove-box)))))

(defun forward-schedule-left (box)
  " Similar to determine-machine-for-this-process except modified for forward scheduling"
  (let* (primary-machines
         ;;(tray (kk.get.value (box boxes) 'TRAY))
         (possible-machines (dolist (entry (get.values (kk.get.value (box boxes) 'OPERATION) 'EL
IGIBLE-MACHINES))
                              (dotimes (number-machines (first entry))
                                (setq primary-machines (append primary-machines
                                                               (list (nth (+ 1 number-machines)
entry)))) )
                              (return (cdr entry))))
         alternative)
    (when (not possible-machines)
      (format t "~% No preferred machines for part ~a " (unit.name (kk.get.value ('kk.get.value
(box boxes) 'TRAY) trays-in-system) 'PART-ID))))
    (alternatives-recycle-alternatives)
    (generate-alternatives-forward primary-machines 1 possible-machines box nil)
    (setq alternative (get.value 'ALTERNATIVES 'BEST-ALTERNATIVE))
    alternative))



;;; ---------------------- debugging functions ----------------------
(defun tm (tt) ;; (- tt 2802000000))
  (utime-to-string tt))

(defun setup-box-p (box) (eq 'S (kk.get.value (box boxes) 'box-type)))

(defun du (u) (display-unit u))

(defun tbb ()
  (init-and-run)
  (format T "Events: ~a~%" *events*)
  (utilize-onhand-inventory)
  (shift-schedule-right)
  (check-all)
  (reschedule-left)
  (format T "Events: ~a~%" *events*)
  (check-all)
  nil)

(defun in-resched (box-name-list)
  (let* ((boxes (loop for name in box-name-list collect (unit name))))
    (loop for r in *rescheds*
          when (intersection r boxes)
          do (print r))))

(defun report-resched ()
  (loop for item in (reverse *resched-report*) do
        (format T "Moved box ~a on machine ~a  from ~a to between ~a and ~a~%" (unit.name (first
item))
                (unit.name (second item))
                (subseq (utime-to-string (third item)) 5 19)
                (subseq (utime-to-string (fourth item)) 5 19)
                (subseq (utime-to-string (fifth item)) 5 19))))
```

```
;;; &&&

(defun adjust-left-box (box latest-end-time &optional call)
  "Adjust this box left, beyond the latest-end-time- If movable, move its times- If immovable,
shift its pointers-"
  call  ; ignore -- used for debugging only
  ;; Called first with latest-end-time = start-time of the box we want this box to precede-
  (let* (same-machine-predecessor same-tray-predecessor)
    (cond ((movable-p box)          ;; box is movable
           ;;(when (not (kk.get.value (box boxes) 'FROM-PREVIOUS-SCHEDULE))
           ;;(setq latest-end-time (max latest-end-time *shift-right-ft1-time*)))
           (let* ((shift-amount (determine-left-shift-amount box latest-end-time))
                  (start-time (+ (kk.get.value (box boxes) 'START-TIME) shift-amount))
                  (end-time (+ (kk.get.value (box boxes) 'END-TIME) shift-amount)))
             (when (< shift-amount 0)   ; otherwise, quit-
               (setf same-machine-predecessor (kk.get.value (box boxes) 'SAME-MACHINE-PREDECESSO
R))
               (setf same-tray-predecessor (kk.get.value (box boxes) 'SAME-TRAY-PREDECESSOR))
               (kk.put.value (box boxes) 'START-TIME start-time)        ; adjust current box
               (kk.put.value (box boxes) 'END-TIME end-time)
               (setq latest-end-time start-time))))

          ;; else box is immovable -- find the place to slide it left to
          (t (let* ((end-time (kk.get.value (box boxes) 'END-TIME))
                    (next-box (kk.get.value (box boxes) 'SAME-MACHINE-SUCCESSOR))
                    (next-next-box (when next-box (kk.get.value (next-box boxes) 'SAME-MACHINE-S
UCCESSOR))))
               ;; The next 2 lines use the start-time of the next-box to allow for overlap-
               (when (and next-box (< (kk.get.value (next-box boxes) 'END-TIME) end-time))
; otherwise, quit-
                 (loop while (and next-next-box (< (kk.get.value (next-next-box boxes) 'END-TIME
) end-time))
                       do
                       (setq next-box next-next-box)
                       (setq next-next-box (kk.get.value (next-box boxes) 'SAME-MACHINE-SUCCESSO
R)))
                 (setf same-machine-predecessor (kk.get.value (box boxes) 'SAME-MACHINE-PREDECES
SOR))
                 (left-shift-pointer-update next-box box)))))
    (when same-machine-predecessor
      (adjust-left-box same-machine-predecessor latest-end-time 'SAME-MACH))

    ;; This is not a problem when adjusting left-  We always find the S boxes to push-
    ;;(when same-tray-pred1                                 ;; Use the next setup box for the tray-
    ;; (let* ((tray-successor-machine-predecessor (kk.get.value (same-tray-successor boxes) 'SAM
E-MACHINE-PREDECESSOR)))
    ;; (when (and tray-successor-machine-predecessor
    ;; (eq 'S (kk.get.value (tray-successor-machine-predecessor boxes) 'BOX-TYPE)))
    ;; (setq same-tray-successor tray-successor-machine-predecessor))))

    (when same-tray-predecessor
      (adjust-left-box same-tray-predecessor *plus-infinity* 'SAME-TRAY))))


(defun determine-left-shift-amount (box latest-end-time)
  "Readjusts how much to shift a box to the left at the end of a schedule-
    Returns shift-amount -- We are positive that the box can be placed at the returned location-
    The box must be moved a minimum of latest-end-time to the left-"
;;  May work as is for now but needs to be rewritten more generically to handle the possibility
of multiple predecessors        DHO    2-16-89
  (let* (;;(box-type (kk.get.value (box boxes) 'BOX-TYPE))
         (old-start-time (kk.get.value (box boxes) 'START-TIME))
         (old-end-time (kk.get.value (box boxes) 'END-TIME))
         (same-tray-successor (kk.get.value (box boxes) 'SAME-TRAY-SUCCESSOR))
         (agv-move-time (when same-tray-successor
                          (let* ((tray (kk.get.value (box boxes) 'TRAY))
                                 (machine (kk.get.value (box boxes) 'MACHINE)))
                            (+ (get-agv-time (kk.get.value (box boxes) 'MACHINE)
                                             (kk.get.value (same-tray-successor boxes) 'MACHINE)
                                             (list box tray same-tray-successor))
                               (retrieve-process-times tray (kk.get.value (box boxes) 'OPERATION
```

```
; ;;; 888
                                        machine 'LEAD-TIME)))))
        ;; If it is an S box, shifting left is easy - same-machine-pred takes care of it-
        (succ-start-time (or (when same-tray-successor
                             (- (kk.get.value (same-tray-successor boxes) 'START-TIME) agv-mo
ve-time))
                            *plus-infinity*))
        (end-time (min old-end-time latest-end-time succ-start-time))
        shift-amount)
    (setq shift-amount (- end-time old-end-time))
    (when (plusp shift-amount) (setq shift-amount 0))
    (when (minusp shift-amount)                          ; we must shift left
      (setq shift-amount (jump-left-over-fixed-boxes shift-amount end-time (- old-end-time olds
tart-time) box)))
    shift-amount))



(defun left-shift-pointer-update (next-box box)
  "Next-box is somewhere left of box- Move box just to the left of next-box-   Fix all the point
ers-"
  (remove-box box)
  (insert-box box next-box))



(defun jump-left-over-fixed-boxes (shift-amount end-time duration in-box)
  "This returns the shift-amount for in-box where in-box can be placed (shifting left)-  It must
 be placed at least at end-time, and in-box is duration long-
      Go down the chain of boxes-
      If the box (start-time) is after the current-end-time, ignore it-
      If current-end-time-duration >= box end-time, done - exit-
      If the box is of type U, and current-end-time-(duration * percent / 100) >= end-time, done
 - exit-
      If the box is immovable, bump current-end-time up to its end, go to next box-
      If current-end-time-duration >= next-box end-time, done - exit-
      Else go to next box-"

  (when (eq 'S (kk.get.value (in-box boxes) 'BOX-TYPE))    ;; Increase duration to include the fo
llowing P box-    bill   2/9/89
    (let* ((next-process-box (next-process-box in-box (kk.get.value (in-box boxes) 'MACHINE))))
      (when next-process-box
        (setq duration (+ duration (- (kk.get.value (next-process-box boxes) 'END-TIME)
                                      (kk.get.value (next-process-box boxes) 'START-TIME)))))))
 (let* ((current-end-time end-time)
        (done nil)
        ;;(percent (if (eq 'ACTIVITY (kk.get.value (in-box boxes) 'FROM-PREVIOUS-SCHEDULE))
        ;;0              ;; must always keep current activities - thus, any overlap is ok
        ;;(get.value (kk.get.value (in-box boxes) 'MACHINE) 'PERCENTAGE-REQUIRED-FOR-OVERLAP)))
        ;;(in-box-type (kk.get.value (in-box boxes) 'BOX-TYPE))
        next-box)
   (loop for box = in-box
         then next-box
         for end-time = (when box (kk.get.value (box boxes) 'END-TIME))
         until (or (null box) done)
         do
         (setq next-box (kk.get.value (box boxes) 'SAME-MACHINE-PREDECESSOR))
         (when (> current-end-time (kk.get.value (box boxes) 'START-TIME))      ; otherwise, ign
ore it-
           (cond ((>= (- current-end-time duration) end-time)
                  (setq done T))
                 ((eq 'E (kk.get.value (box boxes) 'BOX-TYPE))
                  (format T "Trying to move left of E box ~a   inbox ~a~%" (unit.name box)(unit
.name in-box))
                  (break))
                 ;;; !!!!! This is the piece of code that allows overlaps !!!!!!!
                 ;;;((and (equal 'U (kk.get.value (box boxes) 'BOX-TYPE))
                 ;;;(equal 'P in-box-type)
                 ;;;(>= (- current-end-time (floor (* percent duration) 100)) end-time))
                 ;;;(setq done T)) ;;; xxx commented out for now- Do we overlap going left?
```

```
                ((not (movable-p box))
                 (setq current-end-time (min current-end-time (kk.get.value (box boxes) 'START
-TIME))))
                (t (let* ((next-box-end-time
                           (if next-box (kk.get.value (next-box boxes) 'END-TIME) *minus-infi
nity*)))
                     (when (>= (- current-end-time duration) next-box-end-time)
                       (setq done T)))))))
    (+ shift-amount (- current-end-time end-time))))


(defun tell (box &optional times-t loop-t)
  (let* ((next (get.value box 'same-machine-successor))
         (nnext (when next (get.value next 'same-machine-successor)))
         (prev (get.value box 'same-machine-predecessor))
         (pprev (when prev (get.value prev 'same-machine-predecessor)))
         (ppprev (when pprev (get.value pprev 'same-machine-predecessor))))
    (format T "U%Machine:  UaU%U%" (get.value box 'machine))
    (when ppprev (tell2 ppprev "PPPrev" times-t))
    (when pprev  (tell2 pprev  " PPrev" times-t))
    (when prev   (tell2 prev   "  Prev" times-t))
    (tell2 box   "   Box" times-t)
    (when next   (tell2 next   "  Next" times-t))
    (when nnext  (tell2 nnext  " NNext" times-t))
    (when loop-t
      (loop while (and next (setq next (get.value next 'same-machine-successor)))
            do (tell2 next " ... " times-t)))
    ))

(defun tell2 (box label times-t)
  (format T "Ua:    Ua  type: Ua  pvor: UaU%" label (unit.name box) (get.value box 'box-type)
          (get-box-pvor (unit box)))
  (when times-t
    (format T "                              start: Ua  end: UaU%" (utime-to-string (get.value box 'ST
ART-TIME))
            (utime-to-string (get.value box 'END-TIME)))))


(defun ts () (tell-setups))

(defun tell-setups (&optional machine)
  (format T "U%")
  (let* ((box (get.value (or machine 'GEN-BROACH-1) 'FIRST-BOX-ON-MACHINE)))
    (loop while box
          do
          (print (get.value box 'BOX-TYPE))
          (setq box (get.value box 'SAME-MACHINE-SUCCESSOR)))))

(defun resched-rating ()
  (let* ((count 0)
         (sum 0)
         (bc-time (get.value *control-unit* 'BUILD-CONTEXT-TIME))
         rating)
    (loop for box in (unit.children 'boxes 'member) do
          (let* ((start-time (kk.get.value (box boxes) 'START-TIME))
                 (type (kk.get.value (box boxes) 'BOX-TYPE)))
            (when (and start-time
                       (eq type 'P)
                       (> start-time bc-time))
              (incf count)
              (incf sum (- start-time bc-time)))))
    (setq rating (floor sum count))
;;    (format T "Rating -- boxes: Ua  sum: Ua  ave: Ua  in days:  UaU%" count sum rating (/ rati
ng 86400.0))
    ))

(defun fit-infinite-cpy (box machine duration earliest-start-time)
  "This is a special case to determine how to link box into the pointers for an infinite-capacit
y machine."
  box ; ignore
```

```
(let* ((done nil)
       (left-box nil)
       (old-start-time 0))
  (loop for next-box = (get.value machine 'first-box-on-machine)
        then (kk.get.value (next-box boxes) 'same-machine-successor)
        while (and next-box (not done))
        for start-time = (kk.get.value (next-box boxes) 'START-TIME)
        do
        (setq old-start-time start-time)
;       (print (list next-box start-time))
        (if (> start-time earliest-start-time)
            (setq done t)
            ;; else
            (setq left-box next-box)))

    (list nil nil nil duration earliest-start-time left-box nil nil nil)))
;;; -*- Mode:Common-Lisp; Package:KEE; Base:10; Fonts:(cptfont HL10B cptfont HL12B HL12BI) -*-

(in-package 'kee)

;;;-----------------------------------
;;;          TRANSLAT.lisp
;;;-----------------------------------

;;  Mark Jeffery, December, 1988, based on work by Ketan Doshi, Summer, 1988.

;;;================================
;;;    Top-level Description
;;;================================

;; This file contains Functions and Globals for the translation of
;; string data from slots in the *DATA-KB* into Units and Slots in the
;; *FACTORY-KB* and *ORDER-KB*, as used by ESS, the Expert System
;; Scheduler.

;; The DATA-KB is built from files.  There is a class unit for each file
;; that has been read, and the members of that class correspond to
;; logical records, where each member unit's slots are named according
;; to the record's fields.  Each slot contains the field value as a
;; string.  This DATA-KB is set up for Saginaw Vanguard's Factory
;; Control System (FCS).

;; There is a Slot-Translation Descriptor for each ESS slot in the ESS
;; KBs.  This Descriptor indicates the ESS class that has the slot, the
;; exact name of the slot, the function that does the translating, the
;; type of values the slot has (SLOT-FORMAT), and the classes and
;; slots in the DATA and ESS KBs that the translation function depends
;; on (SLOT-MAPS).

;; Translation consists of clearing the ESS KBs of old member units and
;; machine values, and then stepping through the Descriptors, in order,
;; listed in the global *SLOT-TRANSLATION-DESCRIPTORS*.  The Translation
;; Function of each Descriptor is run, all the elements of a
;; Descriptor serve as arguments to its Translation Function.  A
;; Translation Function accesses only those classes and slots explicitly
;; listed in the Descriptor's SLOT-MAPS.


;;;------------------------------------------
;;;   Top-level Implementation Notes
;;;------------------------------------------

;; Input values are accessed using the macros GET-MAPPED-VALUES and
;; GET-MAPPED-VALUE, which accept the SLOT-MAPS in the global
;; *SLOT-TRANSLATION-DESCRIPTORS* as arguments.  Thus the data
;; dependency of the translation for each ESS slot is completely
;; explicit.

;; The GET-MAPPED-VALUE macros are set up to optimize the collecting of
;; units and slot values, depending on the form of the SLOT-MAP.  This
```

```
;; permits the Translation Functions to be written for clarity of logic,
;; rather than for optimization of data access.

;; All final values are installed using the function PUT-VALUE-TYPE,
;; which understands the SLOT-FORMAT portion of the Slot-Translation
;; Descriptor. This simplifies making changes to the data type and
;; structure of a value, and permits automated testing of installed
;; values for correct format.

;; Executing the form (SET-MESSAGE-DETAIL 'max) causes PUT-VALUE-TYPE to
;; print each value on the screen as it is being installed, according
;; to the SLOT-FORMAT.  This is a useful debugging aid.

;; Any additional performance demands on the translator can be met by
;; further optimizing the data accessing of the GET-MAPPED-VALUE macros.
;; For example, the association-list cache used for unit indexing could
;; be replaced with a hash table.


;;;-------------------------------
;;;   Making Changes: Overview
;;;-------------------------------

;; To change HOW a slot value is calculated, update the Translation Function to
;; perform the new calculation, and add or modify the SLOT-MAPS (see below) in
;; that slot's Slot-Translation Descriptor to reflect any changed data dependencies.

;; In order to change the data type or structure of a value, update its
;; SLOT-FORMAT in the Slot-Translation Descriptor to indicate the new form.
;; Then change all Translation Functions that depend on that value (as indicated
;; by the SLOT-MAPS in later Slot-Translation Descriptors) to take the changed
;; data-type or structure into account.

;; To change the name of a slot, just change all occurrences of it in the
;; Slot-Translation Descriptors, and in the initialization procedures.

;; In any case, changes to the translator may require additional changes
;; to the post-translation data checking code (CHECKDAT.lisp) and to the
;; ESS scheduling code.

;; Note that the ORDER of the Slot-Translation Descriptors matters; do not
;; change the order unless you check the effects on subsequent descriptors
;; that use that slot value.


;;;---------------------------------------
;;;   NOTES: Warnings, Suggestions
;;;---------------------------------------

;; WARNING:  Required non-productive parts is not yet translated.
;; WARNING:  TRANS-OPERATION-REQUIRED-PRODUCTIVE-PARTS -- since no SOT index now,
;;           extra level of nesting eliminated.
;; WARNING:  Does checkdat eliminate bad orders (using order-table op, or only part FC?)
;; WARNING:  The global *VALID-PARTS-LIST* must be manually maintained.
;;           Any new part should be added to the list.
;; WARNING:  All MACHINEs must appear in *FACTORY-KB*, with their CELLID slots
;;           set to the corresponding CELL-NAME.

;; Add a glossary?  DATA-CODE FC SRT SOT SELF UTIME SLOT-MAP SLOT-FORMAT...
;; Add UNIT.EXISTS.IN.CLASS.P as a predicate to simplify code?
;; Put FILFRMT.lisp into a variable?  then could add comments, would be faster.
;; Could add Slot-Translation Descriptors for BUILD CONTEXT slots.
;; DECREMENT-ORDERS-FROM-INVENTORY should permit restoration without using inventory.
;; Extend data-checker to permit multiple data-types: machine-name; part-unit; part-unit-or-NIL.
;;
;; ESS should use PIECES-TO-TRAYS and the ON-HAND-WIP fns where possible.
;; ESS should not be using single-value-list; the extra level of nesting seems superfluous.
;; Caching should use TYPE of KEY-VALUE to decide cache entry; else numbers problematic.
;; REMIDAT should check that the space separator is indeed a space.
;; The Data Kb should use VARIABLE-VALUES inheritance for its members.
```

```
;;;=============================================
;;;    Overview: Slot-Translation Descriptors
;;;=============================================

;;  A slot-translation descriptor indicates how a specific ESS Slot
;;  is translated from data in the DATA Kb and ESS Kbs:

;;   (ess-class  ESS-SLOT-BEING-FILLED  translation-fn-being-called
;;               slot-format
;;               slot-map-1
;;               slot-map-2
;;               slot-map-3 ... )

;;  Example: The Slot-Translation Descriptor for the PREFERRED-MACHINES
;;           slot of the OPERATIONS class:

;;   (operations  PREFERRED-MACHINES  trans-operation-preferred-machines
;;                (multiple-values-in-list symbol machine)
;;                (Operations-Facility-Preferences-File Operation-Name
;;                              Cell-Name Record-Sequence)
;;                (Machines Cellid Self))


;;;---------------------------------------------------------------------------
;;;  SLOT-MAP: (<class> <key-slot> <slot1> <slot2> <slot3> ...)
;;;---------------------------------------------------------------------------

;; A SLOT-MAP indicates which DATA Kb slots and ESS Kb slots a
;; translation function depends on.  For all units in <CLASS> whose
;; <KEY-SLOT> matches a given value, all the values for the slots
;; <SLOT1>, <SLOT2>, <SLOT3>, etc., are collected.

;; <KEY-VALUES are coerced so that a string matches a unit, a symbol
;; matches a string, etc.  Note, however, that the slot values being
;; collected are NOT coerced; they are returned exactly as they are.
;; For example, some slots, such as DATA-CODE, contain strings, while
;; others have symbols, units, lists, etc.

;; Each unit has a SELF slot containing its own unitname.  Thus as a
;; <KEY-SLOT>, SELF means find a unit whose SELF slot matches the
;; <KEY-VALUE> -- i.e., collect the values from the <KEY-VALUE> unit
;; itself.  As a slot to collect, SELF means collect the name of the
;; unit from which the slots are being retrieved.  The appearance of
;; SELF as a slot to collect indicates that the translation depends
;; on the name of the unit involved.

;;;---------------------------------------------------------------------------
;;;   SLOT-FORMAT:  (<put-value-type> <data-type> <data-role>)
;;;---------------------------------------------------------------------------

;; A SLOT-FORMAT is a list, specifying information about the ESS slot
;; being filled, including its PUT-VALUE-TYPE, its DATA-TYPE, and its
;; DATA-ROLE.

;;  A: PUT-VALUE-TYPE: This indicates whether there are multiple values,
;;                     and whether they appear nested in a list or not.
;;                     The function PUT-VALUE-TYPE performs the installation:

;;     PUT-VALUE-TYPE          Equivalent PUT.VALUE          Exact Equivalent KEE User Fn

;;     SINGLE-VALUE            (put.value unit slot value)          put.value
;;     MULTIPLE-VALUES         (put.valueS unit slot value)         put.values
;;     SINGLE-VALUE-IN-LIST    (put.value unit slot (LIST value))   put.list.value
;;     MULTIPLE-VALUES-IN-LIST (put.valueS unit slot (LIST value))  put.list.values

;;  B: DATA-TYPE: This describes the Lisp data type that EACH value should
;;                have.  For example, a data-type of INTEGER implies that
;;                each value being calculated must be an integer.  Note that
;;                for MULTIPLE-VALUES-IN-LIST, there is only one KEE slot
;;                value, but the DATA-TYPE refers not to the KEE slot value,
;;                but rather to the multiple-values being calculated.  Each
;;                one must be an INTEGER.
```

```
;;                      Any Common Lisp data type is a legal DATA-TYPE, such as
;;                      INTEGER, STRING, NULL, etc.  UNIT and SYMBOL-OR-STRING
;;                      are also recognized; more could be added.  If the DATA-TYPE
;;                      is a LIST, such as (INTEGER INTEGER SYMBOL), then each
;;                      value must also be a LIST, with the elements of the list
;;                      having the indicated types, such as (234 56 FOO) or (0 0 BAR).

;;                      The last type in a LIST DATA-TYPE is implicitly repeated for
;;                      any extra elements.  Thus (integer symbol) will work for the
;;                      case (234 FOO BAR BOO).

;;                      (CHECK-SLOT-FORMATS) is used to check that the PUT-VALUE-TYPE
;;                      and DATA-TYPE restrictions are in fact satisfied for all
;;                      slots that have values; the call is done by DO-PRE-PROCESSING,
;;                      after all translation and other data checking is complete.
;;                      No values are deleted or changed; just a message appears.

;;                      Note that a slot without a value is considered OK, but
;;                      for a LIST DATA-TYPE, any value that does exist must have
;;                      at least as many elements as the DATA-TYPE has.

;;   :DATA-ROLE:        This is a COMMENT describing the meaning of the components
;;                      that make up a value.  It should mirror the structure of the
;;                      DATA-TYPE, and include useful information such as what class
;;                      a component element belongs to, the units for a number, etc.

;;                      Examples:    DATA-TYPE            DATA-ROLE

;;                                   integer              number-trays
;;                                   unit                 part
;;                                   (symbol integer)     (machine  duration-in-seconds)


;;;-------------------------------------------------------------------
;;;   GET-MAPPED-VALUE(S): Using SLOT-MAPS to access slot values
;;;-------------------------------------------------------------------

;; A SLOT-MAP, consisting of (<class> <key-slot> <slot1> <slot2> ...)
;; is used to retrieve the slot values for <slot1>, <slot2>, etc.,
;; for all units in <class> whose <key-slot> matches a given <key-value>.
;; All units have a SELF slot, containing the name of the unit; the SELF slot
;; can appear as a KEY-SLOT, or as a SLOT to retrieve -- just like any other slot.

;; The functions GET-MAPPED-VALUES and GET-MAPPED-VALUE perform the
;; mapping of a KEY-VALUE into slot values.  A KEY-VALUE is coerced to
;; a symbol, so that matching of strings, symbols, units, etc., works;
;; 'SOFT, "SOFT", and #Unit: SOFT AxLEX will all match.

;; Arguments: (GET-MAPPED-VALUE key-value class-key-slots)
;;            (GET-MAPPED-VALUES key-value class-key-slots)

;; Note: (get-mapped-value ...) = (FIRST (get-mapped-values ...)), but it's faster.

;; If there is just one slot being collected, then all the non-NIL slot
;; values for all units whose KEY-SLOT contains the KEY-VALUE are
;; APPENDED, so that results for GET-MAPPED-VALUES for a slot A looks
;; like (a1 a2 a3 a4 a5 ...).  Duplications can appear, but NIL will not.

;; If there is more than one slot being collected, then all the slot values
;; for each unit are COLLECTED, appearing in their own sublist, so that
;; results for GET-MAPPED-VALUES for slots A, B, and C look like
;; ((a1 b1 c1) (a2 b2 c3) ...), where each sublist is from a different unit.
;; If a slot does not have a value, a NIL appears: ((a1 NIL c1) (a2 b2 c2)).
;; If one of the slots has multiple values, say B, then the multiple values
;; will appear in sub-sublists: ((a1 (b11 b12 b13) c1) (a2 (b21 b22) c3) ...)

;; FEW EXAMPLES:

;;  1. When there are several slots to collect, the values for each unit are
;;     COLLECTED into sublists:
;;
```

```
;;     (GET-MAPPED-VALUES '23FT '(operations part-id possible-machs-class data-output-part-code)
) ===>
;;          ((J&L "07840604-MF-010.001")
;;           (J&L "07840604-MF-020.001")
;;           (GEN-BROACH "07840604-MF-030.001")
;;           (ALMCO "07840604-MF-040.001") ... )

;;  2. When there is just one slot to collect, non-NIL values for each unit
;;     are APPENDED into one list (remember that KEY-VALUES are coerced, so
;;     that in this case a UNIT will match the SYMBOL in the PART-ID KEY-SLOT):

;;     (GET-MAPPED-VALUES #Unit: 23FT AXLEA '(operations part-id possible-machs-class)) ===>
;;          (J&L J&L GEN-BROACH ALMCO OUTSIDE-MACHINES GRINDER POLISHER)

;;  3. When SELF appears as a slot to collect, remember that SELF appears
;;     on every unit, containing the name of the unit.  Thus as a slot to collect,
;;     it means collect the name of the unit whose slots are being retrieved:

;;     (GET-MAPPED-VALUES "23ft" '(operations part-id self))  ===>
;;          (07840604-MF-010.002 07840604-MF-020.001 07840604-MF-030.001        ; unit names of
operations
;;           07840604-MF-040.001 07840604-MF-050.001 07840604-MF-060.001 ...)

;;  4. When SELF appears as a KEY-SLOT, it means collect the slots from
;;     the unit whose SELF slot matches the KEY-VALUE -- that is, from
;;     the KEY-VALUE itself, which must be coercible to a unit:

;;     (GET-MAPPED-VALUES "07840604-MF-010.002" '(operations self part-id)) ===>
;;          (23FT)    ; there would be multiple values here if part-id was multi-valued.
;;  5. A KEY-VALUE of :ALL means collect the slot values for all
;;     members of CLASS; in this case, the KEY-SLOT doesn't matter:
;;
;;      GET-MAPPED-VALUES :ALL '(operations SELF possible-machs-class)) ===>
;;             (FINAL-ASSEM FINAL-ASSEM INDUCT-HARD EXCELLO KINEFAC GF-HOL FINAL-ASSEM
;;              GRINDER OUTSIDE-MACHINES GF-GEN LAMB GEN-BROACH J&L POLISHER GRINDER ... )


;; NOTES: If a CLASS has no members, then the slots
;;       . are collected from the CLASS unit itself.

;;        A KEY-SLOT may be a multiple-valued slot, but
;;        not a slot with a value inside a list.  KEY values
;;        must be top-level values, not embedded in lists.

;;        All values in mulitple-valued slots are collected.

;;        A SLOT-MAP may directly specify a constant as a KEY-VALUE
;;        by including it in a list for the KEY-SLOT:
;;        (GET-MAPPED-VALUES :ALL
;;                     '(parts-listing-file (purchased-flag "M") functional-code))
;;        The KEY-VALUES for such SLOT-MAPS are not cached, since it is assumed
;;        that only the one constant KEY-VALUE specified is of interest.

;;        WARNING: Matching of numbers as key-values is tricky; if data is a
;;                 string, it may not match.  Can fix somewhat; Alan will do it?


;;;==========================
;;;      BEGIN LISP CODE
;;;==========================

;;;-----------------------------------------
;;;  Macros for Data Access using SLOT-MAPS       ;; Description Above
;;;-----------------------------------------

(defmacro GET-MAPPED-VALUES (key-value class-key-slots)
  "Collect all the values of the specified SLOTS for units in CLASS
   whose KEY slot has a value that can be matched to the given KEY-VALUE."
  ;; All units have a SELF slot containing the name of the unit;
  ;; the system is smart about handling SELF efficiently.
```

```
  ;; If there is only one slot to collect, NULL values are not included.
  `(GET-MAPPED-VALUES-INTERNAL ,key-value (first ,class-key-slots) (second ,class-key-slots) (cd
dr ,class-key-slots)))

(defmacro GET-MAPPED-VALUE (key-value class-key-slots)
  "Behaves just like taking the FIRST of what
   GET-MAPPED-VALUES would return, but can be faster."
  `(FIRST
     (GET-MAPPED-VALUES-INTERNAL ,key-value (first ,class-key-slots) (second ,class-key-slots) (
cddr ,class-key-slots) t)))


;;;========================================
;;;        ALL GLOBAL VARIABLES
;;;========================================

;; Ultimately, should these first three globals be moved to the "globals" file?
(defparameter *DATA-KB* 'FCS "The name of the Data Kb.")
(defparameter *FACTORY-KB* 'AXLE "The name of the ESS Kb describing the factory.")
(defparameter *ORDER-KB* 'ORDERS "The name of the ESS Kb describing the orders.")

(defparameter *SLOTS-TO-RESTORE-BEFORE-RESCHEDULING*
              '((machines startup-activity-status)
                (machines startup-operation-status)
                (machines scheduled-pm-frequency)
                (operations safety-stock)
                (operations on-hand-wip))
  "The slots whose initial values are copied into INITIAL-<slot>, so
   that the scheduler can restore the initial values when necessary.")


(defparameter *VALID-PART-LIST* '((19DD T F 19 tripots) ; New part for CUTOFF operation  2-7-89
;T
                               (19ft t f 19 SUB-ASSEMBLIES)          ;;   DHO   2-8-89   FOR ENT
;
                               (23ft t f 23 tripots)
                               (23ft.d t f 23 tripots)
                               (23sp s b 23 spiders)
                               (23fx a f 23 axles)
                               (19mt t m 19 tripots)
                               (19mx x m 19 assemblies)
                               (19sp s b 19 spiders)
                               (19sp.2 s b 19 SUB-ASSEMBLIES)
                               (19fx x f 19 assemblies)
                               (19fx1 x f 19 assemblies)
                               (23fx x f 23 assemblies)                   ;; femal assy added DHO  8-
13-88
                               (23ft.2 t f 23 tripots))
  "An alist used to indicate what subclass a part belongs to.")

(defvar *AUTO-CACHE* T "Automatically cache SLOT-MAPS when accessed.")  ; Normally T
(defvar *CACHES* nil "Global alist of SLOT-MAP caches.") ; Initially NIL. Described below, unde
r Caching.


;;;------------------------------------------
;;;   *SLOT-TRANSLATION-DESCRIPTORS* Global        ;; Description Above
;;;------------------------------------------

(defparameter *SLOT-TRANSLATION-DESCRIPTORS*

;;  This is the main TRANSDAT global, describing the translation of each
;;  ESS slot.  Each Slot-Translation Descriptor has the following form:

;;  ((Result-Class> <Result-Slot> <Translating-Function>
;;                   (<put-value-type> <data-type> <data-role>)                                   ;;
 <== SLOT-FORMAT
;;                   (<Input-Class> <Input-KEY-slot> <Slot-to-collect> <Slot-to-collect> ...)   ;;
 <== SLOT-MAP
;;                   (<Input-Class> <Input-KEY-slot> <Slot-to-collect> <Slot-to-collect> ...)   ;;
```

```
;== SLOT-MAP
;;                  (<Input-Class> <Input-KEY-slot> <Slot-to-collect> <Slot-to-collect> ...)  ;; .
;== SLOT-MAP
;;                  ... )
'(
   (parts DATA-CODE create-part-data-code
          (multiple-values string Functional-Code)
          (Productive-Parts-Listing-File (Punchd-Manufd-Flag "M")
                                          Schedule-Resource-Type Functional-Code))     ; SRT

   (operations DATA-CODE create-operation-data-code
             (single-value string Operation-Name)
             (Operations-Listing-File SELF Operation-Name))  ; Operation-Name

   (purchased-parts DATA-CODE create-purchased-part-data-code
                  (single-value string Functional-code)       ; FCs (functional-codes)
                  (Productive-Parts-Listing-File (Punchd-Manufd-Flag "P") Functional-Code))

   (parts ROUTING trans-part-routing
          (multiple-values-in-list unit operation)
          (Parts SELF Data-code)              ; SRT to FC
          (operations self self)              ; All Ops
          (Output-Parts-From-Operations-File Functional-Code Operation-Name) ; Output FC to OP
          (Routings-File To-Operation-Name From-Operation-Name Rank To-Operation-Name))

   (parts MAXIMUM-TRAY-SIZE trans-part-maximum-tray-size
          (single-value number max-parts-per-tray)
          (Parts SELF Data-code)              ; SRT to FC
          (Productive-Parts-Listing-File Functional-Code Max-Tray-Capacity))

   (operations SHORT-NAME trans-operation-short-name
             (single-value string SOT)        ; (Schedule-Operation-Type)
             (Operations-Listing-File Operation-Name Schedule-Operation-Type))  ; OP to SOT

   (operations PART-ID trans-operation-part-id
             (single-value symbol SRT)        ; (Schedule-Resource-Type)
             (Parts SELF Routing Self))       ; SRT to Routing, SRT

   (operations DATA-OUTPUT-PART-CODE trans-operation-data-output-part-code
             (single-value string output-Functional-Code)  ; (part)
             (Operations SELF Part-Id)        ; OP to SRT
             (Parts SELF Data-code)           ; SRT to FC
             (Output-Parts-From-Operations-File Operation-Name Functional-Code)) ; OP to outp
ut FC

   (operations PREFERRED-MACHINES trans-operation-preferred-machines
             (multiple-values-in-list symbol machine)
             (Operations-Facility-Preferences-File Operation-name Cell-name Record-Sequence)
             (Machines Cellid Self))

   (operations POSSIBLE-MACHS-CLASS trans-operation-possible-machs-class
             (single-value symbol machine-class)
             (Operations SELF Preferred-Machines))

   (operations CYCLE-TIME trans-operation-cycle-time
             (single-value-in-list (symbol integer)
                                   (preferred-machine cycle-time-in-seconds))
             (control-unit SELF Cycle-Time-Code)
             (Operations-Listing-File Operation-Name Schedule-Cycle-Time) ; just 1 actually ;
s.t.
             (Operations-Listing-File Operation-Name Standard-Cycle-Time)
             (Operations-Listing-File Operation-Name Budget-Cycle-Time)
             (Operations SELF Short-Name)            ; OP to SOT
             (Operations SELF Preferred-Machines))

   (operations LEAD-TIME-FOR-OPERATION trans-operation-lead-time-for-operation
             (single-value-in-list (symbol integer)
                                   (cycle-time-machine duration-in-seconds))
             (Operations SELF Data-Output-Part-Code) ; OP to FC
             (Operations SELF Cycle-Time)
             (Productive-Parts-Listing-File Functional-Code Lead-Time-Duration))
```

```
(operations ON-HAND-WIP trans-operation-on-hand-wip-pass-1-inventory  ;; WARNING: only multi
ple-pass slot
            (multiple-values (integer integer symbol) ; Should be mult-in-list; vals can rep
eat.
                         (number-trays utime-available constraint-flag))
            (Control-Unit SELF Fraction-Full-For-Inventory)
            (Operations SELF Data-Output-Part-Code) ; OP to FC
            (Operations SELF Part-Id)              ; SRT
            (Parts SELF Maximum-Tray-Size)
            (Productive-Part-Inventory-File Functional-Code Quantity))

(operations SAFETY-STOCK trans-operation-safety-stock
            (single-value (integer integer)
                     (safety-stock target-safety-stock))
            (Operations SELF Data-Output-Part-Code) ; OP to FC
            (Productive-Parts-Listing-File Functional-Code Target-Safety-Stock)
            (Operations SELF Part-Id)              ; OP to SRT
            (Parts SELF Maximum-Tray-Size)         ; SRT to max-tray-size
            (Operations SELF On-Hand-Wip))

(operations ON-HAND-WIP trans-operation-on-hand-wip-pass-2-safety-stock  ;; WARNING: only mu
ltiple-pass slot
            (multiple-values (integer integer symbol)
                         (number-trays utime-available constraint-flag))
            (Operations SELF On-Hand-Wip)
            (Operations SELF Safety-Stock))

(operations ON-HAND-WIP trans-operation-on-hand-wip-pass-3-expected-receipts ;; WARNING: onl
y multiple-pass slot
            (multiple-values (integer integer symbol)
                         (number-trays utime-available constraint-flag))
            (Control-Unit SELF Fraction-Full-For-Inventory)
            (Operations SELF Data-Output-Part-Code) ; OP to FC
            (Operations SELF Part-Id)              ; OP to SRT
            (Parts SELF Maximum-Tray-Size)
            (Not-Confirmed-Expected-Receipts-File Functional-Code
                                         Quantity Expected-Receipt-Date Constraint-
Flag)
            (Operations SELF On-Hand-Wip))

(operations REQUIRED-PRODUCTIVE-PARTS trans-operation-required-productive-parts
            (multiple-values-in-list (symbol number number)
                            (SRT input-qty? trays-out?))  ;; Need better DATA-ROLE
            (operations SELF part-id)              ; OP to SRT
            (Parts SELF Maximum-Tray-Size)
            (Input-Parts-To-Operations-File Operation-Name Functional-Code Quantity)
            (Operations-Listing-File Operation-Name Operation-Type)
            (Operations SELF Data-Output-Part-Code) ; OP to FC
            (Parts SELF Data-code)                 ; SRT to FC
            (Parts Data-code Self))                ; FC to SRT

(operations REQUIRED-OTHER-RESOURCES trans-operation-required-other-resources
            (multiple-values (symbol number)
                         (purchased-part number-pieces))
            (Purchased-Parts SELF Data-code)       ; PP to FC
            (Purchased-Parts Data-code Self)       ; FC to PP
            (Input-Parts-To-Operations-File Operation-Name Functional-Code Quantity))

(machines AGV-MOVE-TIME trans-machine-AGV-move-time
          (multiple-values (unit integer)
                      (machine-class time-in-secs))
          (Machines SELF Cellid)                   ; machine to cellid
          (Operations-Facility-Preferences-File Cell-Name Operation-Name)
          (Operations-Listing-File Operation-Name Move-Time)
          (Routings-File From-Operation-Name To-Operation-Name)
          (Operations SELF Possible-Machs-Class))

(machines STARTUP-ACTIVITY-STATUS trans-machine-startup-activity-status
          (multiple-values-in-list (symbol-or-string integer integer symbol string integer)
                          (op-symbol-or-pm-string duration start-time
                                              box-type activity-id quantity))
```

```
        (Manufacturing-Cells-State-Status-File Cell-Id Cell-Id Cell-State Up-State-Time)
        (Control-Unit SELF Build-Content-Time)
        (Machines SELF Cellid)                     ; machine to cellid
        (Manufacturing-Cells-Activity-Status-File Cell-Id
           Operation-Name Activity-Id Activity-Type Actual-Start-Time Schedule-Duration
           Cumulative-Down-Time Time-To-Up-State Schedule-Quantity Current-Quantity))

(machines STARTUP-OPERATION-STATUS trans-machine-startup-operation-status
        (multiple-values-in-list (symbol-or-string integer integer symbol string integer)
                                 (op-symbol-or-pm-string schedule-duration actual-start-ti
me
                                                       box-type activity-id quantity))
        (Manufacturing-Cells-Operational-Schedule-File Cell-Id
           Operation-Name Activity-Id Activity-Type Start-Time Duration Quantity)
        (Machines SELF Cellid))                    ; machine to cellid

(machines SCHEDULED-PM-FREQUENCY trans-machine-scheduled-pm-frequency
        (multiple-values (symbol number number number number)
                         (pm-code start-time end-time duration frequency))
        (Machines SELF Cellid)                     ; machine to cellid
        (PM-Bill-Of-Materials-File Cell-Name PM-Code Duration)
        (PM-Content-File PM-Code Early-Start-Time Due-Date-Time Frequency))

(machines TIME-TO-DEGRADE-STATE trans-machine-time-to-degrade-state
        (single-value integer utime)
        (Machines SELF Cellid)                     ; machine to cellid
        (Manufacturing-Cells-Activity-Status-File Cell-Id Time-To-Degrade-State))

(machines CUMULATIVE-DEGRADED-TIME trans-machine-cumulative-degraded-time
        (single-value integer time-in-seconds)
        (Machines SELF Cellid)                     ; machine to cellid
        (Manufacturing-Cells-Activity-Status-File Cell-Id Cumulative-Degraded-Time))

(purchased-parts LEAD-TIME trans-purchased-part-lead-time
                (single-value number time-in-seconds)
                (Purchased-Parts SELF Data-code)   ; PP to FC
                (Productive-Parts-Listing-File Functional-Code Lead-Time-Duration))

(purchased-parts EXPECTED-RECEIPTS trans-purchased-part-expected-receipts
                (multiple-values (integer integer symbol)
                                 (number-trays utime-available constraint-flag))
                (Purchased-Parts SELF Data-code)   ; PP to FC
                (Productive-Part-Inventory-File Functional-Code Quantity)
                (Net-Confirmed-Expected-Receipts-File Functional-Code Quantity
                                                 Expected-Receipt-Date Constraint-Flag
))

(net-order-demand-orders DATA-CODE create-order-data-code
                        (single-value symbol data-record-unit-name)
                        (Net-Order-Demand-File SELF Self Output-Part-Name date/time-due)
                        (Parts Data-code self))

(net-order-demand-orders OUTPUT-PART-NAME trans-order-slot-unchanged
                        (single-value string Functional-code)
                        (Net-Order-Demand-Orders SELF Data-code)       ; order to data-reco
rd
                        (Net-Order-Demand-File SELF Output-Part-Name)) ; data-record to FC

(net-order-demand-orders ORIGINAL-CUSTOMER-ORDER trans-order-slot-unchanged
                        (single-value string)
                        (Net-Order-Demand-Orders SELF Data-code)       ; order to data-reco
rd
                        (Net-Order-Demand-File SELF Original-Customer-Order))

(net-order-demand-orders SHIP-CUSTOMER-CODE trans-order-slot-unchanged
                        (single-value string)
                        (Net-Order-Demand-Orders SELF Data-code)
                        (Net-Order-Demand-File SELF Ship-Customer-Code))
```

```
(net-order-demand-orders ORDER-TYPE-CODE trans-order-slot-unchanged
                         (single-value string)      ; Should list the possible codes...
                         (Net-Order-Demand-Orders SELF Data-code)
                         (Net-Order-Demand-File SELF Order-Type-Code))

(net-order-demand-orders DATE/TIME-DUE trans-order-slot-unchanged
                         (single-value string)
                         (Net-Order-Demand-Orders SELF Data-code)
                         (Net-Order-Dimand-File SELF Date/Time-Due))

(net-order-demand-orders NETTED-QUANTITY trans-order-slot-unchanged
                         (single-value string number-pieces)
                         (Net-Order-Demand-Orders SELF Data-code)
                         (Net-Order-Demand-File SELF Netted-Quantity))

(net-order-demand-orders PRIMARY-ROUTING-NAME trans-order-slot-unchanged
                         (single-value string)
                         (Net-Order-Demand-Orders SELF Data-code)
                         (Net-Order-Demand-File SELF Primary-Routing-Name))

(net-order-demand-orders MAJOR-REVISION trans-order-slot-unchanged
                         (single-value string)
                         (Net-Order-Demand-Orders SELF Data-code)
                         (Net-Order-Demand-File SELF Major-Revision))

(net-order-demand-orders MINOR-REVISION trans-order-slot-unchanged
                         (single-value string)
                         (Net-Order-Demand-Orders SELF Data-code)
                         (Net-Order-Demand-File SELF Minor-Revision))

(net-order-demand-orders ORDER-TABLE trans-order-order-table
                         (single-value-in-list (symbol symbol integer integer)
                                        (SRT OP number-pieces date/time-due))
                         (Net-Order-Demand-Orders SELF
                                        Output-Part-Name Netted-Quantity Date/Time
Due)
                            (Parts Data-code Self)                      ; FC to SRT
                            (Operations Data-Output-Part-Code Self))    ; FC to OP

    ))

;;;====================================================================================
;;;   Master TOP-LEVEL Translation Functions   (These are called from OUTSIDE this file)
;;;====================================================================================

(defun INITIALIZE-ESS-KBS ()
  "Initialize the Factory Kb and the ORDER Kb."
  (inform (stage "%2%Clearing the ESS Knowledgebases.%%"))
  (CLEAR-FACTORY-KB)
  (CLEAR-ORDER-KB)
  (loop for machine in (class-members (machines *factory-kb*)  ; SELF should already be in the F
ACTORY-KB
        do (PUT-VALUE-TYPE '(single-value symbol) machine (self (unit.name machine)))))

(defun TRANSLATE-DATA-INTO-ESS-KBS ()
  "Perform the translation of information in the
   DATA-KB into the FACTORY-KB and the ORDER-KB."
  (inform (stage "%2%Translating from the Data Kb to the ESS Kbs.%%"))
  (inform (notification "%2%****** %a%%" (trans-control-unit-slots)
  (TRANS-CONTROL-UNIT-SLOTS (control-unit (build-context-master-record-1 'Cycle-Time-Code)
  (RESET-CACHE)
  (TRANSLATE-USING-SLOT-TRANSLATION-DESCRIPTORS)
  (RESET-CACHE)
  (SAVE-INITIAL-SLOT-VALUES)) ; copy the initial values of slots that might have to be restored
by the scheduler.

;;;=========================================
;;;       Hi-level Translation Functions
;;;=========================================
```

```
(defun TRANSLATE-USING-SLOT-TRANSLATION-DESCRIPTORS
       (&optional (slot-translation-descriptors *SLOT-TRANSLATION-DESCRIPTORS*))
  "Go through the list of Slot-Translation Descriptors, calling
   each Translation Function in turn, with the elements of the
   Slot-Translation Descriptor as arguments to the function."
   (declare (special *SLOT-TRANSLATION-DESCRIPTORS* ua::*u-cache*))
  (loop for desc in slot-translation-descriptors
        for function-name = (third desc)
        do (reset-cache)    ; this could probably be taken out without any ill effects; may incre
ase speed.
           (inform 'notification "~2%****** ~a~%" function-name)
           (apply (symbol-function function-name) desc)))


;;;  For selecting Descriptors for debugging

 (defun COLLECT-DESCRIPTORS (&rest symbols-present)
  "Collect into a list all Slot-Translation Descriptors
   containing the indicated symbols."
   (declare (special *SLOT-TRANSLATION-DESCRIPTORS*))
  (loop for map-desc in *SLOT-TRANSLATION-DESCRIPTORS*
        when (every #'(lambda (symbol) (member symbol map-desc))
                    symbols-present)
        collect map-desc))
;;; -------------------------
;;;   BBB Initialization
;;; -------------------------

 (defun CLEAR-FACTORY-KB (&optional (factory-kb *factory-kb*))
  "Clear the Parts, Operations, and Purchased-Parts classes
   in the Factory Kb; clear various slots on Machines."
  ;; WARNING: names of parts and operations classes not variables here...
  (restore-units factory-kb)
  (loop for unitname in '(PARTS OPERATIONS PURCHASED-PARTS)
        for unit = (unit.exists.p unitname factory-kb)
        when unit do (delete-instances-of unit))
  (loop for machine in (class-members 'machines factory-kb)
        with machine-slots = (mapcar #'second (collect-descriptors 'machines))  ;; pick off all
machine-slots.
        do (loop for machine-slot in machine-slots             ;; could leave this out IF PUT-VALU
E-TYPE always performed
                 do (remove.all.values machine machine-slot) ;; for every member of machines for
 every slot -- nearly is now
                 finally
                 (remove.all.values machine 'first-box-on-machine)
                 (remove.all.values machine 'last-box-on-machine))))

(defun CLEAR-ORDER-KB (&optional (order-kb *order-kb*))
  "Clear the Order Kb of Net-Order-Demand-Orders and Rejected-Orders."
  (restore-units order-kb)
  (delete-instances-of 'rejected-orders)
   (delete-instances-of 'net-order-demand-orders))


;;; ------------------------------------------------------------
;;;   SAVE/RESTORE data that may be changed by a scheduling run.
;;; ------------------------------------------------------------

(defun SAVE-INITIAL-SLOT-VALUES (&optional class slot)  ; 11 10/88 MJJ
  "Save the original slot values for CLASS members for the selected SLOT
   in a slot called INITIAL-<slot>.  Should only be run when all the
   slots still have their original values.  By default, saves all slots
   in *SLOTS-TO-RESTORE-BEFORE-RESCHEDULING*."
   (declare (special *SLOTS-TO-RESTORE-BEFORE-RESCHEDULING*))
  (loop for class-slot in (or (if (and class slot) (list (list class slot)))
                              *slots-to-restore-before-rescheduling*)
        for class = (first class-slot)
        for slot = (second class-slot)
        for initial-slot = (coerce-to-symbol (format nil "INITIAL-~a" slot))  ; initial-<slot>
slip;
```

```
      collect
      (loop for member in (append (discarded-units class) (unit.descendants class 'member))  ;
in or original, too
            for values = (get.values member slot)          ; get the original slot values; its
all over if NO vals!!
            do
            (put.values member initial-slot values)        ; and save them in a special slot f
or later restoring.
            collect (list (unit.name member) values))))   ; return only used for debugging.


;;;=============================
;;;   TRANSLATION FUNCTIONS
;;;=============================

;;;------------------------------
;;;    CONTROL-UNIT Translation     ;; WARNING: This is the only one that does NOT use Slot-Tran
slation Descriptons.
;;;------------------------------

(defun TRANS-CONTROL-UNIT-SLOTS (factory-control-unit build-context-data-record cycle-time-code-
slot)
  "Translate all the slots for the CONTROL-UNIT from the master BUILD-CONTEXT Data Record."
  (loop for item in '((Build-Context-Time Build-Context-Time)   ; (Date-slot ESS-slot)
                      (Frozen-Time-One Frozen-Time-1)
                      (Frozen-Time-Two Cutoff-For-FT2)
                      (End-of-Activity-List End-of-Activity-List)
                      (End-of-Horizon Horizon-End))
        for date/time-string = (get.value data-context (first item))
        with control-unit = (unit factory-control-unit *factory-kb*)
        with data-context = (unit build-context-data-record *data-kb*)
        do
         (PUT-VALUE-TYPE '(multiple-values integer string) control-unit (second item)
                         (list (string-to-utime date/time-string) date/time-string))  ; include h
uman form...
        finally (PUT-VALUE-TYPE '(single-value string) control-unit Cycle-Time-Code-slot
                               (get.value data-context Cycle-Time-Code-slot))))


;;; ------------------------------------
;;;    PARTS Translation
;;; ------------------------------------

(defun CREATE-PART-DATA-CODE (ess-part-class data-code-slot this-fn slot-format
                              manufd-part-SRT-FC-map)
  (declare (ignore this-fn) (special *valid-part-list*))
  ;; Slot desc: Multiple-values, string
  ;; WARNING: should only output parts with a Primary.Flag = "P" be collected?
  (let ((valid-part-list *valid-part-list*)
        (manufd-part-SRT-FC-list (GET-MAPPED-VALUES :ALL manufd-part-SRT-FC-map)))
    (loop for (manufd-part-SRT-string FC) in manufd-part-SRT-FC-list  ; all manufactured-part SR
Ts, and FCs (functional-code)
          for manufd-part-SRT = (coerce-to-symbol manufd-part-SRT-string)
          for part-subclass = (coerce-to-unit (nth 3 (cdr (assoc manufd-part-SRT valid-part-list
)))
                                              *factory-kb*)
          with parent = (unit ess-part-class *factory-kb*)
          unless (unit.ancestor.p parent (unit.exists.p manufd-part-SRT *factory-kb*) 'member) ;
 only create it once.
          do (if part-subclass
                 (let ((part-unit (create.unit manufd-part-SRT *factory-kb* nil part-subclass)))
                   (PUT-VALUE-TYPE '(single-value symbol) part-unit 'SELF manufd-part-SRT)
                   (PUT-VALUE-TYPE slot-format part-unit data-code-slot
                                   (loop for (SRT FC) in manufd-part-SRT-FC-list  ;; find all FC
s for this SRT.
                                         when (equal manufd-part-SRT-string SRT)  ;; secondary k
eys would be nice.
                                         collect FC)))
               (inform 'warning "~%Skipping the creation of part ~a;~
                                 ~%it does not have an entry in *VALID-PART-LIST*.~%"
                       manufd-part-SRT)))))
```

```
(defun TRANS-PART-ROUTING (part-class routing-slot this-fn slot-format
                           SRT-to-FC-map op-map FC-to-FROM-OP-map TO-OP-to-FROM-OP-rank-TO-OP-ma
p)
  ;; Slot desc: Multiple-values, unit (ESS op)
  (declare (ignore this-fn))
  (loop for part-SRT in (class-members part-class *factory-kb*)
        with valid-ops = (GET-MAPPED-VALUES :ALL op-map)
        do
        (let* ((functional-codes (GET-MAPPED-VALUES part-SRT SRT-to-FC-map))
               (last-functional-codes (get-last-fcs functional-codes))  ; find fcs with highest
op stage (chars 13-15)
               (last-ops (loop for last-FC in last-functional-codes     ; sometimes more than 1
s have same op stage (error)
                               append (GET-MAPPED-VALUES last-FC FC-to-FROM-OP-map)))   ; get co
rresponding ops.
               (routing (loop for last-op in last-ops
                              for last-op-routing = NIL
                              when (member (coerce-to-symbol last-op) valid-ops)        ; don't
use unless op is valid.
                              do (setq last-op-routing (get-routing last-op valid-ops TO-OP-to-F
ROM-OP-rank-TO-OP-map))
                              when last-op-routing do (return last-op-routing)))) ; chain on FRO
M links to find earlier ops.
          (PUT-VALUE-TYPE slot-format part-SRT routing-slot (mapcar #'coerce-to-unit routing))))
)


(defun TRANS-PART-MAXIMUM-TRAY-SIZE (part-class maximum-tray-size-slot this-fn slot-format
                                     SRT-to-FC-map FC-to-max-tray-capacity-map)
  ;; Slot desc: Single-value, number
  (declare (ignore this-fn))
  (loop for part-SRT in (class-members part-class *factory-kb*)
        for functional-code = (GET-MAPPED-VALUE part-SRT SRT-to-FC-map) ; WARNING: all FCs shoul
d be same; so use first.
        for max-tray-size-string = (GET-MAPPED-VALUE functional-code FC-to-max-tray-capacity-map
)
        for max-tray-size = (coerce-to-number max-tray-size-string 1)    ; defaults to 1 for NIL.
        do
        (when (zerop max-tray-size)
          (inform "Warning: "%Max tray size of 0 found for part ~a; using 1.~%" (unit.name part-
SRT))
          (setq max-tray-size 1))
        (PUT-VALUE-TYPE slot-format part-SRT maximum-tray-size-slot max-tray-size)))


;;; ------------------------------------
;;;     OPERATIONS
;;; ------------------------------------


(defun CREATE-OPERATION-DATA-CODE (ess-op-class data-code-slot this-fn slot-format
                                   op-name-map)
  (declare (ignore this-fn))
  ;; Slot desc: Single-value, string (FOS op-name)
  (loop for op-string in (GET-MAPPED-VALUES :ALL op-name-map)
        for op-name = (coerce-to-symbol op-string)
        with parent = (unit ess-op-class *factory-kb*)
        unless (unit.ancestor.p parent (unit.exists.p op-name *factory-kb*) 'member)
        do  (let ((op-unit (create.unit op-name *factory-kb* nil parent)))
              (PUT-VALUE-TYPE '(single-value symbol) op-unit 'SELF op-name)
              (PUT-VALUE-TYPE slot-format op-unit data-code-slot op-string))))


(defun TRANS-OPERATION-SHORT-NAME (op-class short-name-slot this-fn slot-format OP-to-SOT-map)
  ;; Slot desc: Single-value, string (FOS SOT)
  (declare (ignore this-fn))  ; string is the SOT, right padded with spaces.
  (loop for op in (class-members op-class *factory-kb*)
        do (PUT-VALUE-TYPE slot-format op short-name-slot (GET-MAPPED-VALUE op OP-to-SOT-map))))
        ; SOT is string
```

```
(defun TRANS-OPERATION-PART-ID (op-class part-id-slot this-fn slot-format routing-SRT-map)
  ;; Slot desc: Single-value, symbol (ESS part)
  (declare (ignore this-fn))  ; single-valued slot, containing the single symbol part-name (SRT.
  (loop for op in (class-members op-class *factory-kb*)
        with part-entries = (GET-MAPPED-VALUES :ALL routing-SRT-map)
        do (loop for (routing srt) in part-entries
                 when (member op routing)
                 do (return (PUT-VALUE-TYPE slot-format op part-id-slot SRT)))))        ; should
have error if none found??


(defun TRANS-OPERATION-DATA-OUTPUT-PART-CODE (op-class data-output-part-code-slot this-fn slot-f
ormat
                                            OP-to-SRT-map SRT-to-FC-map OP-to-output-FC-map)
  ;; Slot desc: Single-value, string (FCS functional code)  ;; need output flag "P" for primary?
?
  (declare (ignore this-fn))
  (loop for op in (class-members op-class *factory-kb*)
        for SRT = (GET-MAPPED-VALUE op OP-to-SRT-map)
        do (PUT-VALUE-TYPE slot-format op data-output-part-code-slot  ; should be just one outpu
t part; do we need any check?
                           (first (intersection (GET-MAPPED-VALUES SRT SRT-to-FC-map)
                                                (GET-MAPPED-VALUES op OP-to-output-FC-map)
                                                :test #'equal)))))

(defun TRANS-OPERATION-PREFERRED-MACHINES (op-class preferred-machines-slot this-fn slot-format
                                          op-to-pref-CELLID-sequence CELLID-to-machine-map)
  ;; Slot desc: multiple-values-in-list, symbol (ESS machine)
  (declare (ignore this-fn))
  (loop for op in (class-members op-class *factory-kb*)
        for facility-pref-entries = (sort (copy-list (GET-MAPPED-VALUES op op-to-pref-cellid-seq
uence))  ; sort by sequence
                                          #'< :key #'second)    ; copy the list; sort is destruc
tive...
        do (PUT-VALUE-TYPE slot-format op preferred-machines-slot
                           (loop for (cellid record-sequence) in facility-pref-entries
                                 for machine = (GET-MAPPED-VALUE cellid CELLID-to-machine-map)
                                 when machine collect machine
                                 unless machine
                                 do (inform 'error
                                            "~%No ESS machine for CELL-NAME ~a, sequence number
~a.~%"

                                            cellid record-sequence)))))


(defun TRANS-OPERATION-POSSIBLE-MACHS-CLASS (op-class possible-machs-class-slot this-fn slot-for
mat
                                            op-to-pref-machines-map)
  ;; Slot desc: Single-value, symbol (ESS machine class)
  (declare (ignore this-fn)) ; single-valued slot, containing ESS machine class unitname.
  (loop for op in (class-members op-class *factory-kb*)
        for pref-machines = (GET-MAPPED-VALUE op op-to-pref-machines-map)
        when pref-machines
        do (PUT-VALUE-TYPE slot-format op possible-machs-class-slot   ; assume all machines in
the same class.
                           (unit.name (first (unit.parents (first pref-machines) 'member))))))


(defun TRANS-OPERATION-CYCLE-TIME (op-class cycle-time-slot this-fn slot-format
                                  control-cycle-time-key-map  ; selects one of following 3 maps
;
                                  op-to-schedule-time-map op-to-standard-time-map op-to-budget-
time-map
                                  op-to-SRT-map op-to-pref-machines-map)
  ;; Slot desc: Single-value-in-list, (symbol integer), (a-preferred-machine cycle-time-in-sec.'
ds)
  (declare (ignore this-fn))
  (let* ((cycle-time-key (GET-MAPPED-VALUE :ALL control-cycle-time-key-map))  ; :CLASS?
         (op-to-cycle-time-map (case (string-to-symbol cycle-time-key)  ; pick the right descrip
tion
```

```
                          (S op-to-schedule-time-map)     ; Schedule-Cycle-Time
                          (P op-to-standard-time-map)     ; Standard-Cycle-Time
                          (B op-to-budget-time-map))))    ; Budget-Cycle-Time
  (loop for op in (class-members op-class *factory-kb*)
        for SOT = (GET-MAPPED-VALUE op op-to-SOT-map)
        do
        (let ((a-preferred-machine  (if (equal SOT "OUTSIDE-OP  ")     ; WARNING: This seems pr
etty random...
                                        (car (GET-MAPPED-VALUE op op-to-pref-machines-map))))
              (cycle-time (HOURS-TO-SECONDS (GET-MAPPED-VALUE op op-to-cycle-time-map))))
          (PUT-VALUE-TYPE slot-format op cycle-time-slot (list a-preferred-machine cycle-time)
))))


(defun TRANS-OPERATION-LEAD-TIME-FOR-OPERATION (op-class lead-time-for-operation-slot this-fn sl
ot-format
                                                op-to-FC-map op-to-cycle-time-machine-map FC-to-
lead-time-map)
  ;; Slot desc: Single-value-in-list, list (cycle-time-machine duration-in-seconds)
  (declare (ignore this-fn))
  (loop for op in (class-members op-class *factory-kb*)
        for functional-code = (GET-MAPPED-VALUE op OP-to-FC-map)
        for cycle-time-machine = (car (GET-MAPPED-VALUE op op-to-cycle-time-machine-map))
        for lead-time = (GET-MAPPED-VALUE functional-code FC-to-lead-time-map)
        do (PUT-VALUE-TYPE slot-format op lead-time-for-operation-slot
                           (list cycle-time-machine (convert-string-to-duration lead-time)))))


(defun TRANS-OPERATION-ON-HAND-WIP-PASS-1-INVENTORY (op-class on-hand-wip-slot this-fn slot-form
at
                                                    fraction-full-map OP-to-FC-map OP-to-SRT-ma
p
                                                    SRT-to-max-tray-size-map FC-to-tray-invento
ry-map)
  ;; Slot desc: Multiple-values (only 1 at this stage), list (<#trays> <time available, as unive
rsal time> <constraint flag>)
  ;; This fn computes on-hand-wip, without decrementing safety stock.  Pass 2 fixes that.
  (declare (ignore this-fn))
  (let* ((fraction-full-for-inventory (GET-MAPPED-VALUE :ALL fraction-full-map)))  ; :CLASS?
    (loop for op in (class-members op-class *factory-kb*)
          for functional-code = (GET-MAPPED-VALUE op OP-to-FC-map)
          for SRT = (GET-MAPPED-VALUE op OP-to-SRT-map)
          for max-tray-size = (coerce-to-number (GET-MAPPED-VALUE SRT SRT-to-max-tray-size-map))
          for count-as-full-threshold = (* fraction-full-for-inventory max-tray-size)
          for total-wip =
          (loop for tray-qty in (GET-MAPPED-VALUES functional-code FC-to-tray-inventory-map)
                sum (pieces-to-trays-with-rejection-msg
                      (coerce-to-number tray-qty) max-tray-size count-as-full-threshold SRT))
          do (PUT-VALUE-TYPE slot-format op on-hand-wip-slot (list `(,total-wip 0 Y))))))
             ; 0 = minus infinity time; Y is constraint flag.


(defun TRANS-OPERATION-SAFETY-STOCK (op-class safety-stock-slot this-fn slot-format
                                     OP-to-FC-map FC-to-target-safety-stock-map
                                     OP-to-SRT-map SRT-to-max-tray-capacity-map op-to-on-hand-wi
p-map)
  ;; Slot desc: Single-value, list (<safety stock> <target safety stock>)
  (declare (ignore this-fn))
  (loop for op in (class-members op-class *factory-kb*)
        for functional-code = (GET-MAPPED-VALUE op OP-to-FC-map)
        for target-safety-stock-pieces = (coerce-to-number (GET-MAPPED-VALUE functional-code FC-
to-target-safety-stock-map))
        for max-tray-capacity = (GET-MAPPED-VALUE (GET-MAPPED-VALUE op OP-to-SRT-map) SRT-to-max
-tray-capacity-map)
        for target-safety-stock = (round target-safety-stock-pieces (max (coerce-to-number max-t
ray-capacity) 1))
        for on-hand-wip = (first (GET-MAPPED-VALUE op op-to-on-hand-wip-map)) ; on-hand-wip has
triples; just 1 triple so far
        do (PUT-VALUE-TYPE slot-format op safety-stock-slot (list (min target-safety-stock on-ha
nd-wip)
                                                                  target-safety-stock))))
```

```
(defun TRANS-OPERATION-ON-HAND-WIP-PASS-2-SAFETY-STOCK (op-class on-hand-wip-slot this-fn slot-f
ormat
                                                          op-to-on-hand-wip-map op-to-safety-stock
-map)
  ;; Slot desc: multiple-values (only 1 at this stage), list (<#trays> <time available, as unive
rsal time> <constraint flag>)
  ;; This fn subtracts safety stock from the original on-hand-wip tray count.
  (declare (ignore this-fn))
  (loop for op in (class-members op-class *factory-kb*)
        for (on-hand-wip-qty time-wip-available constraint-flag) = (GET-MAPPED-VALUE op op-to-on
-hand-wip-map);only need qty.
        for (safety-stock target-safety-stock) = (GET-MAPPED-VALUE op op-to-safety-stock-map)
; only need safety-stock.
        do (PUT-VALUE-TYPE slot-format op on-hand-wip-slot
                           (list `(,(- on-hand-wip-qty safety-stock)
                                   ,time-wip-available
                                   ,constraint-flag)))))

(defun TRANS-OPERATION-ON-HAND-WIP-PASS-3-EXPECTED-RECEIPTS (op-class on-hand-wip-slot this-fn s
lot-format
                                                              fraction-full-map OP-to-FC-map OP-t
o-SRT-map
                                                              SRT-to-max-tray-size-map FC-to-expe
cted-qty-date-flag-map
                                                              op-to-on-hand-wip-map)
  ;; Slot desc: Multiple-values, list (<#trays> <time available, as universal time> <constraint
f
lag>)
  (declare (ignore this-fn))
  (let* ((fraction-full-for-inventory (GET-MAPPED-VALUE :ALL fraction-full-map)))
    (loop for op in (class-members op-class *factory-kb*)
          for functional-code = (GET-MAPPED-VALUE op OP-to-FC-map)
          for SRT = (GET-MAPPED-VALUE op OP-to-SRT-map)
          for max-tray-size = (coerce-to-number (GET-MAPPED-VALUE SRT SRT-to-max-tray-size-map))
          for count-as-full-threshold = (* fraction-full-for-inventory max-tray-size)
          for receipt-info-list
          = (loop for (piece-qty receipt-date constraint-flag)
                  in (GET-MAPPED-VALUES functional-code FC-to-expected-qty-date-flag-map)
                  for tray-count = (pieces-to-trays-with-rejection-msg
                                     (coerce-to-number piece-qty) max-tray-size count-as-full-th
reshold
                                     SRT "Expected Receipts")
                  unless (zerop tray-count)
                  collect (list tray-count
                                (string-to-utime receipt-date)
                                (coerce-to-symbol (if (member constraint-flag '(NIL ,vendor-toke
n))
                                                      ny
                                                      constraint-flag))))
          when receipt-info-list
          do (PUT-VALUE-TYPE slot-format op on-hand-wip-slot (append (GET-MAPPED-VALUES op op-to
-on-hand-wip-map)
                                                                      receipt-info-list)))));

;;;
;;; REMOVE OP-TO-OP-TYPE-MAP ARG FROM ARG LIST AS WELL AS IN THE SLOT TRANSLATION DESCRIPTOR (*S
LOT-TRANSLATION-DESCRIPTOR*)
;;;

(defun TRANS-OPERATION-REQUIRED-PRODUCTIVE-PARTS (operation-class required-productive-parts-slot
 this-fn slot-format
                                                   OP-to-SRT-map SRT-to-max-tray-map op-to-input-
FC-qty-map
                                                   op-to-op-type-map op-to-output-FC-map manuf-FC
-map FC-to-SRT-map)
  ;; Slot desc: multiple-values-in-list, list (SRT number number)
  ;; Looks like ((assmbly 1 1) (part input-qty trays-out?) (part input-qty trays-out?)); numbers
, or integers?
  ;; WARNING: A level of nesting was removed, due to the elimination of IOTs.
  ;; WARNING: This calculation should be reviewed; it gives odd numbers -- could be due to bad d
ata...
```

```
 (declare (ignore this-fn))
 (loop for op in (class-members operation-class *factory-kb*)
;       for op-type = (GET-MAPPED-VALUE op op-to-op-type-map)
        for output-FC = (GET-MAPPED-VALUE op OP-to-output-FC-map)
        for output-SRT = (coerce-to-symbol (GET-MAPPED-VALUE op op-to-SRT-map))
        for input-FC-qty-entries = (GET-MAPPED-VALUES op op-to-input-FC-qty-map)
        for input-SRT-qty-entries = (loop for (input-FC input-quantity) in input-FC-qty-entries
                                          for input-SRT = (coerce-to-symbol (GET-MAPPED-VALUE in
put-fc fc-to-SRT-map))
                                          when (member input-fc valid-manufactured-fcs :test #'e
qual)     ;Only Manufactured.
                                          unless (eq output-SRT input-SRT)      ;If short codes
are the same.
                                          collect (list input-SRT (coerce-to-number input-quanti
ty)))
        with valid-manufactured-fcs = (GET-MAPPED-VALUES :ALL manuf-FC-map)
        when output-FC                          ;(equal op-type "A")
        unless (null input-SRT-qty-entries)
        do
        (PUT-VALUE-TYPE slot-format op required-productive-parts-slot
                        (let ((tray-size-out (coerce-to-number (GET-MAPPED-VALUE output-SRT SRT-
to-max-tray-map))))
                          (cons (list output-SRT 1 1)    ; first in list is assembled part.
                                (loop for (input-SRT input-quantity) in input-SRT-qty-entries

                                      collect
                                      (let ((tray-size-in (GET-MAPPED-VALUE input-SRT SRT-to-max
-tray-map)))
                                        (list input-SRT
                                              input-quantity
                                              (/ (* input-quantity tray-size-out)       ; round?
 ALiss?
                                                 (max (coerce-to-number tray-size-in) 1)))))))))
)


#$(defun TRANS-OPERATION-REQUIRED-PRODUCTIVE-PARTS (operation-class required-productive-parts-sl
ot this-fn slot-format
                                                   OP-to-SRT-map SRT-to-max-tray-map op-to-input-
FC-qty-map
                                                   op-to-op-type-map op-to-output-FC-map manuf-FC
-map FC-to-SRT-map)
  ;; Slot desc: multiple-values-in-list, list (SRT number number)
  ;; Looks like ((assembly 1 1) (part input-qty trays-out?) (part input-qty trays-out?)); numbers
, or integers?
  ;; WARNING: A level of nested was remove, due to the elimination of SOTs.
  ;; WARNING: This calculation should be reviewed; it gives odd numbers -- could be due to bad d
ata...
  (declare (ignore this-fn))
  (loop for op in (class-members operation-class *factory-kb*)
        for op-type = (GET-MAPPED-VALUE op op-to-op-type-map)
        with valid-manufactured-fcs = (GET-MAPPED-VALUES :ALL manuf-FC-map)
        when (equal op-type "A")
        do
        (let ((output-FC (GET-MAPPED-VALUE op OP-to-output-FC-map)))
          (PUT-VALUE-TYPE slot-format op required-productive-parts-slot
                          (if output-fc         ; no values when output-fc not found -- is this
 what we want?
                              (let* ((output-SRT (GET-MAPPED-VALUE op op-to-SRT-map))
                                     (tray-size-out (coerce-to-number (GET-MAPPED-VALUE output-S
RT SRT-to-max-tray-map))))
                                (cons (list (coerce-to-symbol output-SRT) 1 1)  ; first in list
 is assembled part.
                                      (loop for (input-fc input-quantity) in (GET-MAPPED-VALUES
 op op-to-input-FC-qty-map)
                                            when (member input-fc valid-manufactured-fcs :test #
'equal)
                                            collect
                                            (let* ((input-SRT (GET-MAPPED-VALUE input-fc fc-to-S
RT-map))
                                                   (tray-size-in (GET-MAPPED-VALUE input-SRT SRT
```

```
-to-max-tray-map))
                                    (input-quantity (coerce-to-number input-quant
ity)))
                              (list (coerce-to-symbol input-SRT)
                                    input-quantity
                                    (/ (* input-quantity tray-size-out) ; round?
floor?
                                       (max (coerce-to-number tray-size-in) 1)))
))) |#)


(defun TRANS-OPERATION-REQUIRED-OTHER-RESOURCES (op-class required-other-resources-slot this-fn
slot-format
                                    PP-to-FO-map FO-to-PP-map op-to-input-FO-qty-m
ap)
  ;; Slot desc: multiple-values, list (part quantity)
  ;; WARNING: Required non-productive parts is not yet translated.
  (declare (ignore this-fn))
  (loop for op in (class-members op-class *factory-kb*)
        with valid-purchased-part-fos = (GET-MAPPED-VALUES :ALL PP-to-FO-map)
        do (PUT-VALUE-TYPE slot-format op required-other-resources-slot
                       (loop for (fo quantity) in (GET-MAPPED-VALUES op op-to-input-FO-qty-m
ap)
                             when (member FO valid-purchased-part-fos :test #'equal)
                             collect (list (coerce-to-symbol (GET-MAPPED-VALUE FO FO-to-PP-m
ap)) ; unit.name of ppart
                                           (coerce-to-number quantity))))))


;;;-----------------
;;;   MACHINES
;;;-----------------

(defun TRANS-MACHINE-AGV-MOVE-TIME (machine-class AGV-move-time-slot this-fn slot-format
                                    machine-to-cellid-map pref-cellid-to-op-map
                                    op-to-move-time-map FROM-OP-to-TO-OP-map
                                    op-to-possible-machs-map)
  ;; Slot desc: Multiple-values, list (machine-class duration-in-secs)
  (declare (ignore this-fn))
  (loop for machine in (class-members machine-class *factory-kb*)
        for cellid = (GET-MAPPED-VALUE machine machine-to-cellid-map)
        do (PUT-VALUE-TYPE slot-format machine agv-move-time-slot
                 (loop for op in (GET-MAPPED-VALUES cellid pref-cellid-to-op-map)
                       for move-time = (GET-MAPPED-VALUE op op-to-move-time-map)
                       for to-op = (coerce-to-symbol (GET-MAPPED-VALUE op FROM-OP-to-TO-OP-map))
                       for possible-machs-class = (if (unit.exists.p to-op)
                                                      (GET-MAPPED-VALUE to-op op-to-possible-mach
s-map))
                       when possible-machs-class  ; only include if exists??
                       collect (list (coerce-to-unit possible-machs-class)
                                     (HOURS-TO-SECONDS move-time))))))


(defun TRANS-MACHINE-STARTUP-ACTIVITY-STATUS (machine-class startup-activity-status-slot this-fn
 slot-format
                                    machine-to-state-status-map build-content-time-ma
p
                                    machine-to-cellid-map cellid-to-activity-status-m
ap)
  ;; Slot desc: multiple-values-in-list, (symbol-or-string integer integer symbol string integer
)
  ;;                               (op-name duration start-time box-type activity-id quant
ity)
  ;; WARNING: Records in MANFACTV file may be mostly blank.
  (declare (ignore this-fn))
  (loop for machine in (class-members machine-class *factory-kb*)
        for FOS-cellid = (GET-MAPPED-VALUE machine machine-to-cellid-map)

        ;; Collect DOWN box info, with LIST elements as above.
        for (cellid cell-state op-state-time) = (GET-MAPPED-VALUE fos-cellid machine-to-state-st
atus-map)
```

```
        for machine-is-down = (equal "D" cell-state)
        for down-box-info = (when machine-is-down   ;; make a DOWN box
                              (cond ((and up-state-time (>= bc-time (string-to-utime up-state-ti
me)))
                                     (inform 'warning "~%Ignoring status DOWN for machine   ~a,~
                                                       ~%          since it will be UP by    ~a,~
                                                       ~%          before Build-Context time ~a.~
%"
                                        (coerce-to-symbol machine) up-state-time (utime-to-
string bc-time))
                                     (setq machine-is-down NIL)) ;; WARNING: treating as not dow
n.  COND must return NIL.
                                    (t (list nil (- (string-to-utime up-state-time) bc-time) bc-
time 'D nil nil))))

        ;; Collect ACTIVITY box info, with LIST elements as above.
        for (op-name activity-id activity-type actual-start-time schedule-duration cumulative-do
wn-time
             time-to-up-state schedule-qty current-qty) = (GET-MAPPED-VALUE fcs-cellid cellid-to
-activity-status-map)
        for activity-box-info = (if (not (member activity-id `(NIL ,*error-token* "0000000") :t
est #'equal))
                                    (COLLECT-ACTIVITY-INFO (coerce-to-symbol machine) bc-time ma
chine-is-down op-name
                                                          activity-id activity-type actual-star
t-time schedule-duration
                                                          cumulative-down-time time-to-up-state
 schedule-qty current-qty))
        with bc-time = (GET-MAPPED-VALUE :ALL build-context-time-map)
        when (or down-box-info activity-box-info)
        do (PUT-VALUE-TYPE slot-format machine startup-activity-status-slot
                           (remove NIL `(,down-box-info ,activity-box-info)))))

        ;; (when (or (null cell-state) (equal cell-state "G")) (setq cell-state "O"))  ; not use
d ?


(defun TRANS-MACHINE-STARTUP-OPERATION-STATUS (machine-class machine-startup-operation-status-sl
ot this-fn slot-format
                                              activity-status-map machine-to-cellid-map)
  ;; Slot desc: Multiple-values-in-list, (symbol-or-string integer integer symbol string integer
)
  ;;                                   (op-or-pm schedule-duration actual-start-time box-type
activity-id quantity)
  ;; Note: these activities haven't started yet, and so no adjustments are needed.
  (declare (ignore this-fn))
  (loop for machine in (class-members machine-class *factory-kb*)
        for cellid = (GET-MAPPED-VALUE machine machine-to-cellid-map)
        do
        (PUT-VALUE-TYPE slot-format machine machine-startup-operation-status-slot
                        (loop for (op-name activity-id activity-type start-time duration quantit
y)
                              in (GET-MAPPED-VALUES cellid activity-status-map)
                              for box-type = (convert-box-type activity-type)
                              when (not (member activity-id `(NIL ,*error-token* "0000000") :te
st #'equal))
                              unless (if (and (member box-type '(p s))
                                              (null (coerce-to-unit op-name)))
                                         (progn (inform 'caution "~%Bad Operation for machine st
artup status: ~s~%" op-name)
                                                t))
                              collect (list (if (eq box-type 'pm) op-name (coerce-to-symbol op-n
ame)) ;; for pm, use string
                                            (convert-string-to-duration duration)
                                            (string-to-utime start-time)
                                            box-type
                                            activity-id
                                            (coerce-to-number quantity)))))))

(defun TRANS-MACHINE-SCHEDULED-PM-FREQUENCY (machine-class scheduled-pm-frequency-slot this-fn s
lot-format
                                             machine-to-cellid-map cellid-to-pm-code-duration-m
ap)
```

```
                                        pm-code-to-start-due-freq-map)
  ;; Slot desc: Multiple-values, list (pm-code start-time end-time duration frequency)
  ;; Start at BD-time, go to horizon-end time, eventually make an entry for each period specifi
ed by frequency.
  (declare (ignore this-fn))
  (loop for machine in (class-members machine-class *factory-kb*)
        for cellid = (GET-MAPPED-VALUE machine machine-to-cellid-map)
        do (PUT-VALUE-TYPE slot-format machine scheduled-pm-frequency-slot
                        (loop for (pm-code duration) in (GET-MAPPED-VALUES cellid cellid-to-p
m-code-duration-map)
                              for pm-context-info = (GET-MAPPED-VALUE pm-code pm-code-to-star
t-due-freq-map)
                              for (early-start-time due-date-time frequency) = pm-context-inf
o
                              when pm-context-info   ; what about (nil nil nil)?
                              collect (list (coerce-to-symbol pm-code)
                                            (string-to-utime early-start-time)
                                            (string-to-utime due-date-time)
                                            (convert-string-to-duration duration)
                                            (convert-string-to-duration frequency))))))

(defun TRANS-MACHINE-TIME-TO-DEGRADE-STATE (machine-class time-to-degrade-state-slot this-fn slo
t-format
                                        machine-to-cellid-map cellid-to-degrade-state-map)
  ;; Slot desc: single-value, integer
  (declare (ignore this-fn))
  (loop for machine in (class-members machine-class *factory-kb*)
        for cellid = (GET-MAPPED-VALUE machine machine-to-cellid-map)
        for time-to-degrade-state = (GET-MAPPED-VALUE cellid cellid-to-degrade-state-map)
        do (PUT-VALUE-TYPE slot-format machine time-to-degrade-state-slot
                        (if (member time-to-degrade-state '(NIL ,*error-token*))
                            0                   ; WARNING: Is this the right default?  Or leave
empty??
                            (string-to-utime time-to-degrade-state)))))

(defun TRANS-MACHINE-CUMULATIVE-DEGRADED-TIME (machine-class cumulative-degraded-time-slot this-
fn slot-format
                                        machine-to-cellid-map cellid-to-cumulative-degrad
e-map)
  ;; Slot desc: single-value, integer
  (declare (ignore this-fn))
  (loop for machine in (class-members machine-class *factory-kb*)
        for cellid = (GET-MAPPED-VALUE machine machine-to-cellid-map)
        for cumulative-degraded-time = (GET-MAPPED-VALUE cellid cellid-to-cumulative-degrade-map
)
        do (PUT-VALUE-TYPE slot-format machine cumulative-degraded-time-slot
                        (if (member cumulative-degraded-time '(NIL ,*error-token*))
                            0                   ; WARNING: is this the right default? or leave e
mpty?
                            (convert-string-to-duration cumulative-degraded-time)))))


;;;----------------------
;;;  PURCHASED-PARTS
;;;----------------------

(defun CREATE-PURCHASED-PART-DATA-CODE (purchased-parts-class data-code-slot this-fn slot-format
                                        ppart-FC-map)
  ;; Slot desc: single-value, string (FCS FC)
  (declare (ignore this-fn))
  (loop for ppart-FC in (GET-MAPPED-VALUES :ALL ppart-FC-map)
        for ppart-name = (coerce-to-symbol (format nil "PP-~a" ppart-FC))
        with parent = (or (unit.exists.p purchased-parts-class *factory-kb*)    ; should already
 exist in AXLE.
                        (create.unit purchased-parts-class *factory-kb*))
        unless (unit.ancestor.p parent (unit.exists.p ppart-name *factory-kb*) 'member) ; in cas
e exists unattached...
        do (let ((ppart-unit (create.unit ppart-name *factory-kb* nil parent)))
             (PUT-VALUE-TYPE '(single-value symbol) ppart-unit 'SELF ppart-name)
             (PUT-VALUE-TYPE slot-format ppart-unit data-code-slot ppart-FC))))
```

```
(defun TRANS-PURCHASED-PART-LEAD-TIME (purchased-parts-class lead-time-slot this-fn slot-format
                                      PP-to-FO-map FO-to-lead-time-map)
  ;; Slot desc: single-value, number
  (declare (ignore this-fn))
  (loop for ppart in (class-members purchased-parts-class *factory-kb*)
        do (PUT-VALUE-TYPE slot-format ppart lead-time-slot
                           (convert-string-to-duration
                             (GET-MAPPED-VALUE (GET-MAPPED-VALUE ppart PP-to-FO-map) FO-to-lead-
time-map)))))


(defun TRANS-PURCHASED-PART-EXPECTED-RECEIPTS (purchased-part-class expected-receipts-slot this-
fn slot-format
                                                 PP-to-FO-map FO-to-inv-qty-map FO-to-expected-qty
-date-flag-map)
  ;; Slot desc: multiple-values, list
  (declare (ignore this-fn))
  (loop for ppart in (class-members purchased-part-class *factory-kb*)
        for FO = (GET-MAPPED-VALUE ppart PP-to-FO-map)
        for inv-qty-list  ; inventory qty -- (total-qty 0 Y) ; 0 is time of negative infinity, Y
 is constraint flag.
        = (loop for inv-qty in (GET-MAPPED-VALUES FO FO-to-inv-qty-map)
                sum (coerce-to-number inv-qty) into total
                finally (unless (zerop total) (list (list total 0 'Y))))        ; will append
        for receipt-info-list  ; this is expected receipts, with real date.
        = (loop for (quantity receipt-date constraint-flag) in (GET-MAPPED-VALUES FO FO-to-expec
ted-qty-date-flag-map)
                collect (list (coerce-to-number quantity)
                              (string-to-utime receipt-date)
                              (if (member constraint-flag &(NIL ,*error-token*))
                                  'Y
                                  (coerce-to-symbol constraint-flag))))
       when (or inv-qty-list receipt-info-list)
       do (PUT-VALUE-TYPE slot-format ppart expected-receipts-slot (append inv-qty-list receipt
-info-list))))


;;;---------------
;;;  ORDERS
;;;---------------

(defun CREATE-ORDER-DATA-CODE (ass-order-class data-code-slot this-fn slot-format
                               order-record-FO-due-map FO-to-ERT-map)
  ;; Slot desc: single-value, symbol (unit name of FOS data-record)
  (declare (ignore this-fn))
  (loop for (data-record-name FO date-due) in (GET-MAPPED-VALUES :ALL order-record-FO-due-map)
; get all order info
        for ERT = (GET-MAPPED-VALUE FO FO-to-ERT-map)
        for order-name = (gentemp (format nil "ORD-~a-~a-" (if (= (length date-due) 23) (subseq
date-due 5 10) "??-??")
                                          (coerce-to-symbol (or ERT FO)))
                                  'kbs)
        with parent = (unit ass-order-class *order-kb*)
        do (let ((order-unit (create.unit order-name *order-kb* nil parent)))
             (PUT-VALUE-TYPE '(single-value symbol) order-unit 'SELF order-name)
             (PUT-VALUE-TYPE slot-format order-unit data-code-slot data-record-name) )))

(defun TRANS-ORDER-SLOT-UNCHANGED (order-class order-slot this-fn slot-format
                                   order-to-record-map record-to-data-slot-map)
  ;; Slot desc: Single-value, string
  (declare (ignore this-fn))
  (loop for order in (class-members order-class *order-kb*)
        do (PUT-VALUE-TYPE slot-format order order-slot
                           (GET-MAPPED-VALUE (GET-MAPPED-VALUE order order-to-record-map) record
-to-data-slot-map))))

(defun TRANS-ORDIN-ORDER-TABLE (order-class order-table-slot this-fn slot-format
                                order-to-FO-qty-due-map FO-to-ERT-map FO-to-CP-map)
  ;; Slot desc: single-value-in-list, list (symbol symbol integer integer) = (ERT CP quantity du
e-date)
```

```
(declare (ignore this-fn))
(loop for order in (class-members order-class *order-kb*)
      for (FC qty time-due) = (GET-MAPPED-VALUE order order-to-FC-qty-due-map)
      for SRT = (GET-MAPPED-VALUE FC FC-to-SRT-map)
      for OP = (GET-MAPPED-VALUE FC FC-to-OP-map)
      do (PUT-VALUE-TYPE slot-format order order-table-slot
                         (list (coerce-to-symbol SRT)
                               (coerce-to-symbol OP)   ; use OP instead of SOT...
                               (coerce-to-number qty)
                               (string-to-utime time-due)))))


;;;=================================================
;;;   Auxiliary Fns used by the Translation Functions
;;;=================================================

;;; ------------------------------------------
;;;     Auxiliary Fns for TRANS-PART-ROUTING
;;; ------------------------------------------

(defun GET-LAST-FCS (functional-code-list)
  "Auxiliary function for TRANS-PART-ROUTING.
   Return the functional-codes with the largest d"staged" number: chars 13-15.
   Several FCs can erroneously end up with the same highest stage."
  (let* ((ordered-list (sort (copy-list functional-code-list)  ; SORT is destructive, so copy th
e list.
                             #'>  ; highest codes at beginning of list.
                             :key  #'(lambda (fc) (coerce-to-number (subseq fc 12 15)))))
         (highest (when ordered-list (subseq (car ordered-list) 12 15)))
         (highest-ones (when highest
                         (remove-if-not #'(lambda (fc) (equal fc highest))
                                        ordered-list
                                        :key #'(lambda (fc) (subseq fc 12 15))))))
    (when (> (length highest-ones) 1)
        (inform 'warning "~%Warning: A part has multiple functional codes with d
                         ~%the same op-stage: ~a~%"
                highest-ones))
    highest-ones))

(defun GET-ROUTING (op-name valid-ops TO-OP-to-FROM-OP-rank-TO-OP-MAP)
  "Auxiliary function for TRANS-PART-ROUTING.
   Given the last operation in a routing, chain using
   the FROM-TO relation to find the earlier operations."
  ;; IMPROVE: make a check to see that op-step1 is always a "000" op-name.
  ;; Note: only chains on routings of rank "01"
  ;; Slot-map: (Routings-File To-Operation-Name Rank From-Operation-Name Rank To-Operation-Name)
  (if op-name
      (let* ((next-steps (GET-MAPPED-VALUES op-name TO-OP-to-FROM-OP-rank-TO-OP-map))
             (next-routing-steps (remove-if-not #'(lambda (entry)
                                                   (and (equal (second entry) "01")  ; rank "01
"; from-op is valid.
                                                        (member (coerce-to-symbol (first entry)
) valid-ops)))
                                               next-steps)))
        (when (> (length next-routing-steps) 1)
          (inform 'warning "~%multiple routings encountered for a single part: ~a~%" next-routin
g-steps))
        (or (loop for (from-op rank to-op) in next-routing-steps
                  for beginning-routing = (get-routing from-op valid-ops TO-OP-to-FROM-OP-rank-T
O-OP-map)
                  when beginning-routing do (return `(,@beginning-routing ,to-op)))  ; take firs
t non-empty one.
            (list op-name))))  ; if none found, return original entry; there are no more.


;;;-----------------------------------------------------------------------------------
;;;    Auxiliary Fn for TRANS-MACHINE-STARTUP-ACTIVITY-STATUS
;;;-----------------------------------------------------------------------------------

;;; Manufacturing-cells == mc
```

```
;;; MO-state-status - shortname manfstat - this tells you whether the machine is up or down.
;;; cell id - 7 bytes
;;; cell state - 1 byte (O or D or G)  -- treat G as O
;;; up state time - 23 bytes - when a D machine will to back up
;;; degraded state time - 23 bytes - ignore for now.
;;; MO-activity-status - shortname manfactv - this tells you what the machine is doing right now
.
;;;   This record has a lot of info, and you can calculate what you want from it.
;;; cell id
;;; activity id - 9 bytes - if 0, ignore this record
;;; activity type - 2 bytes
;;; operation name - 19 bytes
;;; schedule quantity - 9 bytes - use this, not current quantity
;;; cumulative-down-time - 10 bytes
;;; cumulative-degraded-time - 10 bytes - ignore
;;; current-quantity - how many parts built so far - ignore
;;; schedule-duration - 10 bytes
;;; actual-start-time - 23 bytes - Add this to schedule-duration to get end-time if machine is u
p.
;;; time of update - 23 bytes - ignore - time that the cell last reported its status to FCS
;;; time to up state - 23 bytes - time at which a down machine will be up
;;; time to degrade state - 23 bytes - ignore
;;; schedule operation type - 12 bytes - BOT!
;;; tray serial number - 7 bytes - ignore - get serial number from activity id

;;; MO-operational-schedule - shortname man-oper - what the machine will be doing - fields just
like MO-activity-status
;;; cell id
;;; activity id - 9 bytes - if 0, ignore this record
;;; activity type - 2 bytes
;;; operation name - 19 bytes
;;; start-time - 23 bytes - use this - add to duration to get end-time
;;; (or y-return-time - 23 bytes - ignore
;;; duration - 10 bytes
;;; quantity - 8 bytes
;;; schedule operation type - 12 bytes - BOT!
;;; tray serial number - 7 bytes - ignore - get serial number from activity id

(defun COLLECT-ACTIVITY-INFO (machine bc-time machine-is-down op-name activity-id activity-type
actual-start-time
                              schedule-duration cumulative-down-time time-to-up-state schedule-q
uantity current-quantity)
  "Auxiliary function for TRANSFORM-WHITE-STARTUP-ACTIVITY-STATUS.
   Make the data list for a Status activity box:
   (op-name duration start-time box-type activity-id quantity)"
  (let* ((box-type (convert-box-type activity-type))  ;; check that op is valid for box type.
         (op (coerce-to-symbol op-name)))
    (when (and (member box-type '(P S)) (null (coerce-to-unit op)))
      (inform 'caution "~%Bad operation ~s for machine ~a activity status.~%" op-name machine)
      (return-from collect-activity-info nil))
    (let* ((actual-start-time (string-to-utime actual-start-time))
           (schedule-duration (convert-string-to-duration schedule-duration))
           (cumulative-down-time (convert-string-to-duration cumulative-down-time))
           (time-to-up-state (max (if (numberp actual-start-time) actual-start-time bc-time)   ;;
could be 1970 default...
                                  (if (not (member time-to-up-state '(NIL ,error-token)))
                                      (string-to-utime time-to-up-state) 0)))
           (schedule-quantity (coerce-to-number schedule-quantity))
           (current-quantity (coerce-to-number current-quantity)))
      (let ((test-list (list actual-start-time schedule-duration cumulative-down-time  ;; make s
ure all are numbers.
                             time-to-up-state schedule-quantity current-quantity)))
        (unless (every #'numberp test-list)
          (inform 'caution "~%Non-numeric args for machine ~a and op ~a status activity calculat
ions: ~%   ~a~%"
                  machine op-name test-list)
          (return-from collect-activity-info nil)))
      (when (> current-quantity schedule-quantity)  ;; is this really worth noting???
        (inform 'caution "~%On machine ~a, the current production quantity ~a~
                         ~%          for part ~a exceeds the schedule quantity ~a.~%"
                machine current-quantity (get.value op 'part-id) schedule-quantity))
```

```
   (let* ((actual-duration
             (if (equal activity-type "MP")                                 ; ONLY PROCESSES NOT S
ETUPS! CRJ 5/10/89.
                (round (* schedule-duration                                  ; This is a correction
 for the
                       (/ (- schedule-quantity                               ; fraction remaining t
o be processed;
                             (min schedule-quantity current-quantity))      ; assumes time proport
ional to quantity.
                          (max 1 schedule-quantity))))

                ;; When an activity-type is an MS, or similar operation which has no quantity
                ;; its duration should not be based on its quantity.  Also, if the schedules
                ;; duration is shorter than the time already spent on this activity, and sinc
e
                ;; we have to use a positive number for the duration, we choose to schedule t
he
                ;; whole duration since it is better than less than nothing.  Ideas???  CRJ
5/10/89

                (max schedule-duration
                     (- schedule-duration (- bc-time actual-start-time))))); Note: not true f
or something like heat treat
                                                                             ; or SETUPS.
         (duration (round (+ actual-duration cumulative-down-time (- actual-start-time bc-ti
me)))))
     (when (and machine-is-down (<= duration 0))
       (setq duration actual-duration)
       (inform 'caution "U%For DOWN machine Ua, the calculated remaining duration for UaU
                       u%is negative; Using duration proportional to pieces of Ua remaining
 on tray.U%"
                machine op-name (get.value op 'part-id)))
     (list (if (eq box-type 'pm) op-name op) ; use string for PM case, symbol otherwise.
           (if machine-is-down duration actual-duration)
           (if machine-is-down time-to-up-state actual-start-time)
           box-type
           activity-id
           schedule-quantity))))


;;;======================================
;;;   General Translation Utilities
;;;======================================


(defun PIECES-TO-TRAYS-WITH-REJECTION-MSG (piece-count full-tray-piece-count count-as-full-thres
hold &PT
                                          &optional (msg "On-Hand WIP"))
  "Convert PIECE-COUNT into trays, giving a b"Rejectedb" message for any
   pieces that do not fit onto a tray with COUNT-ALL-FULL-TRESHOLD pieces.
   Return the number of complete trays and the number of pieces left-over."
  (multiple-value-bind (complete-trays rejected-pieces)
      (pieces-to-trays piece-count full-tray-piece-count count-as-full-threshold)
    (unless (= rejected-pieces 0)
     (inform 'notification  "U%Ua partial tray rejected: U2,' d parts of type UaU%"
             msg rejected-pieces (coerce-to-symbol srt)))
   (values complete-trays rejected-pieces)))

(defun PIECES-TO-TRAYS (piece-count full-tray-piece-count count-as-full-threshold)
  "Convert PIECE-COUNT into trays.
   Return the number of complete trays and the number of pieces left-over.
   Note that a partial tray with at least the COUNT-AS-FULL-THRESHOLD is counted as a full tray.
"
  ;; two main uses:  count-as-full-threshold = (* .75 full-tray-piece-count) for converting inve
ntory to stock on hand;
  ;;                 count-as-full-threshold = 1 for converting ordered piece count quantities t
o number of trays to build.
  (when (or (not (numberp full-tray-piece-count)) (minusp full-tray-piece-count))
    (inform 'notification "U2%Invalid maximum tray capacity of Ua encountered converting Ua to t
rays; using 1.U%"
```

```
           full-tray-piece-count piece-count)
      (setq full-tray-piece-count 1))
  (when (or (not (numberp count-as-full-threshold)) (zerop count-as-full-threshold))
    (inform 'notification "~2%Invalid count-as-full-tray threshold ~a encountered converting ~a
to trays; using 1.~%"
           count-as-full-threshold piece-count)
    (setq count-as-full-threshold 1))
  ;; need check on COUNT-AS-FULL-THRESHOLD, *****
  (multiple-value-bind (complete-trays partial-tray-piece-count)
      (floor piece-count full-tray-piece-count)
    (if (>= partial-tray-piece-count count-as-full-threshold)  ; count as one full tray.
        (values (1+ complete-trays) 0)  ; count partial tray as full; nothing remaining.
        (values complete-trays (round partial-tray-piece-count)))))

(defun CLASS-MEMBERS (class &optional kb)
  "Return the member units of CLASS."
  ;; WARNING: Tries to be fast for data-kb classes by using unit.children.
  (declare (special *data-kb*))
  (setq class (unit class kb))
  (if (eq (unit.kb-name class) (kb.name *data-kb*))
      (unit.children class 'member)              ; assume only 1 level; much faster.
      (unit.descendants class 'member)))


;;;-------------------------------------------------
;;;    PUT-VALUE-TYPE: Slot Value Installation Fns
;;;-------------------------------------------------

(defun PUT-VALUE-TYPE (slot-format unit slot value)
  "Install VALUE in SLOT of UNIT, using the indicated SLOT-FORMAT."
  (cond ((null value)
         (inform 'warning  "~%~a ~20,,,'-<~a: ~> NO VALUES~%" slot (coerce-to-symbol unit))
         (remove.all.values unit slot))  ;; Then make sure there are no left over values.
        ((null (unit.exists.p unit))
         (inform 'warning "~%~a does not exist as a unit; unable to access slot ~a ~
                        ~%to install value(s) ~s ~%" unit slot value))
        (t (case (car slot-format)
             (single-value (PUT.VALUE unit slot value))
             (multiple-values (PUT.VALUES unit slot value))
             (single-value-in-list (PUT.VALUE unit slot (list value)))
             (multiple-values-in-list (PUT.VALUES unit slot (list value)))
             (t (inform 'error "~%Unrecognized PUT-VALUE-TYPE ~s; unable to install slot ~a valu
e in ~s.~%"
                        (car slot-format) slot (coerce-to-symbol unit))))
           (when (and (active-inform-mode 'detailed) (not (eq slot 'SELF)))
             (report-values slot-format unit slot value)))))

(defun REPORT-VALUES (slot-format unit slot value)
  "Print to the screen the VALUEs for SLOT of UNIT.
   Use SLOT-FORMAT to ensure that each object printed corresponds to
   one value of the slot.  For example, a multiple-valued slot, say
   with two values, will appear as follows: SLOT-NAME UNIT-NAME: VALUE1
                                                                 VALUE2"
  (case (car slot-format)
    (single-value (format-values unit slot (list value)))
    (multiple-values (format-values unit slot value))
    (single-value-in-list (format-values unit slot (list value) t))
    (multiple-values-in-list (format-values unit slot value t))))

(defun FORMAT-VALUES (unit slot value-list &optional show-in-list-p)
  "Print values with an indent corresponding to the size of the unit name
   and slot name.  Start new sublists on their own line.  Add an
   extra level of list embedding if SHOW-IN-LIST-P is non-NIL."
  (let* ((list-values-p (every #'consp value-list))
         (preamble (format nil "~%~a ~a: " slot (unit.name unit)))
         (null-preamble (format nil "~%~VA~" (1- (length preamble))))
         (final-format (format nil (if show-in-list-p  ; the variable indent is embedded in the
iteration, so use string.
```

```
                 (if list-values-p
                     "[illegible]"
                     "[illegible]")
                 (if list-values-p
                     "[illegible]"
                     "[illegible]"))
              preamble null-preamble null-preamble))) ;; variable indent is st
ring.
    (format t final-format value-list)))


;;;------------------------------
;;;   SLOT-MAP Access Fns
;;;------------------------------

;; * Slot-Map is composed of (CLASS KEY-SLOT SLOT1 SLOT2 ...)
;; * Key-Value is a string, symbol, unit, or number.

(defun GET-MAPPED-VALUES-INTERNAL (key-value class key-slot slots &optional single-value-only)
  "Given a Slot-Map consisting of CLASS, KEY-SLOT, and SLOTS,
   retrieve the requested SLOTS for all units in CLASS whose
   KEY-SLOT matches the KEY-VALUE.  KEY-SLOT values are coerced,
   if necessary, in order to match the KEY-VALUE. If KEY-VALUE
   is :ALL, find SLOTS for all CLASS members.  All units are
   assumed to have a SELF slot, containing its own name."
  ;; If there is just one required slot, return single list: (req1 req1 req1 ...)
  ;; If there are multiple required slots, return the slots for each
  ;; matching unit in their own sublist: ((req1 req2 req3) (req1 req2 req3) ...)
  (declare (special *auto-cache*))
  (let (cache)
    (cond ((and (member key-slot '(NIL SELF) :test #'eq)        ; (GET.VALUES <key-value> <slots>)
                (null (eq key-value :all))) ; "ALL" below      ; Make this case first, fastest.
           (MAP-SELF-KEY (coerce-to-unit key-value) class slots))
          ((consp key-slot)                                     ; Key specified directly in SLOT-M
ap
           (unless (eq key-value :all)
             (inform 'warning "~%Using expected key-value :ALL, not ~s, for SLOT-MAP ~s.~%"
                     key-value (list* class key-slot slots)))
           (MAP-WITH-KEY (cadr key-slot) class (first key-slot) slots single-value-only))
          ((eq key-value :all)                                  ; (GET.VALUES <class-members> <sl
ots>)
           (MAP-ALL-KEY (coerce-to-unit class) slots single-value-only))
          ((and *auto-cache* (setq cache (GET-CACHE class key-slot))) ; CACHE enabled, availab

           (MAP-WITH-CACHE key-value class key-slot slots cache single-value-only)) ; So use it.
          (*auto-cache*                         ; CACHE enabled; KEY slot must be available
           (MAP-WITH-CACHE key-value class key-slot slots (MAKE-CACHE class key-slot) single-val
ue-only))
                                                          ; so make CACHE and use it.
          (t (MAP-WITH-KEY key-value class key-slot slots single-value-only)))))

(defun MAP-SELF-KEY (key-value class slots)          ; (GET.VALUES <KEY-VALUE> <SLOTS>)
  "Like (GET.VALUES <key-value> <slots>)"
  (if key-value
      (collect-slot-values key-value slots)
      (progn (inform 'warning "~%Mapping has a null key: Class ~s with slots ~s.~%" class slots)
             nil)))

(defun MAP-ALL-KEY (class slots single-value-only)
  "Like (GET.VALUES <class-members> <slots>)"
  (let ((members (class-members class)))             ; (GET.VALUES <ALL-CLASS-MEMBERS> <SLOTS>)
    (catch 'single-value-only
      (if members
          (loop for member in members
                for values = (collect-slot-values member slots)
                when (and single-value-only values) do (throw 'single-value-only values)
                append values)
          (collect-slot-values class slots)))))   ; (GET.VALUES <CLASS> <SLOTS>)    ; class had
no members.
```

```
(defun MAP-WITH-CACHE (key-value class key-slot slots alist single-value-only)
  "Like (GET.VALUES <class-members-with-key-slot = key-value> <slots>)"
  (if (and key-value alist)                                   ; (GET.VALUES <CLASS-MEMBERS-WITH-KEY-SLOT = K
EY-VALUE> <SLOTS>)
      (if (null single-value-only)
          (loop for unit in (cdr (assoc (coerce-to-symbol key-value) alist))
                append (collect-slot-values unit slots))
          (loop for unit in (cdr (assoc (coerce-to-symbol key-value) alist))
                for values = (collect-slot-values unit slots)
                when values do (return values)))
      (progn (inform 'warning "~%Null arguments encountered while doing Cache lookup:~
                              ~%key ~s, class ~a, key-slot ~a, and cache with length ~a.~%"
                     (coerce-to-symbol key-value) class key-slot (length alist))
             nil)))

(defun MAP-WITH-KEY (key-value class key-slot slots single-value-only)
  "Like (GET.VALUES <members-with-key-slot = key-value> <slots>)."
  (if (or (unitp key-value) (stringp key-value))  ; (GET.VALUES <CLASS-MEMBERS-WITH-KEY-SLOT = K
EY-VALUE> <SLOTS>)
      (setq key-value (coerce-to-symbol key-value)))  ; no coercion of non-numbers, to simplify
 fe.
  (catch 'single-value-only                          ; should make special version of this fn for t
his case...
    (loop for member in (class-members class)        ; Duplicates remain for single-slot?
          for member-key-slot-values = (get.values member key-slot)
          with data-key-coercion-fn
               = (typecase key-value
                   (symbol #'coerce-to-symbol)  ; "23FT   " to 23FT; #Unit: foo ...> to FOO
                   (number #'coerce-to-number)
                   (t (inform 'warning "~2%Trying to find match with KEY of ~
                                       unrecognized datatype: ~s.~%" key-value)
                      #'identity))
          when (member key-value member-key-slot-values :key data-key-coercion-fn)
          append (let ((values (collect-slot-values member slots)))
                   (when (and single-value-only values) (throw 'single-value-only values))
                   values))))

(defun COLLECT-SLOT-VALUES (unit slots)
  "Collect all the values for each slot in SLOTS on UNIT,
   ready for APPENDing to results for other units."
  ;; If just one slot: (val1 val2 val3) -- only non-NIL values.
  ;; If more than that: ((slot1-val slot2-val (slot3-val1 slot3-val2)))
  ;; Note that multiple-values for a slot (slot3, above) are left in a sublist.
  (if (null (cdr slots))
      (remove NIL (get.values unit (car slots)))
      (list (loop for slot in slots
                  for values = (remove NIL (get.values unit slot))  ; collect even if all NIL?
                  collect
                  (if (null (cdr values))
                      (car values)        ; For single value, drop the list str.
                      values)))))        ; For multiple values, must keep it.


;;;---------------------------
;;;  Auxiliary Caching Fns
;;;---------------------------

;;  *AUTO-CACHE*:  A global defined above, normally set to T.
;;                 When T, Slot-Maps are automatically cached.

;;  *CACHES*:      A global defined above, normally initially NIL.
;;                 It is an alist where the Slot-Map Caches are stored.

;;                 Each key is a dotted pair of CLASS and KEY-SLOT.
;;                 Each entry is also an alist, here called a CACHE.
;;                 For each CACHE alist:
;;                         Each key is a KEY-VALUE, as a symbol.
;;                         Each entry has the UNIT.NAMES of units whose KEY-SLOT
;;                              contained values that could be coerced to KEY-VALUE.
```

```
;; NOTE: Each CACHE is currently implemented as an alist; it could be a hash table.
;; WARNING: should index key-values as numbers, not symbols, when original key-value is a numbe
r.

;; The Structure of *CACHES*:

;;   (((<class1> . <key-slot1>)
;;     ((<key-value-symbol> <unit.name> <unit.name> ...)   ; Each CACHE is an ALIST:
;;      (<key-value-symbol> <unit.name> <unit.name> ...)   ;    Alist Keys:    key-values, as sy
mbols.
;;      (<key-value-symbol> <unit.name> <unit.name> ...))) ;    Alist entries: unitnames whose K
EY-SLOT matchs KEY-VALUE

;;    ((<class2> . <key-slot2>)
;;     ((<key-value-symbol> <unit.name> <unit.name> ...)
;;      (<key-value-symbol> <unit.name> <unit.name> ...)
;;      (<key-value-symbol> <unit.name> <unit.name> ...))))

(defun RESET-CACHE ()
  "Set *CACHES* to NIL."
  (declare (special *caches*))
  (setq *caches* nil))

(defmacro MAKE-CACHES-KEY (class key-slot)
  "Make a key for the *CACHES* alist."
  `(cons ,class ,key-slot))

(defun GET-CACHE (class key-slot)
  "Get the CACHE for this entry from *CACHES*."
  (declare (special *caches*))
  (second (assoc (make-caches-key class key-slot) *caches* :test #'equal)))

(defun MAKE-CACHE (class key-slot)  ; make more global cases to speed up code?
  "Create a CACHE for this combination."
  ;; WARNING: Should index key-values as numbers, not symbols, when original key-value is a num
ber.
  ;;           Otherwise, coercion of key values is not reliable: YES doesn't match BOOLE.
  (loop for member in (class-members class)
        for key-values = (get.values member key-slot)  ; handle key slots with multiple-values
        with alist = nil
        when key-values          ; WARNING: not allowing NIL or *error-token* as a key value
        do (loop for key-value in key-values
                 with alist-value = (unit.name member)
                 unless (member key-value `(NIL ,*error-token*))
                 do (setq alist (augment-alist (coerce-to-symbol key-value) alist-value alist)))
        finally (if alist  ; should NULL case be installed anyway?
                    (return (add-cache (make-caches-key class key-slot) alist))
                    (progn (inform 'warning "~%No entries found, while making cache for
                                       ~%class ~s and key-slot ~s.~%" class key-slot)
                           nil))))

(defun ADD-CACHE (cache-key cache)
  "Add the CACHE to the *CACHES* alist under key CACHE-KEY."
  (declare (special *caches*))
  (let ((old-cache (assoc cache-key *caches* :test #'equal)))
    (if old-cache
        (rplacd old-cache (list cache))    ; alist is the new cache.
        (push (list cache-key cache) *caches*))
    cache))

(defun AUGMENT-ALIST (key datum alist &key (test #'eql))
  "If KEY is on the alist, add DATUM to its DATA list; else create an entry for KEY and DATUM."
  ; Note that the alist looks like ((key1 datum1 datum2 ...) (key2 datum1 datum2 ...))
  (let ((entry (assoc key alist :test test)))
    (if entry
        (pushnew datum (cdr entry))
        (push (list key datum) alist))
    alist))
```

```
;;;-------------------------------
;;;   Type Checking Fns        ;; Run as an independant check of the interface after all transla
tion and other checking.
;;;-------------------------------

(defun CHECK-SLOT-FORMATS (&optional (slot-translation-descriptors *SLOT-TRANSLATION-DESCRIPTORS
*
))
  "Print an error message for any Slot whose values do not conform to the
   SLOT-FORMAT specification found in the Slot's Slot-Translation Descriptor."
  ;; Called by DO-PRE-PROCESSING
  (declare (special *SLOT-TRANSLATION-DESCRIPTORS*))
  (inform 'stage "~2%Checking the format of translated slots.~%")
  (loop for (class slot function slot-format) in slot-translation-descriptors
        do (inform 'notification "~2%***** For class ~a, checking slot ~a~%" class slot)
           (loop for member in (class-members class)
                 for values = (get.values member slot)
                 do
                 (CHECK-PUT-VALUE-TYPE slot-format member slot values)  ; check cardinality, lis
t embedding
                 (CHECK-DATA-TYPE slot-format member slot values))      ; check data type of va
lues
        finally (return 'done)))

(defun CHECK-PUT-VALUE-TYPE (slot-format unit slot values)
  "Print an error message if VALUES in SLOT for UNIT
   do not conform to the Put-Value-Type spec in SLOT-FORMAT."
  ;; SLOT-FORMAT is (<put-value-type> <data-type> <data-role>)
  (case (first slot-format)  ;; PUT-VALUE-TYPE
    (SINGLE-VALUE
     (unless (<= (length values) 1)
       (format-value-msg "has more than one value; there should only be one" slot-format unit sl
ot values)))
    (SINGLE-VALUE-IN-LIST
     (unless (<= (length values) 1)
       (format-value-msg "has multiple slot values; it should have one list value" slot-format u
nit slot values))
     (loop for value in values    ;; there should be just one, but check all.
           when (listp value)     ;; must be list for next test...
           do (unless (<= (length value) 1)
                (format-value-msg "has multiple values in the list; there should only be one"
                                  slot-format unit slot (list value)))))
    (MULTIPLE-VALUES-IN-LIST
     (unless (<= (length values) 1)
       (format-value-msg "has multiple slot values; it should have one list value"  slot-format
 unit slot values)))))

(defun CHECK-DATA-TYPE (slot-format unit slot values)
  "Print an error message for each value in VALUES for SLOT in
   UNIT that does not conform to the Data-Type spec in SLOT-FORMAT."
  ;; SLOT-FORMAT is (<put-value-type> <data-type> <data-role>)
  (let ((put-value-type (first slot-format))
        (data-type (second slot-format)))
    (if (member put-value-type '(SINGLE-VALUE MULTIPLE-VALUES))  ; no list embedding in this cas
e
        (loop for value in values
              unless (check-value data-type value)
              do (format-value-msg "has a value that does not match format ~a" slot-format unit
slot (list value)))
        (loop for value-list in values          ; there should only be ONE value, actually, but
test any extras
              do
              (if (null (listp value-list))     ; oops, should be a list...
                  (format-value-msg "has a slot value that is not a list; it should be"
                                    slot-format unit slot (list value-list))
                  (loop for value in value-list ; each one should conform.
                        unless (check-value data-type value)
                        do (format-value-msg "has a value in the list that does not match format
~a"
                                            slot-format unit slot (list value))))))))
```

```
(defun FORMAT-VALUE-MSG (msg slot-format unit slot values)
  "Notify user of a SLOT-FORMAT error."
  ;; SLOT-FORMAT: (<put-value-type> <data-type> <data-role>)
  (format t "U2%U:(Ua) slot U?:U%" (first slot-format) msg (cdr slot-format))  ;; currently, DA
TA-ROLE is not included.
  (format-values unit slot values))

(defun CHECK-VALUE (data-type value)
  "Check if value is of type DATA-TYPE, using the function TYPEP.
   A type of UNIT is also handled.  DATA-TYPE may be a list; in
   that case the elements of VALUE must satisfy the corresponding
   type appearing in DATA-TYPE: (integer symbol) <=> (23 FOO)"
  ;; The last type of DATA-TYPE implicitly repeats if necessary.
  ;; ENHANCEMENT:  It would be nice to permit data-types like (one-of Y N). Perhaps should
  ;;               recognize AND, OR, NOT, and (ONE-OF ...) as special cases XCONSTANTS, too?I,
thus
  ;;               permitting ( (or null (and unit machines)) number (one-of Y N));  (or Y N) fo
r (one-of y n) ??
  ;;               Could use compound symbols instead: MACHINE-UNIT-OR-NIL?  I like this better.
..
  ;;               Also, UNITNAME, <ESS-class> data-types could easily be added...
  (if (listp data-type)
      (and (consp value) (>= (length value) (length data-type))  ; assume missing values are NOT
 permitted.
           (loop for x from 0 to (1- (length value))  ; assume extra vals OK; repeat last data-t
ype when data-type too short
                 always (check-value (or (nth x data-type) (car (last data-type))) (nth x value)
)))
      (if (subtypep data-type 'common)  ; is it a Common Lisp data-type?
          (typep value data-type)       ; yes -- perform the check.
          (case data-type               ; no; dispatch on it.
            (unit (unitp value))
            (symbol-or-string (or (symbolp value) (stringp value)))
            (t (inform 'error "U2%Unknown data-type specifier Us encountered for value Us.U%" da
ta-type value)
               nil)))))


;;;--------------------------
;;;  COERCION Utility fns
;;;--------------------------

(defun CONVERT-BOX-TYPE (activity-type)
  "Convert an FOS activity-type to a Box-type."
  ;; WARNING: FOS-specific function
  (case (coerce-to-symbol activity-type)
    (PM 'PM) ;; preventive maintenance
    (PP 'P)  ;; process
    (W 'P)   ;; process
    (S 'S)   ;; setup?
    (t (inform 'warning "U%Unknown activity type Us encountered.U%" activity-type)
       nil)))

(defun HOURS-TO-SECONDS (hours)
  "Change a number of hours into an integer number of seconds."
  (round (* 3600 (coerce-to-number hours))))
(defun CONVERT-STRING-TO-DURATION (string)  ; where the prettier one?
  "Convert a string duration in the format HHHH:MM:SS (10 chars) to seconds."
  ;; WARNING: FOS-specific function.
  (unless (and (stringp string) (= (length string) 10))
    (inform 'warning "U2%Duration US is not of the form HHHH:MM:SS; returning 0.U%" string)
    (return-from convert-string-to-duration 0))
  (let ((hours (read-from-string string nil nil :end 4))
        (minutes (read-from-string string nil nil :start 5 :end 7))
        (seconds (read-from-string string nil nil :start 8)))
    (if (and (integerp hours) (integerp minutes) (integerp seconds))
        (+ seconds (* minutes 60) (* hours 3600))
        (progn (inform 'warning "U2%Duration Us is not of the form HHHH:MM:SS; returning 0.U%" s
tring)
               0))))
```

```
(defun COERCE-TO-SYMBOL (string-number-symbol-unit)
  "Convert the arg to a symbol, if necessary, by converting
   to uppercase, trimming spaces, and interning."
  (typecase string-number-symbol-unit
    (symbol string-number-symbol-unit)
    (string (intern (string-trim '(#\space) (string-upcase string-number-symbol-unit))
                    'kee))
    (number (intern (format nil "~a" string-number-symbol-unit) 'kee))
    (t (let ((u (unit.exists.p string-number-symbol-unit)))
         (cond (u (unit.name u))
               (t (inform 'notification "~%~%~s could not be coerced to a symbol; returning NIL."
                          string-number-symbol-unit)
                  nil)))))))

(defun COERCE-TO-UNIT (string-or-symbol-or-unit &optional kb)
    "Convert the arg to unit, if possible; even coerce strings."
    (or (unit.exists.p string-or-symbol-or-unit kb)
        (unit.exists.p (coerce-to-symbol string-or-symbol-or-unit)
                       kb)
        (progn (inform 'notification
                       "~%~%~s could not be coerced to a unit; returning NIL.~%" string-or-symbol
-or-unit)
               nil)))

(defun COERCE-TO-NUMBER (string-or-number &optional (default 0))
  "Either coerce to a number, or give a warning and return the default, which defaults to 0."
  (or (typecase string-or-number
        (number string-or-number)  ; done.
        (string (let ((num (read-from-string string-or-number nil nil)))
                  (if (numberp num) num))))
      (progn (inform 'notification
                     "~%~%~s could not be coerced to a number; using ~s.~%" string-or-number defa
ult)
             default)))
;;; -*- Mode:Common-Lisp; Package:KEE; Base:10 -*-

(in-package 'kee)


;;; ---------------------------------------------------
;;;        DECREMENT INVENTORY FROM ORDER
;;; ---------------------------------------------------

;;; ----------------------------------------------------------
;;;   Main Function for decrementing orders from inventory.
;;; ----------------------------------------------------------

(defun DECREMENT-ORDERS-FROM-INVENTORY (&key (restore-initial-slot-values t) (restore-order-quan
tities t))

  "Restore original inventory levels, and then reduce the size of orders -- earliest orders first
 --
   from on-hand inventory -- first-arriving inventory first -- thus preserving maximum flexibilit
y for scheduler."

  ;; rewritten 10/10/88 MJJ to handle dated WIP.

  ;; Note that all initial slots and order quantities are restored first.  This could easily be
changed
  ;; so that only the slots actually used here are restored: ON-HAND-WIP, and order table QUANTI
TY.

  (when restore-initial-slot-values (restore-initial-slot-values))  ; restore slots in *slots-to
-restore-before-rescheduling*
  (when restore-order-quantities (restore-order-quantities))  ; restore order-table QUANTITY fro
m the NETTED-QUANTITY slot.
  (let ((selected-orders (get.values 'control-unit 'selected-orders)))  ; MUST be unitnames.
    (unless selected-orders (return-from decrement-orders-from-inventory nil))
    (let* ((sorted-order-entries (sort-order-entries-by-due-date selected-orders)))
      (loop for order-entry in sorted-order-entries
```

```
          for order = (first order-entry)
          for partname = (unit.name (second order-entry))
          for final-op = (third order-entry)
          for pieces-to-build = (fourth order-entry)
          for due-date = (fifth order-entry)
          for pieces-per-tray = (get.value partname 'maximum-tray-size)
          for trays-to-build = (pieces-to-trays pieces-to-build pieces-per-tray 1) ; even 1 le
ft-over piece = full tray.
          for on-hand-wip-str = (get.values final-op 'on-hand-wip)
          when (and on-hand-wip-str (numberp pieces-to-build))
          do
          (when (zerop pieces-per-tray)
            (inform 'warning "~2%Maximum-tray-size is zero for part ~a.~%" partname))
          (multiple-value-bind (new-wip-str trays-remaining)
              (reduce-on-hand-wip on-hand-wip-str
                                  partname
                                  trays-to-build
                                  0))            ; 0 is utime of *minus-infinity*
            (put.values final-op 'on-hand-wip new-wip-str)  ; update the wip structure.
            (update-order-table-quantity order
                                         (max 0  ; never reduce order below zero; may be build
ing more than order.
                                              (- pieces-to-build (* (- trays-to-build trays-re
maining)
                                                                    pieces-per-tray))))))))

(defun REDUCE-ON-HAND-WIP (on-hand-wip-str partname quantity reduction-utime)
  "Reduce the latest ON-HAND-WIP available by REDUCTION-UTIME by QUANTITY for PARTNAME.
   ON-HAND-WIP and QUANTITY should either both be in trays, or both be in pieces.
   Returns the updated WIP list str, and any remaining quantity that couldn't be reduced."

  ;; wip str: ((part quantity receipt-utime constraint-flag) (part quantity receipt-utime constra
int-flag) ...)
  ;;           where parts can appear more than once.
  ;; The calling procedure should install the new WIP str as the current one.

  ;; The last arriving WIP before REDUCTION-UTIME is used up first.

  ;;  WARNING: THIS generally doesn't work if multiple EQUAL lists appear; this has to be done ve
ry carefully.
  ;;  Convert to a "multi-list" at some point.
  ;;  Return quantity reduced instead of not reduced?
  ;;  Take out copy-lists when sure that new value will always be installed?

  (let ((ordered-on-hand-wip-str                                  ; use up latest arriving stuff f
irst.
         (let ((first-entry (first on-hand-wip-str)))
           (if (> (length first-entry) 2)  ; if only two, then no utime is present.
               (stable-sort on-hand-wip-str #'> :key                 ; gives scheduler the most f
lexibility.
                            (if (symbolp (first first-entry))  ; if symbol, then includes part
name.
                                #'third #'second))
               on-hand-wip-str)))  ; don't try to sort if no utime key present.
    (loop for full-wip-entry in ordered-on-hand-wip-str
          for wip-entry = (if (symbolp (first full-wip-entry)) (cdr full-wip-entry) full-wip-ent
ry)
          for wip-quantity = (first wip-entry)
          for wip-utime = (second wip-entry)
          when (and (or (not (symbolp (first full-wip-entry)))  ; if not symbol, no need for par
t agreement; assume OK.
                        (eq partname (first full-wip-entry)))   ; else, make sure part agrees.
                    (if wip-utime                  ; handle case where there is no utime for now.
                        (<= wip-utime reduction-utime)  ; must have them before you can use tha
t
                        t))
          do (if (>= wip-quantity quantity)
                 (progn (setf (first wip-entry) (- wip-quantity quantity)) ; reduction complete
; return update wip str.
                        (return (values ordered-on-hand-WIP-str 0)))    ; no remaining quantity
 to find and reduce.
```

```
                (progn (setq quantity (- quantity wip-quantity))       ; reduction partially fu
lfilled.
                       (setf (first wip-entry) 0)))    ; this wip-quantity has been used up; co
ntinue to find remaining amt
          finally (return (values ordered-on-hand-wip-str quantity)))))


(defun SORT-BY-LATEST-ARRIVAL (wip-str)
  "Sort the list of lists by the third element of the sublists, using >."
  (stable-sort wip-str #'> :key #'third))


(defun UPDATE-ORDER-TABLE-QUANTITY (order piece-count)
  "Set the piece-count (third item) in the order table for the indicated order."
  (let ((order-table (if (unit.exists.p order) (copy-tree (car (get.value order 'order-table))))
))
    (when order-table
      (if (< piece-count 0) (inform 'warning "~%~%Negative quantity encountered while updating or
der ~a; using 0.~%"
                                     (unit.name order)))
      (setf (third order-table) (max 0 (round piece-count)))
      (put.value order 'order-table (list order-table)))))


(defun SORT-ORDER-ENTRIES-BY-DUE-DATE (orders)
  "Sort orders, earliest first.  Returns a five-tuple:
   (<order name> <ESS partname> <ESS final op> <piece-count> <due-date in universal time intege
r>)"
  ;; Quantity is in pieces, not trays, for orders.
  ;; Tries to work for manual orders, which do not (yet) have a netted-quantity slot.
  (let ((order-entries
          (loop for order in orders
                when (unit.exists.p order)
                collect
                (let* ((date/time-due (get.value order 'date/time-due))
                       (quantity (get.value order 'netted-quantity))
                       (order-table (car (get.value order 'order-table))))
                  (list order
                        (first order-table)             ; ESS part name
                        (second order-table)            ; ESS final op
                        (or quantity (third order-table))  ; order quantity; handle manual order
s.
                        (if date/time-due               ; Due date; handle manual orders.
                            (string-to-utime date/time-due)
                            (fourth order-table)))))))
    (sort order-entries #'< :key #'fifth)))



(defun RESTORE-INITIAL-SLOT-VALUES (&optional class slot)   ; 10/10/88 MJJ
  "Restore the original values for CLASS members with slot SLOT from the slot INITIAL-<SLOT>.
   By default, restores all slots in *SLOTS-TO-RESTORE-BEFORE-RESCHEDULING*."
  (loop for class-slot in (or (if (and class slot) (list (list class slot)))
                            *slots-to-restore-before-rescheduling*)
        for class = (first class-slot)
        for slot = (second class-slot)
        for initial-slot = (coerce-to-symbol (format nil "INITIAL-~a" slot))  ; INITIAL-on-hand-
wip, etc.
        collect
        (loop for member in (append (discarded-units class) (unit.descendants class 'member))
              for values =  (get.values member initial-slot)  ; get initial slot values
              do
              (put.values member slot values)               ; and restore them
              collect (list (unit.name member) values))))     ; return only used for debugging.


(defun REPORT-INITIAL-SLOT-VALUES (&optional class slot)   ; 10/10/88 MJJ
  "Report the original (INITIAL) values and real slots for CLASS members with slot SLOT."
  (loop for class-slot in (or (if (and class slot) (list (list class slot)))
                            *slots-to-restore-before-rescheduling*)
```

```
        for class = (first class-slot)
        for slot = (second class-slot)
        for initial-slot = (coerce-to-symbol (format nil "INITIAL-~a" slot))  ; INITIAL-on-hand-
ip, etc.
        do
        (loop for member in (append (discarded-units class) (unit.descendants class 'member))
              for values1 =  (get.values member initial-slot)  ; get initial slot values
              for values2 =  (get.values member slot)  ; get slot values
              when (or values1 values2)
              do
              (format T "~%~15a ~20a ~a~%~15a ~20a ~a~%" (unit.name member) initial-slot values1
                      " " slot values2))))


(defun INITIALIZE-INITIAL-SLOT-VALUES (&optional class slot)   ; 10/10/88 MAJ
  "Copy out the original (INITIAL) values and real slots for CLASS members with slot SLOT."
  (loop for class-slot in (or (if (and class slot) (list (list class slot)))
                              *slots-to-restore-before-rescheduling*)
        for class = (first class-slot)
        for slot = (second class-slot)
        for initial-slot = (coerce-to-symbol (format nil "INITIAL-~a" slot))  ; INITIAL-on-hand-
ip, etc.
        do
        (loop for member in (append (discarded-units class) (unit.descendants class 'member))
              for values1 =  (get.values member initial-slot)  ; get initial slot values
              for values2 =  (get.values member slot)  ; get slot values
              when (or values1 values2)
              do
              (remove.all.values member initial-slot)
              (remove.all.values member slot))))

(defun RESTORE-ORDER-QUANTITIES (&optional orders)
  "Restore the order table entry for quantity to be the value of the order's netted-quantity slo
t, if it has one."
  (loop for order in (or orders (loop for class in '(component-orders factory-orders
                                               net-order-demand-orders rejected-orders)
                                  append (unit.descendants class 'member)))
        for table = (get.value order 'order-table)
        for netted-quantity = (get.value order 'netted-quantity)
        do (if (and table netted-quantity)
               (update-order-table-quantity order netted-quantity)
               (inform 'notification "~2%Order quantity could not be restored for order ~a~%" (u
nit.name order)))))

;;; -*- Mode:Common-Lisp; Package:KEE; Fonts:(cptfont HL10B cptfont HL12B HL12BI); Syntax:ZETALI
SP; Base:10 -*-

;; This file contains all function related to trays allocation.
;; A tray is a generic unit that attains specific attributes during initialization.
;; Trays are recycled and are maintained in a 'pool' format.
;; There is a pool of used trays and free trays.

(defun allocate-final-trays-from-order (order)
  "This function explodes the final assembly order into assembly and component trays"
  (let* ((latest-due-date 0)
         (valid-parts (unit.descendants 'parts 'member))
         assembly-qty assembly-part-name assembly-due-date assembly-pieces-per-tray assembly-tra
y-qty assembly-tray)
    (loop for order-item in (get.value order  'order-table)      ; loop for each item (assembly)
ordered with
          when (not (zerop (setq assembly-qty (third order-item))))     ; qty not = zero
          do
          (setq assembly-part-name (first order-item))              ; The order table is in the f
orm (part qty due-date)
          (cond ((member (unit assembly-part-name) valid-parts)
          (setq assembly-due-date (fourth order-item))
          (if (> assembly-due-date latest-due-date)
              (setq latest-due-date assembly-due-date))
          (setq assembly-pieces-per-tray (get.value assembly-part-name 'maximum-tray-size))
          (setq assembly-tray-qty (ceiling (/ assembly-qty assembly-pieces-per-tray)))  ; how ma
ny assembly trays do I need?
```

```
        (loop repeat assembly-tray-qty do       ; loop for each tray of the item
              (setq assembly-tray (get-any-tray-from-free-pool 'assembly-trays))      ; ordere
d (assembly)-
              (initialize-tray-slots assembly-tray assembly-part-name order assembly-due-date
t)
              (determine-batching assembly-tray)
              (generate-sub-assy-and-component-trays order assembly-part-name assembly-tray as
sembly-due-date)))
              (t (format t "~%% Trying to schedule part ~a which isn't a valid part " assembly-
part-name))))
    (put.value *control-unit* 'horizon-end (max (or (get.value *control-unit* 'horizon-end) 0)))
    (set-time-parameters)))

(defun generate-sub-assy-and-component-trays (order assembly-part-name assembly-tray assembly-du
e-date)
  (let* ((routing (get.value assembly-part-name 'routing))
         component-part-name component-trays-per-assembly-tray component-tray component-count
         percent-offset match quit required-parts-list)
                                                  ; Component entries are in the form ((component)
 ignore trays-per-assembly-tray)
    (loop for oper in routing
          until (or (null routing) quit) do
          (setq required-parts-list (get.values oper 'required-productive-parts))
          (when required-parts-list
            (setq quit t)
            (loop for entry in required-parts-list
                  until (or (null entry) match) do
                  (when (equal (unit.name (caar entry)) assembly-part-name)
                    (setq match t)
                    (setq required-parts-list entry)))))
    (loop for component-entry in required-parts-list    ;loop for each component part of
          when (not (equal (setq component-part-name (unit.name (car component-entry))) ;the ord
ered assembly (not
                           assembly-part-name)) ;including the assembly itself)
          do
          (setq component-trays-per-assembly-tray (third component-entry))
          (setq component-count -1)                ; so the first tray has offset of 0%
          (loop repeat component-trays-per-assembly-tray do      ;loop for as many trays of a com
ponent
                (setq component-tray
                      (get-any-tray-from-free-pool
                        (if (or (member (unit component-part-name) (unit.children 'assemblies 'm
ember))
                                (member (unit component-part-name) (unit.children 'sub-assemblie
s 'member)))
                            'sub-assembly-trays
                            'component-trays))) ;as I need for one assembly tray
                (initialize-tray-slots component-tray component-part-name order assembly-due-dat
e)
                (determine-batching component-tray)
                (setq component-count (1+ component-count))
                (setq percent-offset (round-2 (//quotient component-count component-trays-per-ass
embly-tray)))
                (put.value component-tray 'assembly-tray (list assembly-tray percent-offset))
                (add.value assembly-tray 'component-trays
                           component-tray))
          (if (or (member (unit component-part-name) (unit.children 'assemblies 'member))
                  (member (unit component-part-name) (unit.children 'sub-assemblies 'member)))
              (generate-sub-assy-and-component-trays order component-part-name component-tray as
sembly-due-date)))))

#|(defun get-any-tray-from-free-pool-old (&optional tray)
  " Return a unit from the free-pool."
  (let* ((free-unit (or tray (first (unit.children 'FREE-TRAY-POOL 'MEMBER) )))
         return-unit)
    (cond (free-unit                        ;; if there is a tray in the free pool
           (replace.parent free-unit 'free-tray-pool 'trays-in-system 'member)       ;; move tra
y to used pool
           (setq return-unit free-unit))
          (t ;; no unit in free pool, so create the new tray
           (setq return-unit (create-new-tray))))
    return-unit))|#
```

```
#|(defun get-any-tray-from-free-pool (&optional tray)        ;; like above but seems to create li
ke trays for linked parts
  " Return a unit from the free-pool."
  ;; input arg "tray" is only an atom -- we must create a tray unit for it.
  (if tray
      (let* ((trayu (create.unit tray 'trays nil 'sip-and-spares-trays "Generic tray unit that i
s uniquely initiailized for each run."
                              nil nil nil)))
        (add.parent trayu 'trays-in-system 'member)
        trayu)
      (let* ((free-unit (first (unit.children 'FREE-TRAY-POOL 'MEMBER) ))                   ;; els
e get a free tray
         return-unit)
        (cond (free-unit                                                                     ;; if
there is a tray in the free pool
               (replace.parent free-unit 'free-tray-pool 'trays-in-system 'member)         ;; move
tray to used pool
               (setq return-unit free-unit))
              (t                                                                          ;; no un
it in free pool, so create the new tray
               (setq return-unit (create-new-tray))))
        return-unit)))|#

(defun get-any-tray-from-free-pool (type &optional tray)
  (let* ((free-pool (get.value type 'free-tray-pool))
         (system-trays (get.value type 'trays-in-system))
         (free-tray (pop free-pool)))   ;Get one of the classes free trays.
    (cond (free-tray                                                   ;If there is a free one, ma
ke it unfree and return it.
           (put.value type 'free-tray-pool free-pool)
           (when tray
             (when (unit.exists.p tray)
               (rename.unit tray (get-unique-tray-name)))
             (rename.unit free-tray tray))
           ;(remove.value type 'free-tray-pool free-tray)
           (put.value type 'trays-in-system (adjoin (unit free-tray) system-trays))       ;; per
 chris james   8-22-89
           free-tray)
          (t                                        ;No free ones, create one.
           (create-new-tray type tray)))))

(defun create-new-tray (type &optional tray)
  " Create a new tray as a member of the trays-in-system."
  (unless tray                                      ;Unless we passed the name of the tray.  Create
a name.
    (setq tray (read-from-string
                (format nil "tray-~4,'0D-~2,'0D"
                        (get.value 'tray 'number-of-created-trays) xxx))))
  (PUT.VALUE 'TRAY 'NUMBER-OF-CREATED-TRAYS (1+ (GET.VALUE 'TRAY 'NUMBER-OF-CREATED-TRAYS)))

  (cond ((unit.exists.p tray)     ;; if a tray already exists with this name then get a different
 tray name
         (create-new-tray type))
        (t                               ;; since this a unique tray name create the unit
         (let ((new-tray (create.unit tray 'trays nil type nil
                                      nil nil 'compact-unit))
               (system-trays (get.value type 'trays-in-system)))
           (put.value type 'trays-in-system (push (unit new-tray) system-trays))
           ;(add.value type 'trays-in-system new-tray)
           new-tray))))

#|(defun create-new-tray (type)
  " Create a new tray as a member of the trays-in-system."
  (let (new-tray)
    (PUT.VALUE 'TRAY 'NUMBER-OF-CREATED-TRAYS (1+ (GET.VALUE 'TRAY 'NUMBER-OF-CREATED-TRAYS)))
    (setq new-tray (read-from-string
                    (format nil "tray-~4,'0D-~2,'0D"
                            (get.value 'tray 'number-of-created-trays) xxx)))
    (cond ((unit.exists.p new-tray)     ;; if a tray already exists with this name then get a dif
ferent tray name
```

```
        (create-new-tray))
       (t                                  ;; since this a unique tray name create the unit
        (create.unit new-tray 'trays nil 'trays-in-system "Generic tray unit that is uniquely
initiailized for each run-"
                     nil nil nil))))) |#

(defun initialize-tray-slots (tray tray-type order due-date &optional assy)
 " Initialize the slots used on trays during scheduling."
  (kk.remove.all.values (tray trays-in-system) 'initial-box)
  (kk.remove.all.values (tray trays-in-system) 'final-box)
   (KK.PUT.VALUE (TRAY TRAYS-IN-SYSTEM) 'DUE-DATE DUE-DATE)
   (KK.PUT.VALUE (TRAY TRAYS-IN-SYSTEM) 'MAXIMUM-TRAY-SIZE (or (GET.VALUE TRAY-TYPE 'MAXIMUM-TRAY
-SIZE)
                                              (get.value (car (unit.parents tray 'member)) 'MAXIMUM-T
RAY-SIZE)))
   (if (null (unit.exists.p order))
       (create.unit order 'orders))
   (KK.PUT.VALUE (TRAY TRAYS-IN-SYSTEM) 'ORDER (UNIT ORDER))
   (KK.PUT.VALUE (TRAY TRAYS-IN-SYSTEM) 'PART-ID TRAY-TYPE)
   (KK.PUT.VALUE (TRAY TRAYS-IN-SYSTEM) 'ROUTING (GET.VALUE TRAY-TYPE 'ROUTING))
   (KK.PUT.VALUE (TRAY TRAYS-IN-SYSTEM) 'TRAY-SIZE (GET.VALUE TRAY-TYPE 'MAXIMUM-TRAY-SIZE))
   (KK.PUT.VALUE (TRAY TRAYS-IN-SYSTEM) 'ALL-OPERS-SCHEDULED T)
   (kk.remove.all.values (tray trays-in-system) 'component-trays)        ; Added so we can associ
ate assembly trays with their components  11/11/87
   (kk.remove.all.values (tray trays-in-system) 'assembly-tray)
   (when (and (member (unit tray-type) (unit.descendants 'parts 'member))
              assy)
     (KK.PUT.VALUE (TRAY TRAYS-IN-SYSTEM) 'NUMERIC-TRAY-CODE (GET.VALUE (KK.GET.VALUE (TRAY TRAYS
-IN-SYSTEM) 'PART-ID) 'NUMERIC-PART-CODE))))


   #|(cond ((and (member (unit tray-type) (unit.descendants 'parts 'member))
              assy)                     ;;  need to rethink how to handle customer ordered componen
ts as final products
          (replace.parent tray 'trays-in-system 'assembly-trays 'member)
          (KK.PUT.VALUE (TRAY TRAYS-IN-SYSTEM) 'NUMERIC-TRAY-CODE (GET.VALUE (KK.GET.VALUE (TRAY
TRAYS-IN-SYSTEM) 'PART-ID) 'NUMERIC-PART-CODE)))
         ((member (unit tray-type) (unit.children 'sub-assemblies 'member))
          (replace.parent tray 'trays-in-system 'sub-assembly-trays 'member))
         (t (replace.parent tray 'trays-in-system 'component-trays 'member))))|#

(defun return-trays-to-free-pool ()
  " Take all units in the current used-pool and place then into the free list."
  ;; No data is changed on the units.  If the unit is in the free pool, its data should be consi
dered invalid.
   (get-unique-tray-name 'initialize)
   (loop for tray in (unit.children 'ASSEMBLY-TRAYS 'MEMBER)
         do
         ;; reset the parents unit to free-tray-pool and blank out numeric code
         (KK.REMOVE.ALL.VALUES (TRAY TRAYS-IN-SYSTEM) 'NUMERIC-TRAY-CODE)
         (recycle-tray-to-free-pool tray))
   (loop for tray in (unit.children 'SUB-ASSEMBLY-TRAYS 'MEMBER) do
         (recycle-tray-to-free-pool tray))
   (loop for tray in (unit.children 'COMPONENT-TRAYS 'MEMBER) do
         (recycle-tray-to-free-pool tray))
   (loop for tray in (unit.children 'WIP-AND-SPARES-TRAYS 'MEMBER) do
         (recycle-tray-to-free-pool tray)))


 (defun recycle-tray-to-free-pool (tray)
   " Takes a tray no longer needed and put it back into the free pool of trays."
   (rename.unit tray (get-unique-tray-name))
   (let* ((parent (car (unit.parents tray 'member)))
          (free-pool (get.value parent 'free-tray-pool 'own))
          (system-trays (get.value parent 'trays-in-system 'own)))

     (put.value parent 'free-tray-pool (adjoin (unit tray) free-pool))          ;;  per chris j
ames   8-22-89
```

```
  (put.value parent 'trays-in-system (delete (unit tray) system-trays))))


#|(defun recycle-tray-to-free-pool (tray)
  " Takes a tray no longer needed and put it back into the free pool of trays."
  (rename.unit tray (get-unique-tray-name))
  (remove.value (car (unit.parents tray 'member)) 'trays-in-system tray)
  (add.value (car (unit.parents tray 'member)) 'free-tray-pool tray 'member))
  ;(replace.parent tray (first (unit.parents tray 'member)) 'free-tray-pool 'member))|#

(defun get-unique-tray-name (&optional initialize-p)
  "Get a unique tray name of the form TRAY-1234-XX"
  (if initialize-p
      (put.value 'trays-in-system 'tray-number 1)
      ;; else
      (let* (tray-number tray-name)
        (loop while (let ()  ;; Look for an unused number/name-
                     (setq tray-number (1+ (get.value 'trays-in-system 'tray-number)))
                     (setq tray-name (intern (format nil "TRAY-~4,'0d-XX" tray-number)))
                     (put.value 'trays-in-system 'tray-number tray-number)
                     (unit tray-name nil nil 'dontask))
              do nil)
        tray-name)))

(defun determine-batching (tray)
  " Function determines in tray initialization if a tray is to be batched with other like trays
in schedule generation"
  (let* ((batched-parts (get.values *control-unit* 'parts-to-batch))
         (part-id (kk.get.value (tray trays-in-system) 'part-id))
         (list-of-machines-for-batching nil))
    ;;  Check part id against list of batched parts.  Update if necessary.
    (dolist (entry batched-parts)
      (cond ((or (equal part-id (first entry))
                 (not (first entry)))
             (setq list-of-machines-for-batching
                   (append  list-of-machines-for-batching
                            (list (second entry)))))))     ;;   remove unit.name DHO  12-19-88
    (KK.PUT.VALUE (TRAY TRAYS-IN-SYSTEM) 'MACHINES-TO-BATCH LIST-OF-MACHINES-FOR-BATCHING)))

(defun fix-trays ()
  (loop for tray in (unit.children 'free-tray-pool 'member) do  ;; MUST REDEFINE FOR NEW COMPACT
UNITS, CRJ 4/20/89.
        (remove.parent tray 'free-tray-pool 'member)
        (add.parent tray 'free-tray-pool 'member)))

;; -*- Mode:Common-Lisp; Package:KEE; Fonts:(cptfont HL10B cptfont HL12B HL12BI); Base:10 -*-

;;; UTILITIES.LISP: This file contains the major functions to support the "USER INTERFACE"-
;;                    as well as other general functions used for the Expert System Scheduler
        DHO    3/17/87
;;  **********************************************************************************************
*******

;; This is the main function to update in order to change the ESS-LOGO menu.  This function is N
OT called when loading,
;; however it remains in this file to be used for updating the menu.  It modifies the 'MENUITEMS
 slot of 'CONTROL-UNIT in the AXLES KB.

(defun modify-control-unit ()
  (PUT.VALUES 'CONTROL-UNIT 'MENUITEMS
              (LIST (WATCH-CONTROL-OPTION)
                    (DO-IT-ALL-OPTION)
                    (INTERFACE-CHECKER)
                    (DEVELOP-SCHEDULE-MENU)
;;                  (INITIALIZE-FOR-SCHEDULE)
                    (INITIALIZE-FOR-SCHEDULE-AND-RUN)
;;                  (RUN-SCHEDULE)
                    (USE-INVENTORY)
                    (SHIFT-SCHEDULE)
                    (PREVENTIVE-MAINT)
                    (RESCHEDULE-LEFT-OPTION)
```

```
;;                         (PURCHASED-PARTS)
                           (SAFETY-STOCK)
                           (COMPONENT-ORDERS)
                           (SUMMARY-REPORTS)
                           (VIEW-IO-FILES)
                           (COMMIT-FILES)
                           (DEFAULT-CALENDAR-MENU)
                           (SETUP-TIMES-MENU)
                           (USER-PARAMETER-MENU)))
  ;Added to cascade when the default function is nil.  DRJ 5/9/89.
  (UT.PUT.VALUE 'control-unit 'menuitems 'button-method 'cascade-on-nil-menu-button-method))


;; The right button menu for the msg-output-window (a CommonWindow)
(defparameter *output-window-right-menu-item-list*
              '(("Bury" bury "Bury this window")
                ("Clear" clear "Clear this window")
                ("Close" close "Close this window")))

;; The right button method for the msg-output-window (a CommonWindow)
(defun output-window-button-method (stream mouse-state)
  (let ((button-state (mouse-state-button-state mouse-state))
        selection)
    (cond ((eql button-state mouse-right-1)
           (setq selection (pop-up-menu-choose *output-window-right-menu-item-list*))
           (case selection
                 (bury (bury stream))
                 (close (deactivate stream))
                 (clear (clear-window-stream stream))))
          ((eql button-state mouse-left-1)
           (expose stream)
           (select-window-stream stream)))))

(defun make-msg-output-window (control-unit)
  (ignore control-unit)
  (let* (window)
    (setq window (make-window-stream
;;                     :left 475 :bottom 480 :width 545 :height 275 :borders 2
                       :left 550 :bottom 480 :width 595 :height 275 :borders 2     ;;  changed fo
r new screen display   DHD  2-17-89
                       :title "Expert System Scheduler Output Messages"
                       :title-font *title-font* :font-set (list (open-font 'helvetica 'bold 10))
                       :parent *kee-root-window* :type 'window-stream))
    (PUT.VALUE 'CONTROL-UNIT 'MSG-OUTPUT-WINDOW WINDOW)
    (enable-window-stream-page-scrolling window :more-p t)
    (expose window)
    (setf (window-stream-button window) 'output-window-button-method)
    (clear-window-stream window)
    (list window)))

(defun msg-output-window-avget (self slot values unit slottype &optional world)
  "Return the slot's value (a window). If it has no value, make a window, put in the slot, and r
eturn it."
  (ignore world self slot slottype)
  (cond ((null values)
         (unitmsg unit 'make-msg-output-window!))
        (t values)))

(defun interface-checker ()
  '("FCS to ESS Data Translator"
    IO-PRE-PROCESSING-ALL
    "Run Interface Data Translator - Should be done each time a schedule is generated."))

(defun develop-schedule-menu ()
  '(("Order Entry Menu"
    ORDER-ENTRY
    "Create, select, update, or delete orders."
    (SUBITEMS ("Customer orders" nil "Create, update, and delete orders for the factory."
               (SUBITEMS ("Create Orders" 'create-order
                          "Create customer part orders for the factory.")
                         ("Select Orders" 'select-order
```

```
                     "Select customer part orders for demand on the model.")
                    ("Update Orders" 'update-order "Update a customer part order.")
                    ("Delete Orders" 'delete-order "Delete customer orders.")
                    ("Save Orders" 'save-order "Permanently save all customer and component
 orders."")))
          ("Component orders" nil "Create, update, and delete orders for the factory."
           (SUBITEMS ("Create Orders" 'create-top-level-component-order "Create component pa
rt orders for the factory.")
                    ("Update Orders" 'update-component-order "Update a component part order
.")
                    ("Delete Orders" 'delete-component-order "Delete component orders.")
                    ("Save Orders" 'save-order "Permanently save all customer and component
 orders.")
                    ("Select Orders" 'select-component-orders "Select component orders.")))
)))

(defun initialize-for-schedule-and-run ()
  '("Initialize and Develop Schedule"
   'INIT-AND-RUN
   "Initialize and Generate a Schedule for the Chosen Order"))

(defun use-inventory ()
  '("Utilize Inventory and Safety Stock"
   'utilize-onhand-inventory
   "Use Inventory and/or Safety Stock as Required"))

(defun shift-schedule ()
  '("Shift Schedule"
   'shift-schedule-right
   "Right Shift a Schedule to Insure Feasibility"))

(defun purchased-parts ()
  '("Purchased Parts Constraint"
   'schedule-purchased-parts
   "Purchased parts/raw material constraint"))

(defun preventive-maint ()
  '("Schedule Preventive Maintenance"
   'schedule-pm
   "Schedule PM for Machines"))

(defun reschedule-left-option ()
  '("Compact Schedule Left"
   'reschedule-left
   "Compact the Schedule, Moving Boxes to the Left, Possibly Jumping Over Other Boxes"))

(defun safety-stock ()
  '("Replenish Safety Stock"
   'replenish-safety-stock
   "Replenish Safety Stock as Allowable"))

(defun component-orders ()
  '("Schedule Component Orders"
   'schedule-component-orders
   "Schedule Component Orders as Capacity Permits"))

(defun commit-files ()
  '("Write FCS Commit Files"
   'write-commit-files
   "Write out the Commit Files for FCS"))

(defun watch-control-option ()
  '("Control the watch process"
   'WATCH-CONTROL
   "Start, stop, and report status on the process that gets the FCS files from the Unix machine"
   (SUBITEMS ("Show Watch Status"
              'SHOW-WATCH-STATUS
              "Show the current watch process status")
             ("Start Watch Process"
              'START-WATCH
              "Start the process that watches for files from the Stratus appearing on the Unix
```

```
machine")
              ("Stop Watch Process"
               'STOP-WATCH
               "Stop the process that watches for files from the Stratus appearing on the Unix m
achine")))

;;**************************************************************************************************
**

(defun TYPE-IN-HOTSPOT (stream hotspot &optional initial-input (read-type 'string))
  (let (value)
    (unless initial-input (setf initial-input ""))
   (select-window-stream stream)
   (clear-window-stream-region stream (lite-region hotspot))
   (setf (window-stream-x-position stream) (region-left (lite-region hotspot)))
   (setf (window-stream-y-position stream) (- (region-bottom (lite-region hotspot)) 5))
   (turn-on-prompt-blinker stream)
   (setf value (prompt-user read-type :stream stream :prompt "" :initial-input initial-input))
   (turn-off-prompt-blinker stream)
   value))

(defun duration-input (stream hotspot &optional initial-input)
  (let* ((done nil)
         (value-string value)
   (loop while (not done) do
         (setq value-string (TYPE-IN-HOTSPOT stream hotspot initial-input 'string))
         (setq value (convert-string-to-mil-duration value-string))
         (when value (setq done t)))
   value-string))

(defun convert-string-to-mil-duration (string)
  "Convert a string duration from format (5 bytes)  --[HH:MM]-- to seconds"
   (setf string (format nil "~A        " string))
  (when (and (equal ":" (subseq string 2 3))
             (string-num (subseq string 0 1))
             (string-num (subseq string 1 2))
             (string-num (subseq string 3 4))
             (string-num (subseq string 4 5)))
    (let* ((hours (coerce-to-number (subseq string 0 2)))
           (minutes (coerce-to-number (subseq string 3 5))))
      (when (or (and (= 24 hours) (= 0 minutes))
                (and (< hours 24) (< minutes 60)))
        (+ (* minutes 60) (* hours 3600))))))

(defun string-num (s)
  (let* ((c (character s)))
    (and (>= c (character "0"))
         (<= c (character "9")))))

(defun close-panel (self)
  (closew (get.value self 'window)))

(defun logo-buttonfn (&optional keepicture viewport mouse x-coord y-coord)
  "Call the function that corresponds the the SEE-LOGO menu item chosen-"
  (ignore keepicture viewport mouse x-coord y-coord)
   (let ((command (menu (GET-SLOT-MENU 'MENUITEMS 'CONTROL-UNIT) )))
     (when command      ;; perform the task selected from the menu
       (if (functionp command)
           (funcall command)
           (format t "0% Option UA not yet implemented" command)))))

(defun round-2 (number)
  "Round a number to 2 decimal places"
 (fquotient (round (*  number 100 ) 100))

(defun report-execution-time (window)
  "This function prints out the execution time of the various modules"
 (expose window)
 (format window " took ~a minutes"
           (round-2 (+ (fquotient (fquotient (tic::time-difference *time2* *time1*) 60) 60) 0.0
1))) )
```

```
(defun check-all (&optional after-init-only)
  (feasibility-caller)
  (unless after-init-only (check-boxes-ok))
  (check-box-times)
  (check-machines)
  (check-trays))

(defun feasibility-caller ( )
  (let* ((msg-output-window (GET.VALUE *CONTROL-UNIT* 'MSG-OUTPUT-WINDOW)))
    (cond ((get.value *control-unit* 'selected-orders)
           (setq  *number-nonsync-opers* 0)
           (setq  *total-number-opers* 0)
           (loop for tray in (get-trays-in-system) do              ;xxxx??Jyyycrj
                 (let* ((box (kk.get.value (tray trays-in-system) 'initial-box)))
                   (when (and box (kk.get.value (box boxes) 'end-time))
                     (feasibility-checker box))))
           (pointer-checker)
           ;; pointer-checker-2)
           (if (not (equal 0  *total-number-opers*))
           (format msg-output-window "U% This generated schedule is Ua % synchronous"
                   (round-2 (- 100 (* 100 (round-2 (fquotient *number-nonsync-opers* *total-numb
er-opers*))))))))))

(defun feasibility-checker (box)
  (let* ((next-machine-box (kk.get.value (box boxes) 'same-machine-successor))
         (next-tray-box (kk.get.value (box boxes) 'same-tray-successor))
         agv-move-time)
    (cond ((kk.get.value (box boxes) 'start-time)
           (cond (next-tray-box
                  (setq agv-move-time (+ (get-agv-time (kk.get.value (box boxes) 'machine)
                                                       (kk.get.value (next-tray-box boxes) 'mach
ine))

                                         (retrieve-process-times (kk.get.value (box boxes) 'tray
) (kk.get.value (box boxes) 'operation)

                                                                 (kk.get.value (box boxes) 'machin
e) 'lead-time)));;  put back in lead time
                  (when (and (not (synchronous-boxes box next-tray-box))
                             (not (equal (unit.name (kk.get.value (next-tray-box boxes) 'operati
on)) 'assembly)))
                    (setq *number-nonsync-opers* (+ *number-nonsync-opers* 1)))
                  (setq *total-number-opers* (+ *total-number-opers* 1))))
          (when (and (eq (get.value (kk.get.value (box boxes) 'machine) 'infinite-capacity) nil
)

                     next-machine-box
                     (not (and (equal 'U (kk.get.value (next-machine-box boxes) 'box-type))
                               (memq (kk.get.value (box boxes) 'box-type) '(P X))))
                     (> (kk.get.value (box boxes) 'end-time) (kk.get.value (next-machine-box bo
xes) 'start-time)))
            (format t "U% Machine infeasibility at box Ua end-time Ua and machine successor Ua
start-time Ua act-id ua "
                    (unit.name box) (kk.get.value (box boxes) 'end-time) (unit.name next-machin
e-box)
                    (kk.get.value (next-machine-box boxes) 'start-time) (kk.get.value (box boxe
s) 'activity-id)))
          (when next-tray-box
            (let* ((end-time (kk.get.value (box boxes) 'END-TIME))
                   (start-time (kk.get.value (next-tray-box boxes) 'START-TIME)))
              (when (and (> (+ end-time agv-move-time) start-time)
                         (not (equal (unit.name (kk.get.value (next-tray-box boxes) 'operation)
) 'assembly)))
                (format t "U%Tray infeasibility box Ua and tray-successor Ua machines Ua Ua end
 Ua start Ua delta Ua agv Ua"
                        (unit.name box) (unit.name next-tray-box) (kk.get.value (box boxes) 'ma
chine)
                        (kk.get.value (next-tray-box boxes) 'machine) end-time start-time (- st
art-time end-time) agv-move-time))))
          (when next-tray-box
            (feasibility-checker next-tray-box))))))

(defun pointer-checker ()
```

```
(loop for box in (unit.children 'boxes 'member) do
      (let* ((machine (kk.get.value (box boxes) 'MACHINE))
             (box-end (kk.get.value (box boxes) 'end-time))
             (box-start (kk.get.value (box boxes) 'start-time))
             (next-box (when (and machine
                                  (eq 'no (get.value machine 'infinite-capacity)))
                         (kk.get.value (box boxes) 'same-machine-successor))))
        (cond ((not box-end) nil)
              ((not box-start)
               (format T "~% No start/end time: ~a start ~a end ~a" (unit.name box) box-start
box-end))
              (next-box
               (let* ((next-box-start (kk.get.value (next-box boxes) 'start-time))
                      (overlapping-boxes (and (equal 'U (kk.get.value (next-box boxes) 'box-ty
pe))
                                              (memq (kk.get.value (box boxes) 'box-type) '(P X
))))
                 (cond ((or
                         (and overlapping-boxes
                              (> box-end (kk.get.value (next-box boxes) 'end-time)))
                         (and (not overlapping-boxes)
                              (and (> box-end next-box-start))))
                        (format T "~%~a boxes: current-box ~a end-time ~a next box ~a start-ti
me ~a machine ~a act-id ~a"
                                (if overlapping-boxes "Overlapping" " ")
                                (unit.name box) (utime-to-string box-end) (unit.name next-box)

                                (utime-to-string next-box-start) (unit.name machine) (kk.get.v
alue (box boxes) 'activity-id))))))
              (when (and (equal (get.value machine 'INFINITE-CAPACITY) 'no)
                         (not (kk.get.value (box boxes) 'same-machine-predecessor))
                         (not (equal box (get.value machine 'FIRST-BOX-ON-MACHINE))))
                (format t "~% Pointer problem with box ~a box predecessor ~a machine ~a first
 box ~a act-id ~a"
                        (unit.name box)
                        (kk.get.value (box boxes) 'SAME-MACHINE-PREDECESSOR) (unit.name machi
ne)
                        (get.value machine 'FIRST-BOX-ON-MACHINE) (kk.get.value (box boxes) '
ACTIVITY-ID)))))))

(defun pointer-checker-2 ()
  "Check for boxes that are lost - are not in the chain starting with first-box-on-machine"
  (loop for box in (unit.children 'boxes 'member) do
        (when (and (kk.get.value (box boxes) 'END-TIME) (kk.get.value (box boxes) 'MACHINE))
          ;;(not (memq (kk.get.value (box boxes) 'BOX-TYPE) '(S))))
          (when (not (kk.get.value (box boxes) 'BOX-TYPE))
            (format T "Box ~a has end time but no box-type~%" (unit.name box)))
          (let* ((prev (kk.get.value (box boxes) 'SAME-MACHINE-PREDECESSOR)))
            (when (and prev (not (eq box (kk.get.value (prev boxes) 'SAME-MACHINE-SUCCESSOR))))
              (format T "Pointers inconsistent between box ~a and box ~a~%" (unit.name prev)(uni
t.name box))))
        (let* ((machine (kk.get.value (box boxes) 'MACHINE))
               (m-box (get.value machine 'FIRST-BOX-ON-MACHINE))
               (box-ok nil)
               (done nil))
          (loop while (and m-box (not box-ok) (not done)) do
                (cond ((eq m-box box)
                       (setq box-ok t))
                      (t (setq m-box (kk.get.value (m-box boxes) 'SAME-MACHINE-SUCCESSOR)))))
          (unless box-ok
            (format T "~%Lost box: ~a  on machine: ~a  box-type: ~a" (unit.name box)(unit.name
machine)
                    (kk.get.value (box boxes) 'box-type)))))))

(defun check-boxes-ok ()
  (loop for tray in (get-trays-in-system)
        do                                                         ;xxx???yyyzzz
        (loop for box = (kk.get.value (tray trays-in-system) 'initial-box)
              then (kk.get.value (box boxes) 'same-tray-successor)
              until (null box) do
              (box-ok box tray))))
```

```
(defun box-ok (box tray)
  (let* ((box-type (kk.get.value (box boxes) 'box-type))
         (start-time (kk.get.value (box boxes) 'start-time))
         (end-time (kk.get.value (box boxes) 'end-time))
         (next (kk.get.value (box boxes) 'same-machine-successor))
         (prev (kk.get.value (box boxes) 'same-machine-predecessor))
         (machine (kk.get.value (box boxes) 'machine)))
    (when (and prev
               (not (equal box (kk.get.value (prev boxes) 'same-machine-successor))))
      (format T "Ü%Box Üa has bad predecessor Üa act-id Üa" (unit.name box) (unit.name prev) (kk
.get.value (box boxes) 'activity-id)))
    (when (and next
               (not (equal box (kk.get.value (next boxes) 'same-machine-predecessor))))
      (format T "Ü%Box Üa has bad successor Üa act-id Üa" (unit.name box) (unit.name next)(kk.ge
t.value (box boxes) 'activity-id)))
    (if (and start-time end-time machine
             (or (eq 'E box-type)
                 (and next prev)))
        nil ;; ok
        ;; else
        (format T "Ü%Tray: Üa Bad box: Üa start Üa end Üa prev Üa next Üa machine Üa op Üa act-i
d Üa~%" (unit.name tray)
                (unit.name box) start-time end-time prev next machine (kk.get.value (box boxes)
'operation)
                (kk.get.value (box boxes) 'activity-id)))))

(defun check-box-times ()
  (loop for box in (unit.children 'boxes 'member) with start and end do
        (setq start (kk.get.value (box boxes) 'START-TIME))
        (setq end (kk.get.value (box boxes) 'END-TIME))
        (when (and start end)
          (when (and (< end start)
                     (not (eq (kk.get.value (box boxes) 'box-type) 'PM)))
            (format t "Ü%End before start - Box: Üa Start: Üa End: Üa act-id Üa"
                    (unit.name box) start end (kk.get.value (box boxes) 'ACTIVITY-ID)))))))

(defun check-backschedule-times ()
  "  Check to insure that no events were backscheduled prior to the previous schedule passed fro
m
FDS"
  (loop for m in (unit.descendants 'machines 'member) do
        (loop for box = (get.value m 'first-box-on-machine)
              then (kk.get.value (box boxes) 'same-machine-successor)
              until (or (null box) (> (kk.get.value (box boxes) 'start-time) 0)) do
                    (when (and (< (kk.get.value (box boxes) 'start-time) 0)
                               (not (kk.get.value (box boxes) 'from-previous-schedule))
                               (not (eq (kk.get.value (box boxes) 'box-type) 'E)))
                      (format t "Ü% box Üa on machine Üa starts at Üa which is before events fr
om the previous schedule "
                              (unit.name box) (unit.name (kk.get.value (box boxes) 'machine))
                              (utime-to-string (kk.get.value (box boxes) 'start-time)))))))

(defun check-machines ()
  (loop for machine in (unit.descendants 'machines 'member)
        when (not (equal 'yes (get.value machine 'infinite-capacity))) do
        (check-machines-2 machine)))

(defun check-machines-2 (machine)
  (let* ((last-end *minus-infinity*)
         (current-over nil)
         need-setup first-process)
    (setq first-process (next-movable-box nil machine)) ;;     7-19-89   DHO  to catch problem w
ith new schedule code
    (when first-process
      (when (and (memq (get.value first-process 'box-type) '(P X))
                 (not (get.value first-process 'from-previous-schedule))
                 (setq need-setup (if (not (eq 0 (get-setup-time  previous-process-box first-pr
ocess) first-process machine)))
                                      T
                                      NIL)))
```

```
        (format t "~%  box ~a on machine ~a is the first event with no associated setup" (unit.na
me first-process)
                 (unit.name machine))))
    (loop for box = (get.value machine 'first-box-on-machine)
          then (kk.get.value (box boxes) 'same-machine-successor)
          until (null box) do
          (let* ((box-type (kk.get.value (box boxes) 'box-type))
                 (machine (kk.get.value (box boxes) 'machine)))
            (cond ((memq box-type '(D E U PM)) nil)      ; ignore these-
                  ((equal box-type 'S)
                   (setq current-pvor (get-box-pvor box))
                   ;;   don't always need setup between different PVOR's        DHO       6-30-8
9
                   (setq need-setup (if (not (eql 0 (get-setup-time (previous-process-box box) b
ox machine)))
                                       T
                                       NIL))
                   (check-machine-setups box machine))
                  ((memq box-type '(P X))
                                                ;;   7-19-89   DHO  to catch problem with new schedu
le code
                   (let* ((this-pvor (get-box-pvor box)))
                     (when (and (not (equal current-pvor this-pvor))
                                current-pvor
                                need-setup                             ;; 6-30-89    DHO
                                (not (kk.get.value (box boxes) 'ACTIVITY-ID)))
                       (format t "~%Missing setup for box: ~a  this-pvor: ~a on machine: ~a curr
ent-pvor: ~a act-id ~a"
                               (unit.name box) this-pvor
                               (unit.name machine) current-pvor (kk.get.value (box boxes) 'ACTIV
ITY-ID)))
                     (setq current-pvor (get-box-pvor box))))
                  (t (format T "~%Unknown box-type ~a in box ~a~%" box-type box))))
          (setq last-end (kk.get.value (box boxes) 'end-time)))))

(defun check-machine-setups (box machine)
  "Input is a setup box.  Test unnecessary, not abutting, correct setup duration."
  (let* (;;(left-box  (kk.get.value (box boxes) 'SAME-MACHINE-PREDECESSOR))
         (right-box (kk.get.value (box boxes) 'SAME-MACHINE-SUCCESSOR))
         (previous-process-box (previous-process-box box))
         (next-process-box (next-process-box box machine)))
    ;; Test for unnecessary extra setup box.
    (when (and previous-process-box
               (same-pvor-p previous-process-box box))
      (format t "~%Setup box ~a has same pvor as previous-process-box ~a at time ~a successor ~a
 activity-id ~a"
              (unit.name box) (unit.name previous-process-box) (utime-to-string (kk.get.value (b
ox boxes) 'start-time))
              (unit.name (kk.get.value (box boxes) 'same-machine-successor)) (kk.get.value (box
boxes) 'ACTIVITY-ID)))
    ;; Test for setup box not abutting P box.
    (let* ((right-box-type (kk.get.value (right-box boxes) 'BOX-TYPE)))
;;;       (when (or (not (memq right-box-type '(P X)))
;;       (when (and (memq right-box-type '(P X))                               ;;    check for P or
 X    DHO      3-16-89
;;               (not (= (kk.get.value (right-box boxes) 'START-TIME) (kk.get.value (box boxes) '
END-TIME)))))
;;      (format T "~%Setup box ~a end-time ~a  not abutting P box ~a start-time ~a act-id ~a~%"
;;              (unit.name box) (utime-to-string (kk.get.value (box boxes) 'end-time))
;;              (unit.name right-box) (utime-to-string (kk.get.value (right-box boxes) 'start-time
))
;;      (kk.get.value (box boxes) 'ACTIVITY-ID)))
      (when (and (not (memq right-box-type '(P X)))                              ;;    check for
P or X    DHO      3-16-89
                 (not (= (kk.get.value (right-box boxes) 'START-TIME) (kk.get.value (box boxes) '
END-TIME))))
      (format T "~%Setup box ~a end-time ~a  not abutting a process box ~a start-time ~a act-id
~a~%"
              (unit.name box) (utime-to-string (kk.get.value (box boxes) 'end-time))
              (unit.name right-box) (utime-to-string (kk.get.value (right-box boxes) 'start-time
```

```
)) 'kk.get.value (box boxes) 'ACTIVITY-ID)))
    ;; Test for setup time being correct.
    (let* ((duration (box-duration box))
           (setup-time (get-setup-time previous-process-box next-process-box machine)))
      (when (and (not (= duration setup-time))
                 (not (eq (kk.get.value (box boxes) 'from-previous-schedule) 'ACTIVITY)))
        (format T "ÜXSetup box Üa machine Üa has bad setup time Üa  should be Üa act-id Üa"
                (unit.name box) (unit.name machine) duration setup-time (kk.get.value (box boxes
) 'ACTIVITY-ID))))))

(defun check-machine-setups-bill (box machine)
  "Input is a setup box.  Test unnecessary, not abutting, correct setup duration."
  (let* (;;(left-box  (kk.get.value (box boxes) 'SAME-MACHINE-PREDECESSOR))
         (right-box (kk.get.value (box boxes) 'SAME-MACHINE-SUCCESSOR))
         (previous-process-box (previous-process-box box))
         (next-process-box (next-process-box box machine)))
    ;; Test for unnecessary extra setup box.
    (when (and previous-process-box
               (same-pvor-p previous-process-box box))
      (format t "ÜXSetup box Üa has same pvor as previous-process-box Üa at time Üa successor Üa
activity-id ua"
              (unit.name box) (unit.name previous-process-box) (utime-to-string (kk.get.value  (b
ox boxes) 'start-time))
              (unit.name (kk.get.value (box boxes) 'same-machine-successor)) (kk.get.value (box
boxes) 'ACTIVITY-ID)))
    ;; bill's custom
    ;; Test for setup box not abutting its same-machine-successor box.
    (when (not (= (kk.get.value (right-box boxes) 'START-TIME) (kk.get.value (box boxes) 'END-TI
ME)))
      (format T "ÜXSetup box Üa  end-time Üa  not abutting right-box Üa type Üa start-time Üa ac
t-id Üa  Üa ÜaÜX"
              (unit.name box) (utime-to-string (kk.get.value (box boxes) 'end-time))
              (unit.name right-box) (kk.get.value (right-box boxes) 'BOX-TYPE)
              (utime-to-string (kk.get.value (right-box boxes) 'start-time)) (kk.get.value (box
boxes) 'ACTIVITY-ID)
              (kk.get.value (box boxes) 'end-time) (kk.get.value (right-box boxes) 'start-time))
)

    ;;;; Test for setup box not abutting P box.
    ;;(let* ((right-box-type (kk.get.value (right-box boxes) 'BOX-TYPE)))
    ;;when (or (not (memq right-box-type '(P X)))
    ;;(not (= (kk.get.value (right-box boxes) 'START-TIME) (kk.get.value (box boxes) 'END-TIME))
))
    ;;(format T "ÜXSetup box Üa end-time Üa  not abutting P box Üa start-time Üa act-id Üa  Üa Ü
aÜX"
    ;;(unit.name box) (utime-to-string (kk.get.value (box boxes) 'end-time))
    ;;(unit.name right-box) (utime-to-string (kk.get.value (right-box boxes) 'start-time)) (kk.g
et.value (box boxes) 'ACTIVITY-ID)
    ;;(kk.get.value (box boxes) 'end-time) (kk.get.value (right-box boxes) 'start-time))))
    ;; Test for setup time being correct.
    (let* ((duration (box-duration box))
           (setup-time (get-setup-time previous-process-box next-process-box machine)))
      (when (and (not (= duration setup-time))
                 (not (eq (kk.get.value (box boxes) 'from-previous-schedule) 'ACTIVITY)))
        (format T "ÜXSetup box Üa machine Üa has bad setup time Üa  should be Üa act-id Üa"
                (unit.name box) (unit.name machine) duration setup-time (kk.get.value (box boxes
) 'ACTIVITY-ID))))))

(defun check-setups ()
  (let* ((bad-setups nil))
   (loop for m in (unit.descendants 'machines 'member) do
        (loop for box = (get.value m 'first-box-on-machine)
              then (next-movable-box box m)
              until (null box) do
              (when (eq (kk.get.value (box boxes) 'box-type) 'S)
                (when (and (next-process-box box m) (not (same-pvor-p (next-process-box box m) b
ox)))
                  (setq bad-setups t)
                  (format t "ÜX Bad setup Üa for Üa machine Üa start Üa " (unit.name box)(unit.n
ame (next-process-box box m))
                          (unit.name m) (utime-to-string (kk.get.value (box boxes) 'start-time))
```

```
))
              (when (and (previous-process-box box) (same-pvor-p (previous-process-box box) bo
x))
               (setq bad-setups t)
               (format t "~% Extra setup ~a with ~a machine ~a start ~a " (unit.name box)
                      (unit.name (previous-process-box box))
                      (unit.name m) (utime-to-string (get.value (previous-process-box box) '
start-time))))))
  bad-setups))

(defun unit.name-if-unit (u)
  (if (and u (unitp u))
      (unit.name u)
      ;; else
      u))

(defun check-trays ()
  (loop for tray in (get-trays-in-system) do
        (let* ((initial-box (kk.get.value (tray trays-in-system) 'initial-box)))
;         (if (not initial-box)
;              (format T "~%Check-trays: no initial box for tray ~a~%" tray)
              (when (and (not (equal (kk.get.value (tray trays-in-system) 'routing)
                             (loop for box = initial-box
                                   then (kk.get.value (box boxes) 'same-tray-successor)
                                   until (or (null box)
                                             (not (equal tray (kk.get.value (box boxes)
'tray))))
                                   collect (kk.get.value (box boxes) 'operation))))
                     (not (kk.get.value (initial-box boxes) 'inventory))
                     (eq 'CUSTOMER (kk.get.value (initial-box boxes) 'order-type)))
               (format t "~%Routing for tray: ~a incorrectly executed" (unit.name tray))))))

(defun convert-date-to-string (time)
  (let (sec min hour date month year day light zone hstring hmstring mstring string lstring date
string monthstring)
    (multiple-value-setq (sec min hour date month year day light zone) (decode-universal-time ti
me *time-zone*))
    (setf hstring (if (< hour 10) (format nil "0~A" hour) (format nil "~A" hour)))
    (setf mstring (if (< min 10) (format nil "0~A" min) (format nil "~A" min)))
    (setf monthstring (if (< month 10) (format nil "0~A" month) (format nil "~A" month)))    ;;;
Added so that all months are
                                                                                           ;;;
printed out using 2 digits.
    (setf datestring (if (< date 10) (format nil "0~A" date) (format nil "~A" date)))     ;;;
Lee Klaus 9/2/88
    (setf string (format nil "~A-~A-~A ~A:~A" year monthstring datestring hstring mstring))
    (setf hmstring (format nil "~A:~A" hstring mstring))
    (setf hour (mod (+ hour 8) 24))
    (when (zerop hour) (setf hour 24))
    (setf lstring (if (< hour 10) (format nil "0~A:~a" hour mstring) (format nil "~A:~a" hour ms
tring)))
    (values string hmstring mstring lstring)))

(defun convert-incr-time-to-string (time)
  (let* (hour min sec temp hstring mstring hmstring)
    (setq sec (rem time 3600))
    (setq temp (floor (/ time 60)))
    (setq min (rem temp 60))
    (setq hour (floor (/ temp 60)))
    (setf hstring (if (< hour 10) (format nil "0~A" hour) (format nil "~A" hour)))
    (setf mstring (if (< min 10) (format nil "0~A" min) (format nil "~A" min)))
    (setf hmstring (format nil "~A:~A" hstring mstring))
    hmstring))

(defun synchronous-boxes (box-predecessor box-successor)
  "The following function is used to determine whether two boxes are synchronous.  It returns t
 if they are, nil if not.
   The logic used is as follows:
```

```
Two boxes are synchrounous if the time between the boxes is <= the sum of:
   1) move time between the operations
   2) lead time between the operations
   3) down-time on the predecessor machine occuring between the end time of the predecessor
      and the start time of the successor
   4) PM time on the successor machine occuring between the end time of the predecessor
      and the start time of the successor
   5) 5 second time-factor used in case there are gaps for batching "
 (let* ((suc-start-time (kk.get.value (box-successor boxes) 'start-time))
       (pred-end-time (kk.get.value (box-predecessor boxes) 'end-time))
       (time-between-boxes (-  suc-start-time pred-end-time))
       (successor-machine (kk.get.value (box-successor boxes) 'machine))
       (predecessor-machine (kk!get.value (box-predecessor boxes) 'machine))
       (move-time (get-agv-time successor-machine predecessor-machine))
       (lead-time (retrieve-process-times (kk.get.value (box-predecessor boxes) 'tray)
                                          (kk.get.value (box-predecessor boxes) 'operation)
                                          (kk.get.value (box-predecessor boxes) 'machine)
                                          'lead-times))
       (time-factor 15)                                            ;; Add 15 seconds to account fo
r batching gaps, etc.
       (from-box box-predecessor)
       (to-box box-successor)
       (valid-downtime 0)
       (valid-pm-time 0)
       (total-time 0))
   ;; Figure out the amount of valid downtime between the operations.
   ;; loop on the predecessor operation from pred-end-time to suc-start-time
   ;; and add up the amount of down-time that is found.
   (loop for box = (kk.get.value (from-box boxes) 'same-machine-successor)
         until (or (>= (kk.get.value (box boxes) 'start-time) suc-start-time) (null box)) do
         (cond ((memq (kk.get.value (box boxes) 'box-type) '(D U))
                (if (<= (kk.get.value (box boxes) 'end-time) suc-start-time)
                    (setq valid-downtime (+ valid-downtime (- (kk.get.value (box boxes) 'end-ti
me) (kk.get.value (box boxes) 'start-time))))
                    (setq valid-downtime (+ valid-downtime (- suc-start-time (kk.get.value (box
 boxes) 'start-time))))))
         (setq from-box box))
   ;; Figure out the amount of valid PM time between the operations
   ;; loop on the sucessor operation from pred-end-time to suc-start-time
     ;; and add up the amount of PM that is found.
   (loop for box = (kk.get.value (to-box boxes) 'same-machine-predecessor)
         until (or (null box) (<= (kk.get.value (box boxes) 'end-time) pred-end-time)) do
         (cond ((eq (kk.get.value (box boxes) 'box-type) 'PM)
                (if (>= (kk.get.value (box boxes) 'start-time) pred-end-time)
                    (setq valid-downtime (+ valid-pm-time (- (kk.get.value (box boxes) 'end-tim
e) (kk.get.value (box boxes) 'start-time))))
                    (setq valid-downtime (+ valid-pm-time (- (kk.get.value (box boxes) 'end-tim
e) pred-end-time))))))
         (setq to-box box))
   (setq total-time (+ move-time lead-time valid-downtime valid-pm-time time-factor))
   (if (<= time-between-boxes total-time)    ;; The function returns t if the boxes are synchro
nous, nil if not-
       t        ;; else
       nil)))

(defun mouse-to-hourglass ()
  (w:remap-mouse :hourglass)
  (w:mouse-warp 5 5)
  (sleep .01)
  (w:mouse-warp 530 200))
 (defun mouse-to-arrow ()
   (w:remap-mouse)
   (w:mouse-warp 5 5)
   (sleep .01)
   (w:mouse-warp 530 200))

 (w:define-mouse-char-mapping :hourglass
                              (list (list w:mouse-glyph-north-west-arrow
                                          w:mouse-glyph-hourglass)))
 (defun view-io-files ()
```

```
 ("View Input/Output files"
   view-io-files
   "View Input and Output files"
   (SUBITEMS ("Files transfered from FCS to ESS"
              browse-input-files
              "Browse files transfered from the Stratus (FCS) to the TI (ESS)-")
             ("Files transfered from ESS to FCS"
              browse-output-files
              "Browse files transfered from the TI (ESS) to the Stratus (FCS)-"))))

(defun browse-input-files ()
  (browse-files "ess:data;"))

(defun browse-output-files ()
  (browse-files "ess:commit;"))

(defun browse-files (dir)
  "This function takes a directory (ending with a ;) and gives the user a list of files in that
directory.
   He/she can then select one or move off the menu to abort the function.  The user is told how
to get back to
   KEE (ESS) and given the option of continuing.  The files are listed in sorted order.   Lee Kl
aus"
  (let* ((unsorted-filenames
          (loop for filename in (directory (format nil "~a*.*#>" dir)) collect
                (list (format nil "~35<~a~;~>" (subseq (string filename)
                                                       (1+ (position #\; (format nil "~a" filena
me) :test #'char-equal))
                                                       (position #\# (format nil "~a" filename)
:test #'char-equal)))
                      filename
                      (string filename))))
         (sorted-filenames (sort unsorted-filenames #'(lambda (a b) (string< (car a) (car b)))))
         (filename (pop-up-menu-choose sorted-filenames :title
                                       "FILENAME    Please pick one.")))
    (if (and filename
             (y-or-n-p "~%Remember to hit the SYSTEM and K keys when you're done viewing the fil
e.  Continue?"))
        (ed filename))))

(defun cleanup ()
  (loop for oper in (unit.children 'operations 'member) do
        (remove.all.values oper 'load-time-for-operation)))

(defun display-users-guide (keepicture viewport mousestate x y)
  "This simple function is used to call up the user's guide for the user
   when he left-clicks on the USERS GUIDE box string.  Keep in mind that
   the proper directory should be looked at."
  (ignore keepicture viewport mousestate x y)

  (ed "ess-doc;users-guide.txt"))

(defun mouse-confirm (prompt-string &optional (stream *watch-window*))
  "This function is used as a simple mouse confirm routine.  A left click
   means yes (T) and a middle or right means no (NIL)"
  (when (and stream (window-stream-p stream)) (expose stream))
  (format (or stream T) "~a~%" prompt-string)
  (prompt-user '(boolean :boolean-mode (mouse)))

(defun setup-times-menu ()
  '(("Setups" nil "Review or Update Setup Times."
    (SUBITEMS ("Review Setup Times" 'REVIEW-SETUP-TIMES "Review Setup Times.")
              ("Update Setup Times" NIL "Update Setup Times."
               (SUBITEMS ("Add Setup Specifications" 'UPDATE-SETUP-TIMES
                          "Add one or more setup specifications for a specific operation.")
                         ("Delete Setup Specifications" 'DELETE-SETUP-TIMES
                          "Delete one or more setup specifications for a specific operation.")))
              ("Permanently Save New Setup Times" 'SAVE-AXLE-KB "Permanently Save the New Setup
Times."))))

(defun delete-setup-times ()
```

```
 "This function lets the user pick setup entries to delete out of a
  specific operation's SETUP-TIMES slot."
 (let* ((operation-units (unit.children 'OPERATIONS 'member))
        (operation-names (loop for op-unit in operation-units collect (unit.name op-unit)))
        (operation-to-update nil)
        (setup-entries nil)
        (setup-entries-to-delete nil))
   (setq operation-to-update (choose-one operation-names "Select an Operation."))
   (loop for entry in (get.values operation-to-update 'setup-times) do
         (setq setup-entries (append setup-entries
                                     (list (list (list (or (first entry) '*)
                                                       (or (second entry) '*)
                                                       (or (third entry) '*)
                                                       (/ (fourth entry) 60))
                                                 $',(list (first entry)
                                                          (second entry)
                                                          (third entry)
                                                          (fourth entry)))))))
   (setq setup-entries-to-delete
         (choice setup-entries "Choose the Setup Entries to be Deleted."))
   (if (not (eql setup-entries-to-delete :ABORTED))
       (loop for entry in setup-entries-to-delete do
             (remove.value operation-to-update 'SETUP.TIMES (list (first entry)
                                                                  (second entry)
                                                                  (third entry)
                                                                  (fourth entry)))))))

(defun review-setup-times ()
  "The following function allows the user to review setup times for one
   or more operations."
  (let* ((operation-units (unit.children 'OPERATIONS 'member))
         (operation-names (loop for op-unit in operation-units collect (unit.name op-unit)))
         (operations-to-review (choice operation-names
                                       "Please select the operations to review.")))
    (if (not (eql operations-to-review :ABORTED))
        (progn
          (make-report-output-window nil)
          (let ((report-window (get.value 'control-unit 'report-output-window)))
            (clear report-window)
            (expose report-window)
            (write-title report-window " Setup Time Review (*'s Represent Wildcards).")
            (loop for op in (sort operations-to-review #'string-lessp) do
                  (format report-window "U3%Operation:  Ua" op)
                  (format report-window
                          "U%
Previous Part            Part To Go              Machine     Setup Time
In Operation             Through Operation                   (minutes)U%")
                  (loop for entry in (get.values op 'SETUP-TIMES) do
                        (let ((prev-part (or (first entry) '*))
                              (part (or (second entry) '*))
                              (machine (or (third entry) '*))
                              (setup-time (/ (fourth entry) 60)))
                          (format report-window "U%U23aU21aU12aUa"
                                  prev-part part machine setup-time))))
            (format report-window
                    "U2%
============================   END   ============================"))))))

(defun update-setup-times ()
  "The following function allows the user to update setup
   times associated with a given operation."
  (let* ((operation-units (unit.children 'OPERATIONS 'member))
         (operation-names (loop for op-unit in operation-units collect (unit.name op-unit)))
         (operation-to-update nil)
         (valid-parts nil)
         (valid-machines nil)
         (previous-part-in-operation nil)
         (part-to-go-through-operation nil)
         (machine nil)
         (setup-time nil)
         (done nil))
```

```
    (setq operation-to-update (choose-one operation-names "Select an Operation-"))
    (setq valid-parts (make-part-list))
    (setq valid-machines (make-machine-list operation-to-update))
;;    (remove.all.values operation-to-update 'setup-times)
    (loop until done do
          (setq previous-part-in-operation (choose-one valid-parts "From Part (* is a wildcard)-
"))
          (setq part-to-go-through-operation (choose-one valid-parts "To Part (* is a wildcard)-
"))
          (setq machine (choose-one valid-machines "Machine Which Runs the Operation (* is a wi
ldcard)-"))
          (setq setup-time nil)
          (loop until (numberp setup-time)
                (with-keeio (format t "~%")
                            (setq setup-time (prompt-user 'READ :prompt "Setup Time (in minutes)
"))))
          (loop for entry in (get.values operation-to-update 'setup-times) do
                (if (and (eql (first entry) previous-part-in-operation)
                         (eql (second entry) part-to-go-through-operation)
                         (eql (third entry) machine))
                    (remove.value operation-to-update 'setup-times entry)))
          (add.value operation-to-update 'setup-times (list
                                                        previous-part-in-operation
                                                        part-to-go-through-operation
                                                        machine
                                                        (* setup-time 60)))
          (if (not (y-or-n-p "Specify more setup times for this operation? "))
              (setq done T)))
   (sort-setup-values operation-to-update)))

(defun sort-setup-values (operation-to-update)
  (let ((sorted-entries (sort (get.values operation-to-update 'setup-times)
                              '(lambda (entry-1 entry-2)
                                  entry-1
                                 (if (and (first entry-1) (not (first entry-2)))
                                     T
                                     (if (and (second entry-1) (not (second entry-2)))
                                         T
                                         (if (and (third entry-1) (not (third entry-2)))
                                             T)))))))
    (remove.all.values operation-to-update 'setup-times)
    (loop for entry in (reverse sorted-entries) do
          (add.value operation-to-update 'setup-times entry))))

(defun choose-one (choices title)
  "This function forces the user to pick one item off the menu."
  (let (chosen-item)
    (loop until chosen-item do
          (setq chosen-item (tic1:send (tv:make-window 'tv:momentary-menu
                                                        :label title
                                                        :columns 1
                                                        :item-list choices)
                                       :choose)))
    (if (eql '* chosen-item) (setq chosen-item nil))
    chosen-item))

(defun make-part-list ()
  "This function return a list of all valid parts in the system"
  (let* ((parts (loop for part in (unit.descendants 'PARTS 'MEMBER) collect (unit.name part))))
    (append '(*) parts)))


(defun make-machine-list (operation)
  (let (machines)
    (loop for machine-class in (get.values operation 'possible-machs-class) do
          (loop for machine in (unit.descendants machine-class 'MEMBER) do
                (setq machines (cons (unit.name machine) machines))))
    (sort machines #'string-lessp)
    (append '(*) machines)))
```

```
(defun update-ft2 ()
  (declare (special *ft2-table*))
  (let ((end-menu-flag))
    (setq *ft2-table*
          (loop for entry in (get.values 'control-unit 'frozen-time-2-cutoff) collect
                (list (first entry) (second entry))))
    (setq end-menu-flag
          ;; set end-menu-flag to whatever the throw and catch returns-
          (catch 'end-menu
            (tv:choose-variable-values
              '(( *ft2-table*
                 (0  "Machine                "
                     :documentation "ESS Machines - Do not modify the value")
                 (1  "FT2 Cutoff (hours)"
                     :documentation "FT2 Cutoff - Events must start before BC plus this time to
be scheduled"
                     :number)))
              :width 45
             :label '(:font fonts:hl12bi :string "Update FT2 Cutoff Time")
             :margin-choices '(("Abort" (throw 'end-menu 'ABORTED))))))
        (if (not (eql end-menu-flag 'ABORTED))
            (progn
              (remove.all.values 'control-unit 'frozen-time-2-cutoff)
              (loop for entry in (reverse *ft2-table*) do
              (add.value 'control-unit 'frozen-time-2-cutoff (list (first entry) (second entry
))))))))

(defun update-end-activities ()
  " Function to let user modify range (time in days) of activities passed back to FOS"

  (declare (special *end-of-activities*))
  (let ((end-menu-flag))
       (setq *end-of-activities* (list (list (get.value *control-unit* 'modified-end-of-activit
ies))))
    (setq end-menu-flag
          ;; set end.menu.flag to whatever the throw and catch returns.
          (catch 'end-menu
            (tv:choose-variable-values
              '(( *end-of-activities*
                 (0  "End of Activities (days)"
                     :documentation "Number of days beyond BC time for activities to be passed b
ack to FOS."
                     :number)))
              :width 45
              :label '(:font fonts:hl12bi :string "Update End of Activities.")
              :margin-choices '(("Abort" (throw 'End-menu 'ABORTED)))))) ; FIXED TYPO -ND.MENU =
> END-MENU CRJ 5/8
          (if (not (eql end-menu-flag 'ABORTED))
              (progn
                      (loop for entry in (reverse *end-of-activities*) do
                (put.value 'control-unit 'modified-end-of-activities (first entry) ))))))

(defun update-gap-for-batched-in-compact-left ()          ;;; added 4-12-89   DHO    for better
batching results on batchable machines
  " Function to let user modify time (in hours) for allowing adding two setups for batched parts
 in compact left"
  (declare (special *reqd-time-gap*))
  (let ((end-menu-flag))
       (setq *reqd-time-gap* (list (list (get.value *control-unit* 'time-gap-for-allowing-two-s
etups-in-reschedule-left))))
    (setq end-menu-flag
          (catch 'end-menu
            (tv:choose-variable-values
              '(( *reqd-time-gap*
                 (0  "Required Time Gap (hours)"
                     :documentation "Required hours for allowing the addition of setups in compa
ct left (batched parts)."
                     :number)))
              :width 45
              :label '(:font fonts:hl12bi :string "Update Required Time Gap (hours).")
              :margin-choices '(("Abort" (throw 'end-menu 'ABORTED))))))
```

```
        (if (not (eql end-menu-flag 'ABORTED))
            (progn
                    (loop for entry in (reverse *reqd-time-gap*) do
                 (put.value 'control-unit 'time-gap-for-allowing-two-setups-in-reschedule-left (f
irst entry) ))))))

(defun make-setups-abut ()
 " Function to abut setups with the initial process box if possible.  To handle cases that
   compact schedule left doesn't take care of"
 (let (next-process setup-duration pocket
       process-start
       setup-end setup-start quit)
   (loop for machine in (unit.descendants 'machines 'member) do
         (loop for box = (get.value machine 'first-box-on-machine)
               then (kk.get.value (box boxes) 'same-machine-successor)
               until (null box) do
               (when (eq (kk.get.value (box boxes) 'box-type) 'S)
                 (setq quit nil)
                 (setq next-process (next-process-box box 'machine))
                 (setq process-start (kk.get.value 'next-process boxes) 'start-time))
                 (setq setup-end (kk.get.value (box boxes) 'end-time))
                 (setq setup-start (kk.get.value (box boxes) 'start-time))
                 (setq setup-duration (- setup-end setup-start))
                 (when (not (equal setup-end process-start))
                   (format t "~% try to abut setup ~a on machine ~a at ~a " (unit.name box) (un
it.name machine)
                         (utime-to-string (kk.get.value (box boxes) 'start-time)))
                   (loop for box1 = next-process
                        then (kk.get.value (box1 boxes) 'same-machine-predecessor)
                        until quit do
                        (setq pocket (- (kk.get.value (box1 boxes) 'start-time)
                                       (kk.get.value ((kk.get.value (box1 boxes) 'same-machin
e-predecessor) boxes) 'end-time)))
                        (when (> pocket setup-duration)
                          (setq quit t)
                          (format t "~% pocket ~a ~a " (kk.get.value (box1 boxes) 'same-machi
ne-predecessor) box1)
                          (remove-box box)
                          (kk.put.value (box boxes) 'end-time (kk.get.value (box1 boxes) 'star
t-time))
                          (kk.put.value (box boxes) 'start-time (- (kk.get.value (box boxes) '
end-time) setup-duration))
                          (insert-box box nil box1)
                          ))))))))

(defun update-machine-unit  ()
  (let* ((leadoff-machine-list nil)
         machines)
     (loop for part in (unit.descendants 'parts 'member) do
          (setq machines (unit.descendants (get.value (first (get.value part 'routing)) 'possibl
e-machine-class) 'member))
          (loop for machine in machines do
                (if (not (member (unit machine) leadoff-machine-list))
                    (setq leadoff-machine-list (append leadoff-machine-list (list (unit machine)
))))))
    (put.value 'machines 'leadoff-machines leadoff-machine-list)))

(defun setups-broach ()
;;     temporary function to count all setups on broach, the number of
;;     processes with each setup and the start time of the each setup
  (let* ((setups 0)
         (processes 0)
         (part nil)
         (start-time 0))
  (loop for box = (get.value 'gen-broach-1 'first-box-on-machine)
        then (kk.get.value (box boxes) 'same-machine-successor)
        until (null box) do
```

```
    (when (eq (kk.get.value (box boxes) 'box-type) 'S)
      (setq setups (+ setups 1))
      (setq start-time (kk.get.value (box boxes) 'start-time))
      (format t "~%% last setup had ~a ~a starting at ~a " processes part (utime-to-string st
art-time))
      (setq processes 0))
    (when (eq (kk.get.value (box boxes) 'box-type) 'P)
      (when (eq processes 0)
      . (setq part (unit.name (kk.get.value ((kk.get.value (box boxes) 'tray) trays-in-syste
) 'part-id))))
      (setq processes (+ processes 1))))
  (format t "~%% setups on broach is ~a " setups)))

defun get-trays-in-system (&optional type)

  "Gets all the trays that are in the system.  If a type is specified either as a list or as a a
tom it will return
    the trays of that type."

  (if type
      (unless (listp type)
        (setq type (list type)))
      (setq type (unit.children 'trays-in-system 'subclass)))
  (loop for each in type
        append (get.value each 'trays-in-system)))
```

The embodiments of the invention in which an exclusive property or privilege is claimed are defined as follows:

1. A computer implemented method of scheduling a plurality of machine operations in a predetermined sequence in a factory containing a plurality of machines and a factory control system which controls the machines in accordance with the schedule, comprising the steps of:

a. constructing a computer model of the factory comprising data relating to the production of parts including inventory, operations, machines, and at least one customer order,
b. scheduling the machine operations necessary to produce the parts in the customer order in the reverse order of routing with the last operation being scheduled first and the first operation being scheduled last,
c. modifying the schedule defined in scheduling step b. by removing machine operations which are unnecessary due to existing factory part inventory to thereby better utilize available machine capacity,
d. further modifying the schedule produced in schedule modifying step c. by shifting certain operations forward in time to insure that no operations are scheduled prior to a predetermined build context time.

2. The invention defined in claim 1 comprising the further step of modifying the schedule produced in schedule modifying step d of claim 1 to include preventive maintenance jobs on machines requiring same during the scheduling horizon.

3. The invention defined in claim 2 comprising the further step of modifying the schedule to front load the schedule.

4. The invention defined in claim 1 comprising the further step of modifying the schedule, if lateness is anticipated for customer orders, by removing machine operations which are unnecessary due to existing safety stock to thereby minimize lateness.

5. The invention defined in claim 1 comprising the further step of modifying the schedule, by forward scheduling the necessary operations to replenish safety stock to a predetermined level.

6. The invention defined in claim 1 wherein step b comprises the steps of, 1) sorting customer orders by due date,
2) considering each of the sorted orders in sequence,
3) considering each operation required to produce the part in the order in the reverse sequence of routing,
4) selecting a machine capable of performing a given operation,
5) defining a desirable window of time during which the operation can be performed.

* * * * *